US011874449B2

(12) United States Patent
Jacques

(10) Patent No.: US 11,874,449 B2
(45) Date of Patent: Jan. 16, 2024

(54) PYRAMIDAL WALL SECTIONS

(71) Applicant: Jonathan Jacques, Peabody, MA (US)

(72) Inventor: Jonathan Jacques, Peabody, MA (US)

( * ) Notice: Subject to any disclaimer, the term of this patent is extended or adjusted under 35 U.S.C. 154(b) by 260 days.

(21) Appl. No.: 16/921,160

(22) Filed: Jul. 6, 2020

(65) Prior Publication Data

US 2020/0333571 A1  Oct. 22, 2020

Related U.S. Application Data

(63) Continuation-in-part of application No. 15/912,343, filed on Mar. 5, 2018, now Pat. No. 10,707,807.
(Continued)

(51) Int. Cl.
*G02B 19/00* (2006.01)
*H02S 40/22* (2014.01)
(Continued)

(52) U.S. Cl.
CPC .......... *G02B 19/0042* (2013.01); *F21S 8/088* (2013.01); *F21S 9/037* (2013.01);
(Continued)

(58) Field of Classification Search
CPC ....... H02S 40/22; H02S 40/38; H05B 45/325; H05B 47/105; F21S 8/086; F21S 8/088;
(Continued)

(56) References Cited

U.S. PATENT DOCUMENTS 4,003,756 A  1/1977 Abrams
4,398,053 A  8/1983 Orillion
(Continued)

FOREIGN PATENT DOCUMENTS

CN  2015/32958 U  7/2010
CN  104037250 A  9/2014
(Continued)

OTHER PUBLICATIONS

International Search Report for counterpart application PCT/US2019/020713, dated Jul. 10, 2019.
(Continued)

*Primary Examiner* — Brook Kebede
(74) *Attorney, Agent, or Firm* — Lathrop GPM LLP; Ricardo Ochoa

(57) ABSTRACT

A light-collecting unit having an inverted pyramid shape is described. The light-collecting unit has one or more outer light-collecting panel facing inward. The light-collecting unit also includes a first plurality of inner, light-collecting panels facing outward and a second plurality of inner, light-collecting panels facing inward. A flower base is configured to support the first plurality of inner, light-collecting panels and the second plurality of inner, light-collecting panels. The first plurality of inner, light-collecting panels is disposed on an outer facing side of the flower base and the second plurality of inner, light-collecting panels is disposed on an inner facing side of the flower base. The light-collecting unit may also include a light emitting element, such as an LED or fiber optic cable end. The light emitting element may provide infrared light to the light-collecting unit. The light emitting element may provide the light using pulse-wave modulation.

22 Claims, 299 Drawing Sheets

Related U.S. Application Data which is a continuation-in-part of application No. 15/484,762, filed on Apr. 11, 2017, now Pat. No. 9,929,691.

(60) Provisional application No. 62/321,287, filed on Apr. 12, 2016.

(51) Int. Cl.
| | | |
|---|---|---|
| *H02S 40/38* | (2014.01) | |
| *F21S 8/08* | (2006.01) | |
| *F21V 8/00* | (2006.01) | |
| *H05B 45/325* | (2020.01) | |
| *H05B 47/105* | (2020.01) | |
| *F21S 9/03* | (2006.01) | |
| *F21Y 107/40* | (2016.01) | |
| *F21Y 115/10* | (2016.01) | |

(52) U.S. Cl.
CPC ....... *G02B 6/0008* (2013.01); *G02B 19/0019* (2013.01); *H02S 40/22* (2014.12); *H02S 40/38* (2014.12); *H05B 45/325* (2020.01); *H05B 47/105* (2020.01); *F21Y 2107/40* (2016.08); *F21Y 2115/10* (2016.08)

(58) Field of Classification Search
CPC ... F21S 9/037; G02B 6/0008; G02B 19/0019; G02B 19/0042; F21Y 2107/00; F21Y 2107/30; F21Y 2107/40; F21Y 2115/10
USPC ............................................................ 29/25
See application file for complete search history.

(56) References Cited

U.S. PATENT DOCUMENTS

| | | |
|---|---|---|
| 6,586,890 B2 | 7/2003 | Min et al. |
| 8,579,360 B2 | 11/2013 | Litchfield |
| 9,929,691 B2 | 3/2018 | Jacques |
| 2009/0230725 A1 | 9/2009 | Juieng |
| 2009/0231838 A1* | 9/2009 | Kim ........................ F21S 8/086 362/183 |
| 2010/0096000 A1 | 4/2010 | Andrade |
| 2010/0289424 A1 | 11/2010 | Chang et al. |
| 2011/0083718 A1 | 4/2011 | Wichner |
| 2011/0193648 A1 | 8/2011 | Zhao |
| 2012/0020060 A1 | 1/2012 | Myer et al. |
| 2012/0138047 A1 | 6/2012 | Ashkin |
| 2013/0138259 A1 | 5/2013 | Yokoyama |
| 2014/0028242 A1* | 1/2014 | Akin ........................ H02J 7/35 320/101 |
| 2014/0210374 A1 | 7/2014 | Schoel et al. |
| 2015/0027514 A1 | 1/2015 | Furutani et al. |
| 2015/0115710 A1* | 4/2015 | Tuerk .................... H05B 47/19 307/23 |
| 2015/0285959 A1 | 10/2015 | Samuels |
| 2015/0325734 A1 | 11/2015 | Pisharodi |
| 2016/0013347 A1 | 1/2016 | Weffer |
| 2016/0073591 A1 | 3/2016 | Surany |
| 2017/0019970 A1 | 1/2017 | Chemel et al. |
| 2017/0294872 A1 | 10/2017 | Jacques |
| 2017/0331322 A1* | 11/2017 | Tuerk ................ H02J 13/00016 |
| 2018/0226917 A1 | 8/2018 | Jacques |
| 2019/0032359 A1* | 1/2019 | Jiang ..................... A45B 25/14 |

FOREIGN PATENT DOCUMENTS

| | | |
|---|---|---|
| EP | 2509113 A1 | 10/2012 |
| KR | 10-1022749 | 3/2011 |
| KR | 10-1724314 | 4/2017 |
| WO | 2015/198348 A1 | 12/2015 |

OTHER PUBLICATIONS

"Inside-Out Pyramids Triple a Solar Cell's Efficiency," http://physicsbuzz.physicscentral.com/2013/07/inside-out-pyramids-triple-solar-cells.html (Jul. 9, 2013).

\* cited by examiner

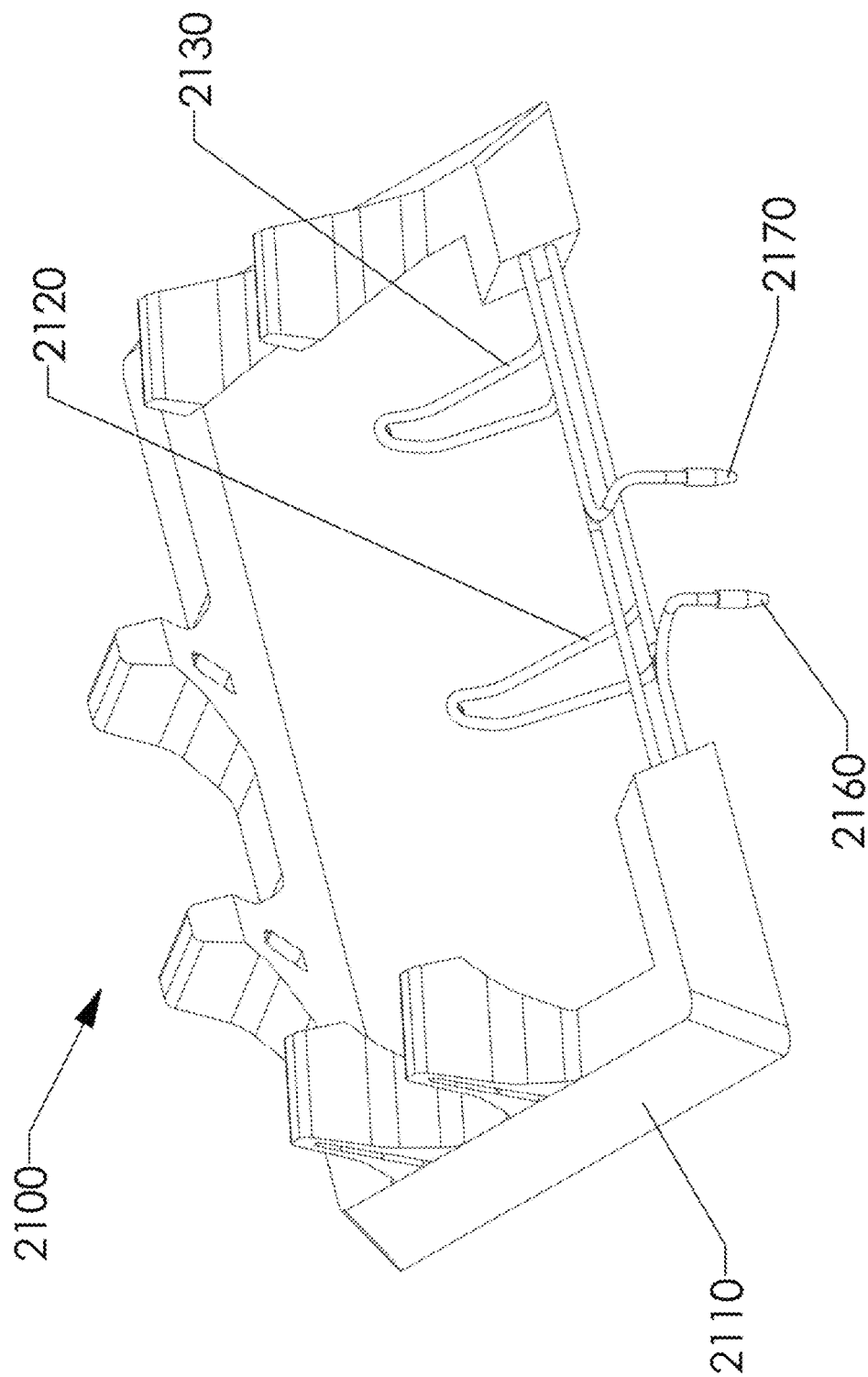

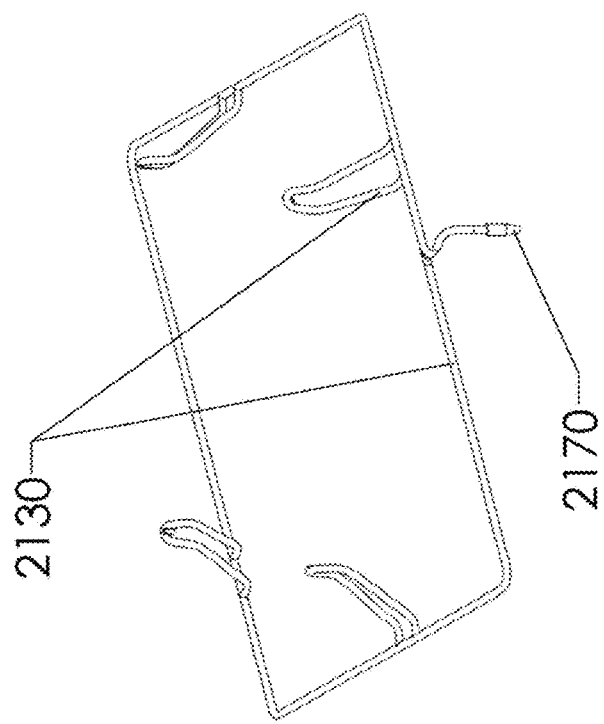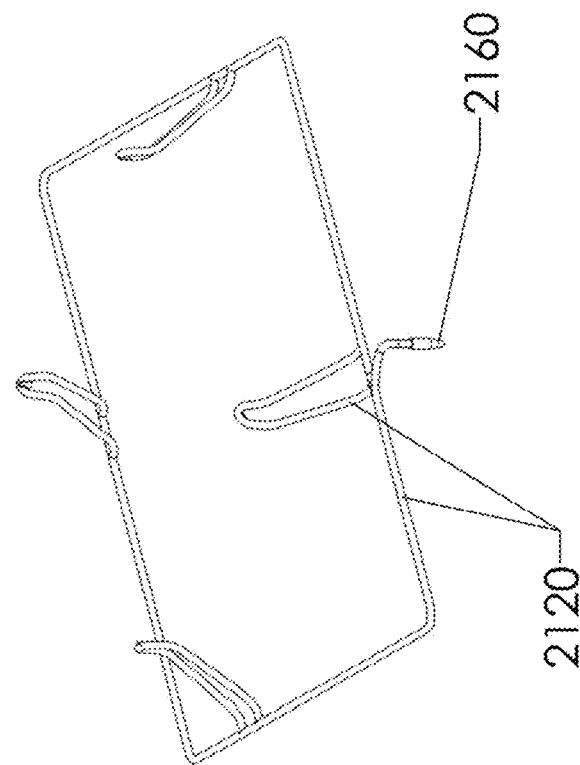
Figure 56B

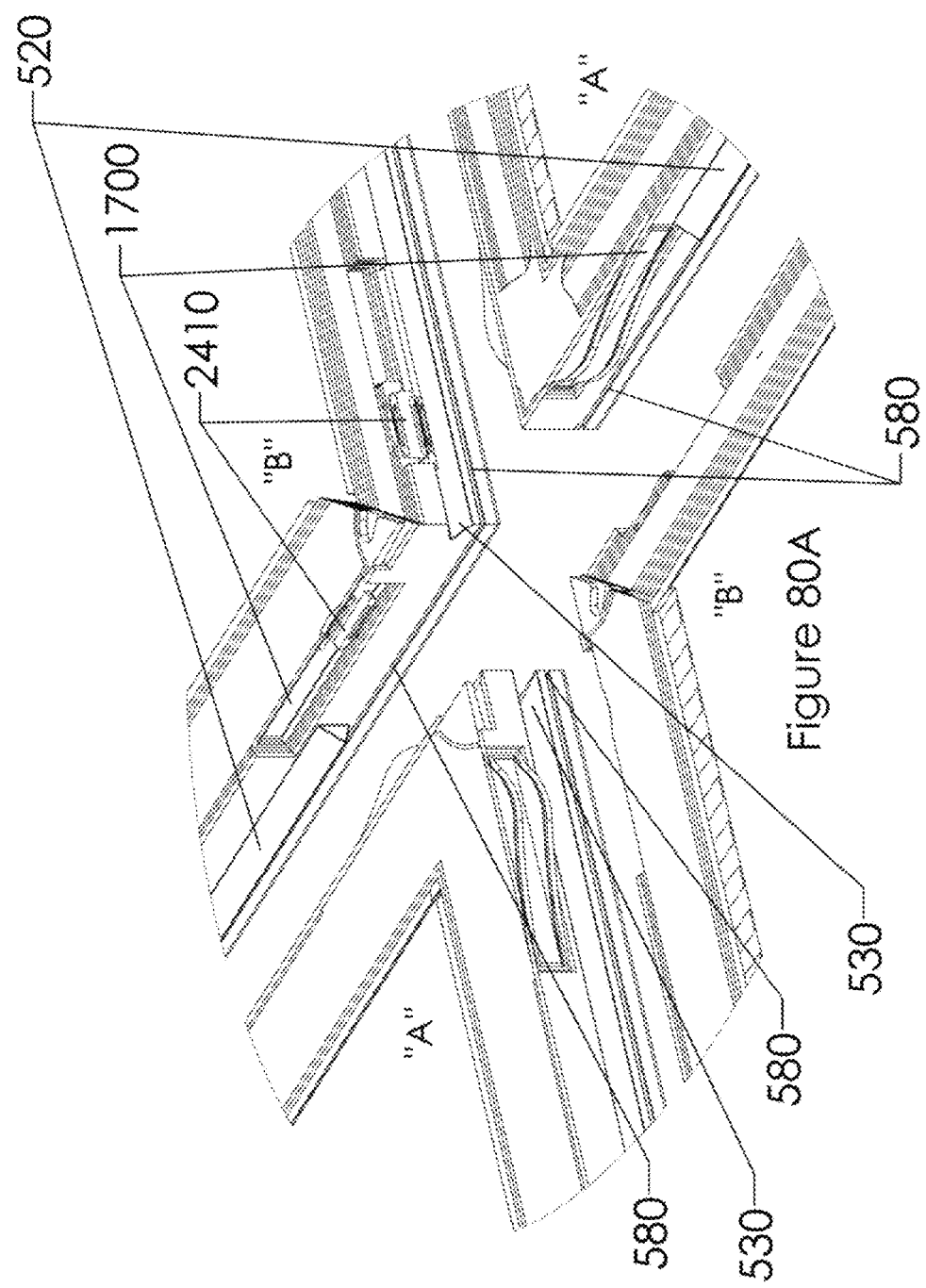

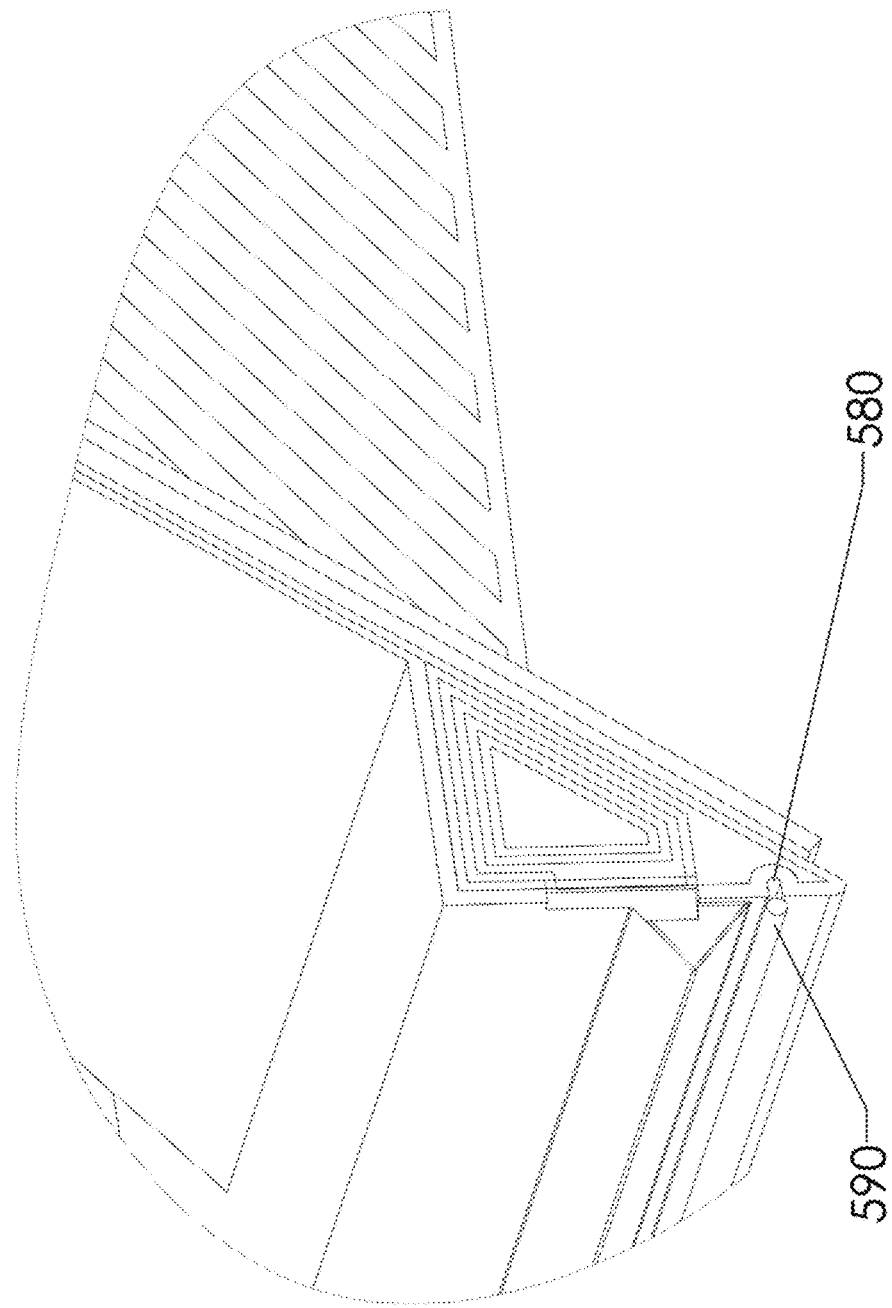

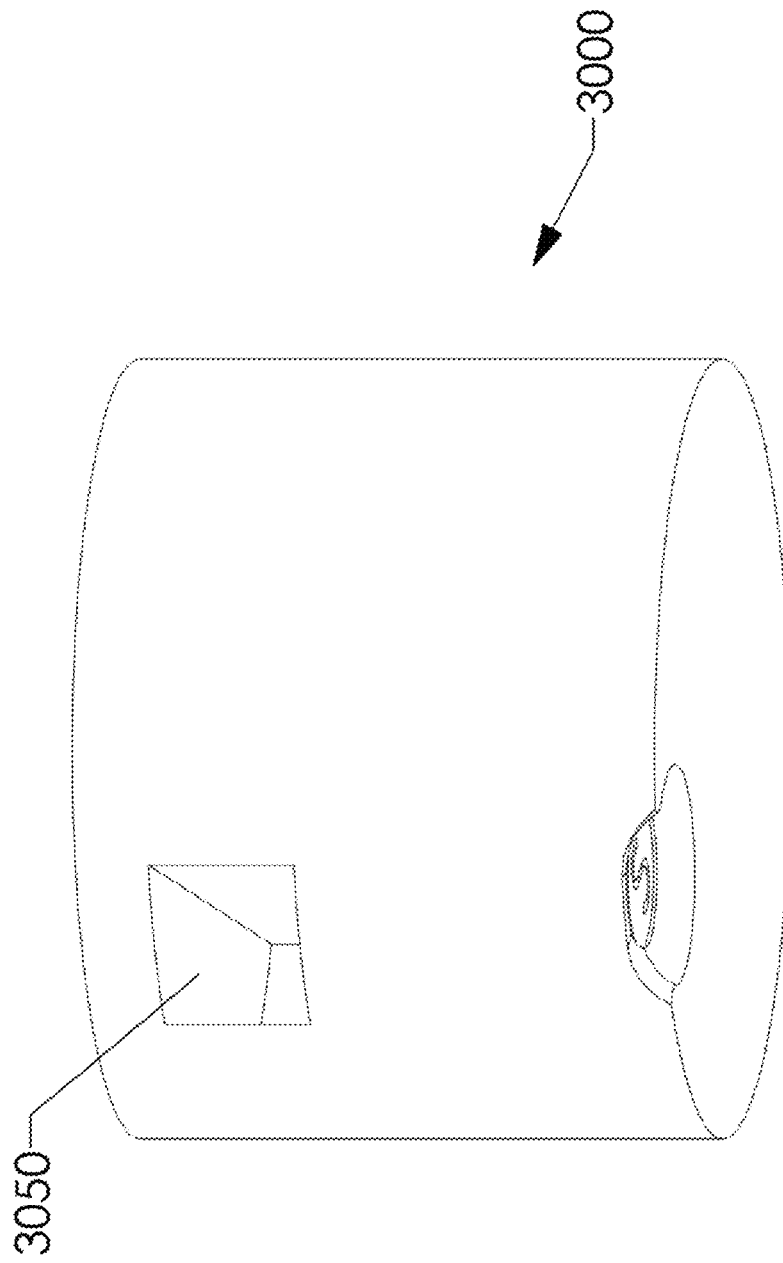

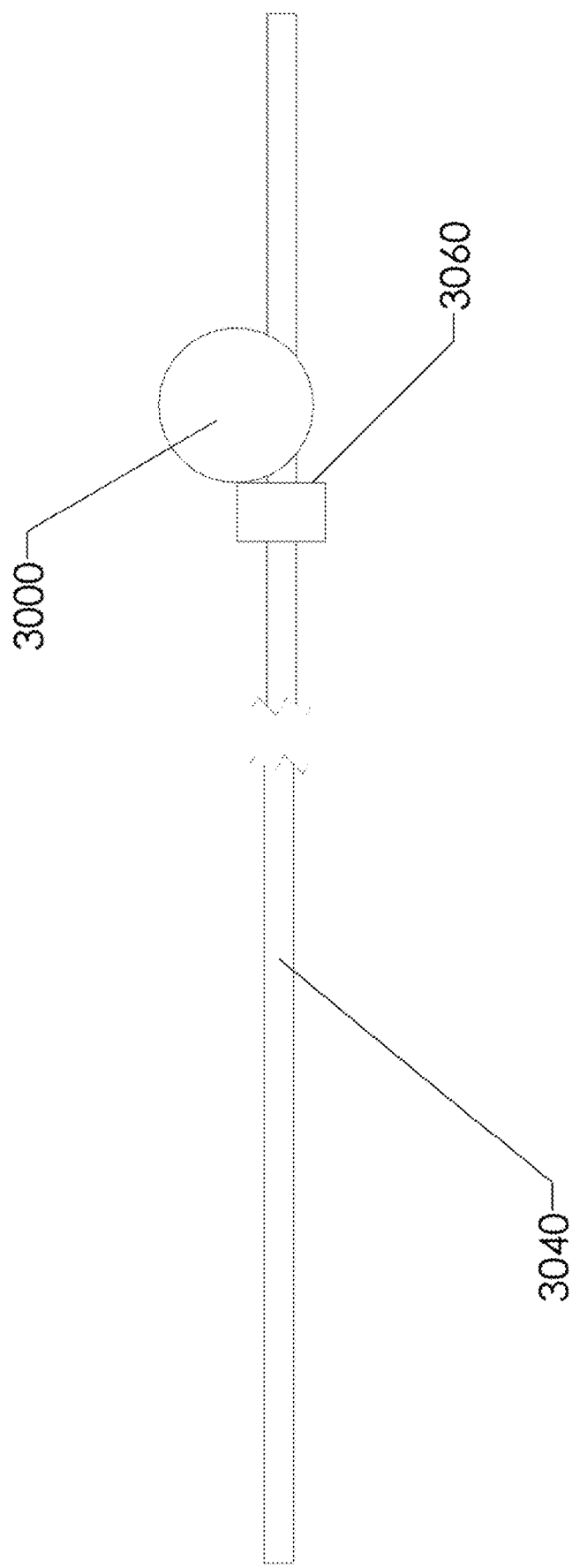

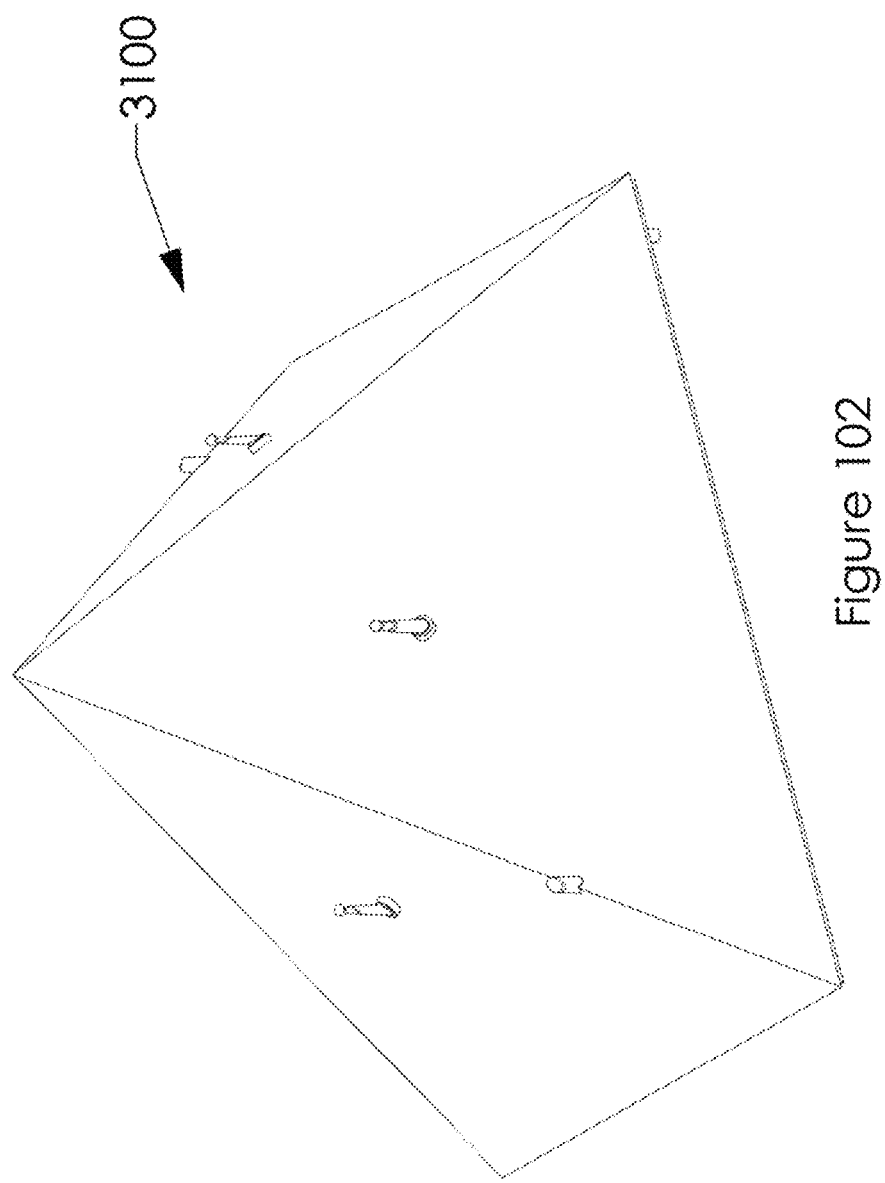

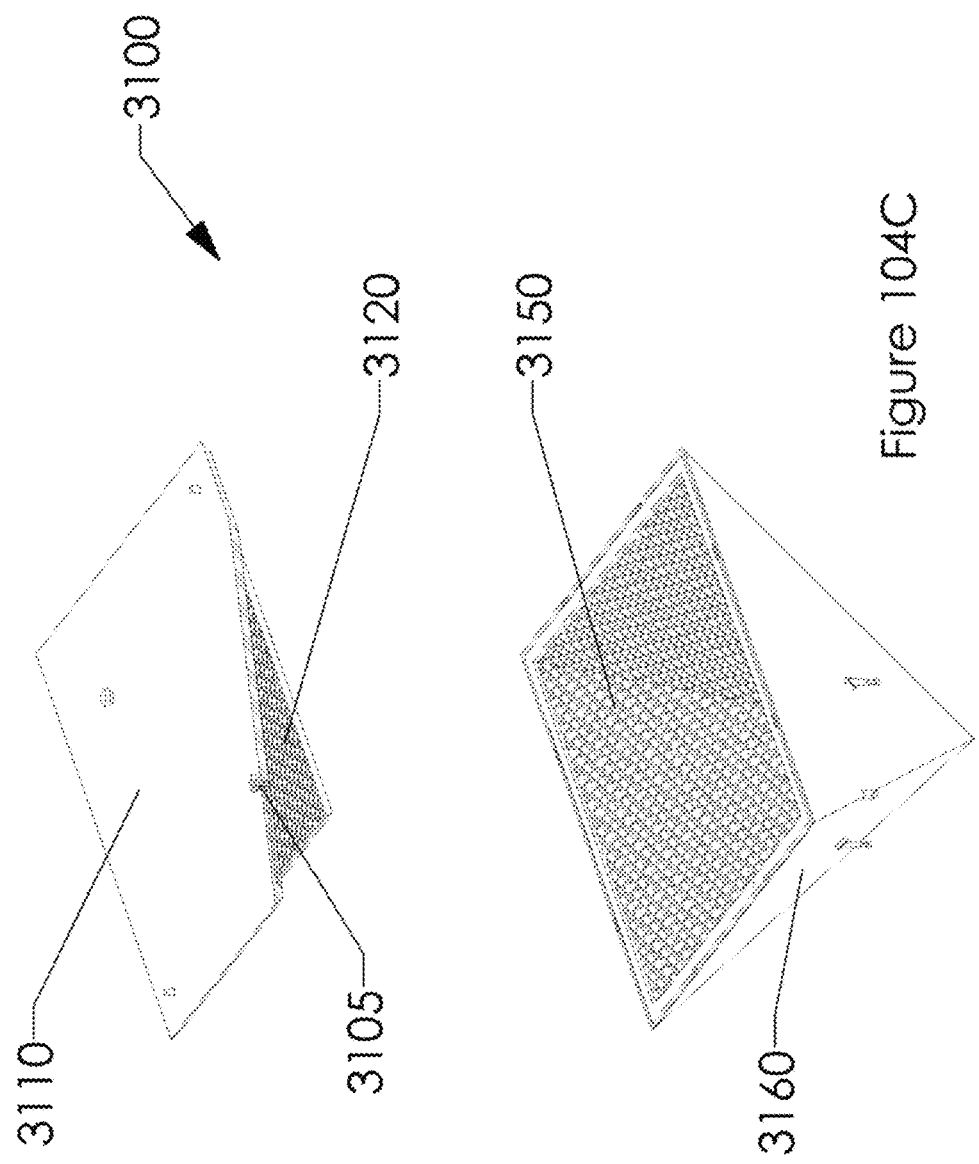

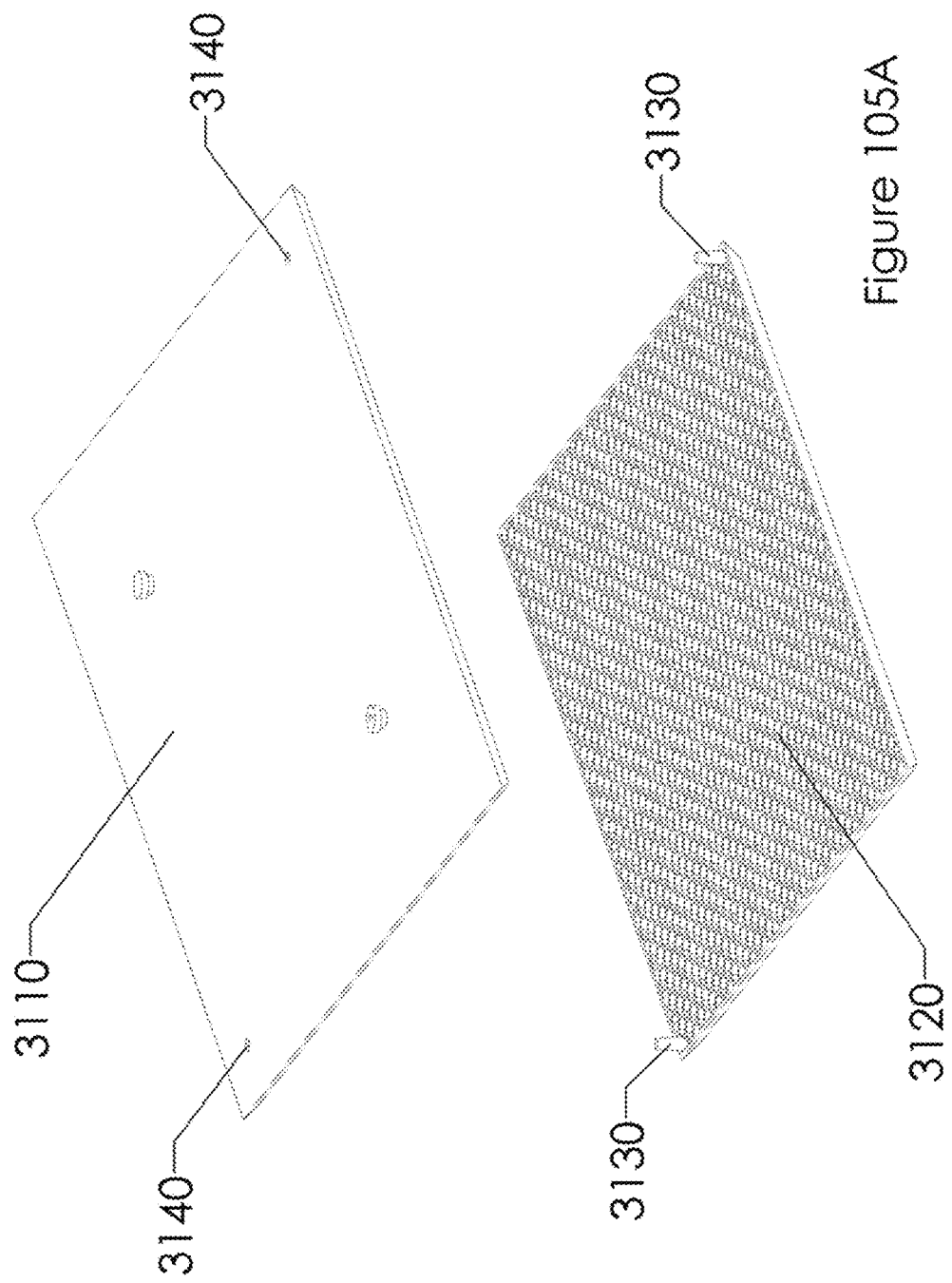

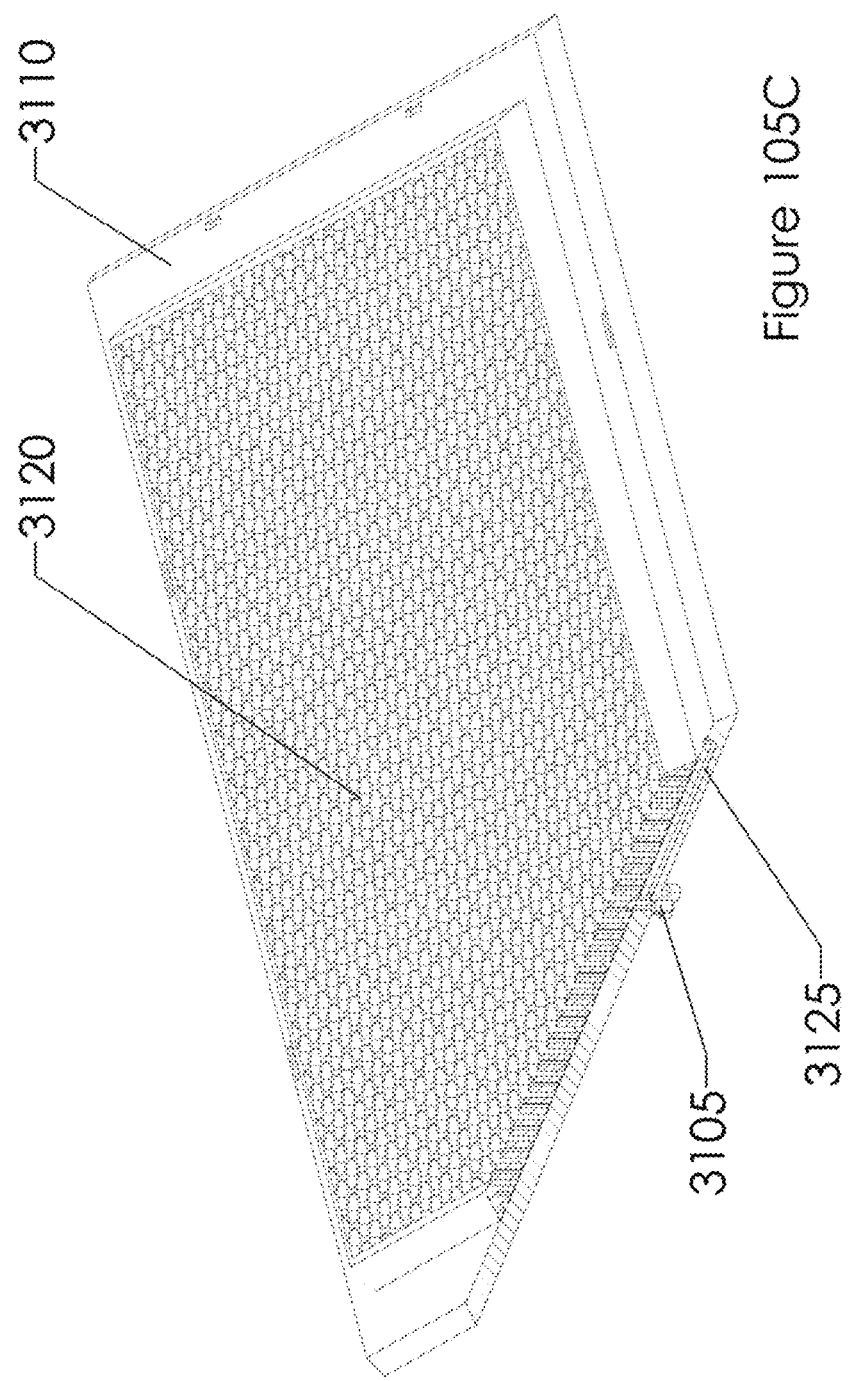

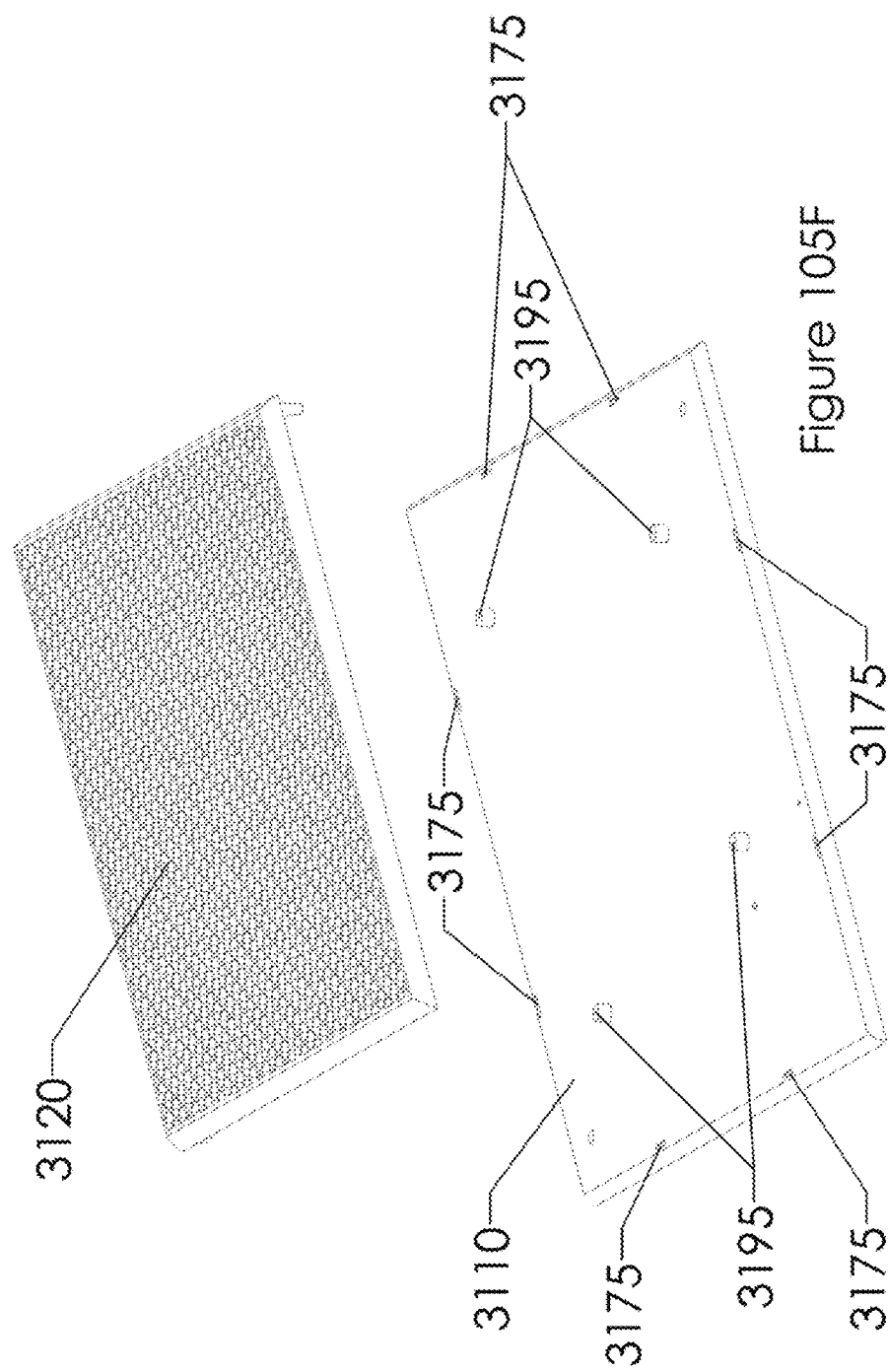

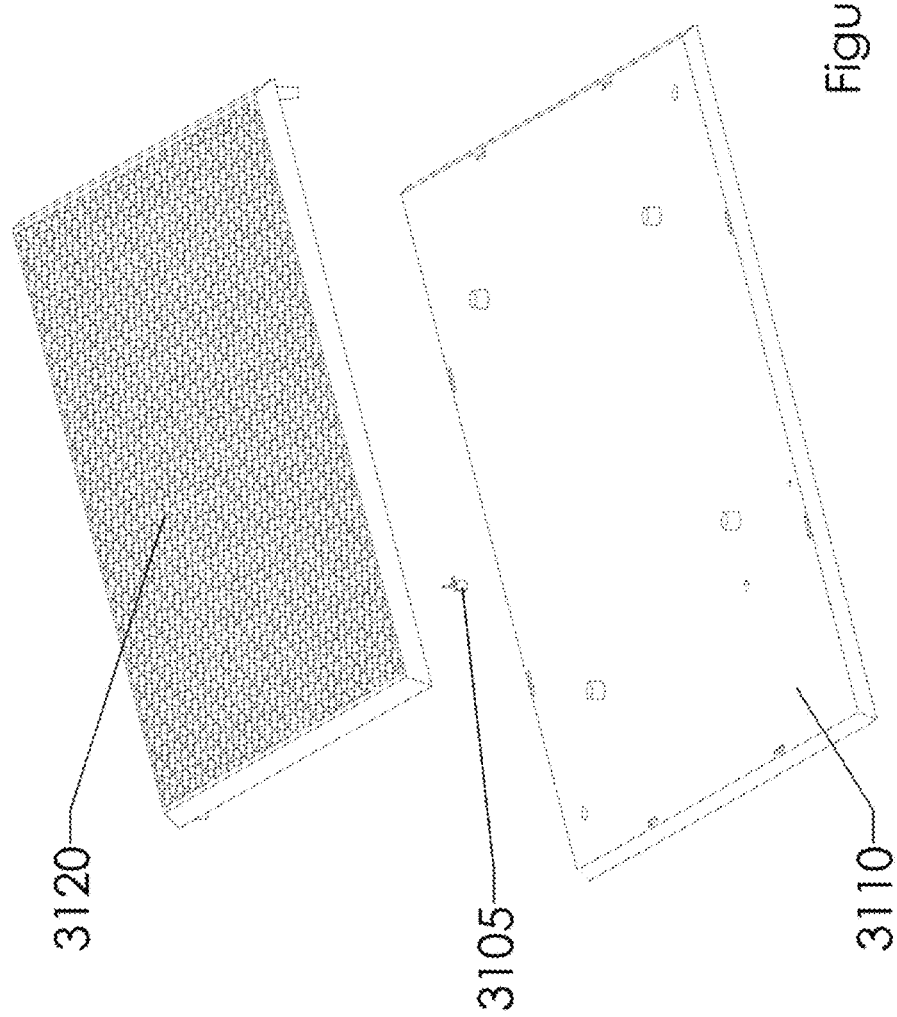

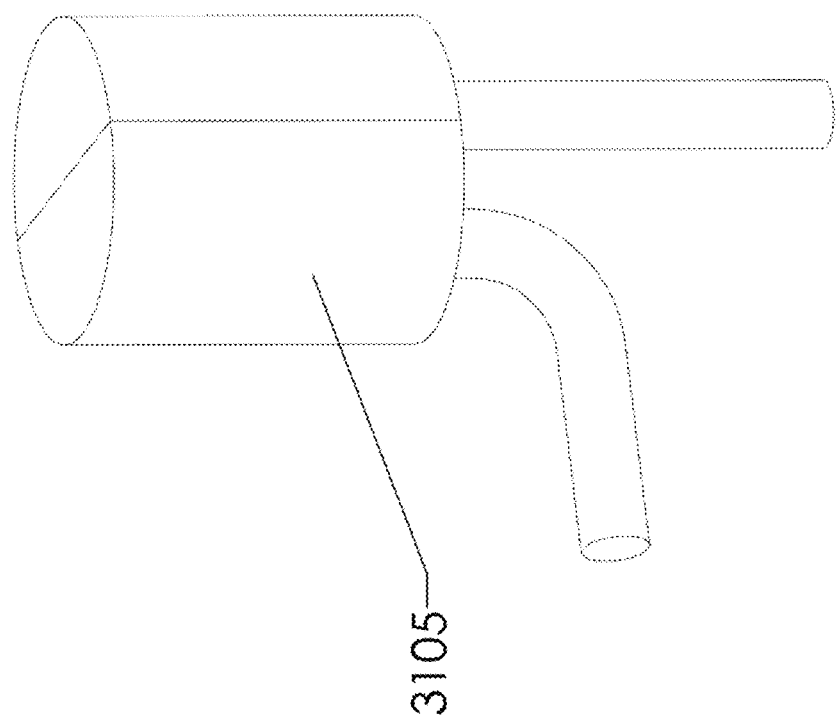

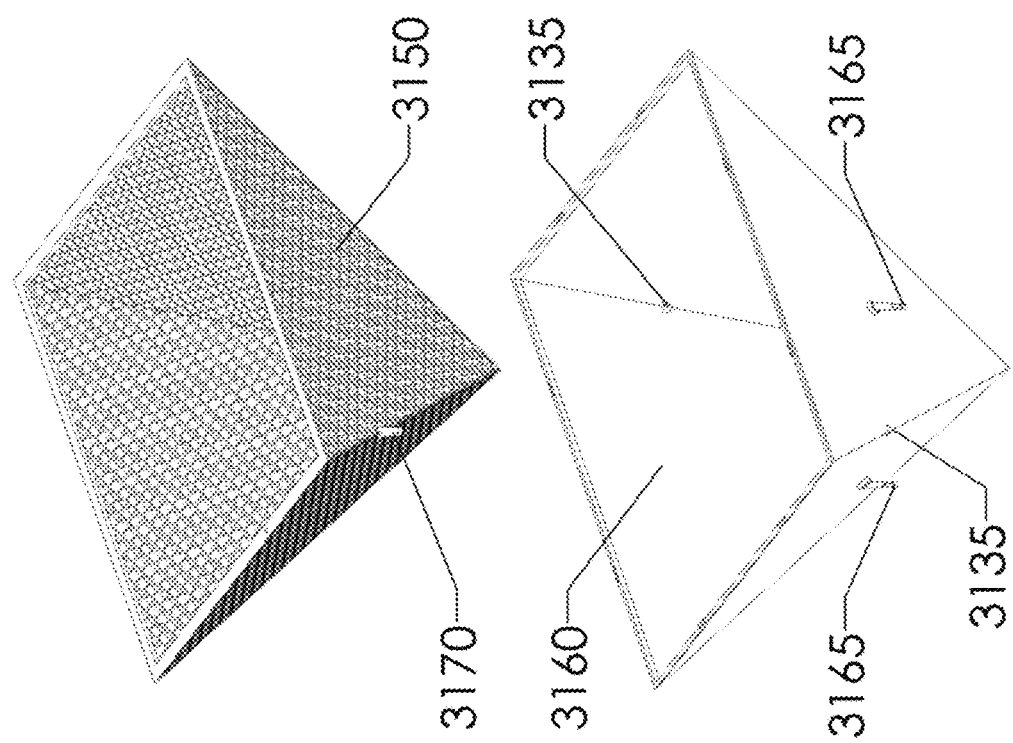

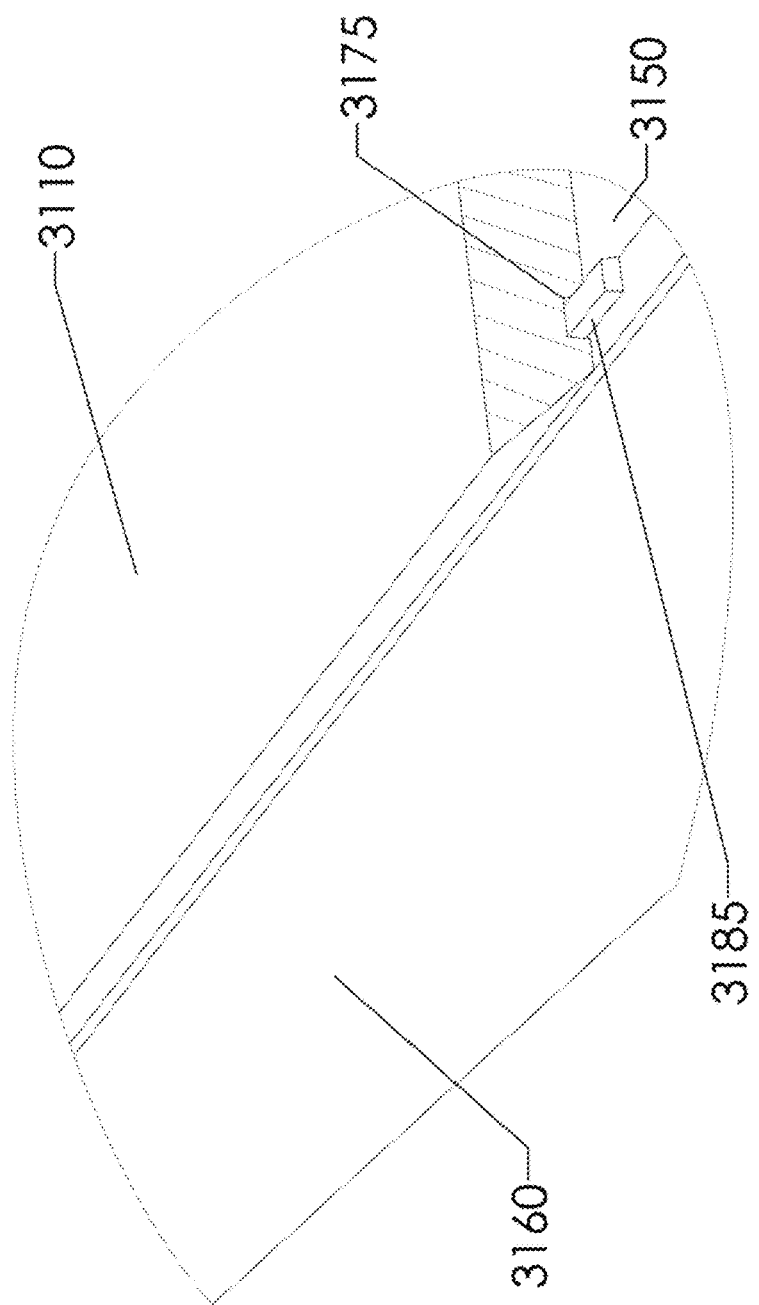

Figure 1111

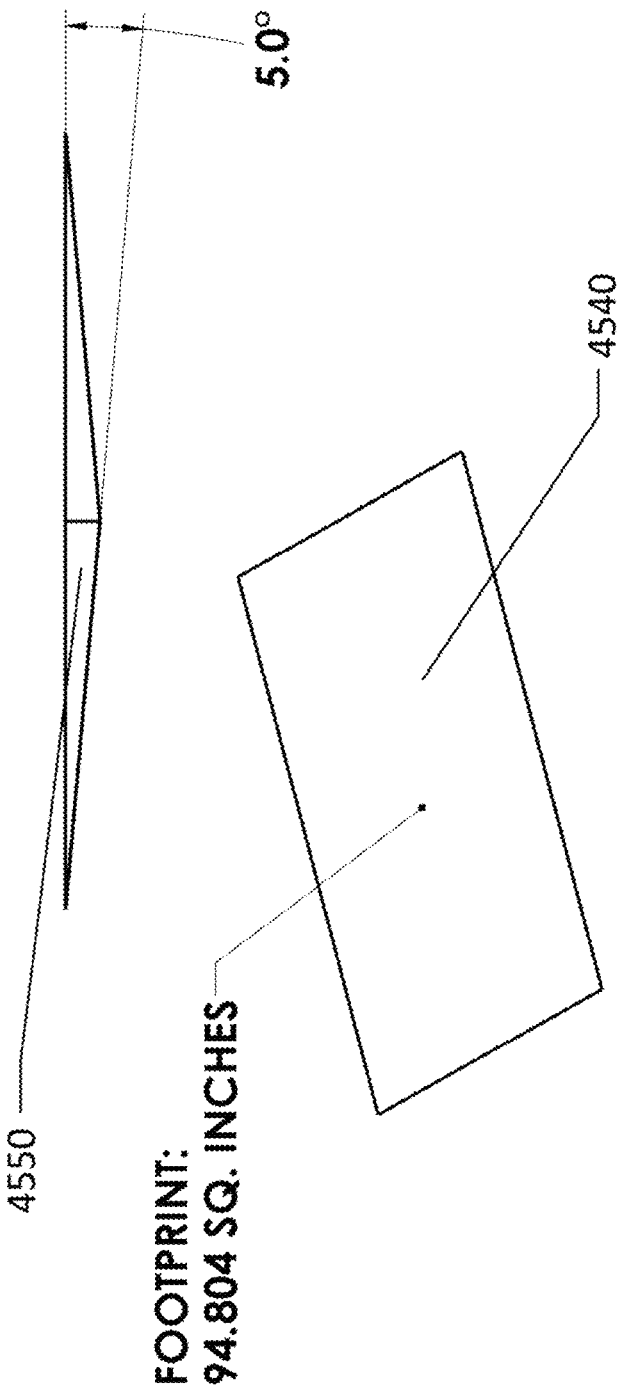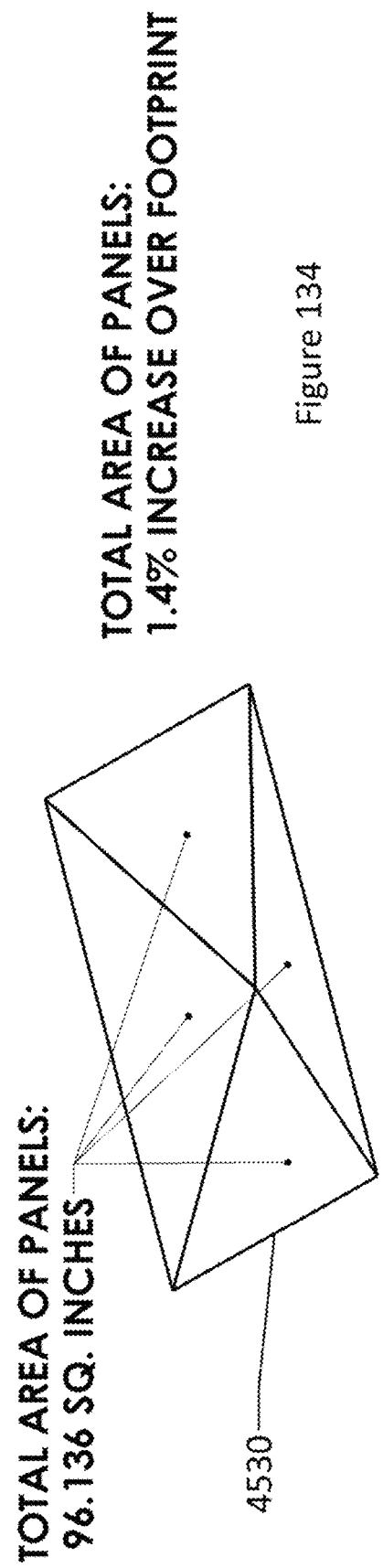
Figure 134

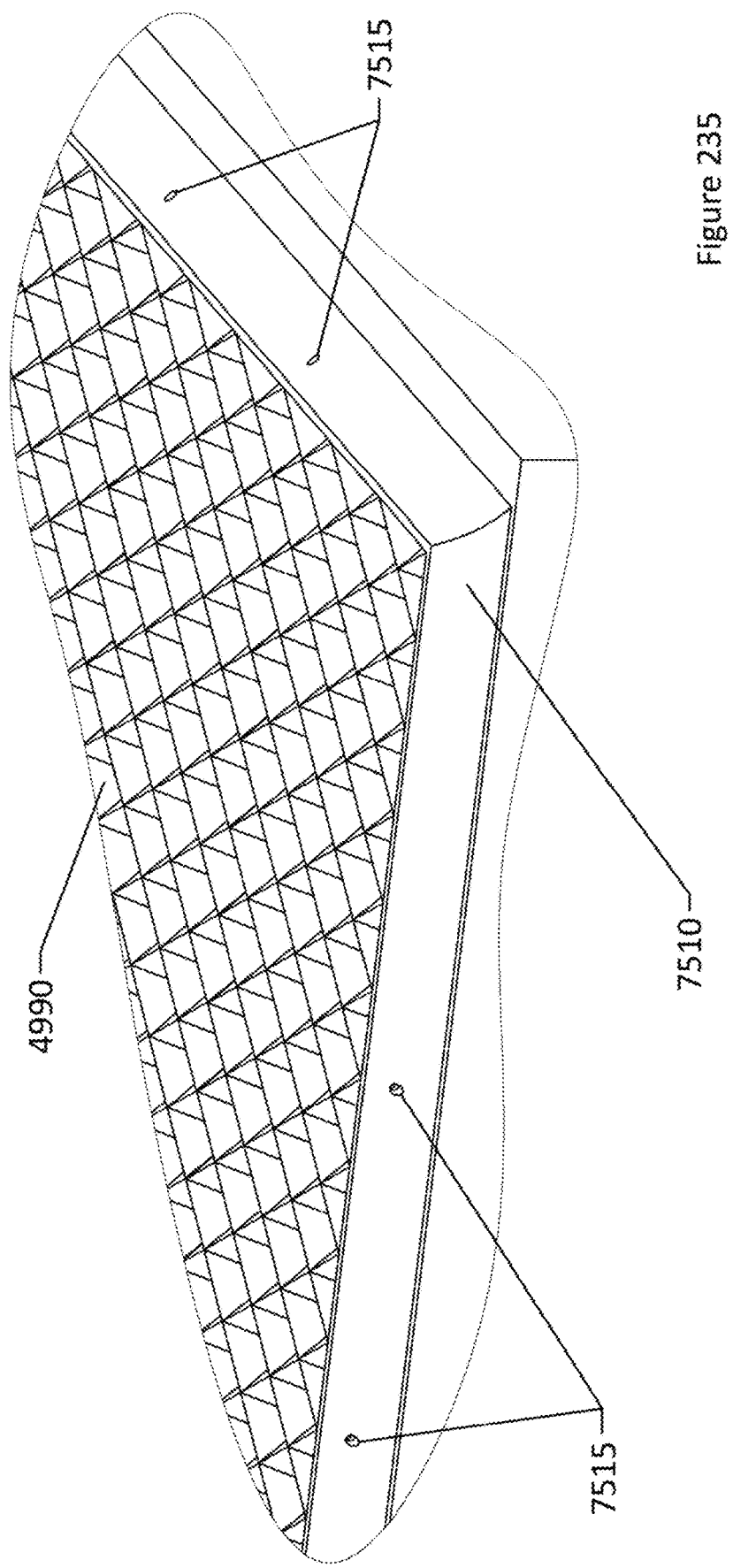

PYRAMIDAL WALL SECTIONS

STATEMENT REGARDING FEDERALLY SPONSORED RESEARCH OR DEVELOPMENT

N/A

BACKGROUND OF THE INVENTION

Various embodiments relate generally to modular wall systems, methods, and devices and, more specifically, relate to wall sections that can be used to create walls for a pyramidal-shaped structure.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

The ability to create structures quickly can be very important for effective emergency response. Additionally, having materials which are lightweight and space-efficient allows for quick deployment in remote locations.

BRIEF SUMMARY OF THE INVENTION

The below summary is merely representative and non-limiting.

The above problems are overcome, and other advantages may be realized, by the use of the embodiments.

In a first aspect, a light-collecting unit having an inverted pyramid shape. The light-collecting unit has one or more outer light-collecting panel facing inward. The light-collecting unit also includes a first plurality of inner, light-collecting panels facing outward and a second plurality of inner, light-collecting panels facing inward. A flower base is configured to support the first plurality of inner, light-collecting panels and the second plurality of inner, light-collecting panels. The first plurality of inner, light-collecting panels is disposed on an outer facing side of the flower base and the second plurality of inner, light-collecting panels is disposed on an inner facing side of the flower base. The light-collecting unit may also include a light emitting element, such as an LED or fiber optic cable end. The light emitting element may provide infrared light to the light-collecting unit. The light emitting element may provide the light using pulse-wave modulation.

BRIEF DESCRIPTION OF THE SEVERAL VIEWS OF THE DRAWINGS

Aspects of the described embodiments are more evident in the following description, when read in conjunction with the attached Figures.

FIG. 56A shows a cutaway view of the connection rack.

FIG. 56B shows the extracted circuits of the connection rack.

FIG. 80A shows a detail of the -A- male connector ends and -B- female connector ends.

FIG. 80C shows a cross section of the corner exposing the O-ring groove and the O-ring.

FIG. 93D shows a magnetic securing post with a view of the rectangular thru hole.

FIG. 95B shows the magnetic securing post slid into position on the magnetic insertion tool.

FIG. 102 shows the cathode contact side of a capacitor cell.

FIG. 104C shows an exploded view of a capacitor cell.

FIG. 105B shows the reverse side of the insulated cover joined with a honeycomb anode.

FIG. 105C is a section view of an LED and the cathode LED channel.

FIG. 105D is a section view of tapered cover bosses on an insulated cover.

FIG. 105E is a cropped detail of one covered boss and the cathode LED channel.

FIG. 105F shows the honeycomb anode separated from the insulated cover.

FIG. 105G is shows the LED in the exploded view of FIG. 105F.

FIG. 106 shows the indicator LED.

FIG. 107A shows a capacitor cell casing and a honeycomb cathode.

FIG. 107B shows the capacitor cell casing and the honeycomb cathode separated.

FIG. 107C shows a cropped detail of a cathode conductive post.

FIG. 107D shows a partially assembled capacitor cell.

FIG. 107E shows a cropped detail of the capacitor cell.

Figure 107A:
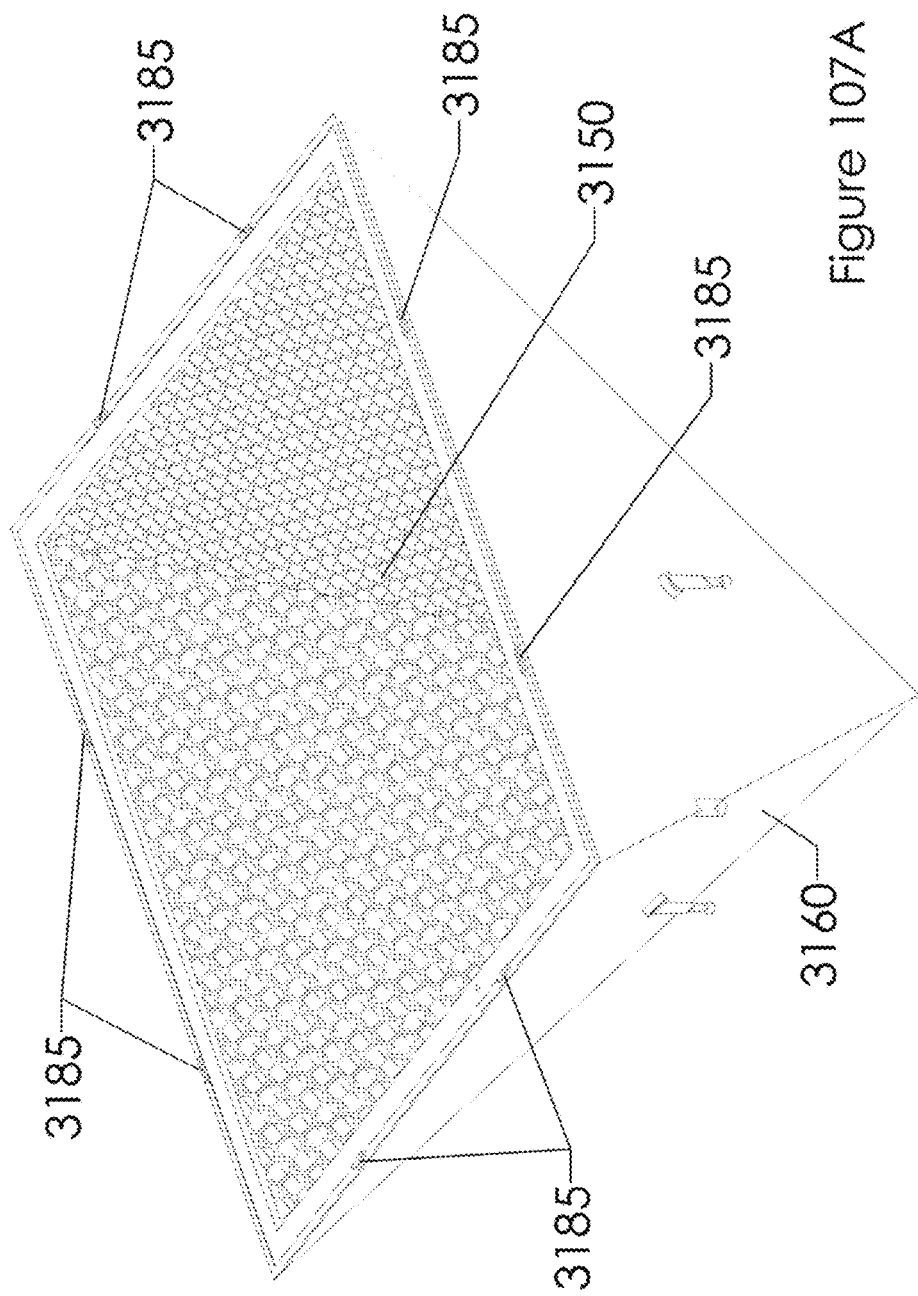
Figure 107C:
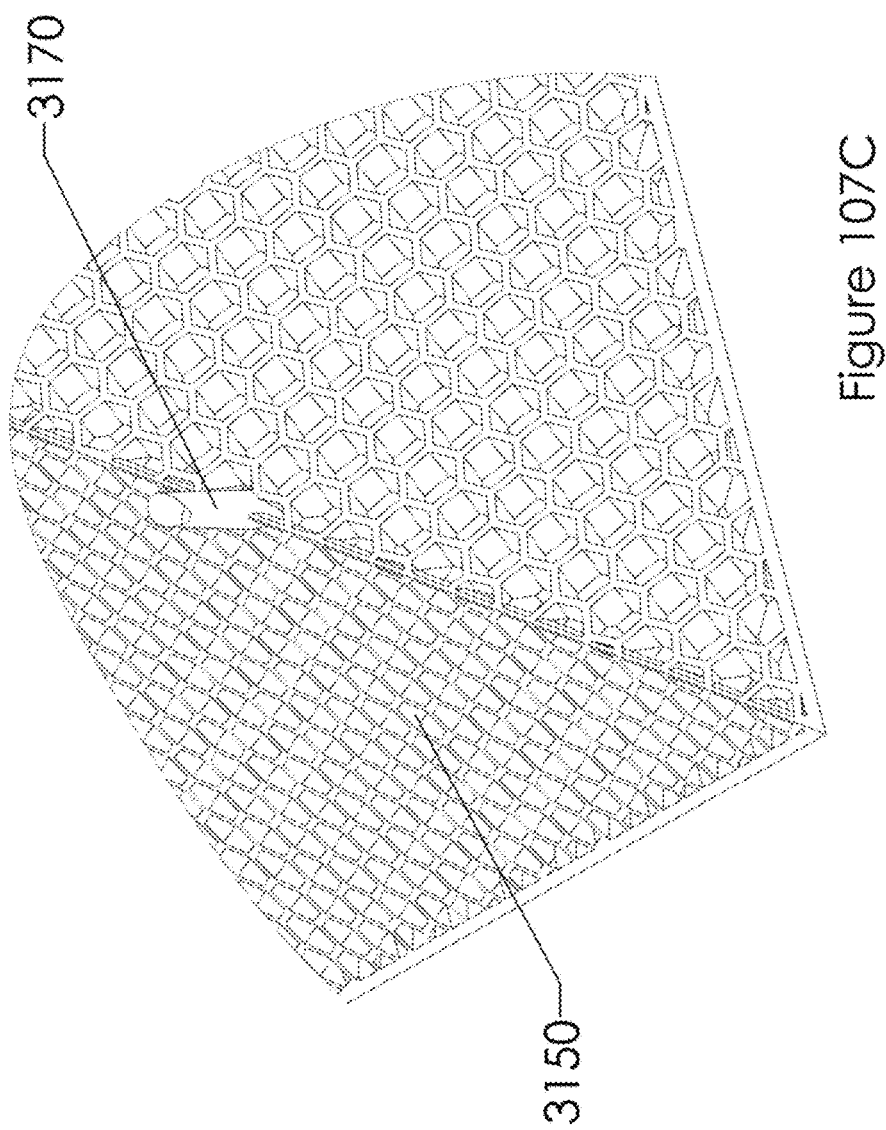
Figure 107D:
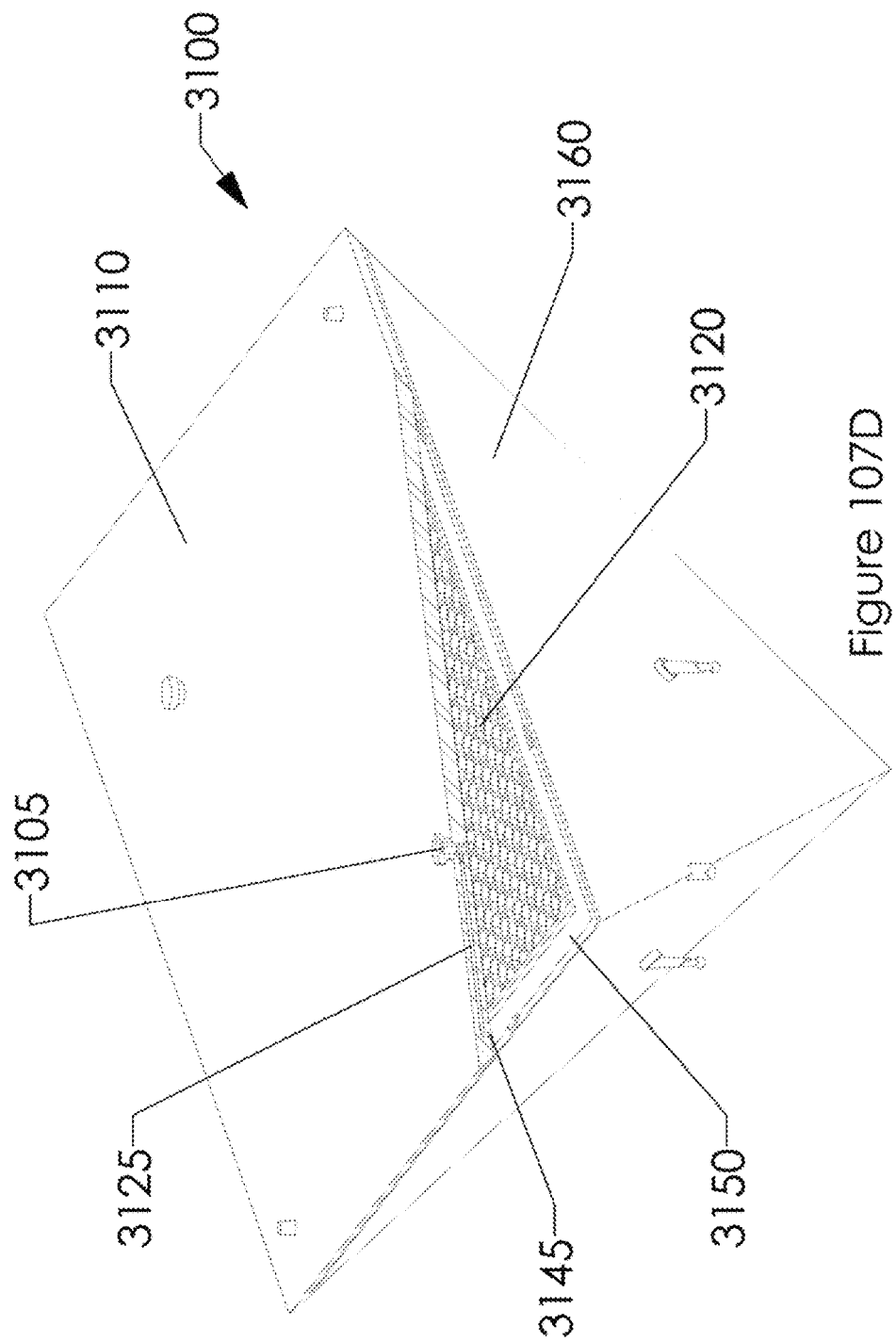
Figure 107E:
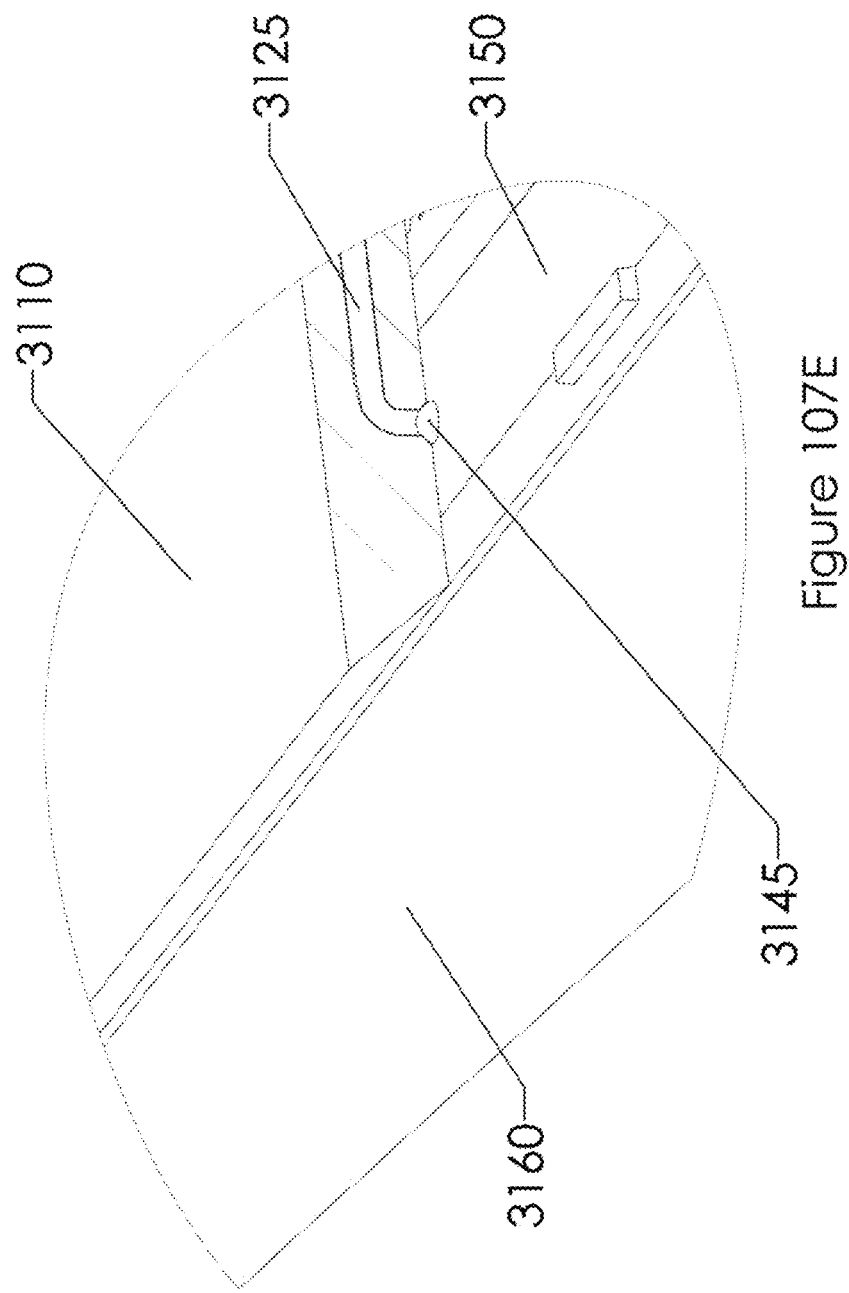
Figure 107F:
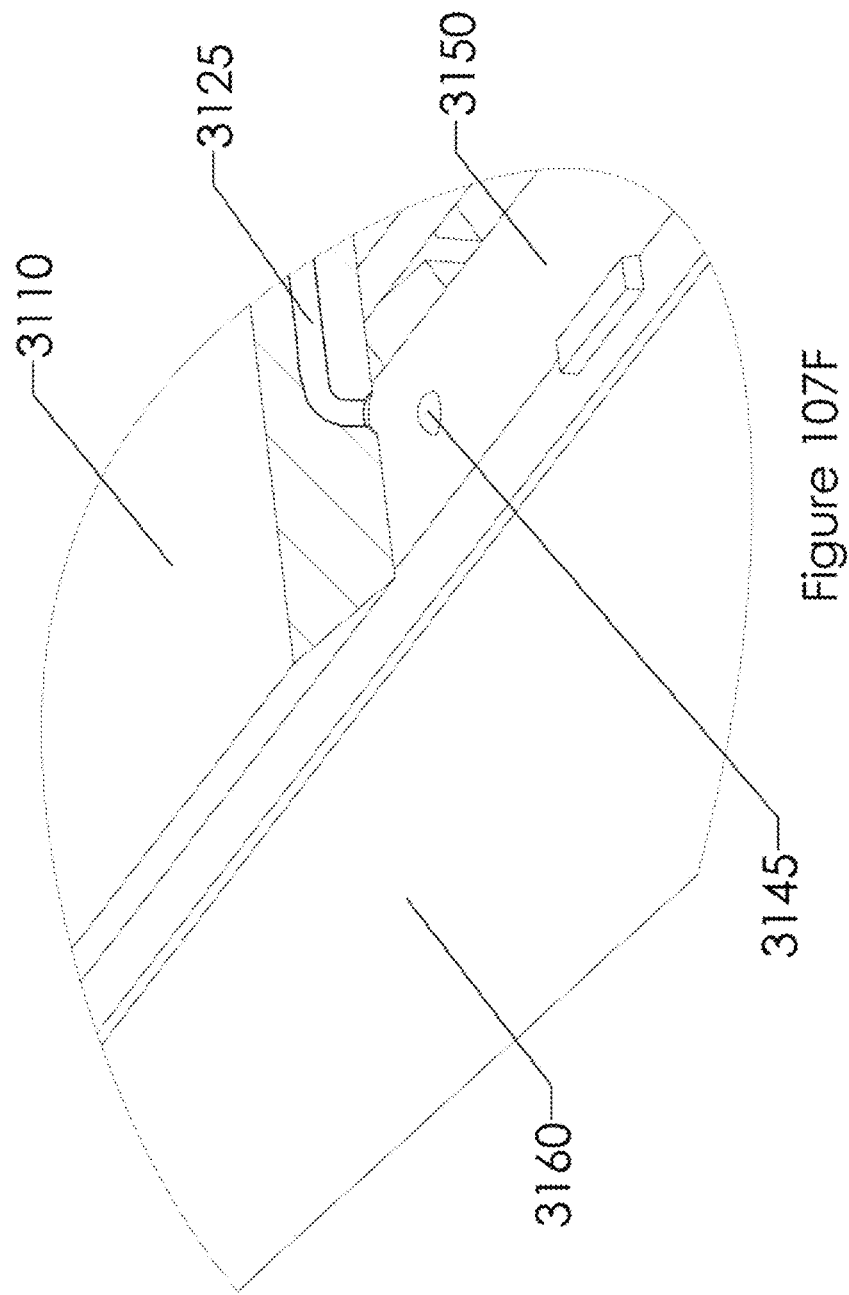

FIG. 107F shows another view of the capacitor cell.

Figure 108A:
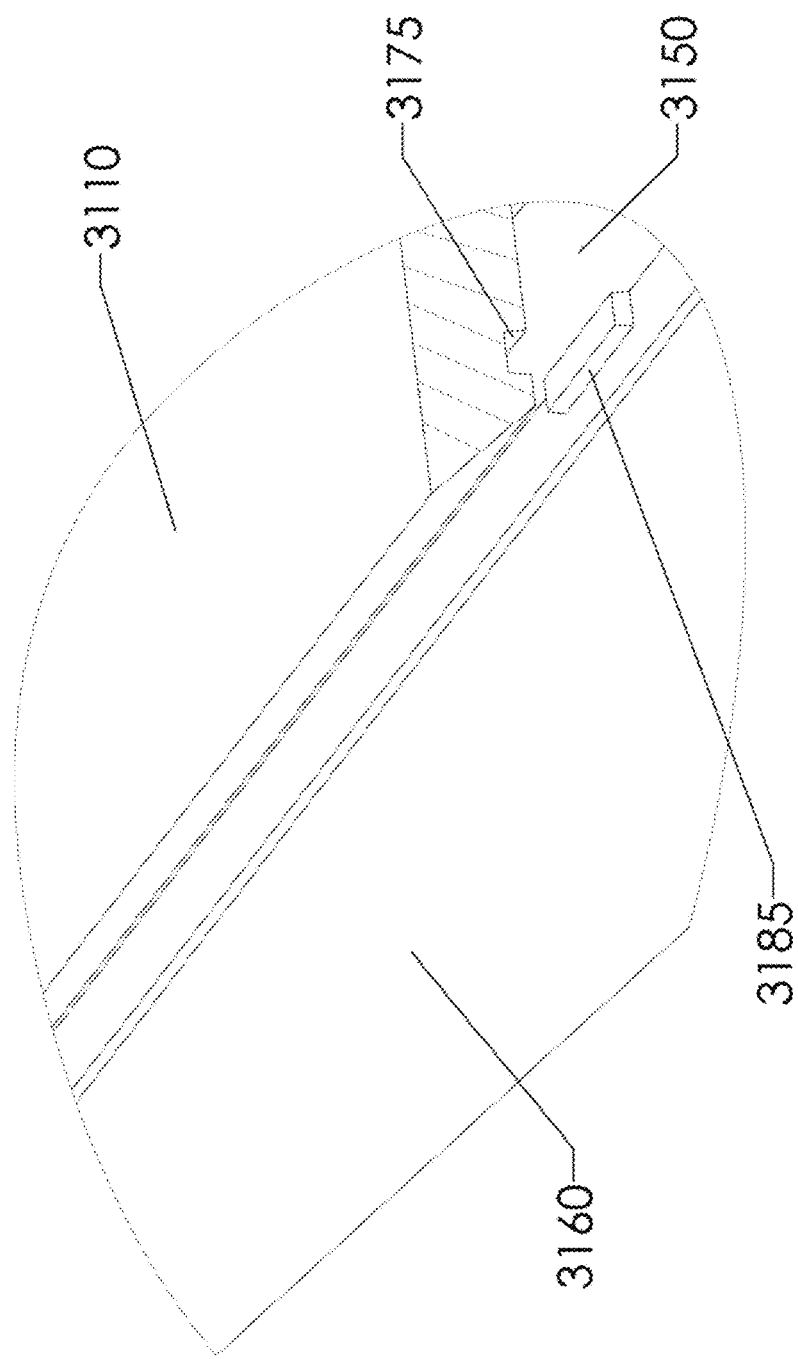

FIG. 108A shows a cropped detail of the top of the capacitor cell.

FIG. 108B shows another view of the top of the capacitor cell.

Figure 109:
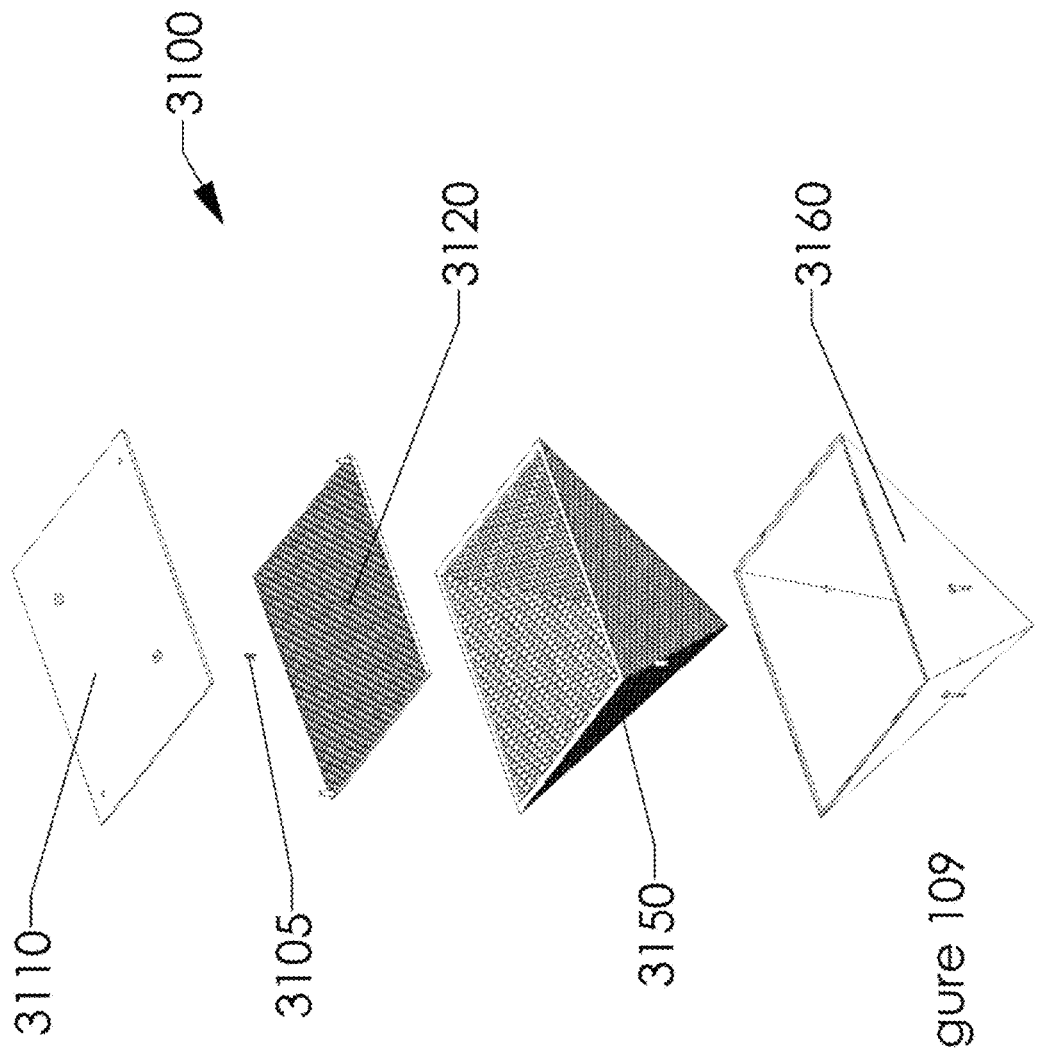

FIG. 109 shows an exploded view of the capacitor cell.

Figure 110:
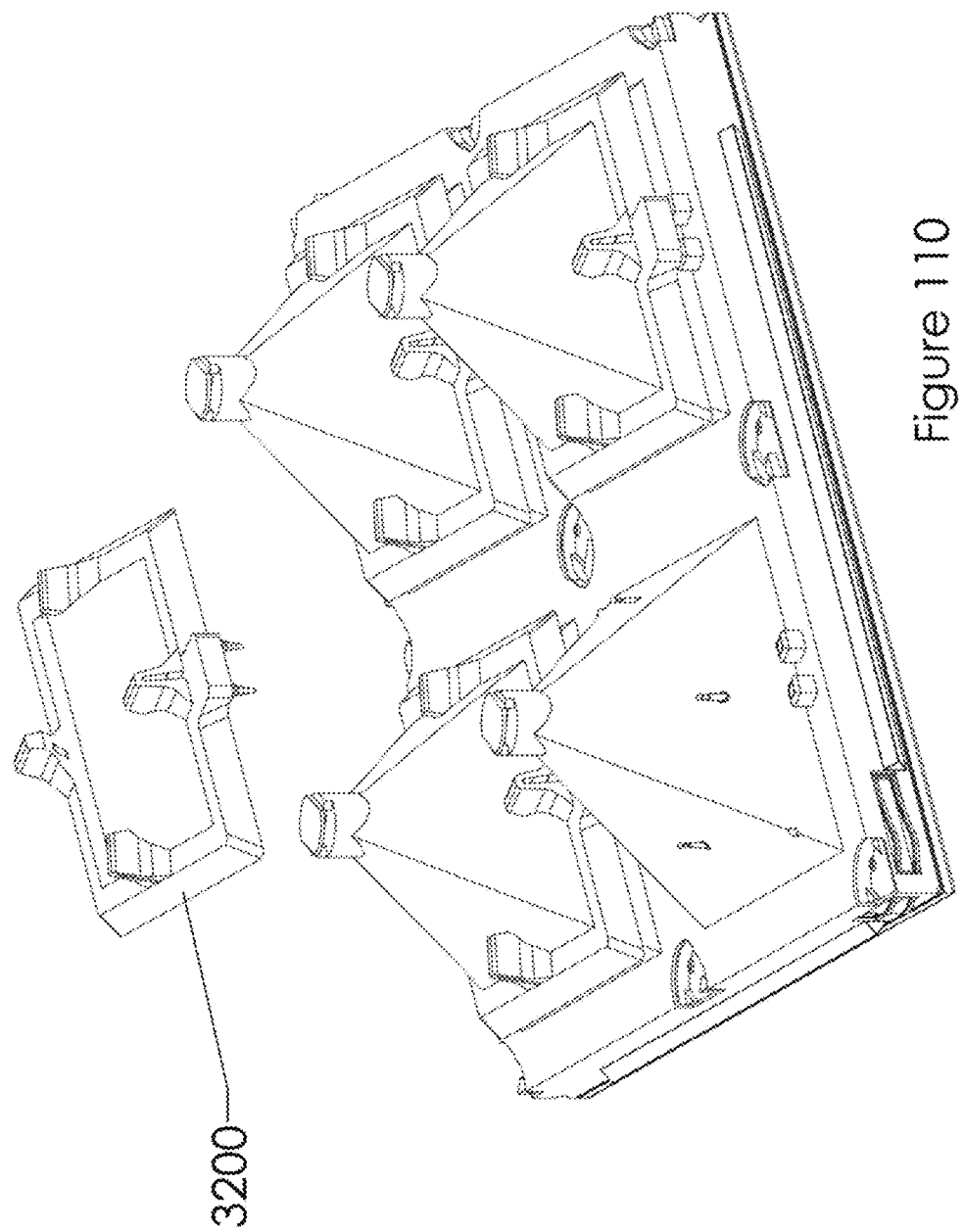

FIG. 110 shows a capacitor rack removed from a complete (male) capacitor wall section.

Figure 111:
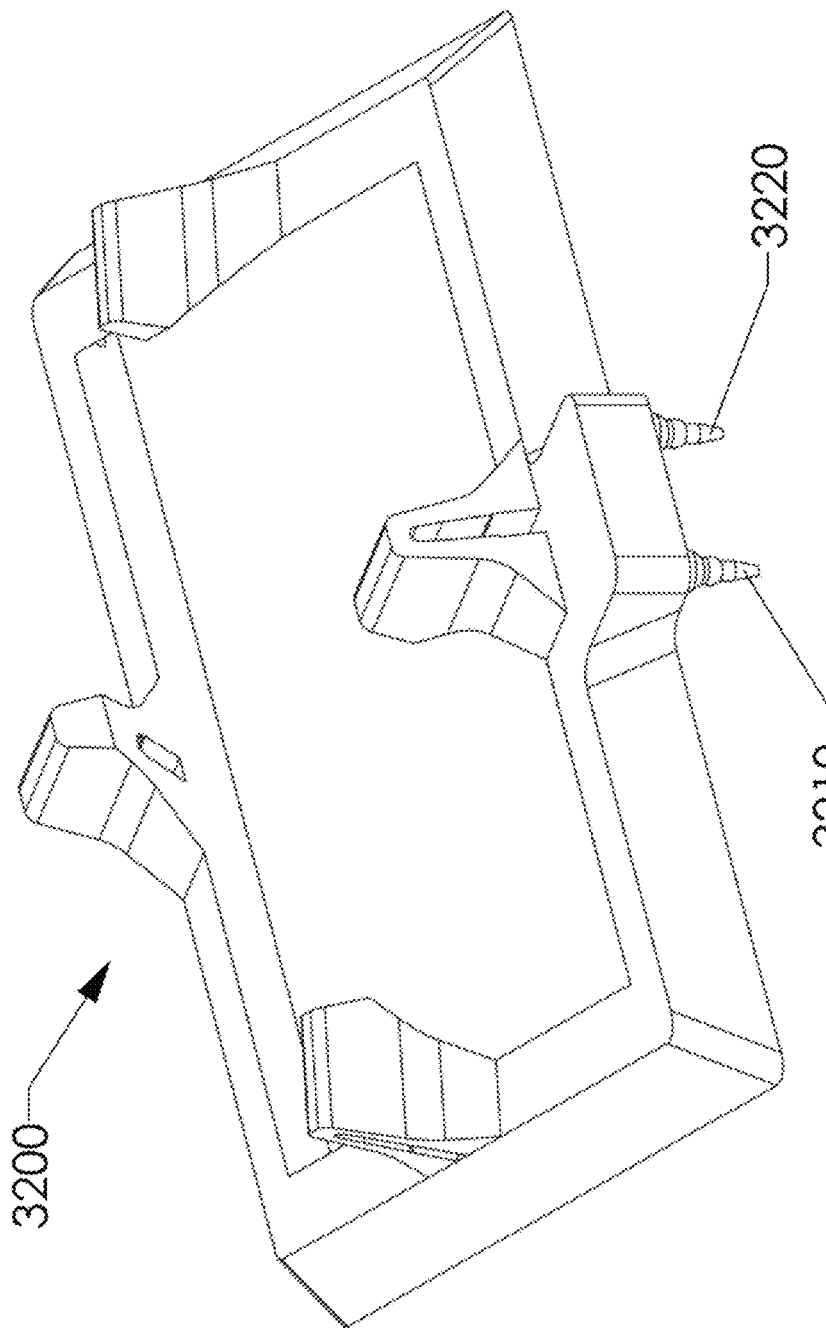

FIG. 111 shows a capacitor rack.

Figure 112:
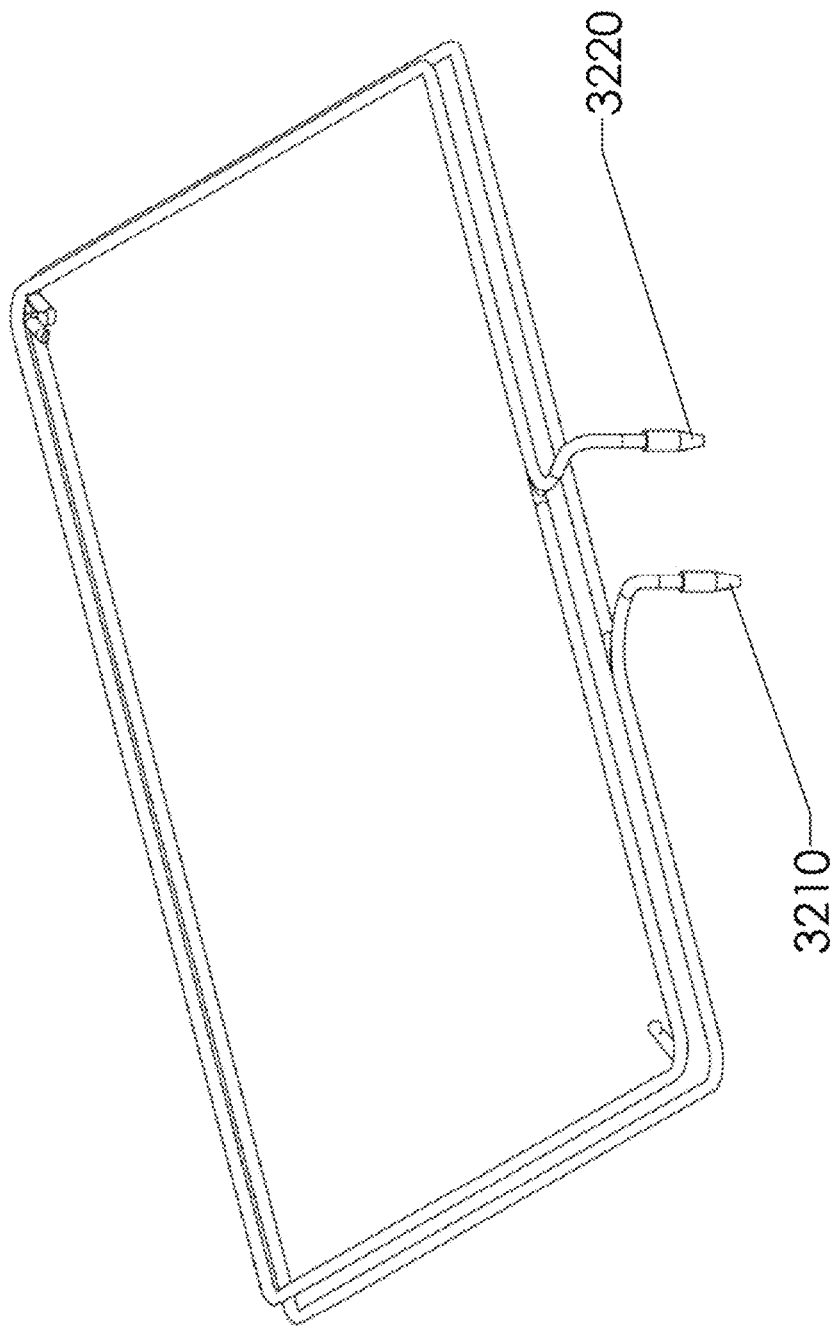

FIG. 112 shows the capacitor rack circuit.

Figure 113:
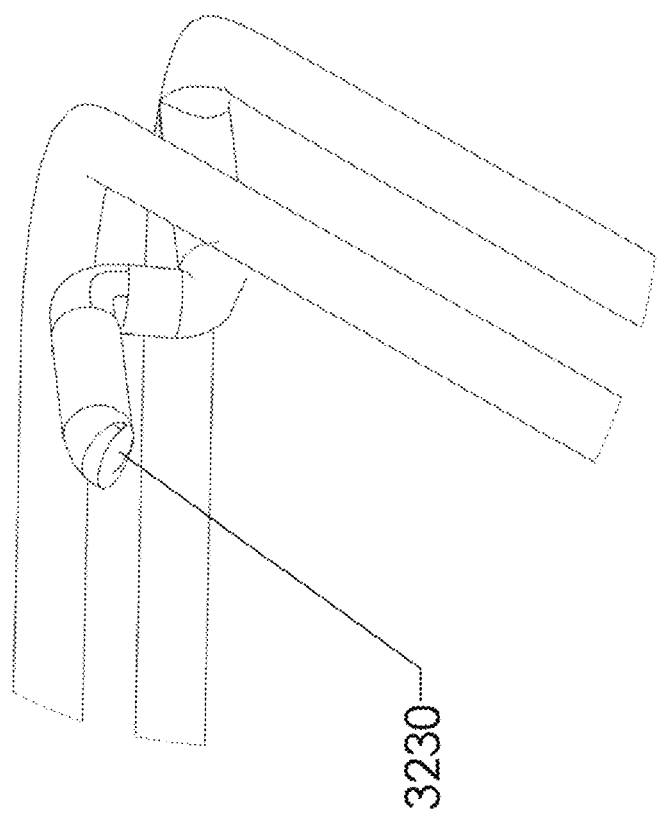

FIG. 113 shows a circuit contact to the cathode.

Figure 114:
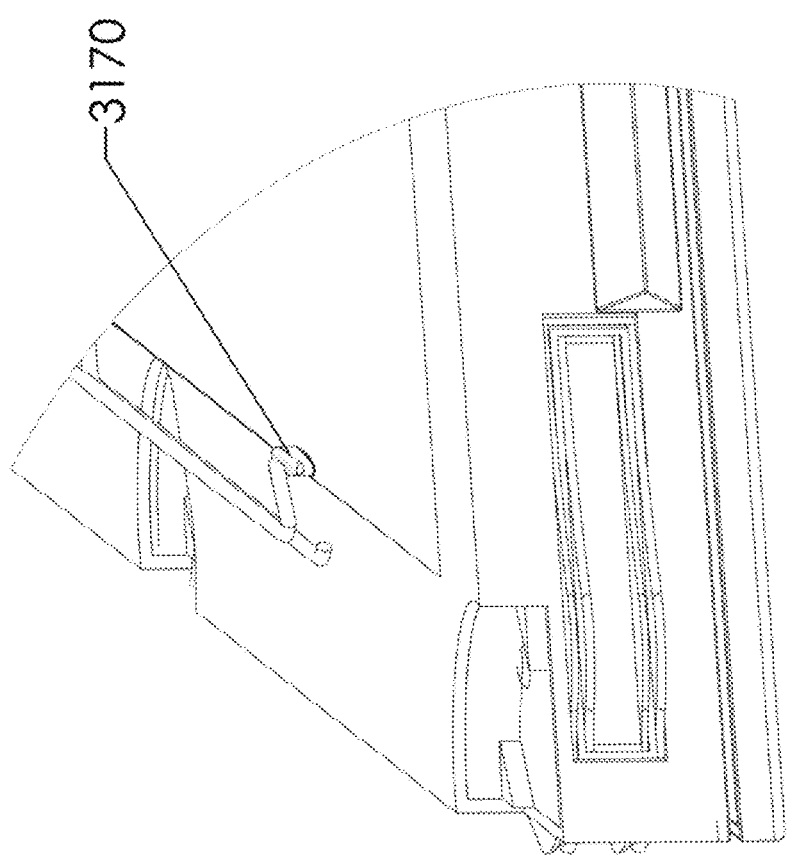

FIG. 114 shows a hatch on the tip of a cathode connection post.

Figure 115:
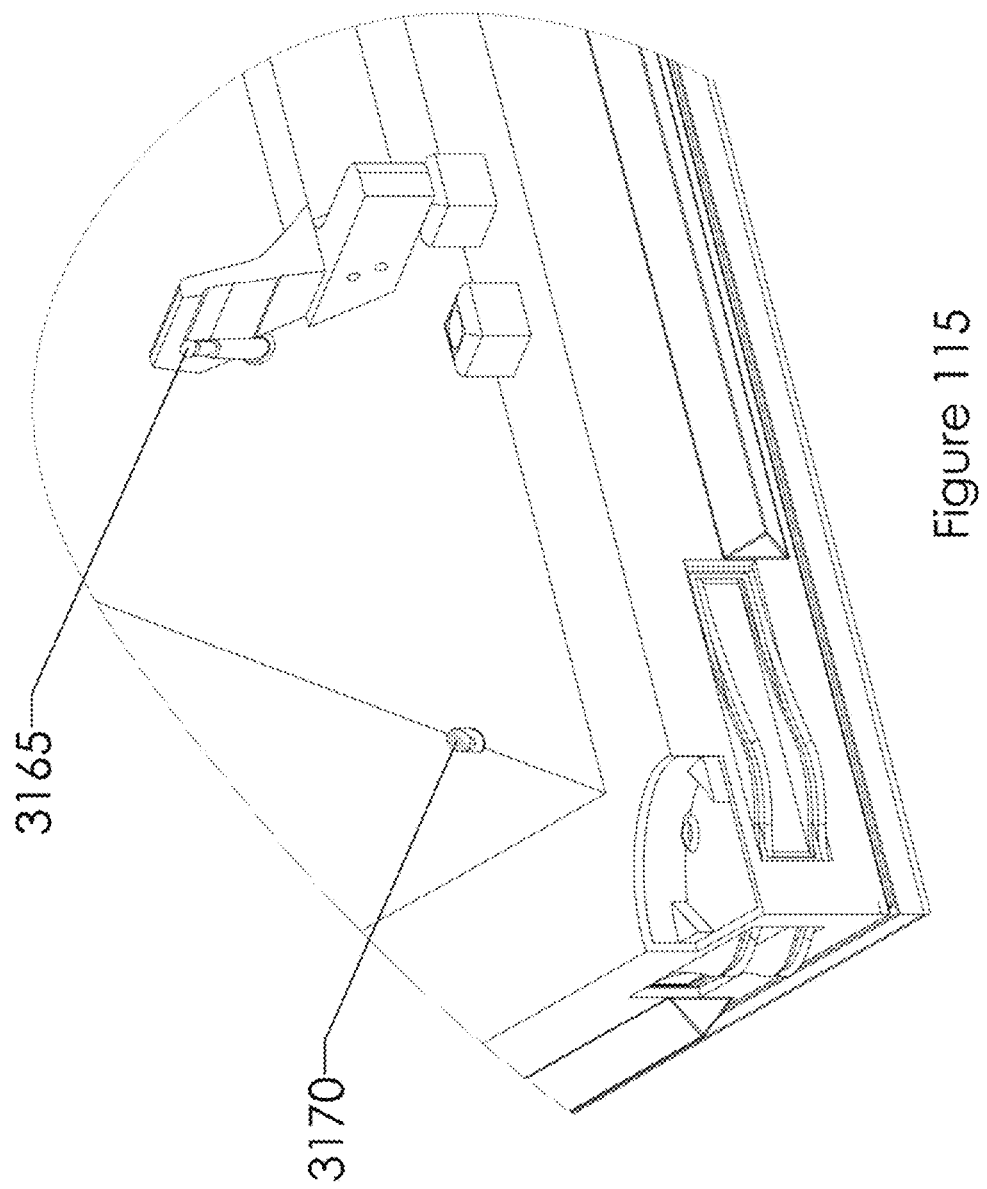

FIG. 115 shows a detail of cathode connection post and the capacitor rack.

Figure 116:
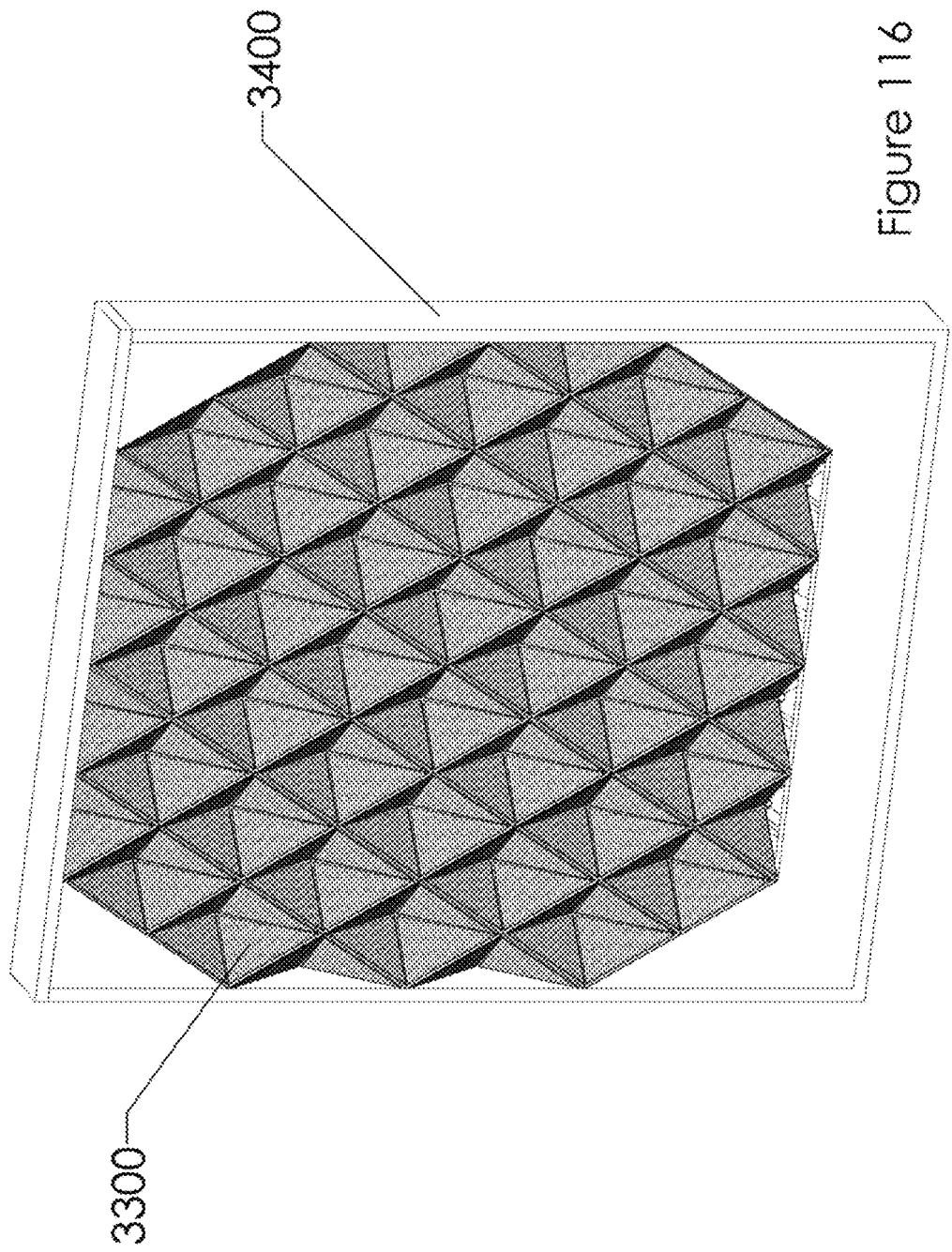

FIG. 116 shows an example of a solar panel wall in a pyramid wall frame.

Figure 117:
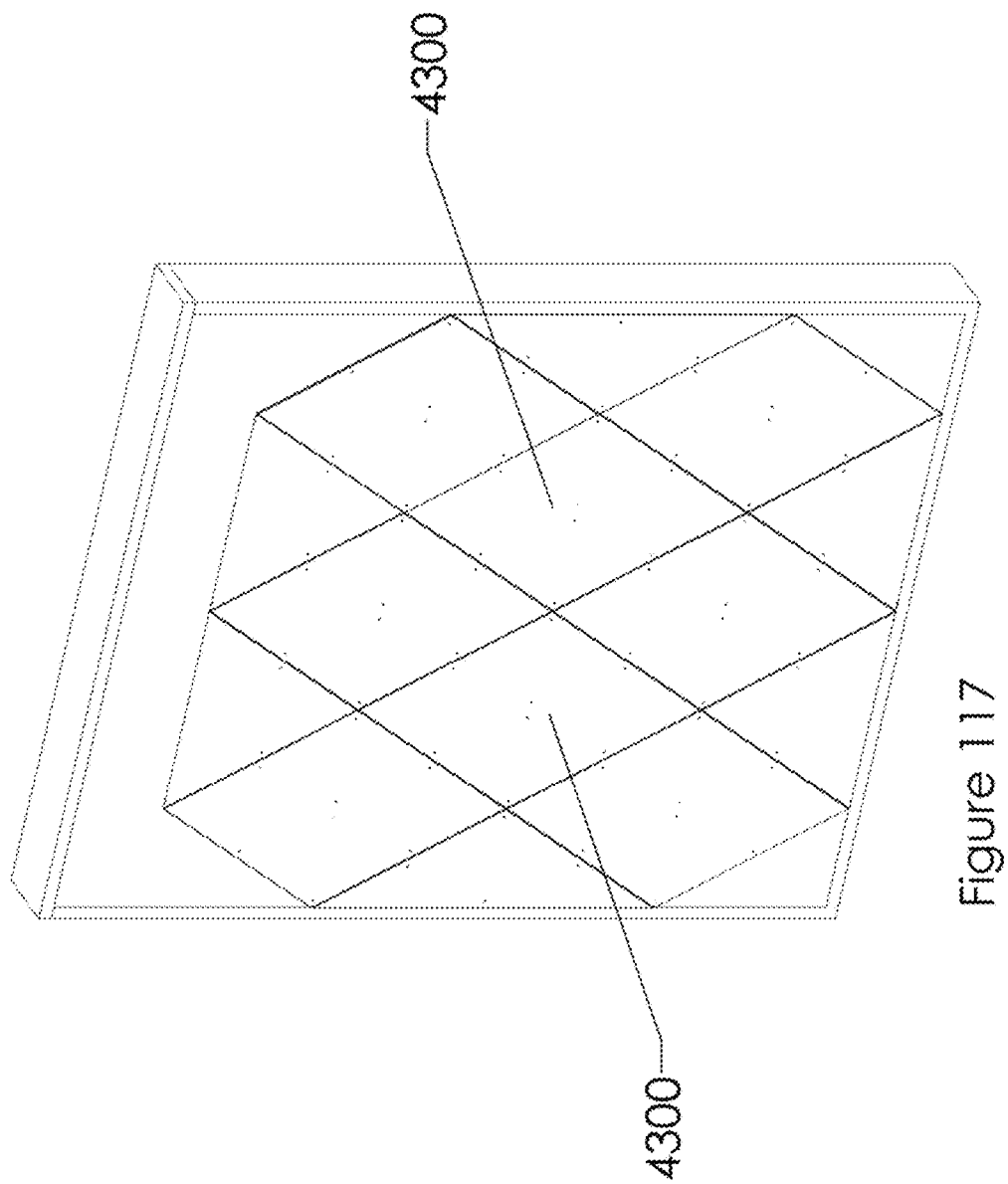

FIG. 117 shows the backside of a pyramid wall frame.

Figure 118:
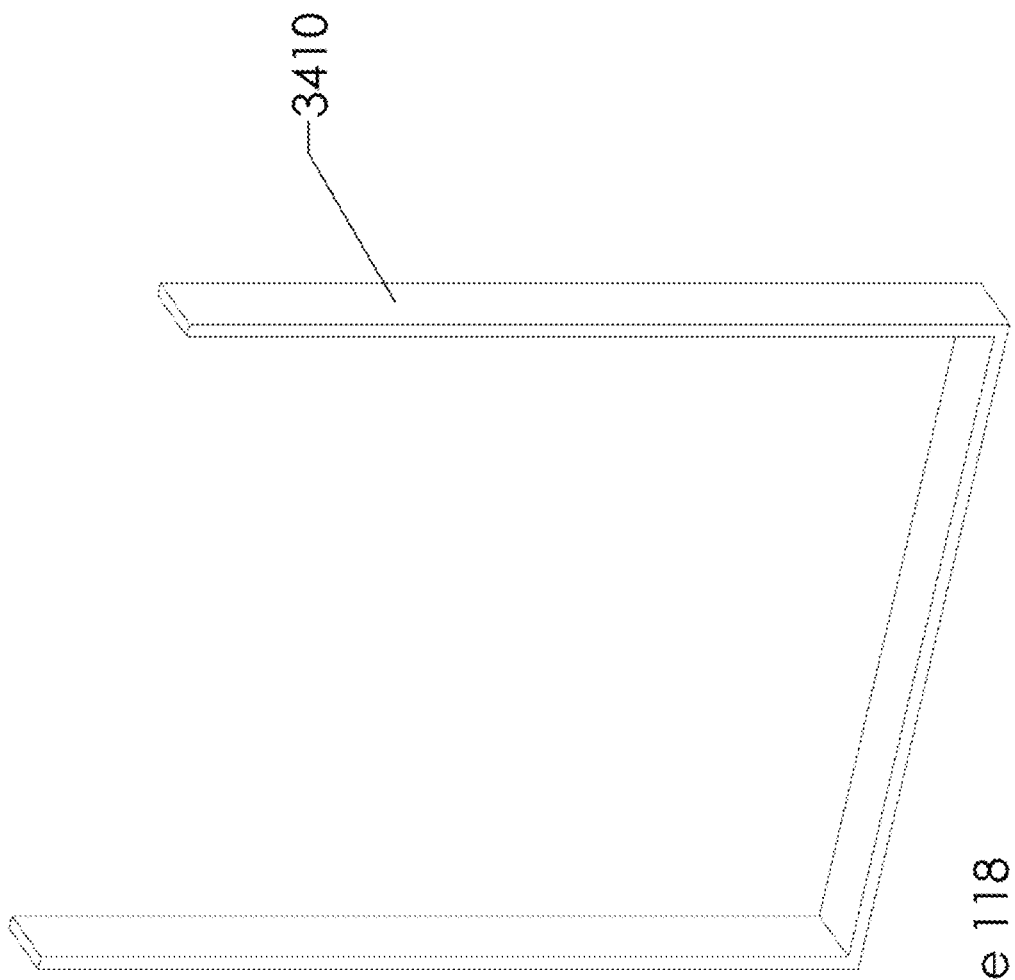

FIG. 118 shows the U-shaped base of the pyramid wall frame.

Figure 119:
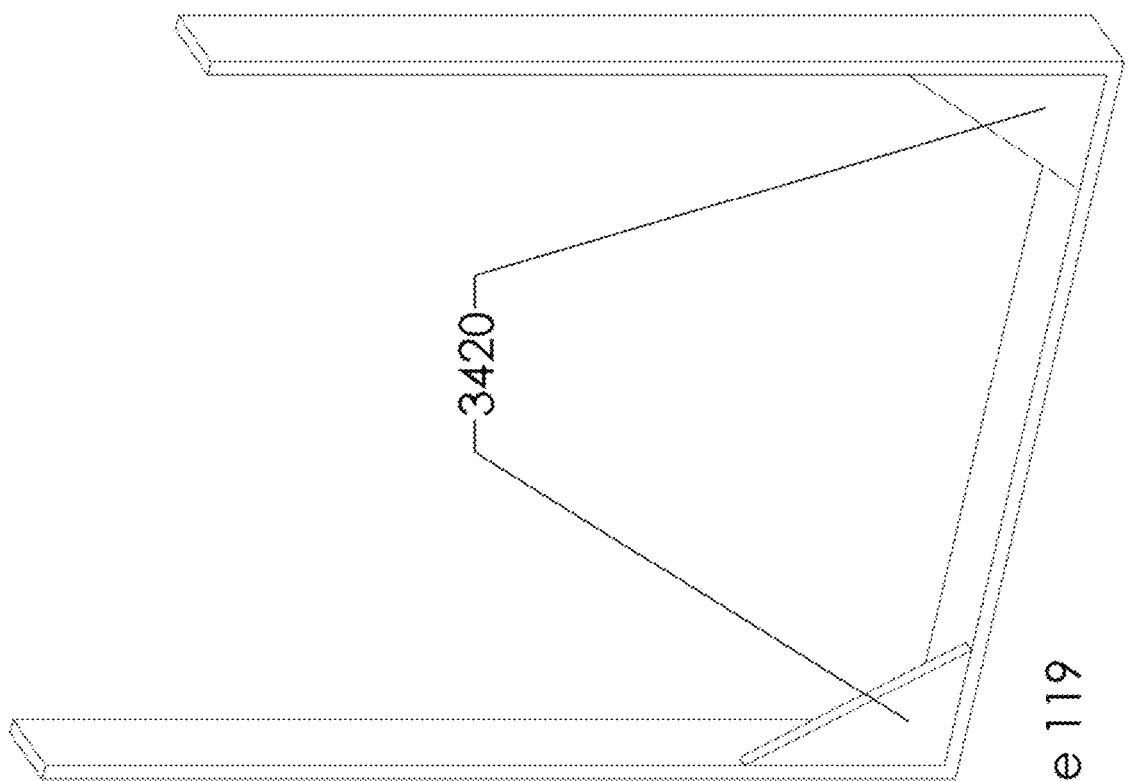

FIG. 119 shows pyramid frame corners added to the frame.

Figure 120:
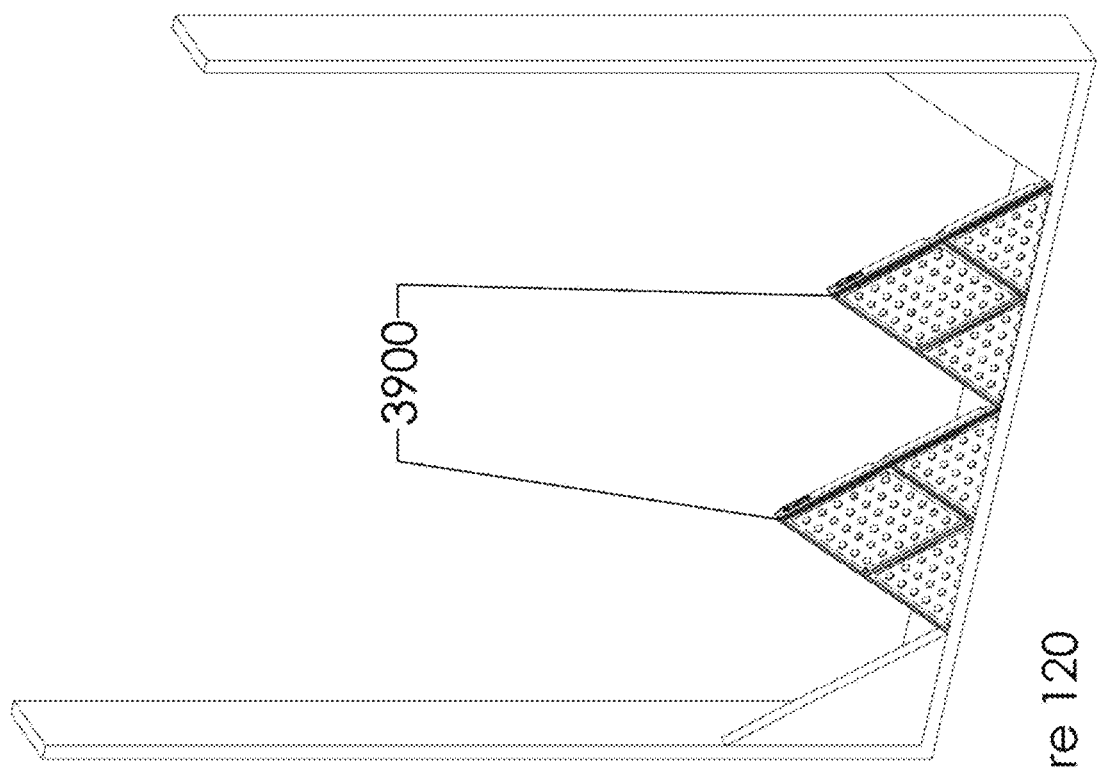

FIG. 120 shows top half female sections inserted at the bottom of the frame.

Figure 121:
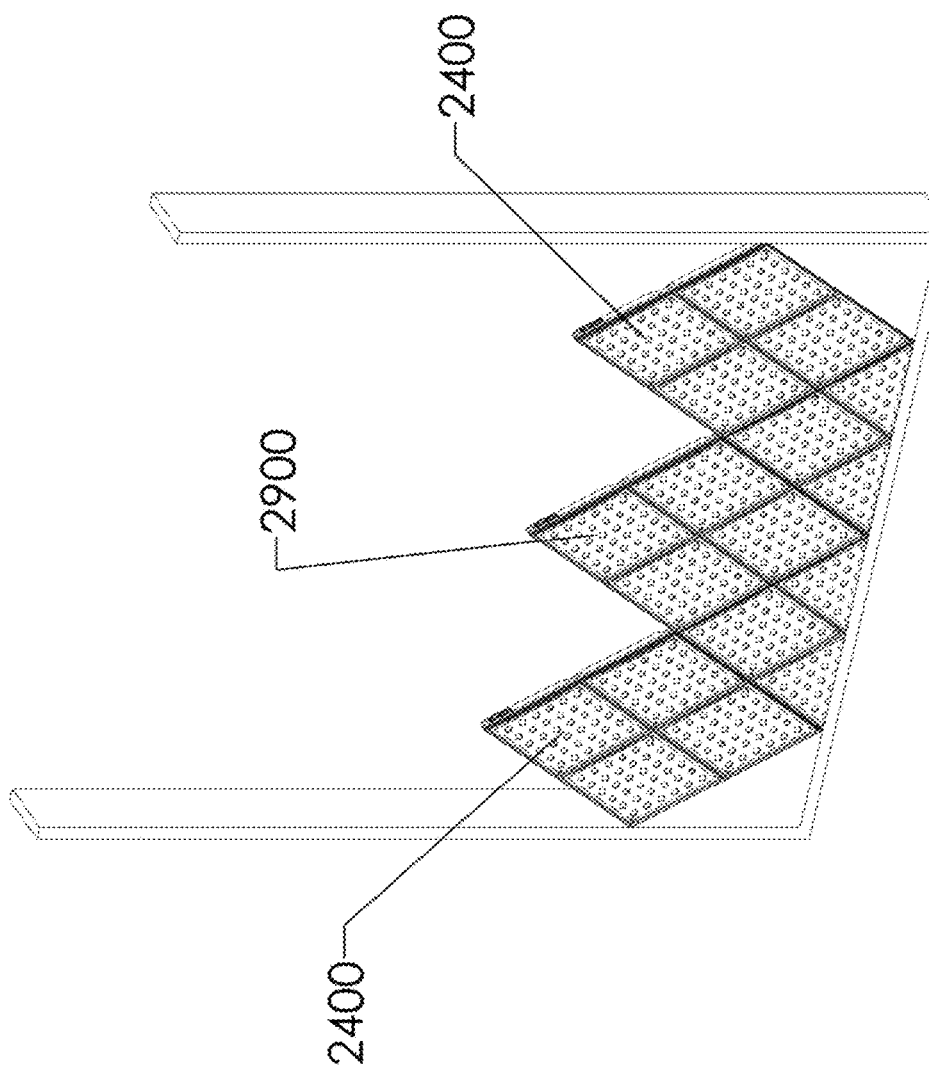

FIG. 121 shows the frame with one male side -A- wall section and two female side -B- wall sections.

Figure 122:
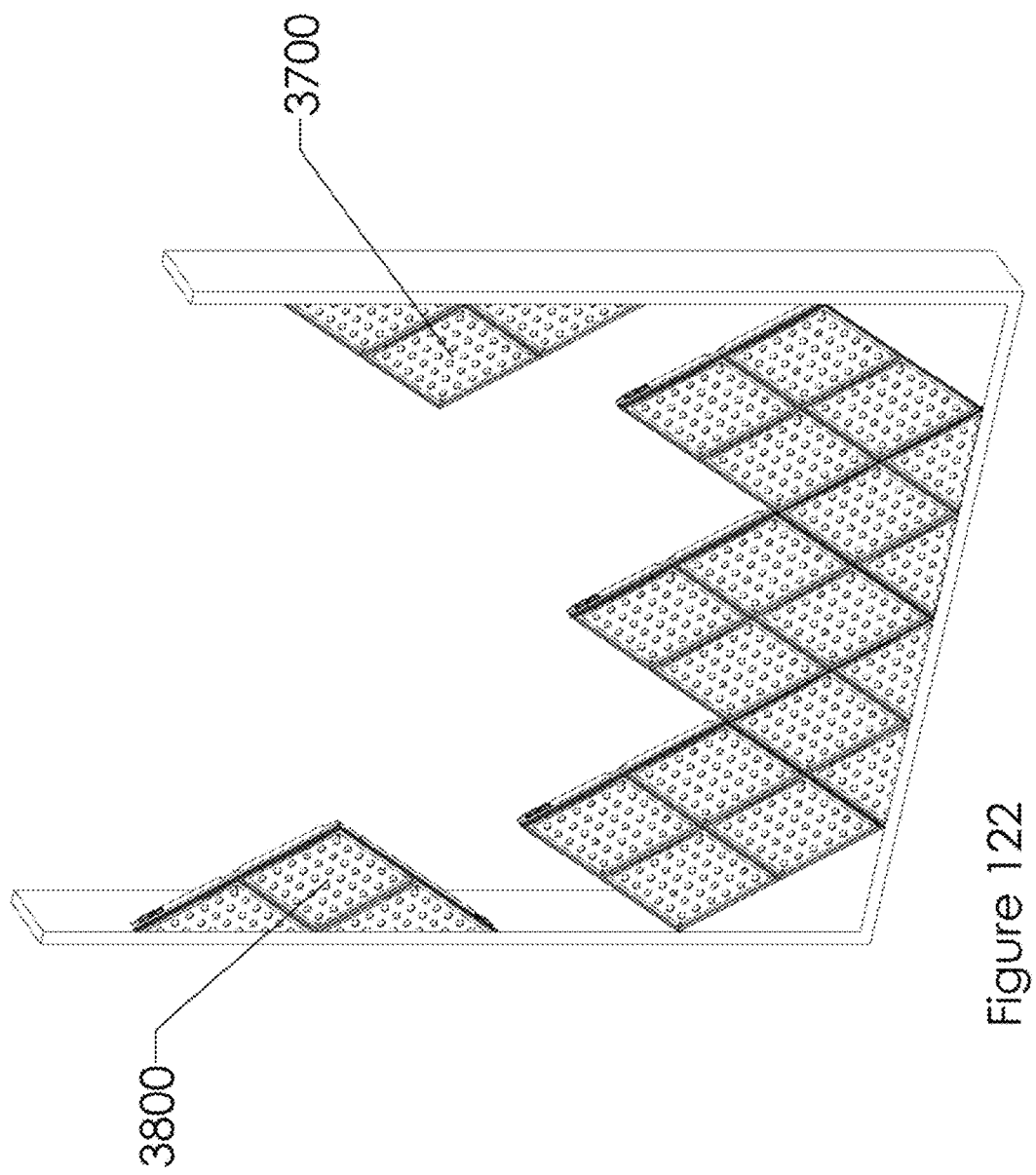

FIG. 122 shows the frame with two half female sections.

Figure 123:
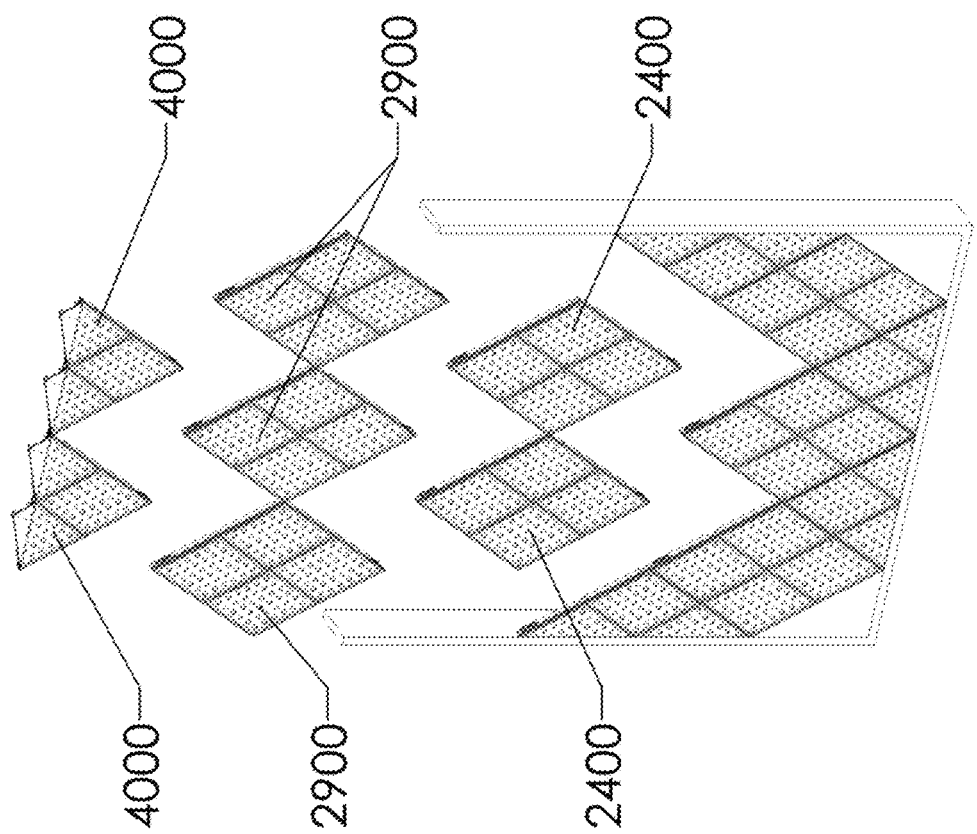

FIG. 123 shows the frame with the remainder of sections.

Figure 124:
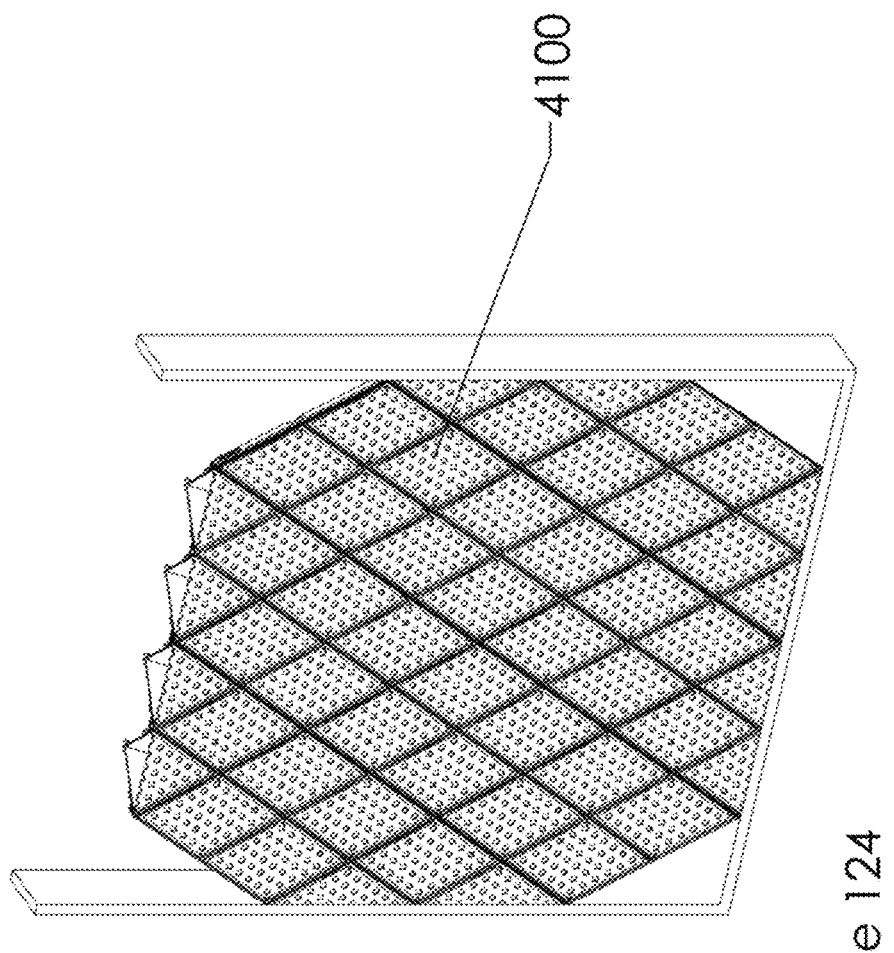

FIG. 124 shows the frame with the capacitor wall.

Figure 125:
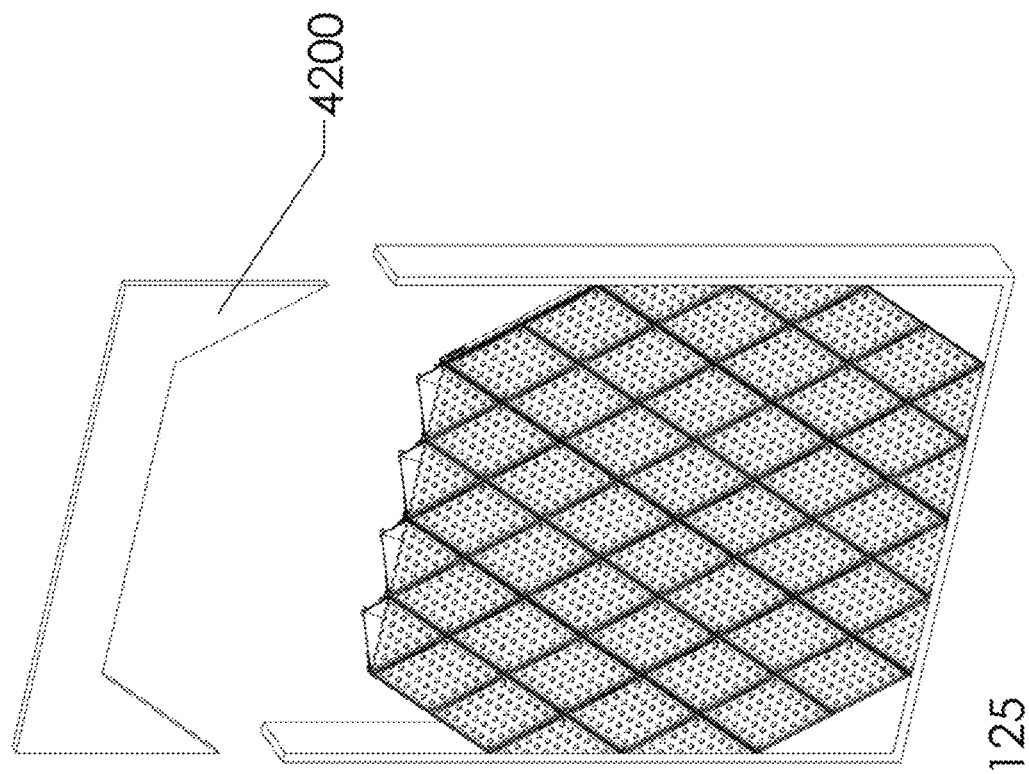

FIG. 125 shows the frame with the frame cover.

Figure 126A:
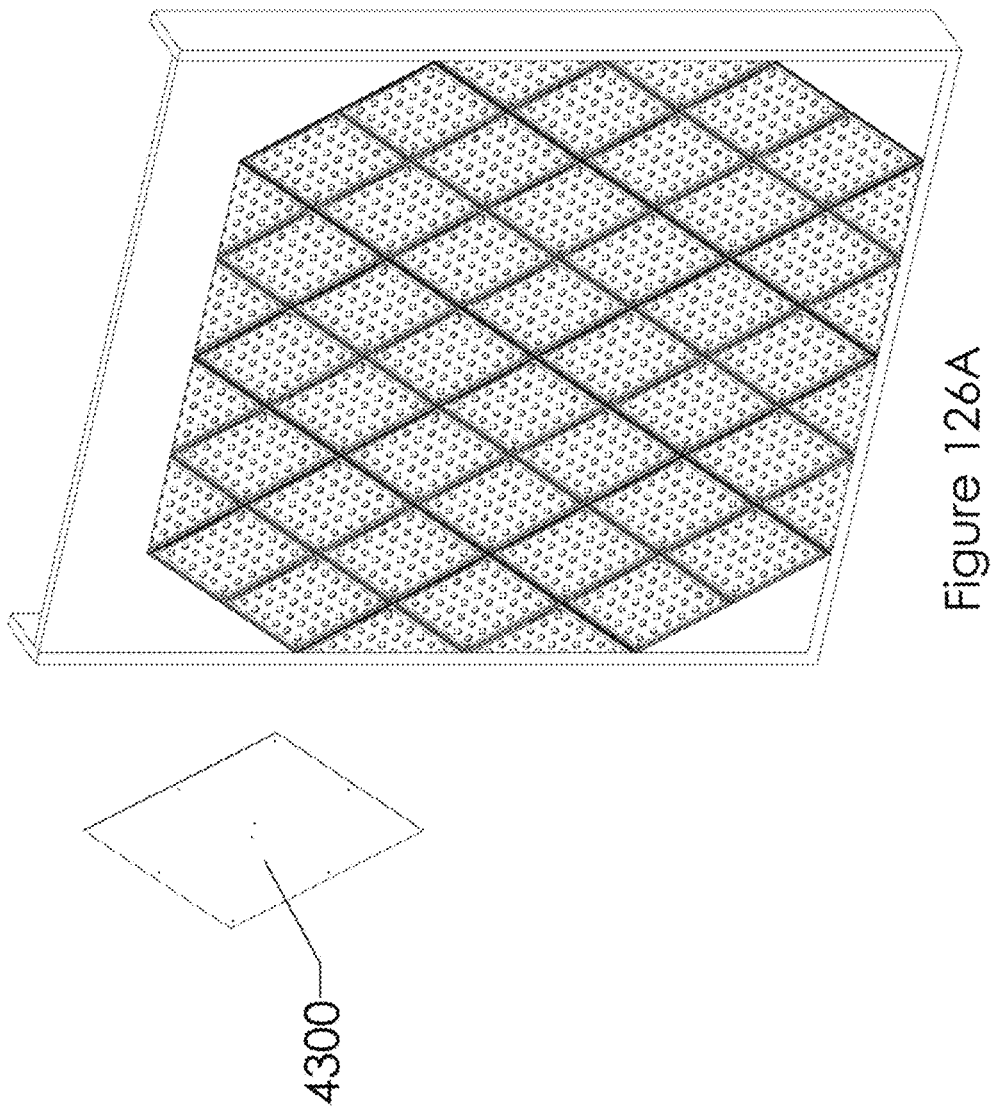

FIG. 126A shows the capacitor shield.

Figure 126B:
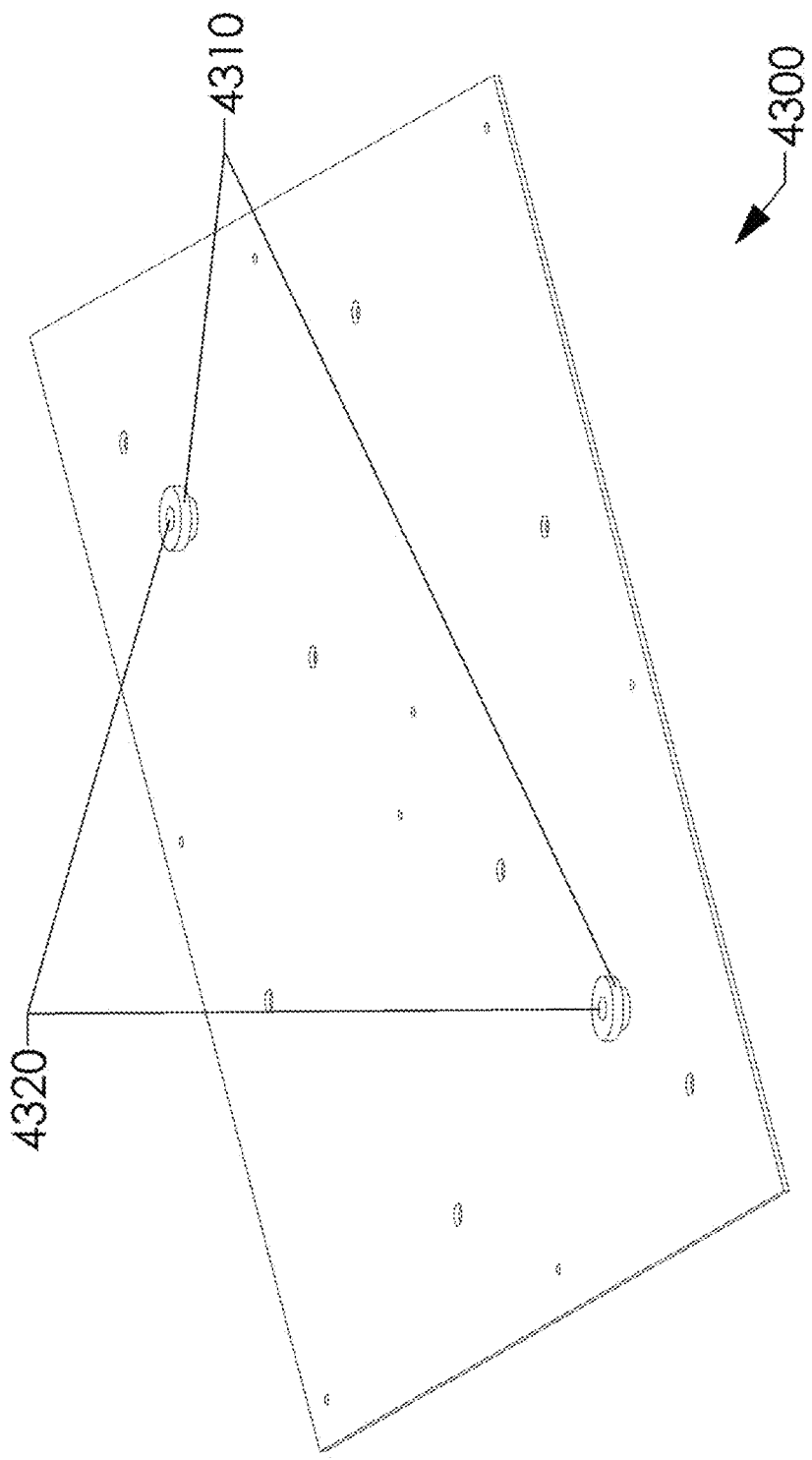

FIG. 126B shows the capacitor shield with maintenance handles.

Figure 127:
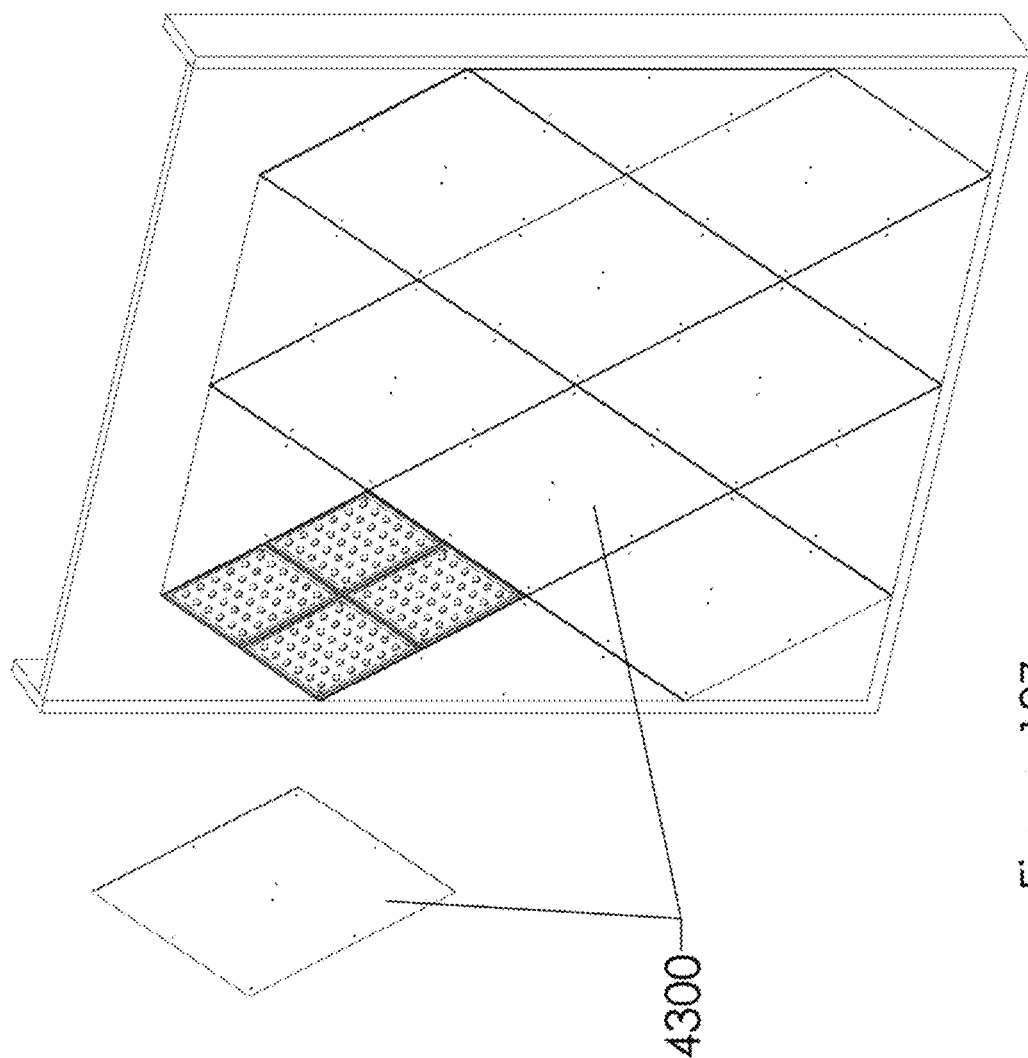

FIG. 127 shows the frame with multiple capacitor shields.

Figure 128:
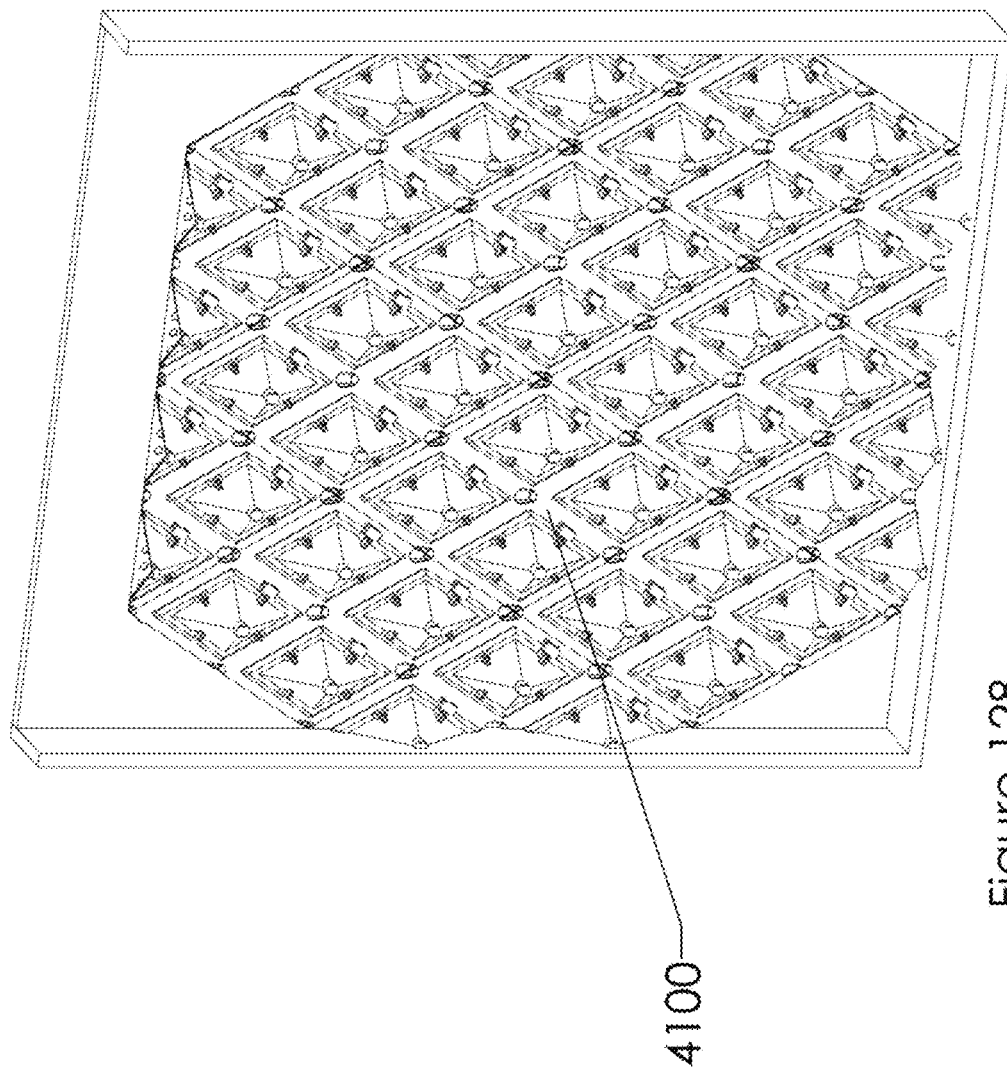

FIG. 128 shows another view of the pyramid wall frame.

Figure 129:
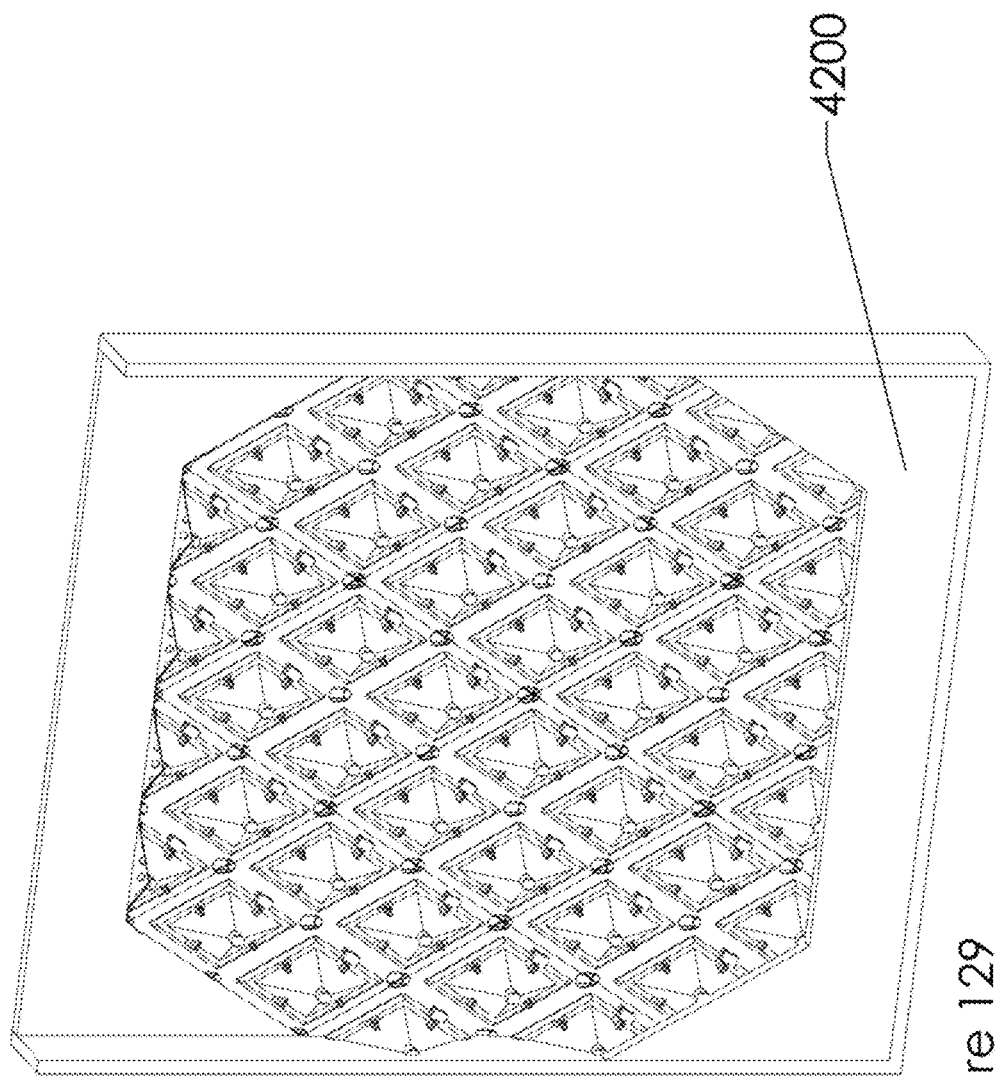

FIG. 129 shows the bottom of the pyramid wall frame with a frame cover.

Figure 130:
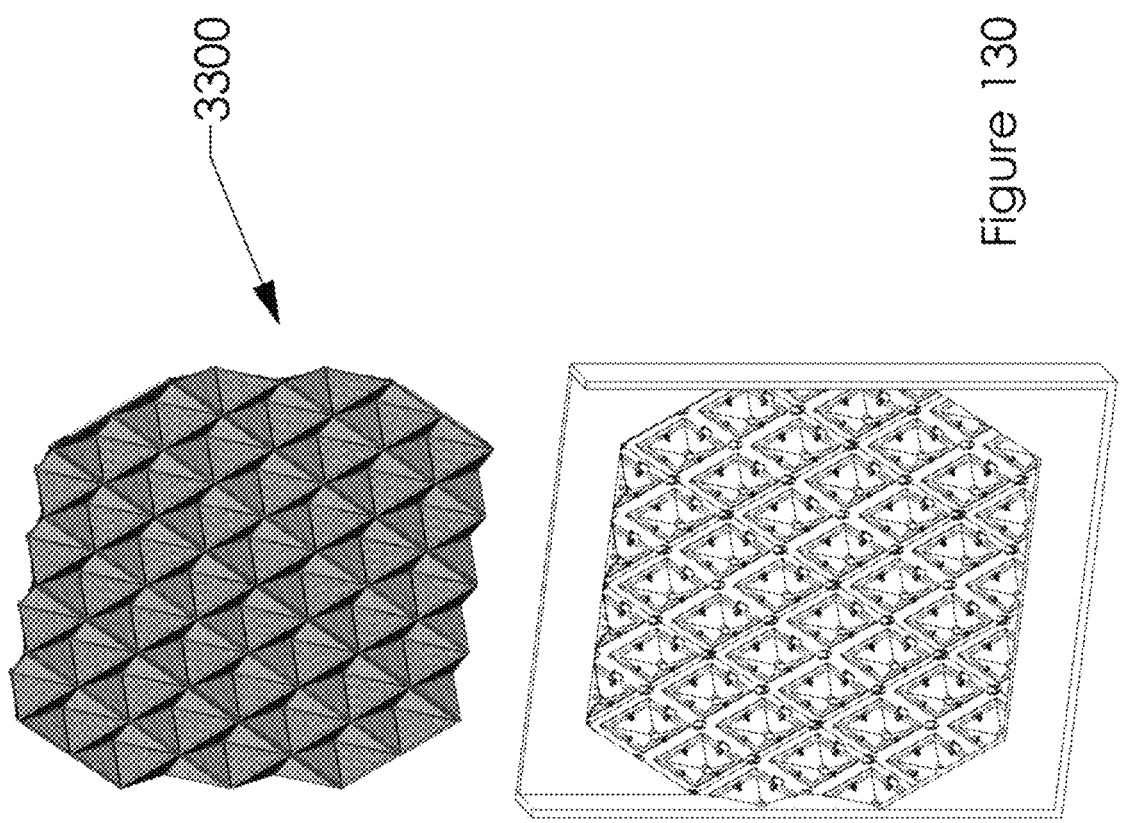

FIG. 130 shows the assembly with the solar panel wall.

Figure 131:
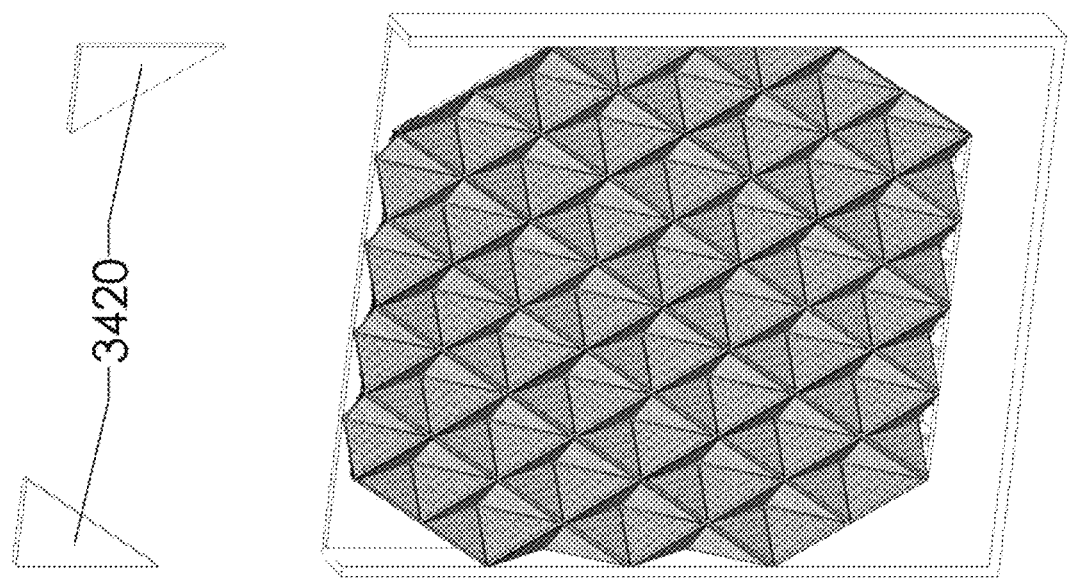

FIG. 131 shows the frame with pyramid frame corners.

Figure 132:
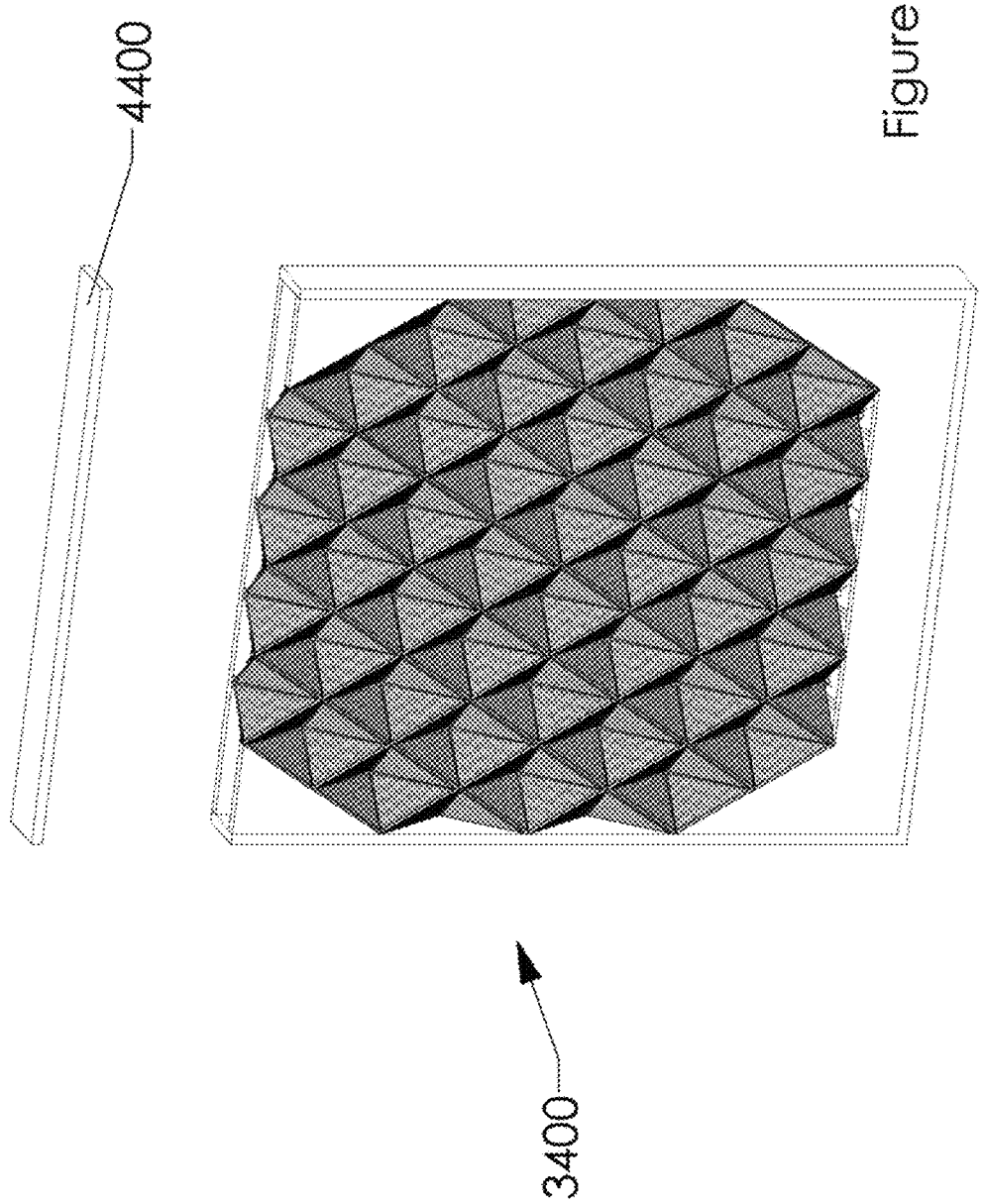

FIG. 132 shows the pyramid wall frame with a top cover.

Figure 133:
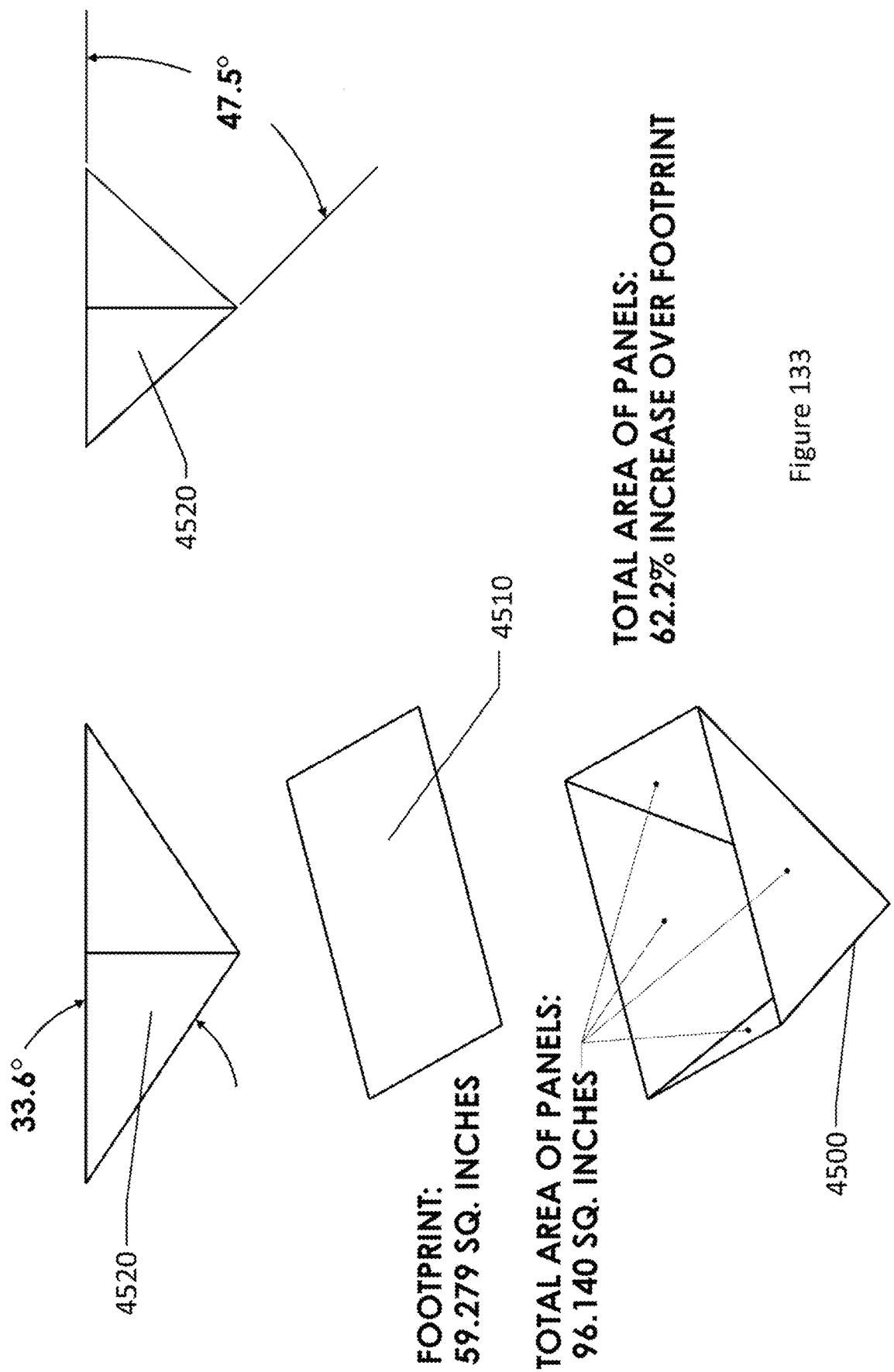

FIG. 133 shows a moderately angled pyramid with a rhombus or diamond shaped base.

FIG. 134 shows a shallow angled pyramid with a diamond shaped base.

Figure 135:
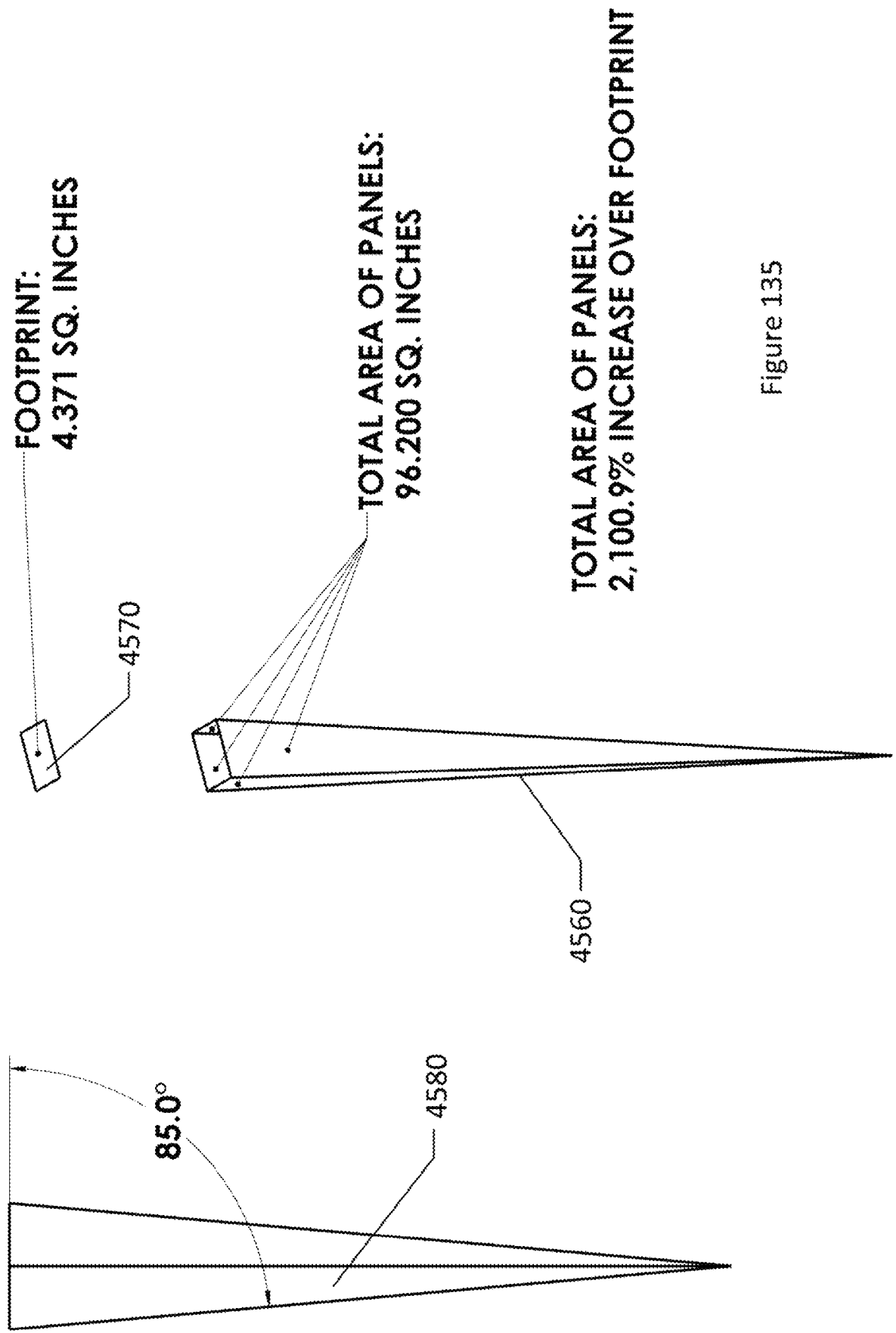

FIG. 135 shows a steep pyramid with a diamond shaped base.

Figure 136:
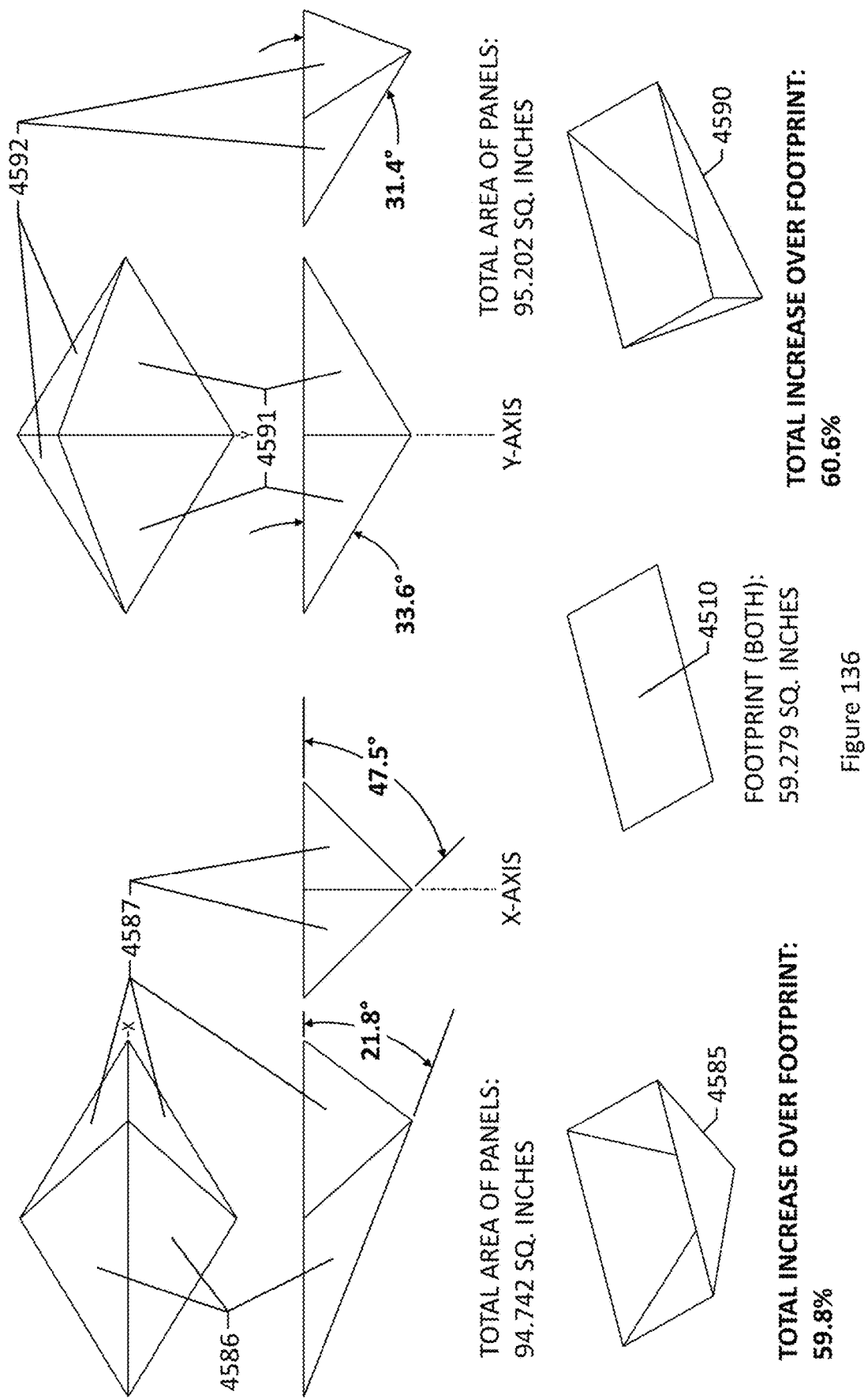

FIG. 136 shows the geometry of inverted pyramids of uneven length sides.

Figure 137:
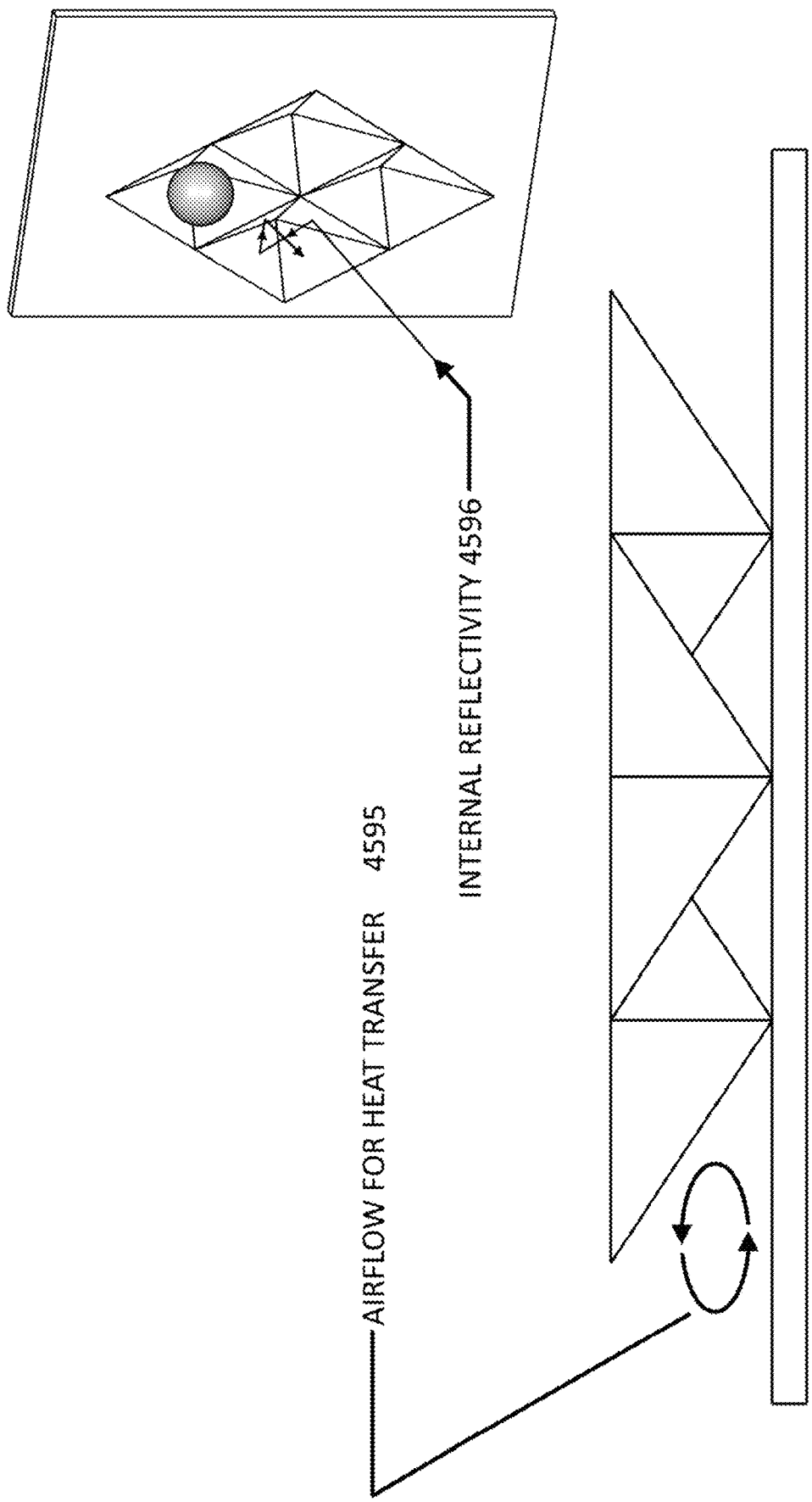

FIG. 137 shows airflow on the underside of panels and their internal reflectivity.

Figure 138:
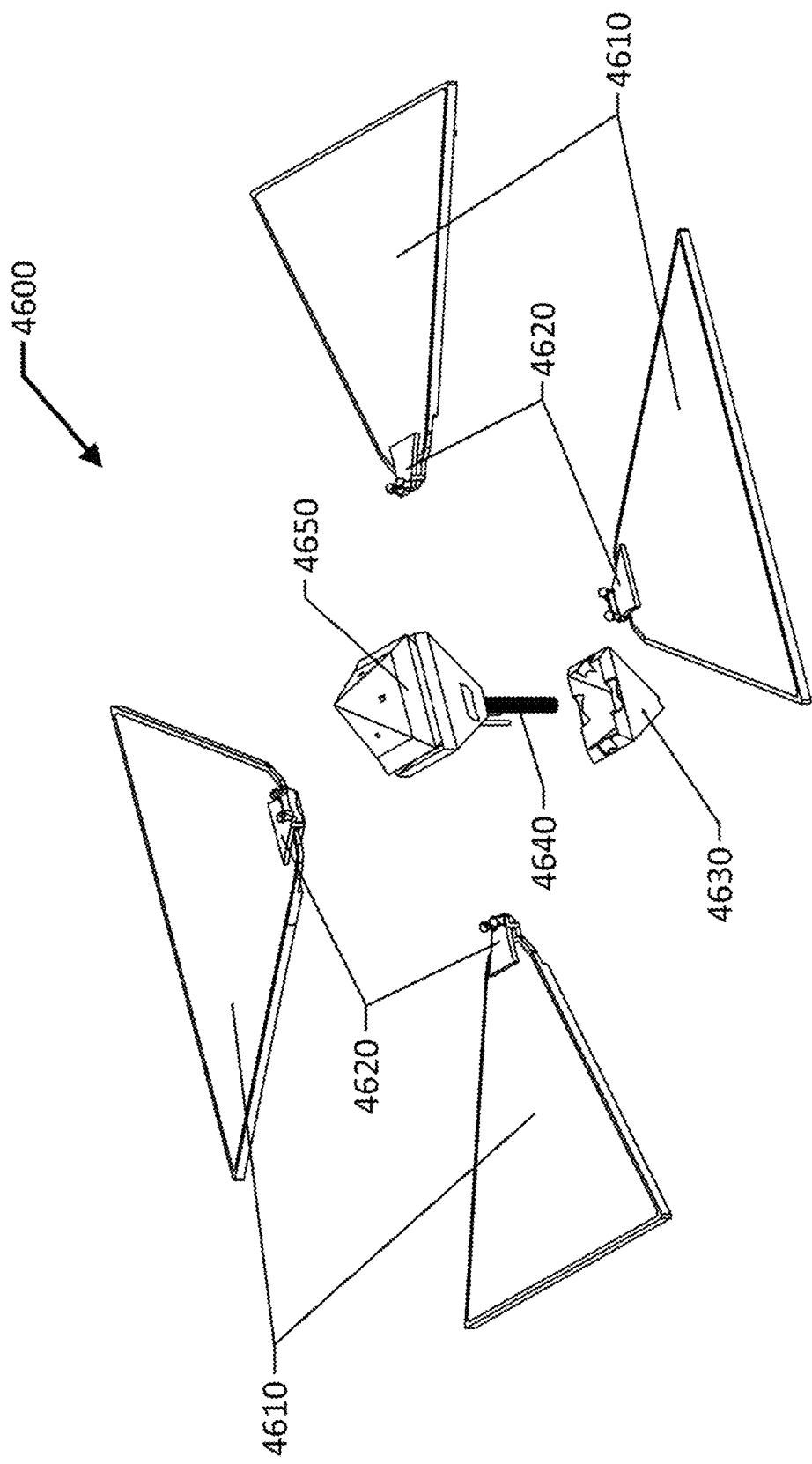

FIG. 138 shows an exploded view of a cross panel assembly.

Figure 139:
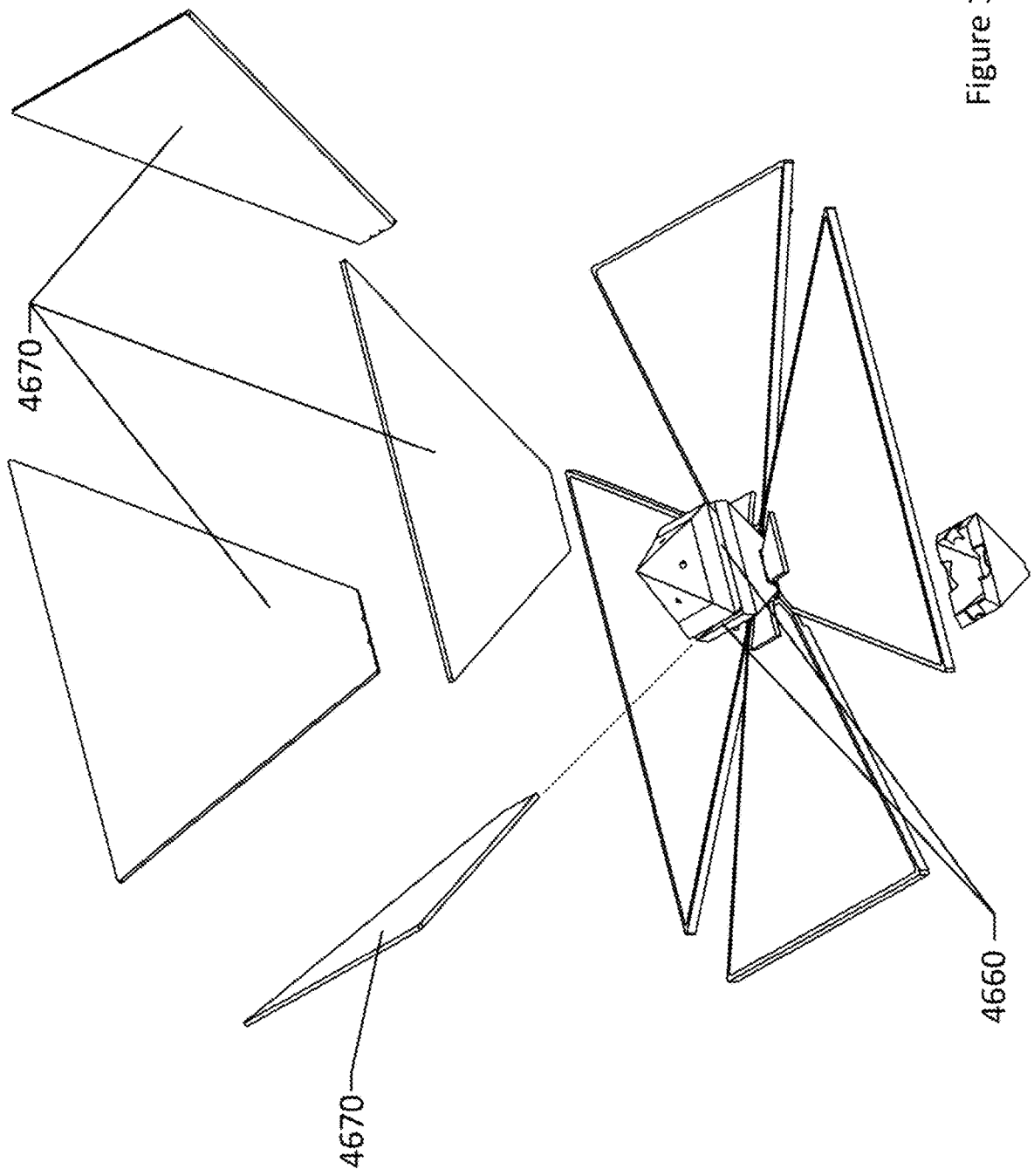

FIG. 139 shows a flattened cross panel assembly introducing a second set of panels.

Figure 140:
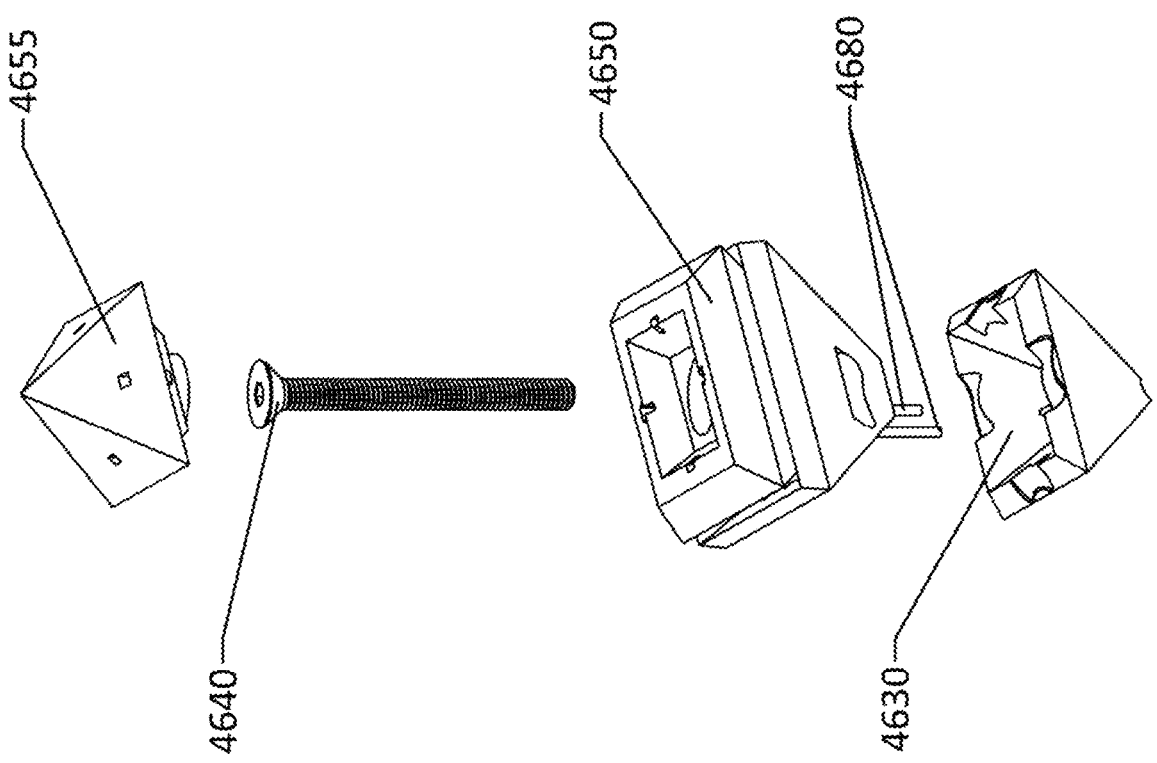

FIG. 140 shows an exploded view of the cross panel mounting post.

Figure 141:
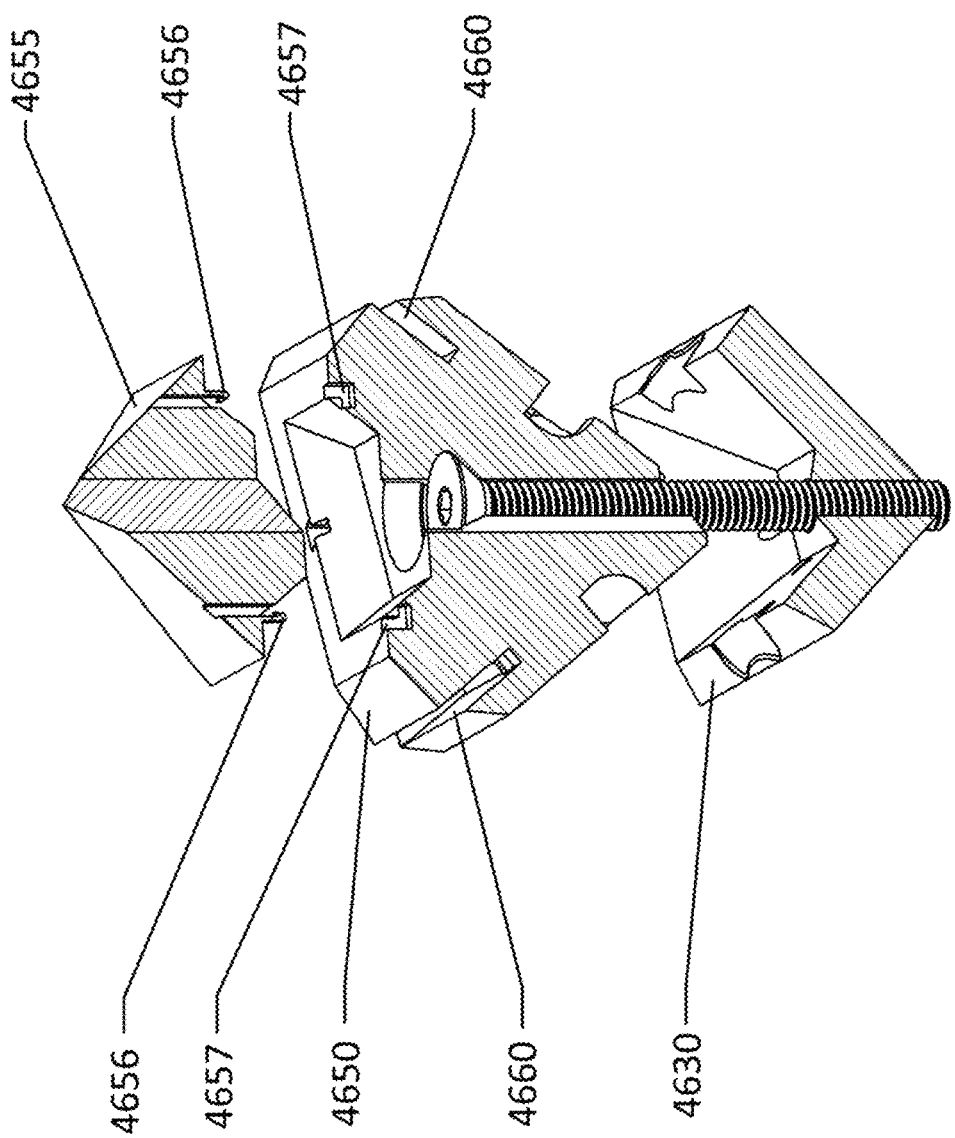

FIG. 141 shows a cross section of the cross panel mounting post.

Figure 142:
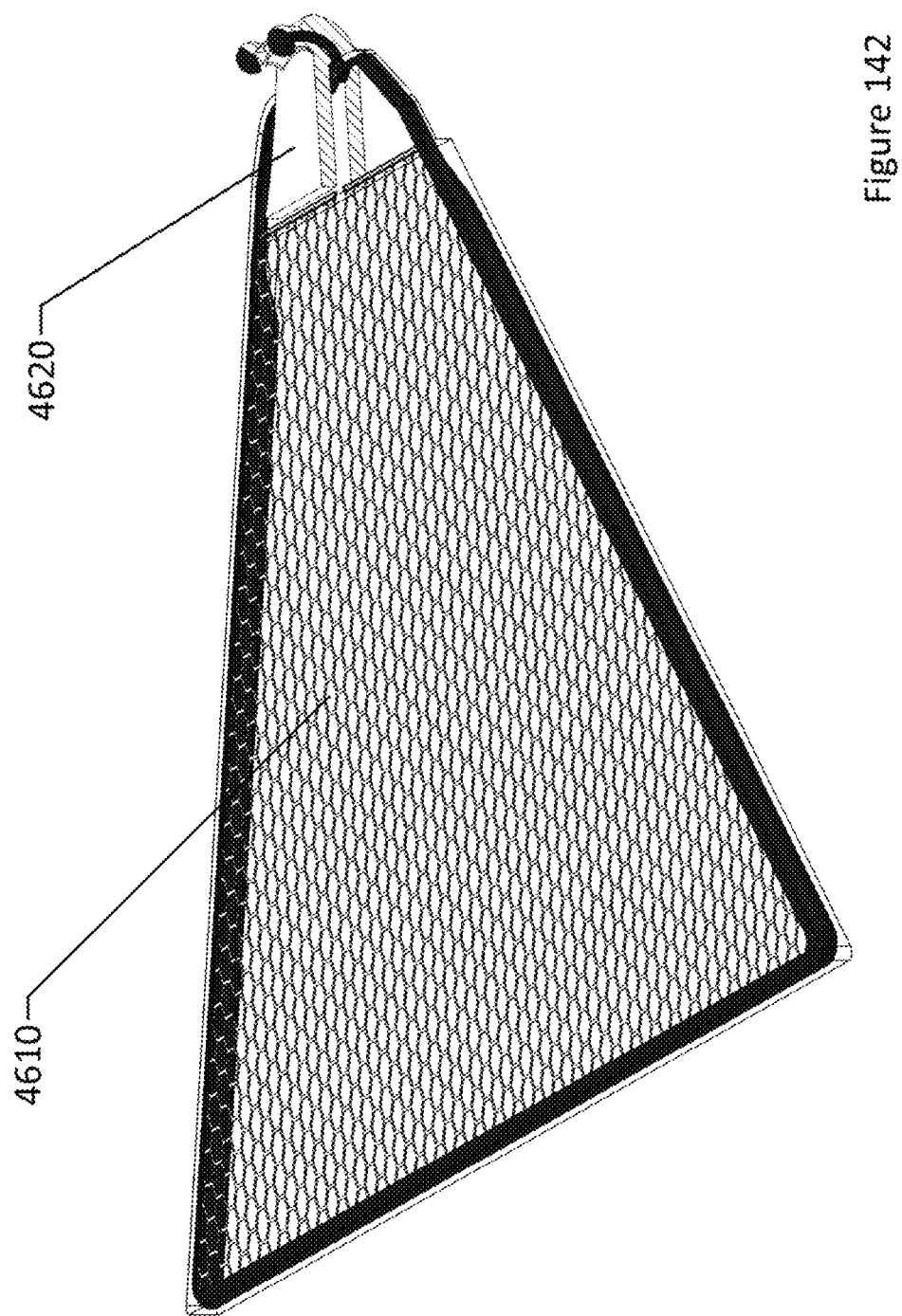

FIG. 142 shows the topside of a transparent honeycomb panel and its hinge.

Figure 143:
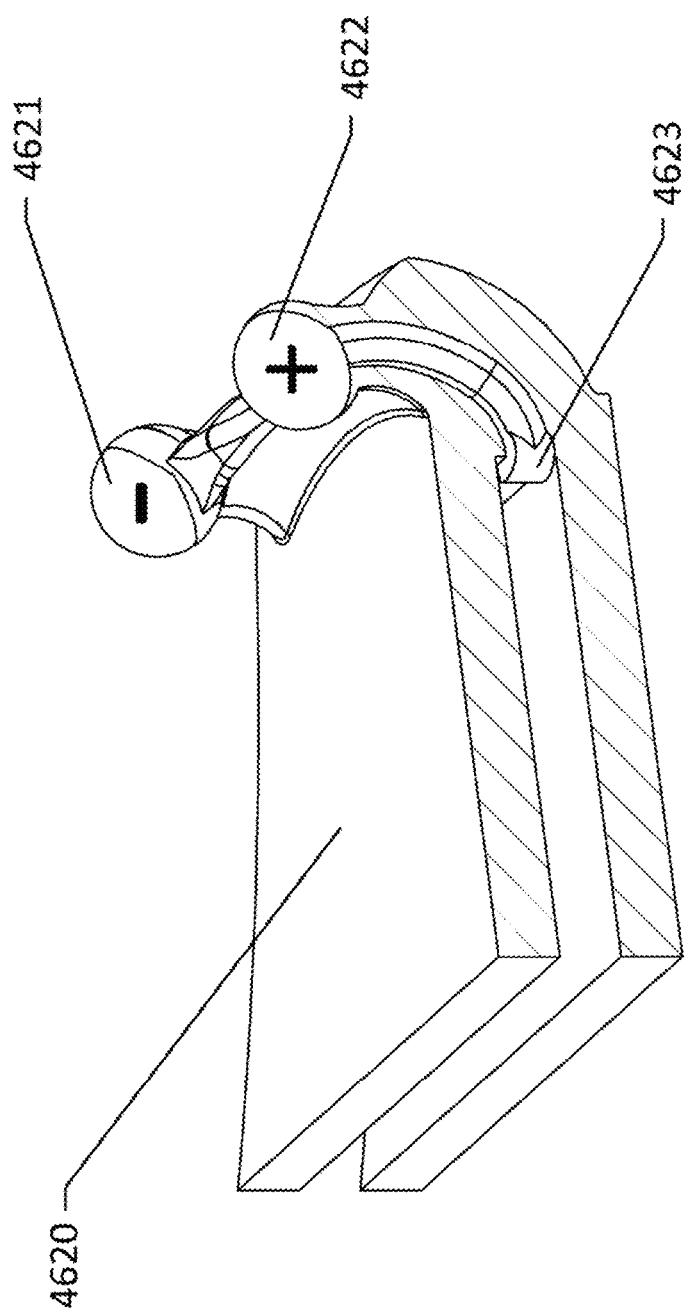

FIG. 143 shows a close-up of the section view of its hinge.

Figure 144:
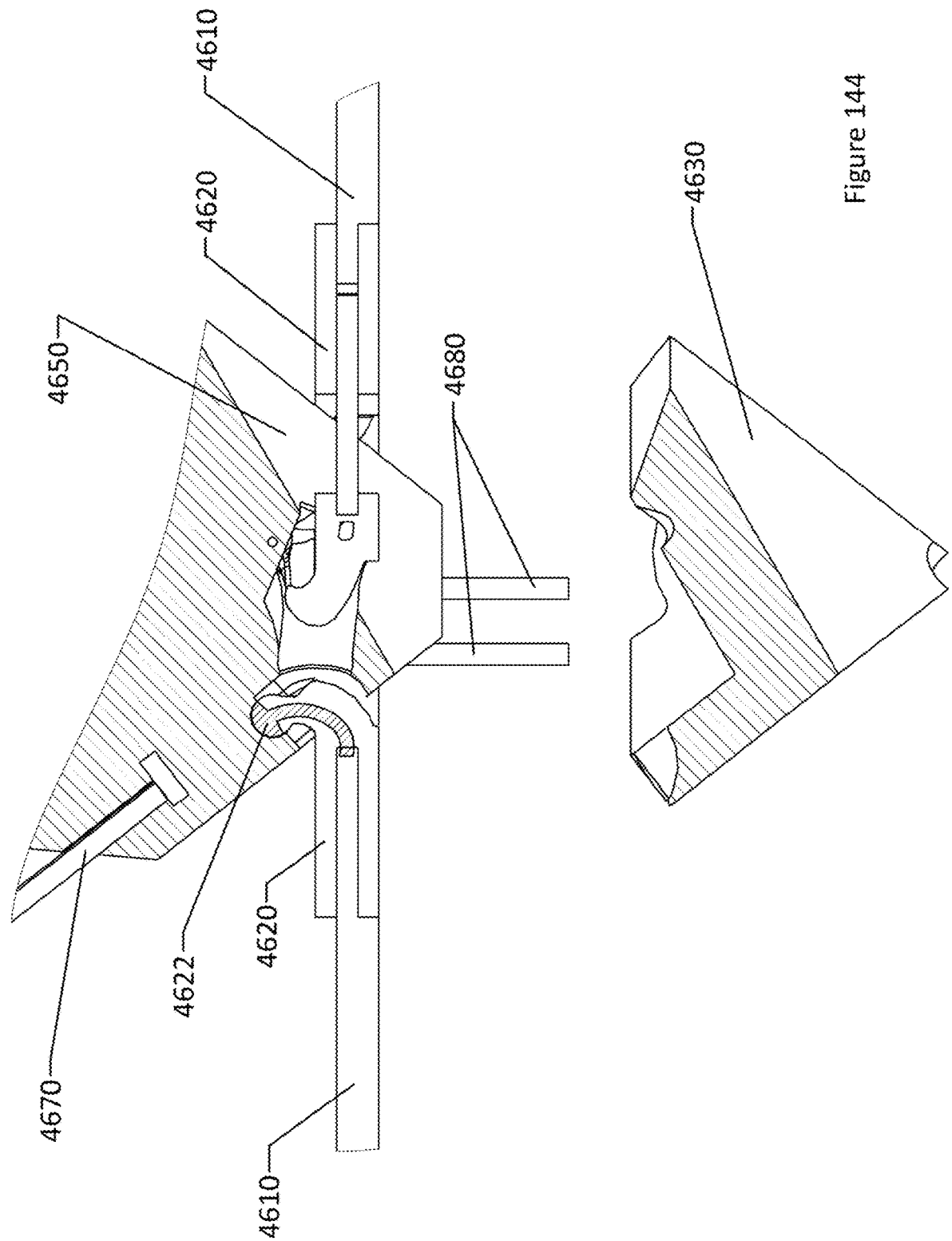
Figure 145:
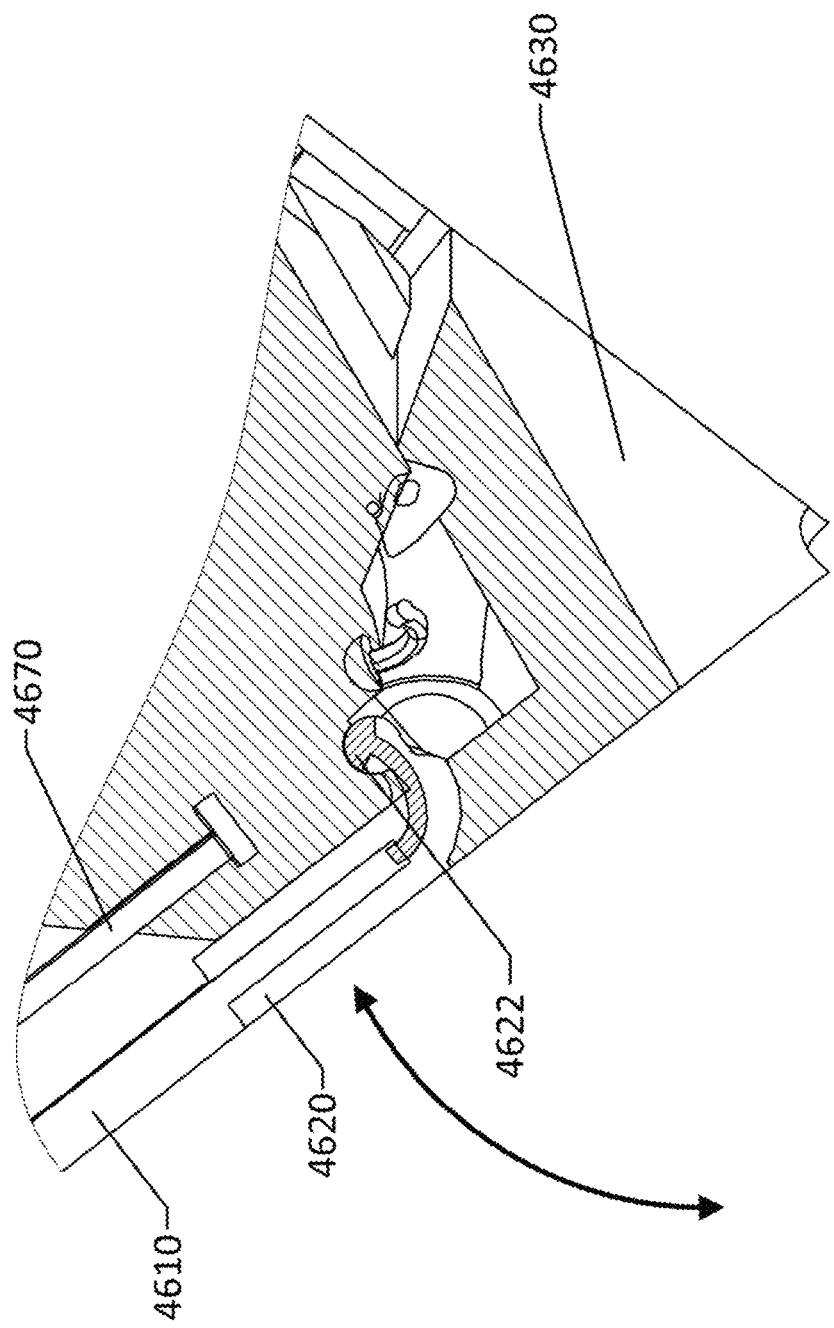

FIG. 144 shows a section view of the cross panel assembly in the flattened position FIG. 145 shows a section view of the cross panel assembly folded up.

Figure 146:
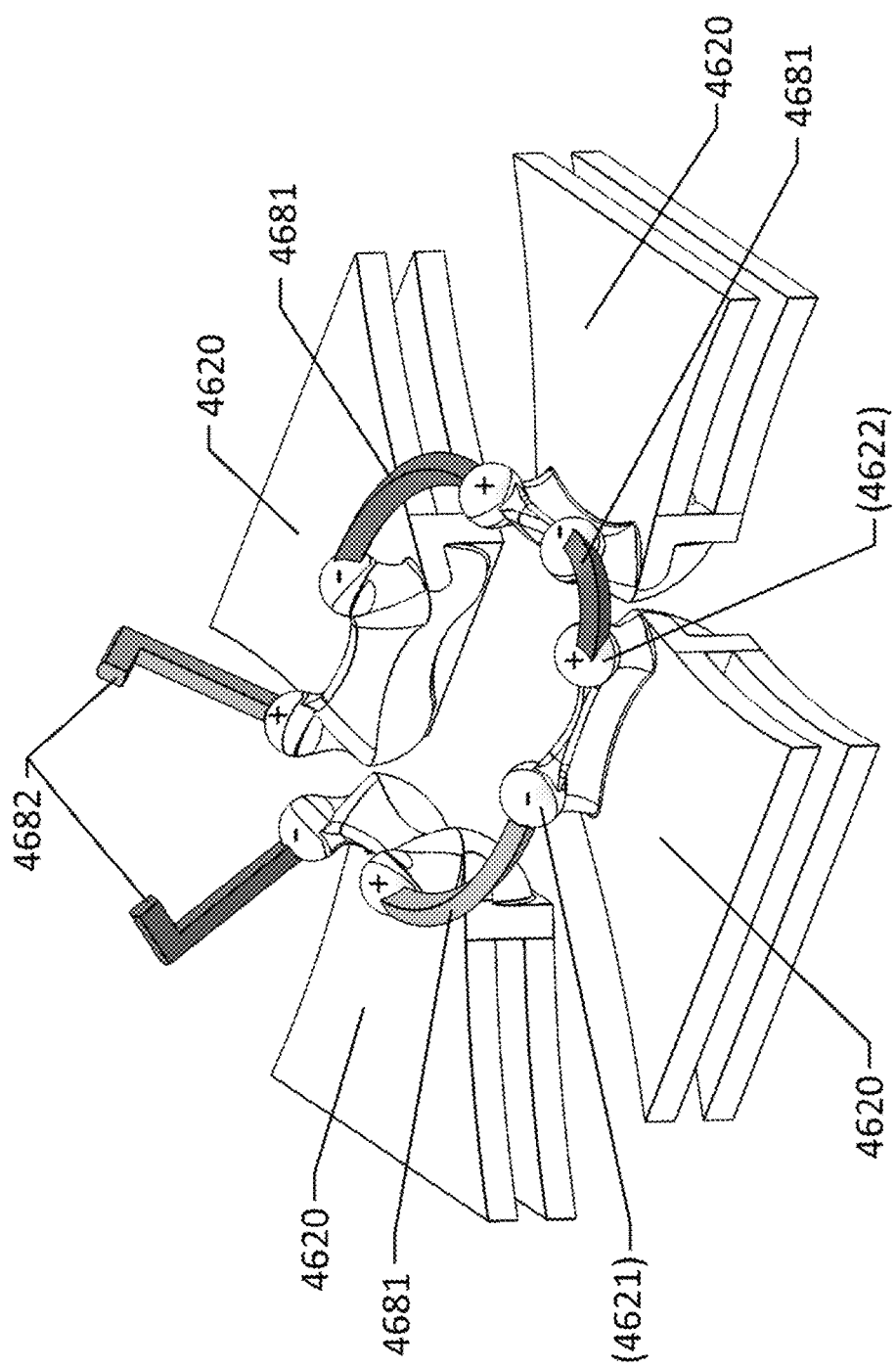

FIG. 146 isolates the hinges in the flat position and the first layer of wiring in the cross panel mounting post.

Figure 147:
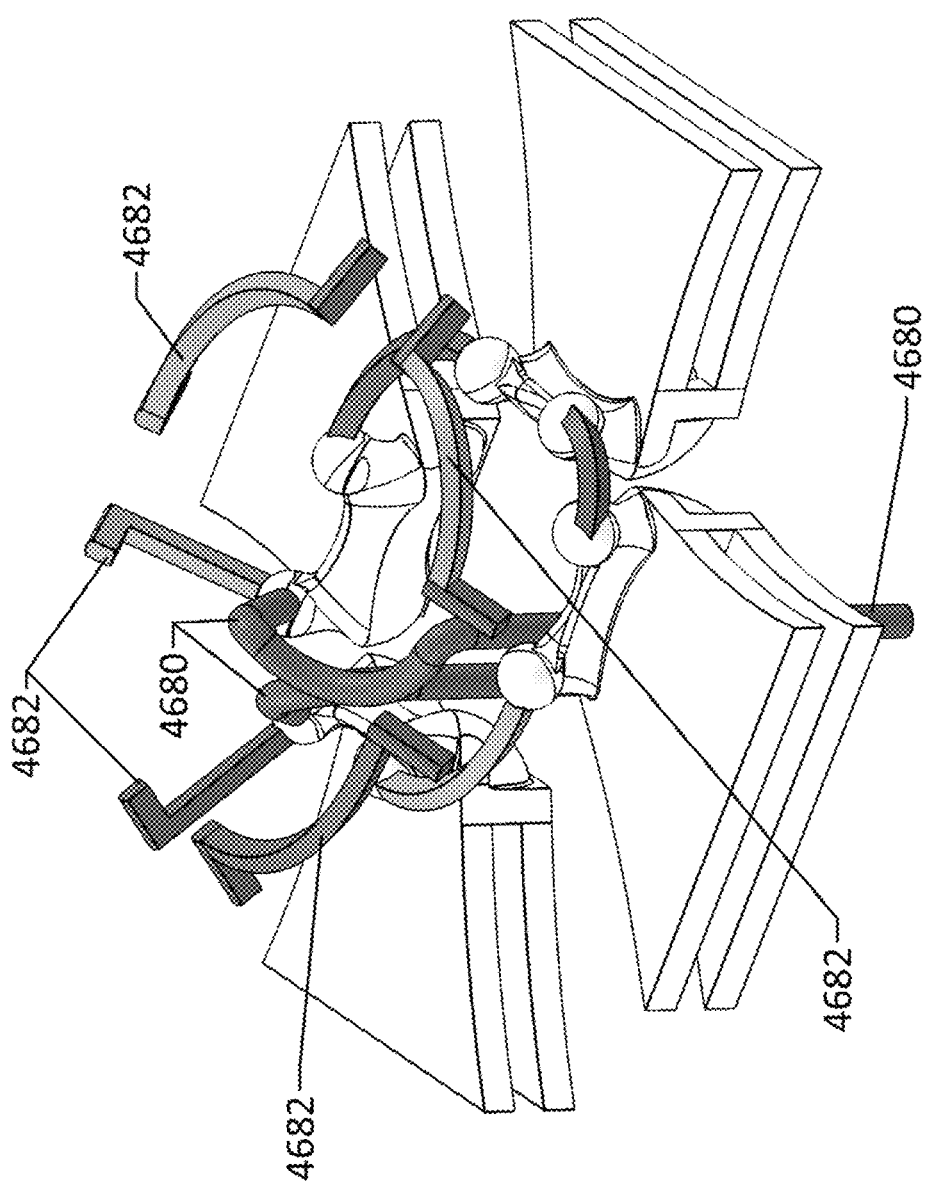

FIG. 147 adds the second layer of wiring in the cross panel mounting post.

Figure 148:
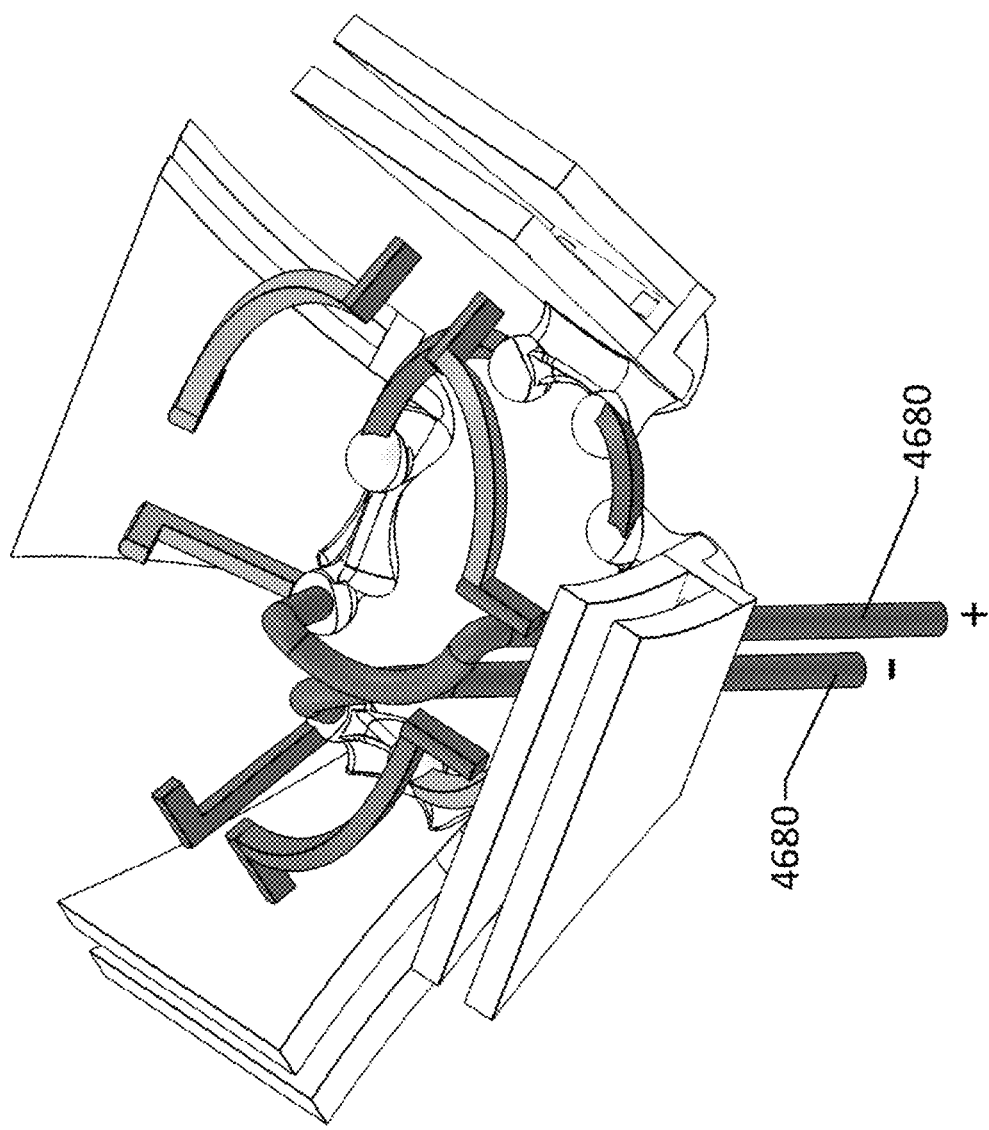

FIG. 148 shows the hinges in the folded position and the exposed leads of the wiring.

Figure 149:
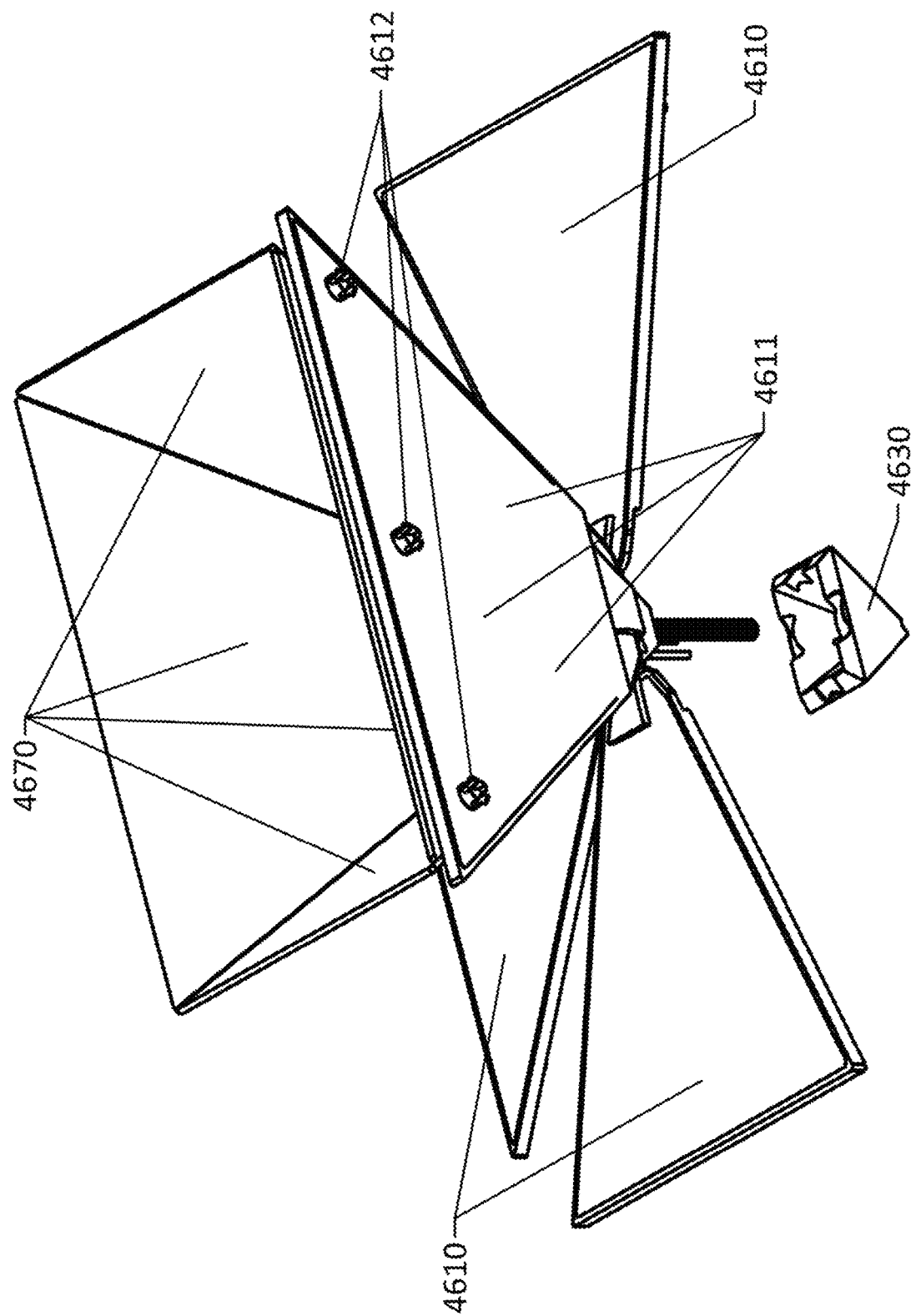

FIG. 149 shows a partially folded assembly, highlighting an electroluminescent coating on the back of the first layer of panels.

Figure 150:
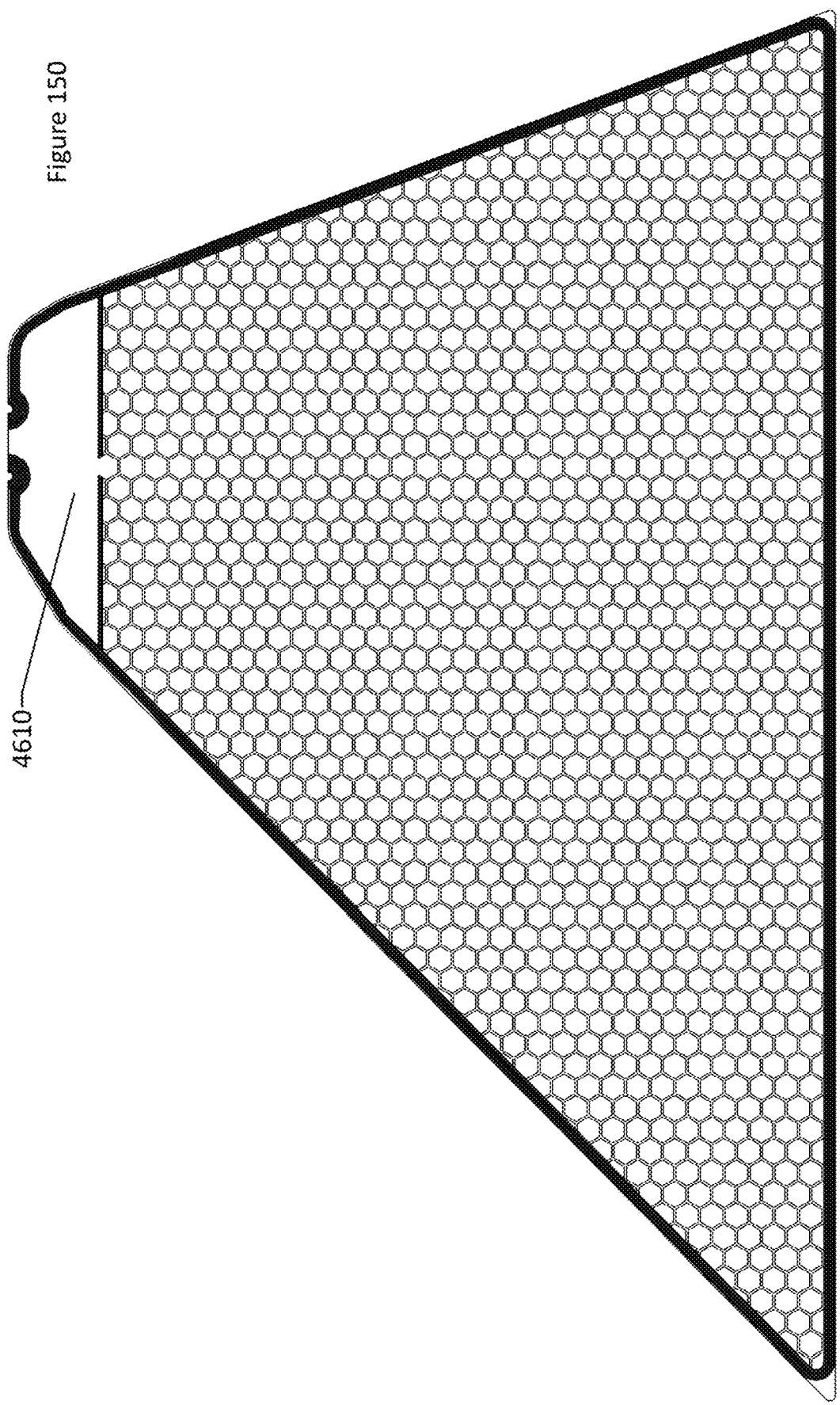

FIG. 150 shows a plan view of a transparent honeycomb panel.

Figure 151:
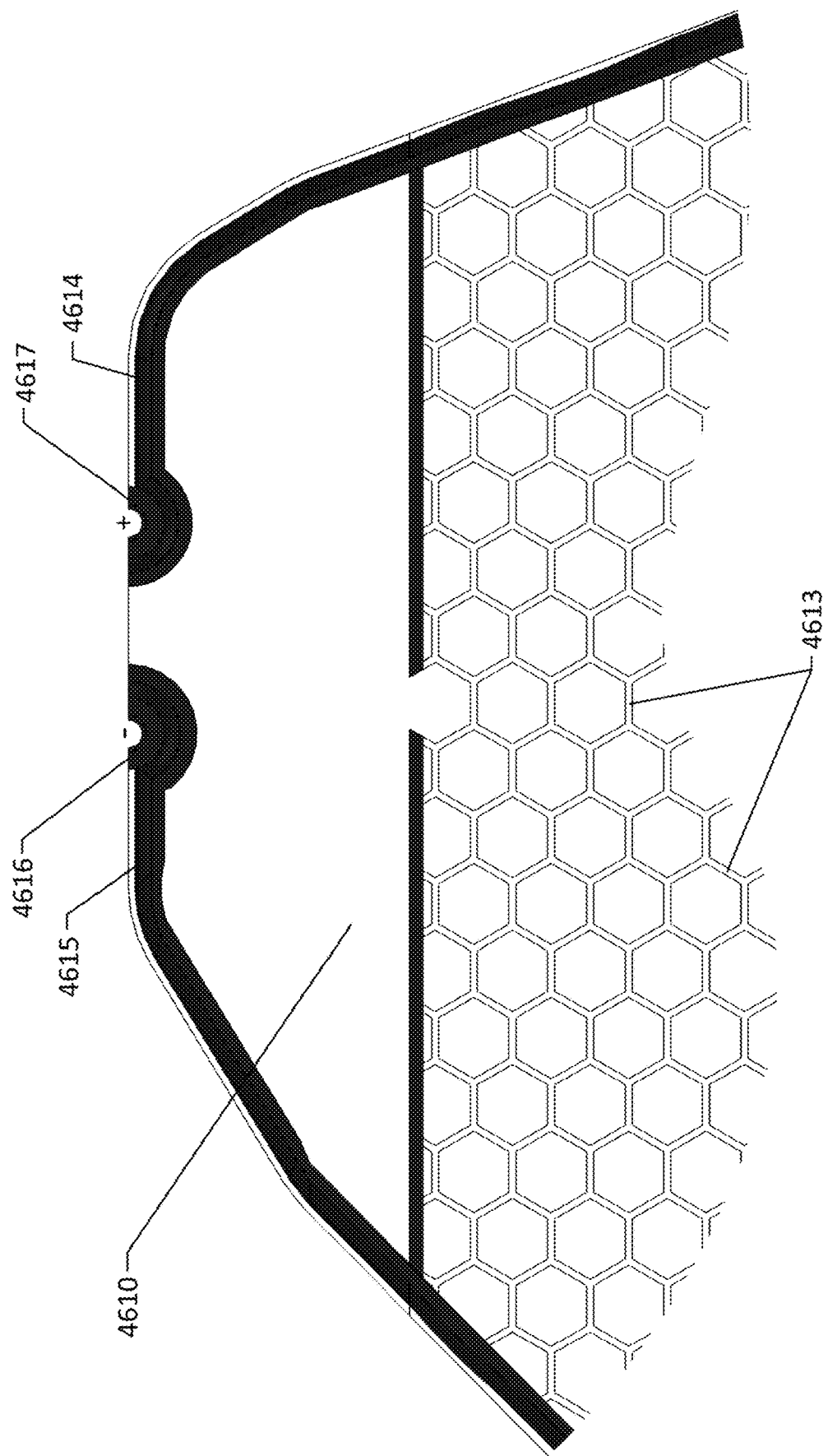

FIG. 151 shows a cropped detail of the connection end of a honeycomb panel.

Figure 152:
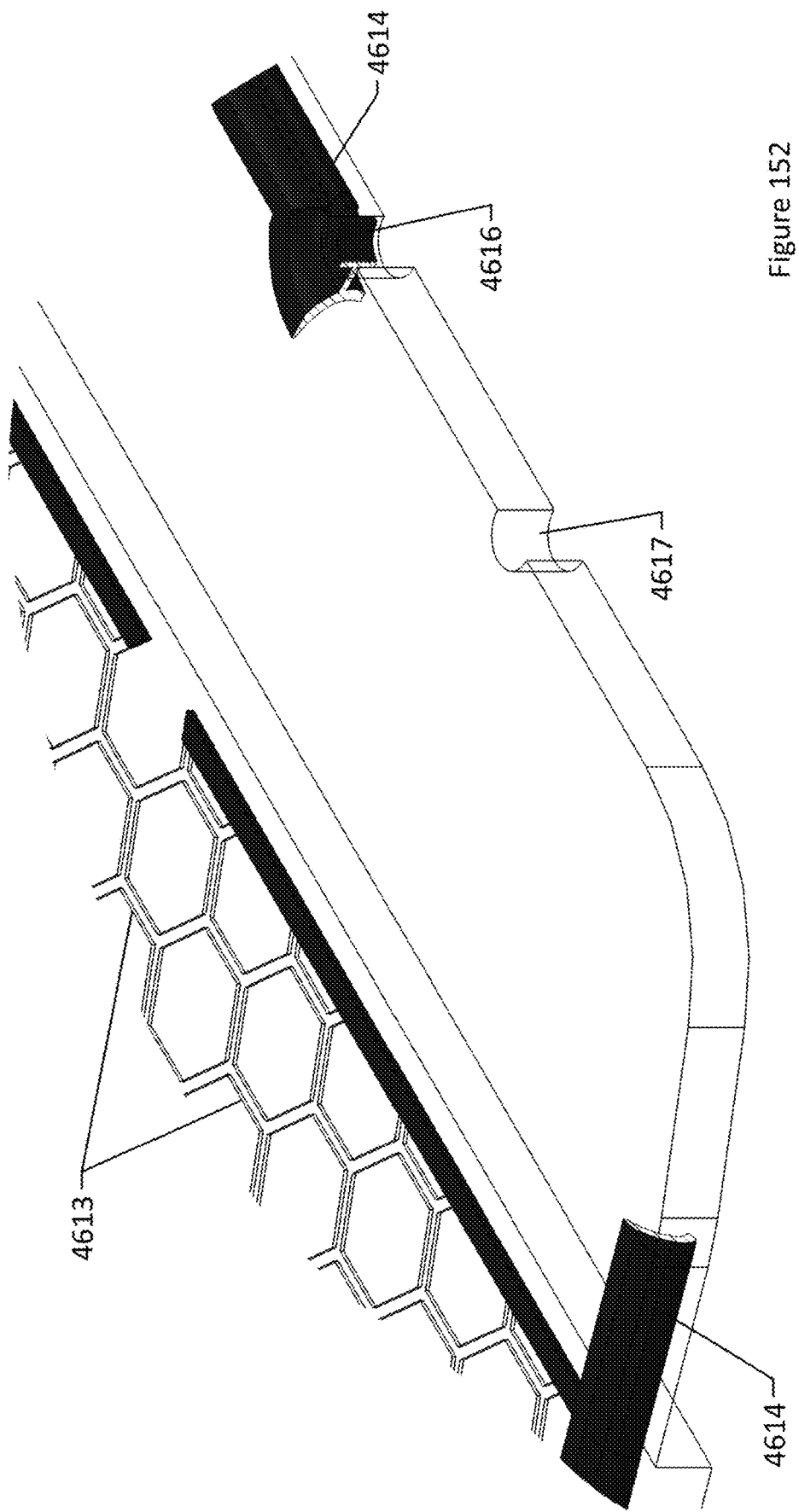

FIG. 152 shows further detail of the honeycomb panel's connection, with a section view of the conductive contacts.

Figure 153:
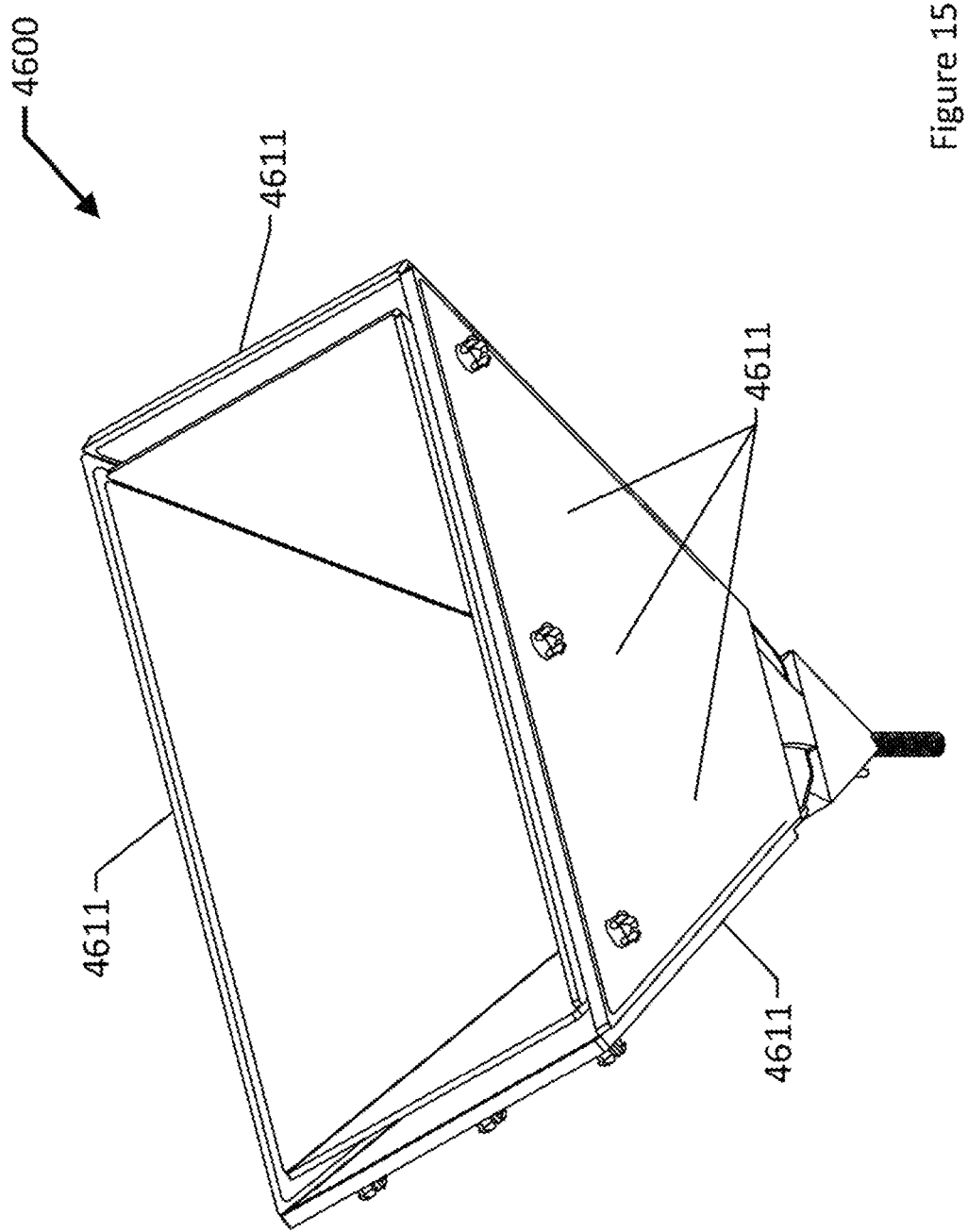

FIG. 153 shows a fully assembled and folded cross panel, highlighting the electroluminescent side of one panel.

Figure 154:
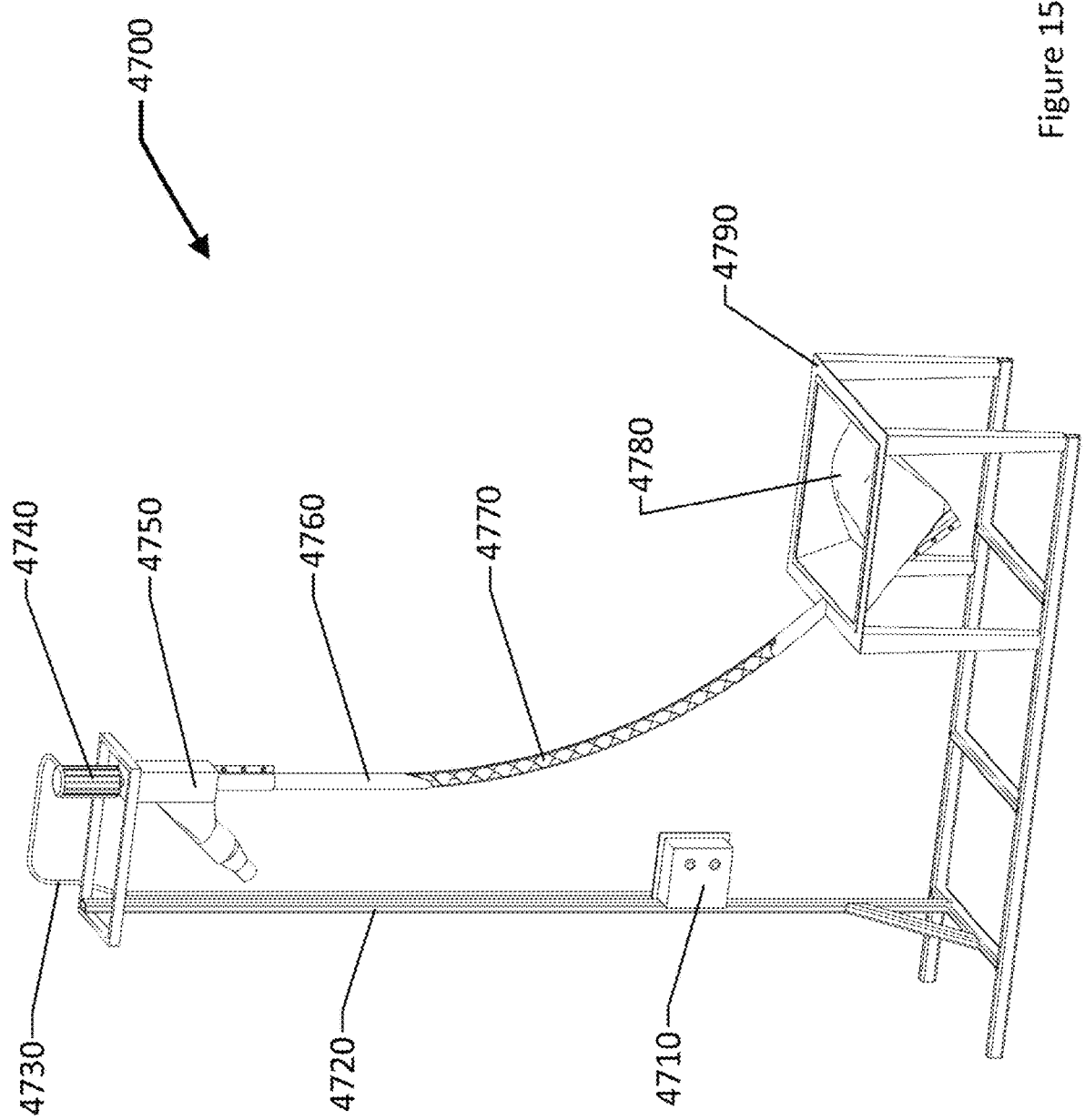

FIG. 154 shows a screw conveyor for to handle plastic pellets for 3D printing.

Figure 155:
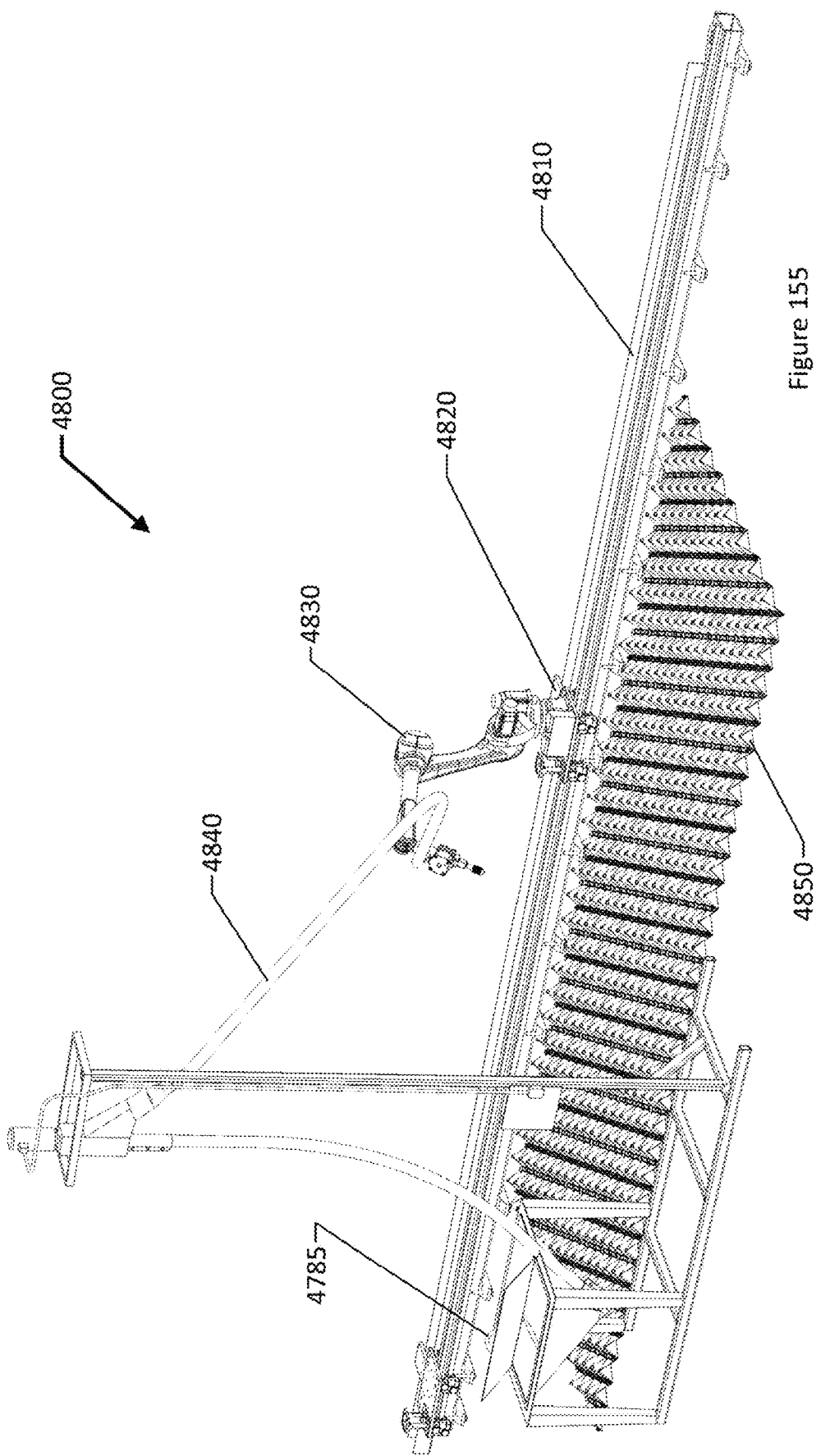

FIG. 155 shows a robotic 3D printing system.

Figure 156:
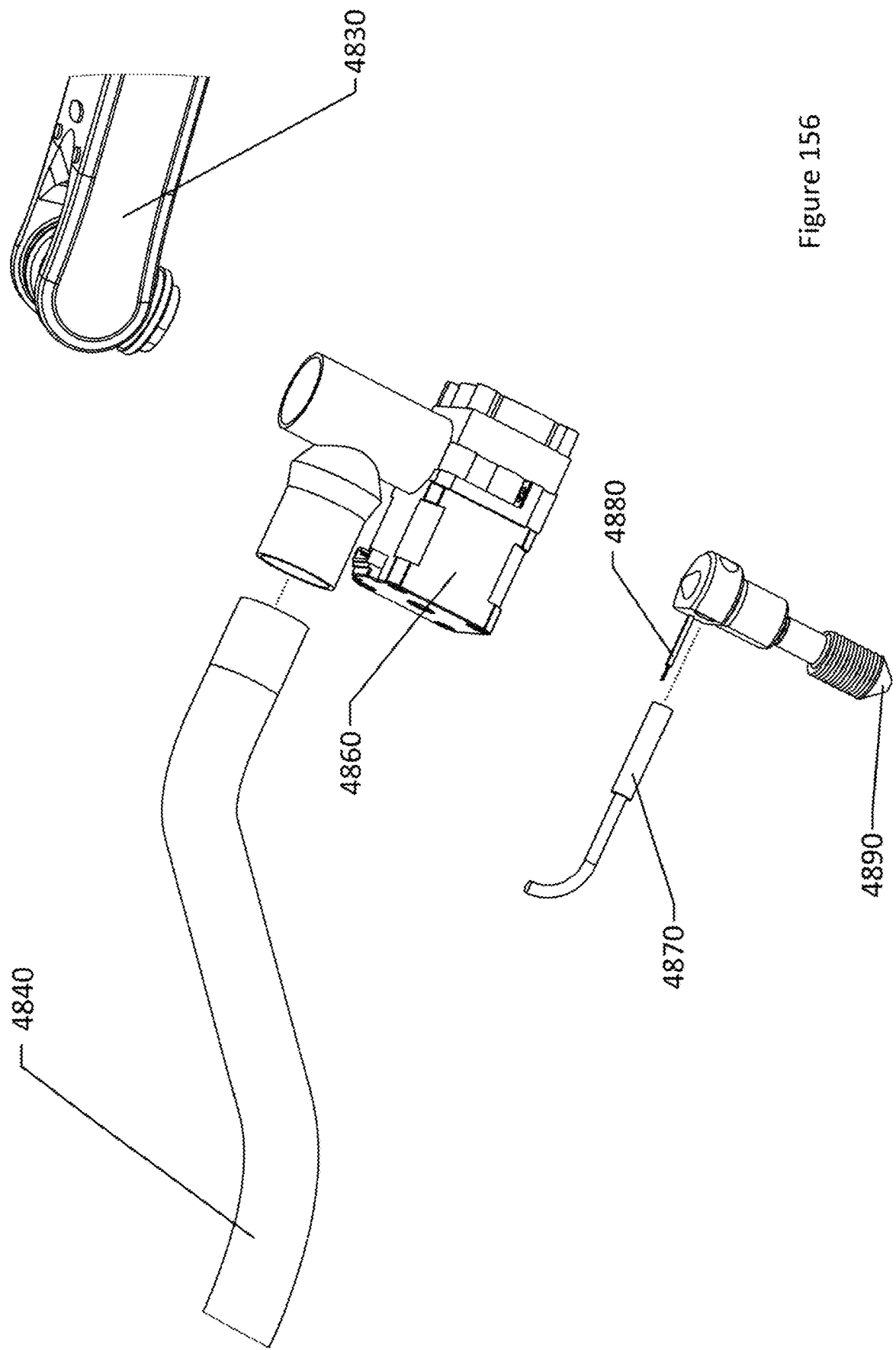

FIG. 156 shows detail of an exploded view of a robotic arm and extruder.

Figure 157:
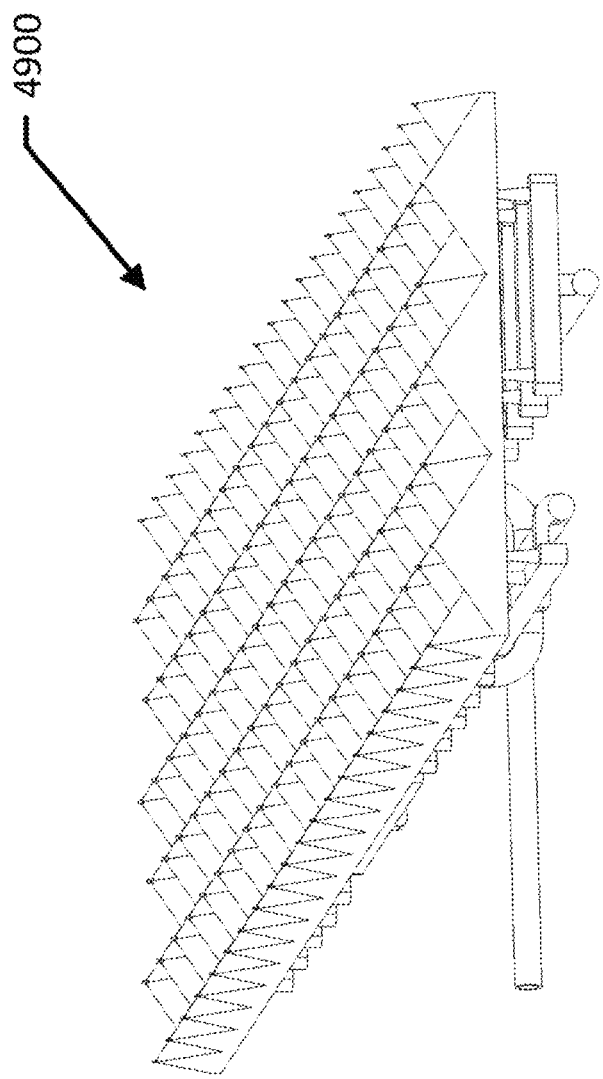

FIG. 157 shows a setup for vacuum forming thermoplastic sheets.

Figure 158:
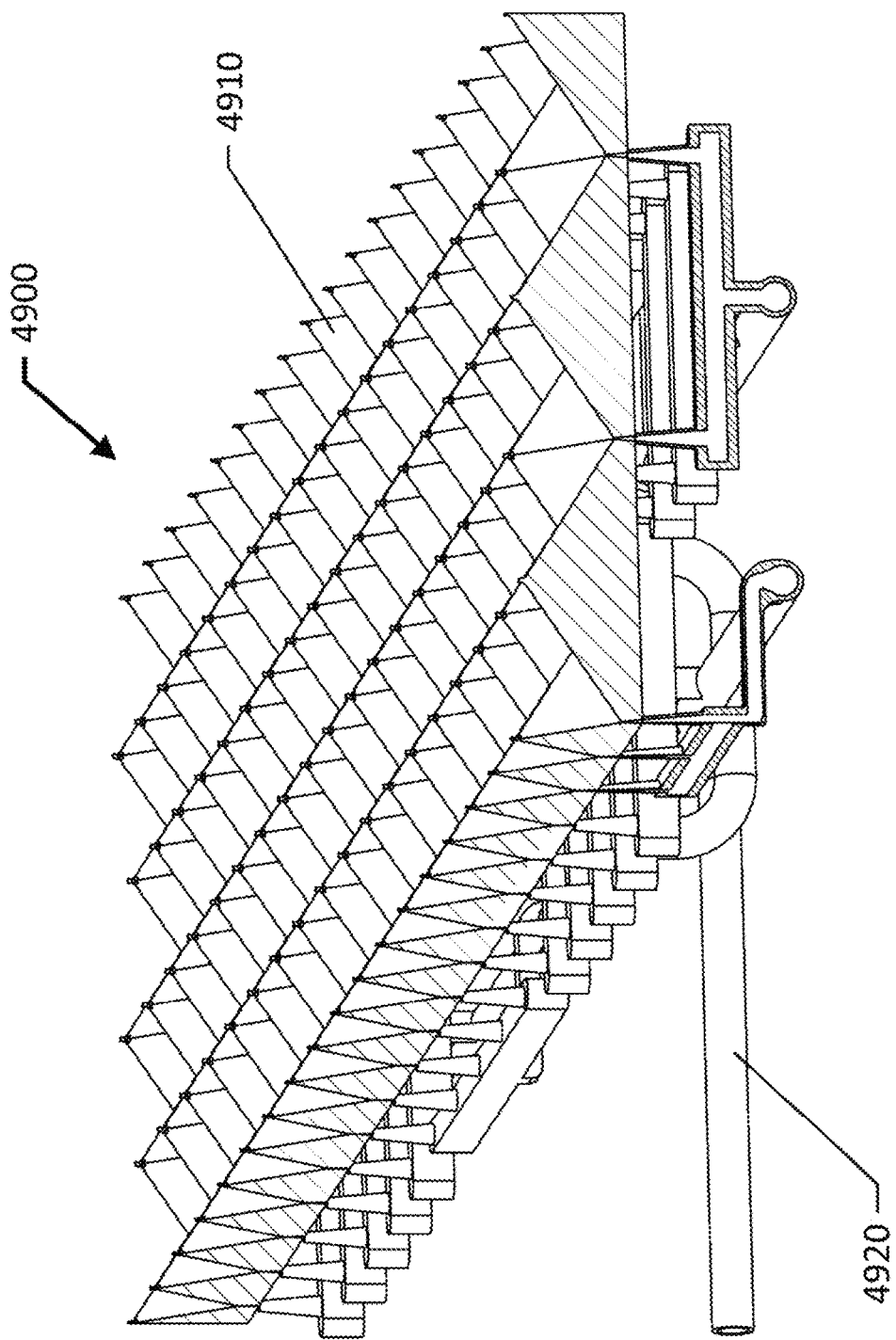

FIG. 158 sections the tubing and mold in the vacuum forming process.

Figure 159:
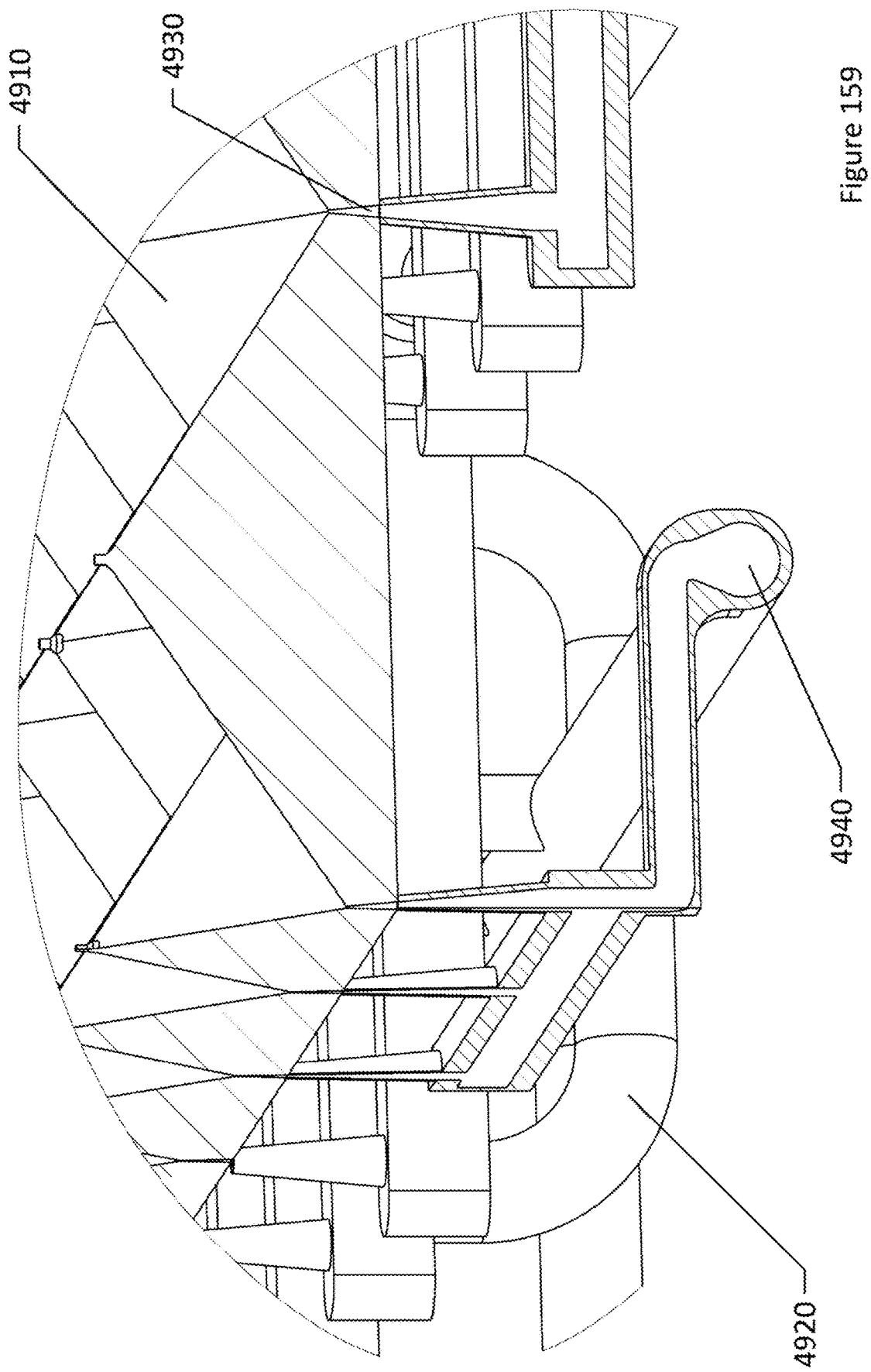

FIG. 159 details a section view of the tubing, mold and mold vents in the vacuum forming setup.

Figure 160:
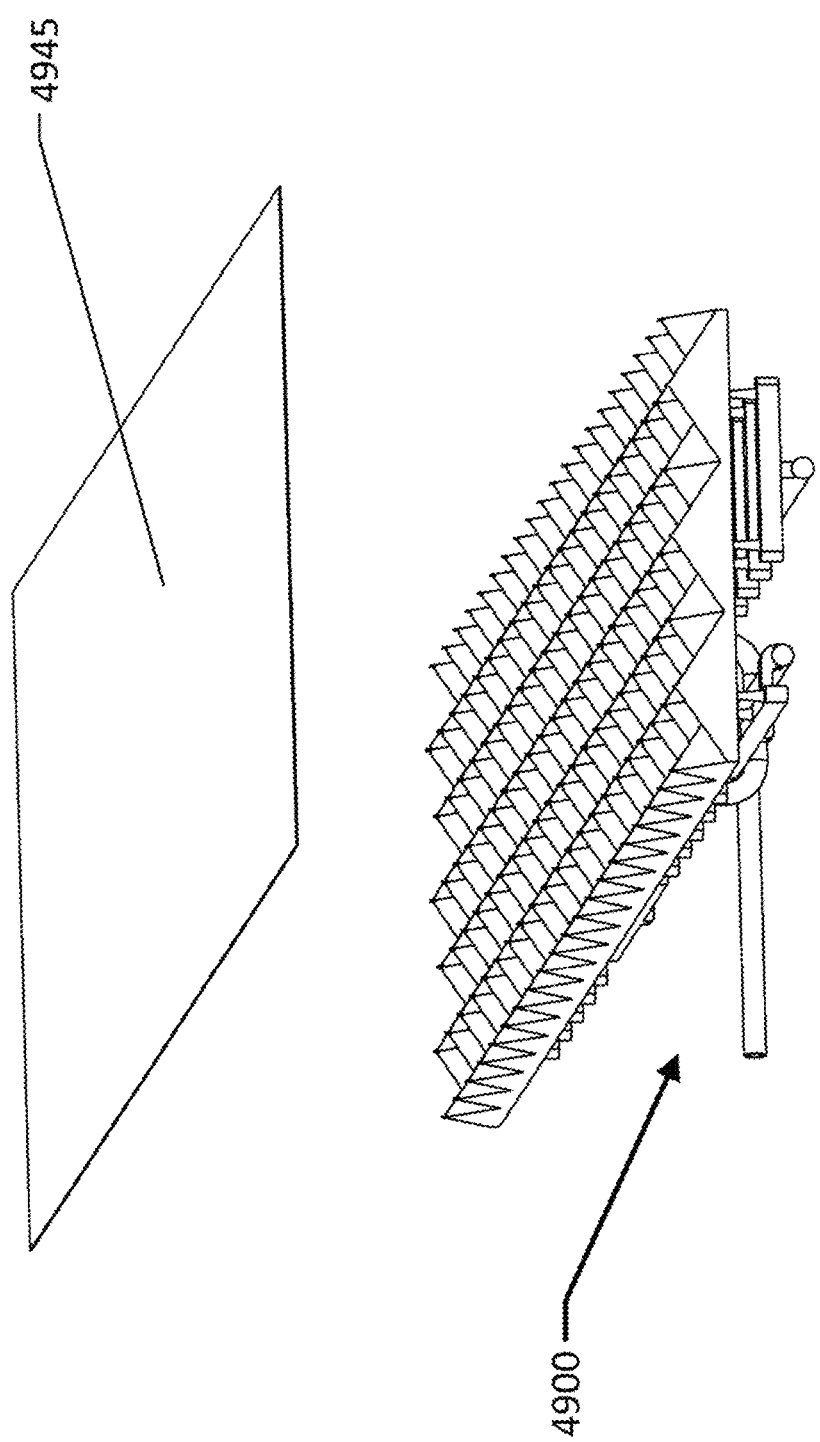

FIG. 160 introduces a thermoplastic sheet into the vacuum forming setup.

Figure 161:
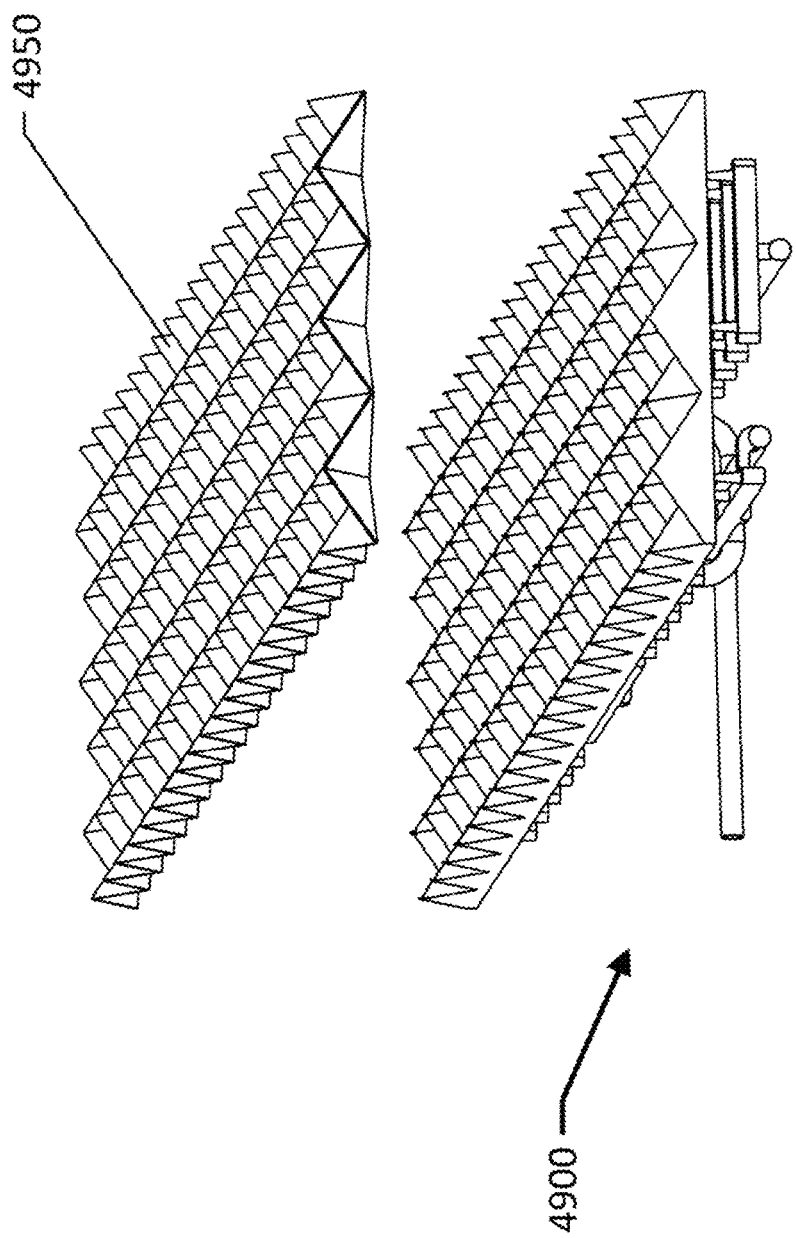

FIG. 161 shows a vacuum/thermoformed sheet lifted off of the mold.

Figure 162:
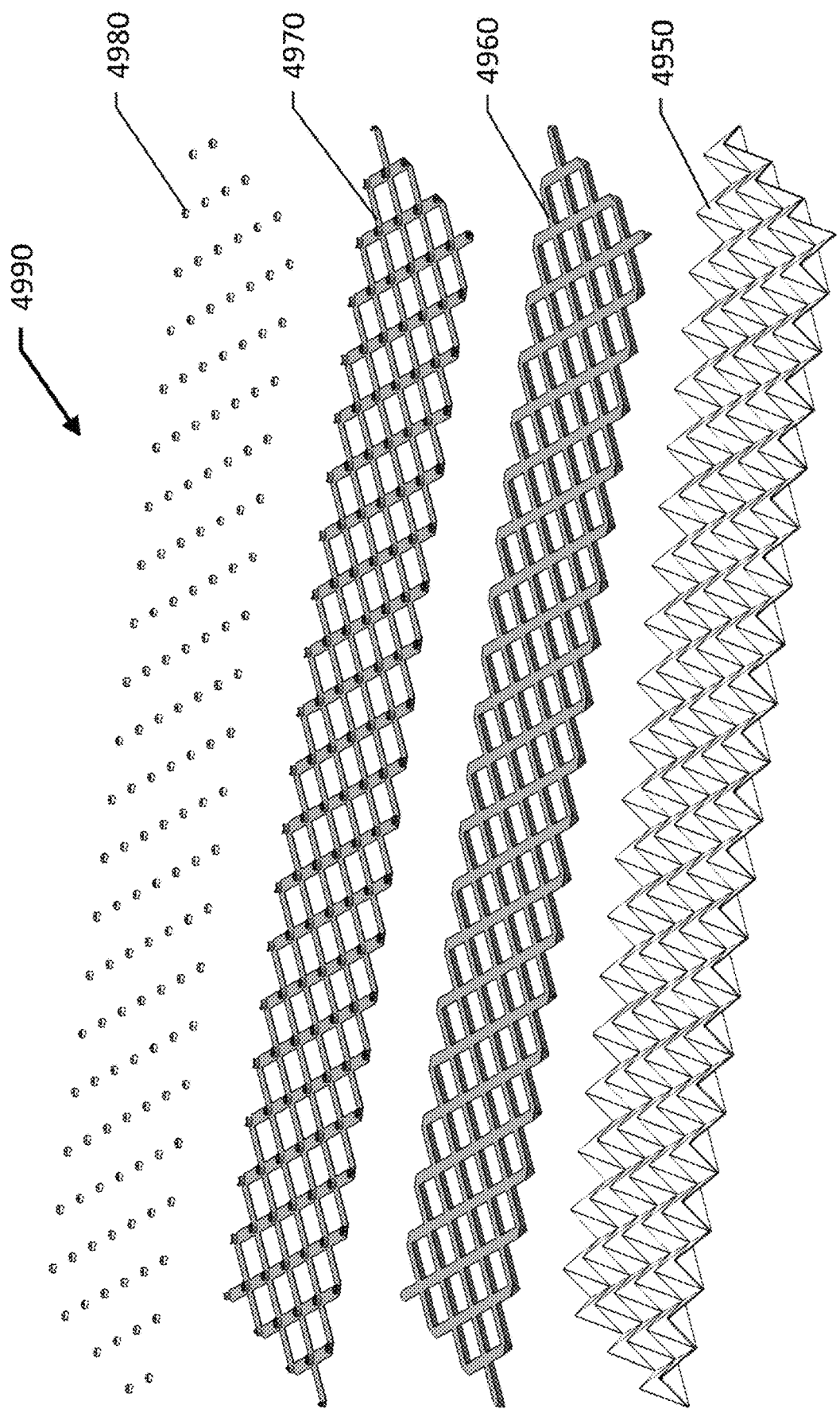

FIG. 162 shows an exploded view of a thermoformed formed pyramid wall assembly.

Figure 163:
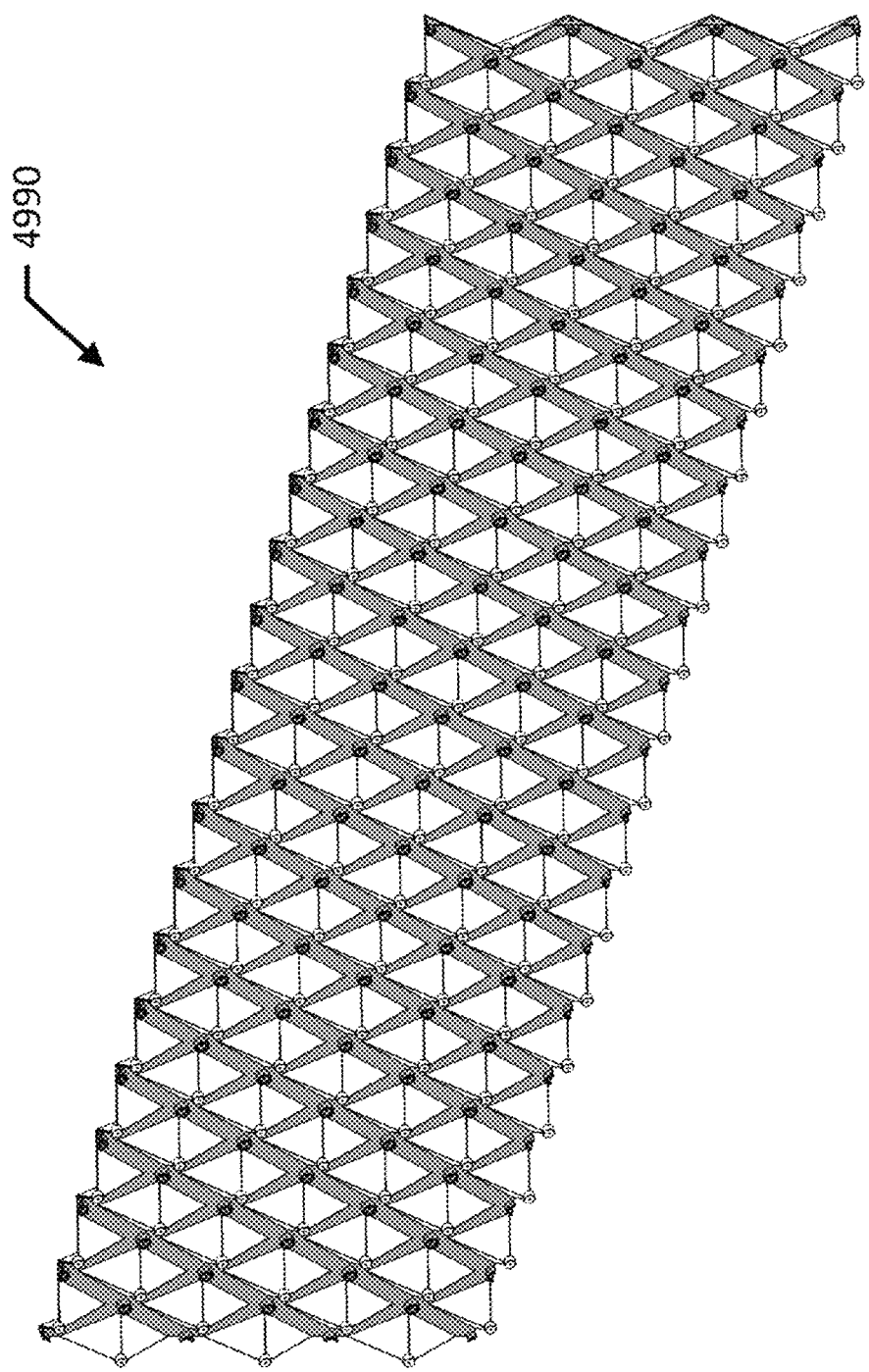

FIG. 163 shows the backside of a thermoformed pyramid wall assembly.

Figure 164:
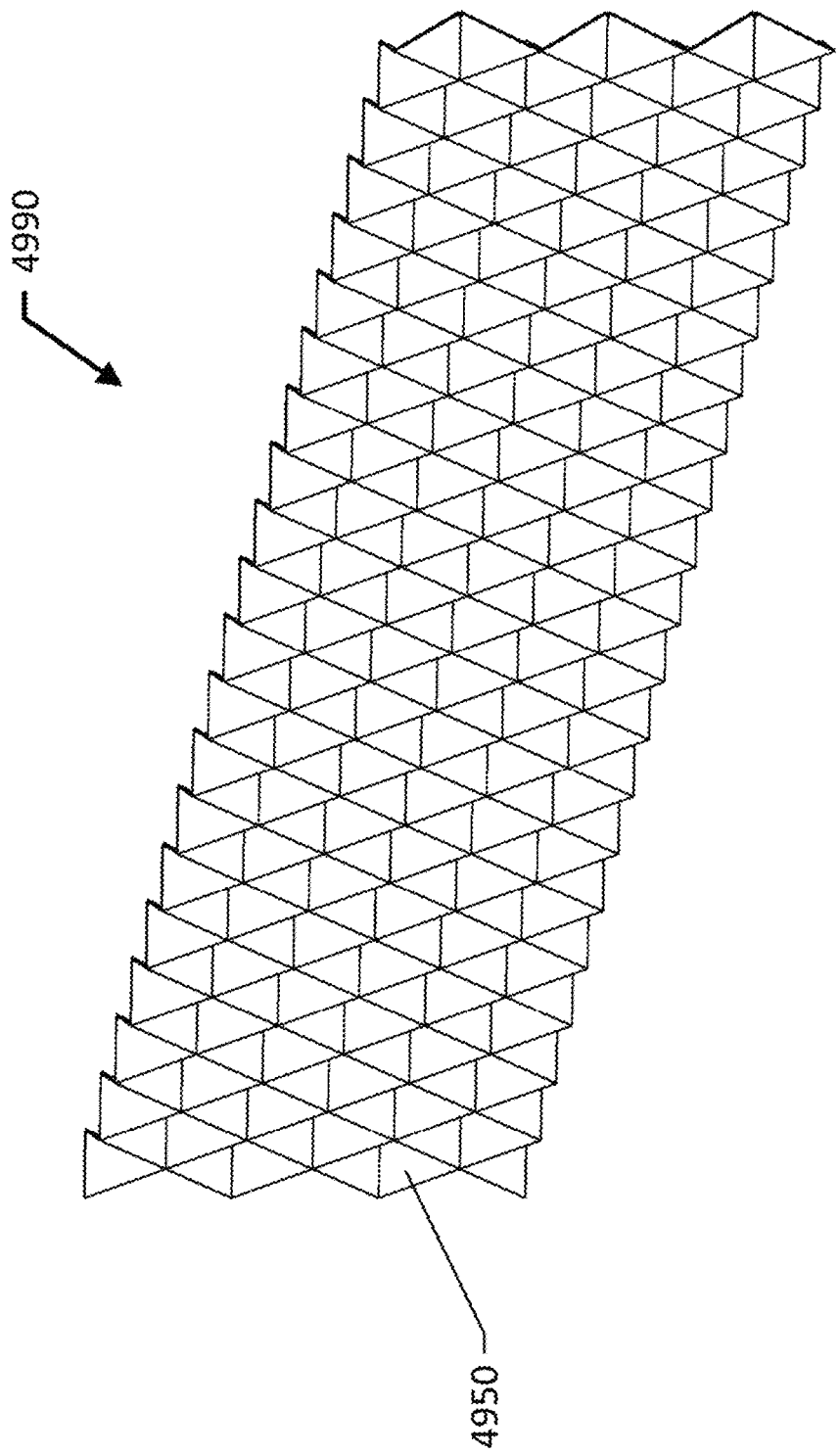

FIG. 164 shows the front side of a thermoformed pyramid wall assembly.

Figure 165:
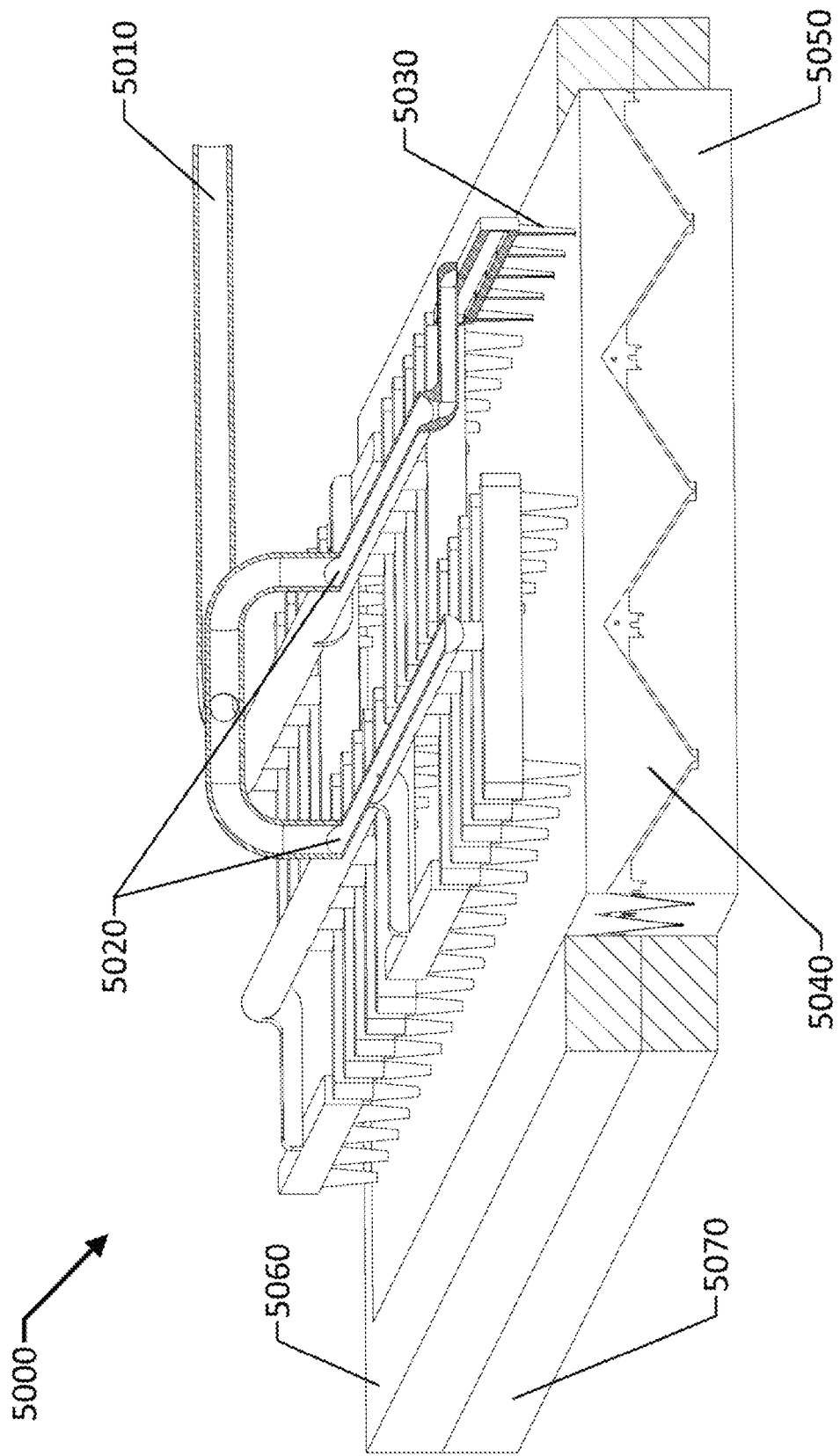

FIG. 165 shows a setup to injection mold a pyramid wall section.

Figure 166:
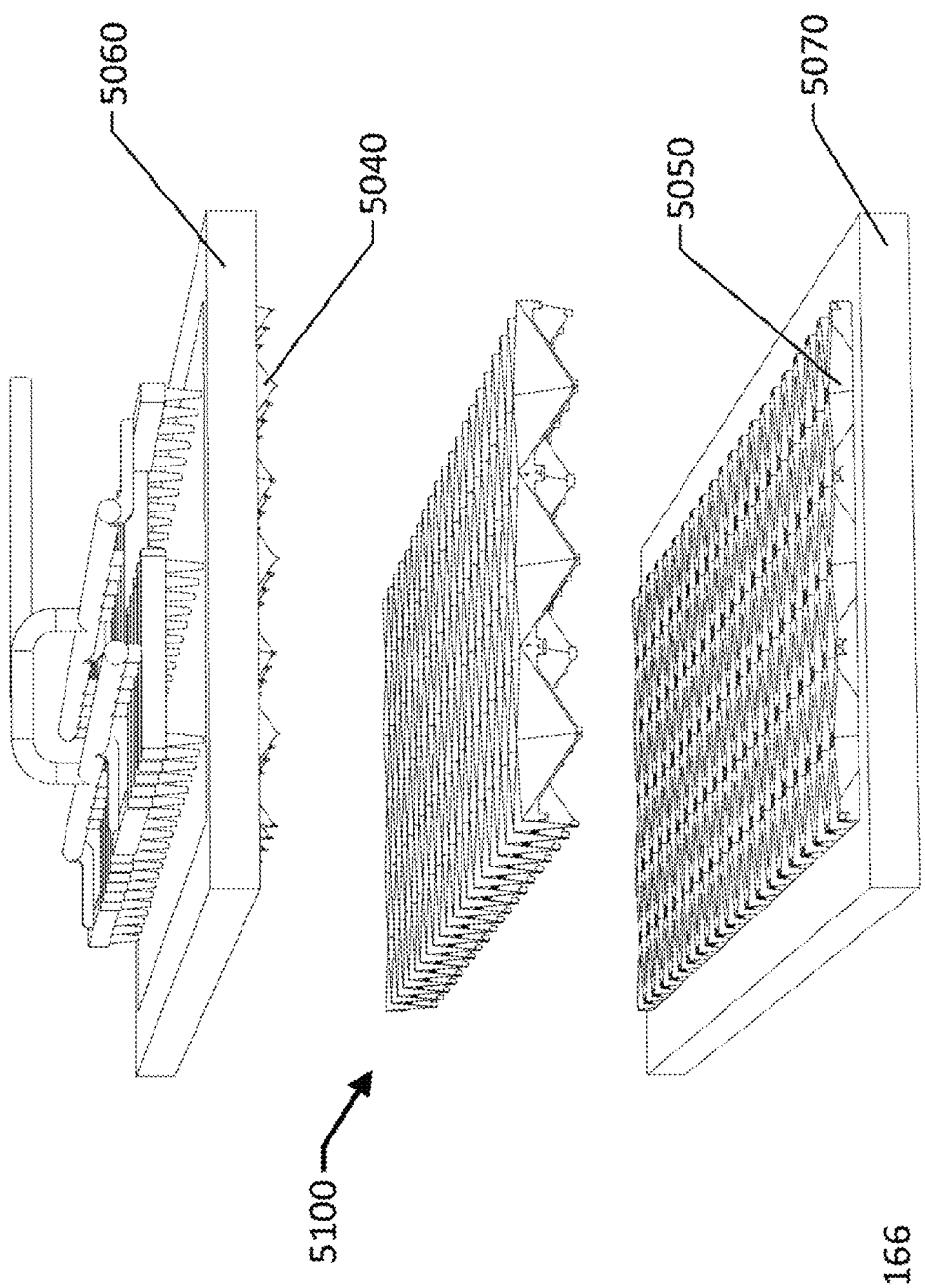

FIG. 166 shows a pyramid wall section ejected from the mold.

Figure 167:
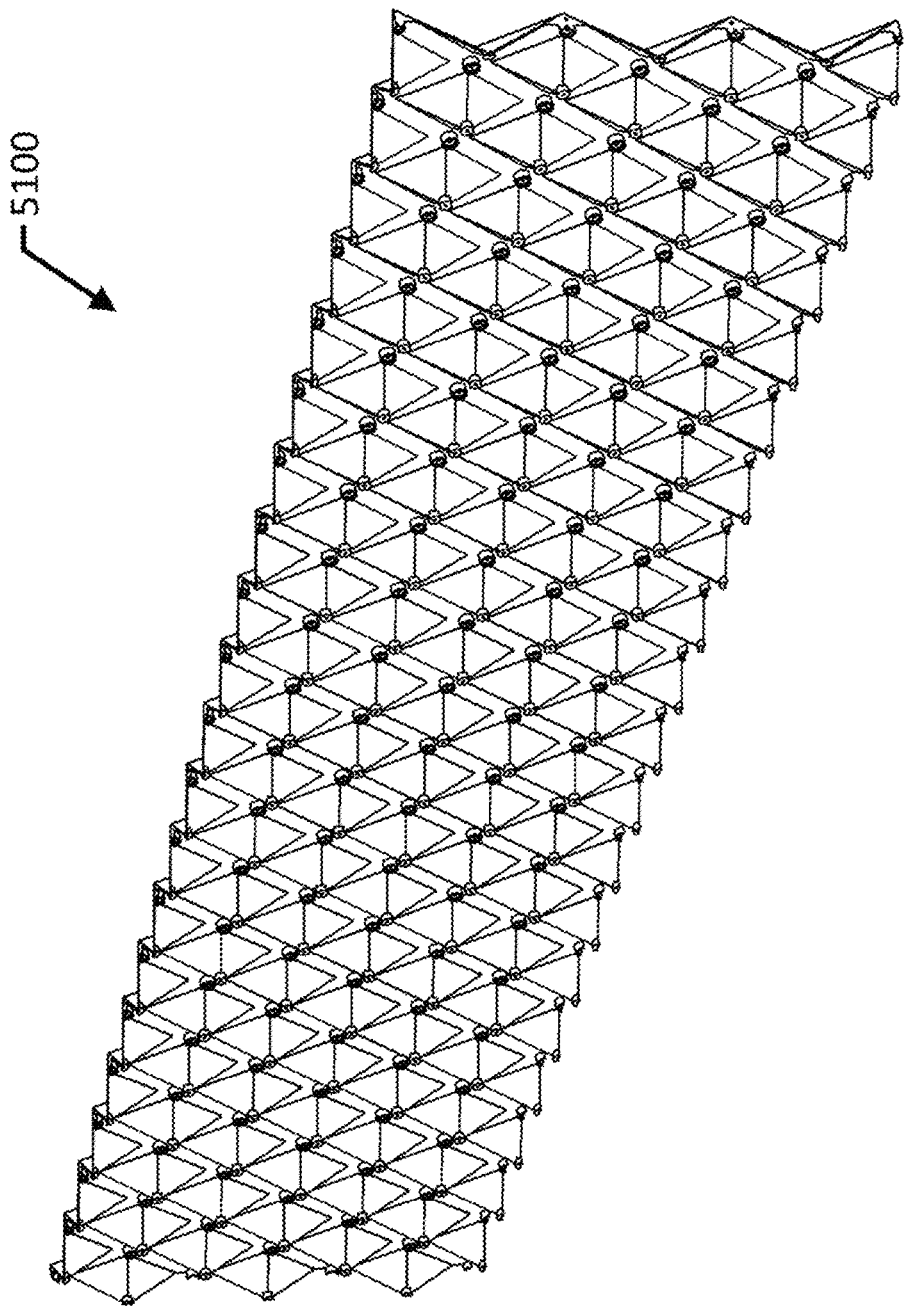

FIG. 167 shows the backside of an injection molded pyramid wall section.

Figure 168:
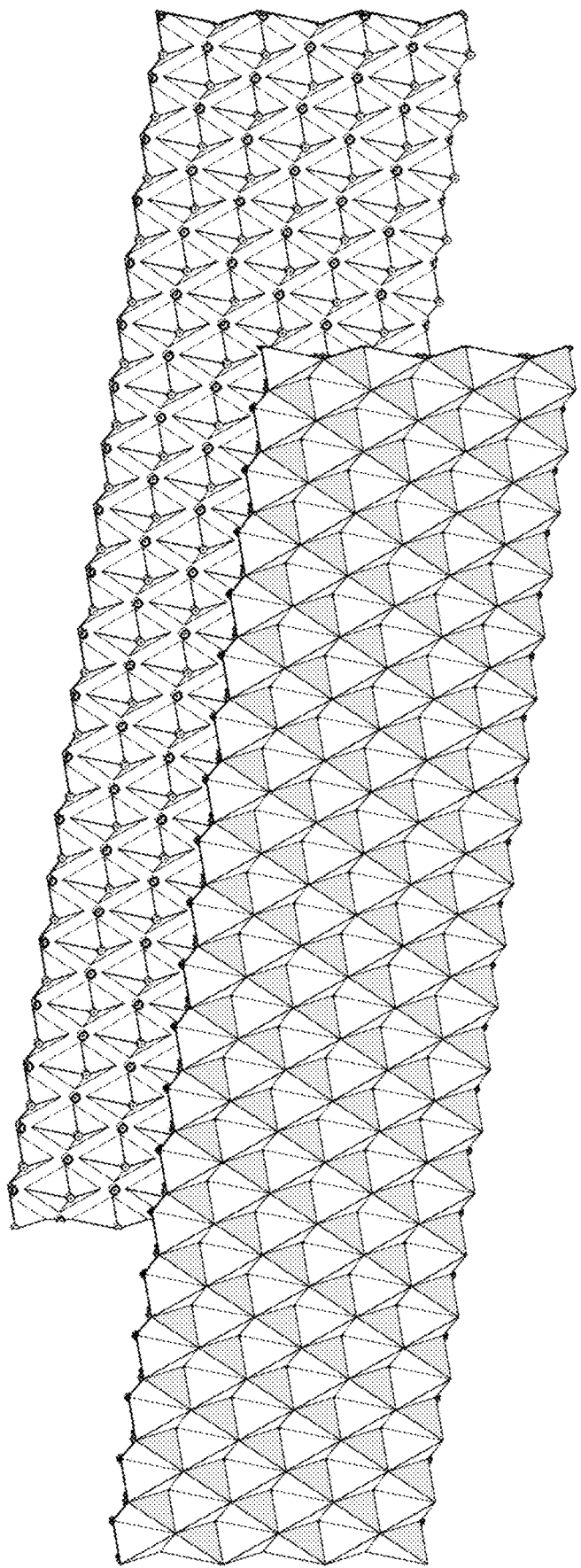

FIG. 168 shows two pyramid wall panel sections back to back.

Figure 169:
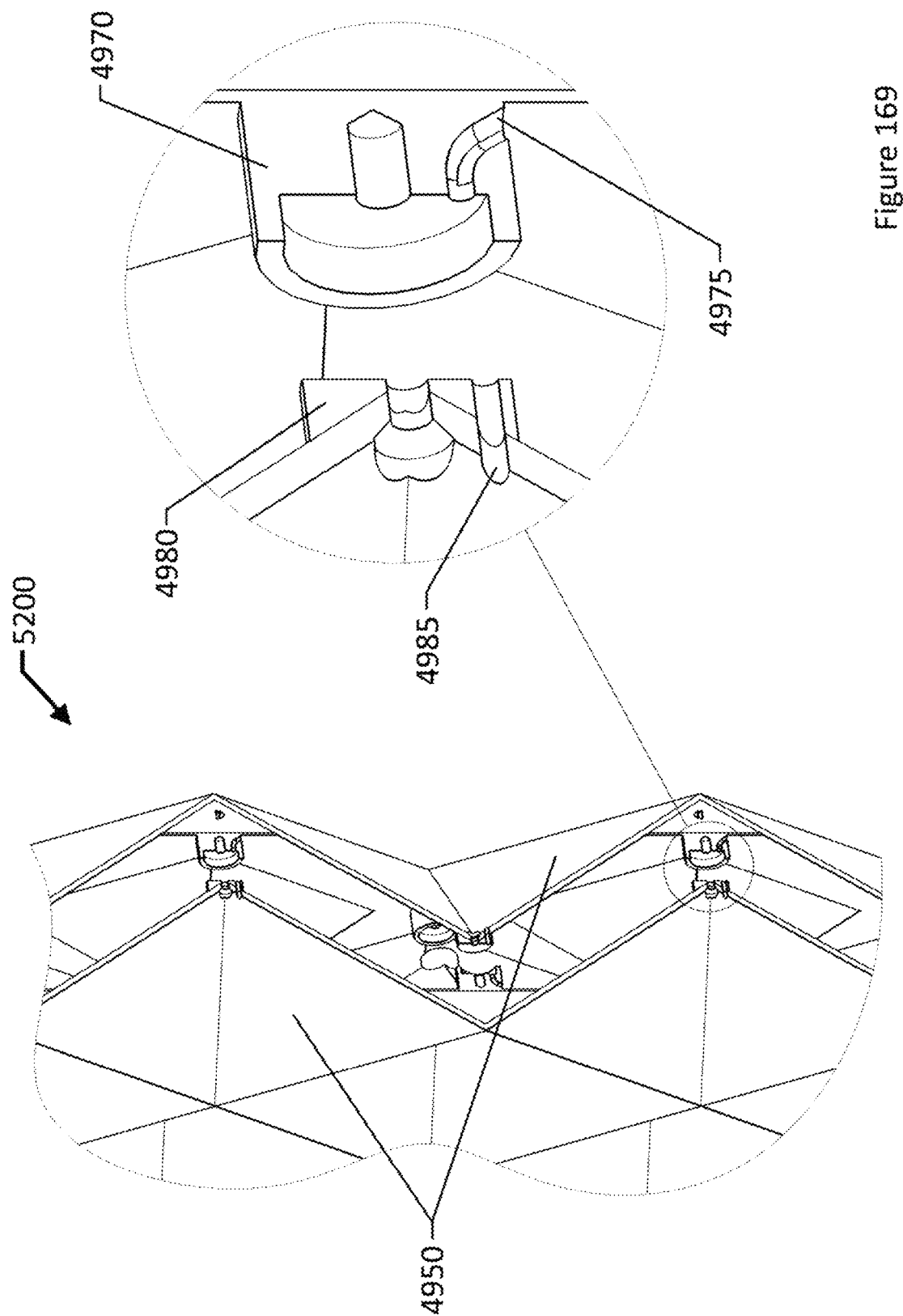

FIG. 169 shows a detail of the connecting features between the panels.

Figure 170:
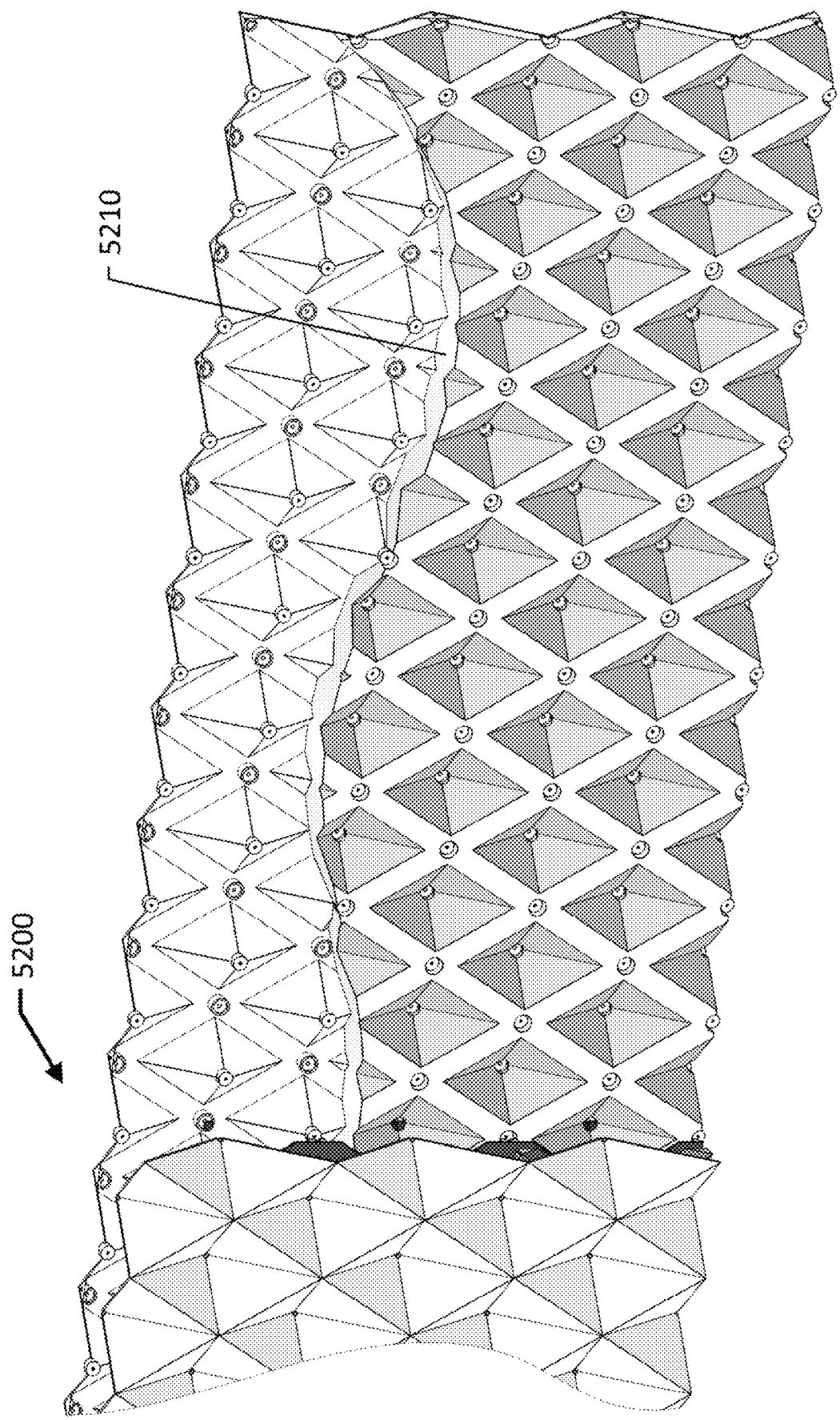

FIG. 170 shows a breakaway section of the sandwiched walls with foam inserted between them.

Figure 171:
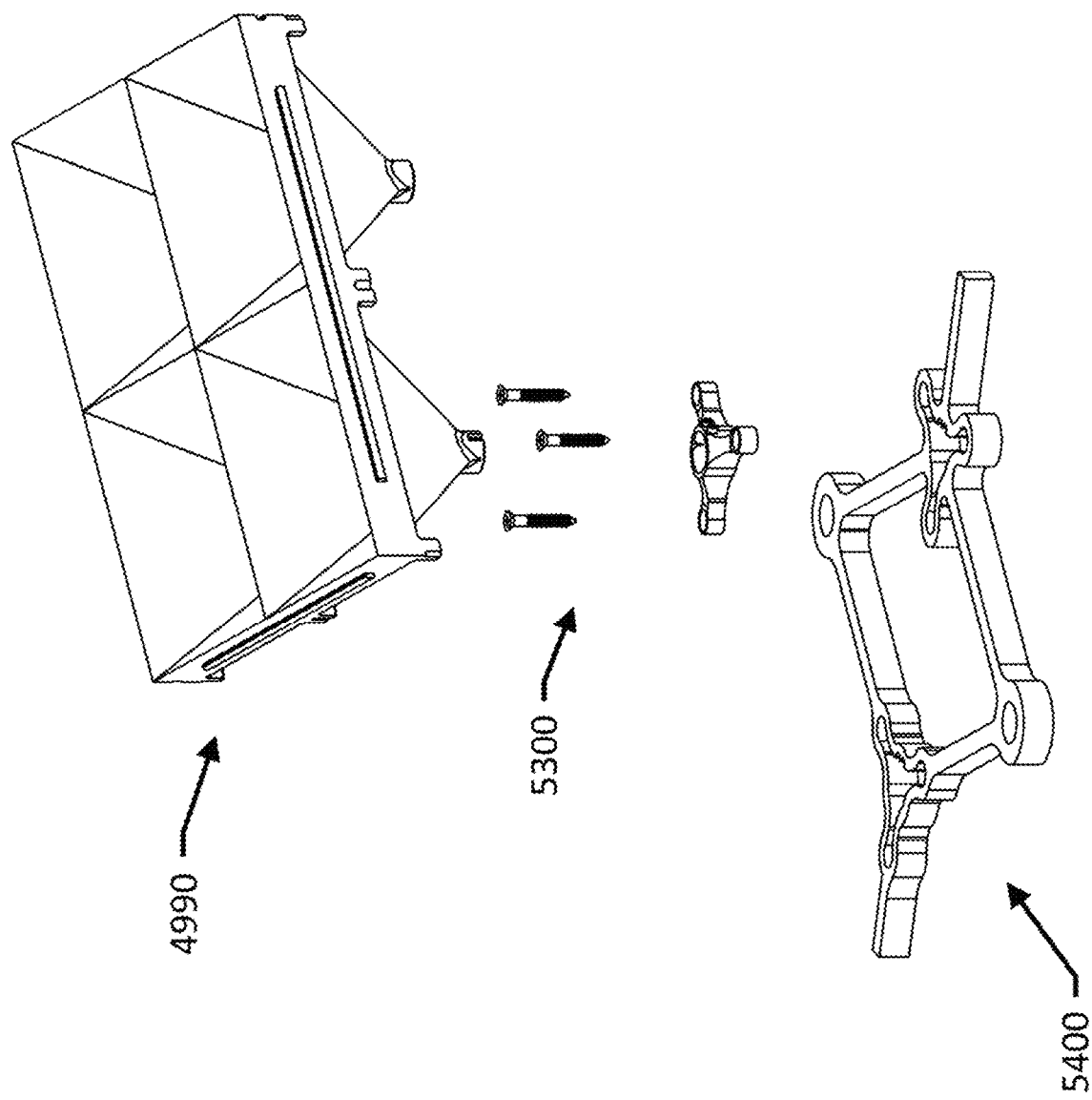

FIG. 171 shows a single, diamond Pyramid Wall section above a Wall Socket, mounting screws and an Aligning Template.

Figure 172:
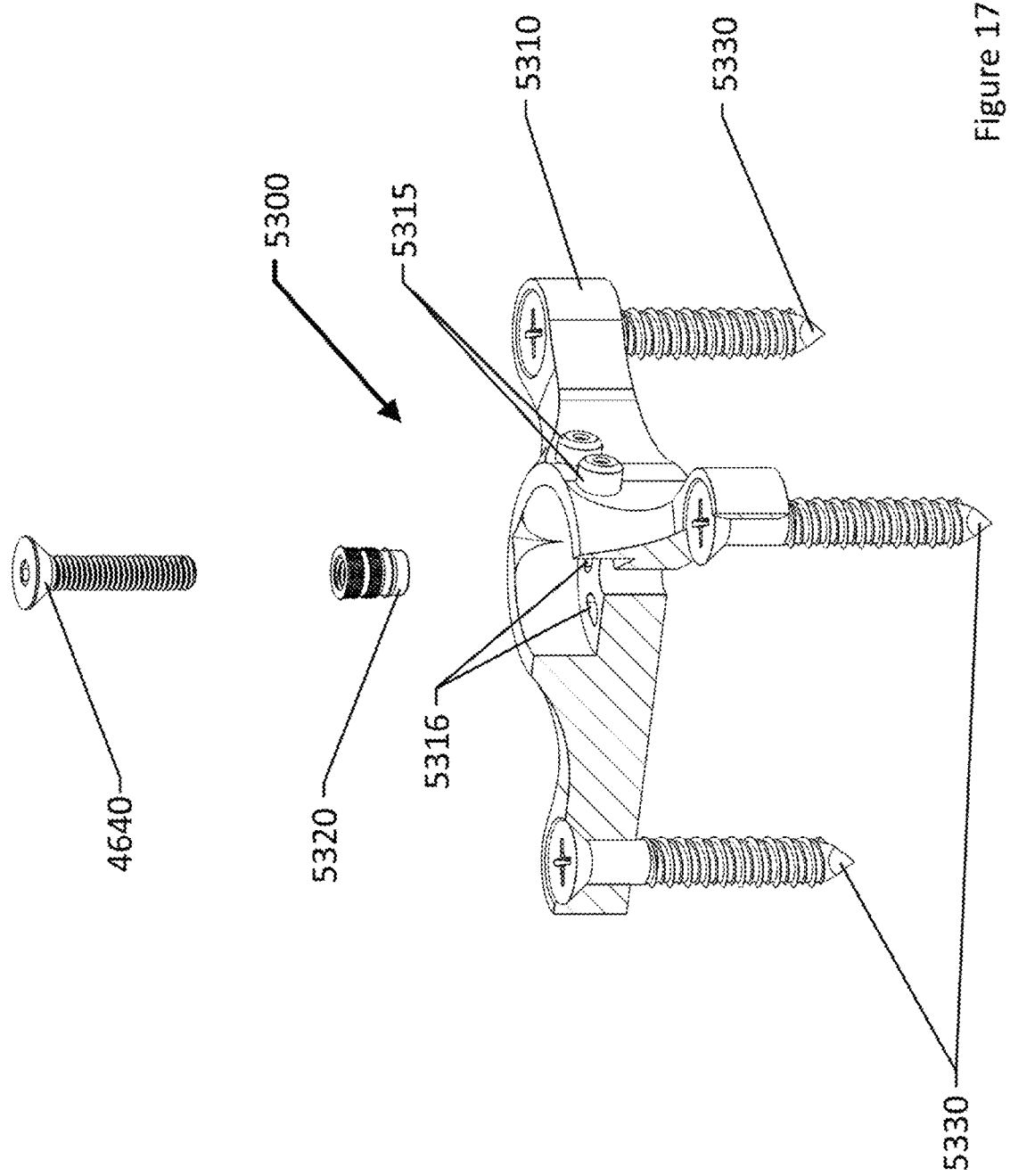

FIG. 172 shows a close-up of an exploded view of a sectioned Wall Socket assembly.

Figure 173:
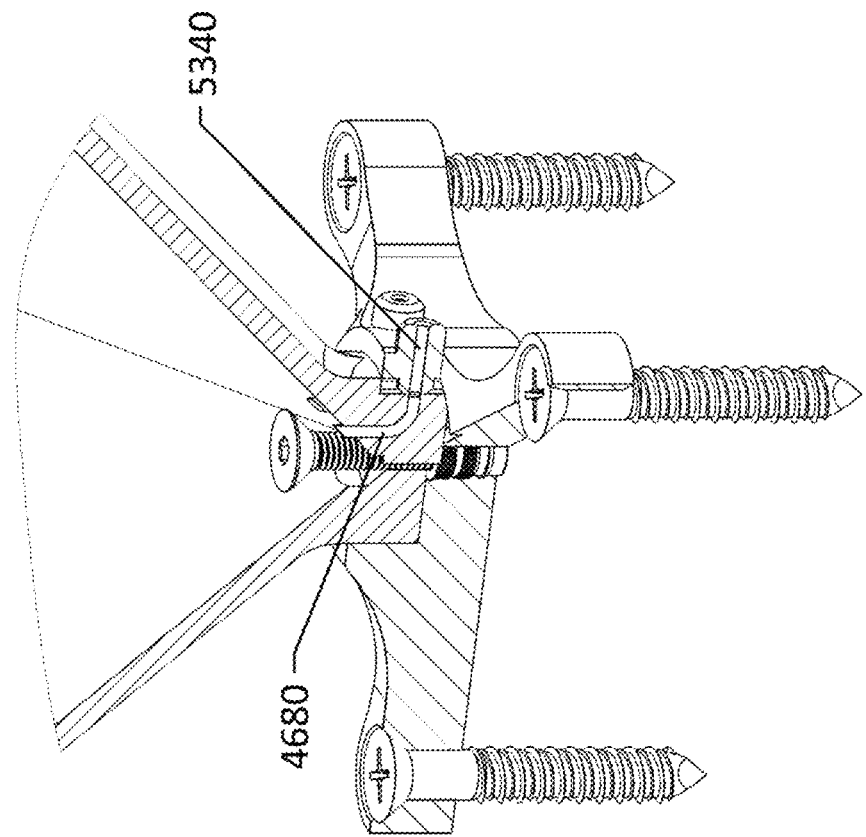

FIG. 173 shows a close-up of a sectioned Wall Socket assembly aligned with a Pyramid Wall.

Figure 174:
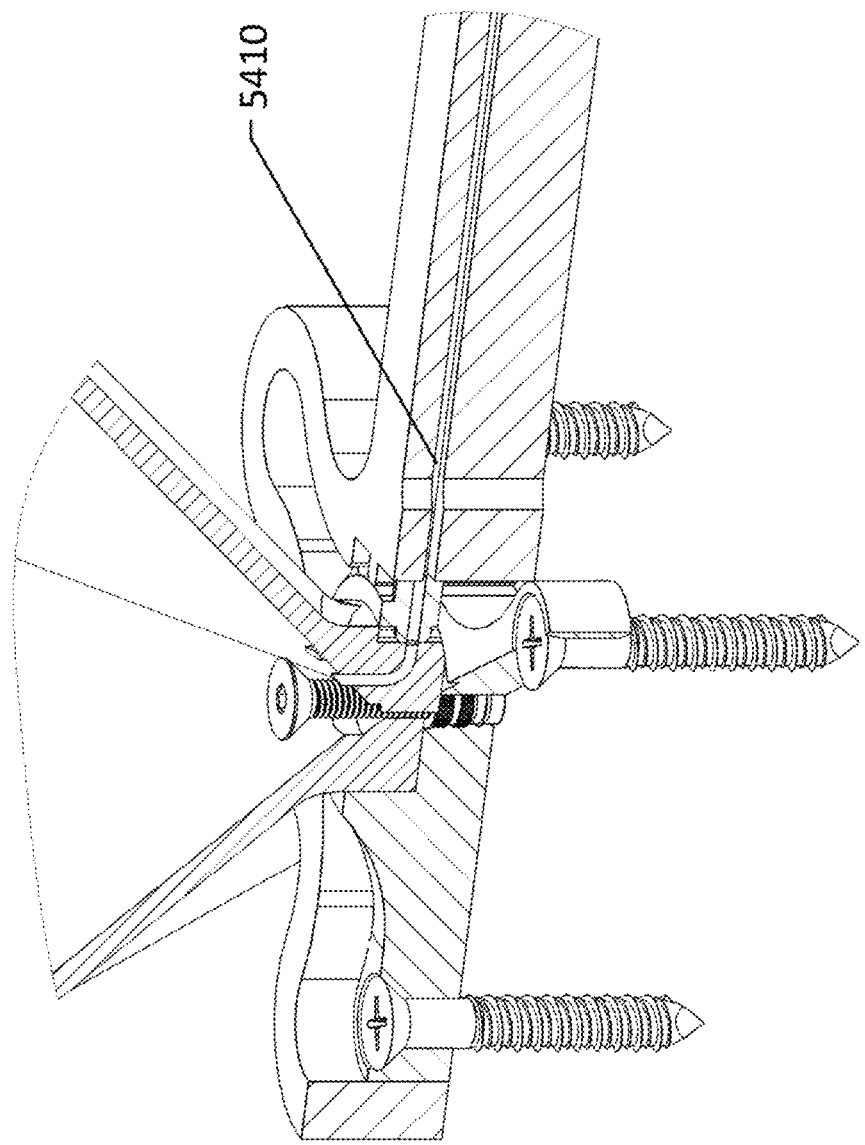

FIG. 174 adds a sectioned Aligning Template.

Figure 175:
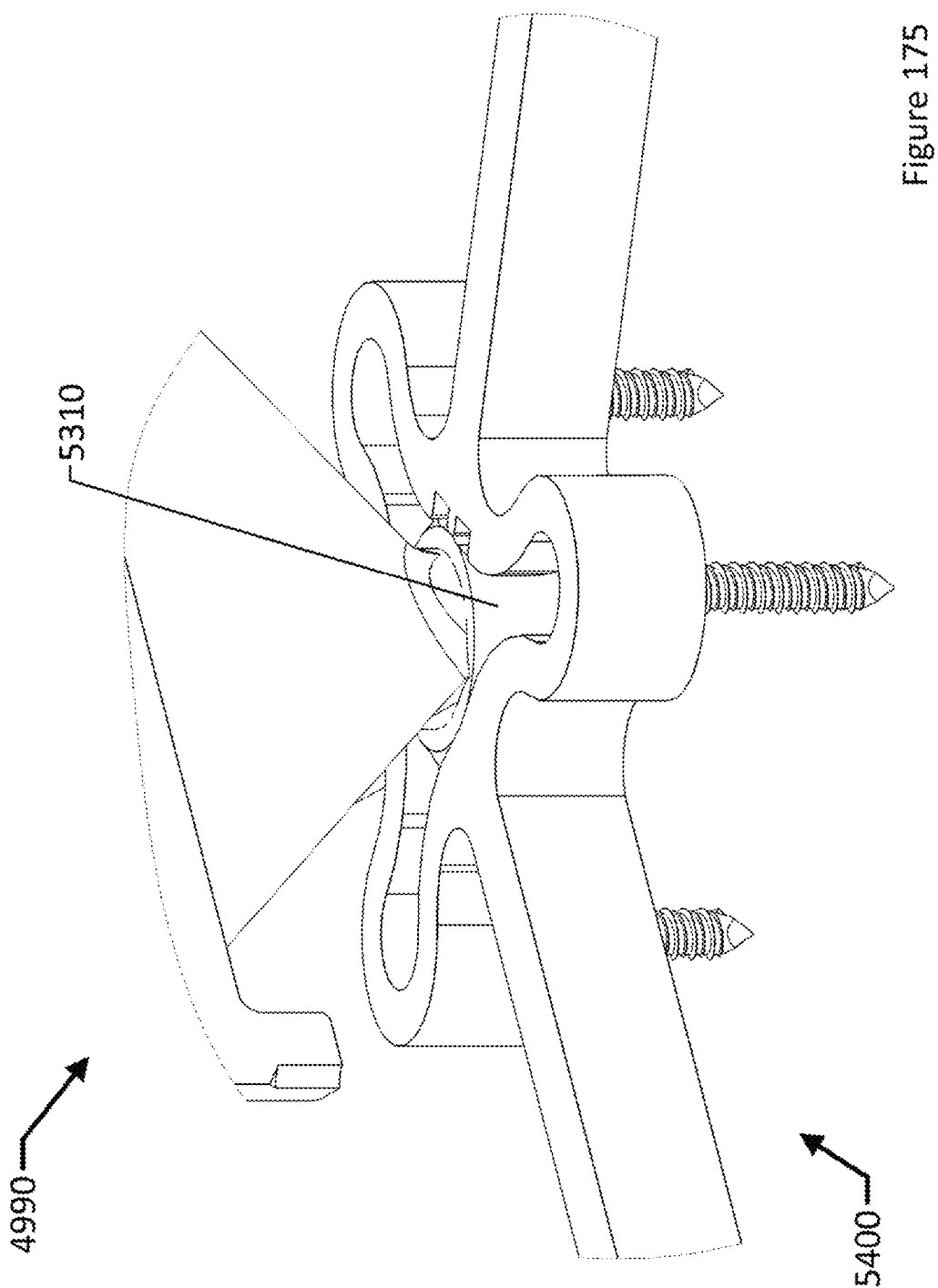

FIG. 175 removes the sectioning from the close-up.

Figure 176:
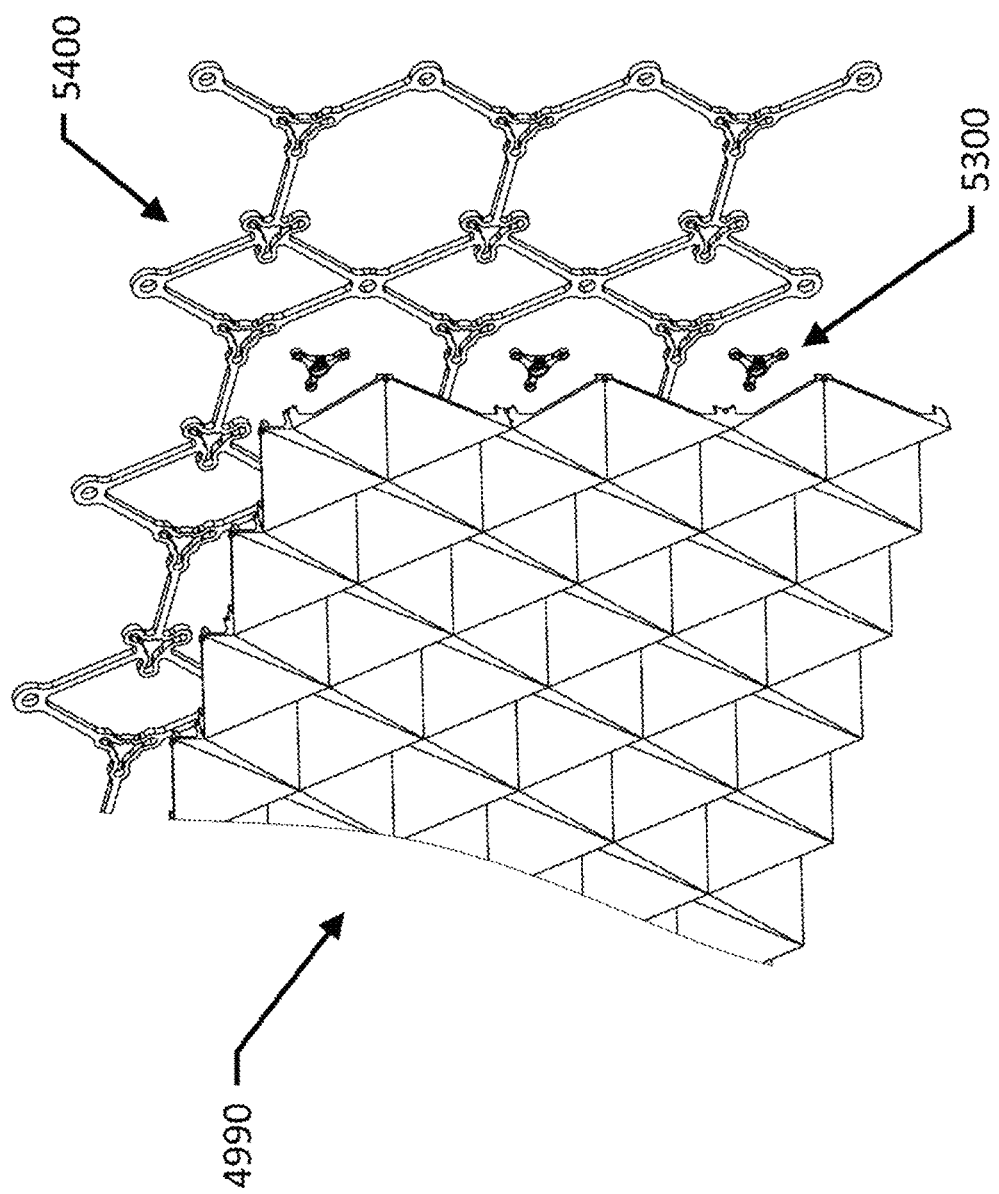

FIG. 176 shows a cropped, exploded view of a full Pyramid Wall section, Wall Sockets and Aligning Template.

Figure 177:
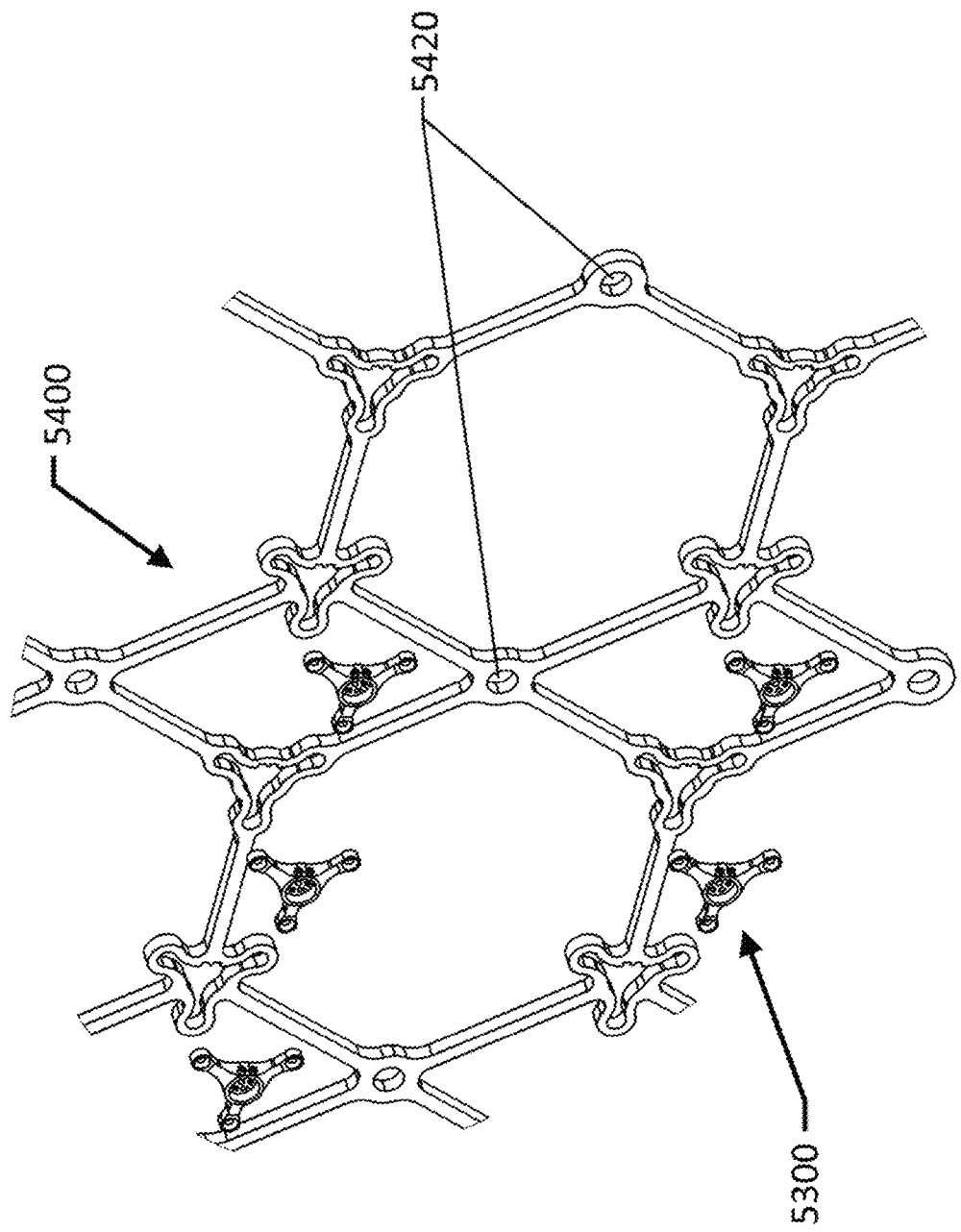

FIG. 177 removes the Pyramid Wall section and shows a close-up.

Figure 178:
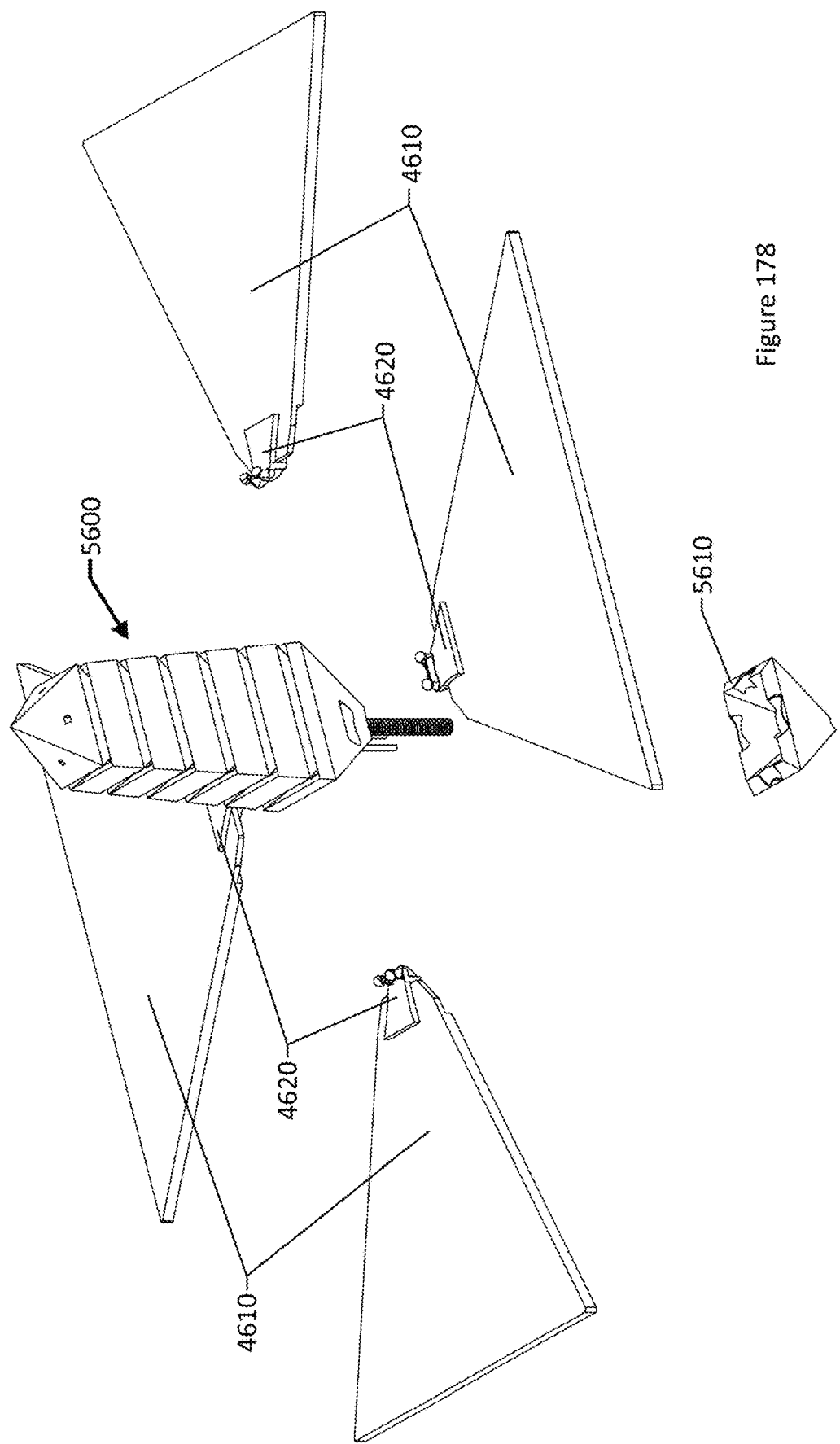

FIG. 178 shows an exploded view of Cross Panels with post for stacking "Flower" panels or "Petals" into a cell.

Figure 179:
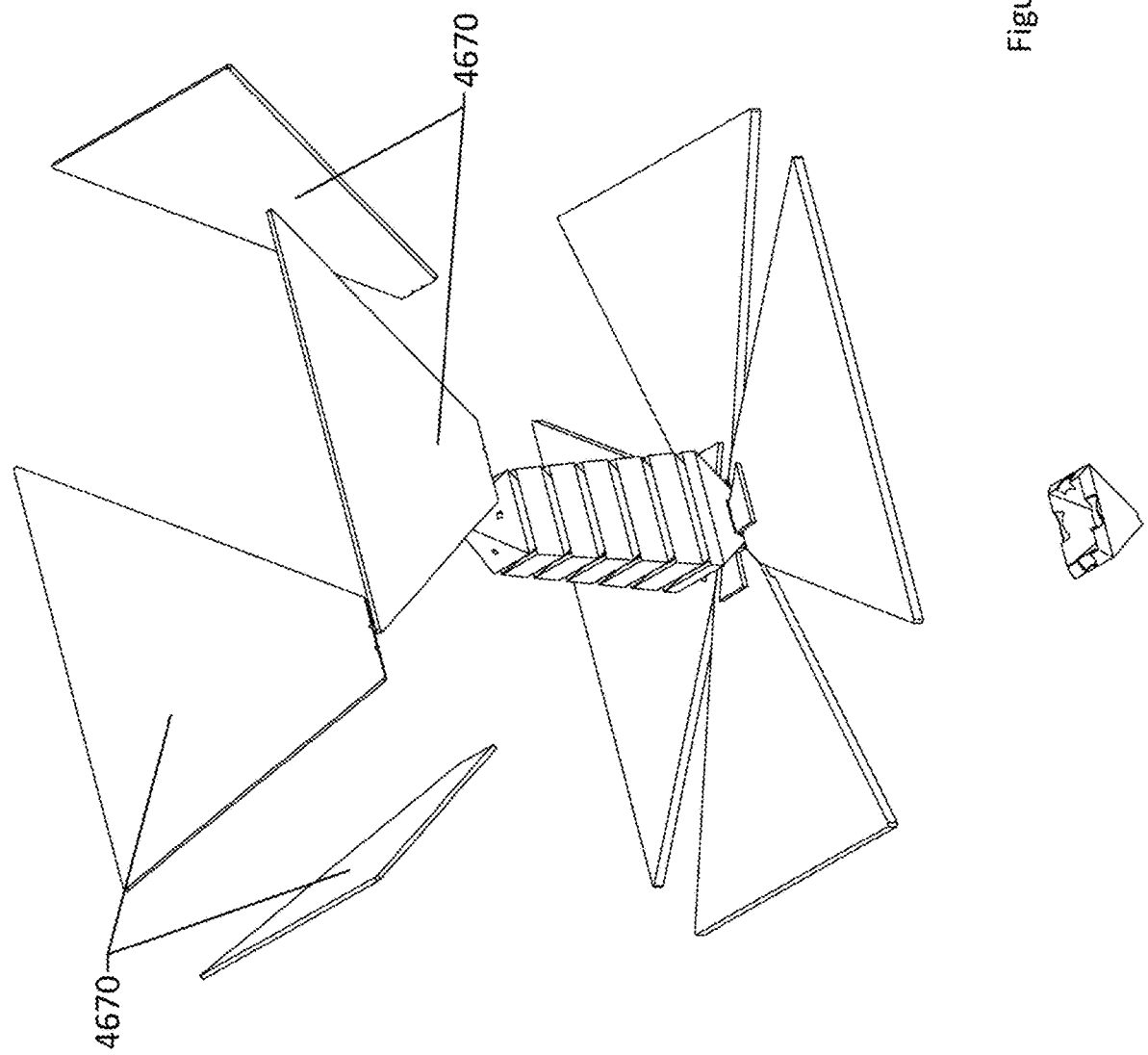

FIG. 179 adds a second level of panels to the assembly.

Figure 180:
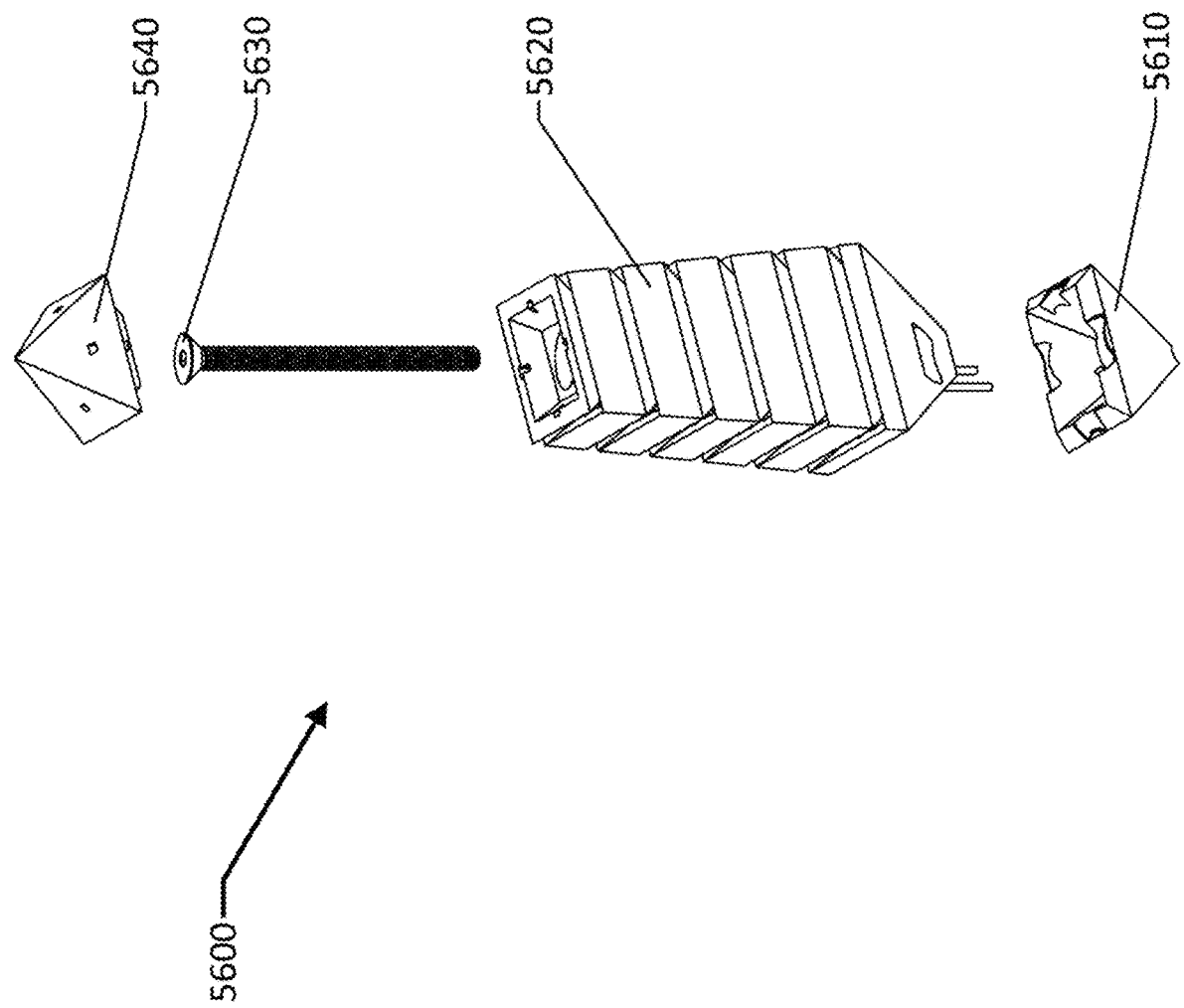

FIG. 180 shows an exploded view of the Flower Post.

Figure 181:
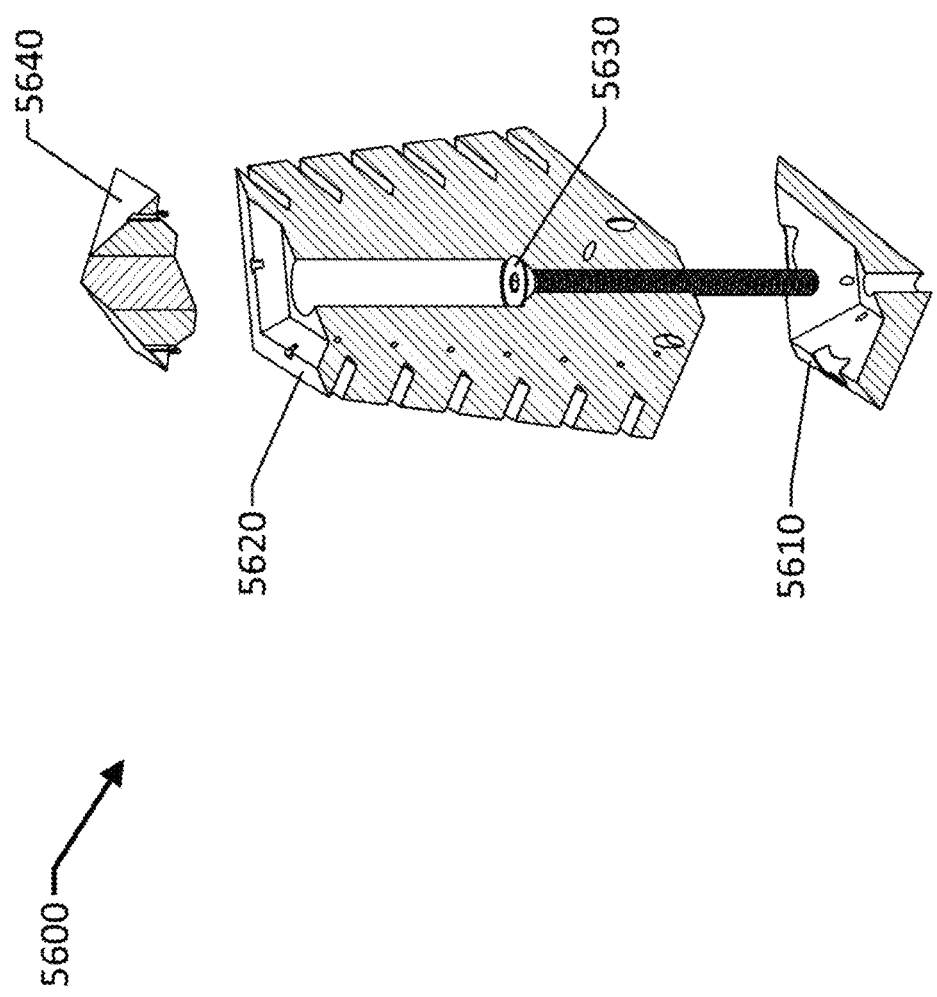

FIG. 181 shows a section view of the Flower Post.

Figure 182:
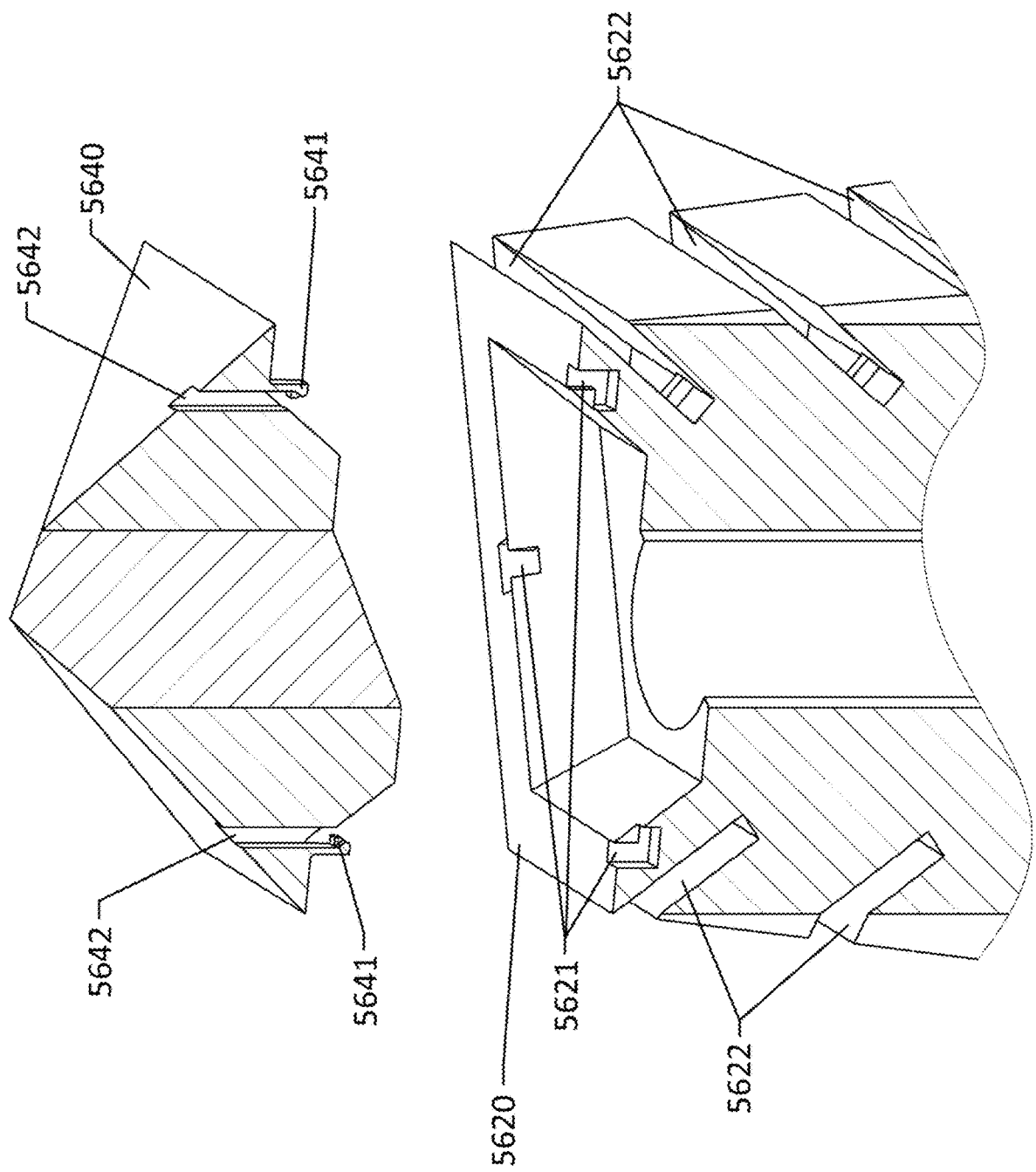

FIG. 182 details a section view of the Flower Post Cap, its snap fits and the snap fit sockets in the post.

Figure 183:
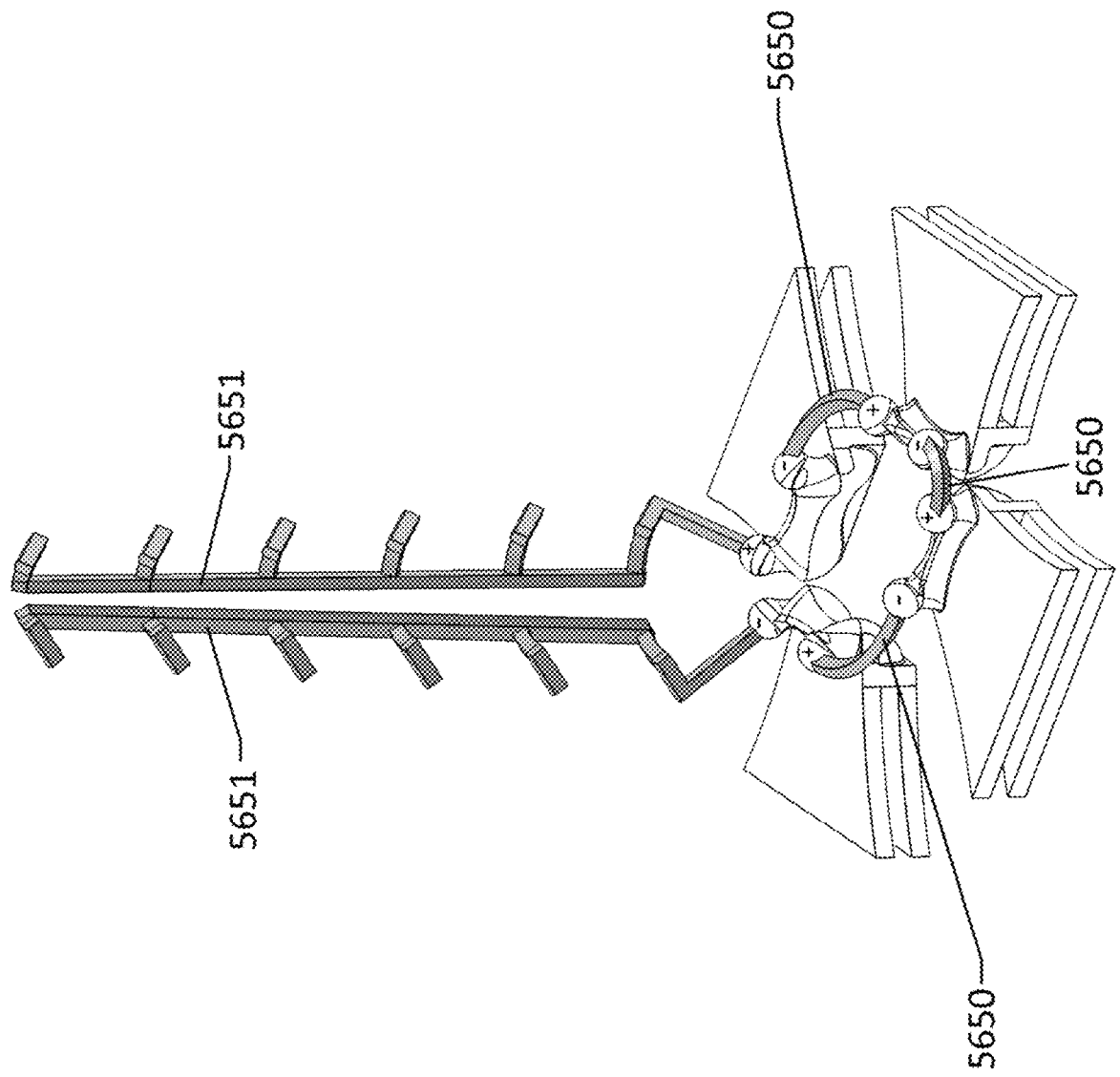

FIG. 183 shows the first level of internal wiring in the Flower Post as it connects to the hinges, as well as the serial connection to the other levels of panels.

Figure 184:
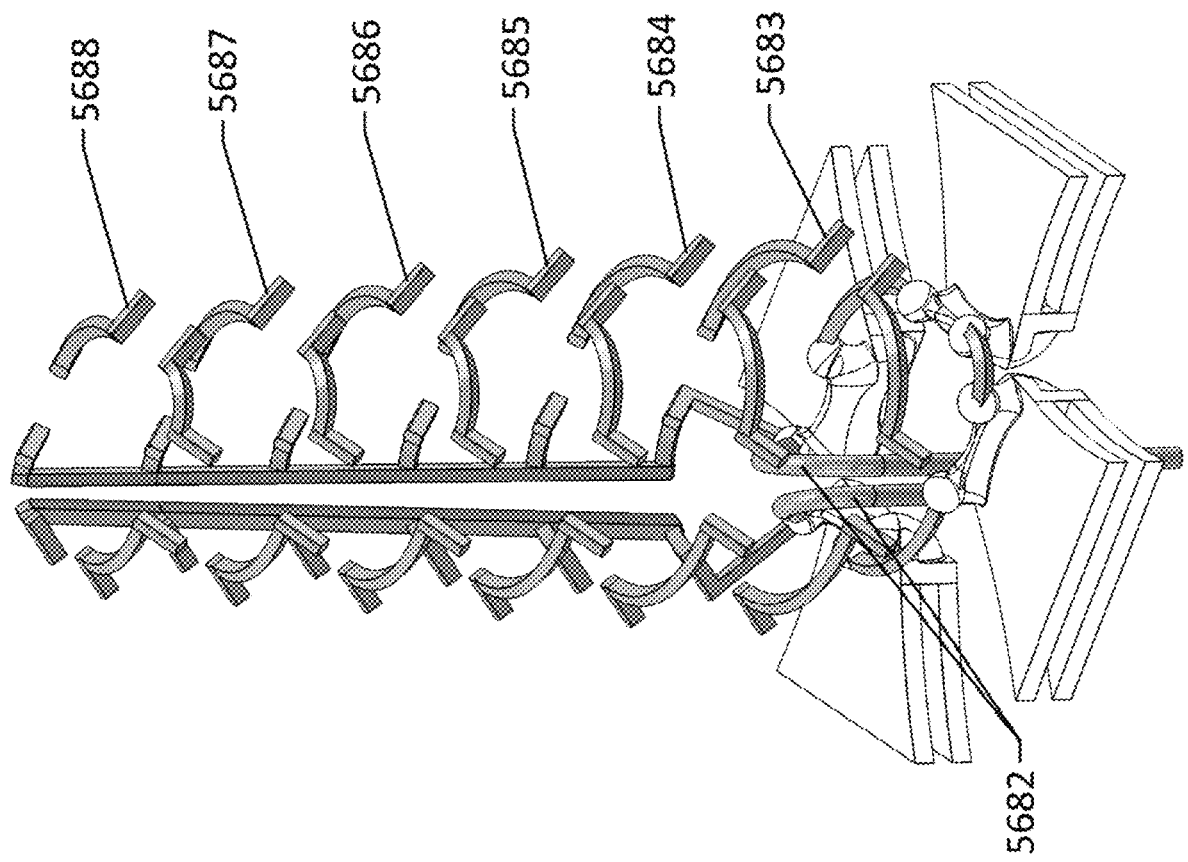

FIG. 184 shows internal wiring in the Flower Post (with the post's body removed).

Figure 185:
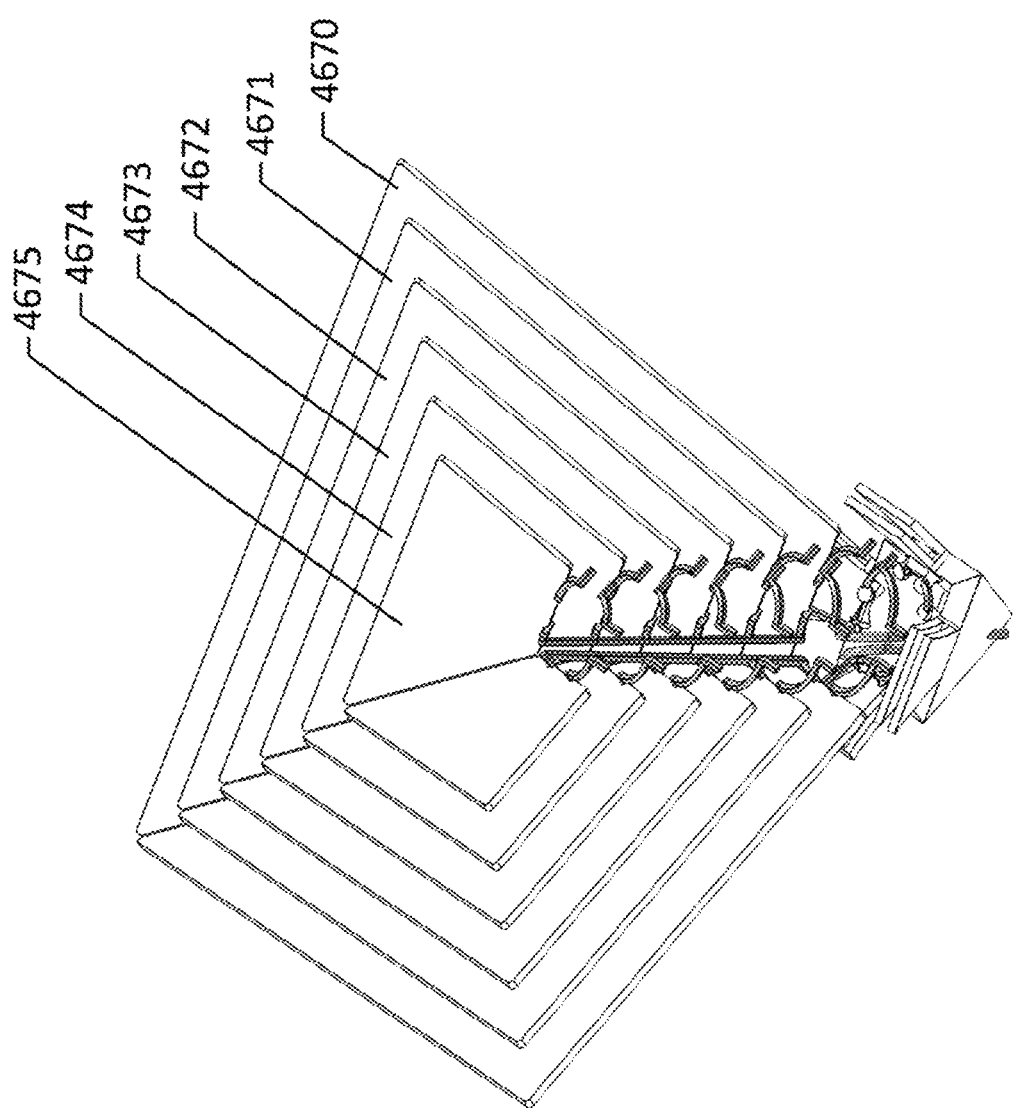

FIG. 185 shows panels connected to the wiring, with the post's body and panels in the foreground removed for clarity.

Figure 186:
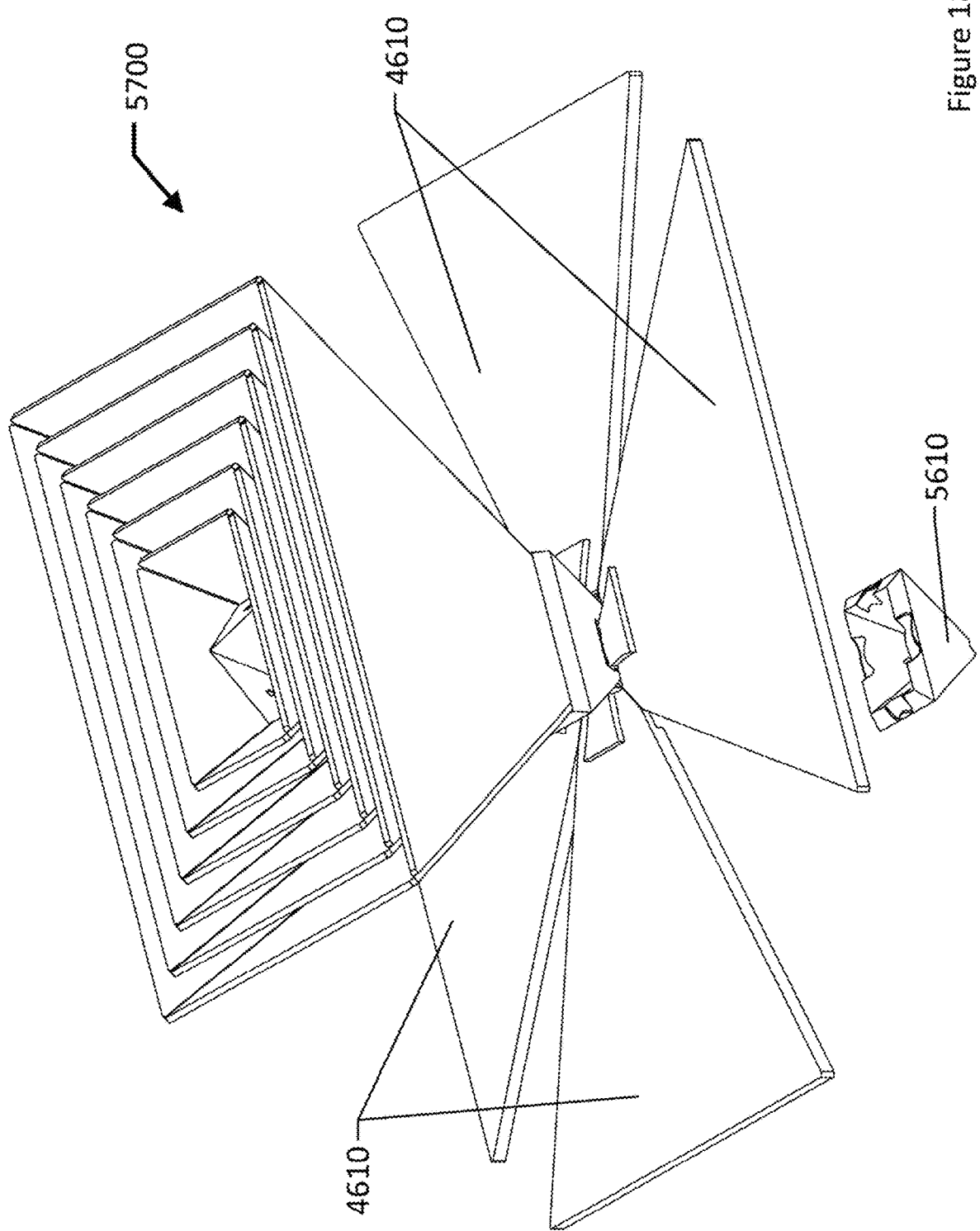

FIG. 186 shows a completed, stacked 'Flower' assembly, with the Cross Panels in the flattened position.

Figure 187:
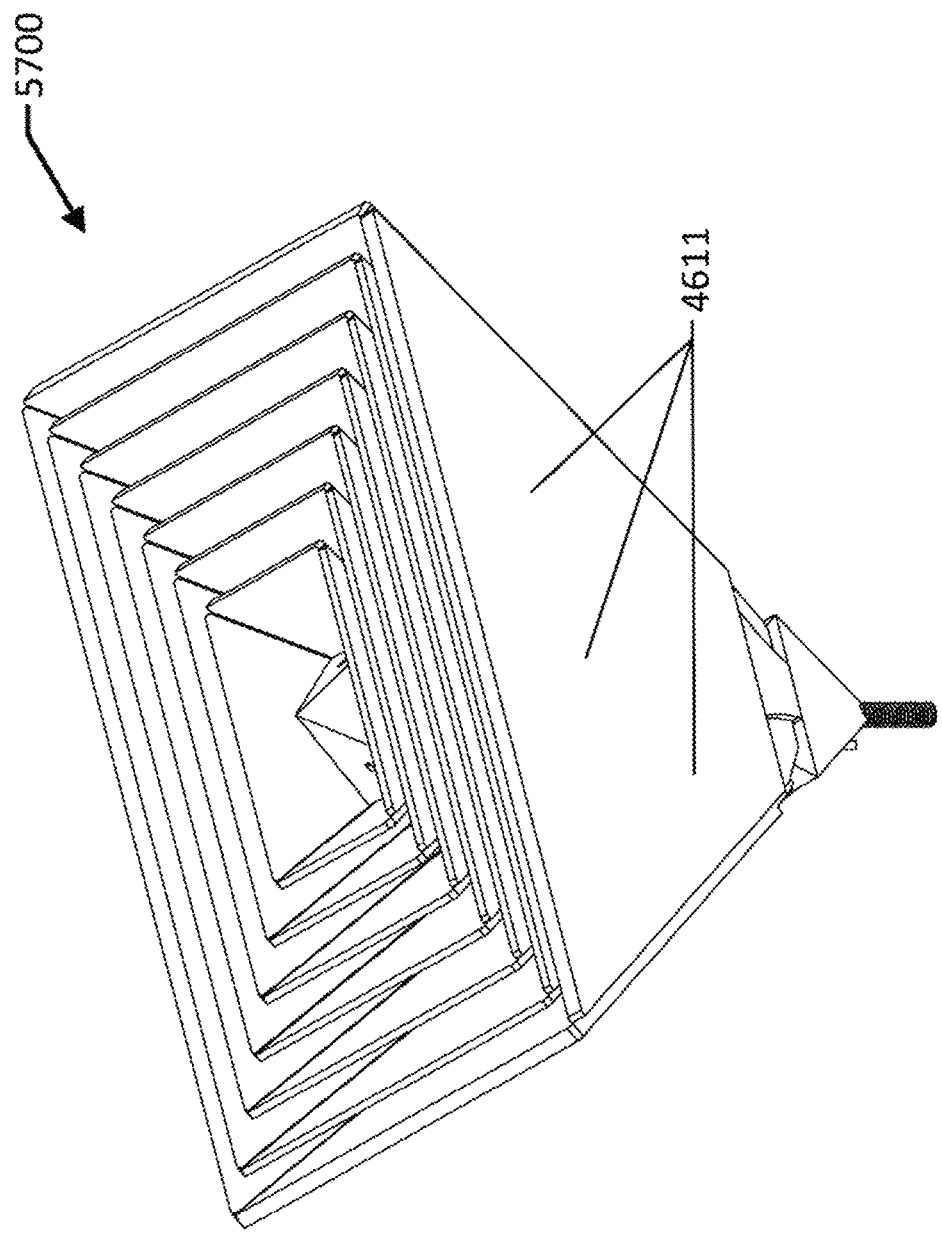

FIG. 187 shows the Cross Panels folded into a pyramid shape, making a complete Flower Panel Cell.

Figure 188:
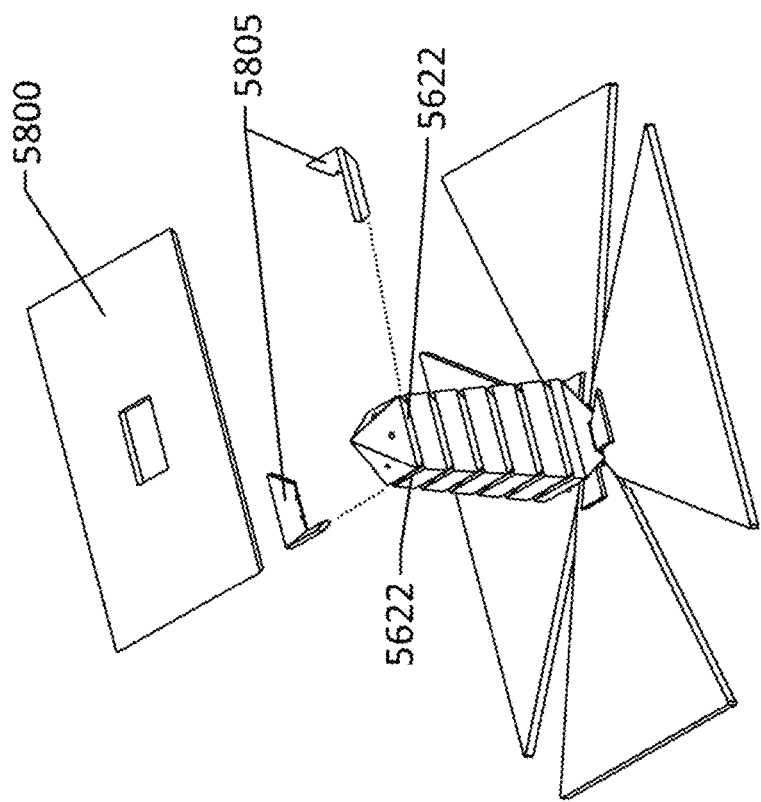

FIG. 188 shows an alternate stacking setup with a horizontal panel and Post connections.

Figure 189:
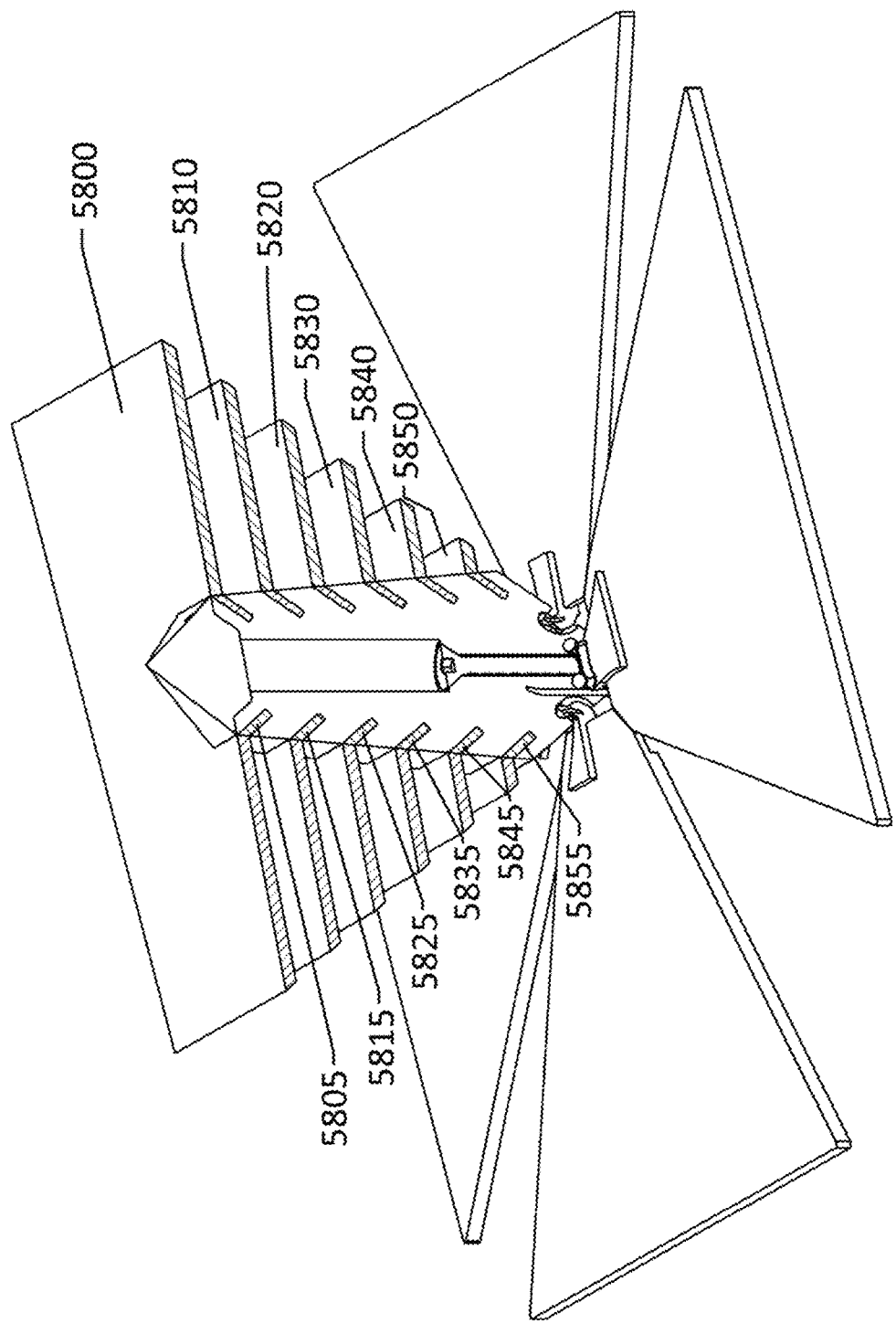

FIG. 189 shows a section view of a completed stacking of horizontal panels, with the Cross Panels in the flattened position.

Figure 190:
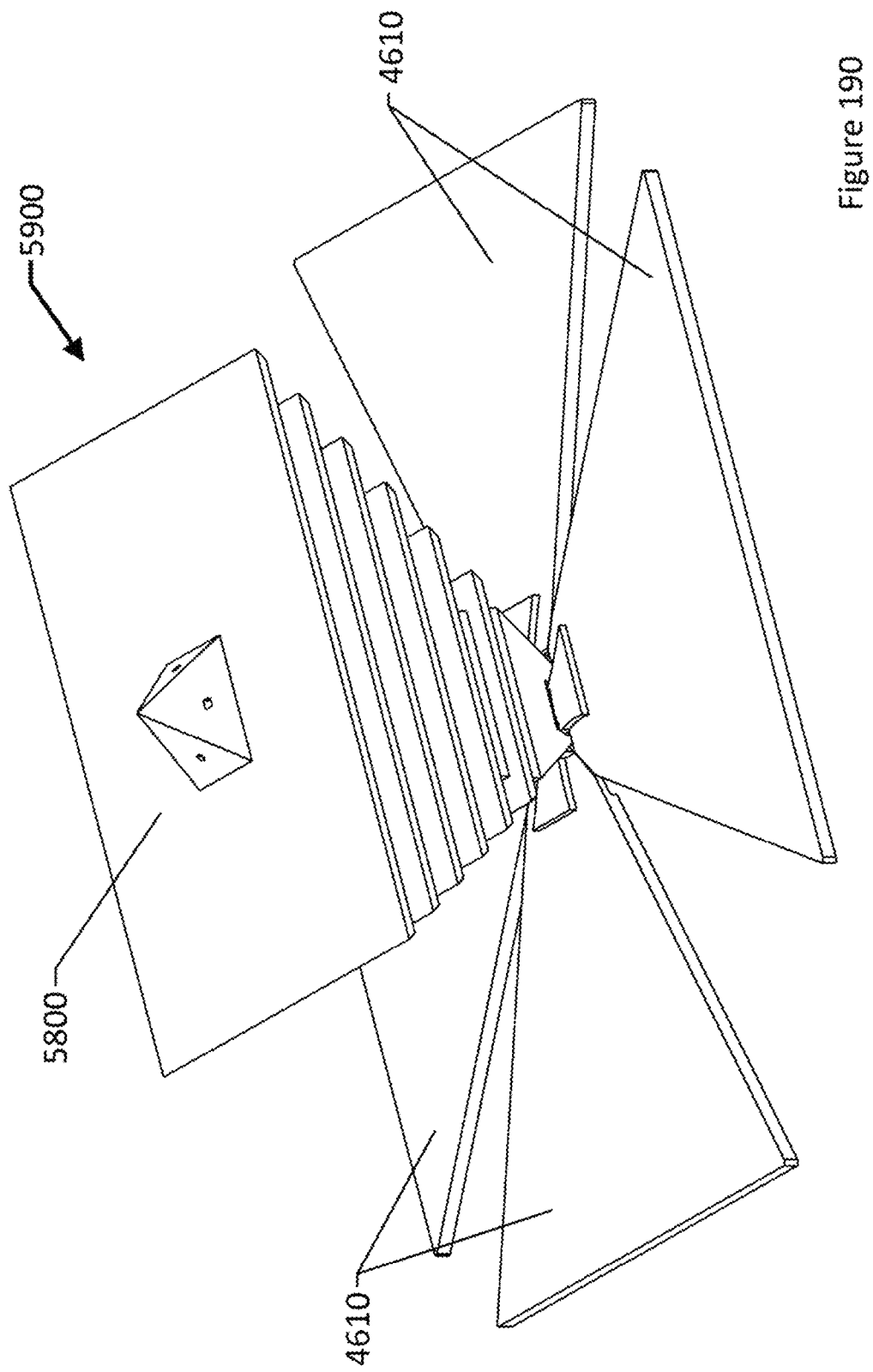

FIG. 190 removes the section view of the stacked panels.

Figure 191:
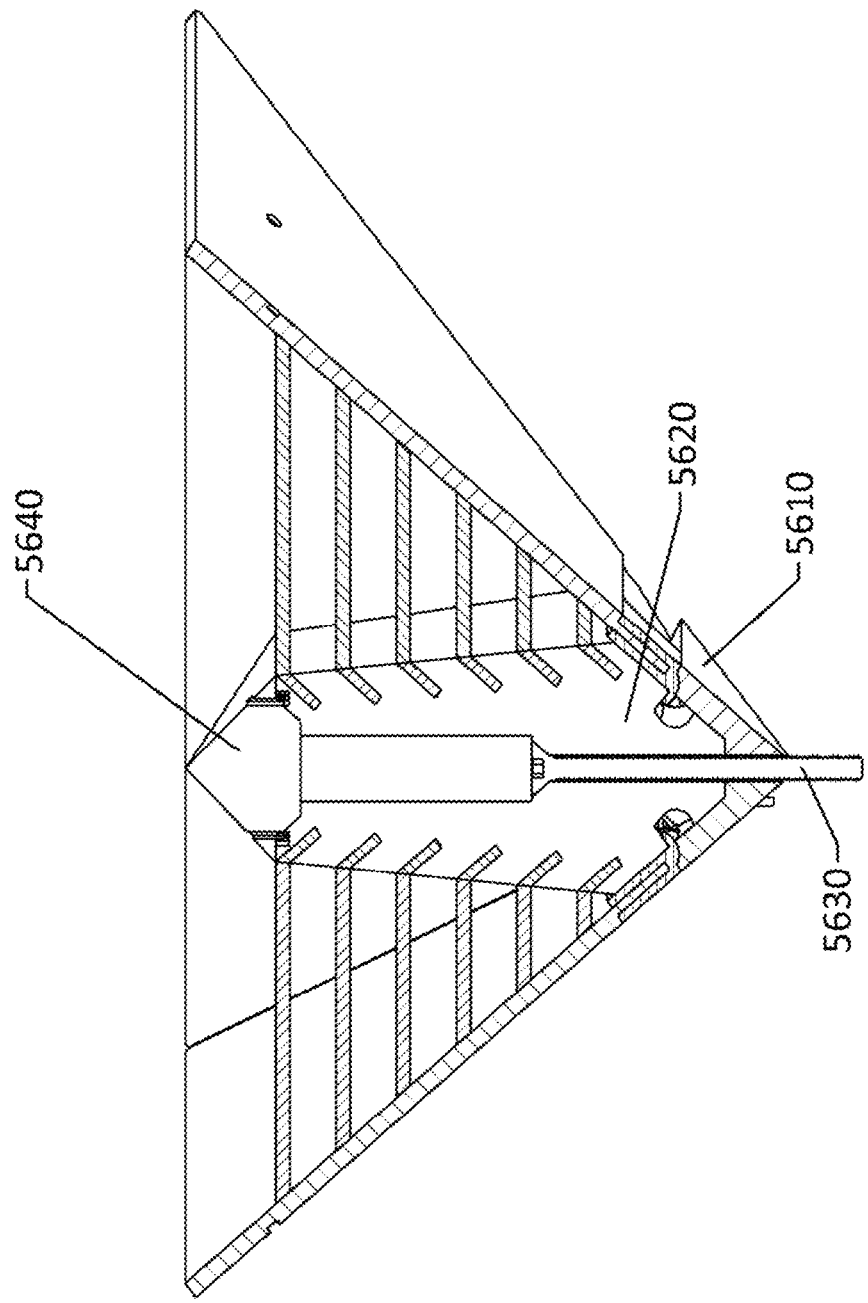

FIG. 191 shows an alternate section view of the stacked, horizontal panels and the cross panels folded up into a pyramid shape.

Figure 192:
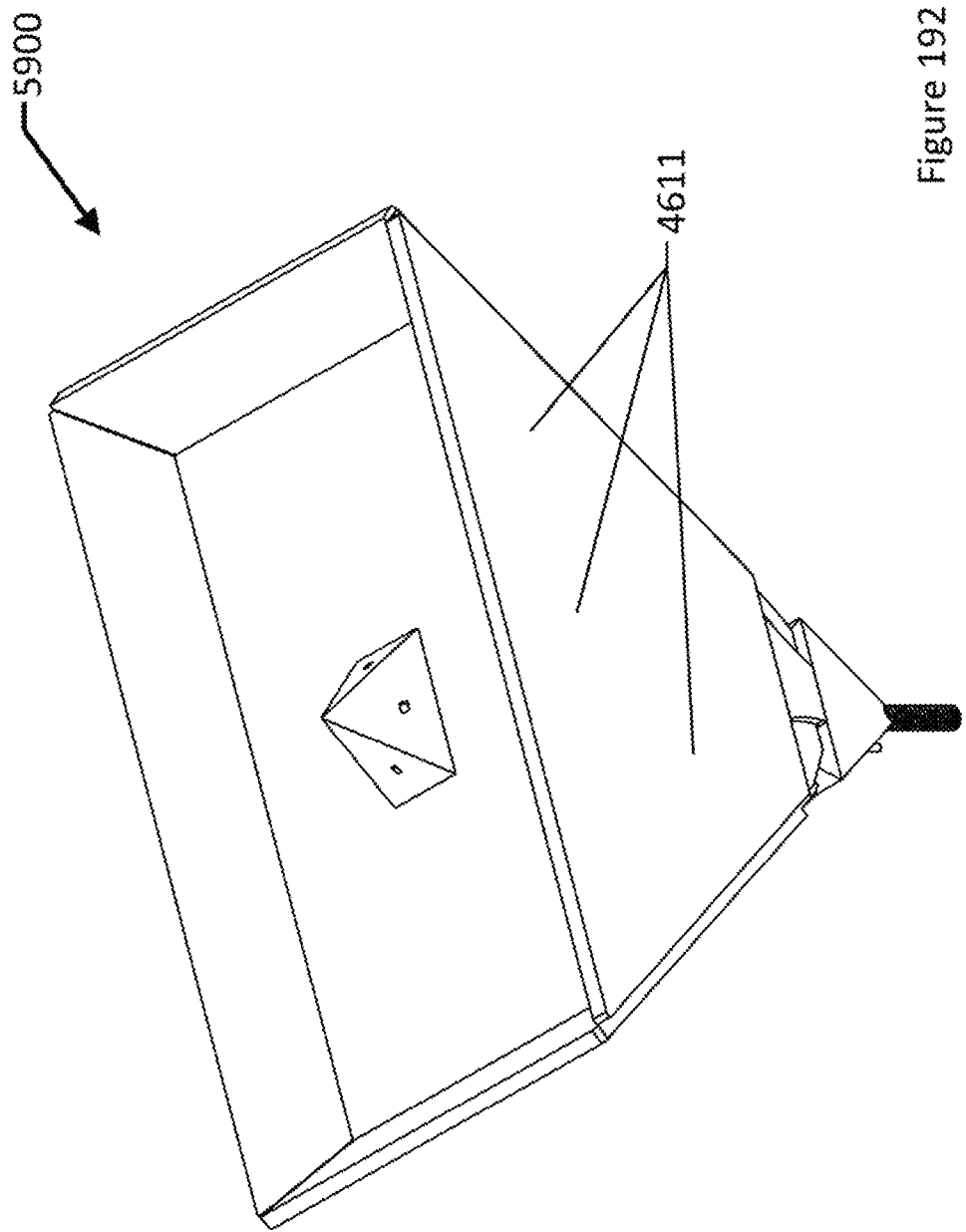

FIG. 192 shows a completely assembled and folded Horizontal Flower Panel Cell.

Figure 193:
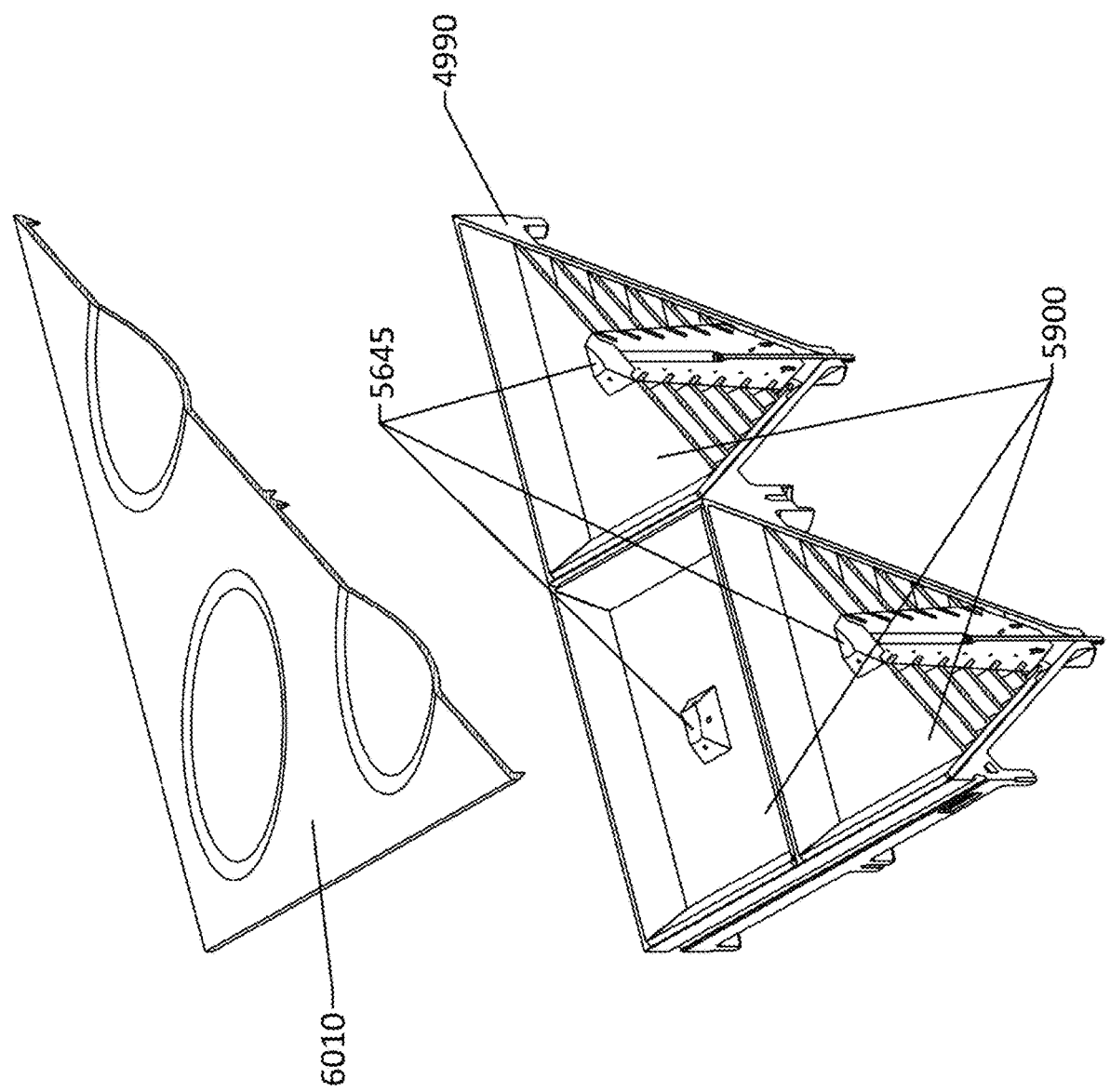

FIG. 193 shows a section view of a concave, transparent cover over a panel section containing a horizontal flower petal assembly.

Figure 194:
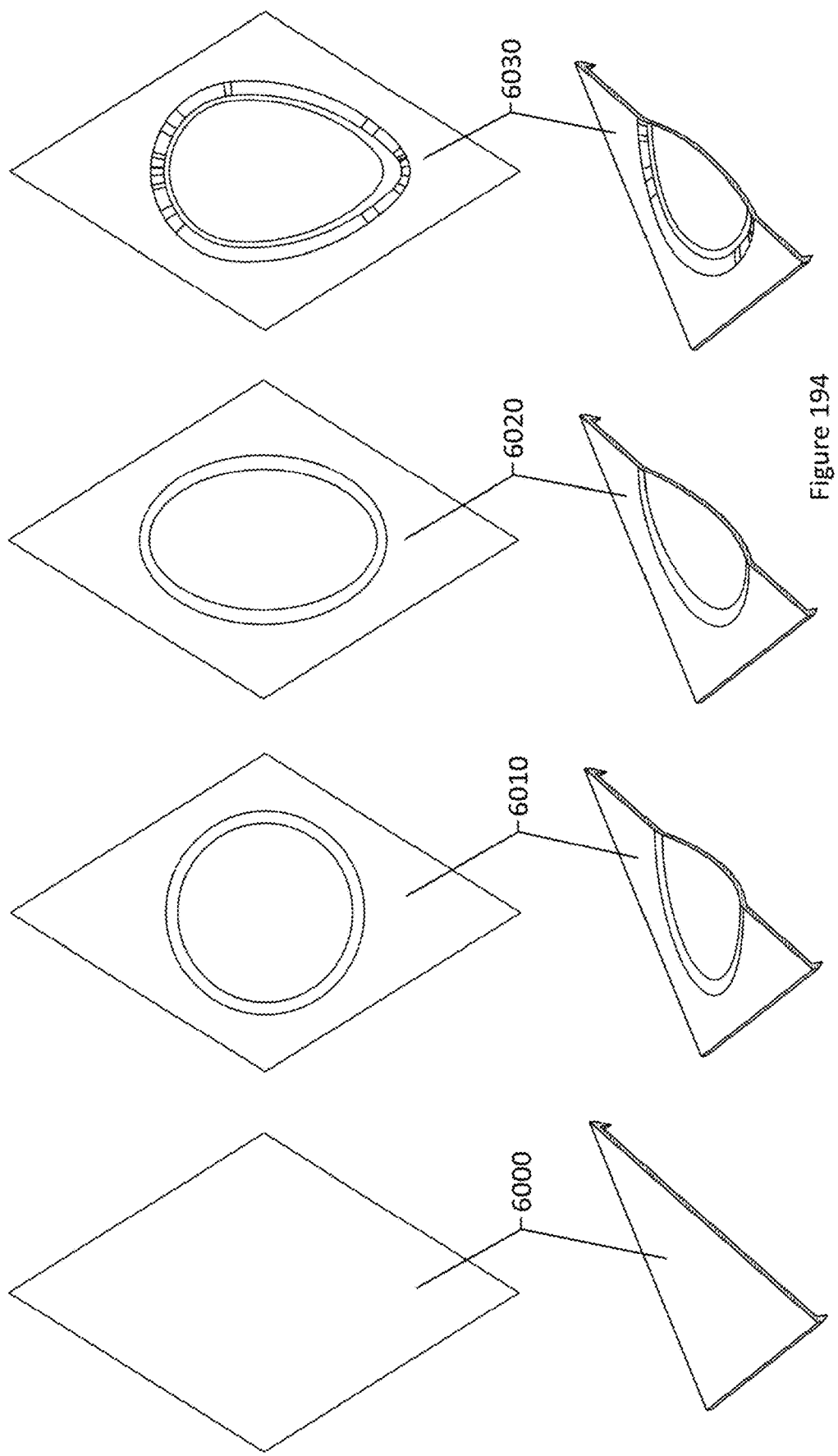

FIG. 194 shows variations of transparent cover geometries including flat, spherically concave, oval concave and teardrop concave.

Figure 195:
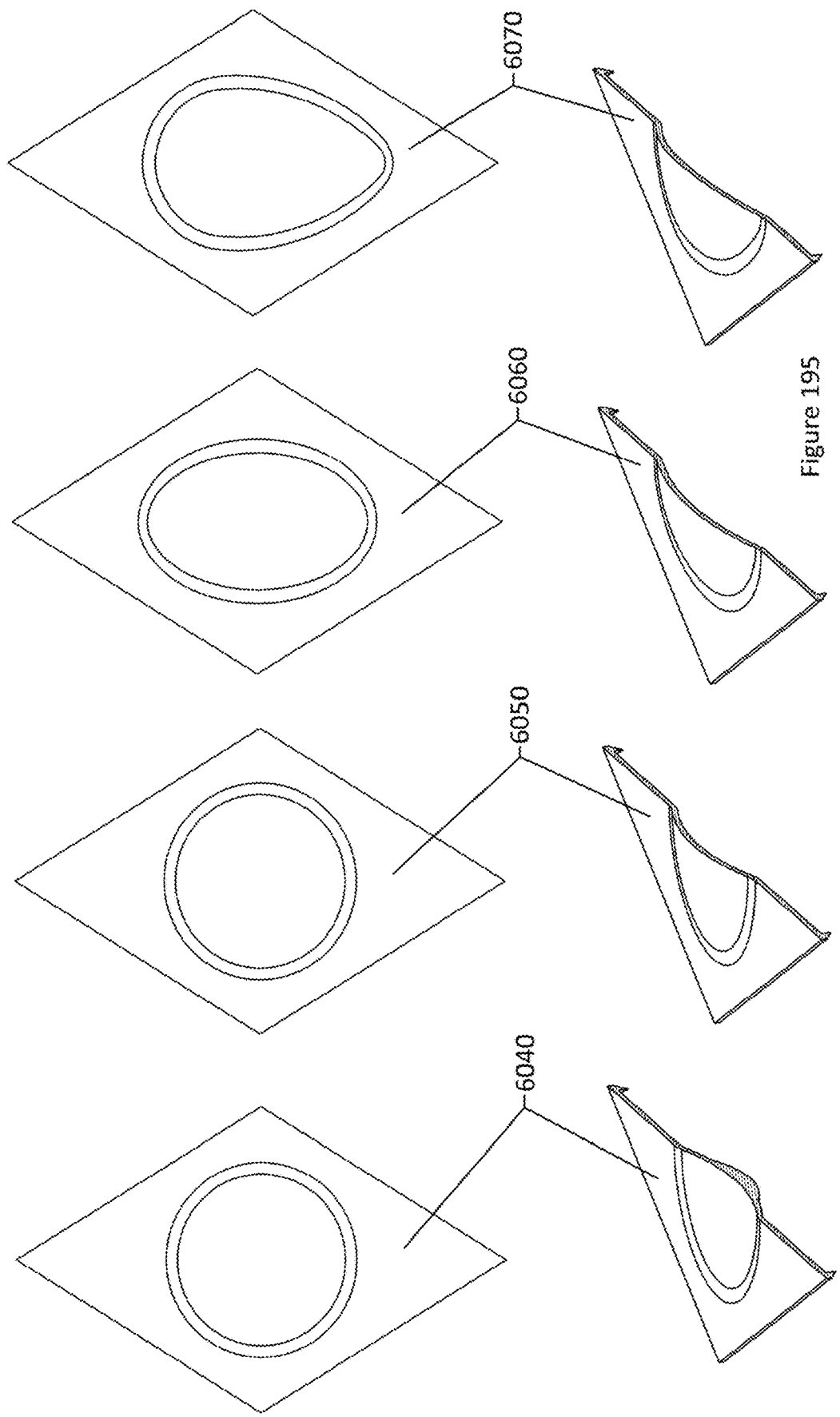

FIG. 195 shows variations of transparent cover geometries including spherically concave with lens, spherically convex, oval convex and teardrop convex.

Figure 196:
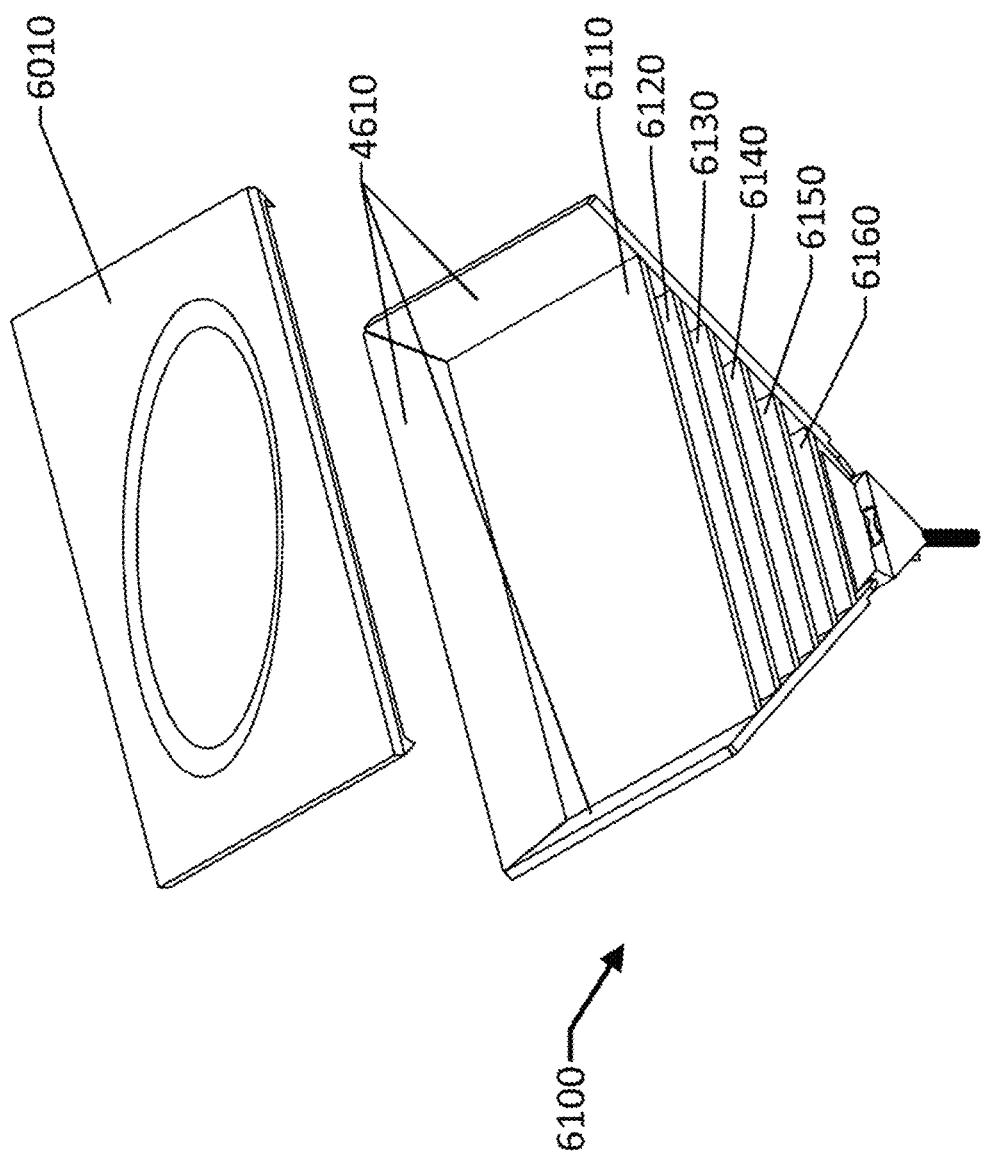

FIG. 196 shows an alternate horizontal petal cell without a center post, one panel and hinge removed for viewing and a spherically concave transparent cover overhead.

Figure 197:
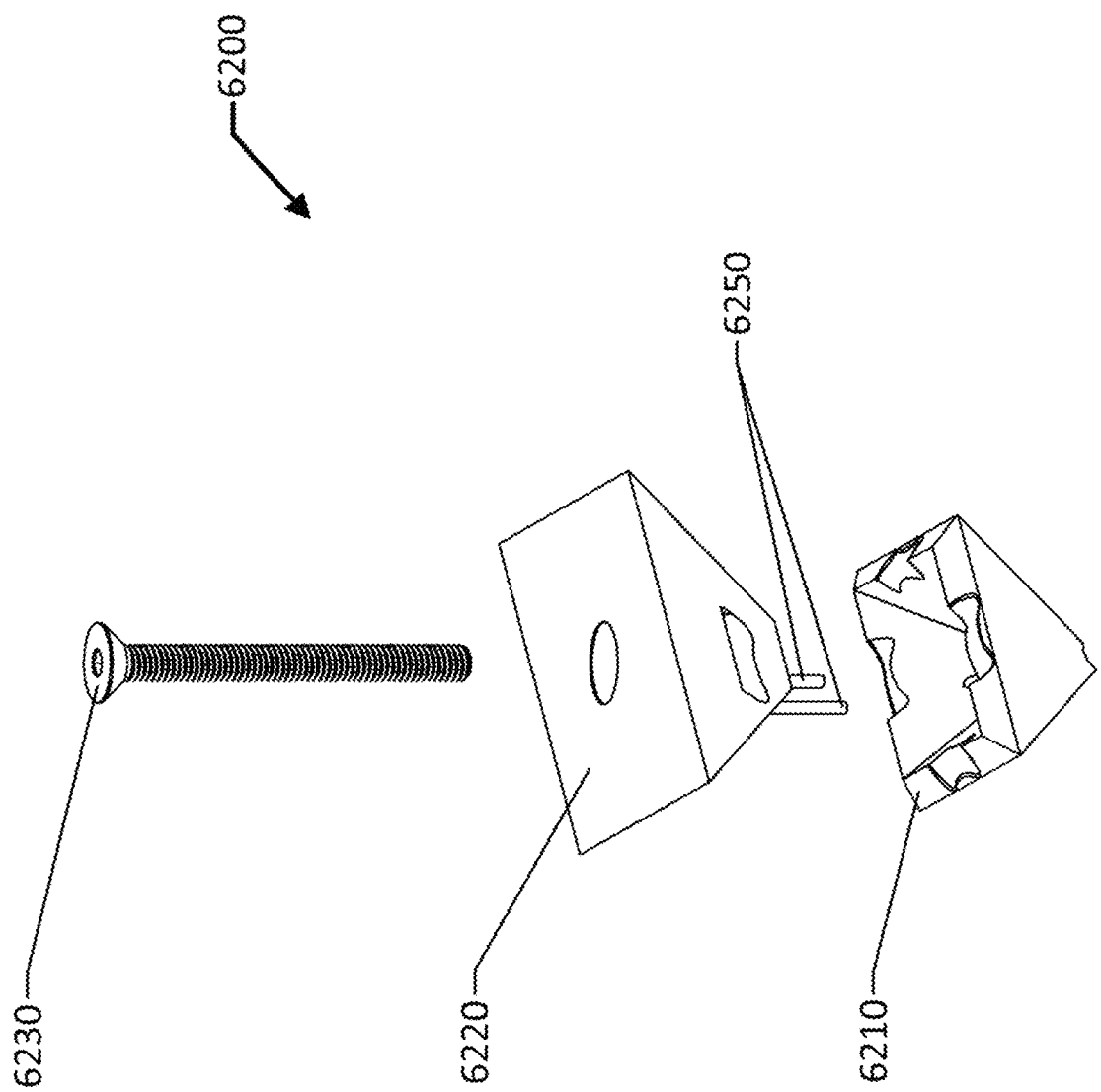

FIG. 197 shows an exploded view of a locking hub assembly for the petal cell.

Figure 198:
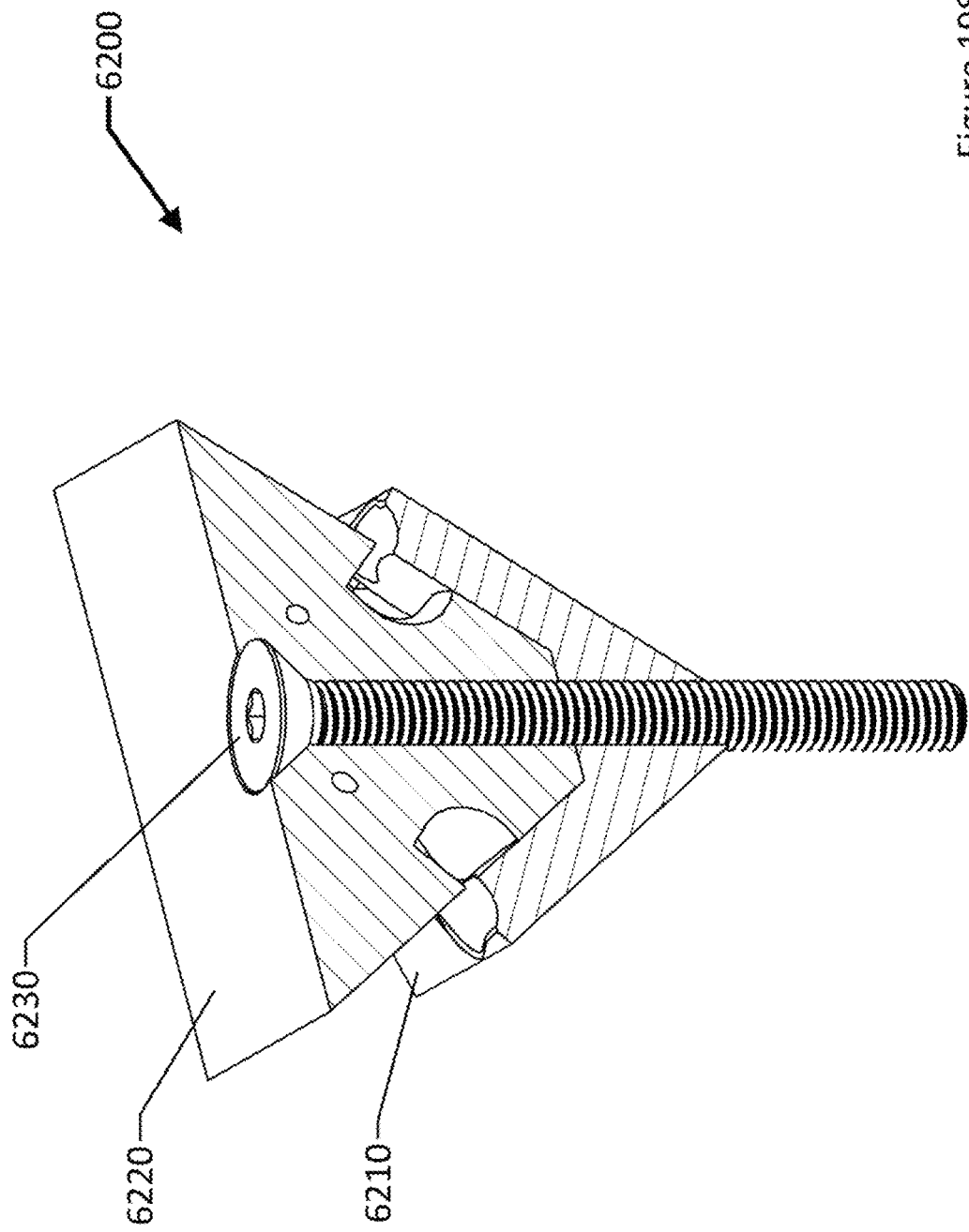

FIG. 198 shows a section view of the locking hub.

Figure 199:
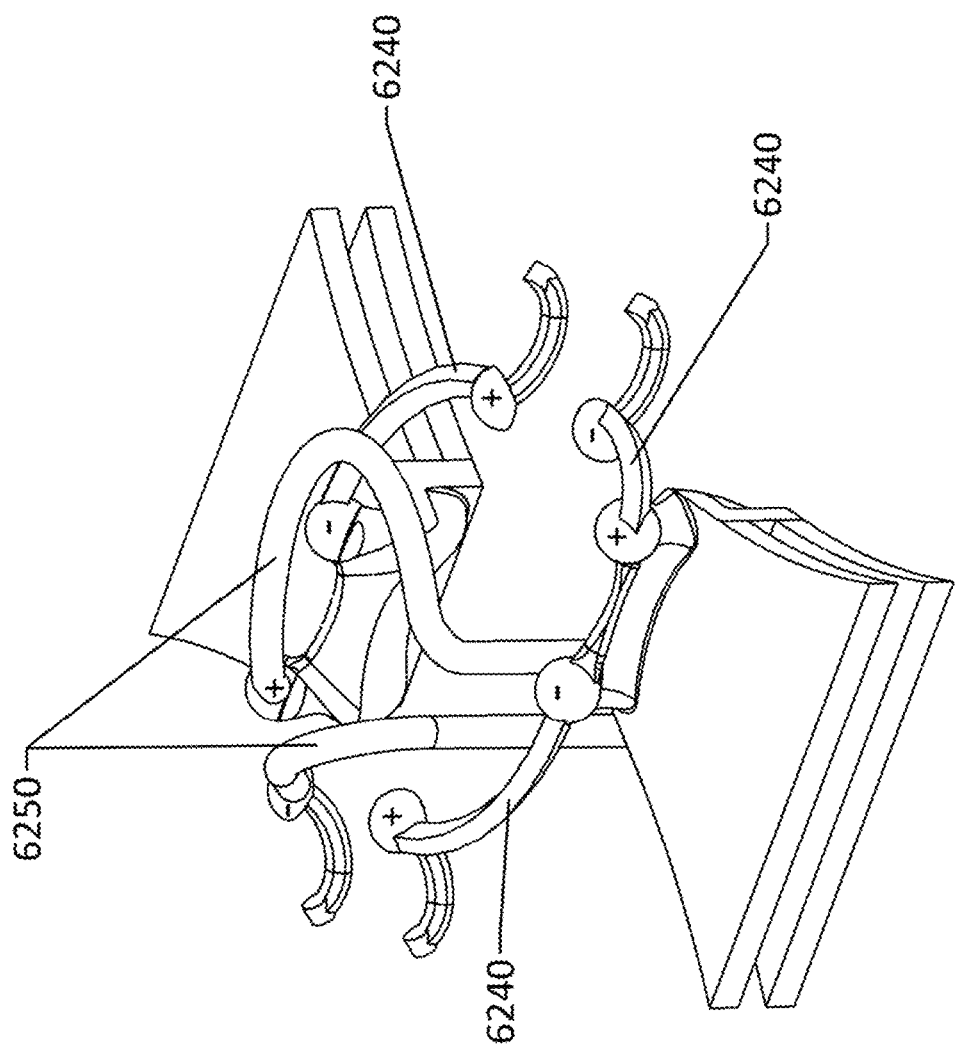

FIG. 199 shows the wiring within the locking hub and the connections to the hinges.

Figure 200:
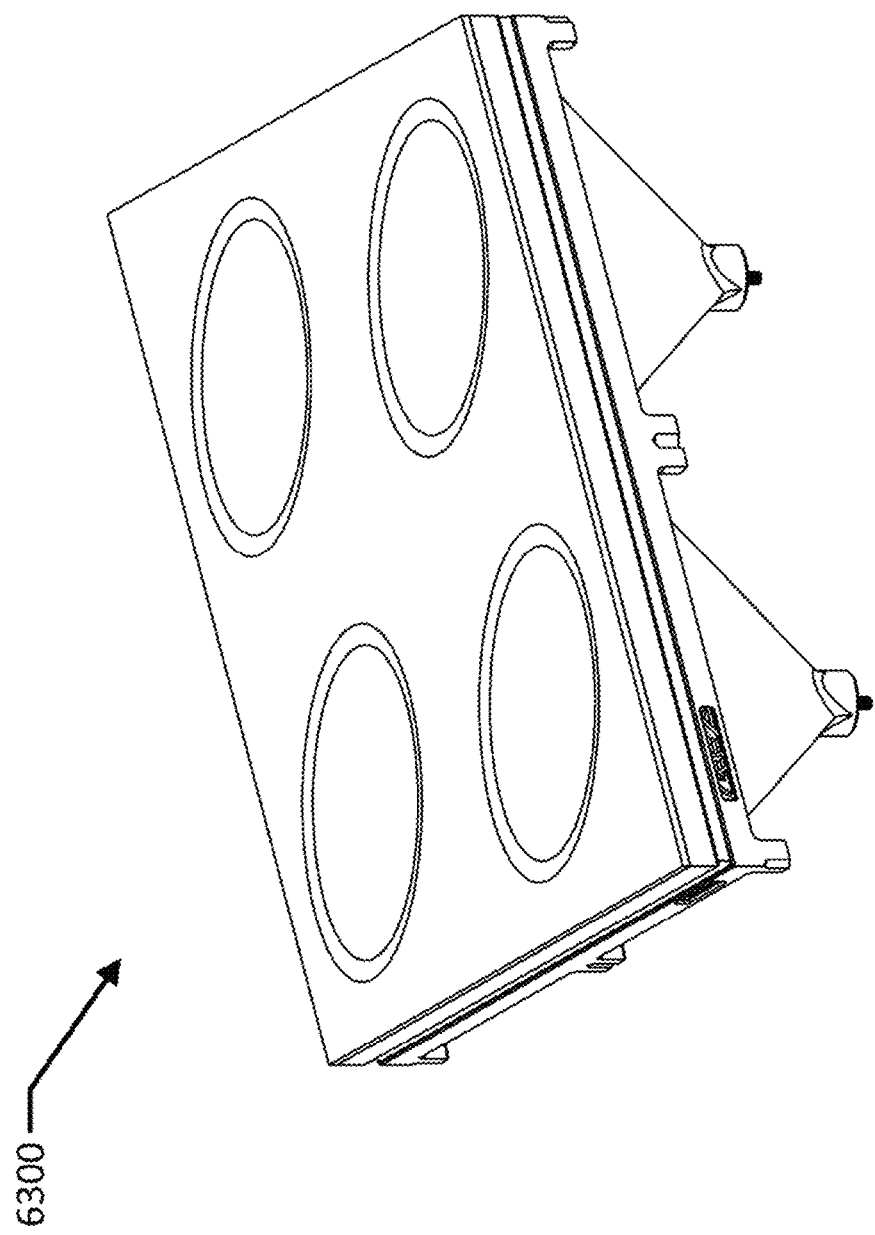

FIG. 200 shows a completely assembled horizontal flower panel assembly with a concave transparent cover.

Figure 201:
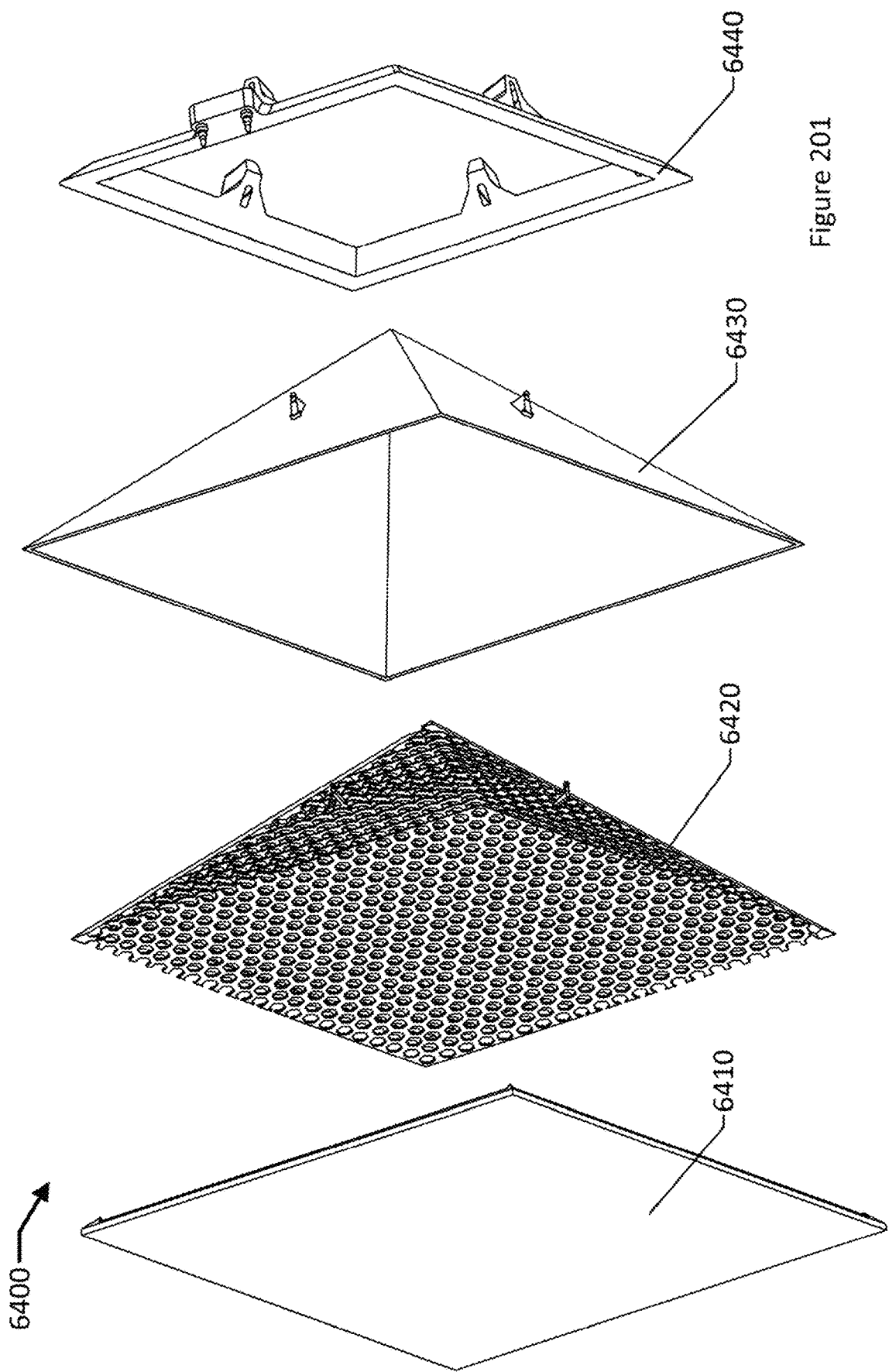

FIG. 201 shows an exploded view of a supercapacitor cell.

Figure 202:
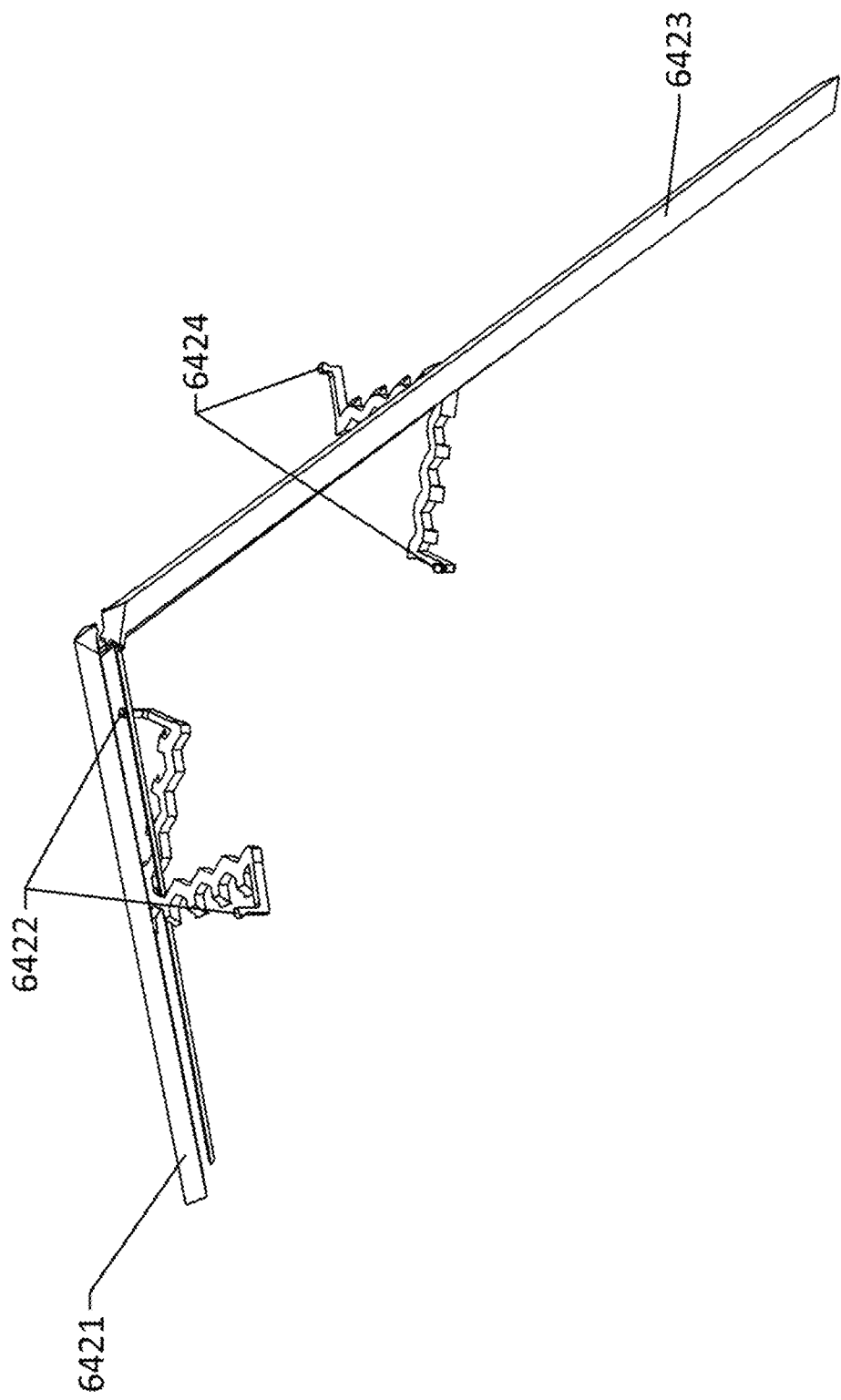

FIG. 202 shows the positive and negative leads in the cell.

Figure 203:
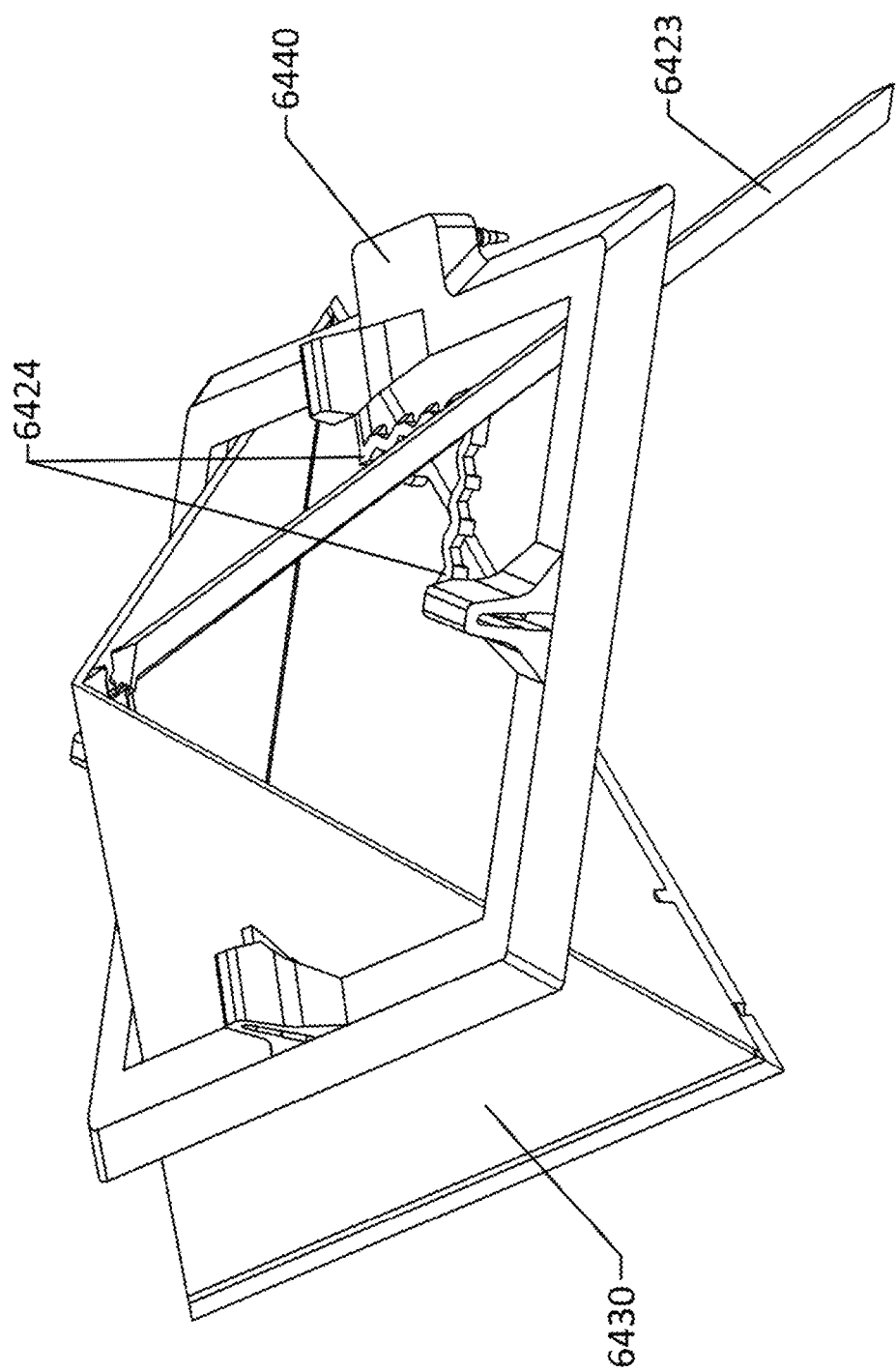

FIG. 203 shows a connection rack connected to the leads and a sectioned cell casing.

Figure 204:
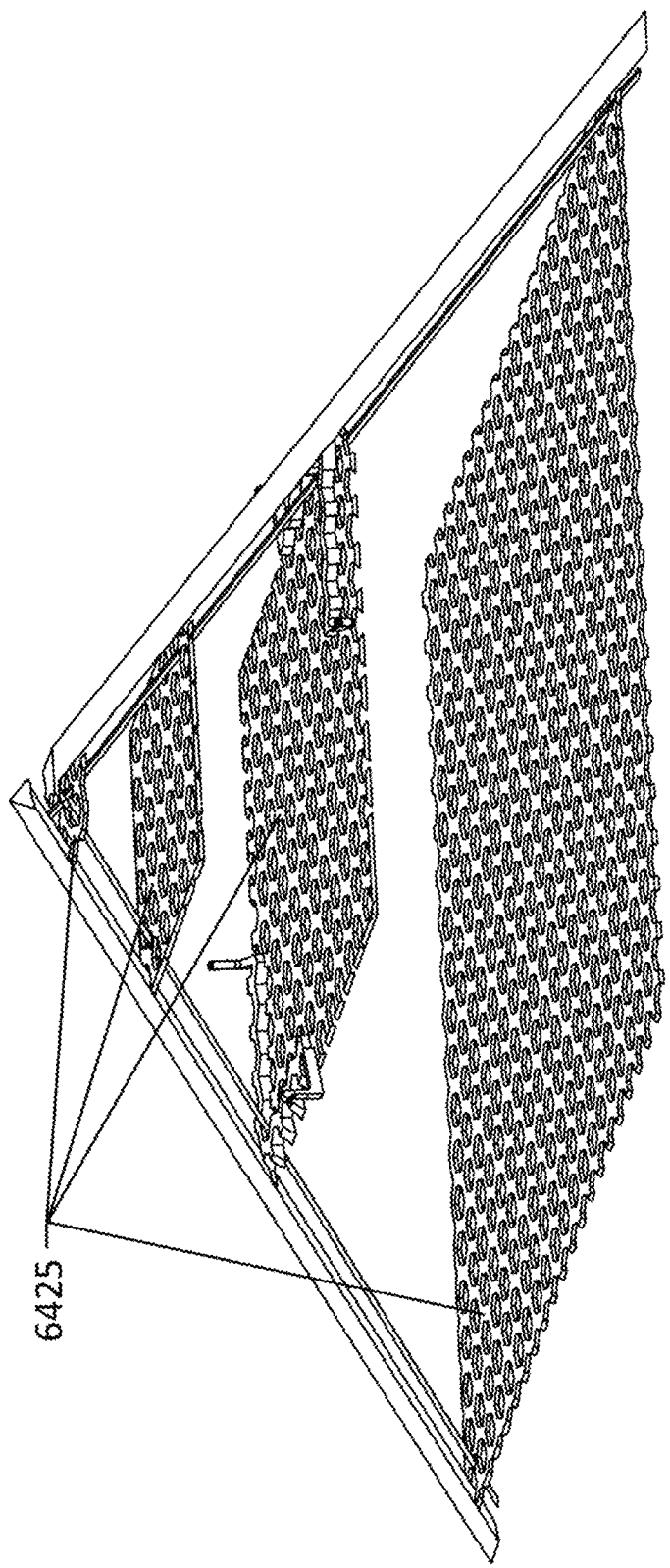

FIG. 204 shows the introduction of positive, honeycomb layers.

Figure 205:
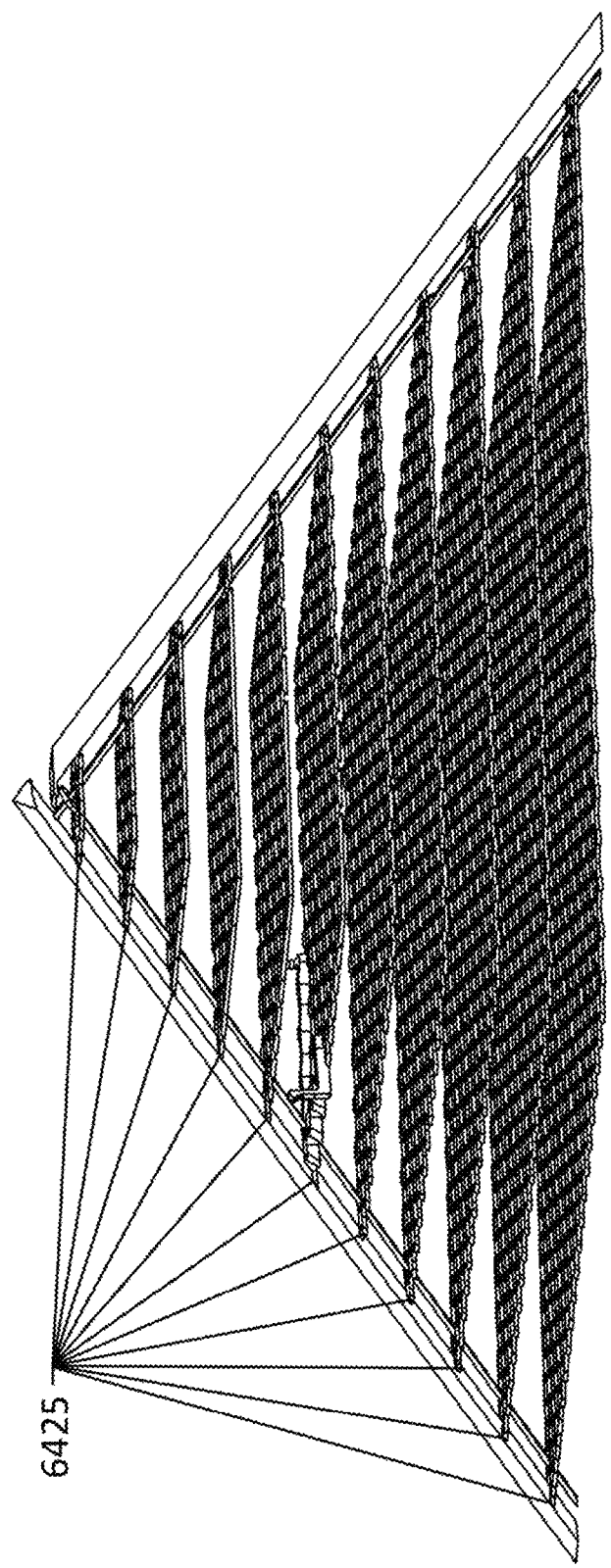

FIG. 205 shows all positive layers.

Figure 206:
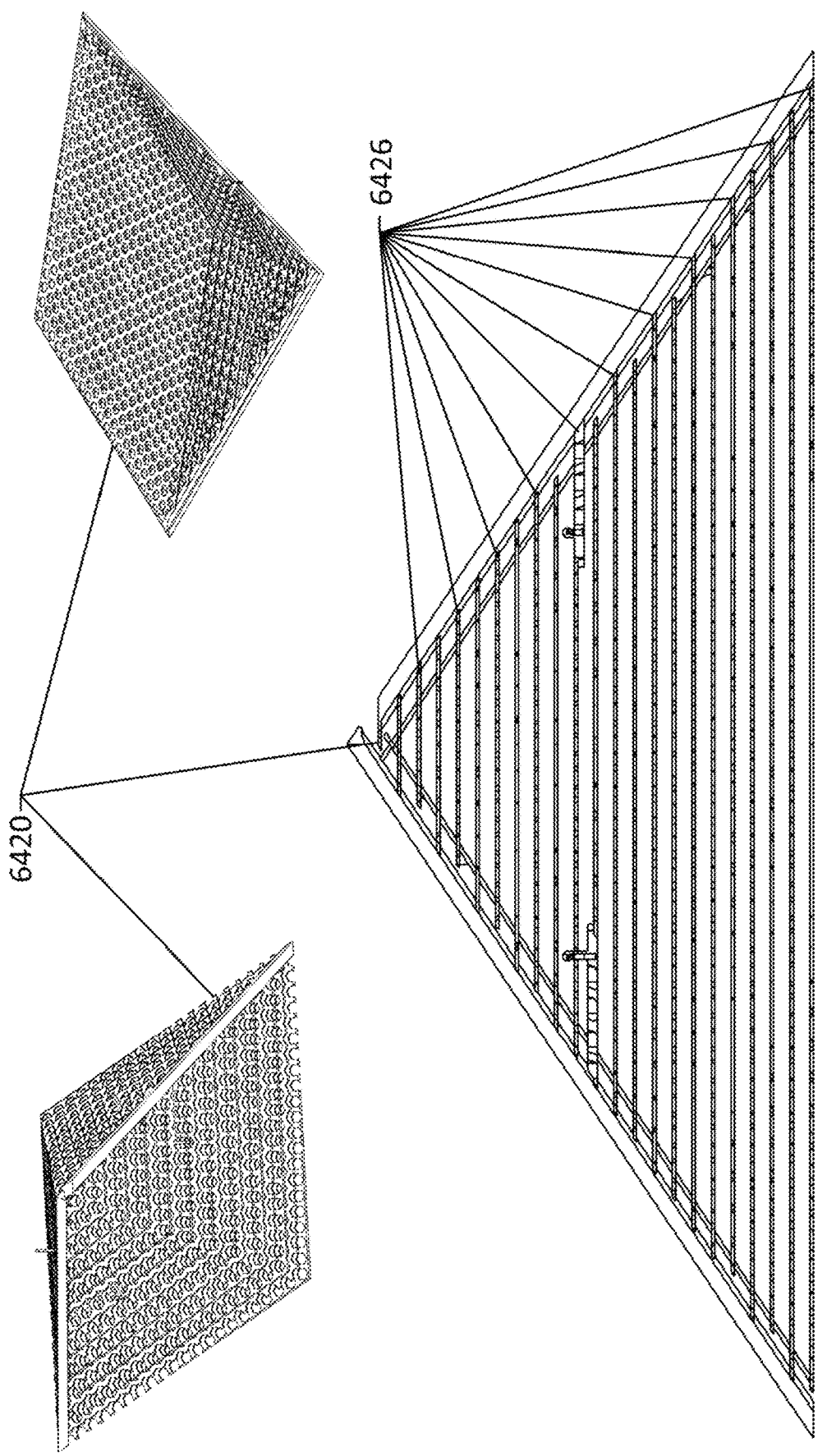

FIG. 206 shows a side view of all positive and negative layers, as well as angled views of its top and bottom.

Figure 207:
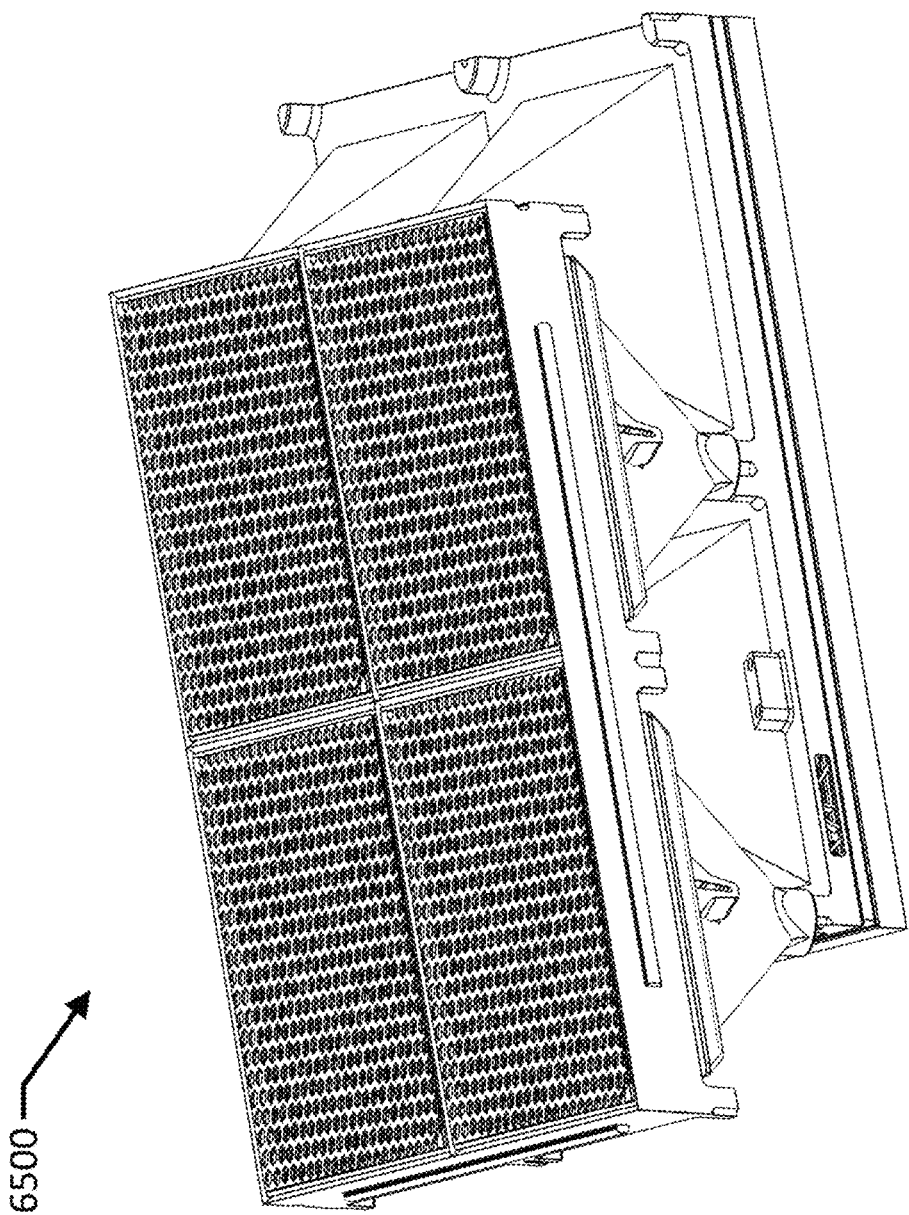

FIG. 207 shows a completed supercapacitor module upside down.

Figure 208:
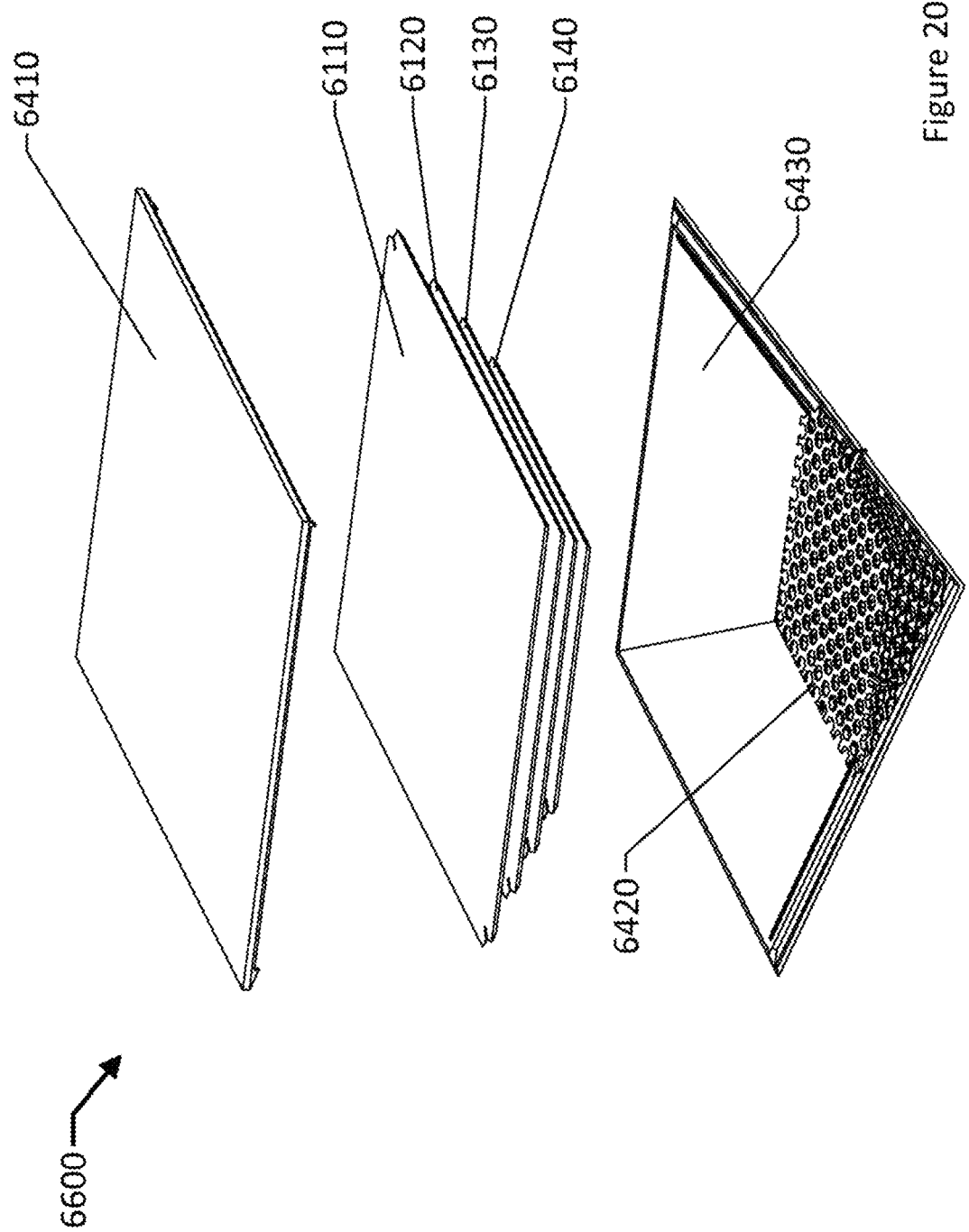

FIG. 208 shows an exploded view of a hybrid capacitor, post-less flower panel cell.

Figure 209:
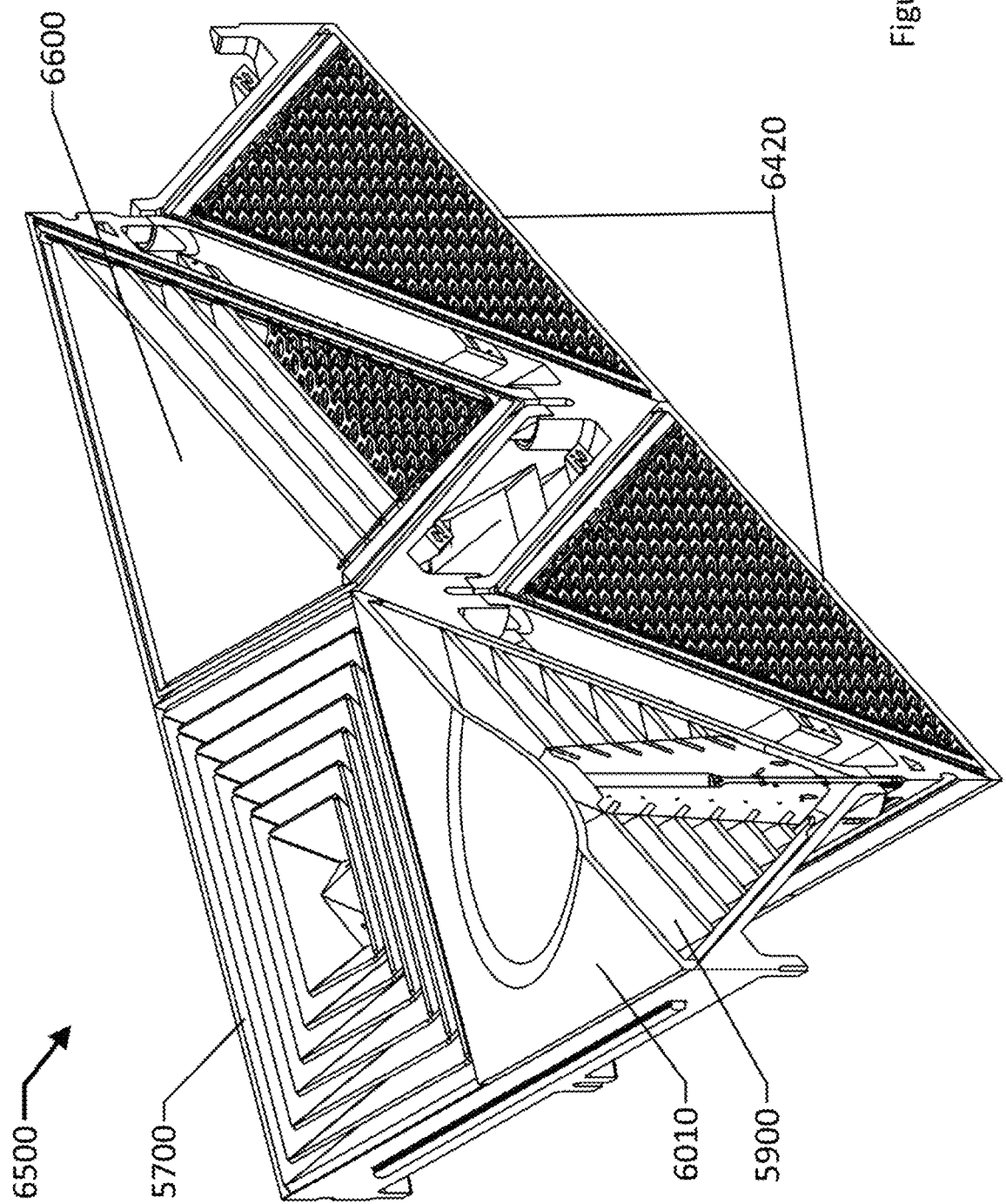

FIG. 209 shows a section view of a supercapacitor module with variations of flower panel cells on top.

Figure 210:
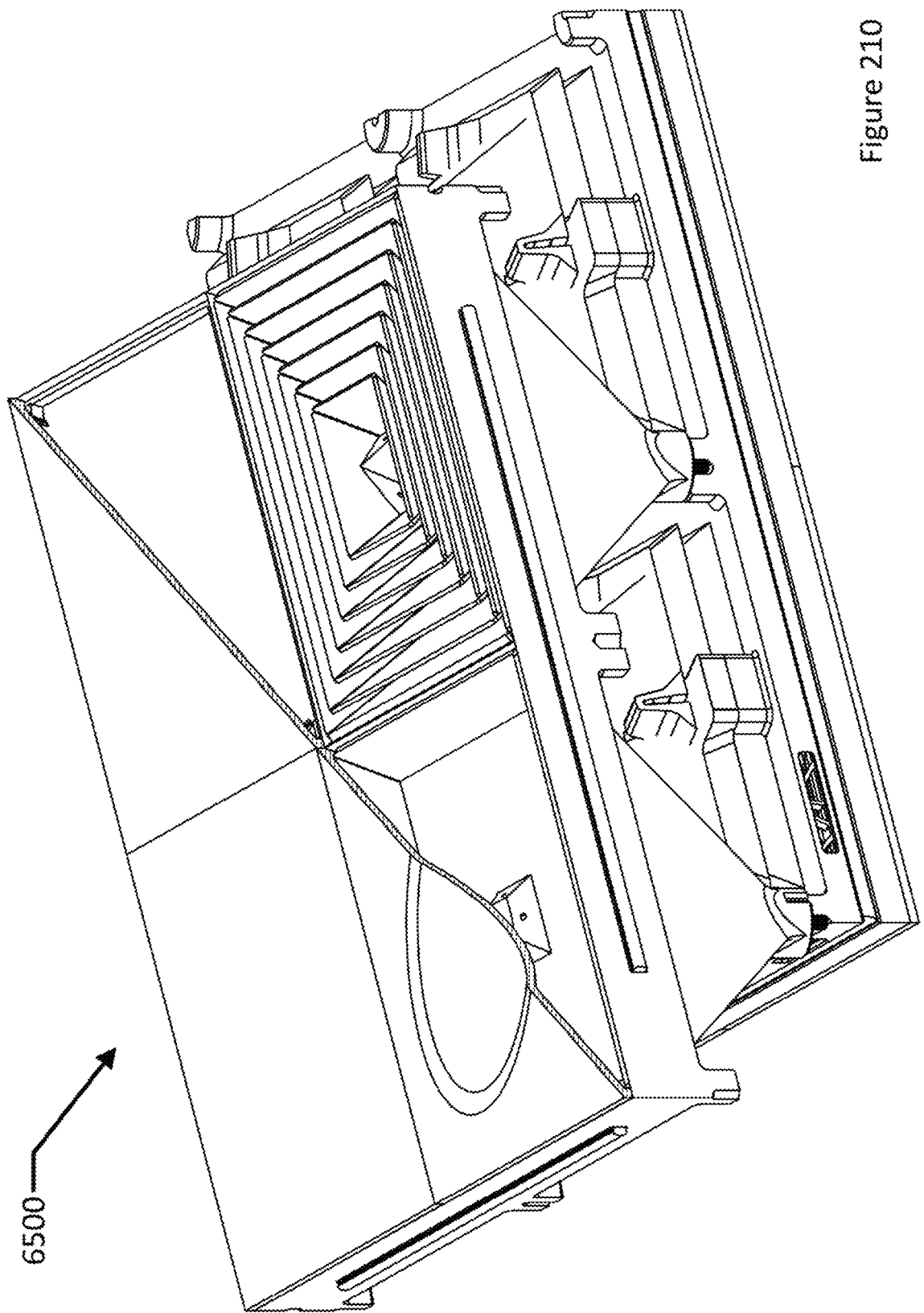

FIG. 210 shows the same module with a sectioned cover and a concave dimple over one cell.

Figure 211:
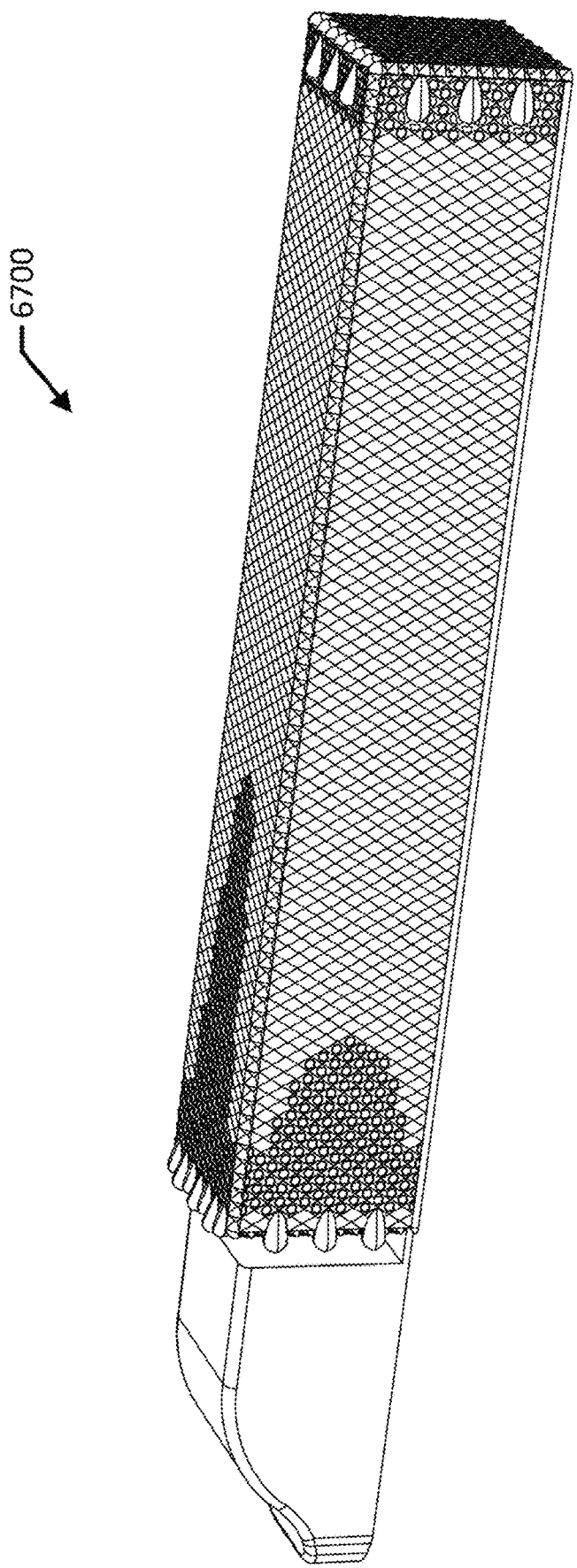

FIG. 211 shows a fully assembled tractor trailer with the Pyramid Wall System.

Figure 212:
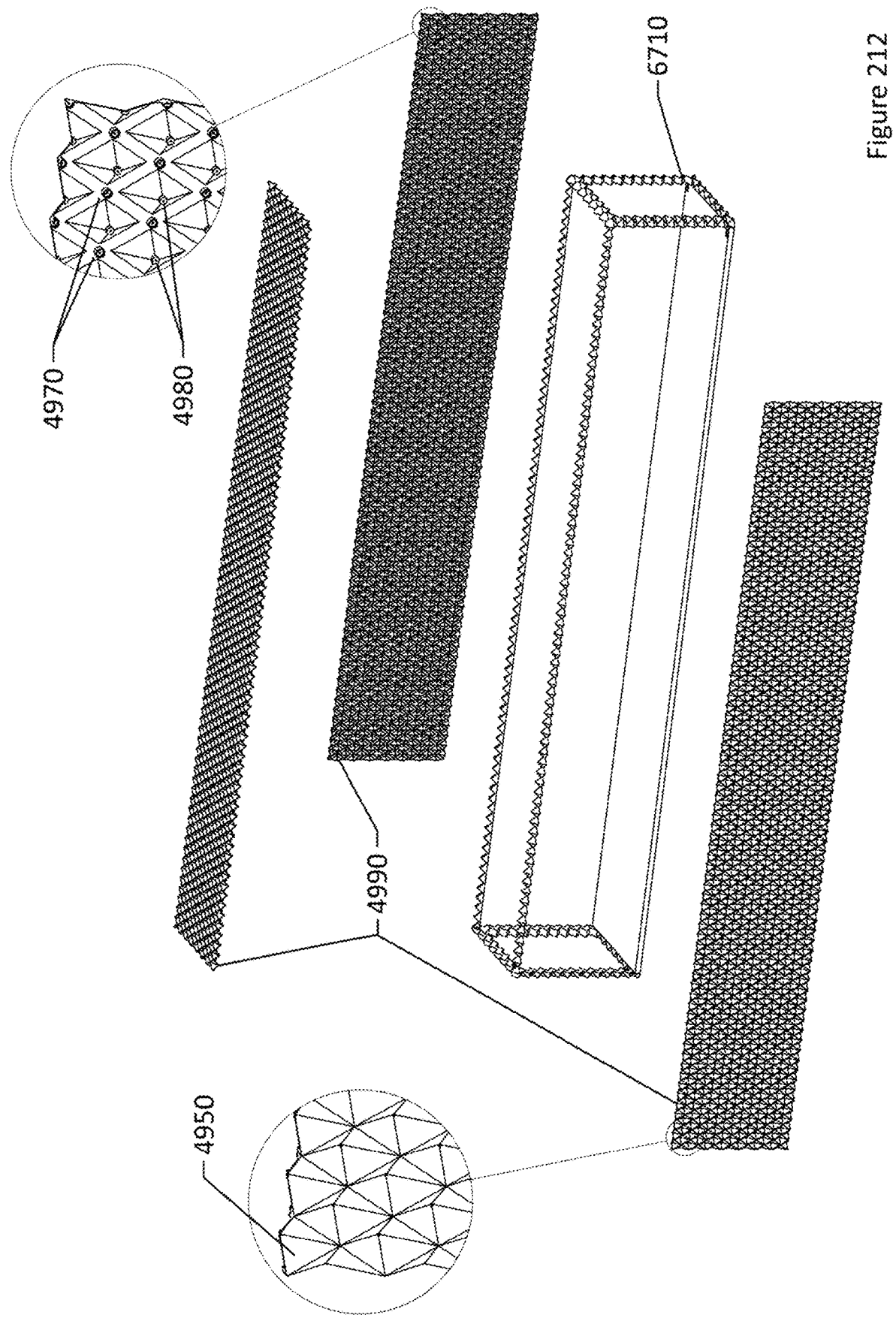

FIG. 212 shows an exploded views of the trailer frame, top and side Pyramid Wall sections and details of the wall section's front and back.

Figure 213:
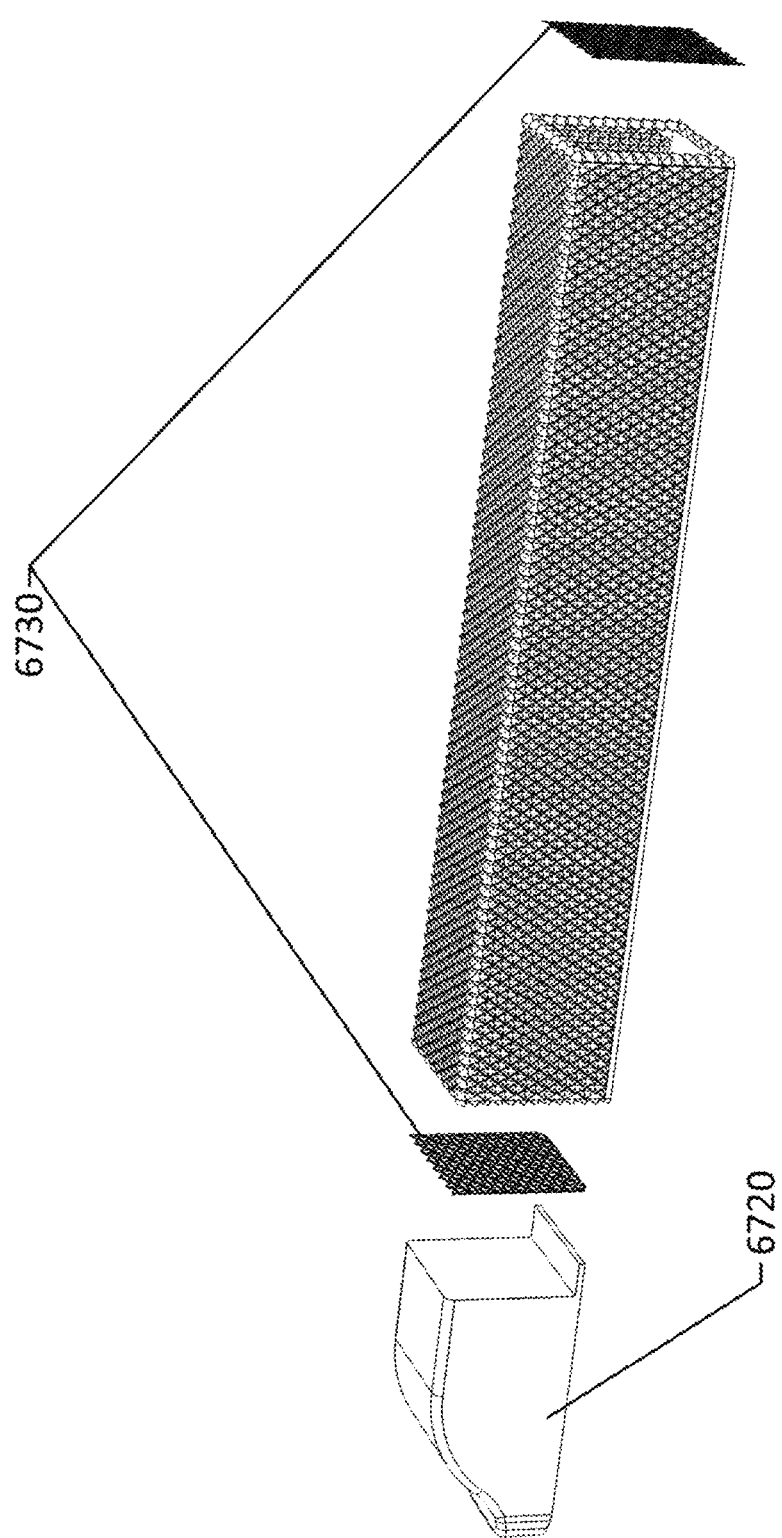

FIG. 213 shows an exploded views of front and back transparent, dimpled wall covers with the cab added.

Figure 214:
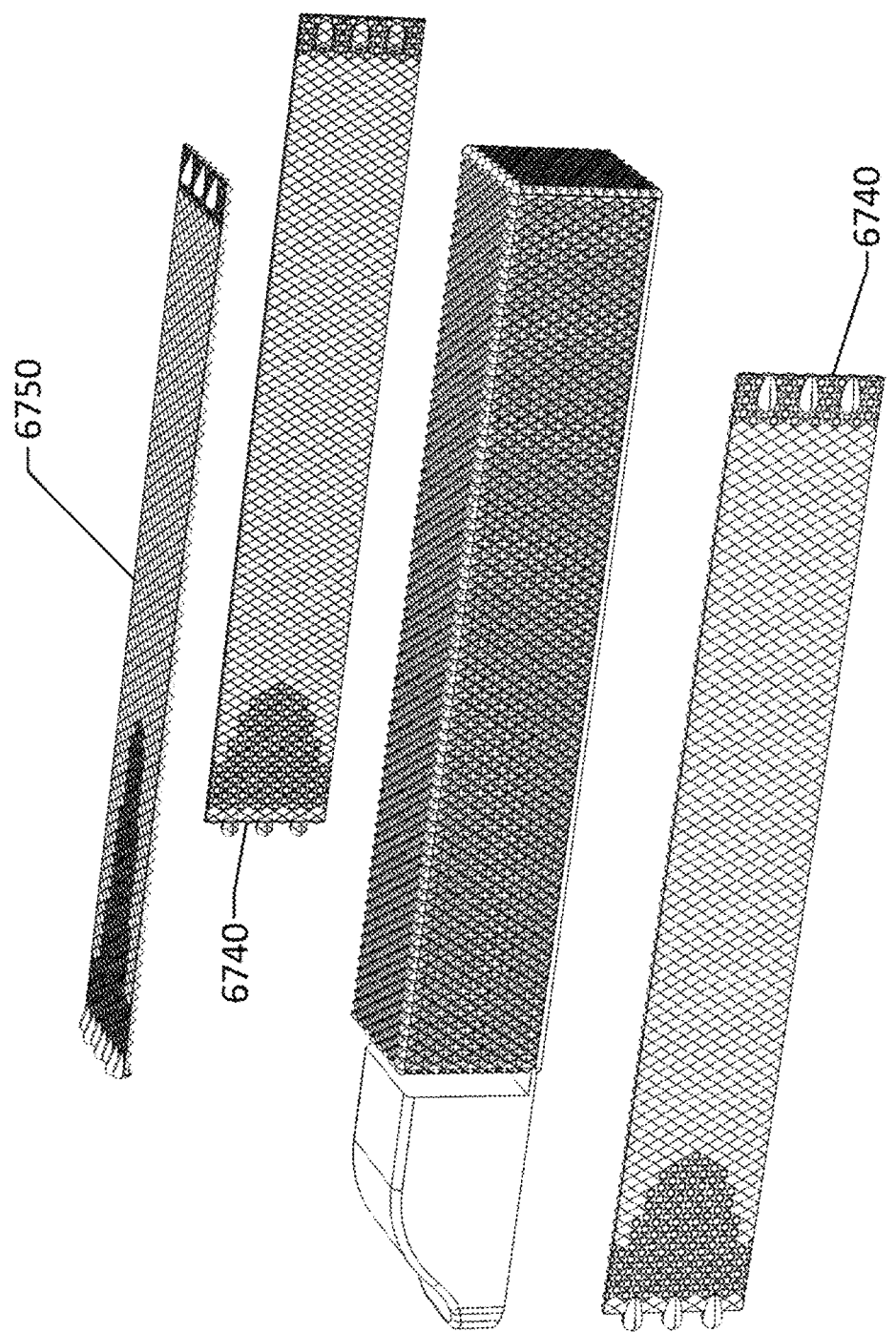

FIG. 214 shows an exploded view of the top and side transparent, dimpled covers.

Figure 215:
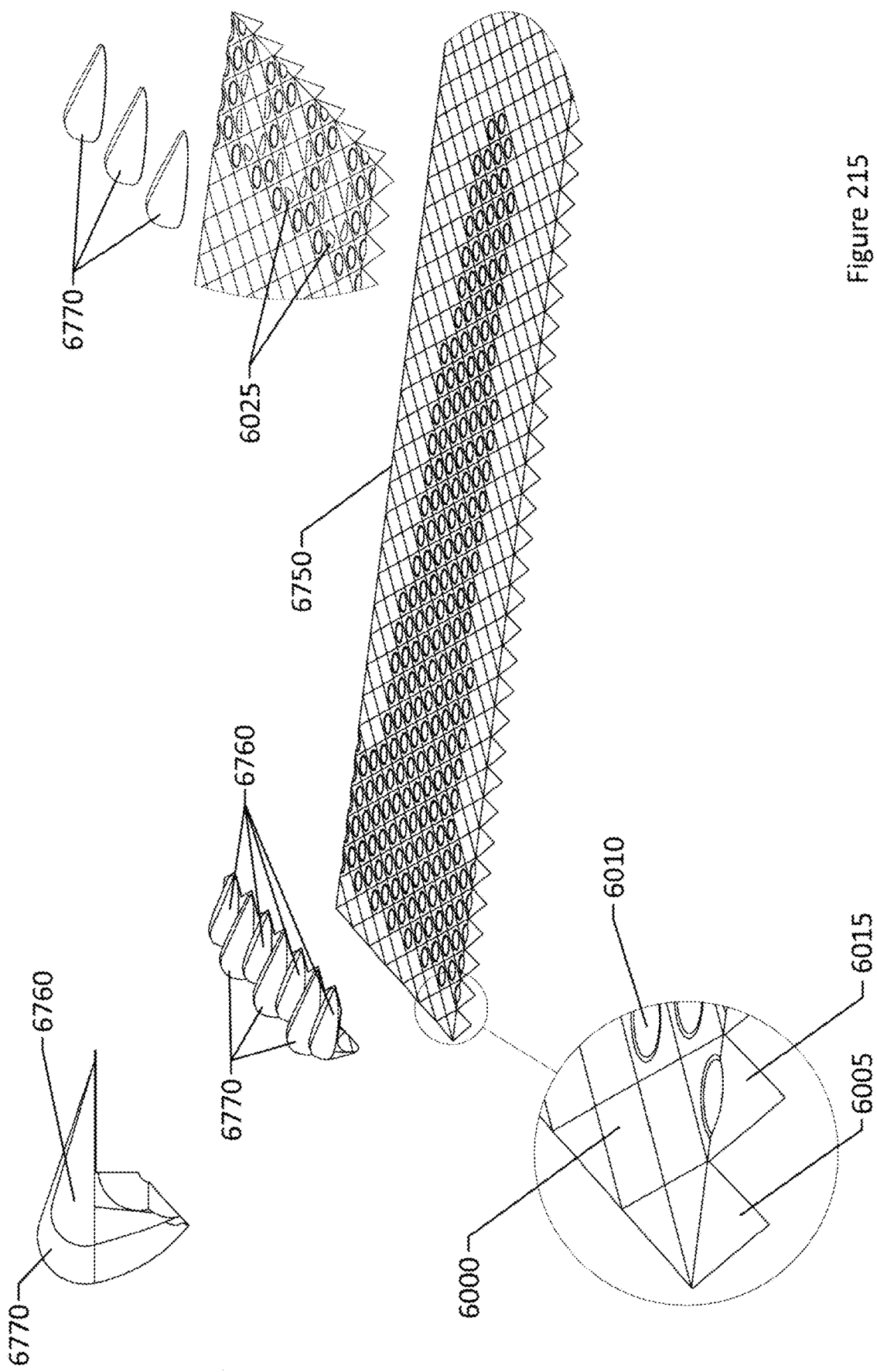

FIG. 215 shows an exploded view of the top transparent dimpled cover.

Figure 216:
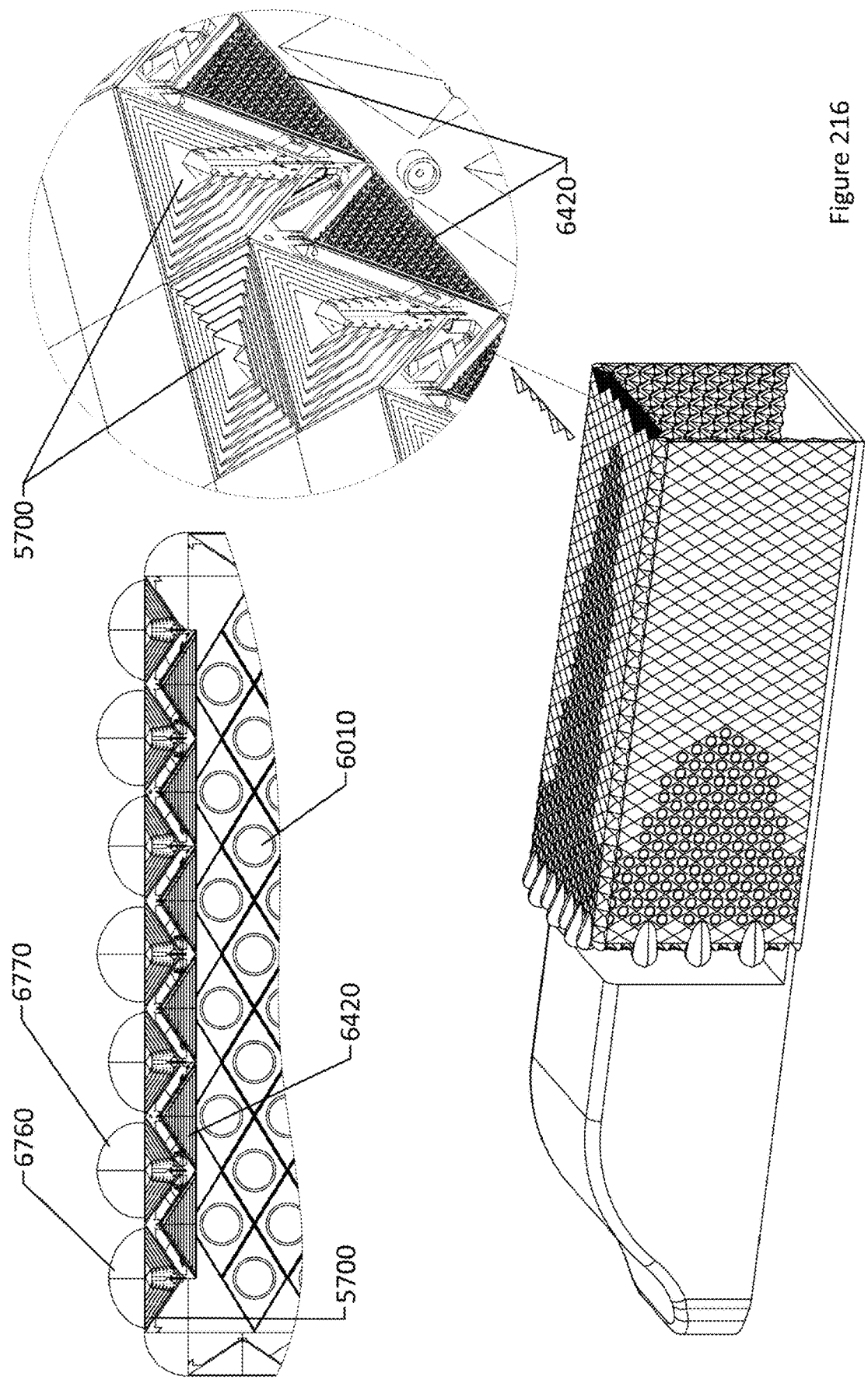

FIG. 216 shows a section view of the trailer.

Figure 217:
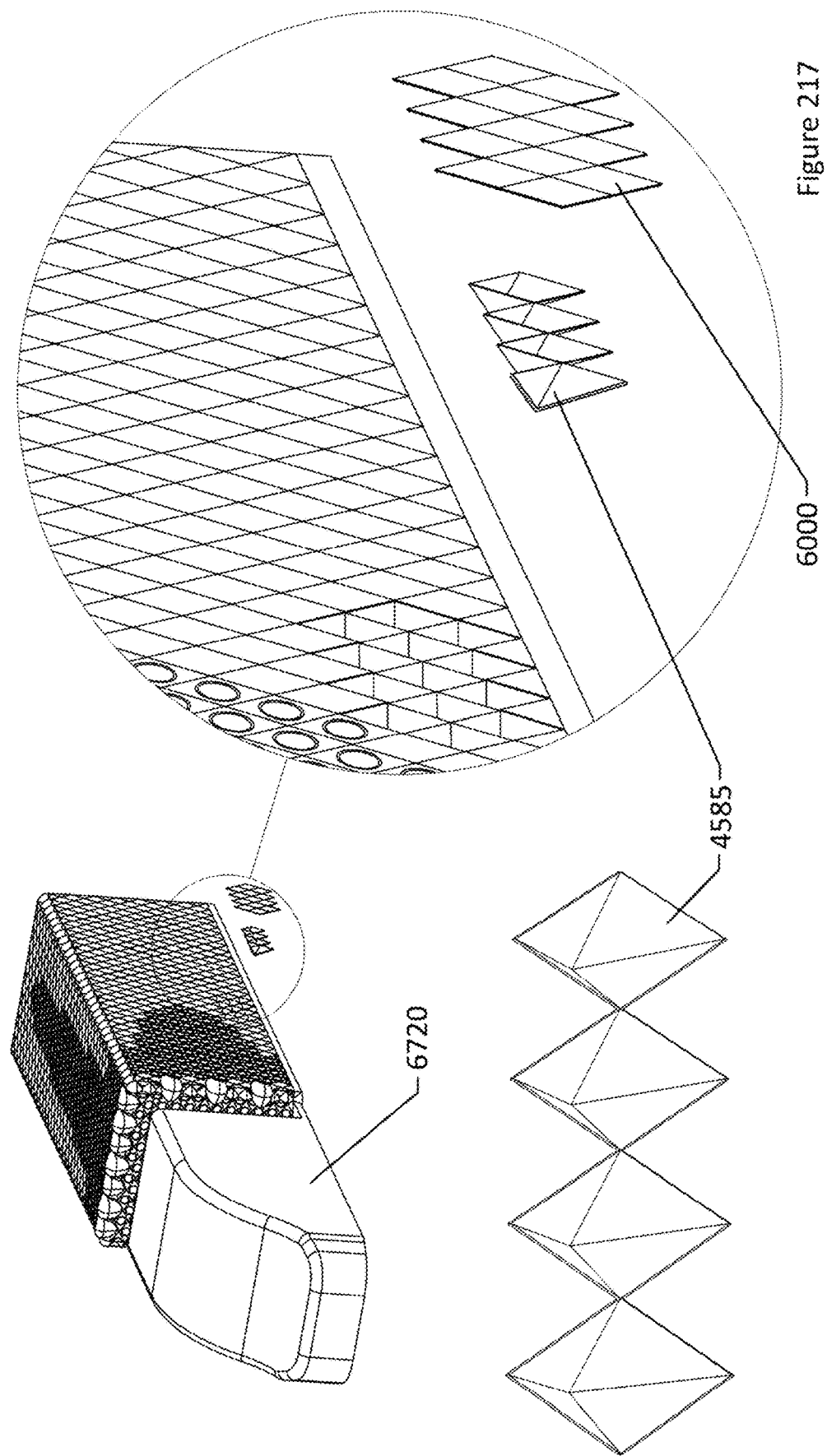

FIG. 217 shows the front end of a sectioned tractor trailer.

Figure 218:
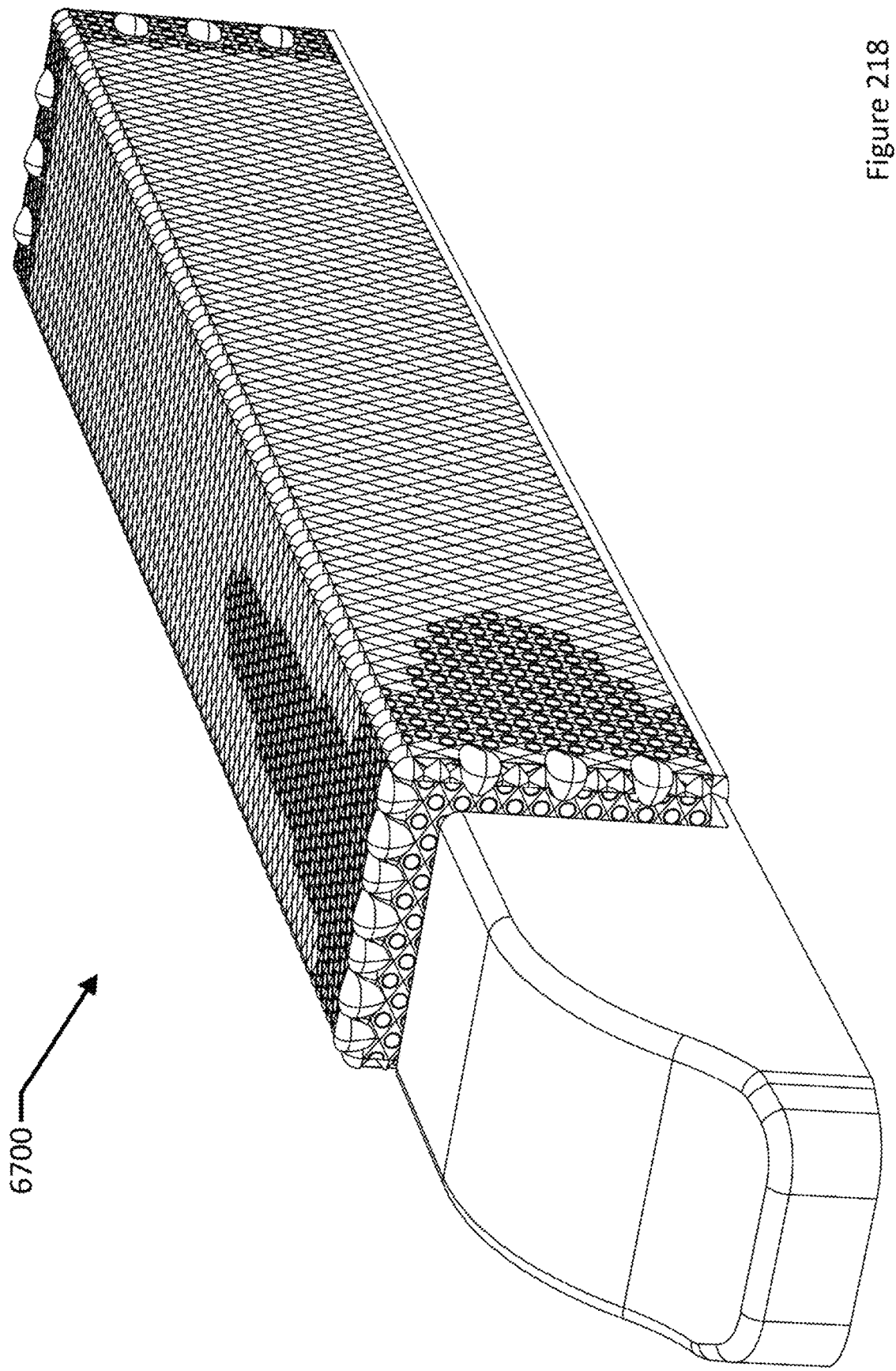

FIG. 218 shows the front end of a complete tractor trailer with Pyramid Wall System.

Figure 219:
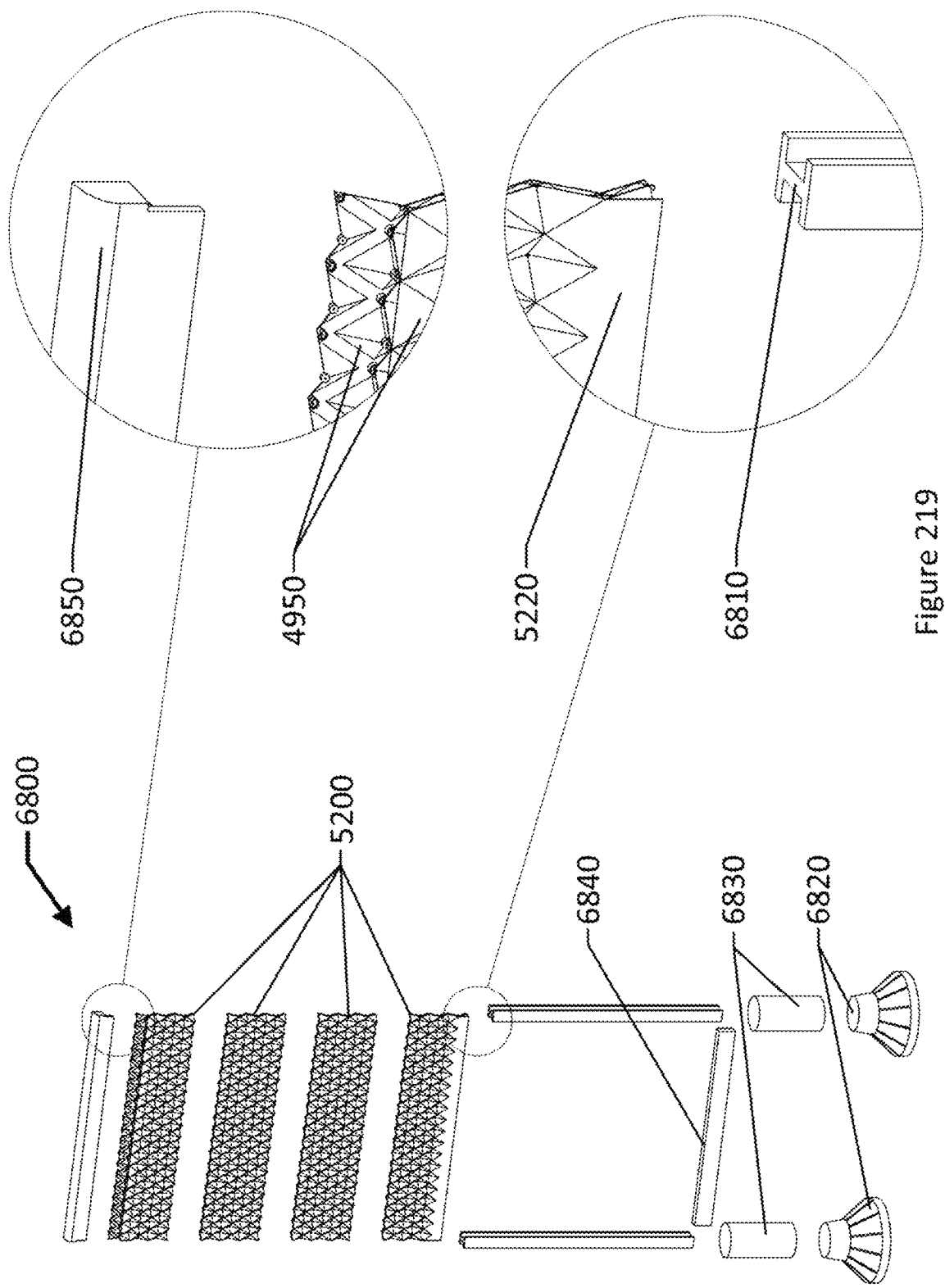

FIG. 219 shows an exploded view of a sound wall section within an "H-Frame".

Figure 220:
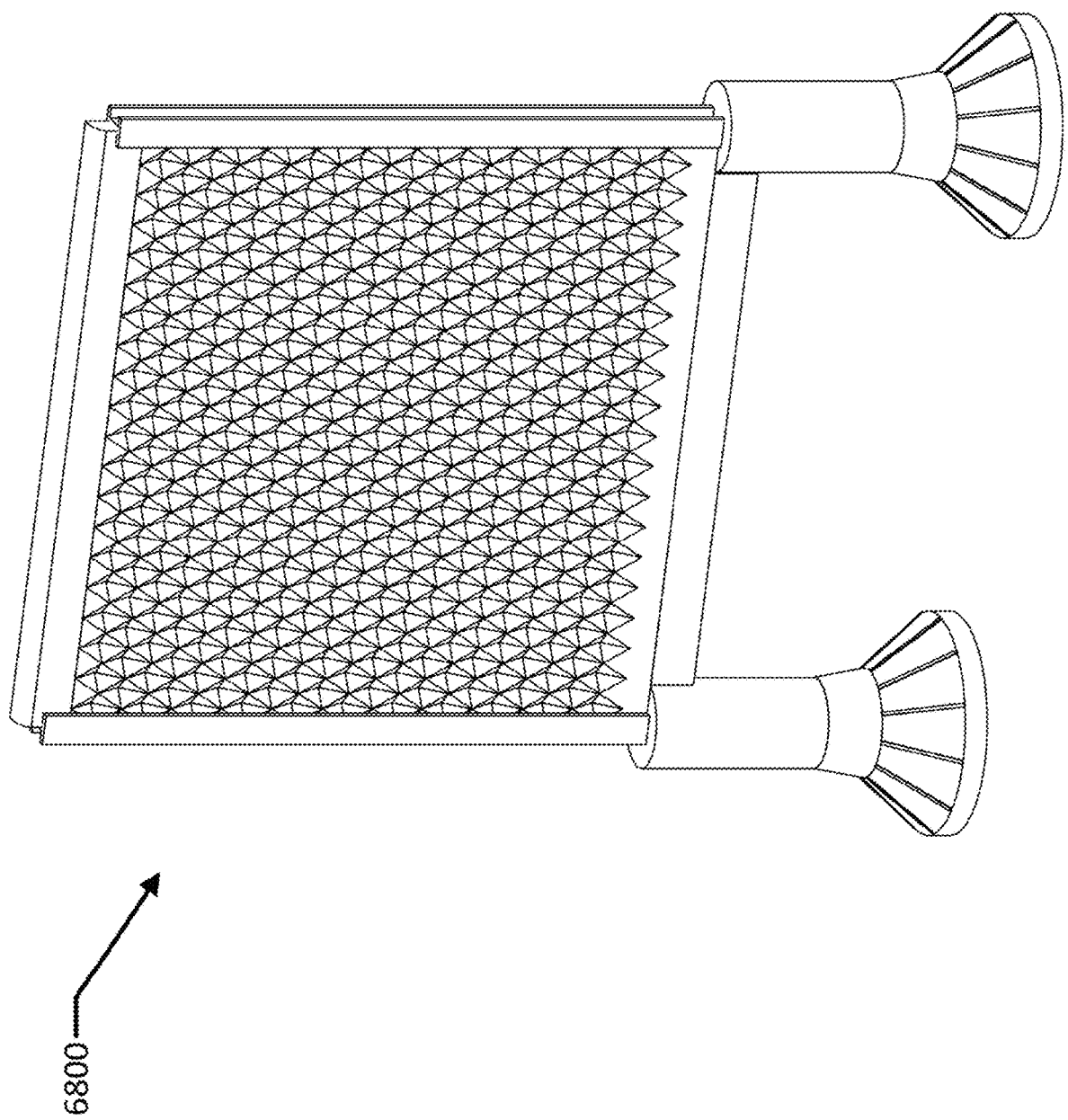

FIG. 220 shows an assembled sound wall section.

Figure 221:
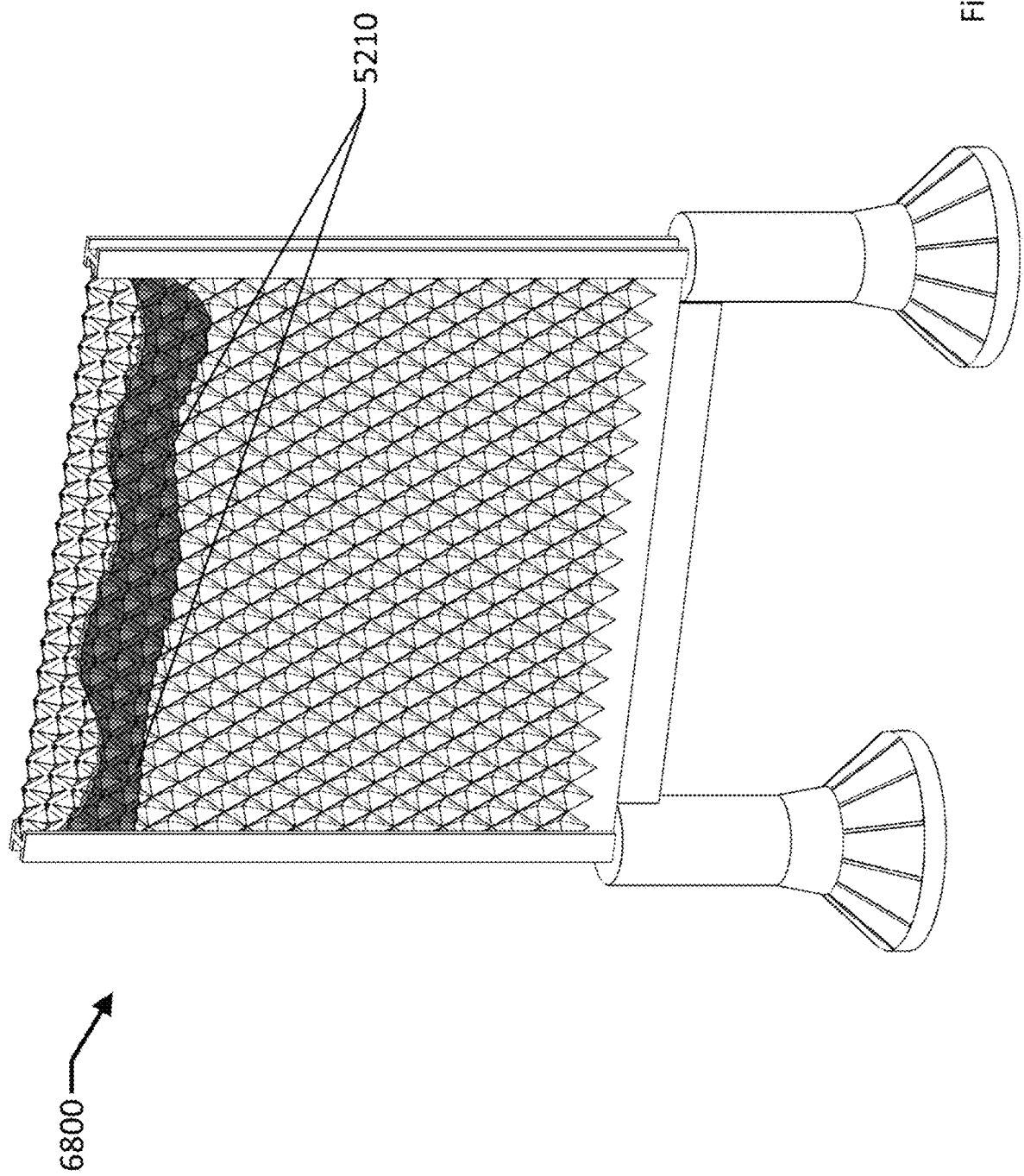

FIG. 221 shows a sound wall section with a breakaway view, exposing a foam or pellet filled interior.

Figure 222:
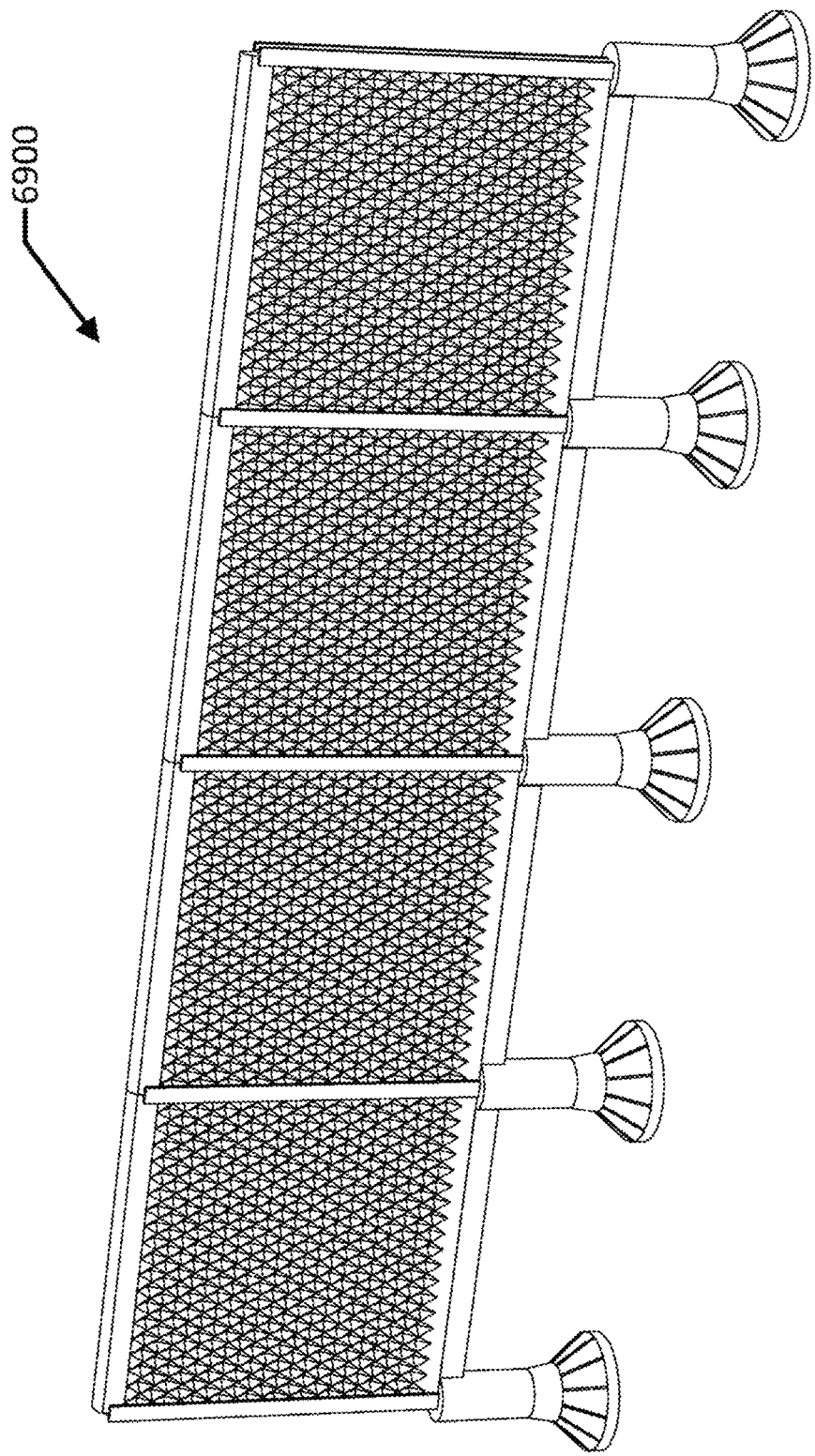

FIG. 222 shows a stretch of sound wall barrier.

Figure 223:
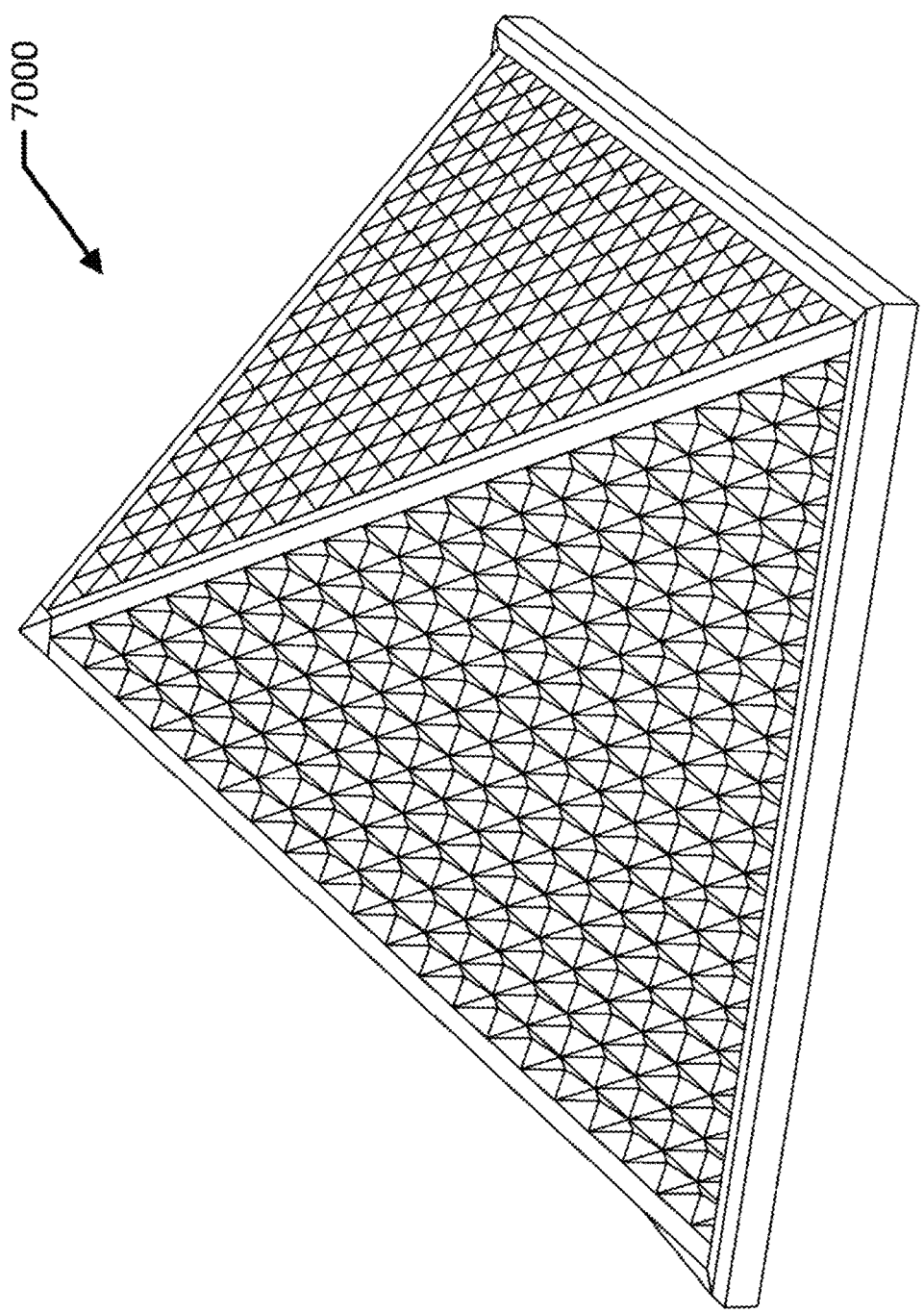

FIG. 223 shows a Pyramid Structure.

Figure 224:
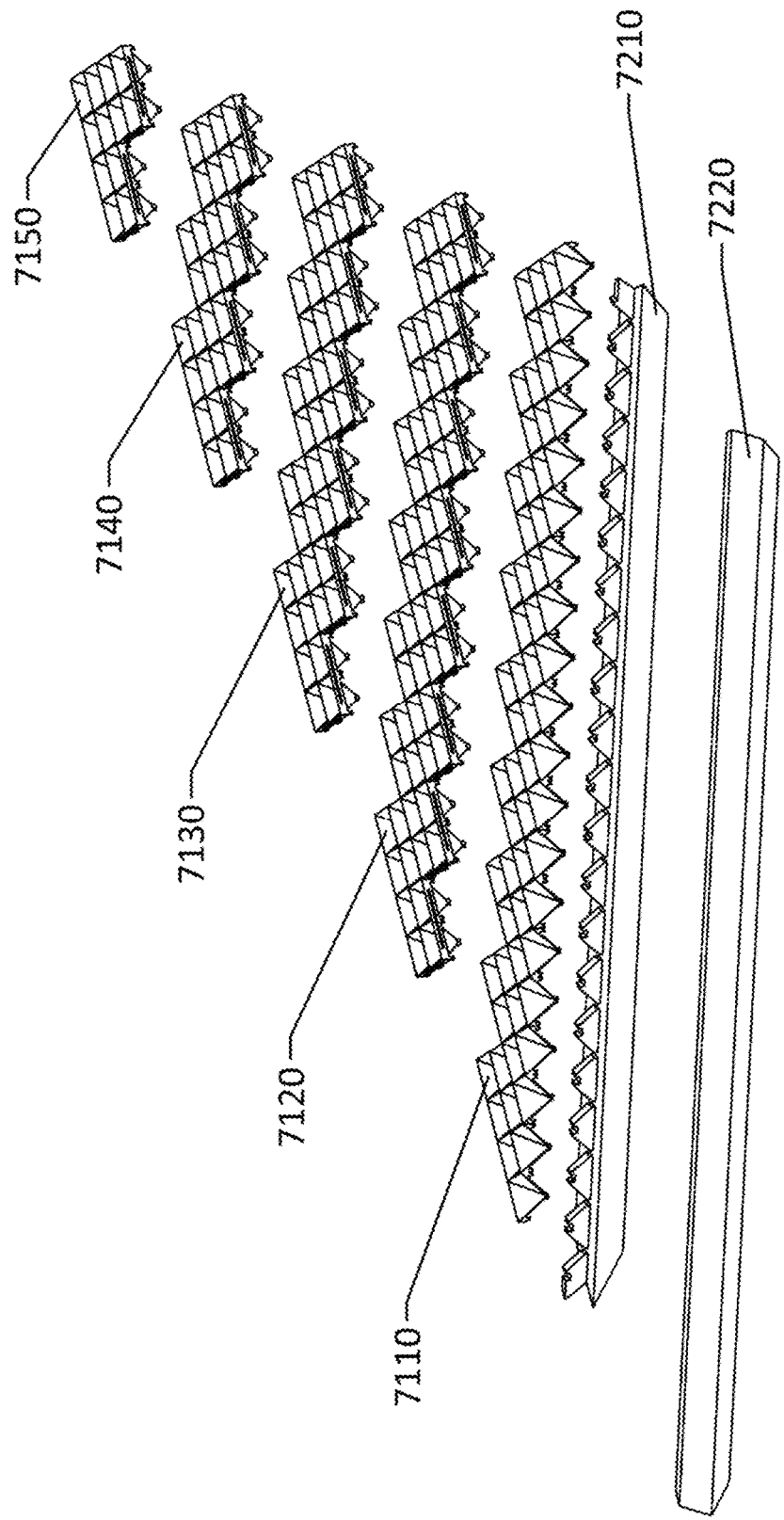

FIG. 224 shows an exploded view of one triangular sidewall of a Pyramid Structure.

Figure 225:
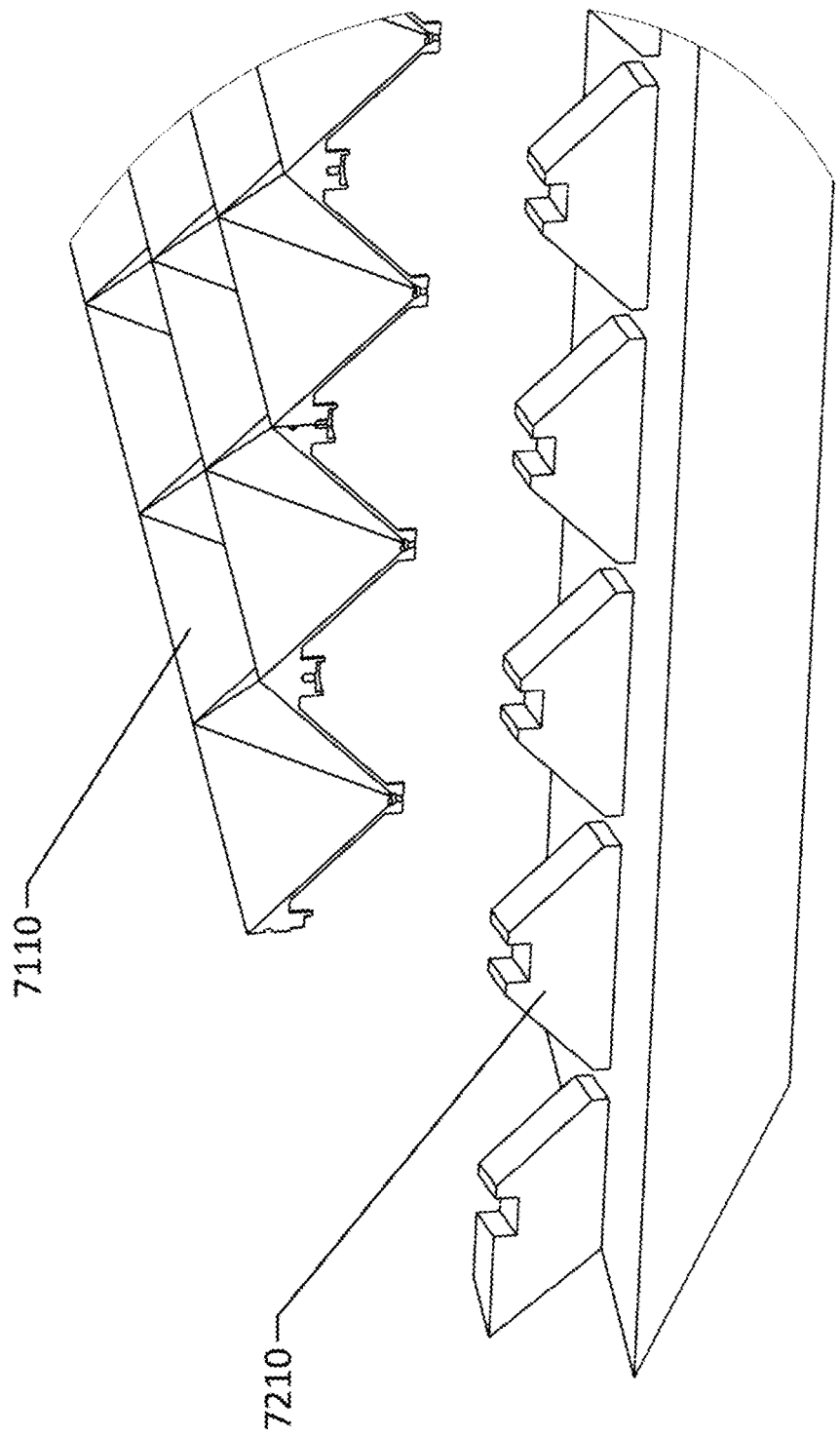

FIG. 225 shows a detail of a triangular sidewall positioned to engage base slots.

Figure 226:
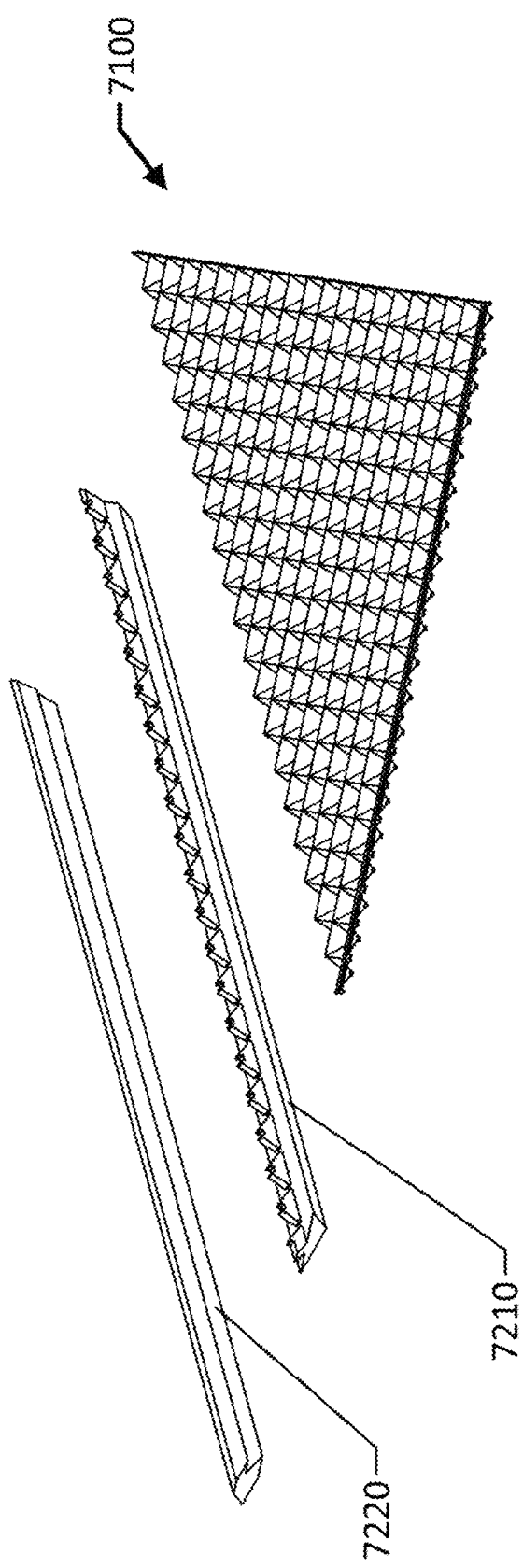

FIG. 226 shows a completed triangular sidewall from another angle, ready to be inserted in base slots and onto a base.

Figure 227:
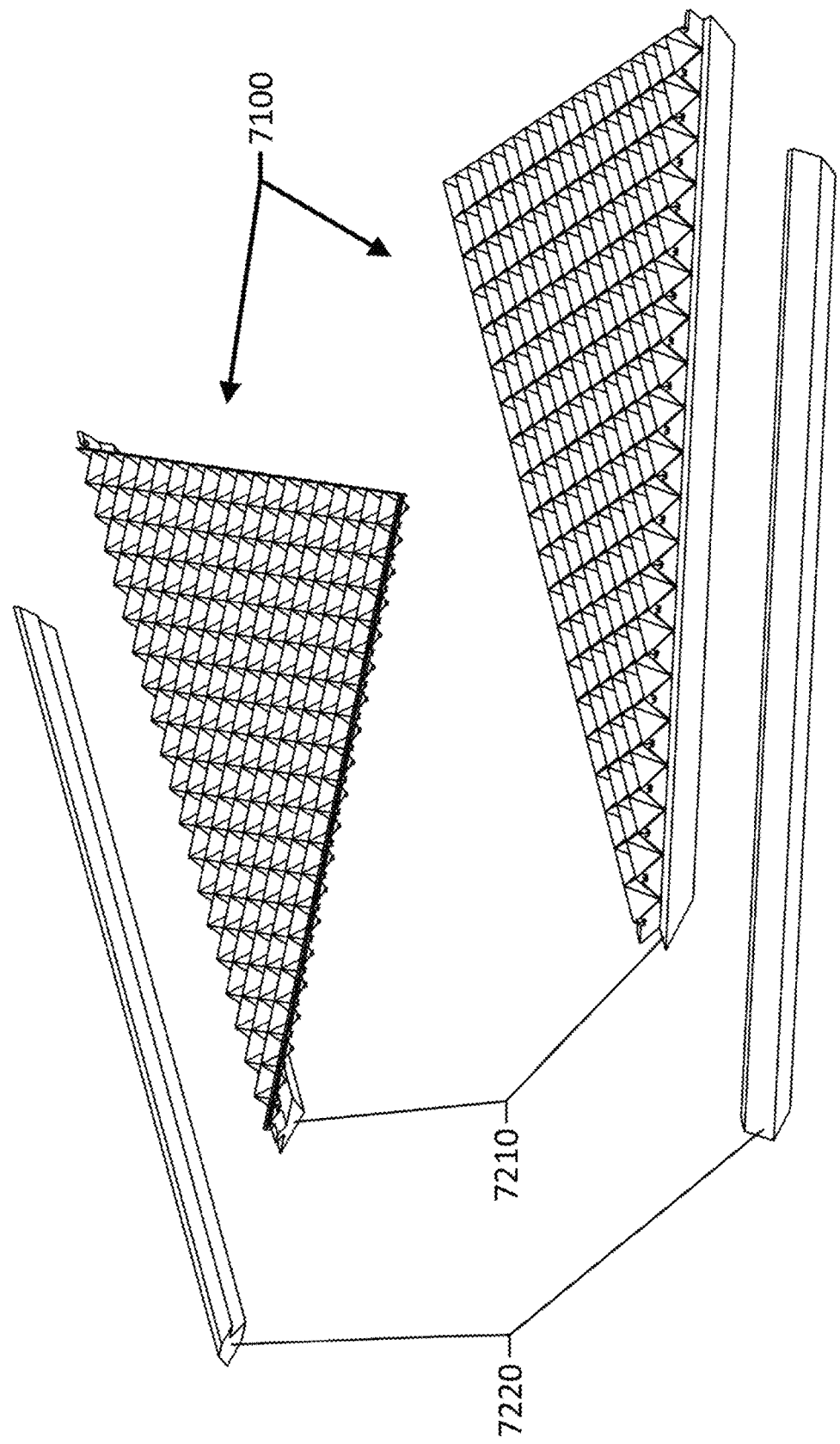

FIG. 227 shows two views of a completed triangular sidewall engaged in base slots and ready to be connected to a base.

Figure 228:
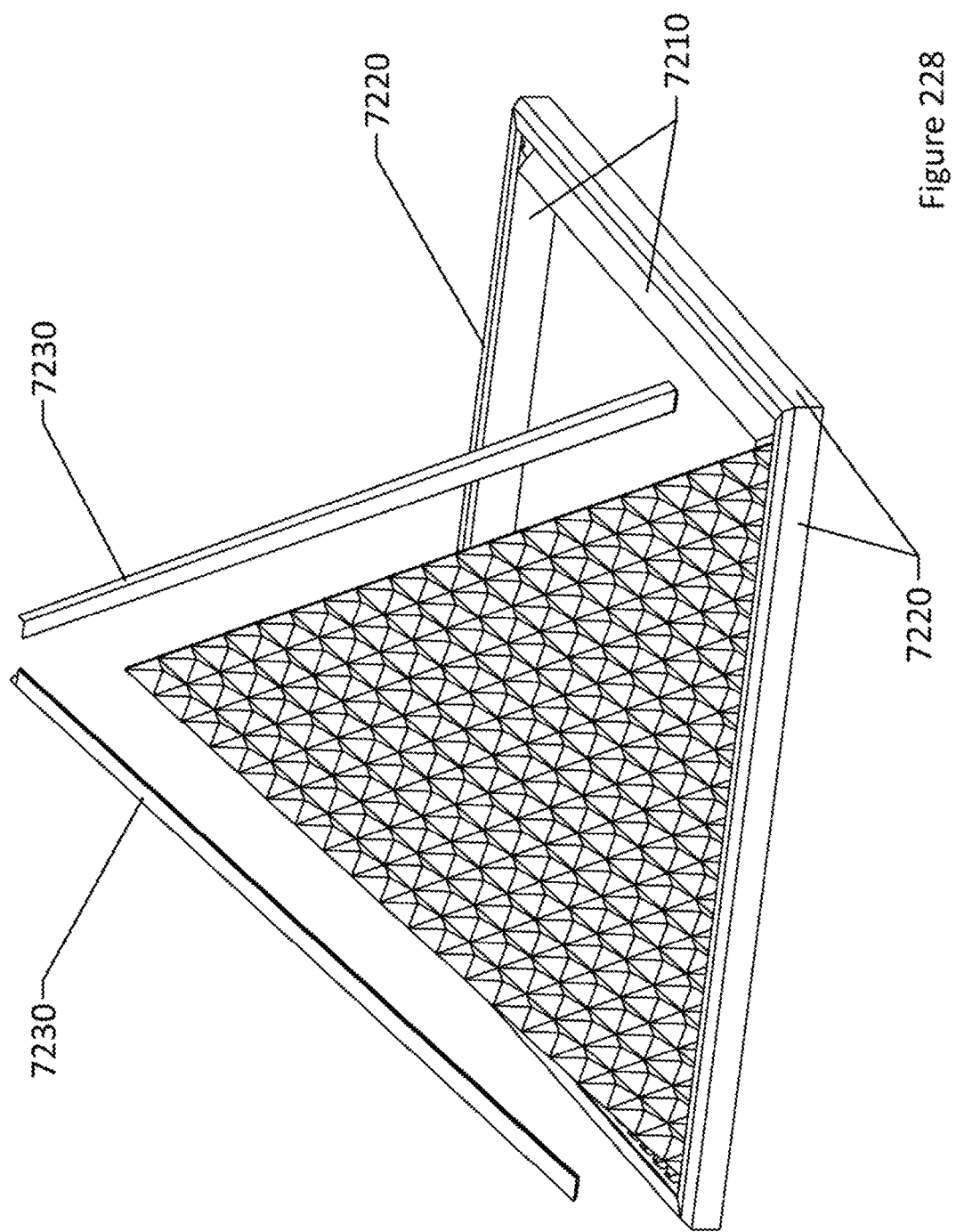

FIG. 228 shows one triangular sidewall inserted into a completed base section, with frame members in position.

Figure 229:
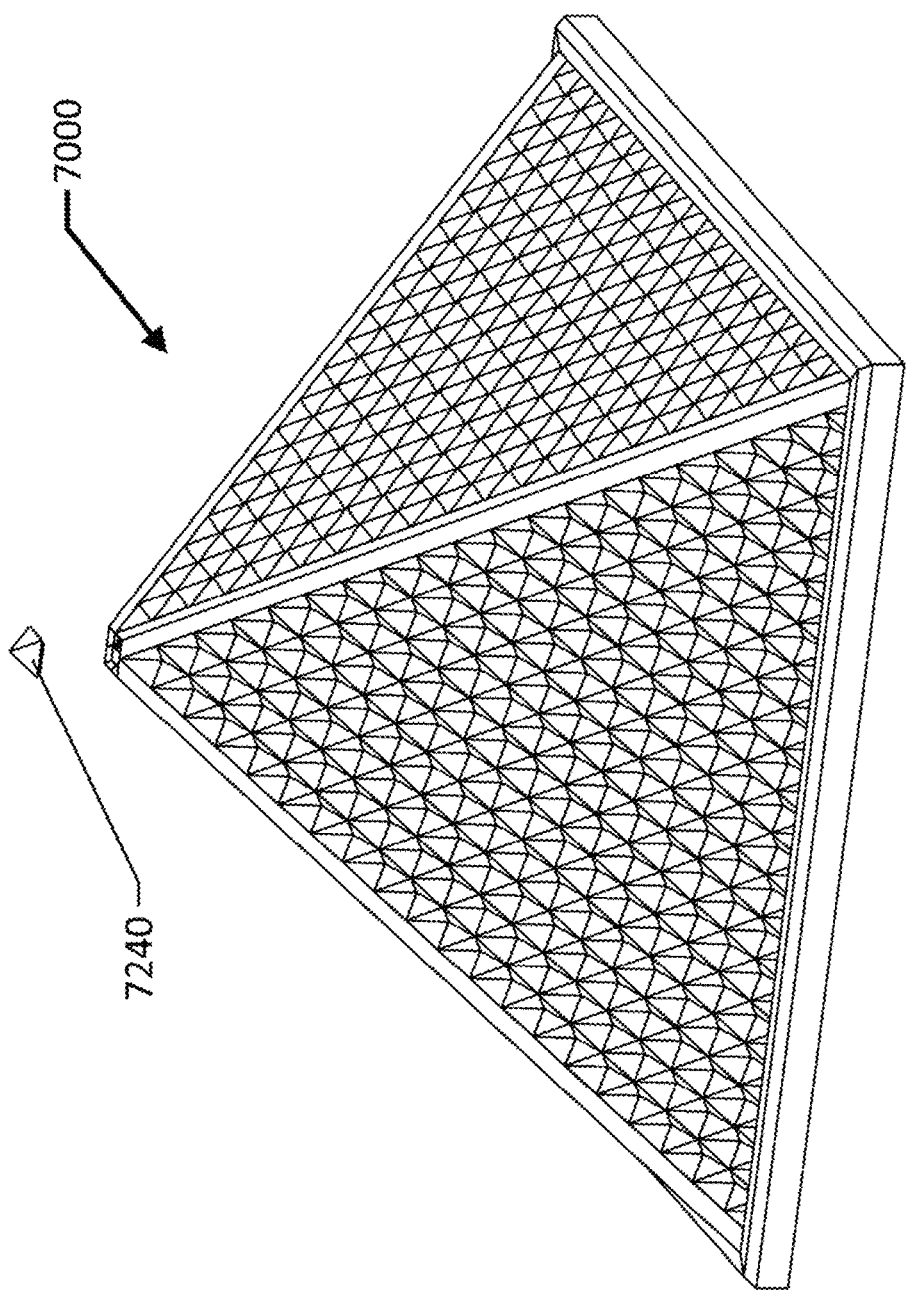

FIG. 229 shows a completed Pyramid Structure with a cap to be inserted.

Figure 230:
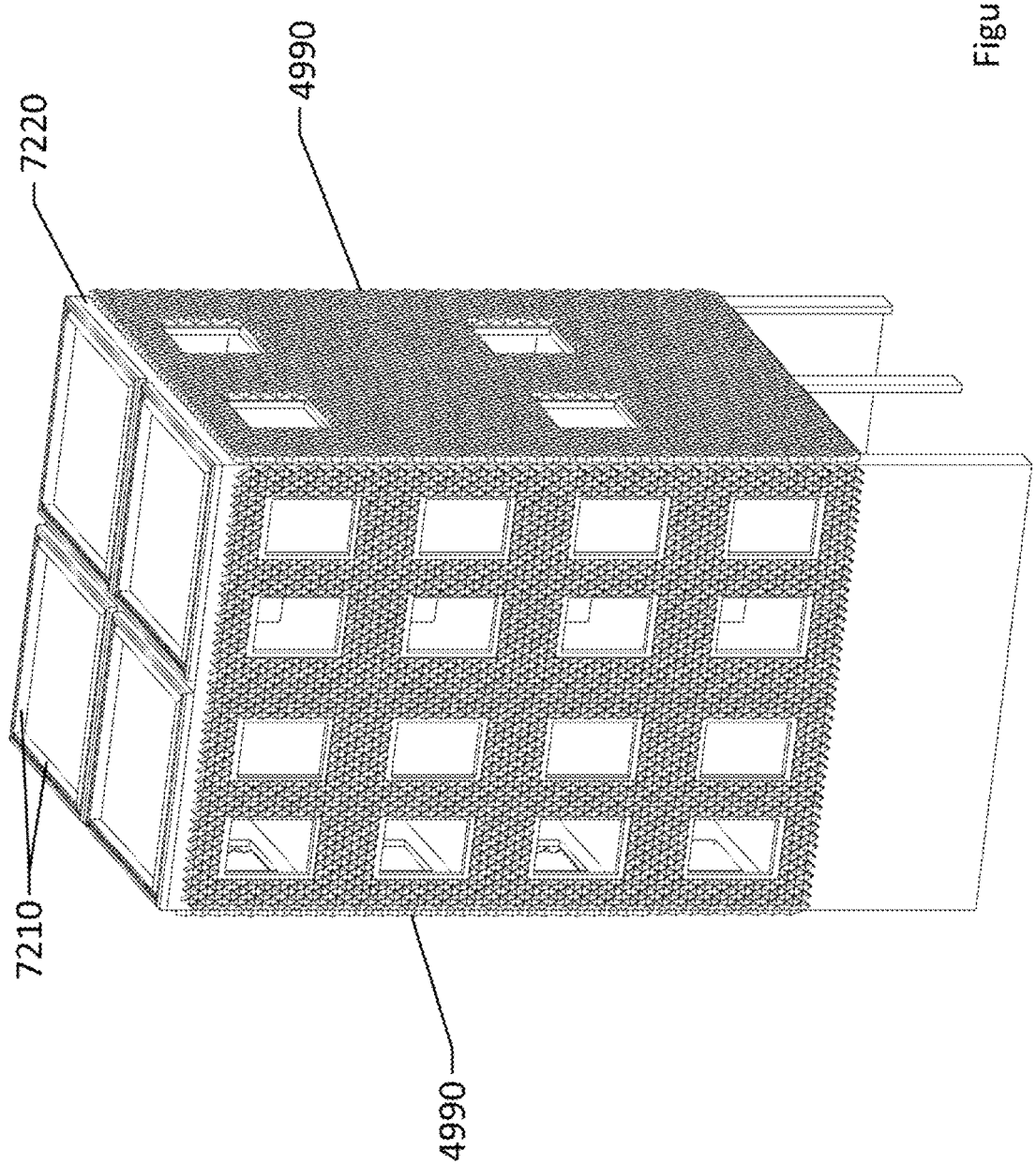

FIG. 230 shows a building with sides covered by Pyramid Wall sections and Pyramid Structure Bases on the roof.

Figure 231:
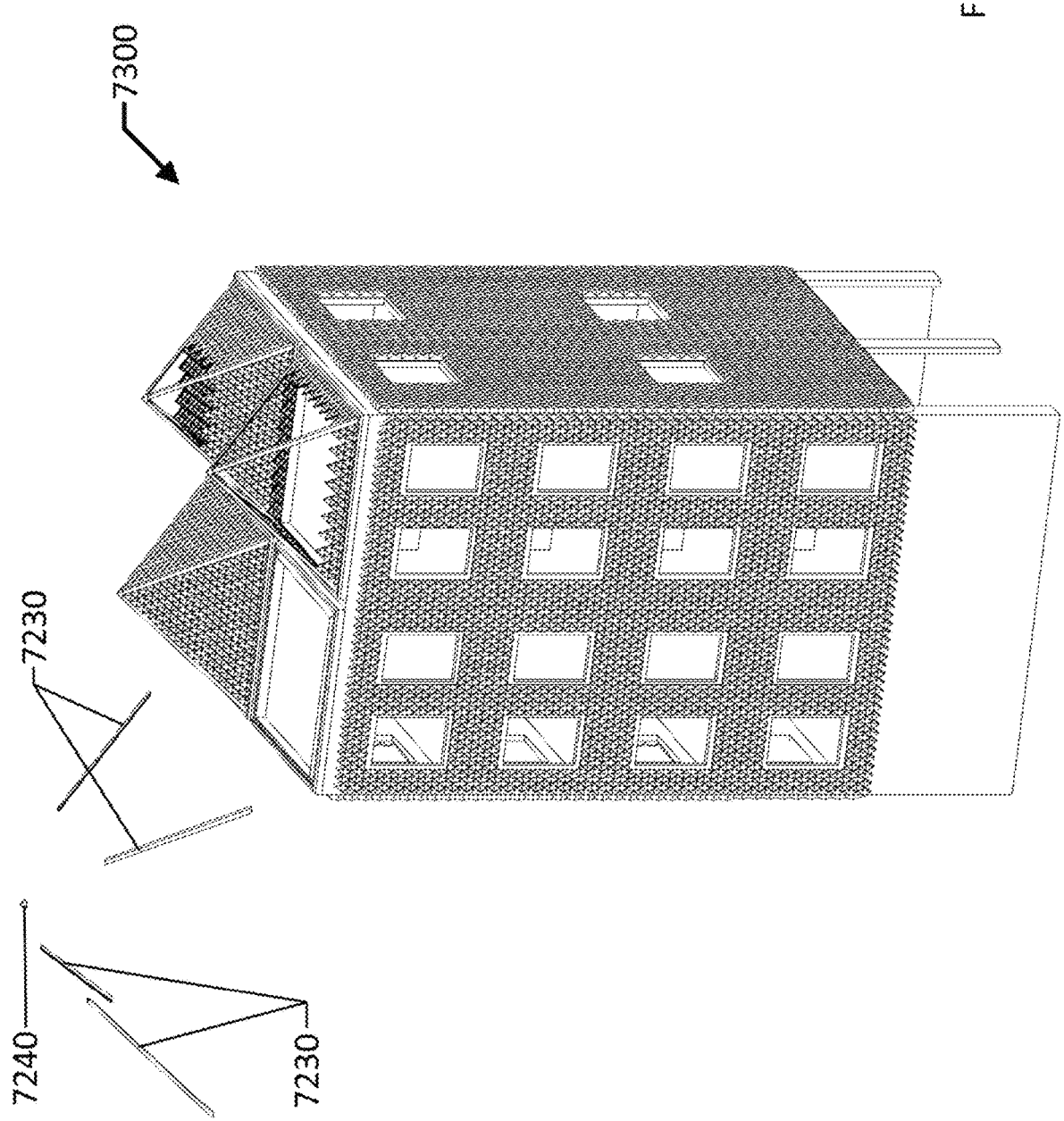

FIG. 231 shows partly assembled Pyramid Wall Structures on the roof.

Figure 232:
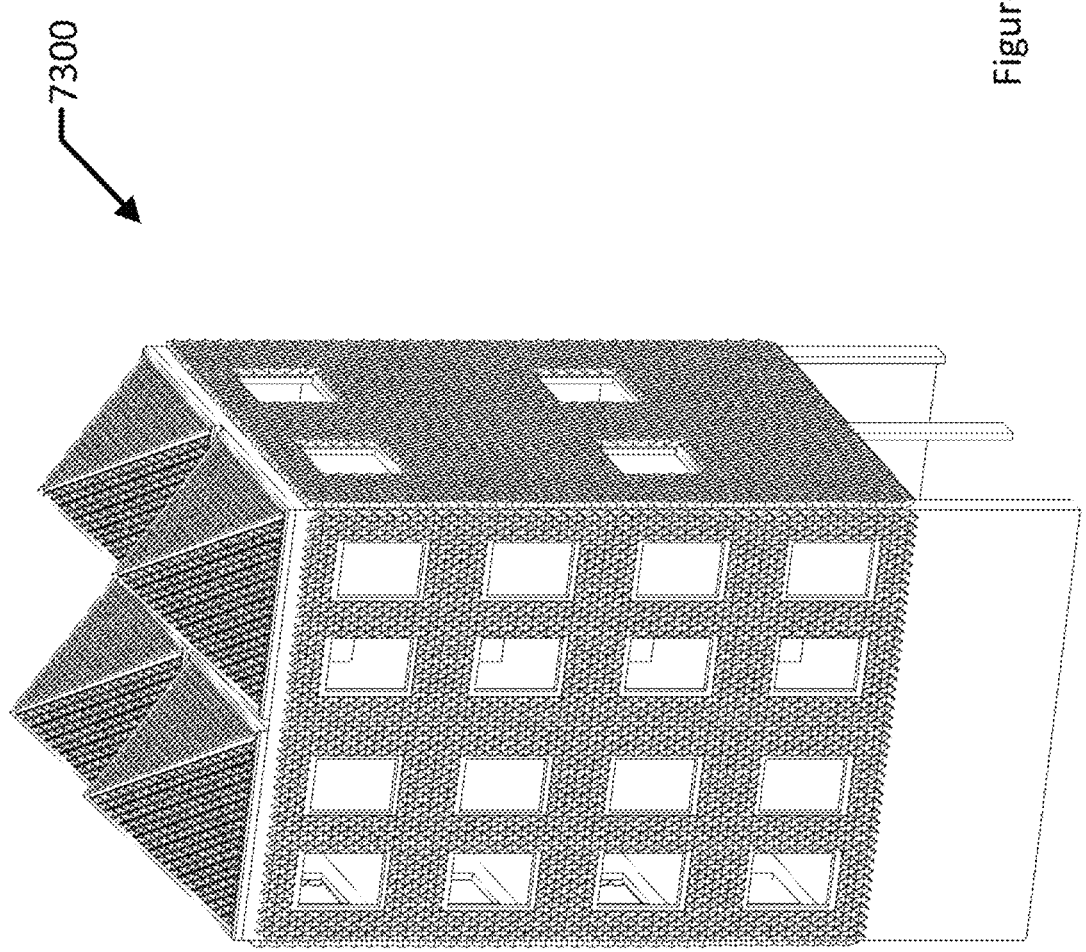

FIG. 232 shows a building with Pyramid Wall sections on its sides and four Pyramid Wall Structures on its roof.

Figure 233:
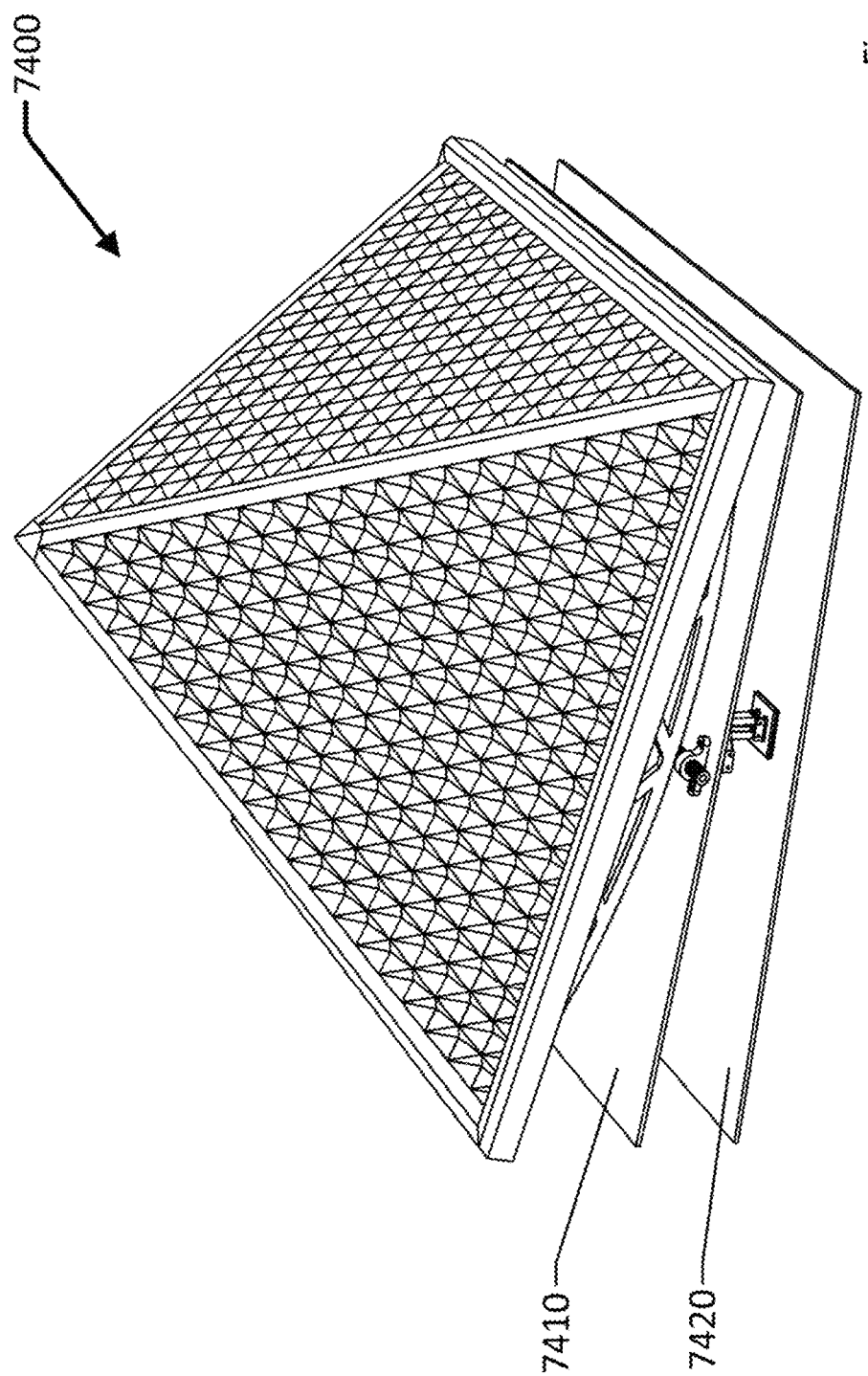

FIG. 233 shows a self-contained Pyramid Structure on a two-axis tracking system.

Figure 234:
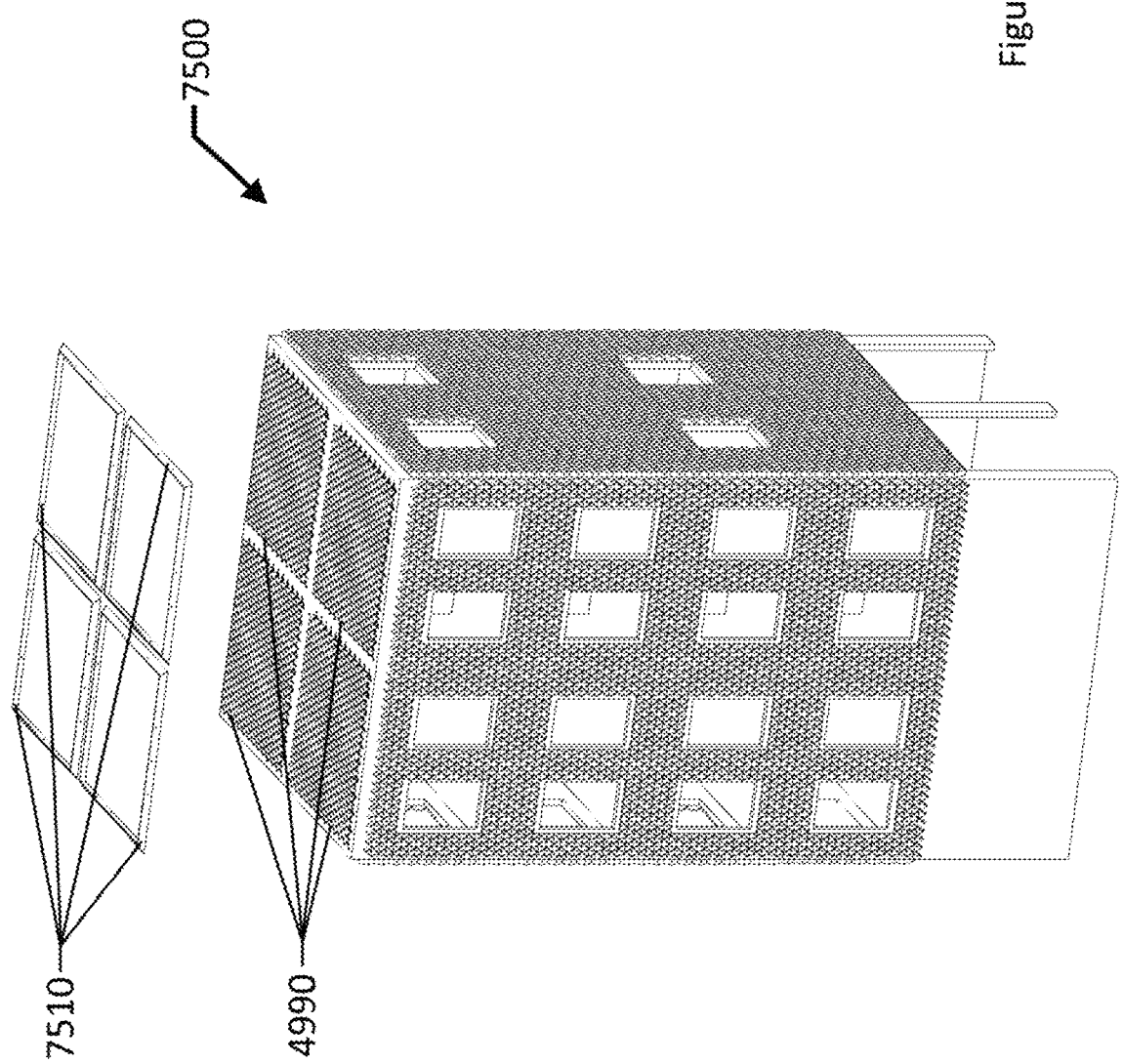

FIG. 234 shows an alternate building setup, with sides and roof covered with a single layer Pyramid Wall System.

FIG. 235 shows a cropped detail of a Wind Skirt surrounding a Pyramid Wall Section.

Figure 236A:
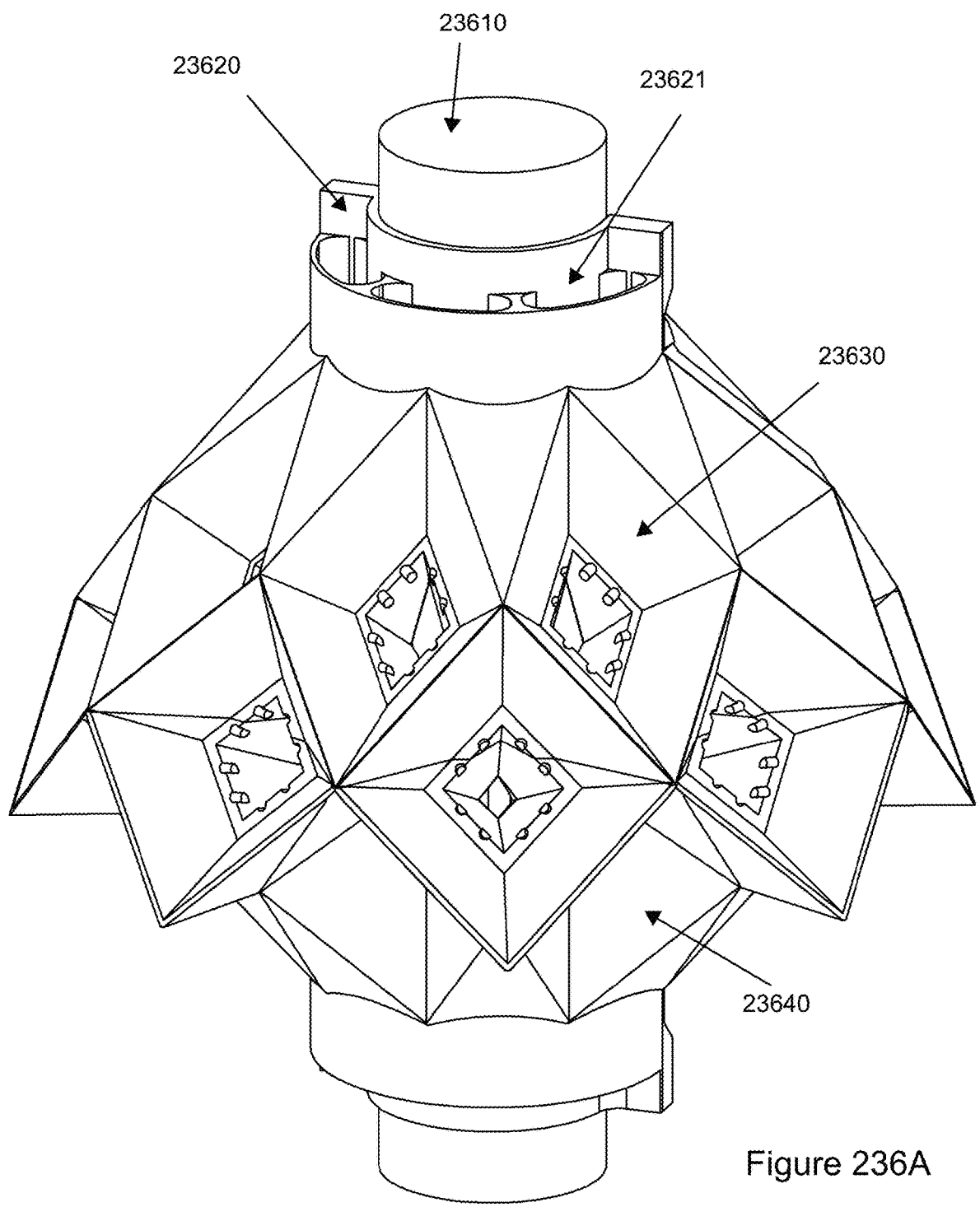

FIG. 236A shows a lamp post embodiment.

Figure 236B:
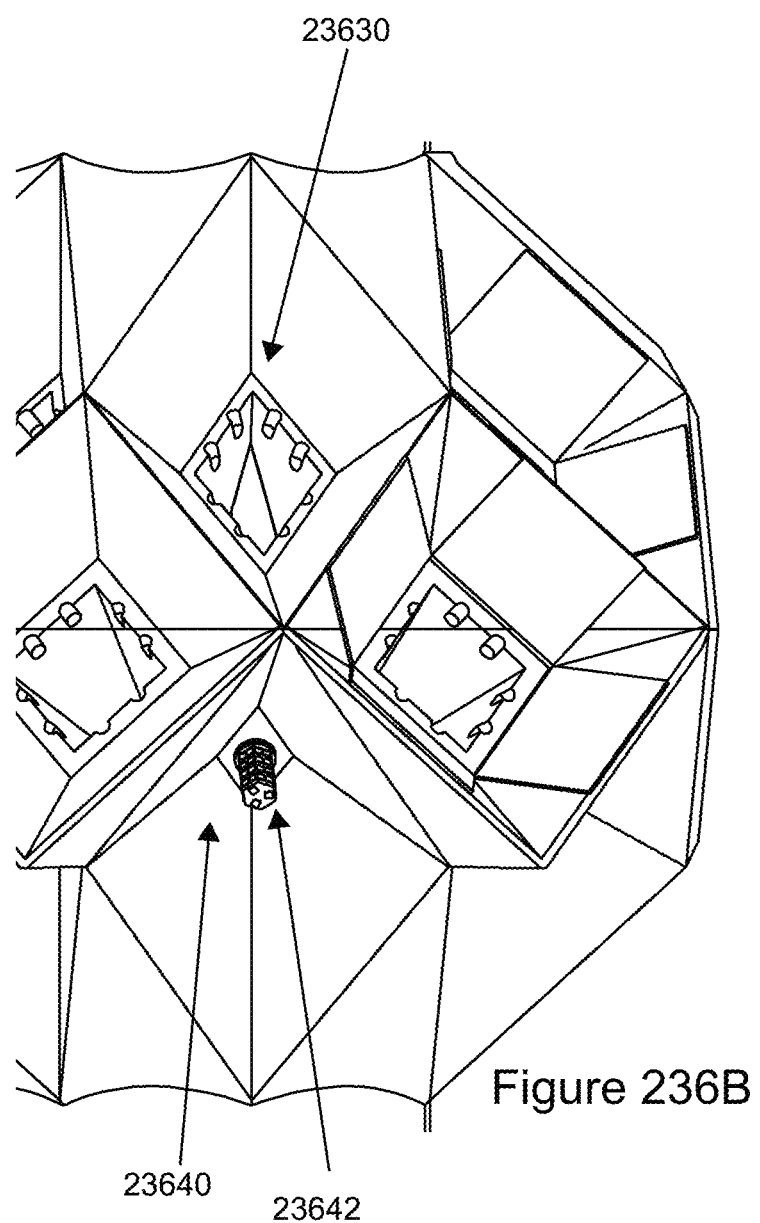

FIG. 236B shows another view of the lamp post embodiment.

Figure 237:
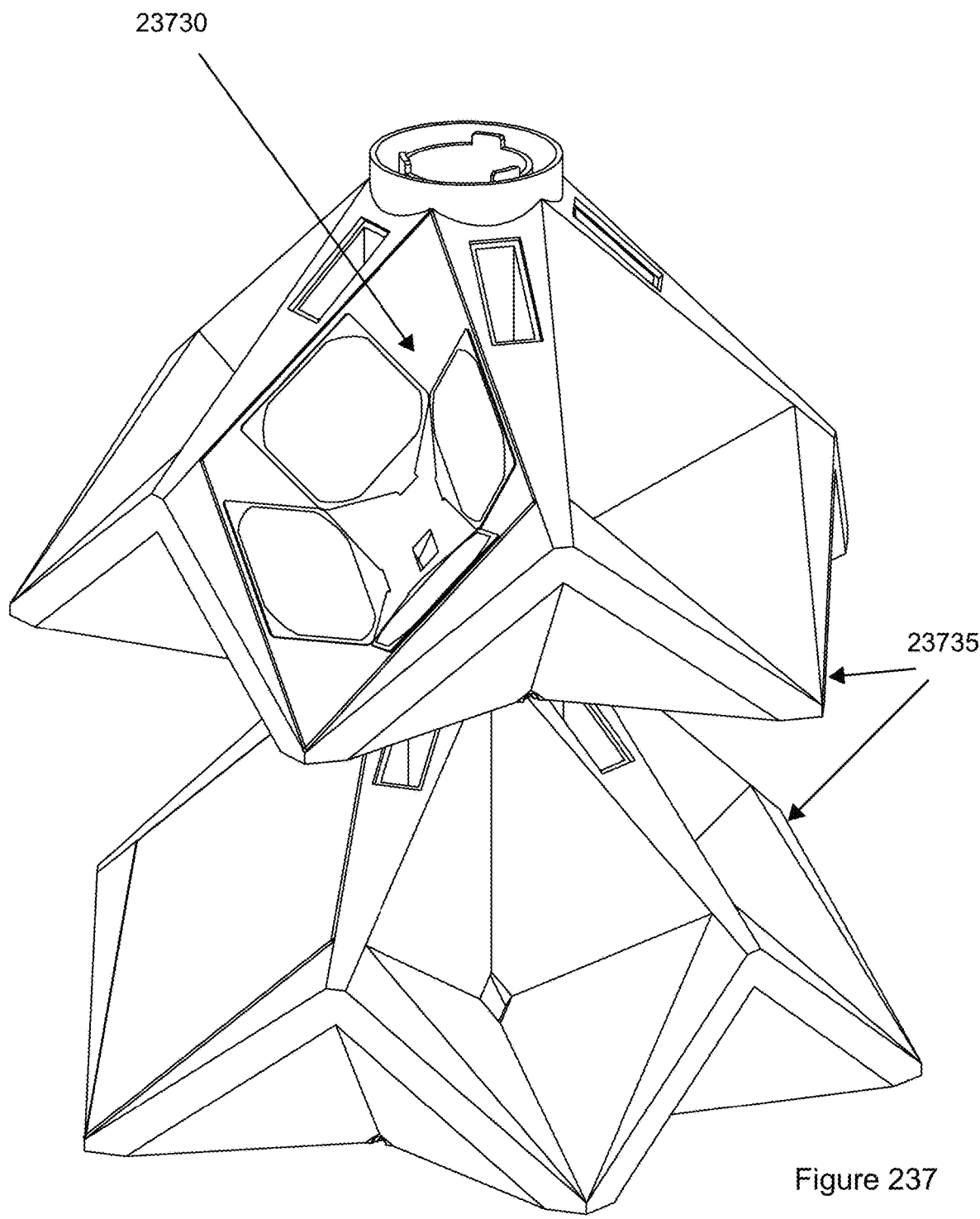

FIG. 237 demonstrates stacked units for another lamp post embodiment.

Figure 238:
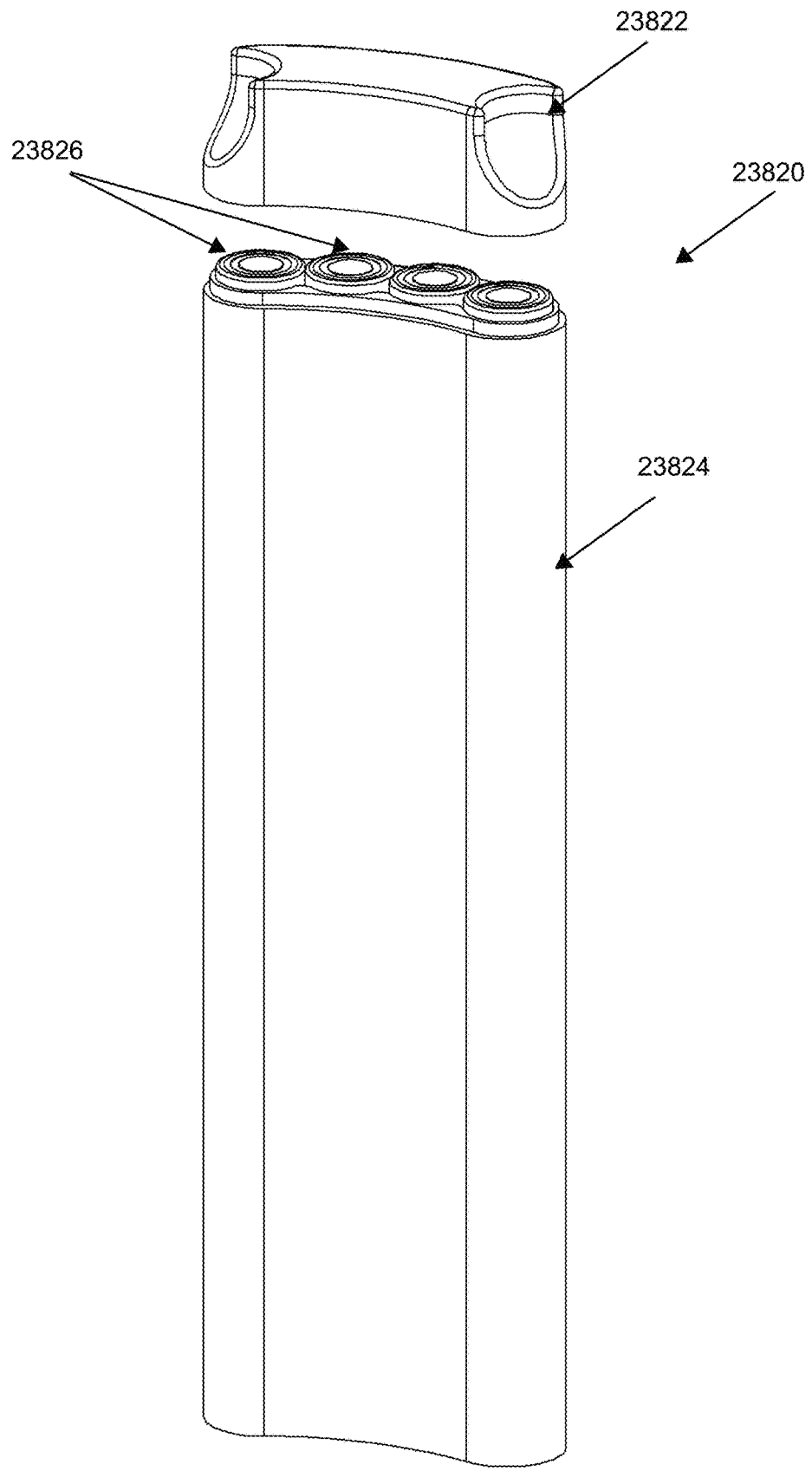

FIG. 238 shows a battery pack for use in the lamp post embodiment.

Figure 239:
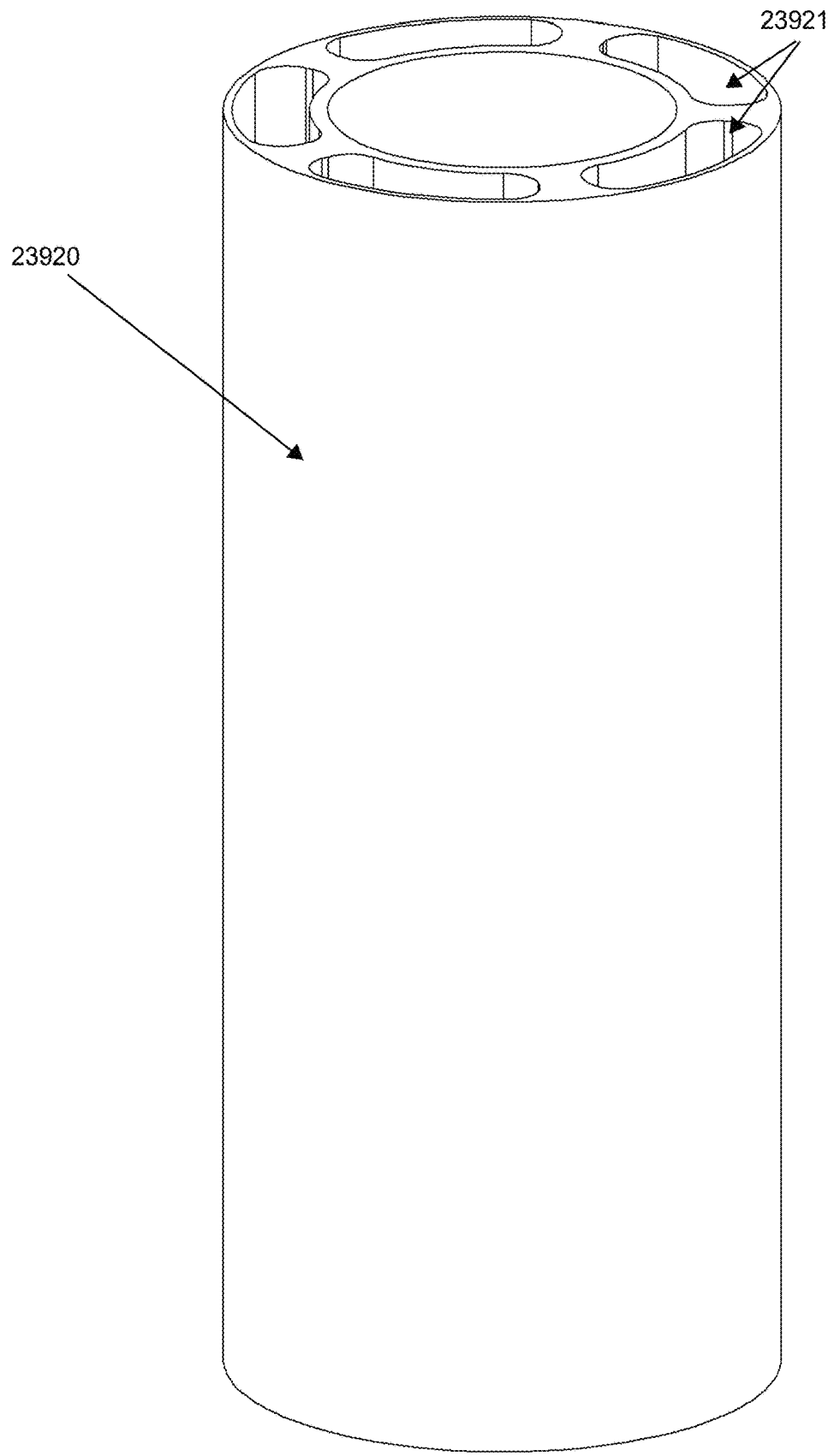

FIG. 239 shows a curved battery wrap for use in the lamp post embodiment.

Figure 240:
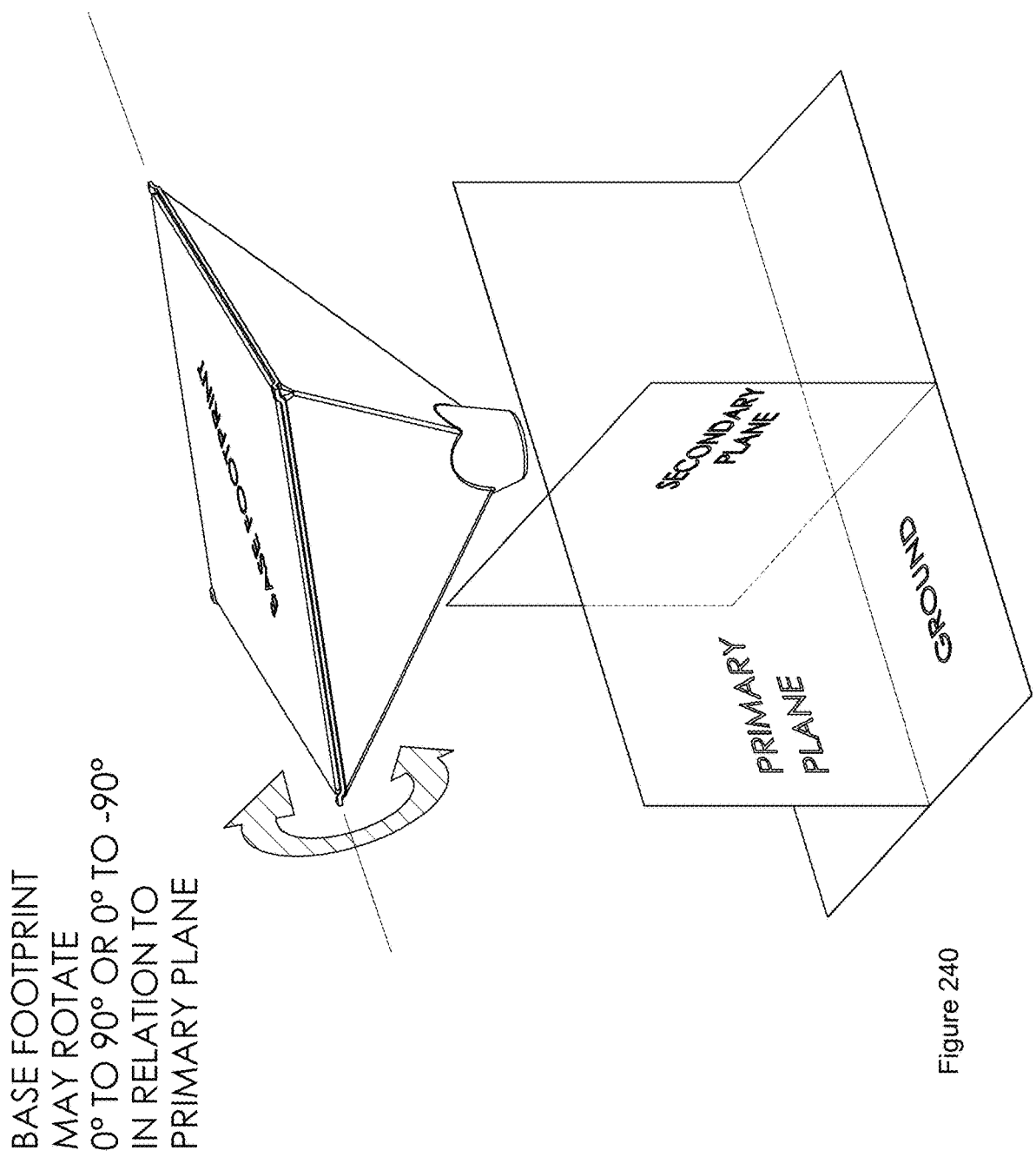

FIG. 240 illustrates a first rotation for a rhombus pyramid.

Figure 241:
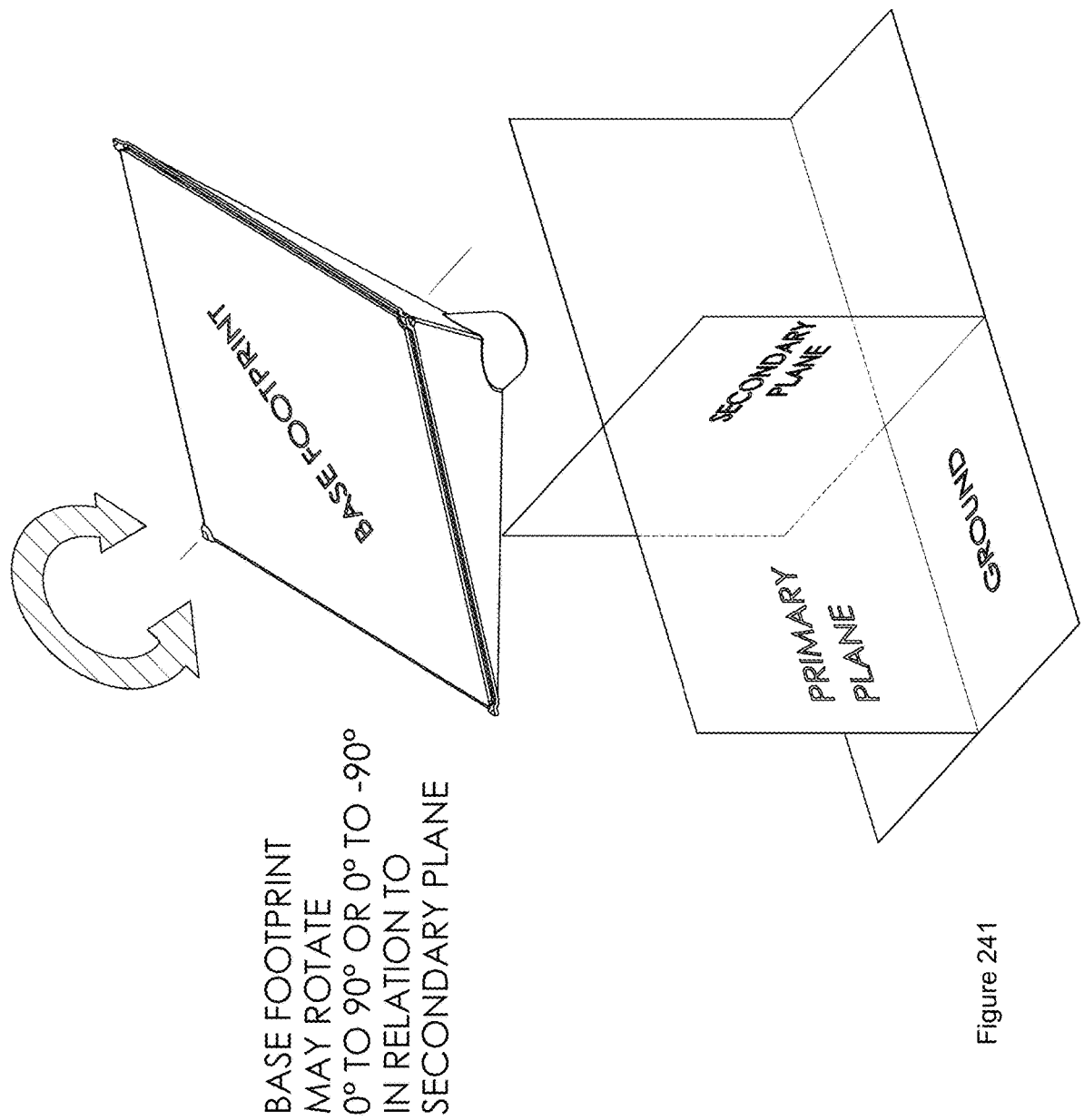

FIG. 241 illustrates a second rotation for a rhombus pyramid.

Figure 242:
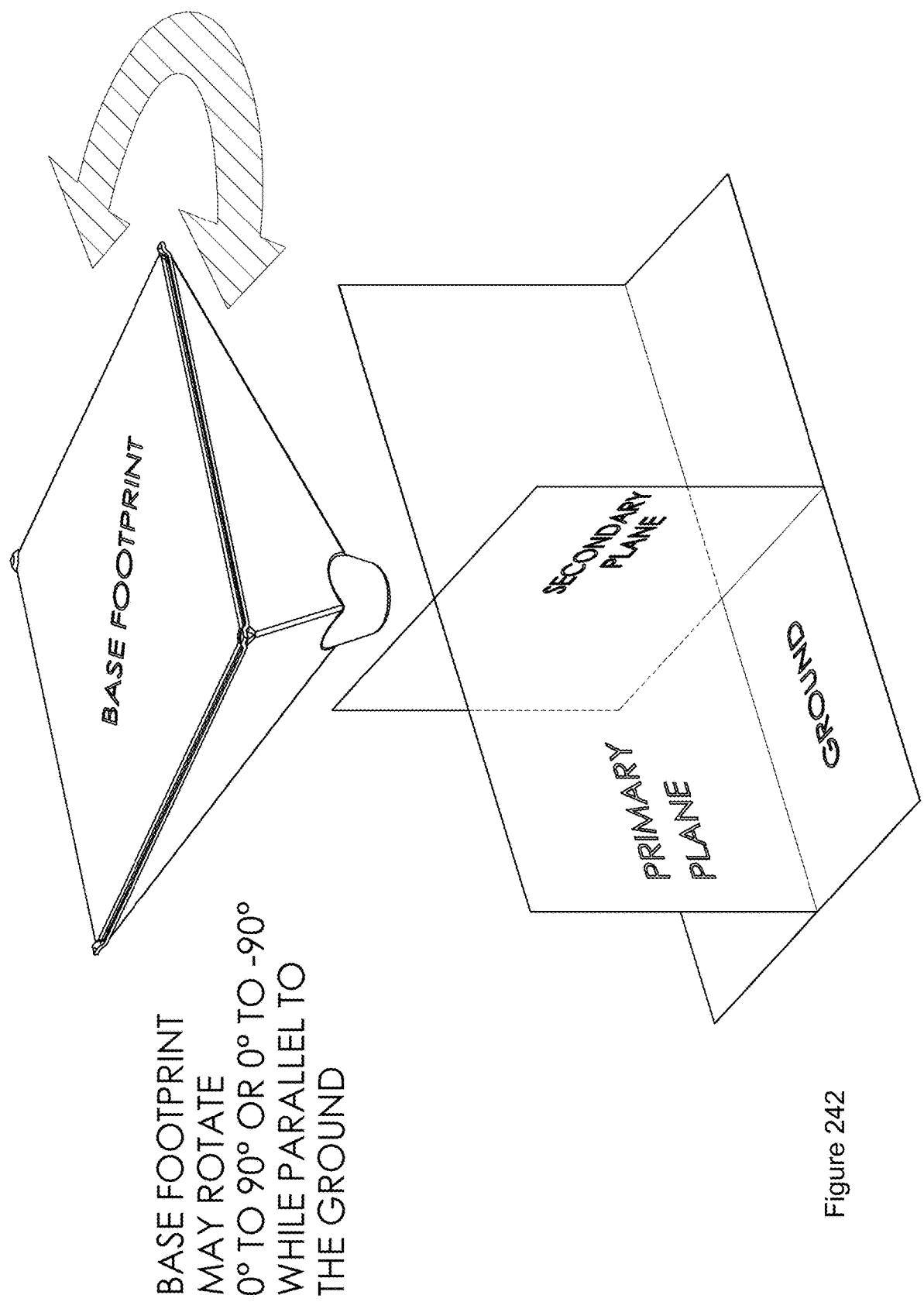

FIG. 242 illustrates a third rotation for a rhombus pyramid.

Figure 243:
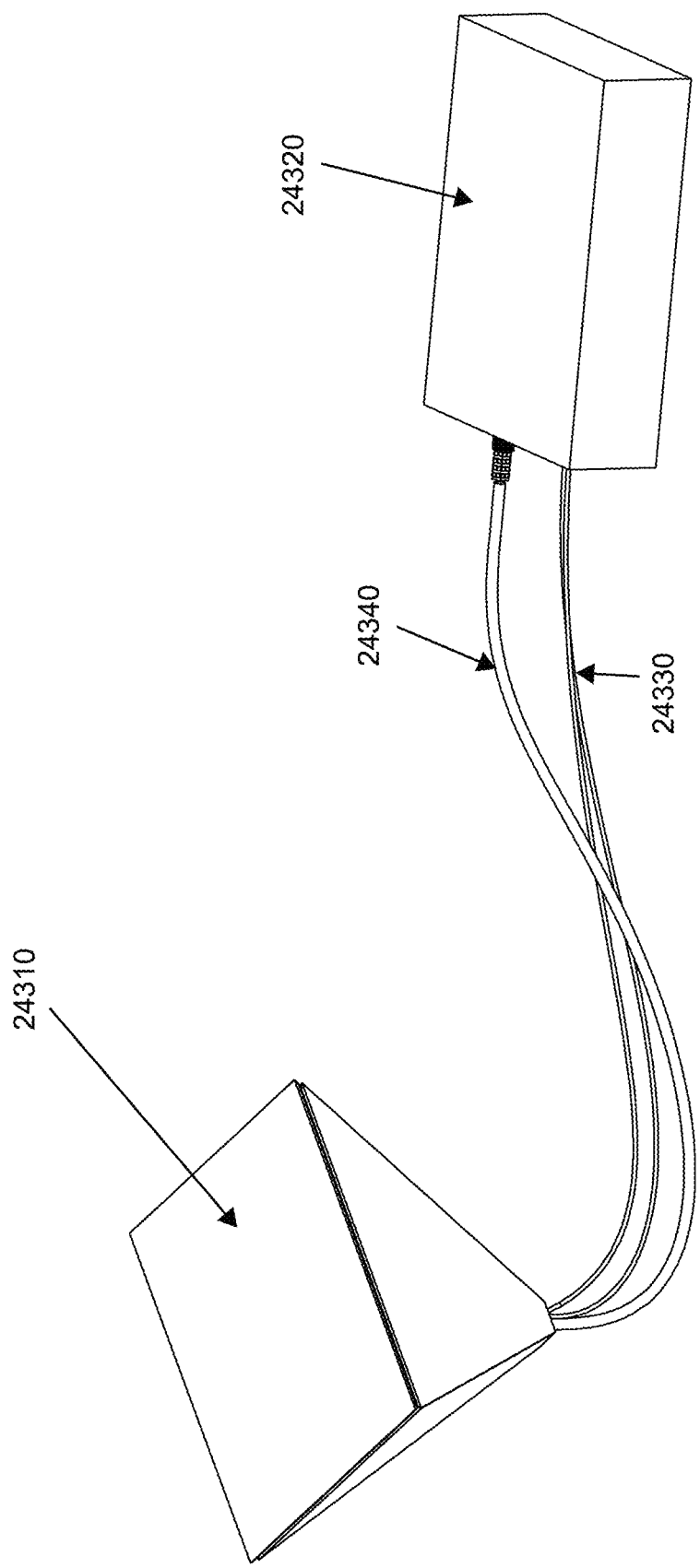

FIG. 243 shows a single collector unit with a control panel for use in various embodiments.

Figure 244:
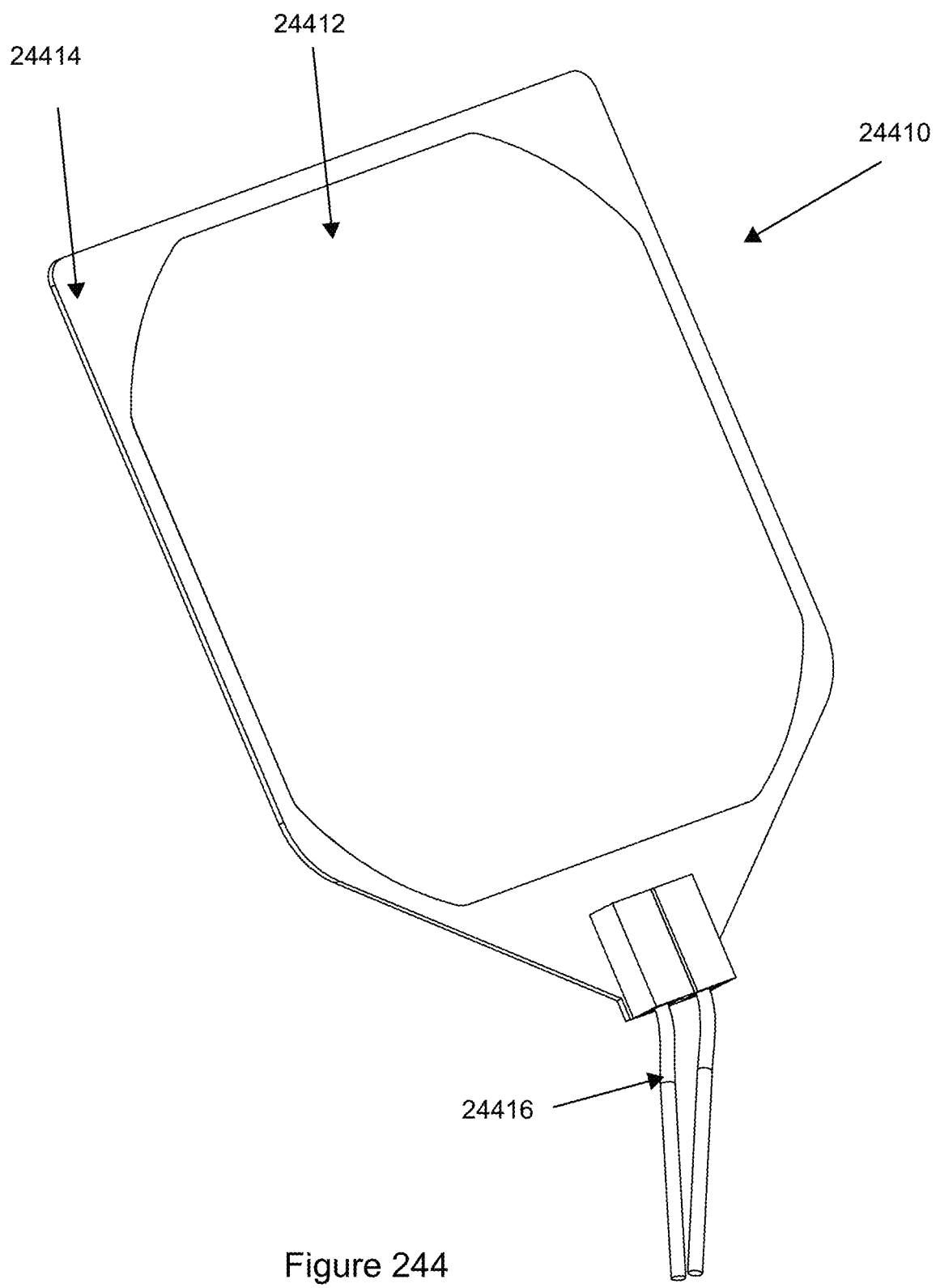

FIG. 244 shows a unit cell collector of the collector unit.

Figure 245:
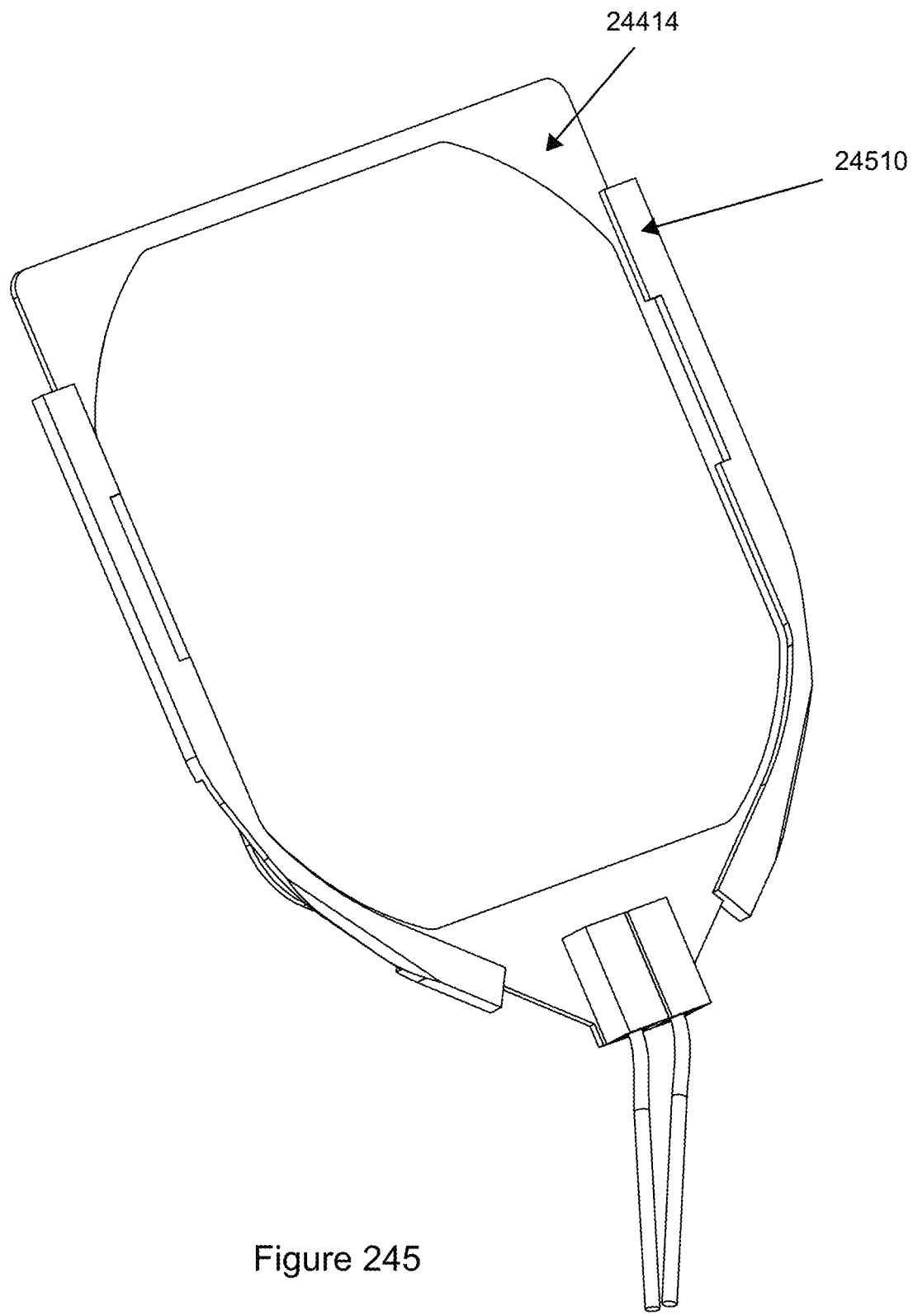

FIG. 245 shows the unit cell collector with a support clip.

Figure 246:
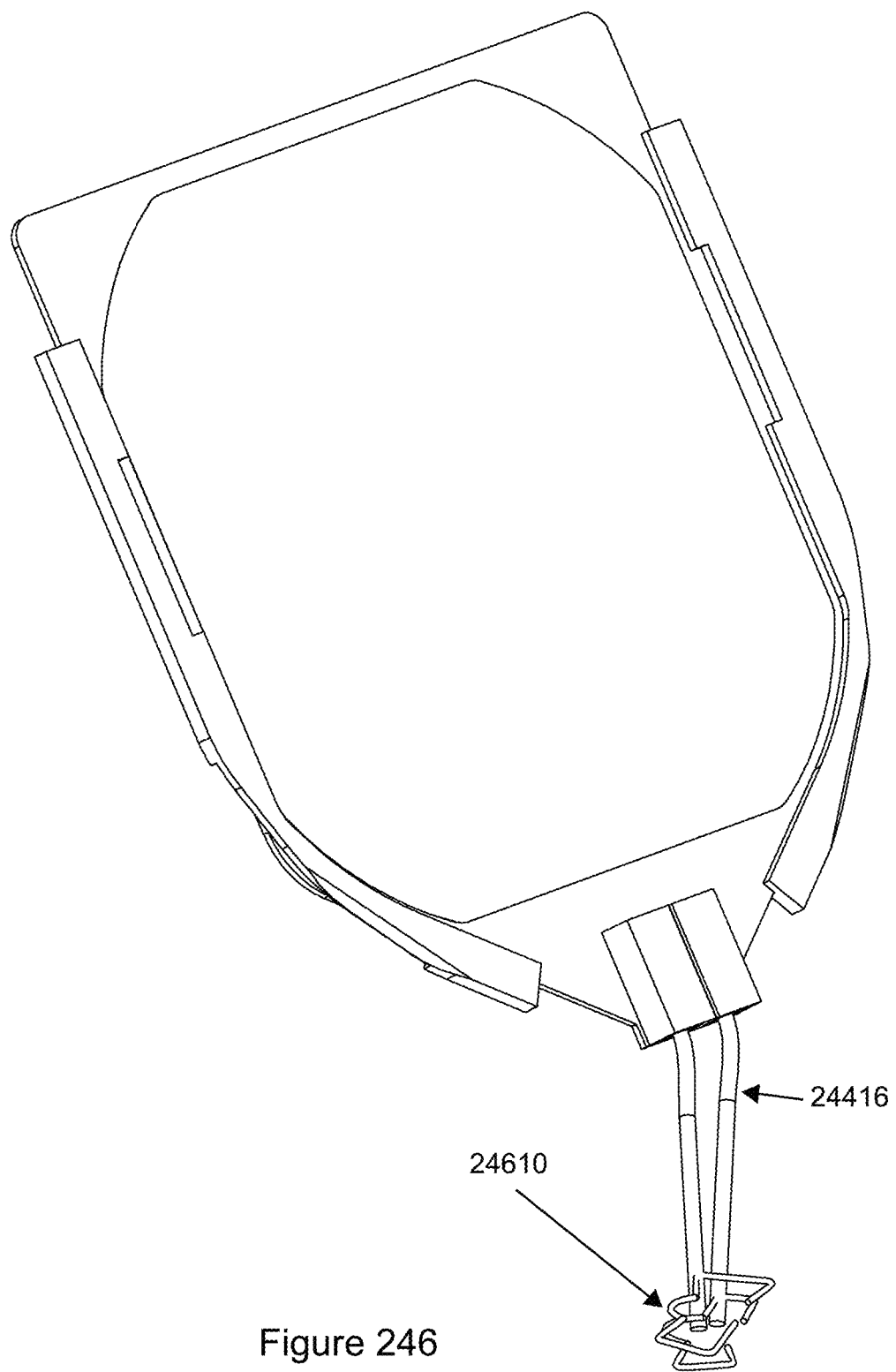

FIG. 246 shows the unit cell collector with a lead connector.

Figure 247:
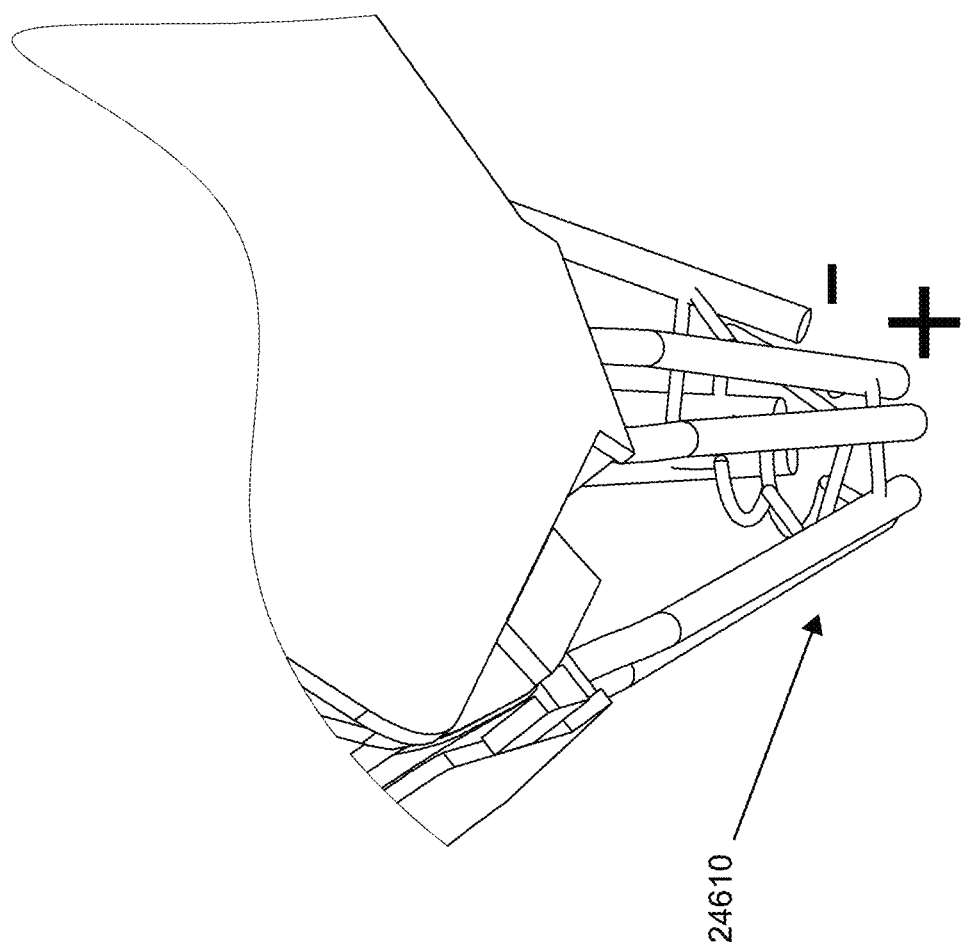

FIG. 247 demonstrates the lead connector closeup.

Figure 248:
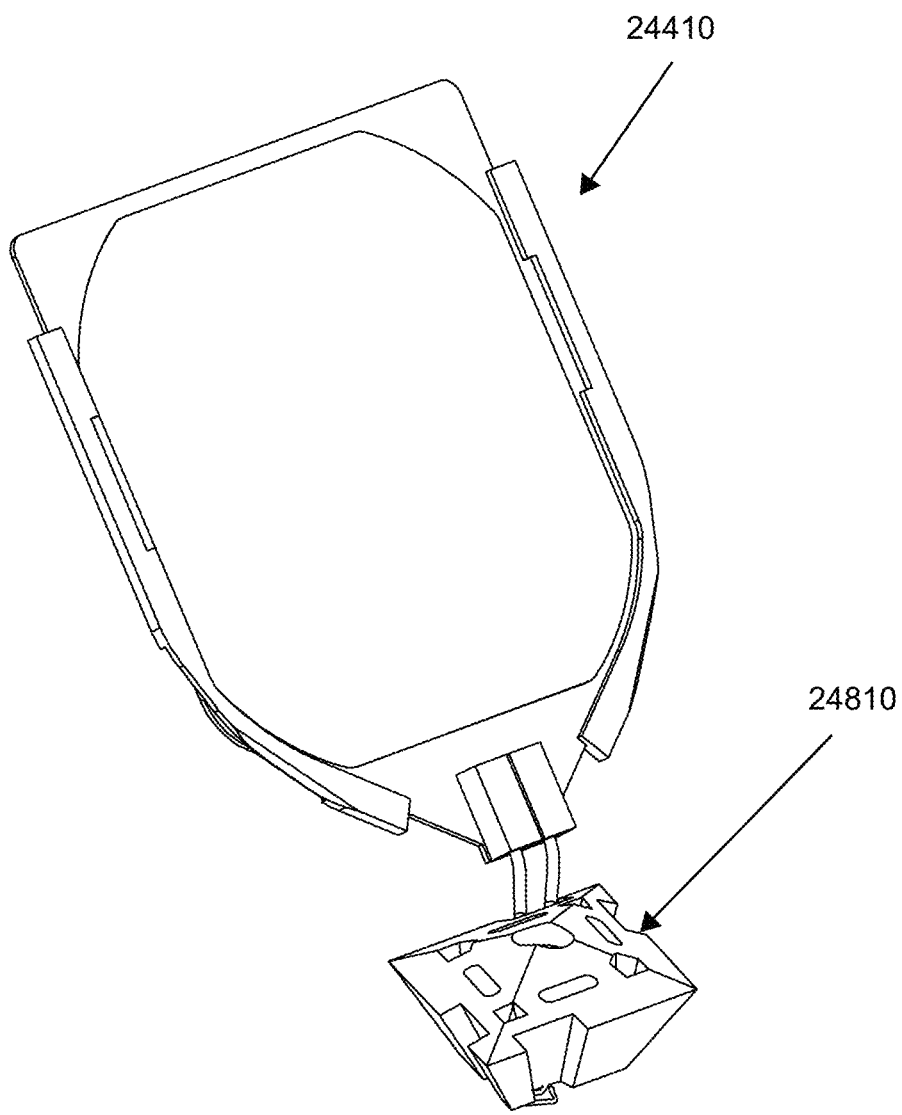

FIG. 248 shows the unit cell collector with a unit junction.

Figure 249:
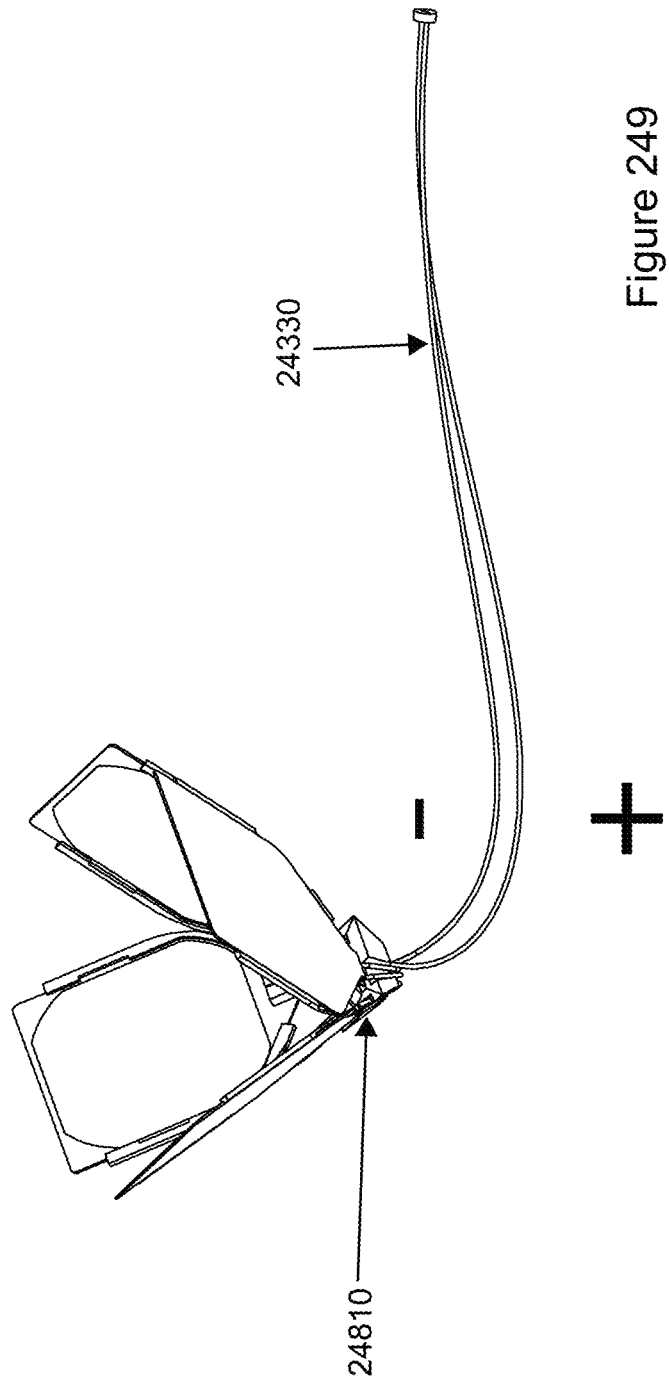

FIG. 249 shows multiple unit cell collectors of the collector unit connected to a power connection.

Figure 250:
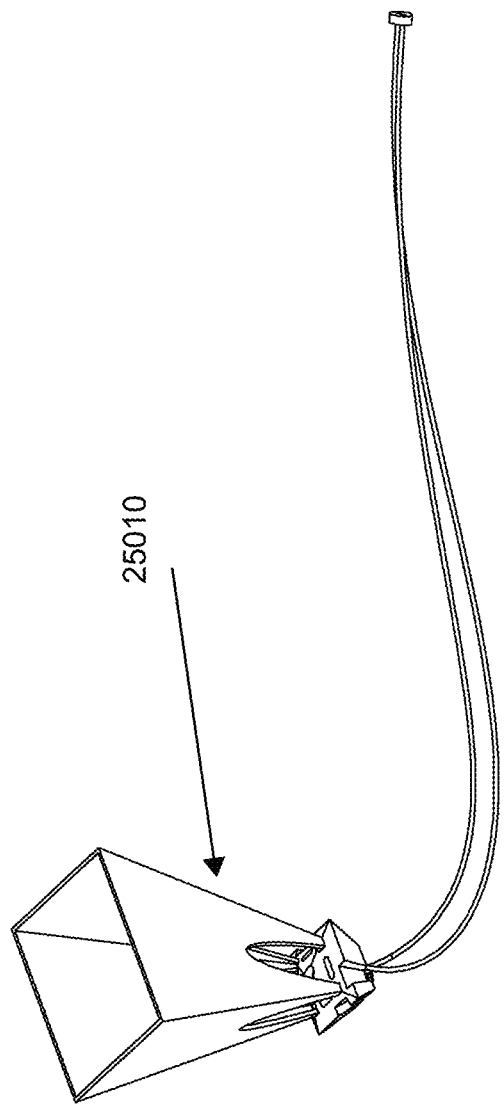

FIG. 250 shows a flower base for the collector unit.

Figure 251:
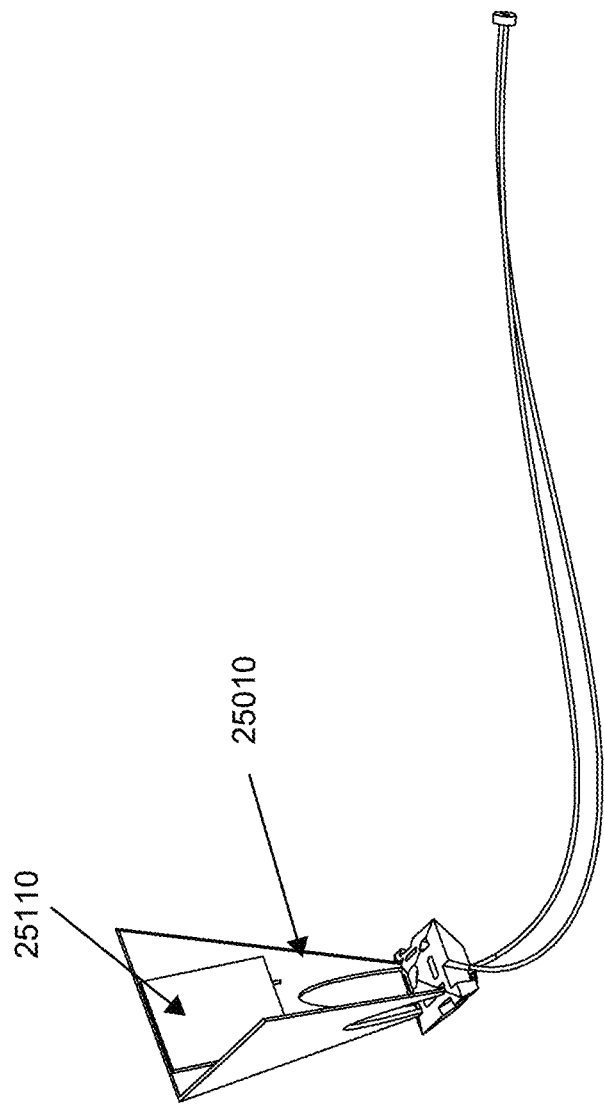

FIG. 251 shows the flower base with a flower cell.

Figure 252:
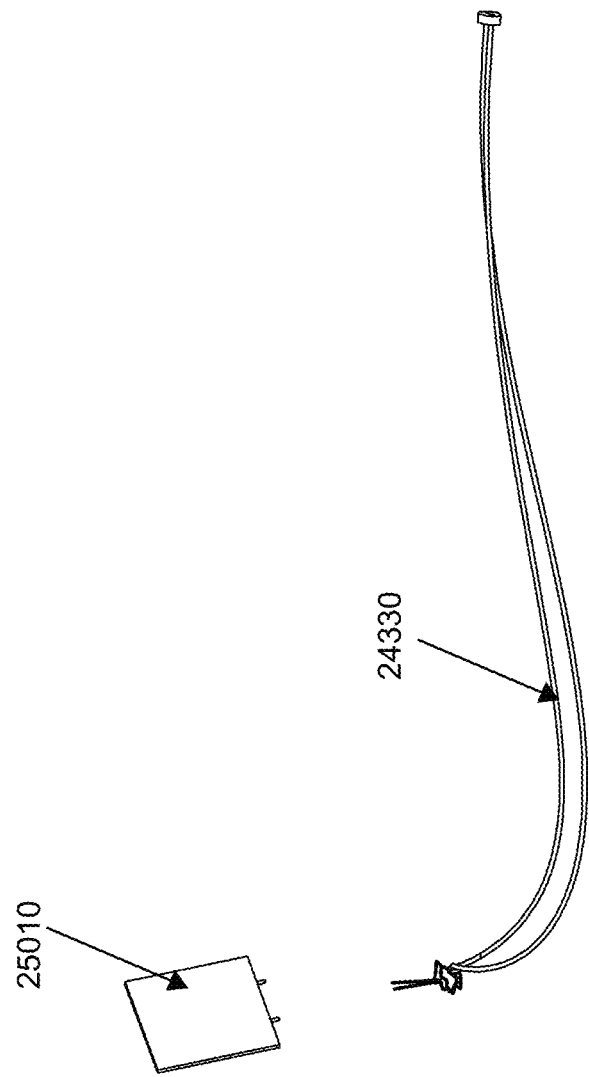

FIG. 252 shows the flower cell and the power leads.

Figure 253:
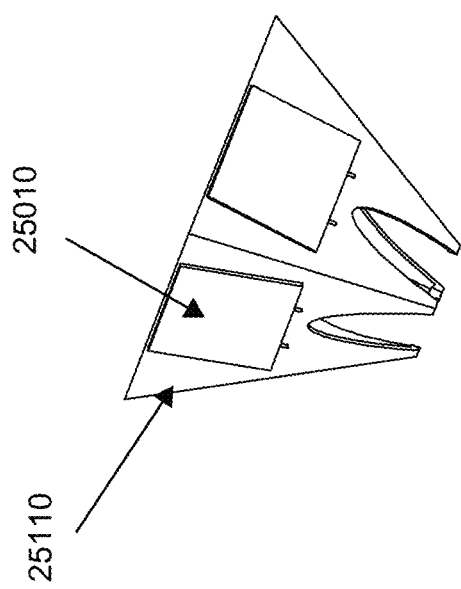

FIG. 253 shows the backside of the flower base with additional flower cell.

Figure 254:
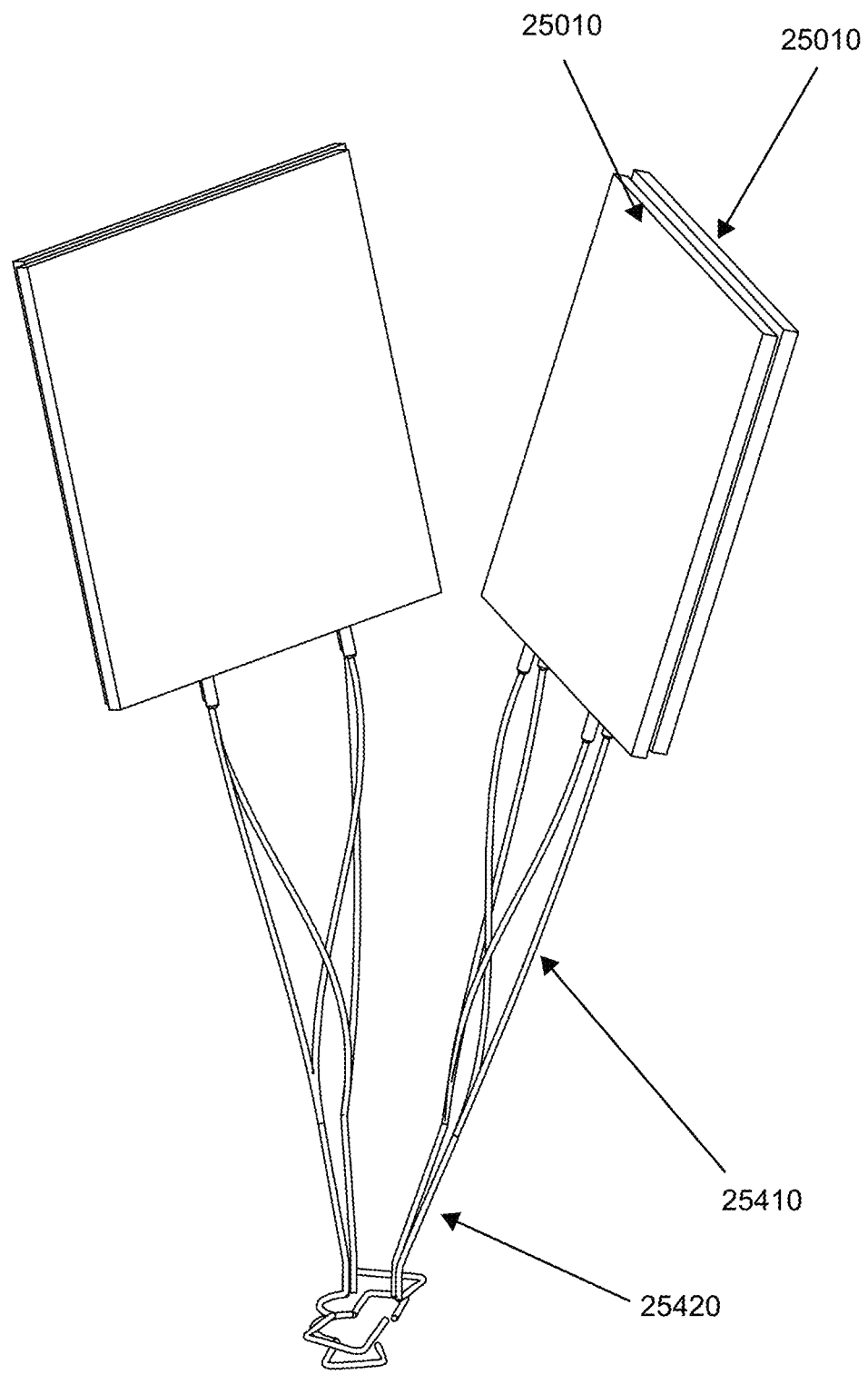

FIG. 254 shows two sets of back-to-back flower cells connected to the power leads.

Figure 255:
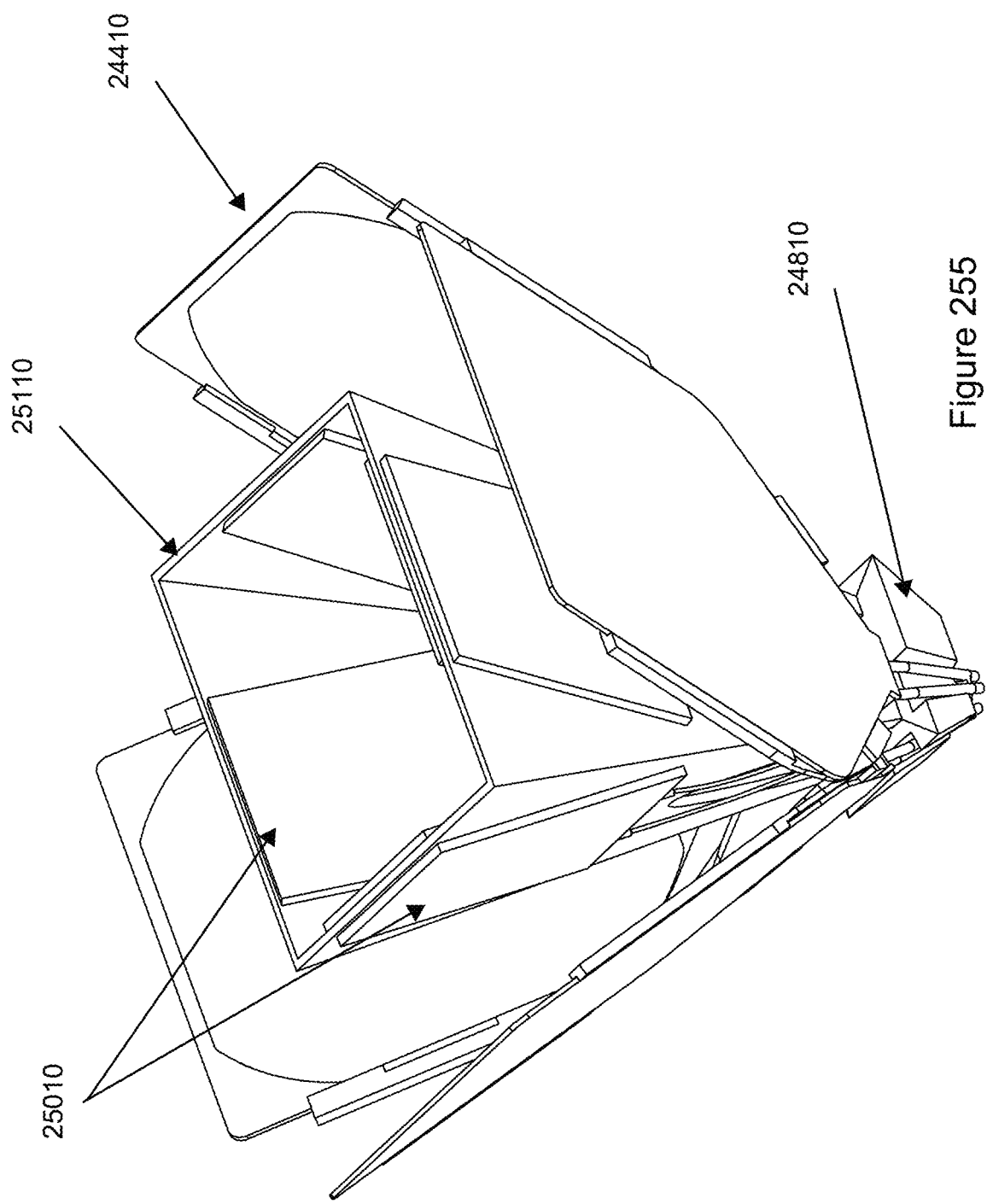

FIG. 255 shows the unit cell collectors and flower cells of the collector unit.

Figure 256:
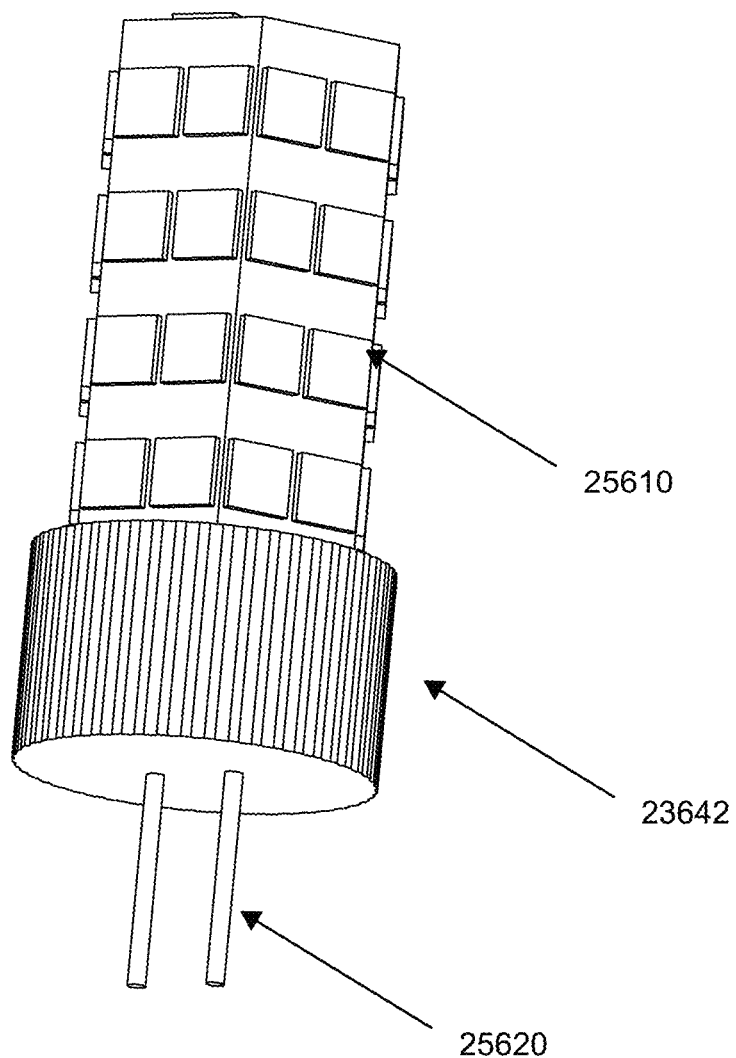

FIG. 256 illustrates an LED for use in various embodiments.

Figure 257:
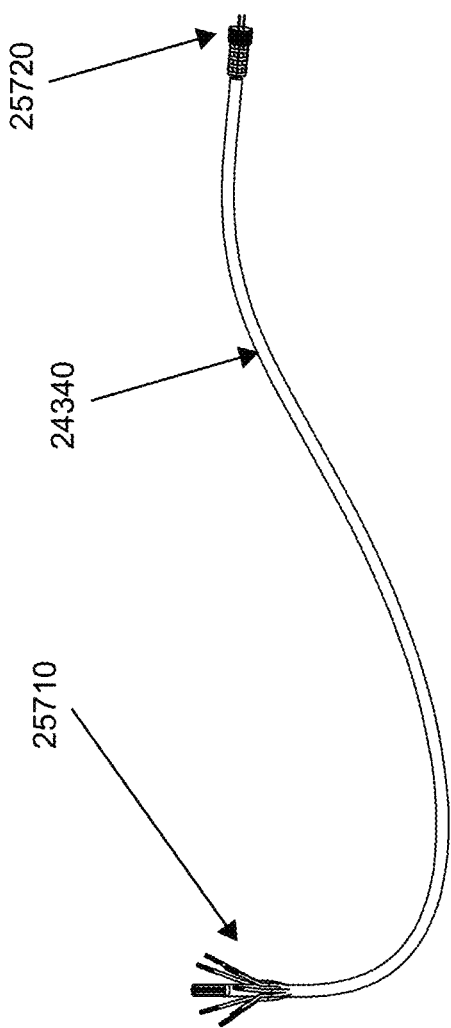

FIG. 257 illustrates an expanded fiber optic cable for use in various embodiments.

Figure 258:
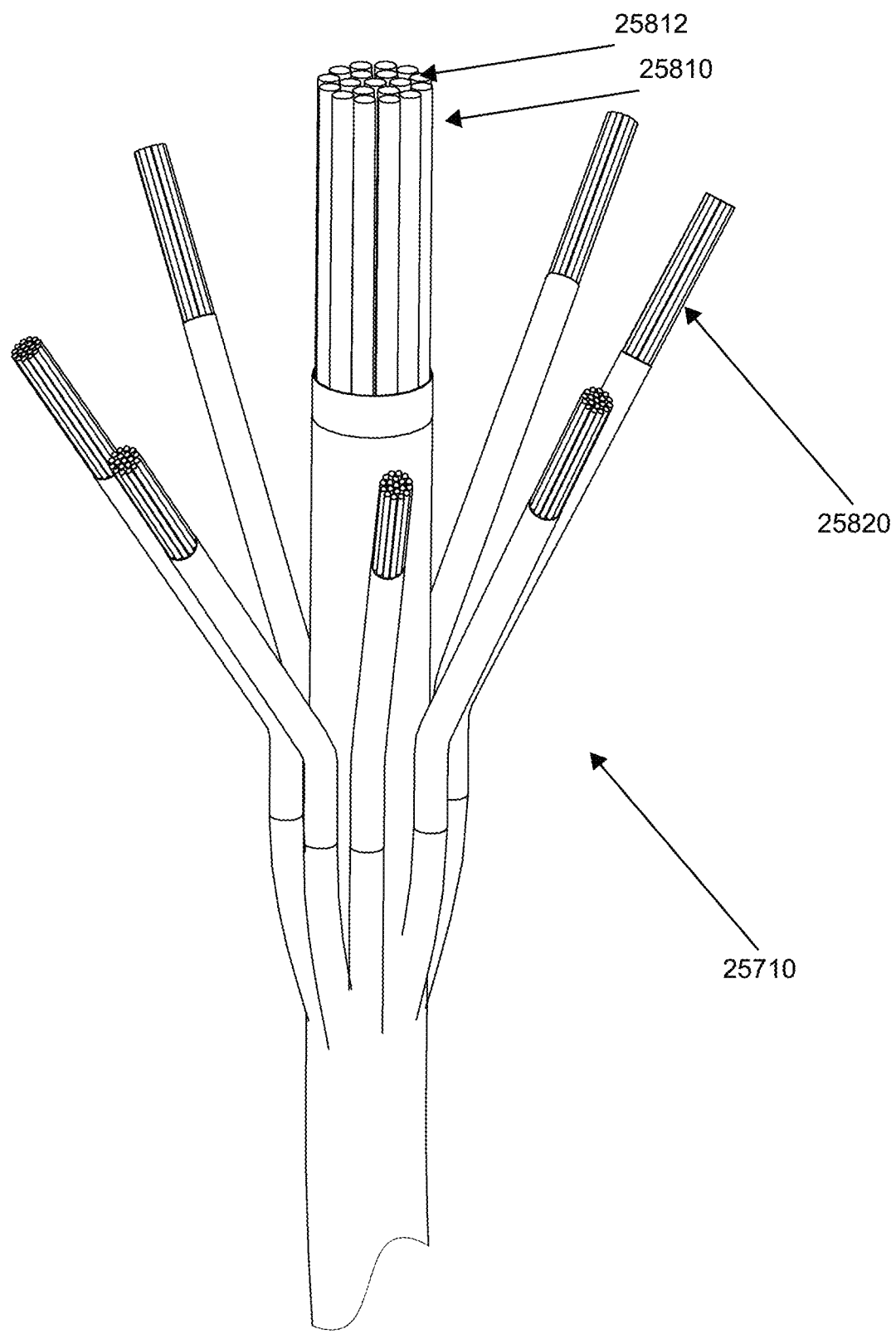

FIG. 258 illustrates one end of the fiber optic cable.

Figure 259:
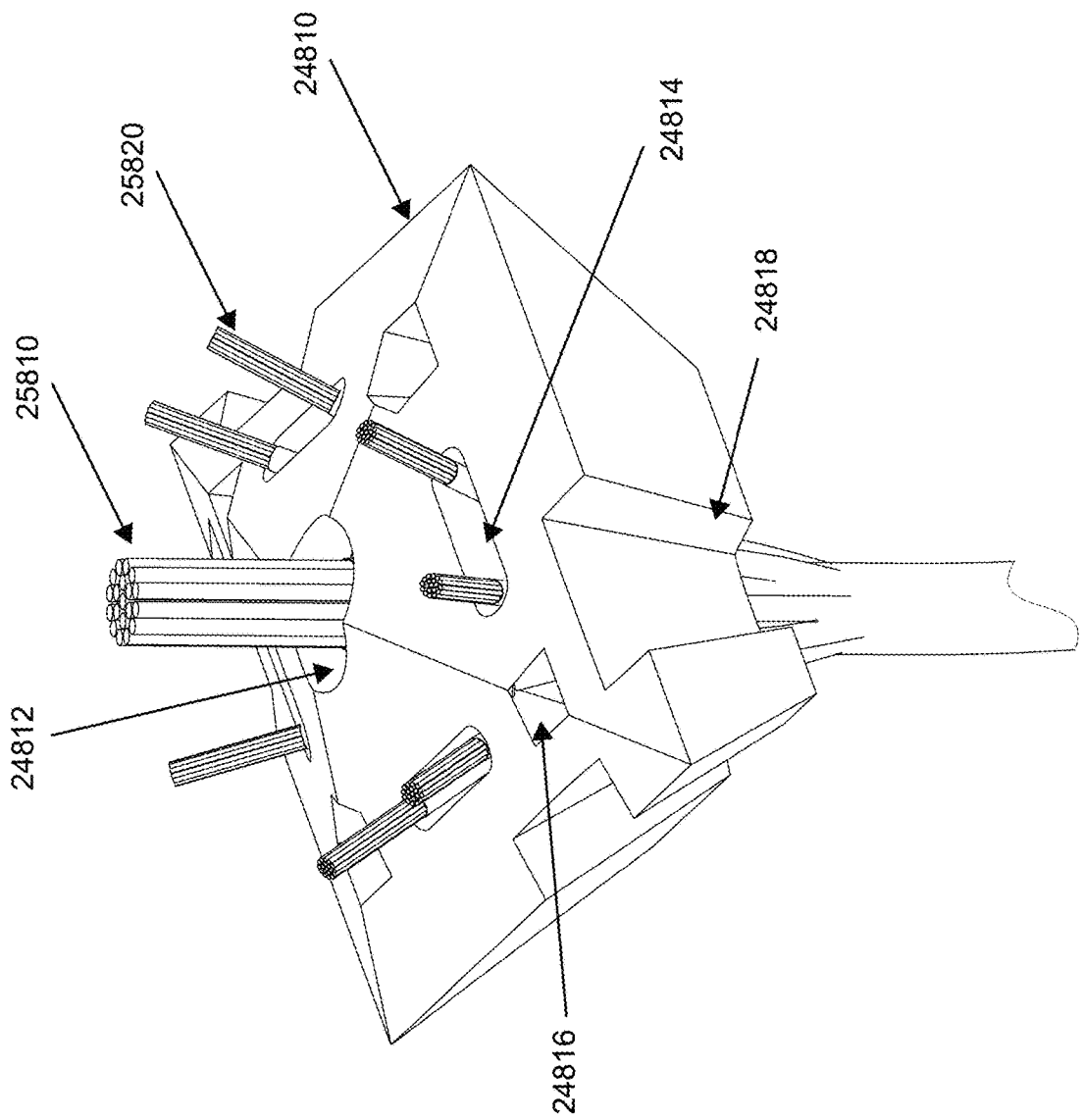

FIG. 259 shows a fiber optic cable positioned within a unit junction of the collector unit.

Figure 260:
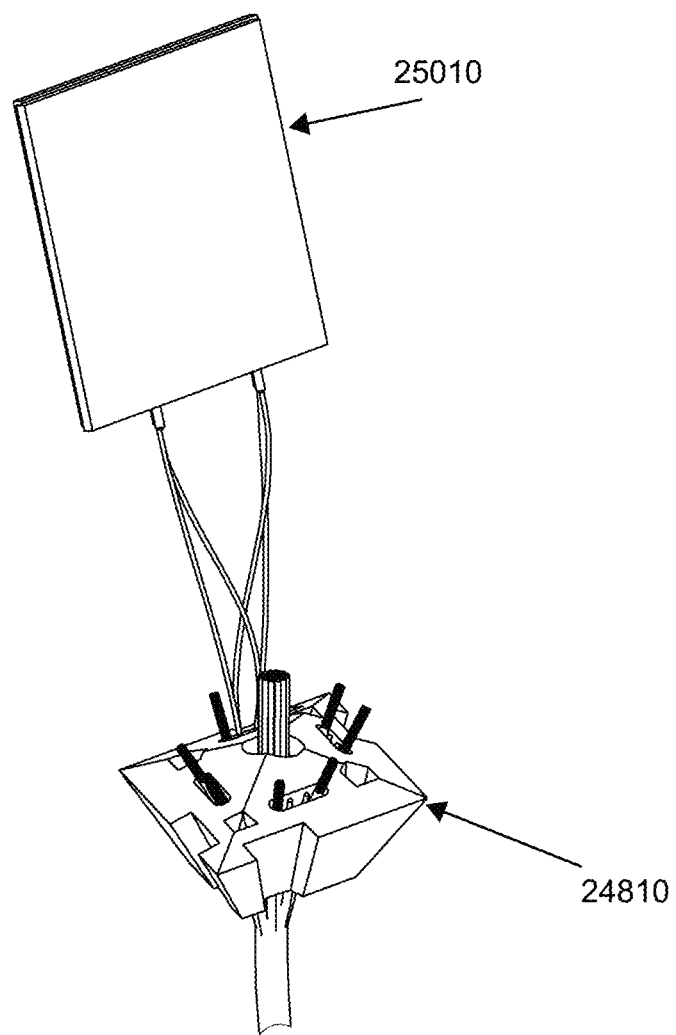

FIG. 260 shows the fiber optic cable, unit junction and flower cells of the collector unit.

Figure 261:
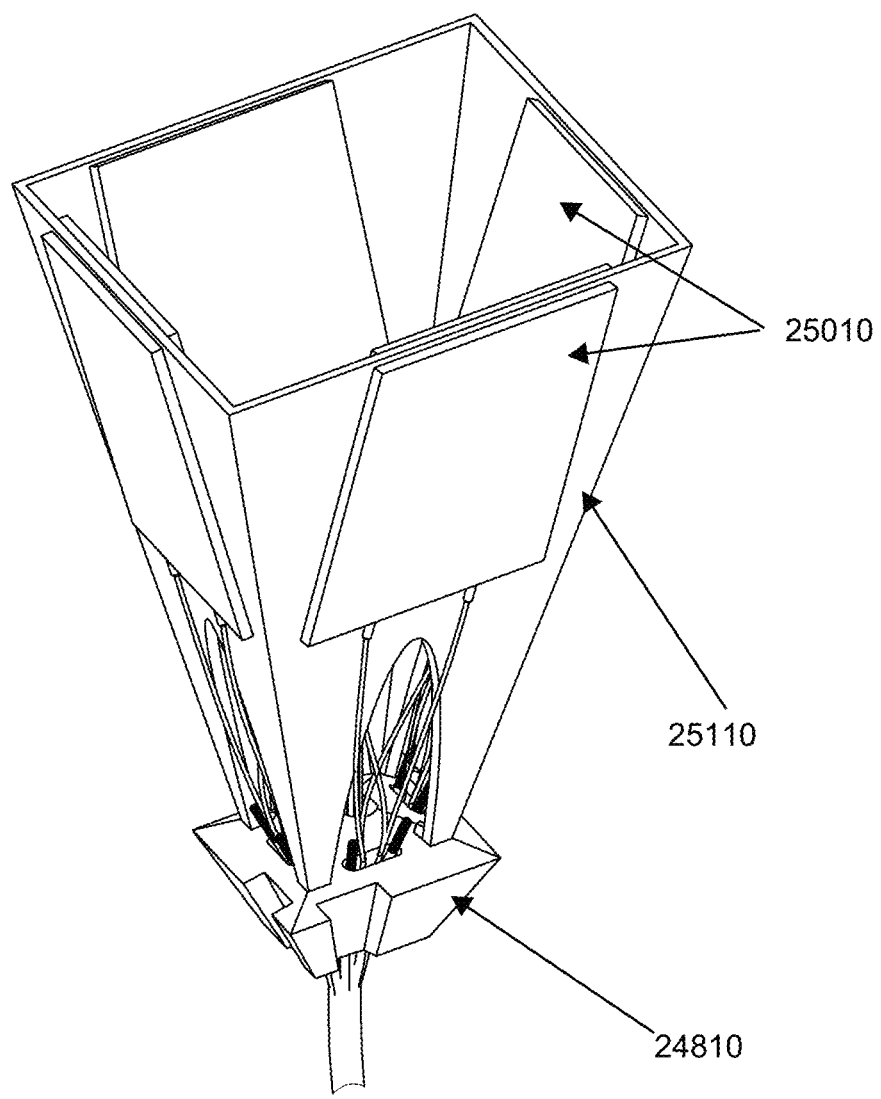

FIG. 261 shows a flower base connected to the unit junction and supporting multiple flower cells.

Figure 262:
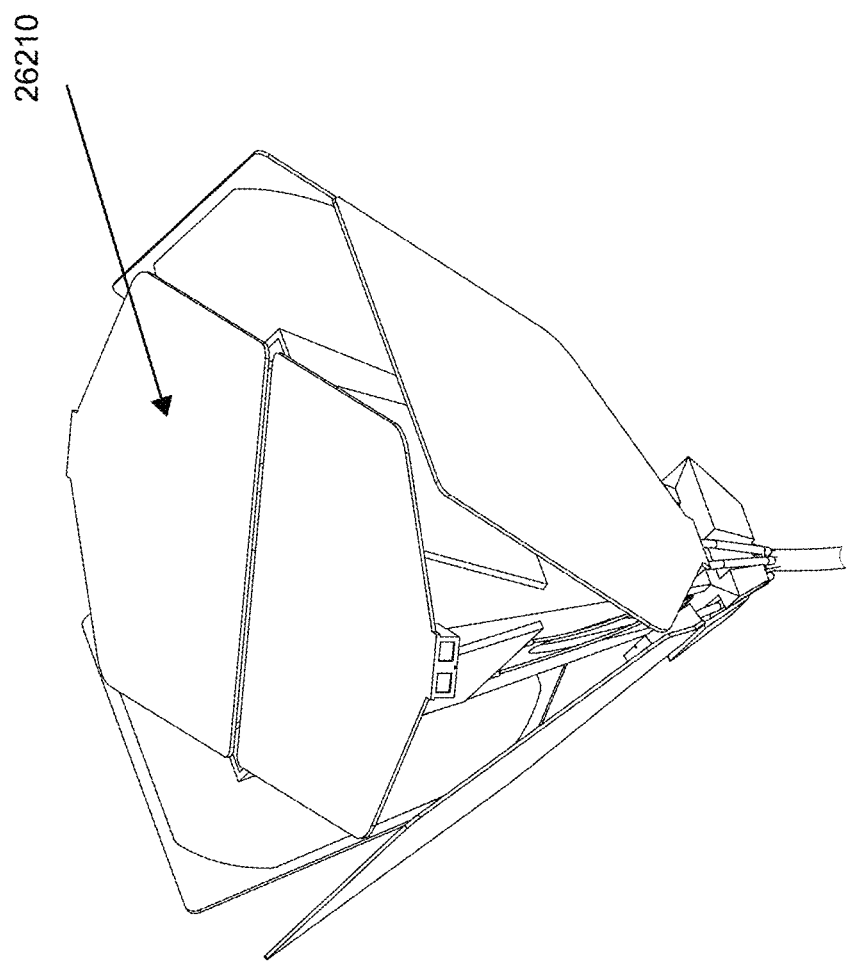

FIG. 262 shows main cells connected to the unit junction and footprint cells.

Figure 263:
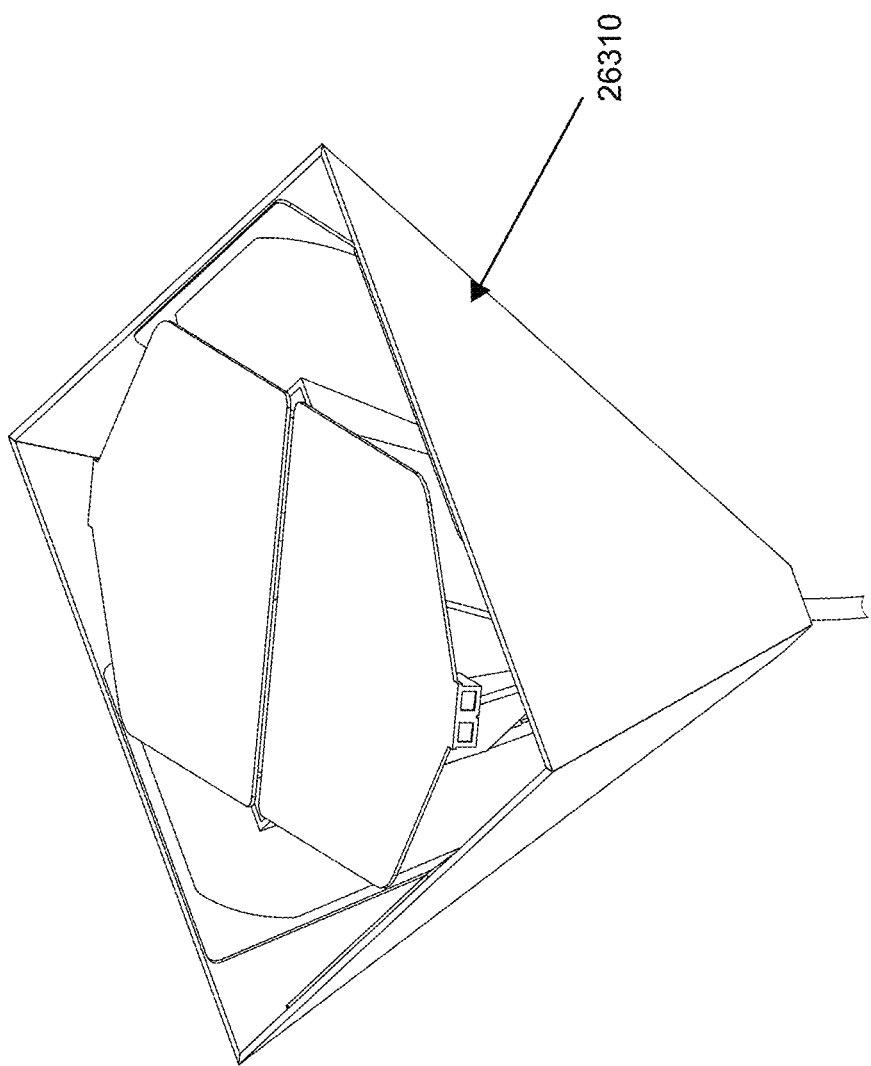

FIG. 263 shows the collector unit with four side of mirrors forming a pyramid shape.

Figure 264:
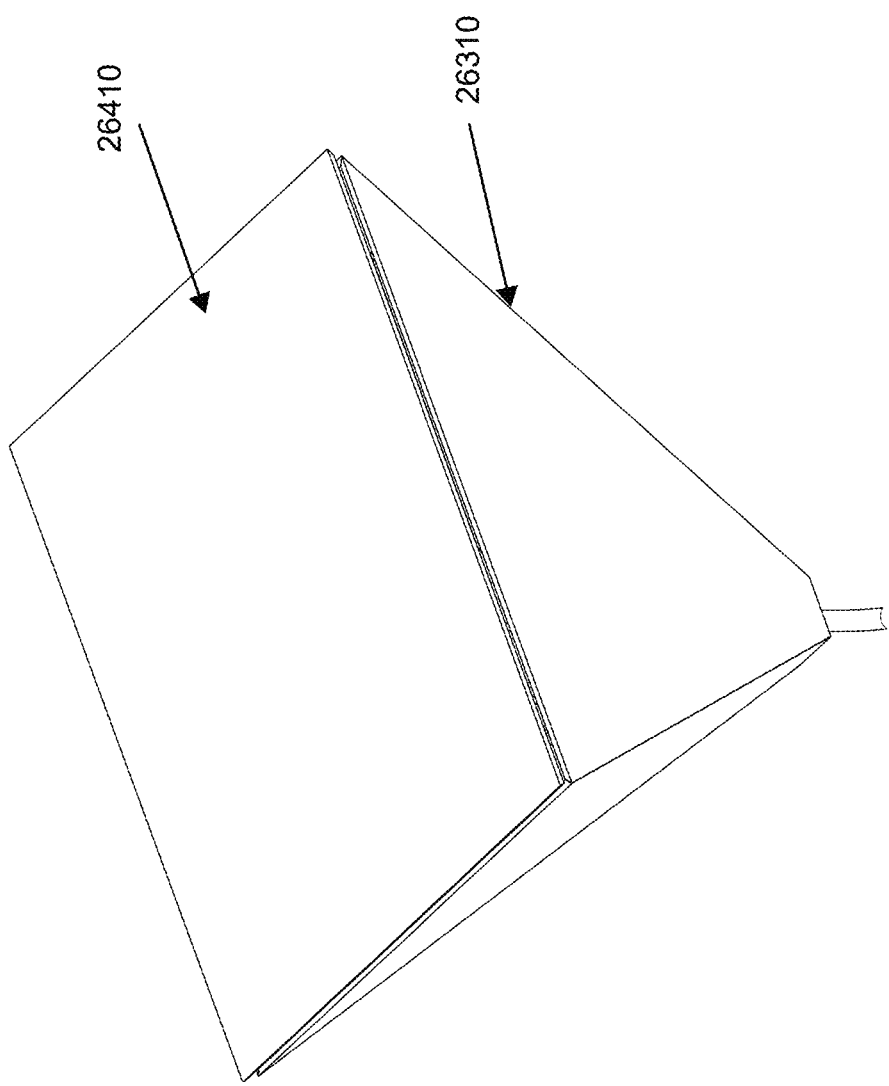

FIG. 264 shows the collector unit with a footprint mirror covering the pyramid shape.

Figure 265:
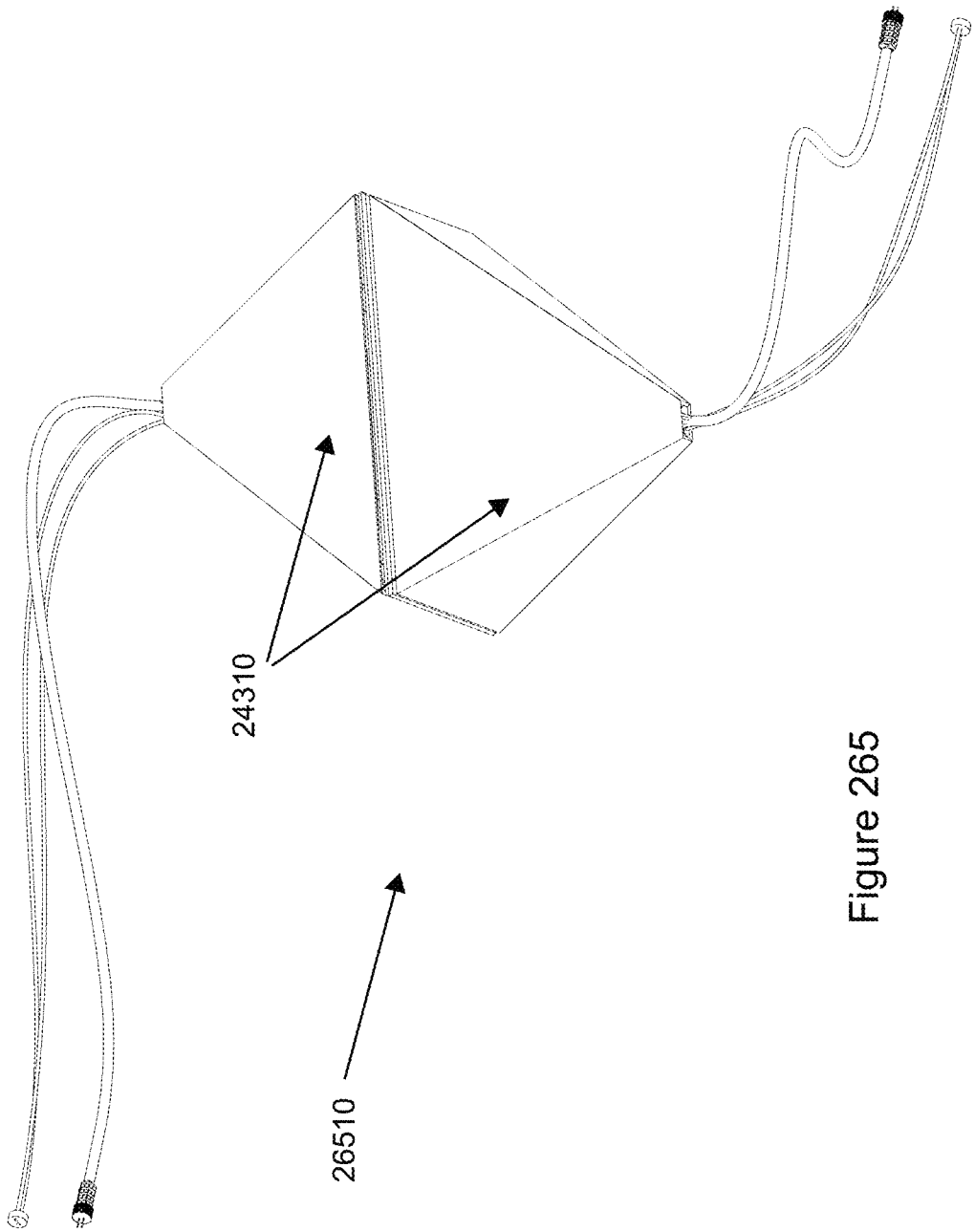

FIG. 265 shows a pair of back-to-back infrared (IR) collector units with power leads.

Figure 266:
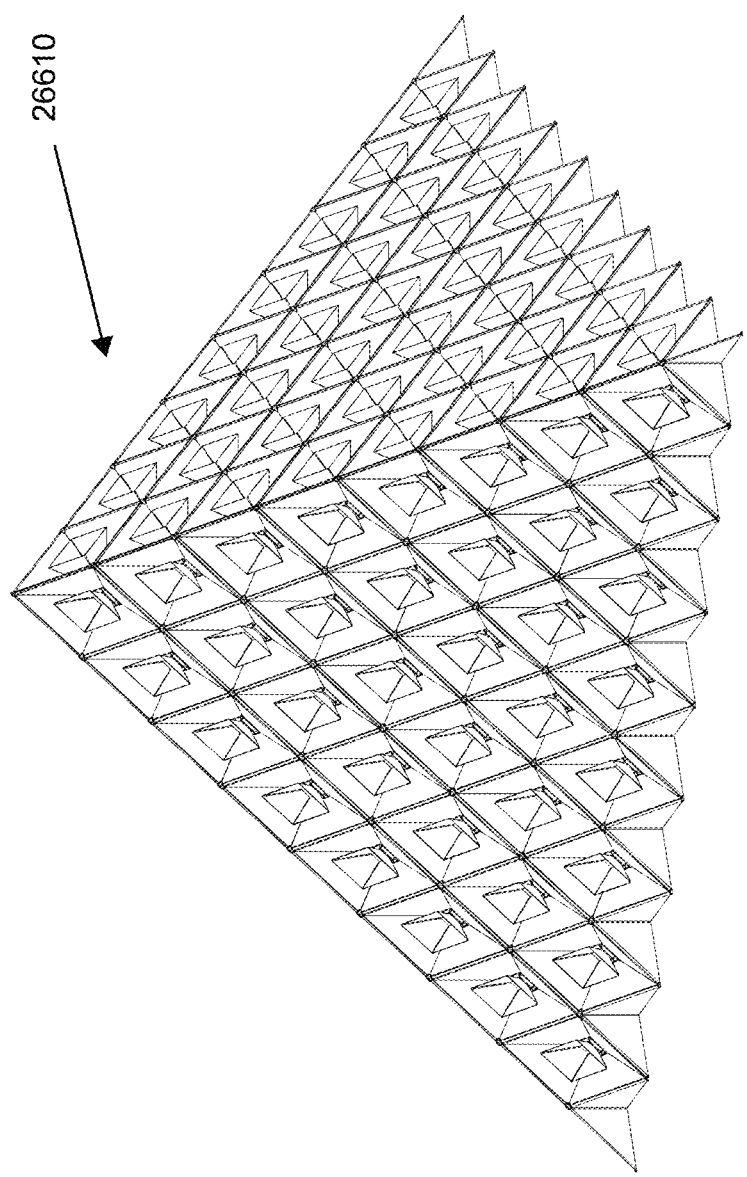

FIG. 266 demonstrates pyramid flower wall panels combined into a pyramid building.

Figure 267:
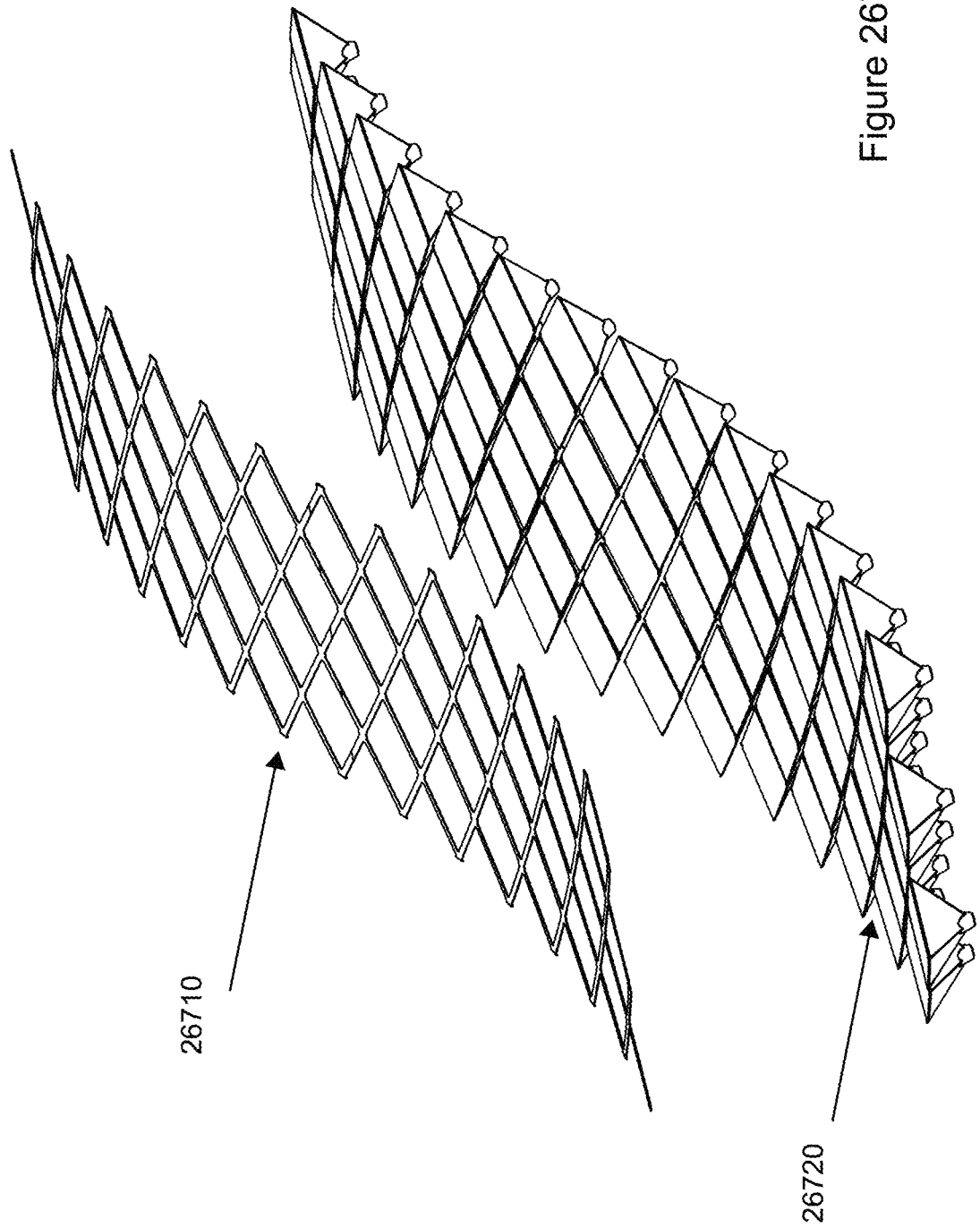

FIG. 267 shows a flexible lattice and an array of collector units for use against a curved wall.

Figure 268:
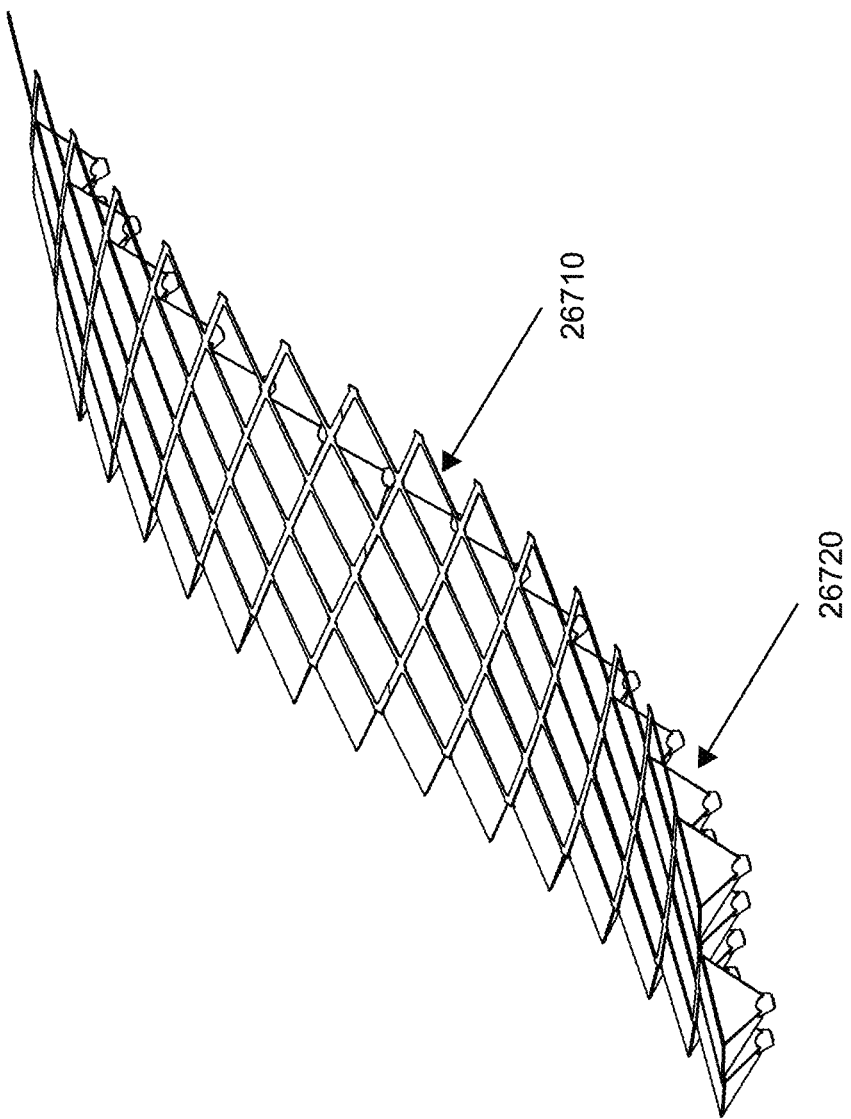

FIG. 268 shows the lattice in place against the collector units.

Figure 269:
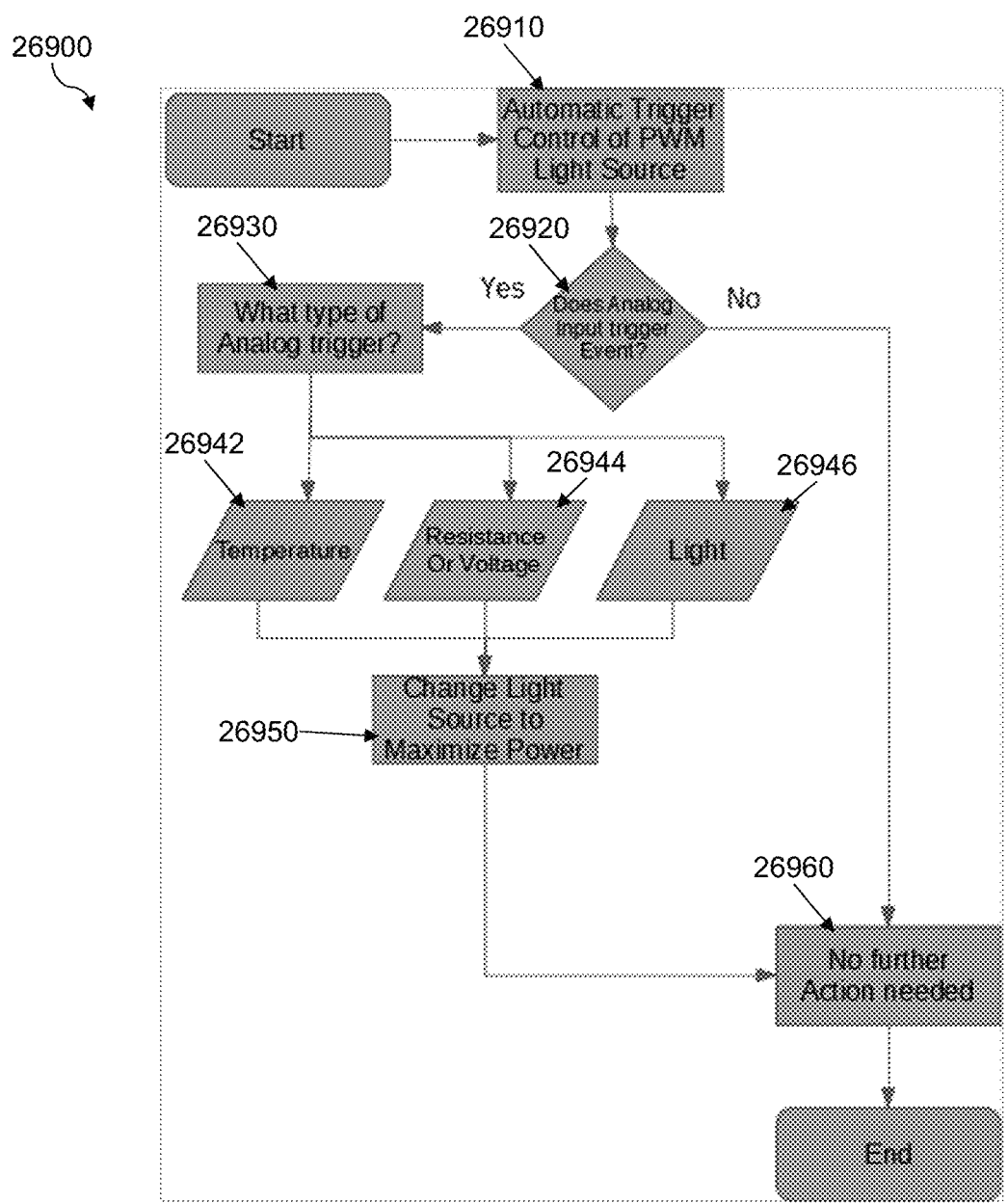

FIG. 269 is a logic flow diagram that illustrates the operation of a method, and a result of execution of computer program instructions for automatic trigger control embodied on a computer readable memory, in accordance with various embodiments.

Figure 270:
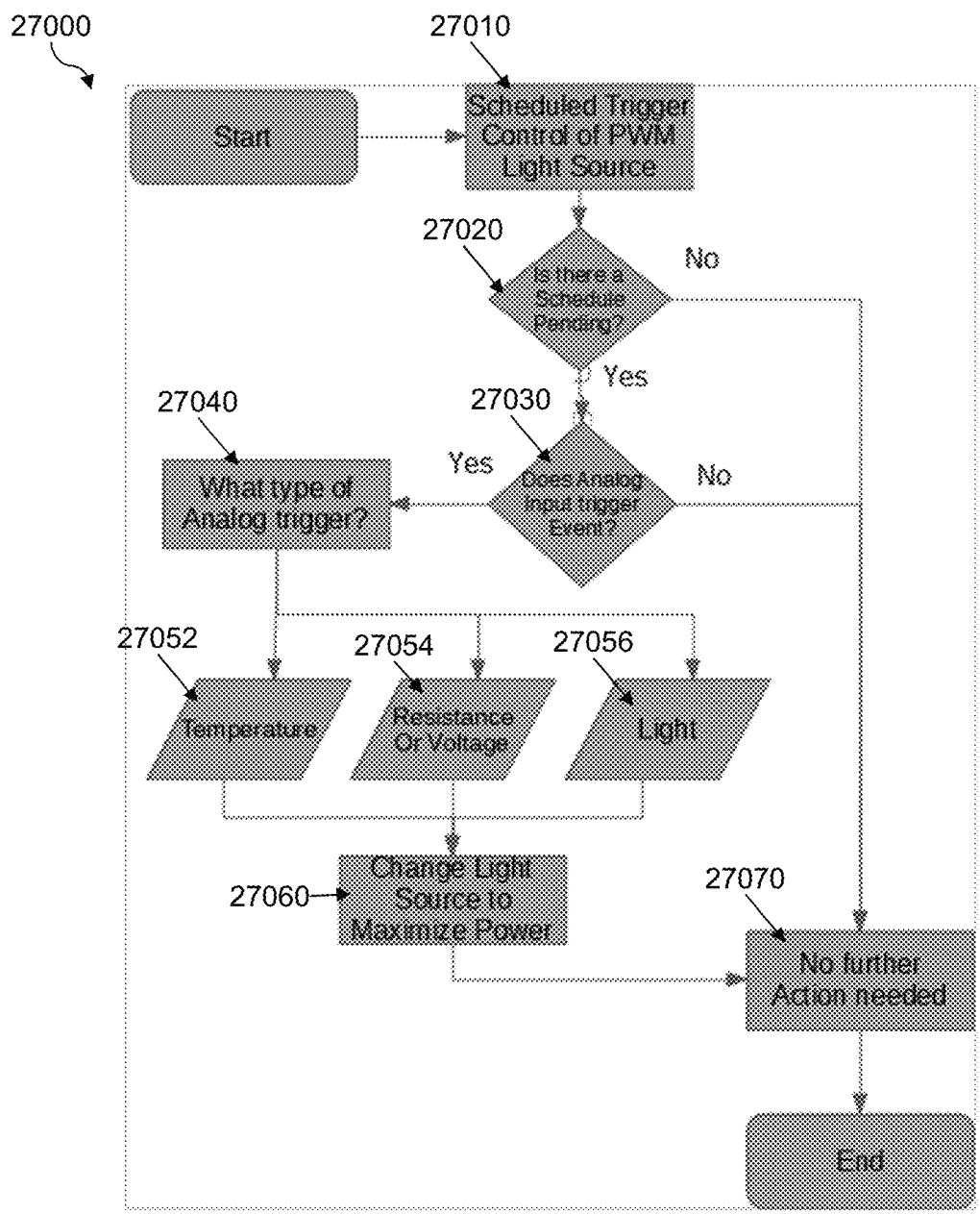

FIG. 270 is a logic flow diagram that illustrates the operation of a method, and a result of execution of computer program instructions for scheduled trigger control embodied on a computer readable memory, in accordance with various embodiments.

Figure 271:
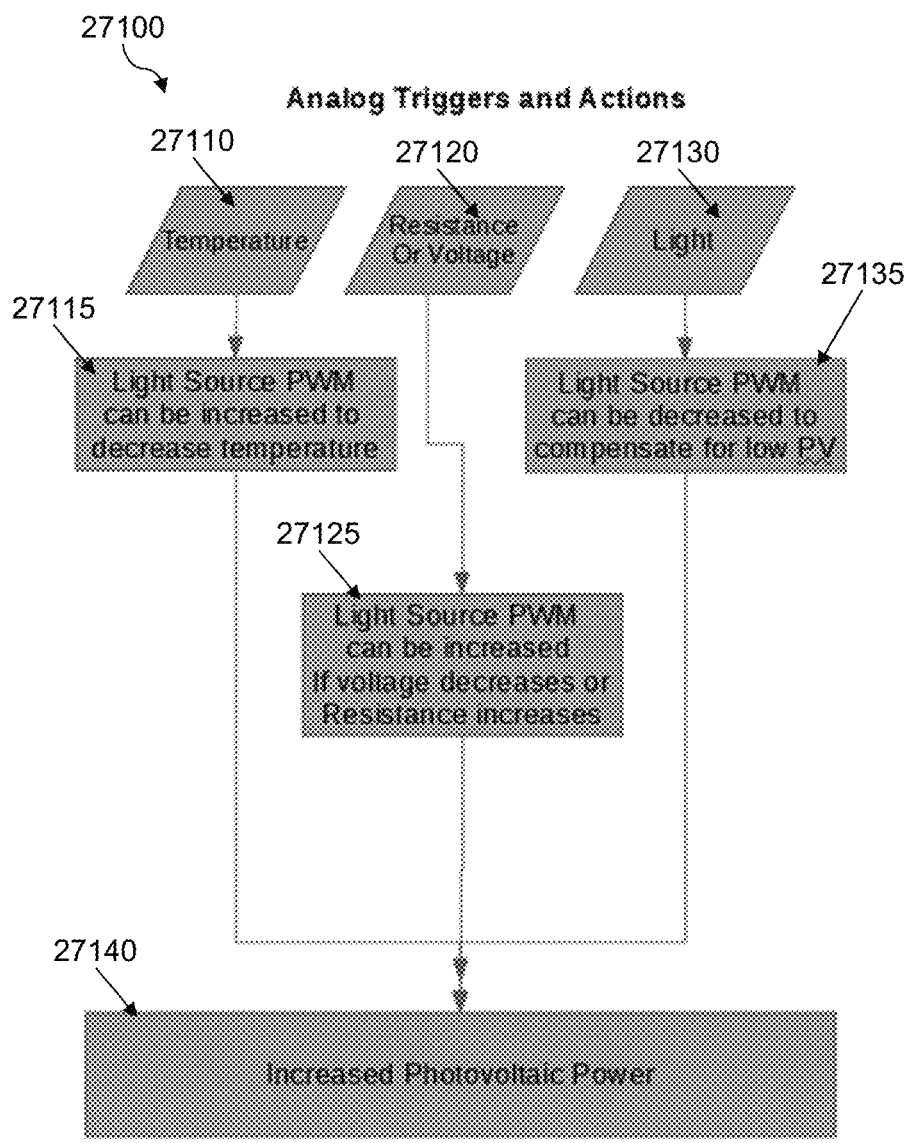

FIG. 271 is a logic flow diagram that illustrates the operation of a method, and a result of execution of computer program instructions for analog triggering of actions embodied on a computer readable memory, in accordance with various embodiments.

Figure 272:
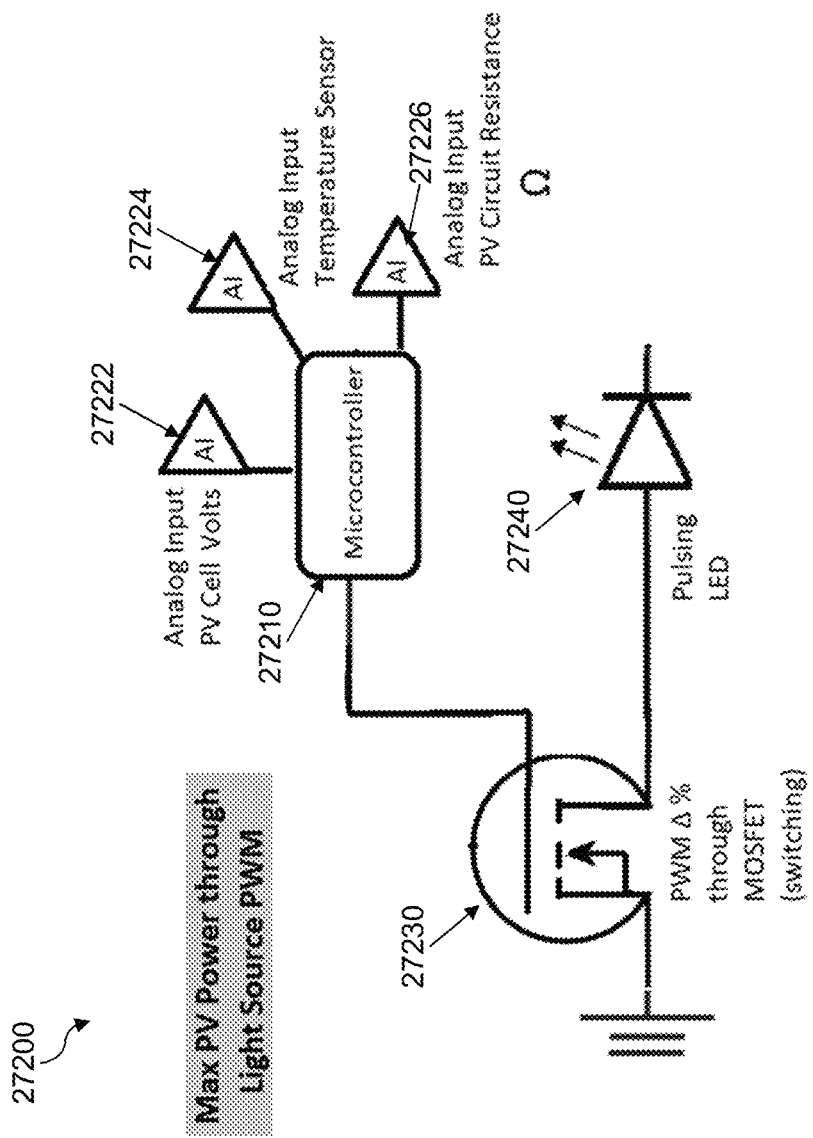

FIG. 272 shows a simplified circuit diagram of a device that is suitable for practicing various embodiments.

DETAILED DESCRIPTION OF THE INVENTION

This patent application is a continuation-in-part application claiming priority from U.S. Non-Provisional patent application Ser. No. 15/912,343, filed Mar. 5, 2018, which is a continuation-in-part application claiming priority from U.S. Non-Provisional patent application Ser. No. 15/484,762, filed Apr. 11, 2017, which claims priority from U.S. Provisional Patent Application No. 62/321,287, filed Apr. 12, 2016, the disclosures of which are incorporated by reference herein in their entirety.

The non-limiting embodiment shown in the figures demonstrate a sequence of manufacturing and assembly steps involved in making diamond wall sections. Various elements of this embodiment may be described with specific measurements. In other embodiments, the dimensions of the elements may be adjusted accordingly, for example, to produce smaller or larger diamond wall sections. In further embodiments, the sequence of manufacturing and assembly steps may be reordered and various steps may be combined and/or omitted.

The pyramid shape has many benefits including strength and increased surface area. One main idea behind the pyramid wall system is threefold:
1) to create a lightweight, inexpensive, modular system that is self-sustaining with power.
2) to increase its capacity for energy storage and efficiency of its solar panels. The pyramid configuration of solar panels gives them 38% more surface area to be exposed to solar energy.
3) the exposed inside/out pyramid pattern reduces wind resistance on the sidewalls of tractor-trailers, similar to the idea of dimples on a golf ball used to extend flight. The reduced drag alone can save at least 11% annual fuel costs per vehicle.

The pyramid wall system is adaptable to structural frameworks that form many different geometric shapes (polyhedral) including, but not limited to, tetrahedrons (pyramids with 3 sides and a base), right pyramids (4 sides and a base), cubes, rectangular cuboids, etc. Wall sections may be sectioned further to form the boundary edge of a frame to support each face of the structure.

Figure 1:
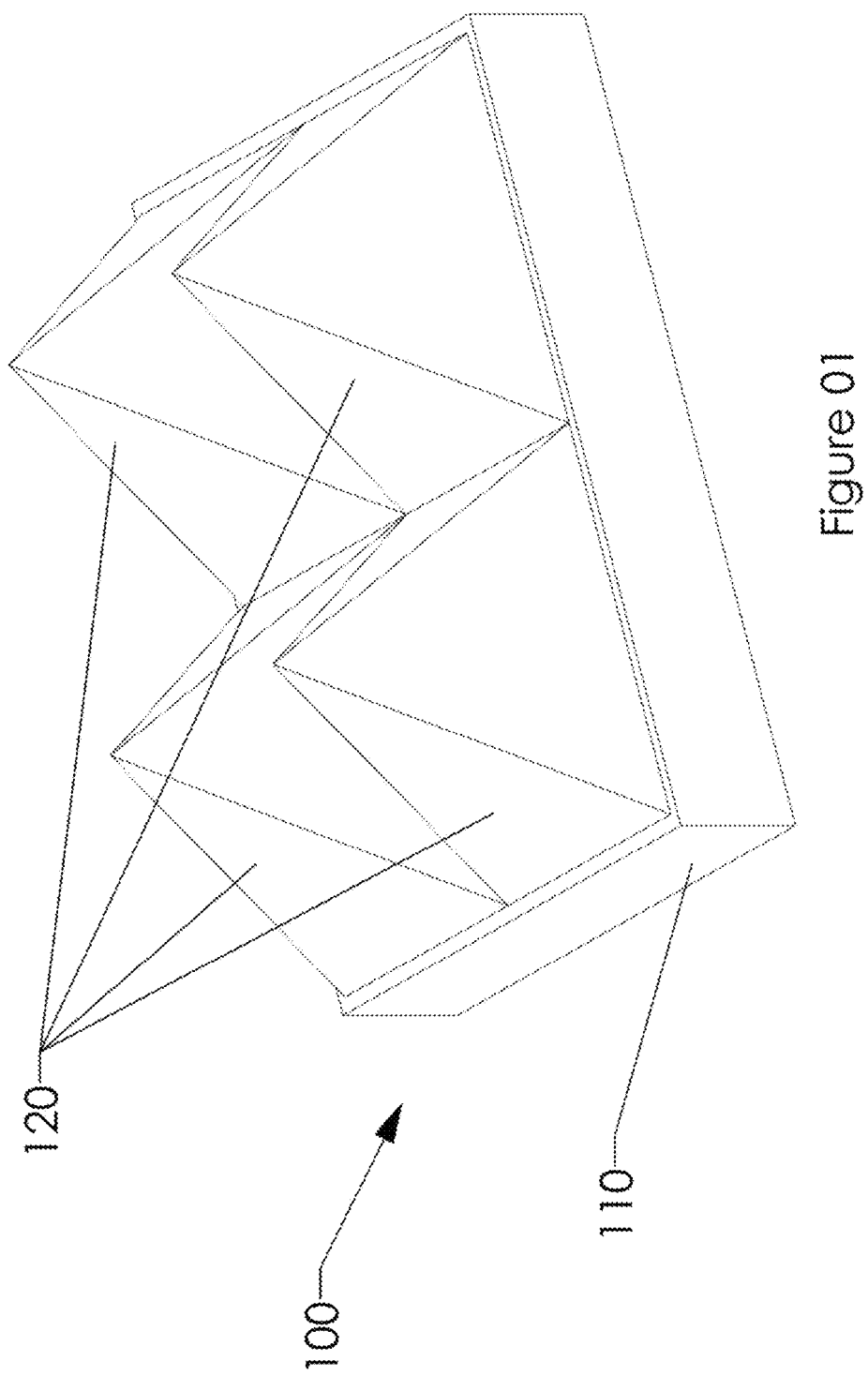
FIG. 01 shows a pyramid mold core in accordance with an embodiment.

The pyramid mold core 100 shown in FIG. 01 is the underlying form used to produce the carbon fiber housing. It may be 3D printed in thermoplastic using a process called Fused Filament Fabrication (FFF), also called Fused Deposition Modelling (FDM). In this process, plastic filament is fed into an extruder which melts and feeds it through a nozzle. The filament may have composite fibers added as well for additional strength and dimensional stability. Data from a 3D model is converted into code which determines the path of the extruder head, the speed of the path, flow rate of material and temperature. The extruder head is attached to a dual gantry setup, allowing servo motors to position it over a level build plate at various points along the X, Y & Z axis. There may be two or more extruder heads, each controlled independently.

The pyramid mold core 100 may be partially hollow with a latticed interior, or solid filled and/or electroplated for rigidity. The "foot print" 110 of the housing is diamond shaped, just under 29"×18" diagonally and 2" thick. It supports four sets of pyramid shaped bosses 120 which are just under 5" high from each base to their apices. The entire mold core 100 can be made in one piece.

Figure 2:
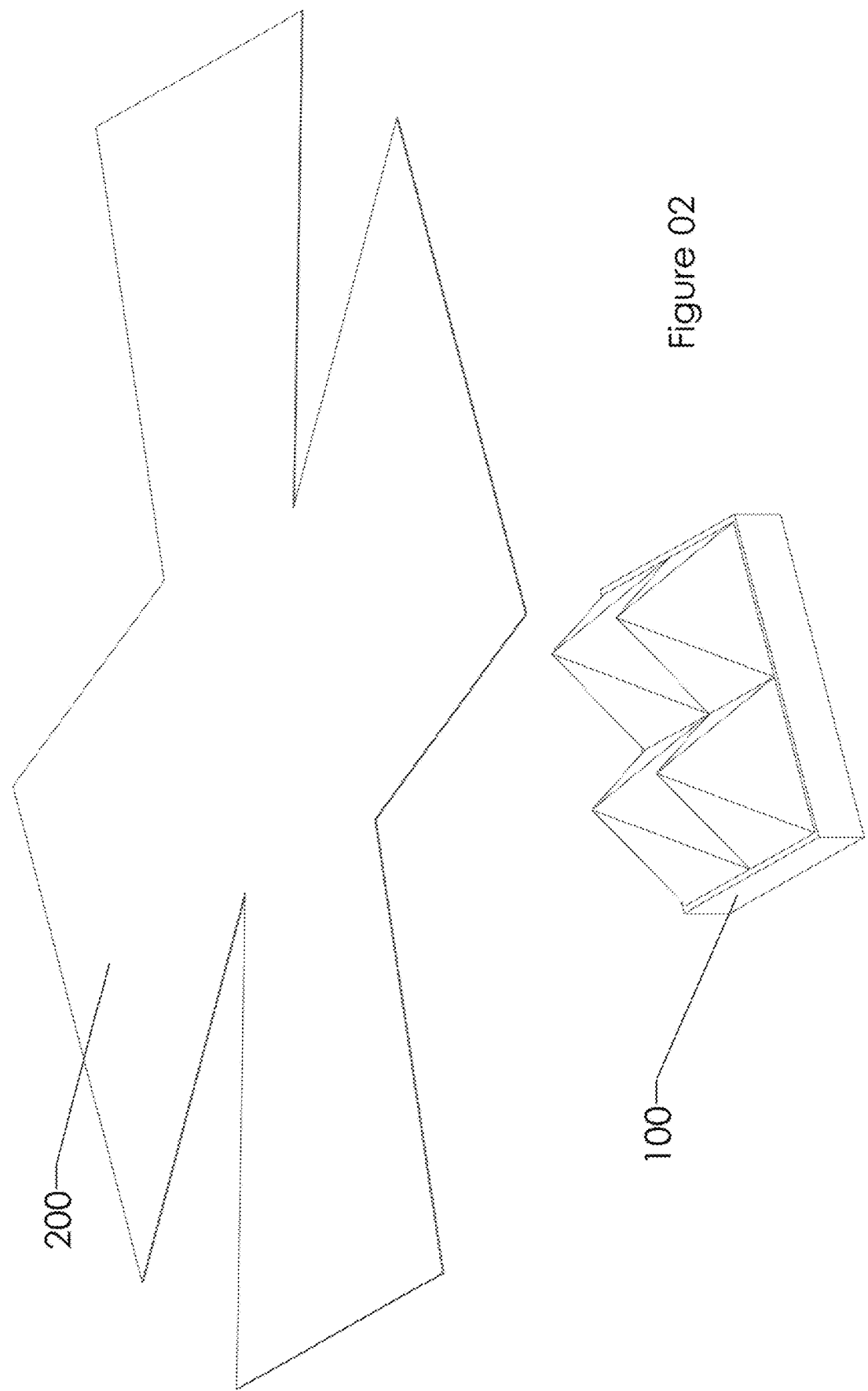
FIG. 02 shows a carbon fiber sheet sized to the pyramid mold core.
Figure 3:
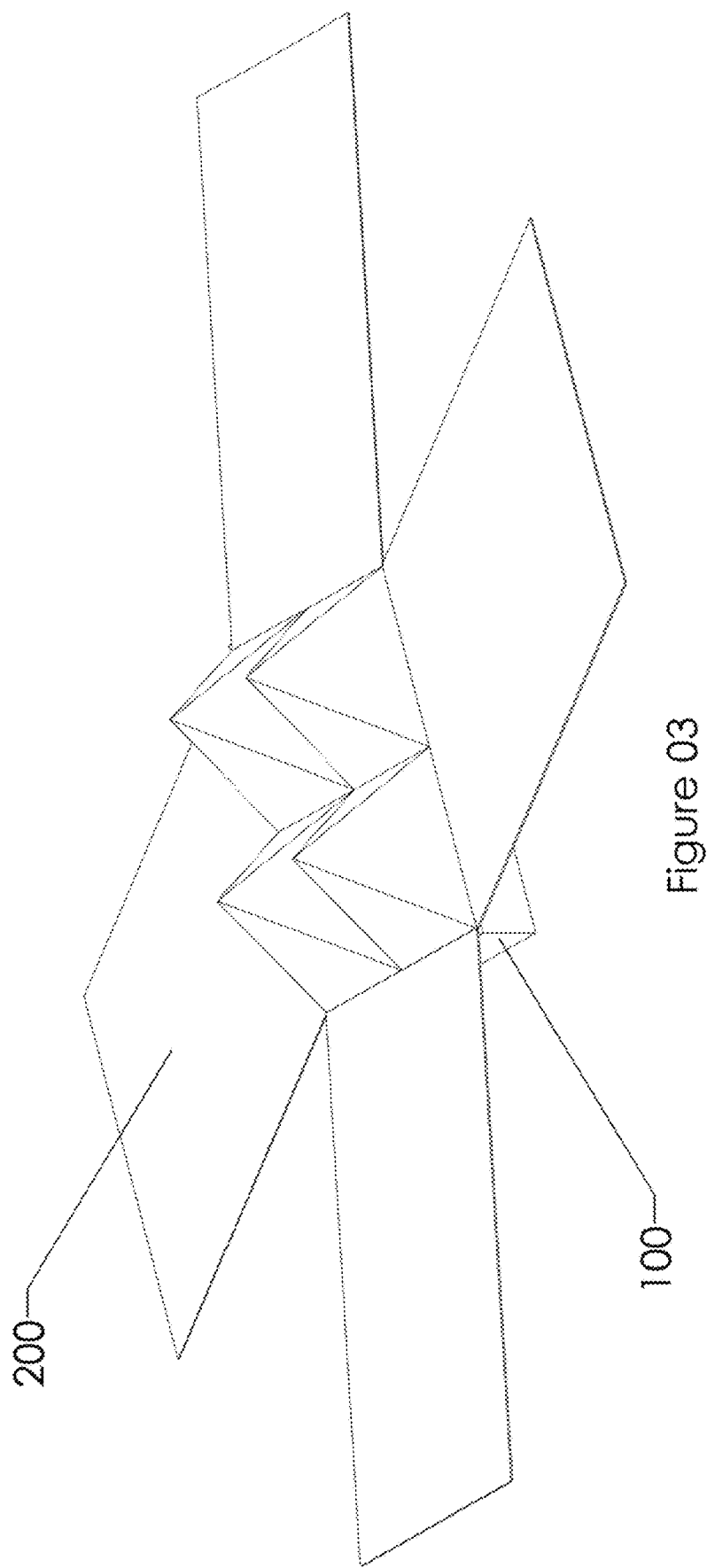
FIG. 03 shows the carbon fiber sheet after it has been vacuum formed to the pyramid mold core.

FIG. 02 shows a carbon fiber sheet 200 used to make the housing. Carbon fiber or its equivalent has several advantages over conventional materials and construction methods. It is lighter, stronger and more durable than wood or metal and can be formed into shapes not possible with these materials. It may be between 1 mm and 1.75 mm thick. The carbon fiber sheet 200 may be cut into a pattern based on where the seams are to be located and/or to provide openings when positioned. In FIG. 03 the carbon fiber sheet 200 is vacuum formed to take on the shape of the pyramid mold core 100.

Figure 4:
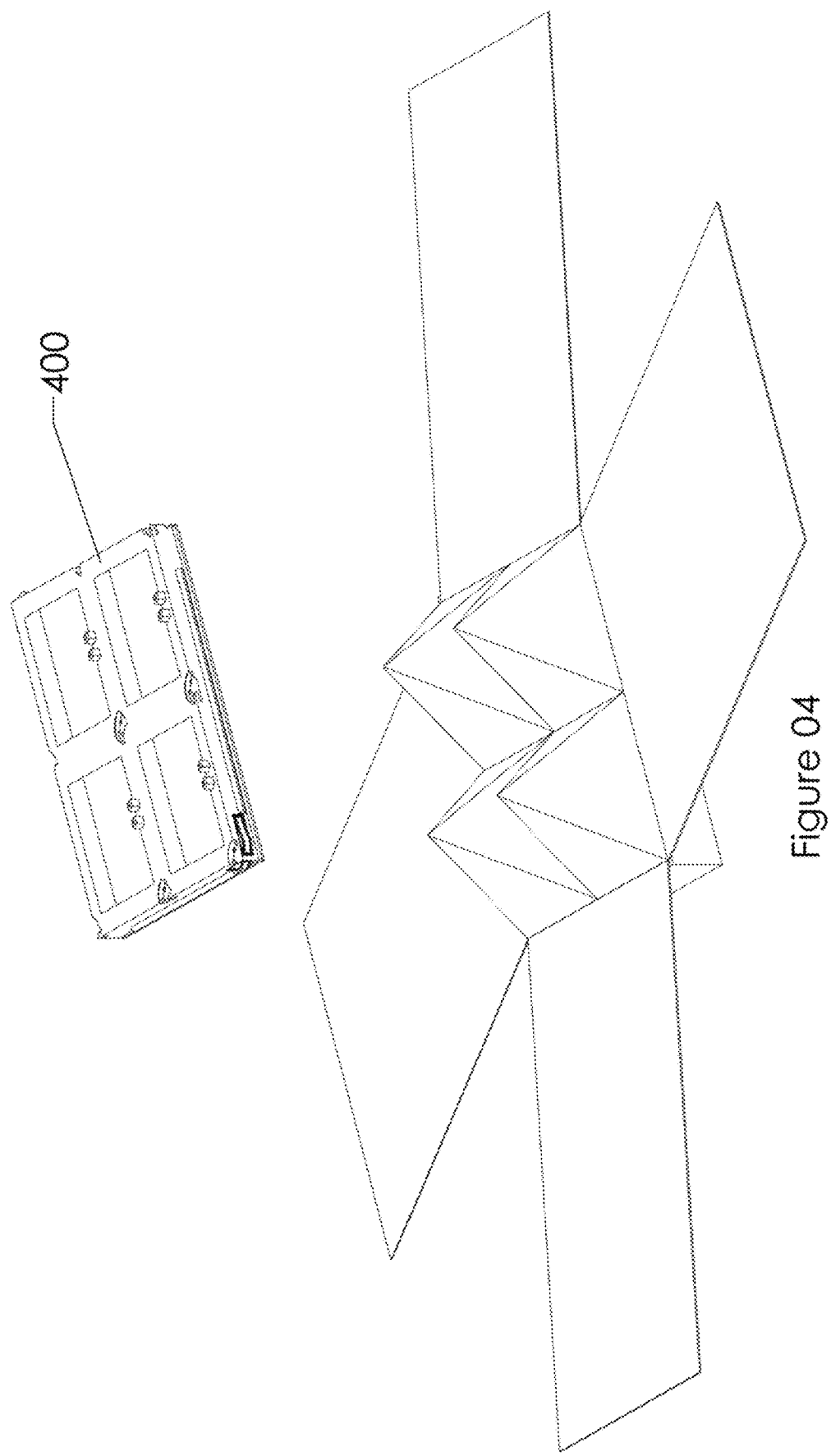
FIG. 04 shows a male conductive frame.

FIG. 04 shows a male conductive frame 400. This frame 400 creates a wireless unit and reduces the chance of long term damage by being embedded in the composite housing. This frame 400, referred to as a male -A- conductive frame, follows the contour of the pyramid walls. As shown in FIGS. 05-17, the frame 400 is 3D printed with dual materials; the first being an insulative thermoplastic which forms the outer shell (500), as well as the first and second insulative layers (which alternate between the conductive layers). The second material may be conductive, such as a graphene infused thermoplastic as one non-limiting example. It forms the first and second conductive layers as well as the "bird bone" core 1300, a hollow light weight internal structure to allow airflow.

This bird bone core 1300 is a structural component providing increased strength at a fraction of the weight. The bird bone core 1300 also provides airflow (e.g., an inert gas flow) which allows a positive ionic current as low pressure gas flows through the lattice increasing current flow. As described below, the bird bone core 1300 also provides a conductive path for sections with solar panels 1800.

In one non-limiting embodiment, the outer shell 500 has post slots 510 along the top face to allow locking posts 1660 to connect the diamond sections. This design may be used where space between back to back wall sections is restricted.

In another non-limiting embodiment, post/slot combinations can be part of the outer shell 500 when space is not as restricted. Post slots 510 would be replaced with a raised cylindrical post that has a blind channel cut into the side. The profile of the channel has a "T" shaped cross section with a radiused inner face. (See FIGS. 14, 40, 83, 87, 88 & 97 for original post slots 510). Locking posts 1660 may be replaced with shouldered cylindrical bosses to create a "T" shaped post to fit inside these channels. (See FIGS. 36-39, 85, 87 & 88 for original locking posts 1660).

Figure 14:
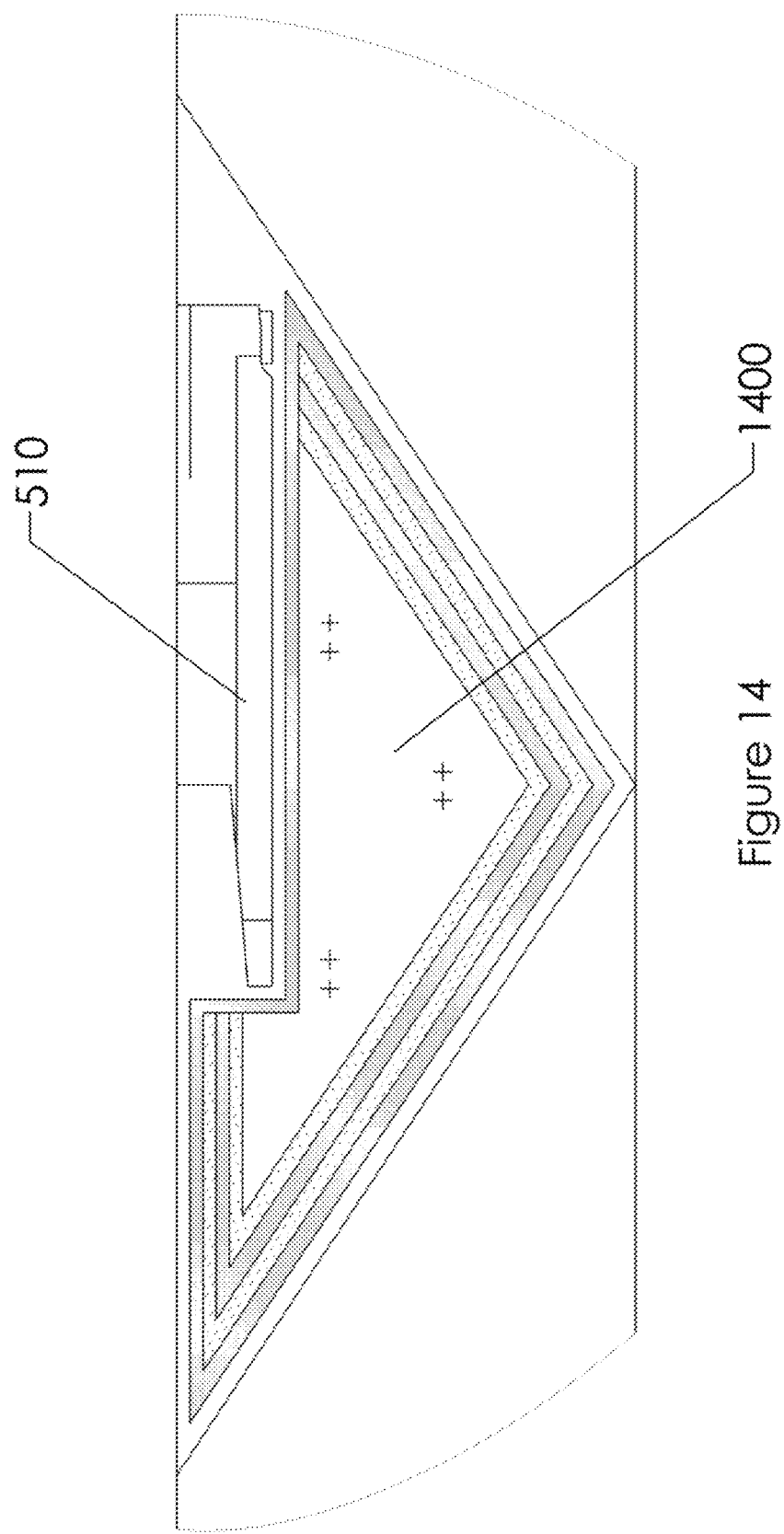
FIG. 14 shows an alternate cross section of the male conductive frame.

In this non-limiting embodiment, the frame 400 is greatly simplified by removing slot features that cut into various layers of conductors and insulators (see FIG. 14). The "V" shaped bosses 520 and grooves 530 along the sides help with alignment and securing. Four sets of ball socket bosses 540 connect the panel rack plugs to the first and second conductive layers. Each corner along the long diagonal has open rectangular slots 550 between connector tabs 560 for the first conductive layer 900 and connector tabs 570 for the second conductive layer 1200. The frame 400 is then placed over the raw carbon fiber material 200.

Figure 5:
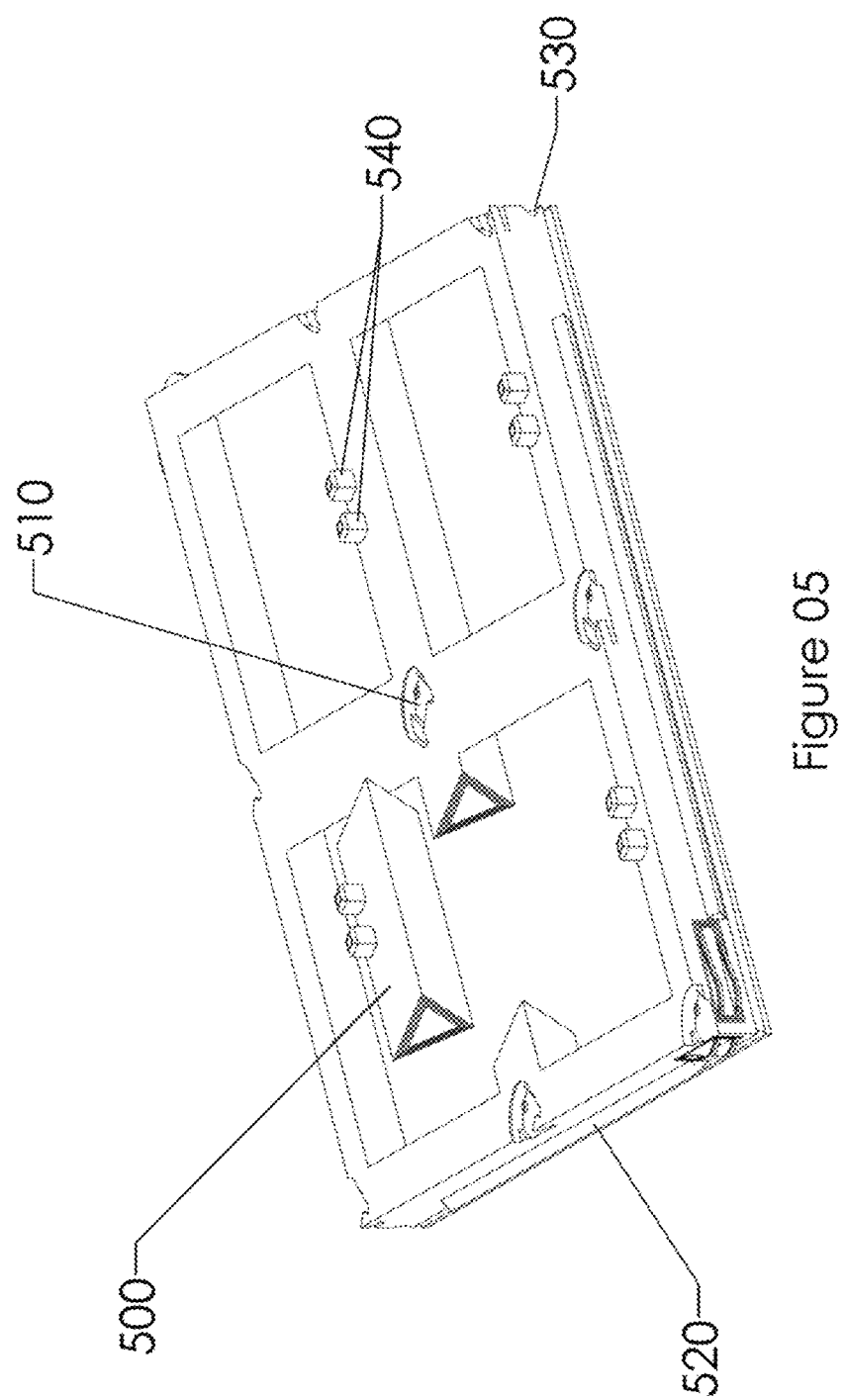
FIG. 05 shows a close-up of a section of the male conductive frame.

FIG. 05 highlights a cross section 500 of the frame 400. FIGS. 06-13 isolate various components and features of this cross section.

Figure 6:
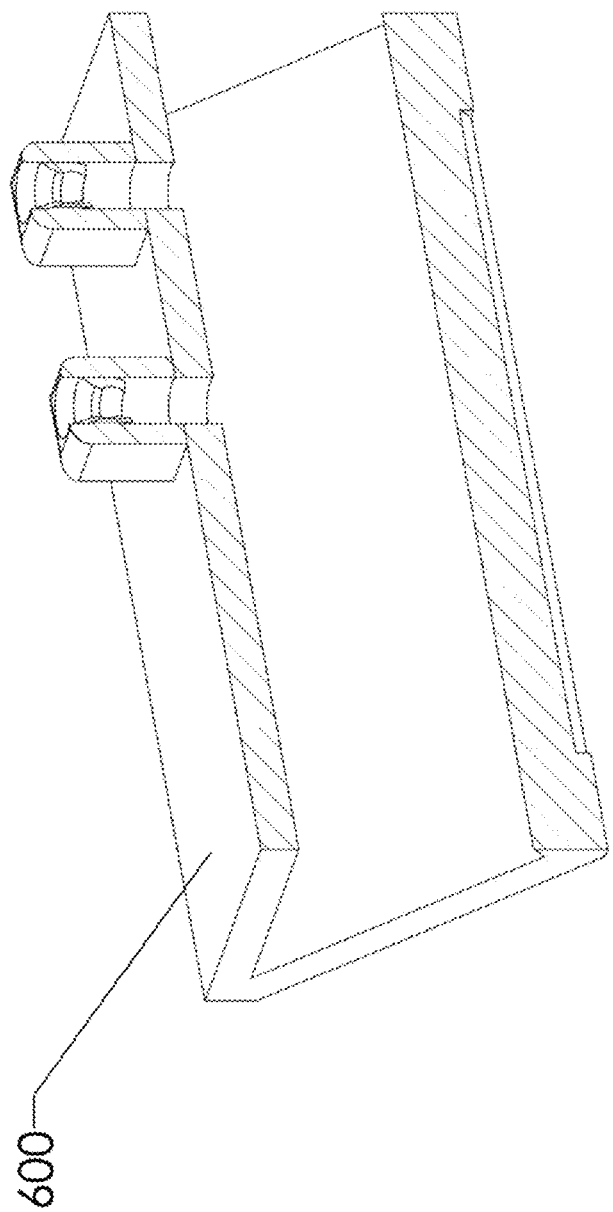
FIG. 06 shows an outer shell section of the male conductive frame.

FIG. 06 shows the outer shell section 600 having half of the "V" profile of this cross section. Here, the ball socket bosses 540 and ball socket snap fits 700 are shown. They may be made of an insulative thermoplastic.

Figure 7:
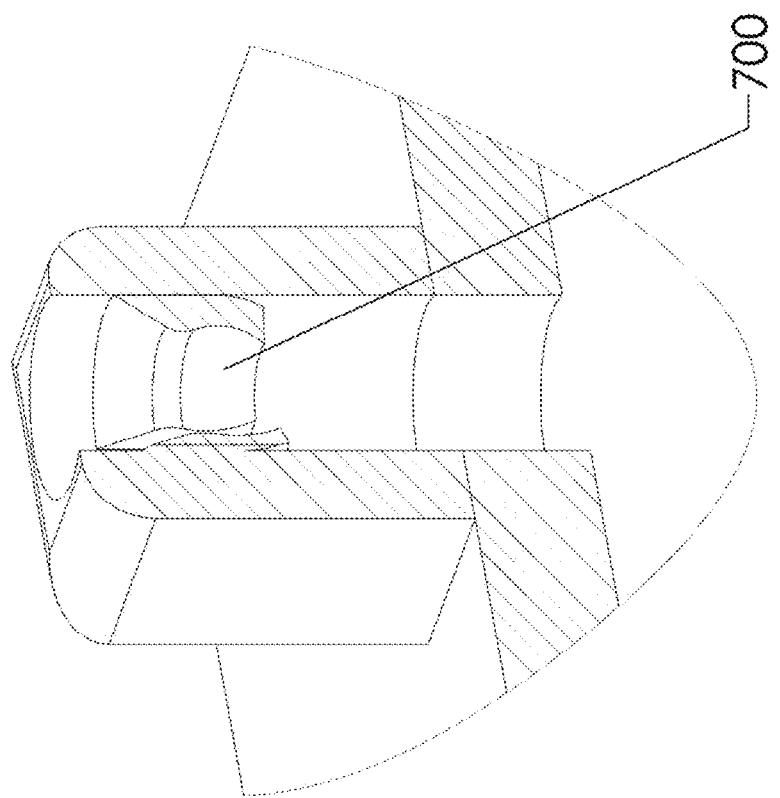
FIG. 07 shows ball socket detail of the outer shell section for a panel rack plug.
Figure 61:
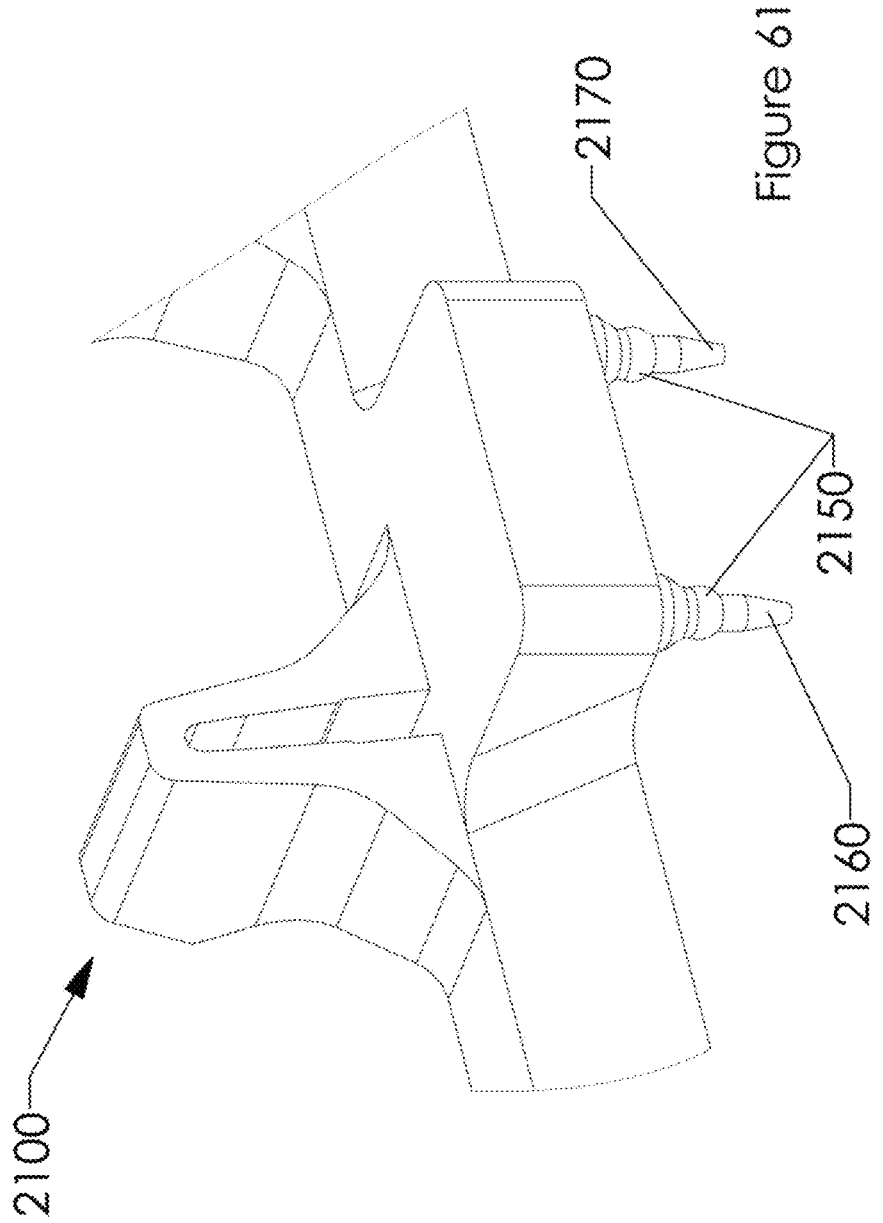
FIG. 61 shows a cutaway of a connection rack.

FIG. 07 shows details of one of the ball socket snap fits 700 used to secure the ball joints 2150 of the panel rack plugs (see FIG. 61). They have a spherical cavity with three relief slots to help conform to the ball shaped plug and then engage the ball shaped plug when in place.

Figure 8:
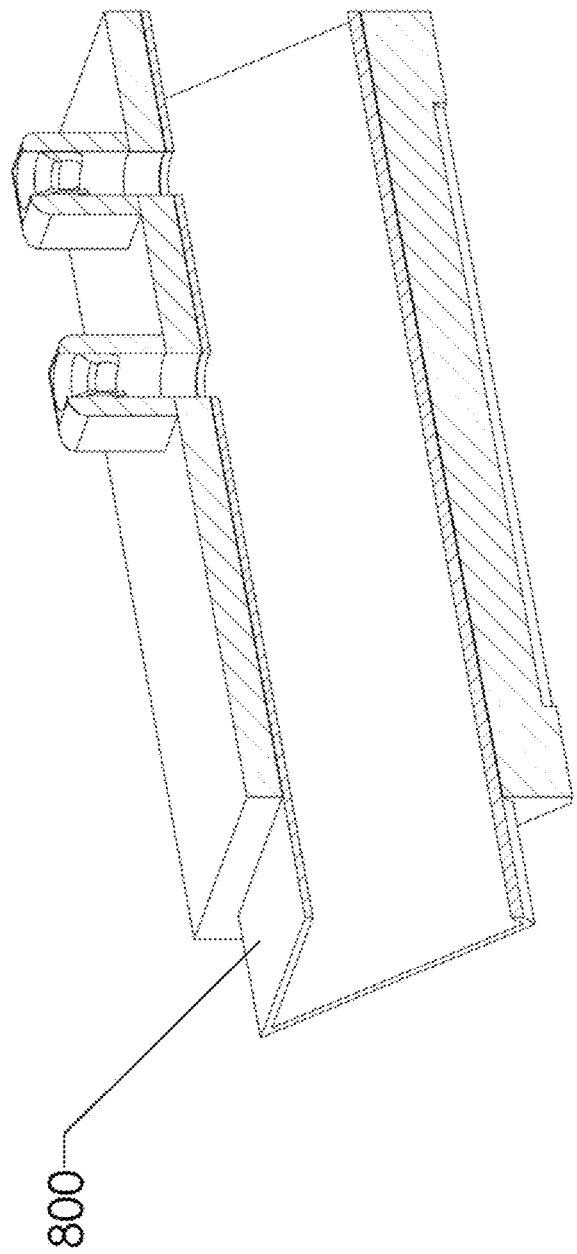
FIG. 08 shows a first insulative layer of the male conductive frame.
Figure 9:
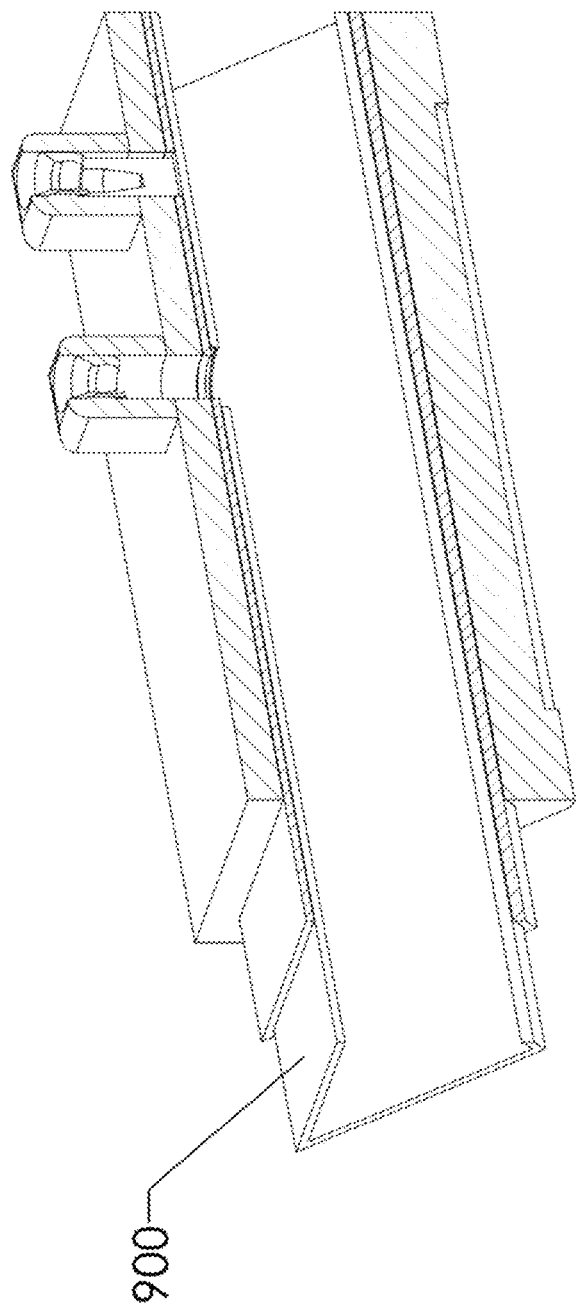
FIG. 09 shows a first conductive layer of the male conductive frame.

FIG. 08 shows the first insulative layer 800 which is the same material as the outer shell. It can be differentiated because it follows the contour of the first conductive layer (see FIG. 9). In this non-limiting embodiment, the material is approximately 1/32" thick. FIG. 09 shows the first conductive layer 900 which may be printed with a graphene infused/embedded thermoplastic (or equivalent). This layer 900 conducts a negative charge, terminates with a conical shaped receptacle 1000 and may be approximately 1/32" thick in this non-limiting embodiment.

Figure 10:
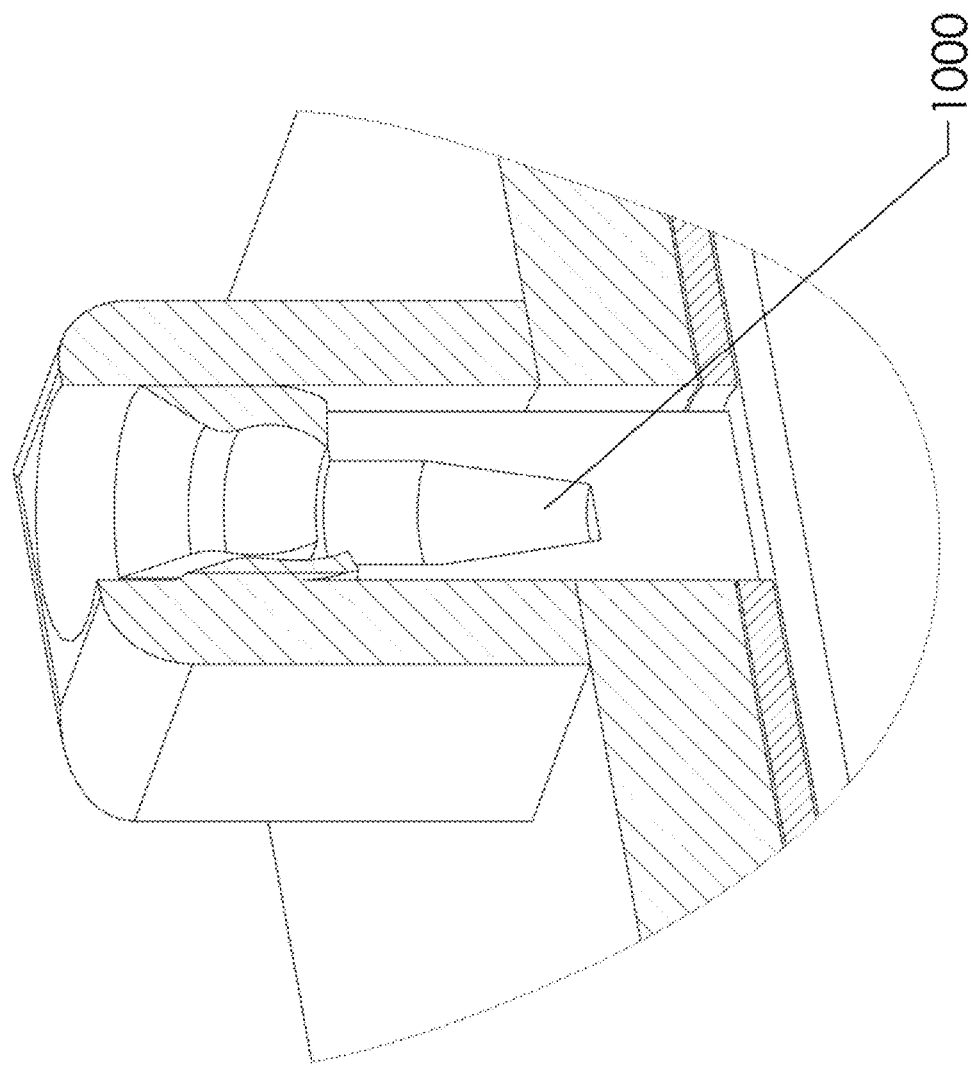
FIG. 10 shows contact detail of the first conductive layer.

In FIG. 10, the details are shown of the conical shaped receptacle 1000 for the plug tip. This is the electrical contact for the first conductive layer 900 when the ball joint 2150 (see FIG. 61) is in place in the ball socket snap fits 700 inside of their ball socket bosses 540.

Figure 11:
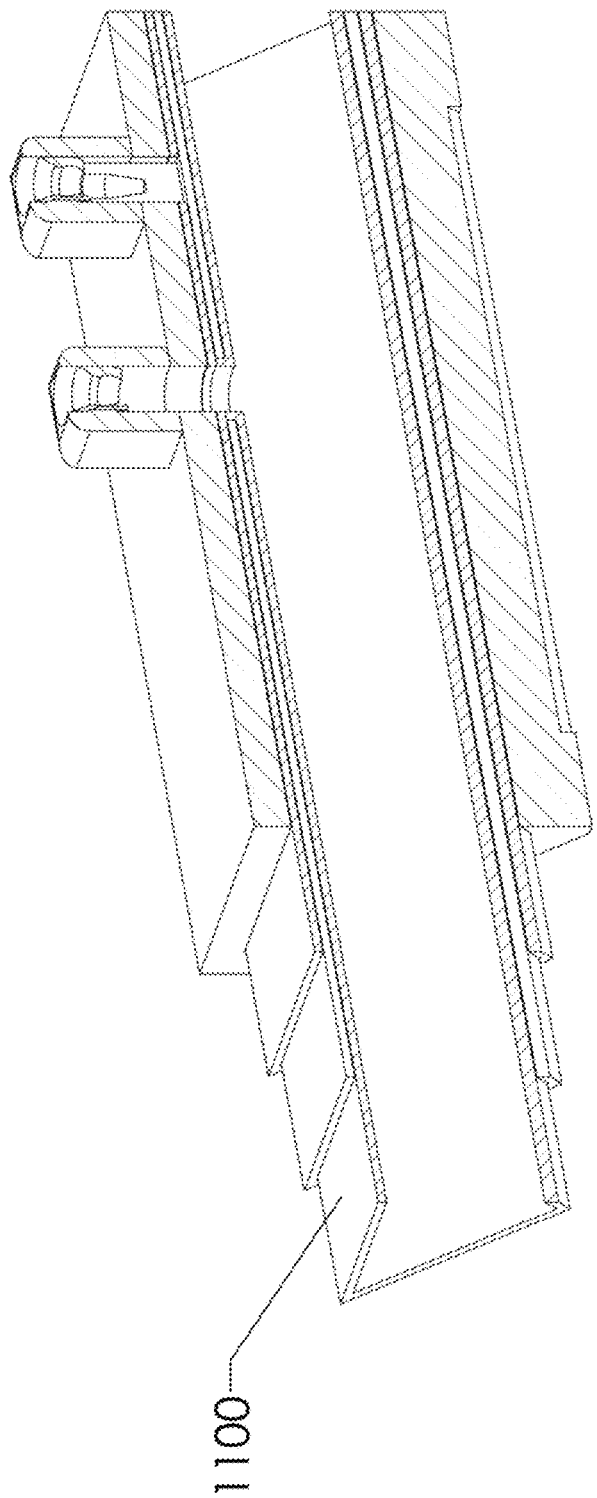
FIG. 11 shows a second insulative layer of the male conductive frame.

The second insulative layer 1100, shown in FIG. 11, is the same material as the outer shell 600 and the first insulative layer 800. This second insulative layer 1100 is sandwiched between the first and second conductive layers 900, 1200 and, in this non-limiting embodiment, is approximately 1/32" thick.

Figure 12:
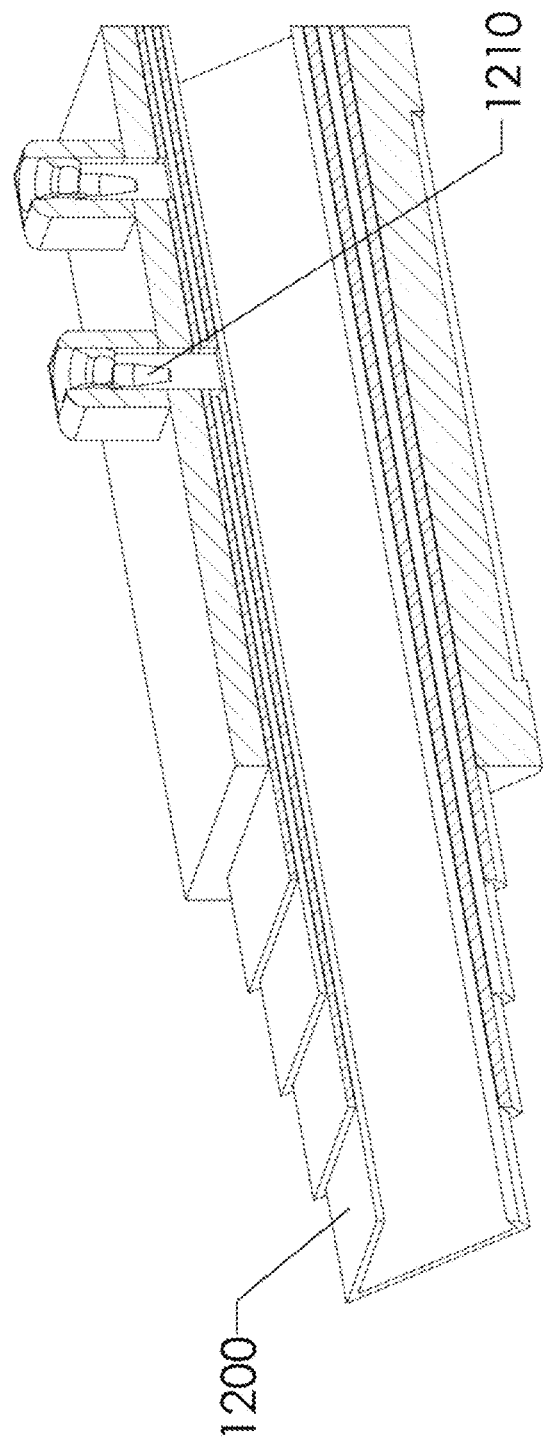
FIG. 12 shows a second conductive layer of the male conductive frame.

FIG. 12 shows the second conductive layer 1200. This layer 1200 is the same material as the first conductive layer 900 except that it conducts a positive charge and terminates with a conical shaped receptacle 1210. It can be considered a shell of the "bird bone" core 1300 (shown in FIG. 13) but is distinguished because it follows the contour of the second insulative layer 1100. In this non-limiting embodiment, the second conductive layer 1200 is approximately 1/32" thick.

Figure 13:
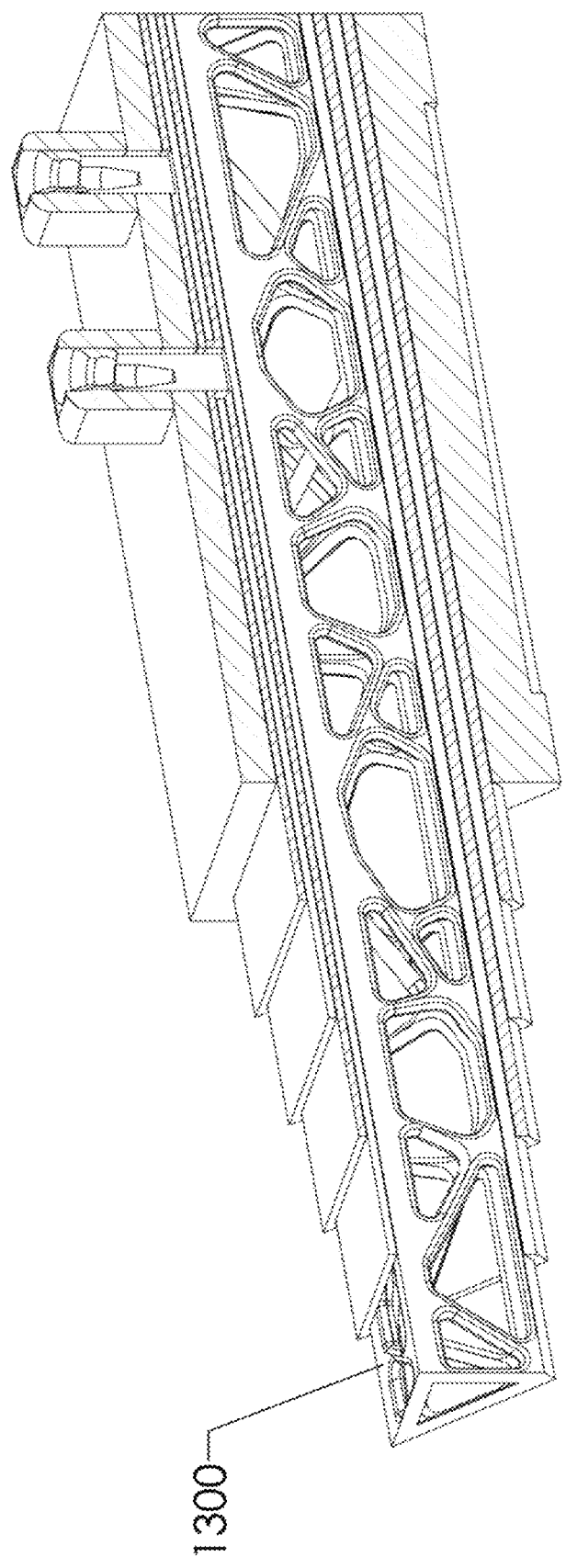
FIG. 13 shows a bird bone section of the male conductive frame.

The bird bone section 1300 of FIG. 13 is also the same material as the first and second conductive layers 900, 1200 and carries a positive charge. The shape of this core 1300 can be hollow and organic, like a bird bone in order to be lightweight and to offer some structural reinforcement while allowing airflow.

FIG. 14 shows an alternate cross section of the layers of the frame in an end view. Starting at the center 1400, the "bird bone" 1300 is positively charged, surrounding the center 1400 is the second conductive layer 1200 (positively charged), then the second insulative layer 1100, then the first conductive layer 900 (negatively charged), then the first insulative layer 800 and finally the shell 600 on the outside. Post slots 510 are shown at the top of the image. (Note that in this example, the second insulative layer 1100 is not continuous, for example, due to limited space).

Figure 15:
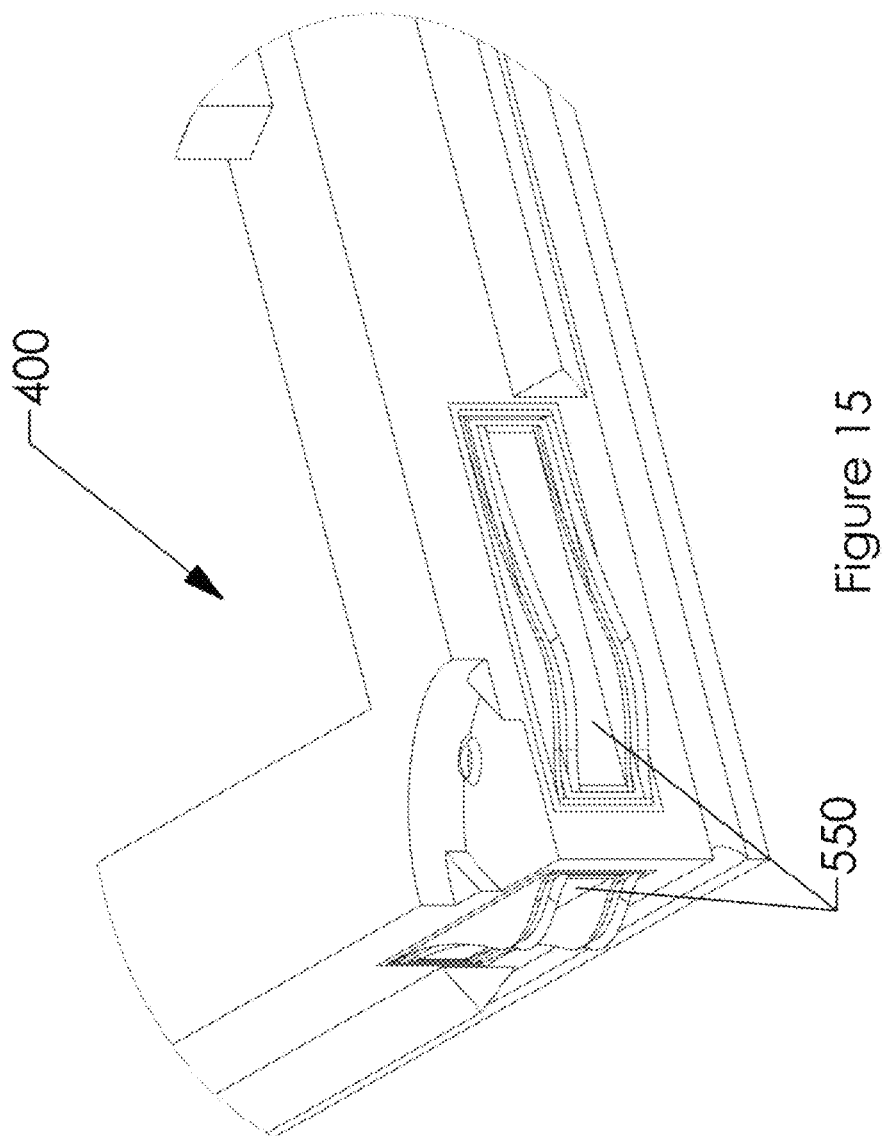
FIG. 15 shows connector detail of the male conductive frame.
Figure 16:
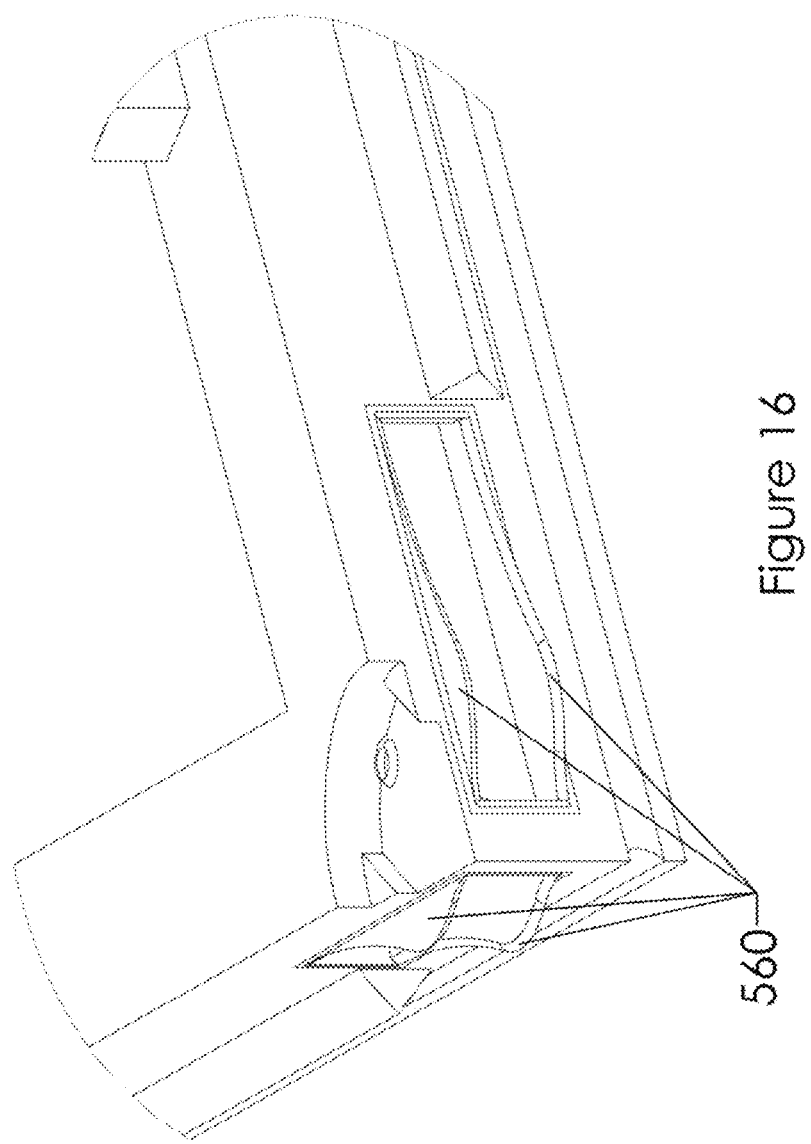
FIG. 16 shows male frame connector tabs for a first conductive layer of the male conductive frame.
Figure 17:
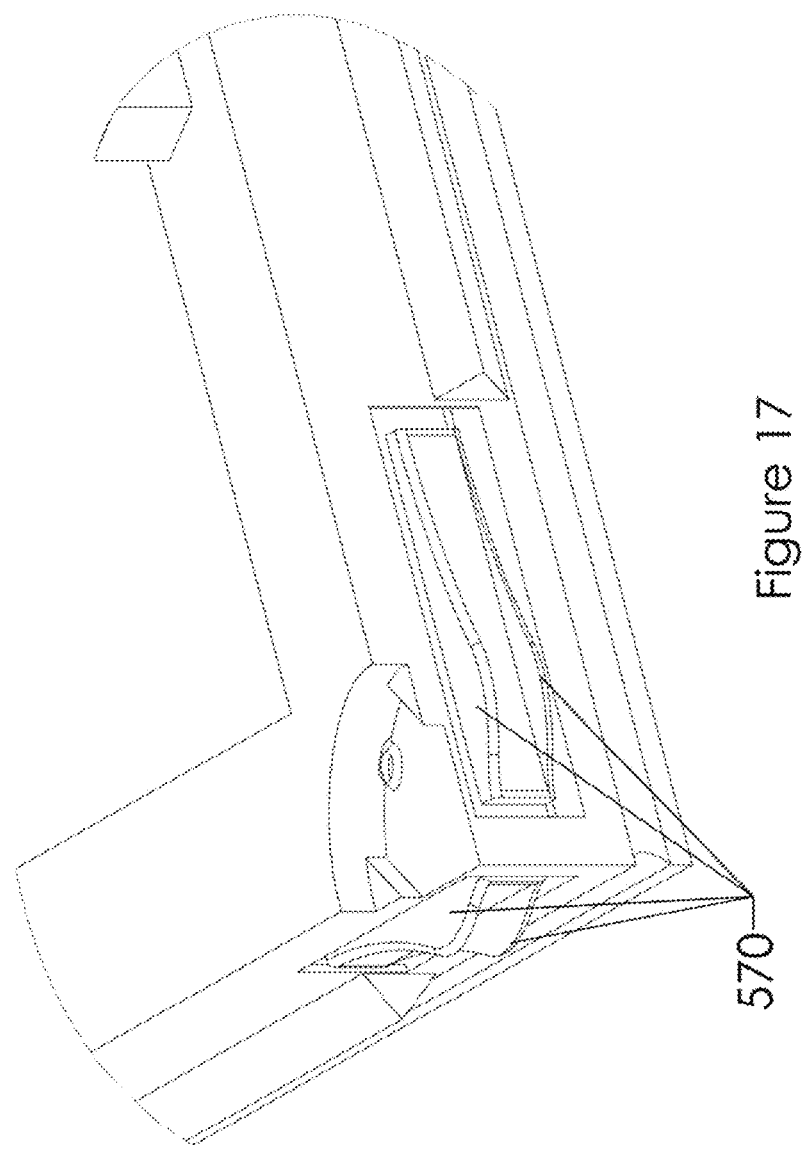
FIG. 17 shows male frame connector tabs for second conductive layer of the male conductive frame.

FIG. 15 shows a cropped view of a male -A- conductive frame 400, with open rectangular slots 550 at the corners. These slots are openings in the conductive "bird bone" core 1300 to allow the flow of low pressure gas between panel sections when they are connected. FIG. 16 shows an isolated view of the connector tabs 560 for the first conductive layer 900. The outer border of this layer and these tabs is the first insulative layer 800. FIG. 17 shows an isolated view of the connector tabs 570 for the second conductive layer 1200. The outer border of this layer and these tabs is the second insulative layer 1100.

Figure 18:
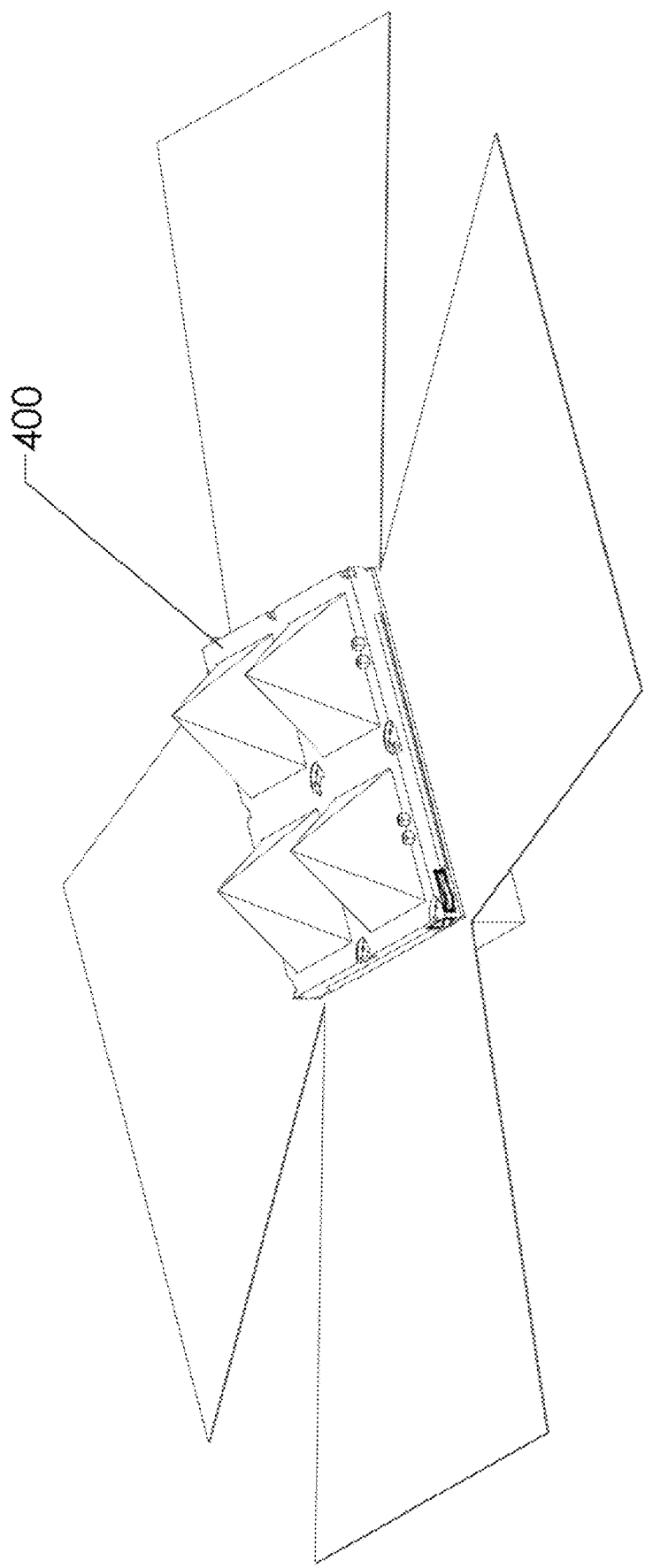
FIG. 18 shows the frame positioned with the pyramid mold core.
Figure 19:
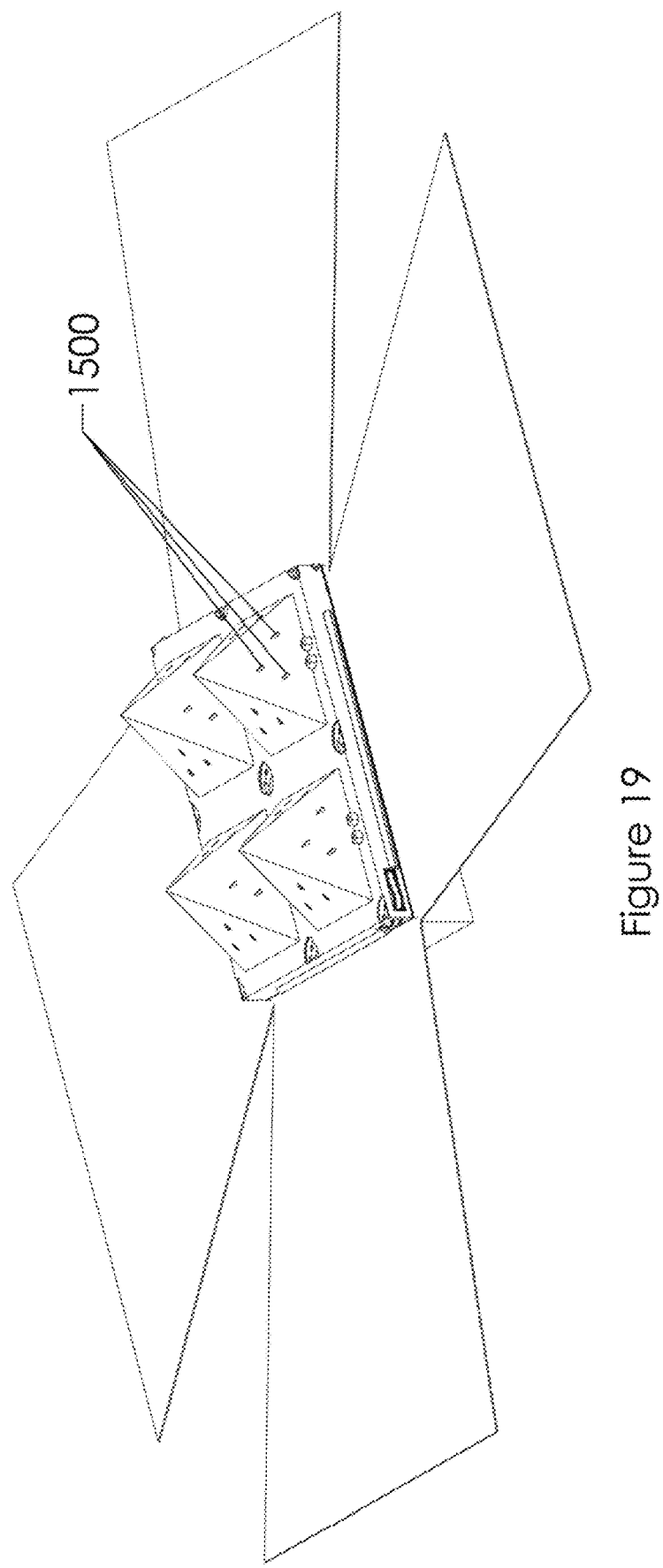
FIG. 19 shows "keyhole" slots in carbon fiber sheet.
Figure 20:
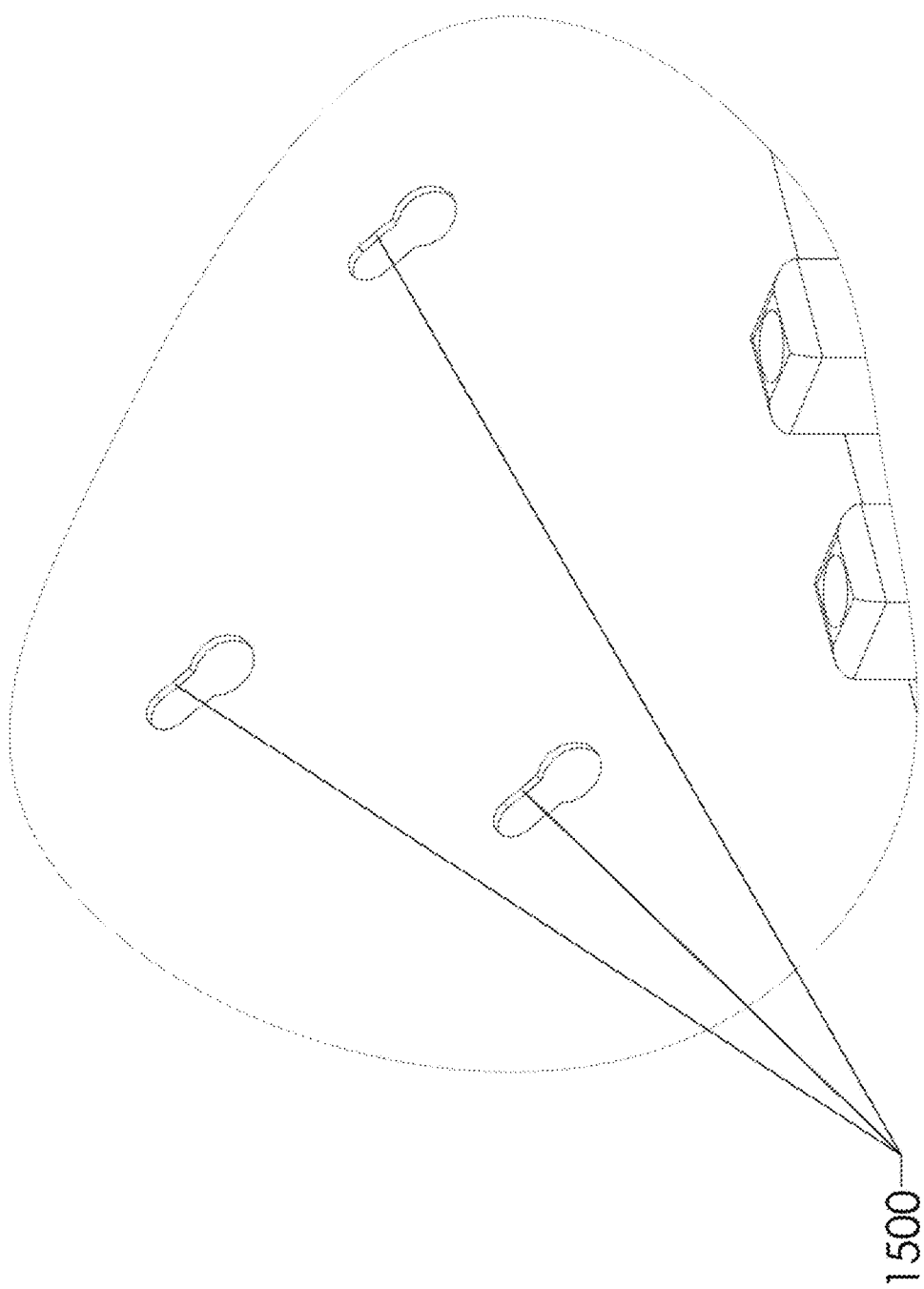
FIG. 20 shows close-up detail of the "keyhole" slots.

FIG. 18 shows a male -A- conductive frame 400 in position on a vacuum formed, carbon fiber sheet 200. FIG. 19 shows one set of three "keyhole" slots 1500 cut into the first layer of a vacuum formed, carbon fiber sheet 200. FIG.

Figure 21:
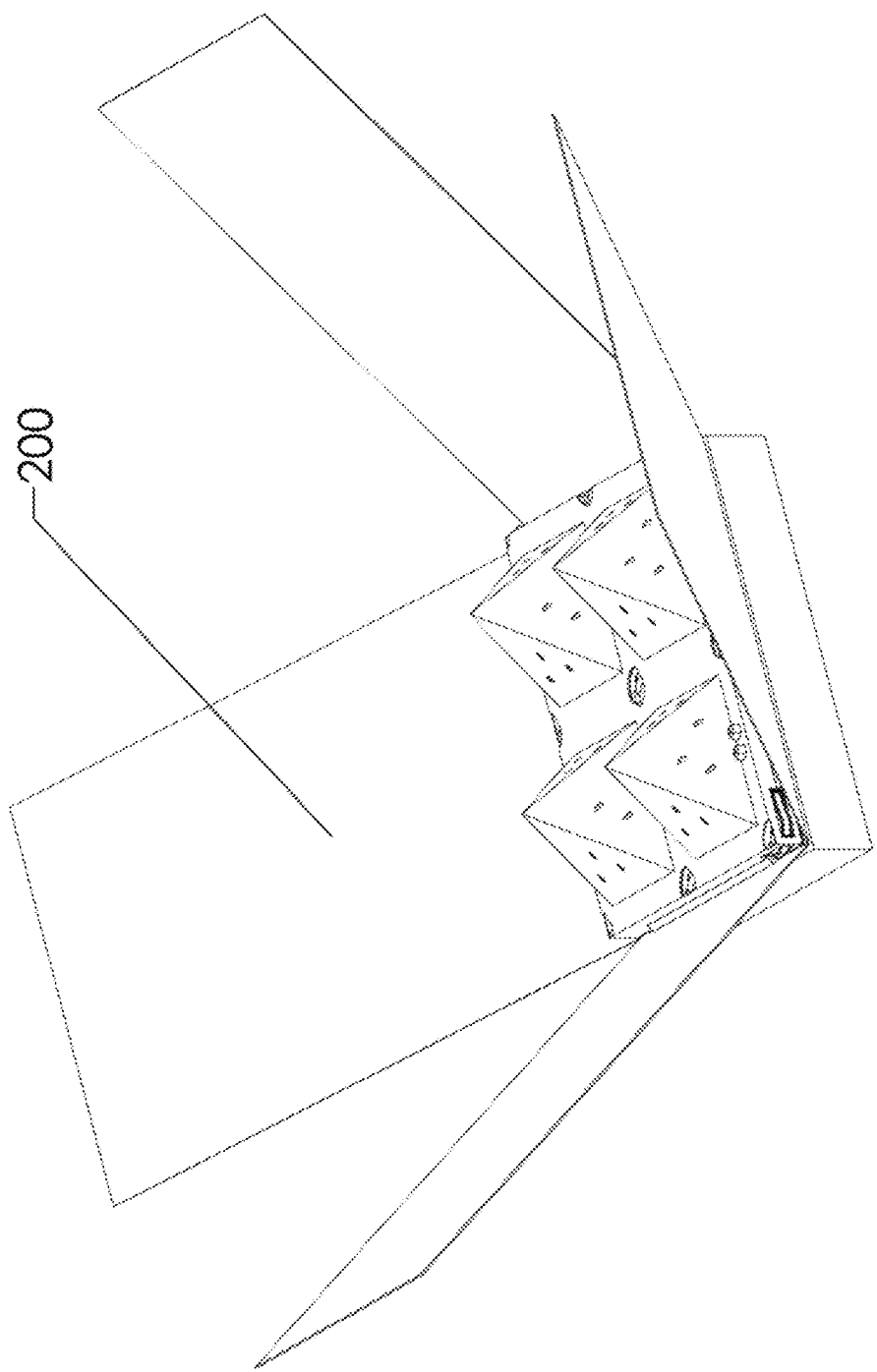
FIG. 21 shows the carbon fiber sheet preparing to wrap around the frame.
Figure 22:
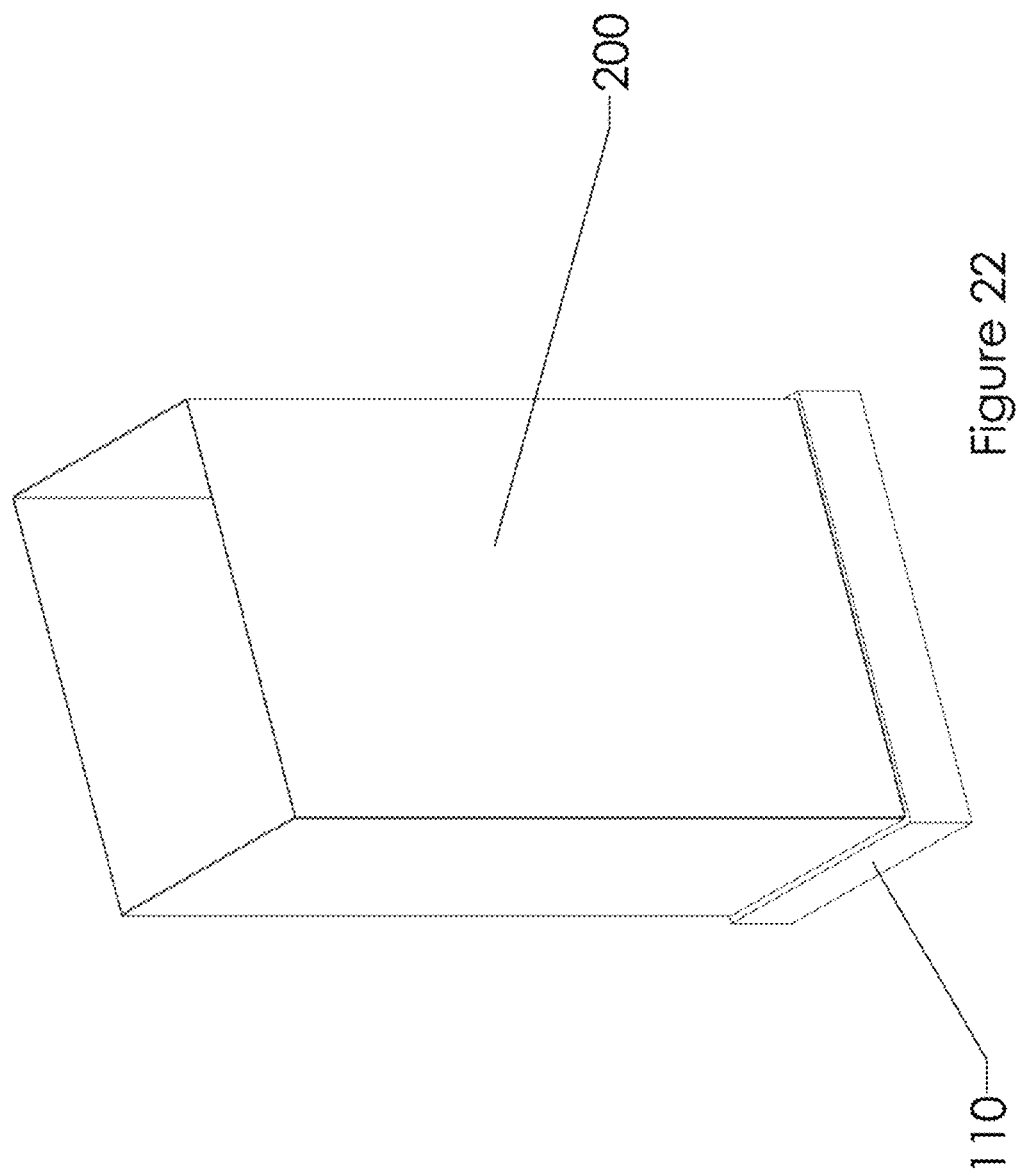
FIG. 22 shows the outside edges of the carbon fiber sheet pulled up, exposing the "foot print" of the housing.

20 shows a detail of the profiles of the "keyhole" slots 1500. The narrow section of each slot 1500 retains the shoulder of a post 1810 on the back of a solar panel 1800, when it is put in position. There are four sets of slots 1500 for each pyramid shaped boss and four pyramid shaped bosses total for each carbon fiber housing. FIG. 21 shows the outside edges of the carbon fiber sheet 200 preparing to wrap around the frame 400 and on top of itself. FIG. 22 shows the outside edges of the carbon fiber sheet 200 pulled up, exposing the "foot print" 110 of the housing to allow clearance for the clamp fixture 1600.

Figure 23:
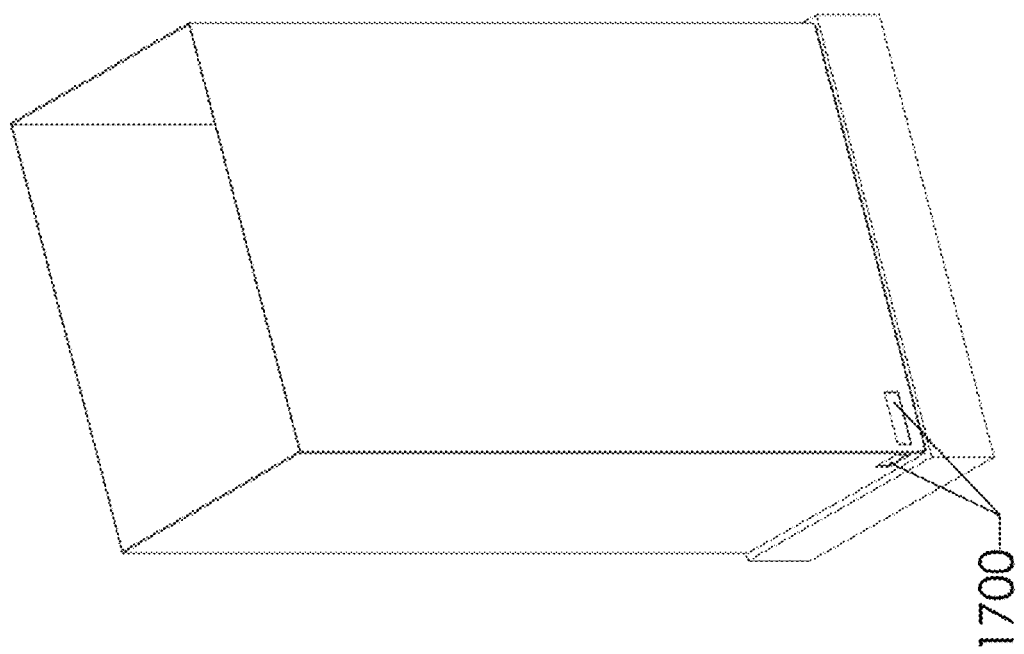
FIG. 23 shows two vents cut into the carbon fiber sheet.
Figure 24:
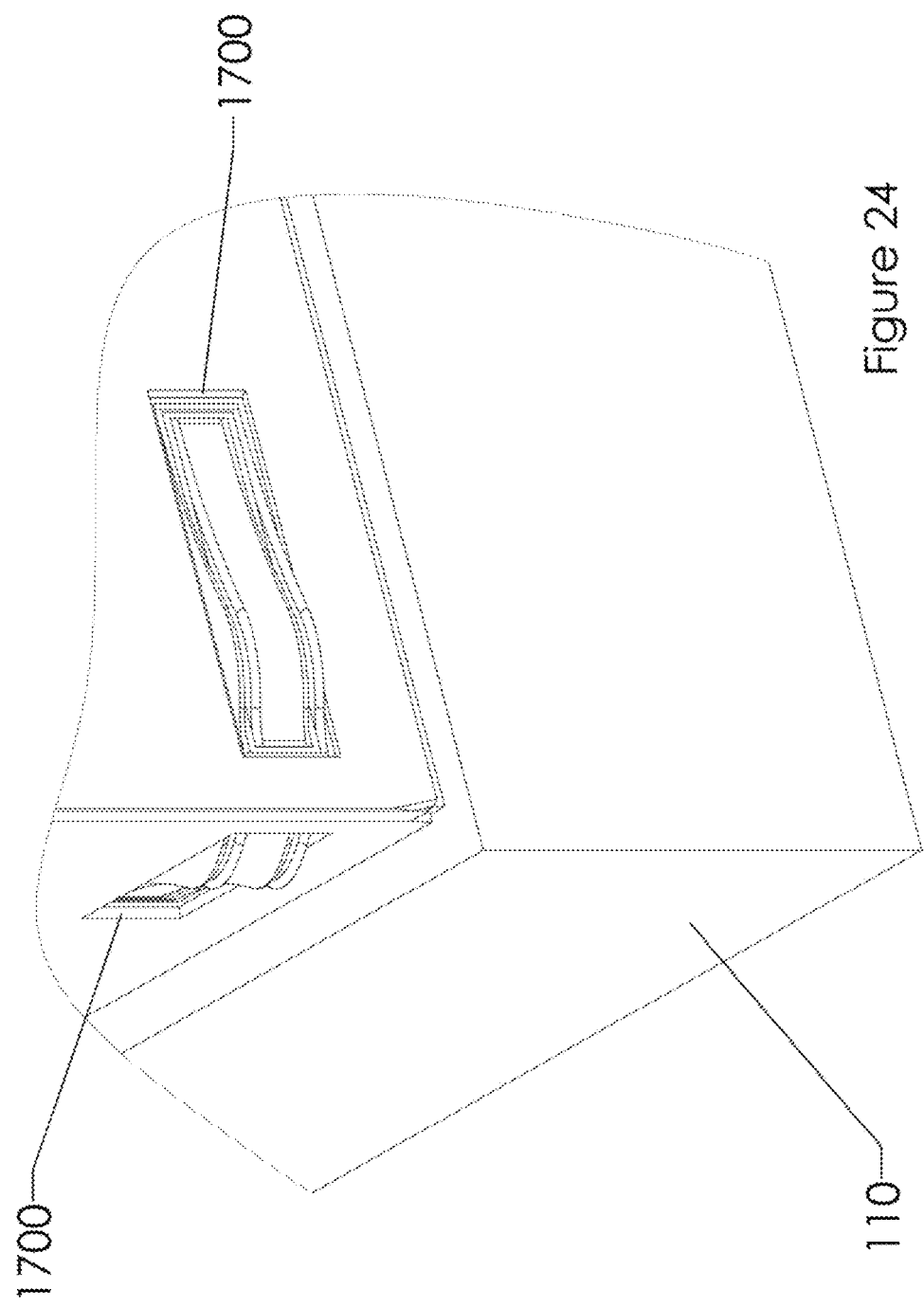
FIG. 24 shows a detail of the vents.

FIG. 23 shows two vents 1700 being cut into the carbon fiber sheet 200 at the long diagonal corner (opposite corner obscured in this view). These cuts are to allow clearance for the open rectangular slots 550, the connector tabs 560 & 570. FIG. 24 shows a detail of the vents 1700.

Figure 25:
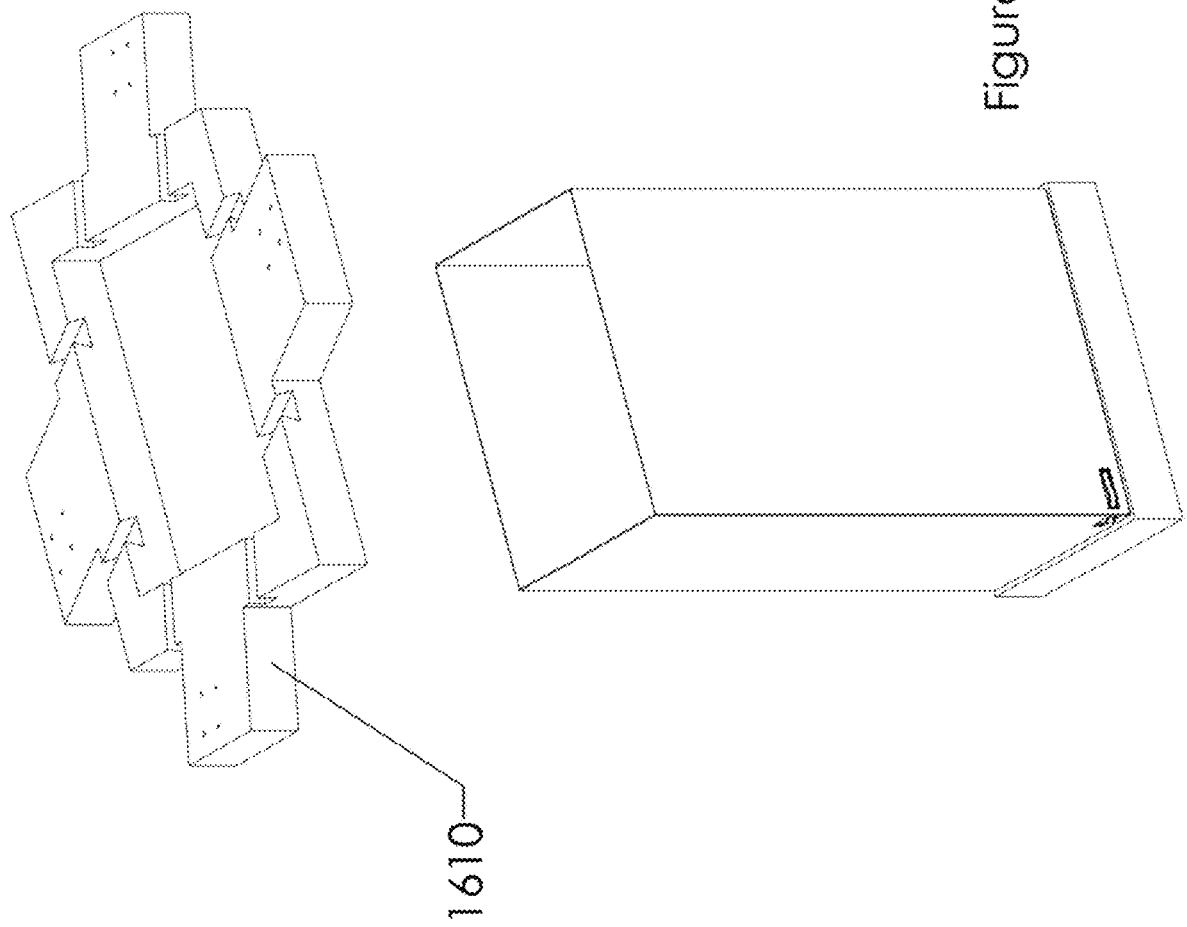
FIG. 25 introduces the clamp base.
Figure 26:
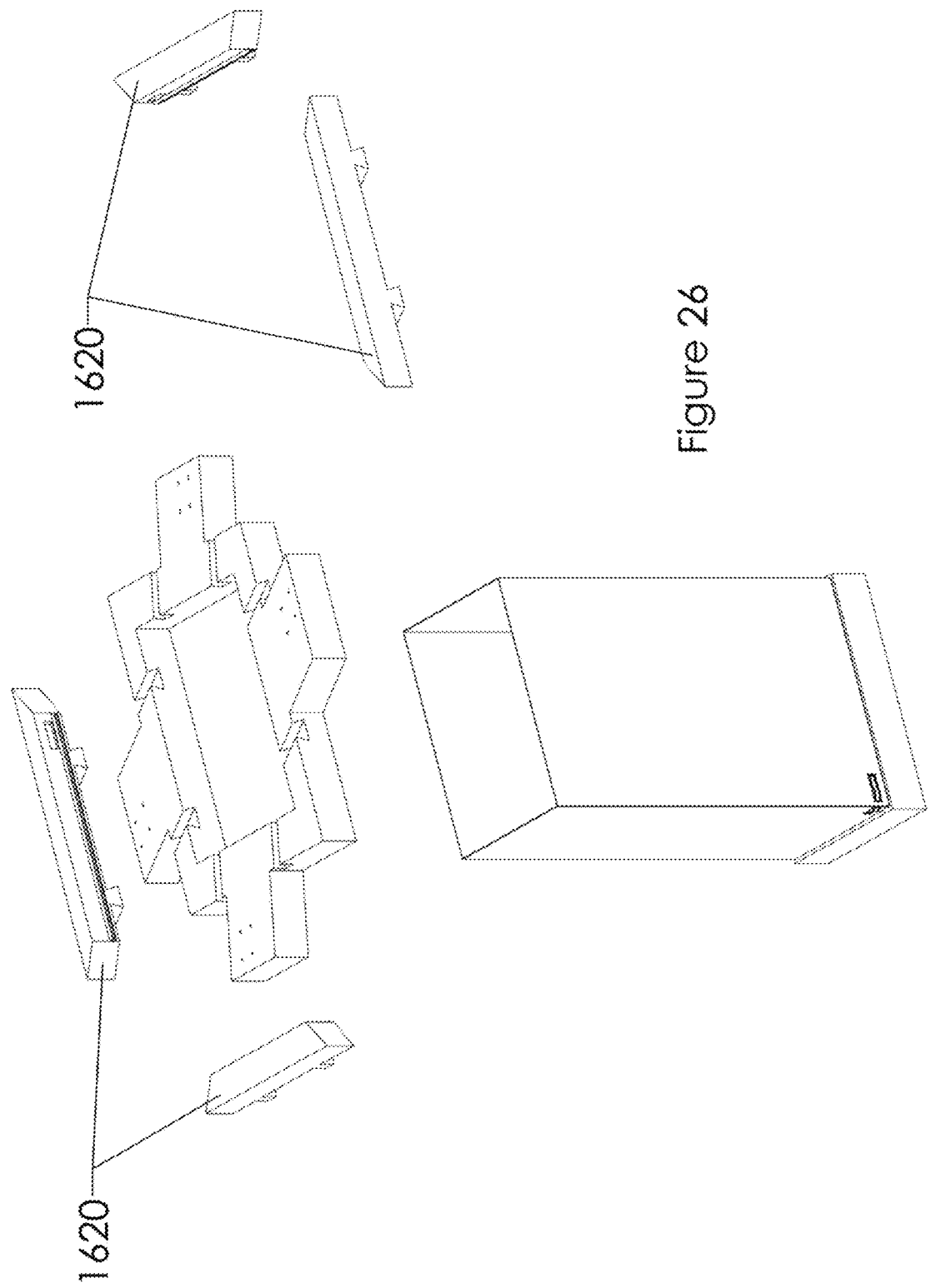
FIG. 26 introduces four slide action slides.
Figure 27:
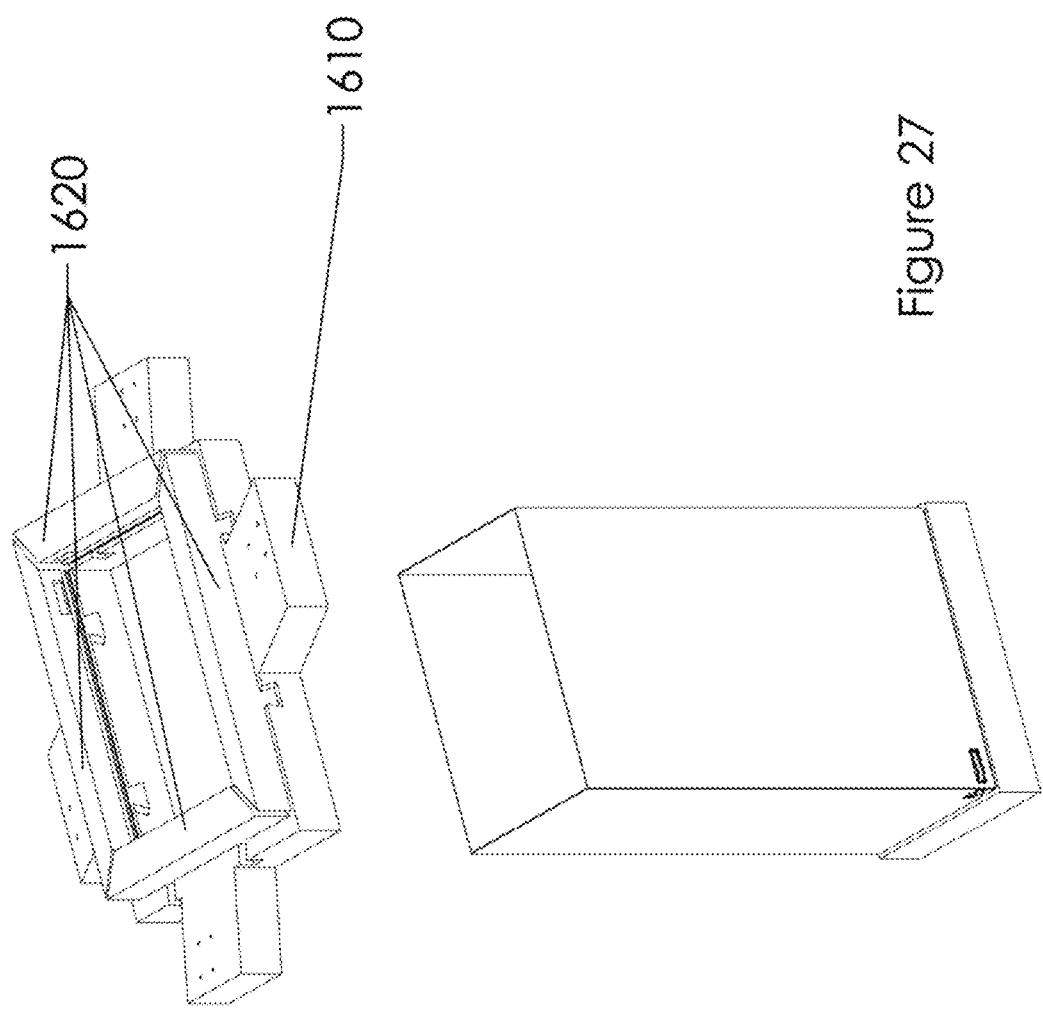
FIG. 27 shows the slide action slides positioned on the clamp base.
Figure 28:
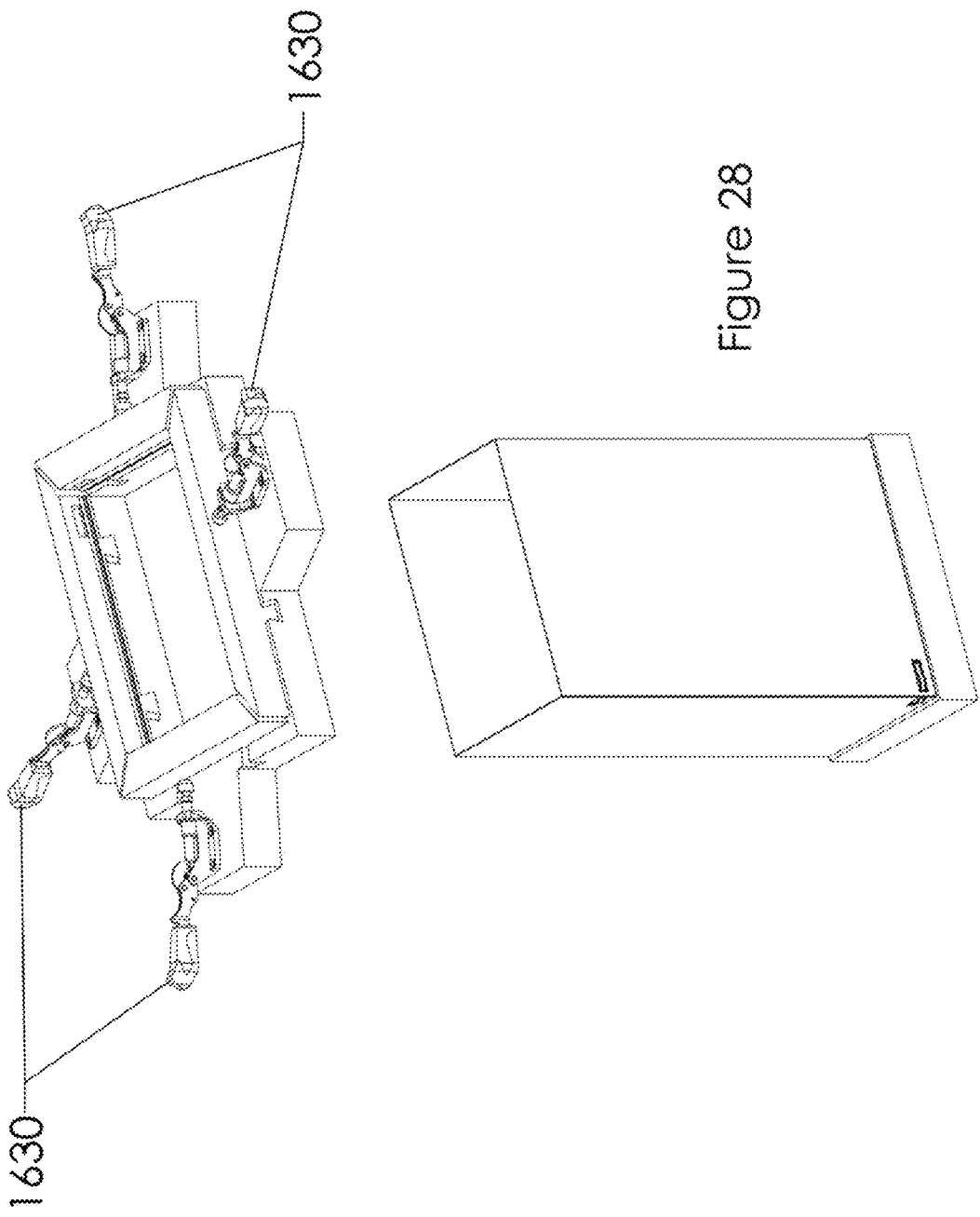
FIG. 28 shows the inline clamps in position on the clamp base.
Figure 29:
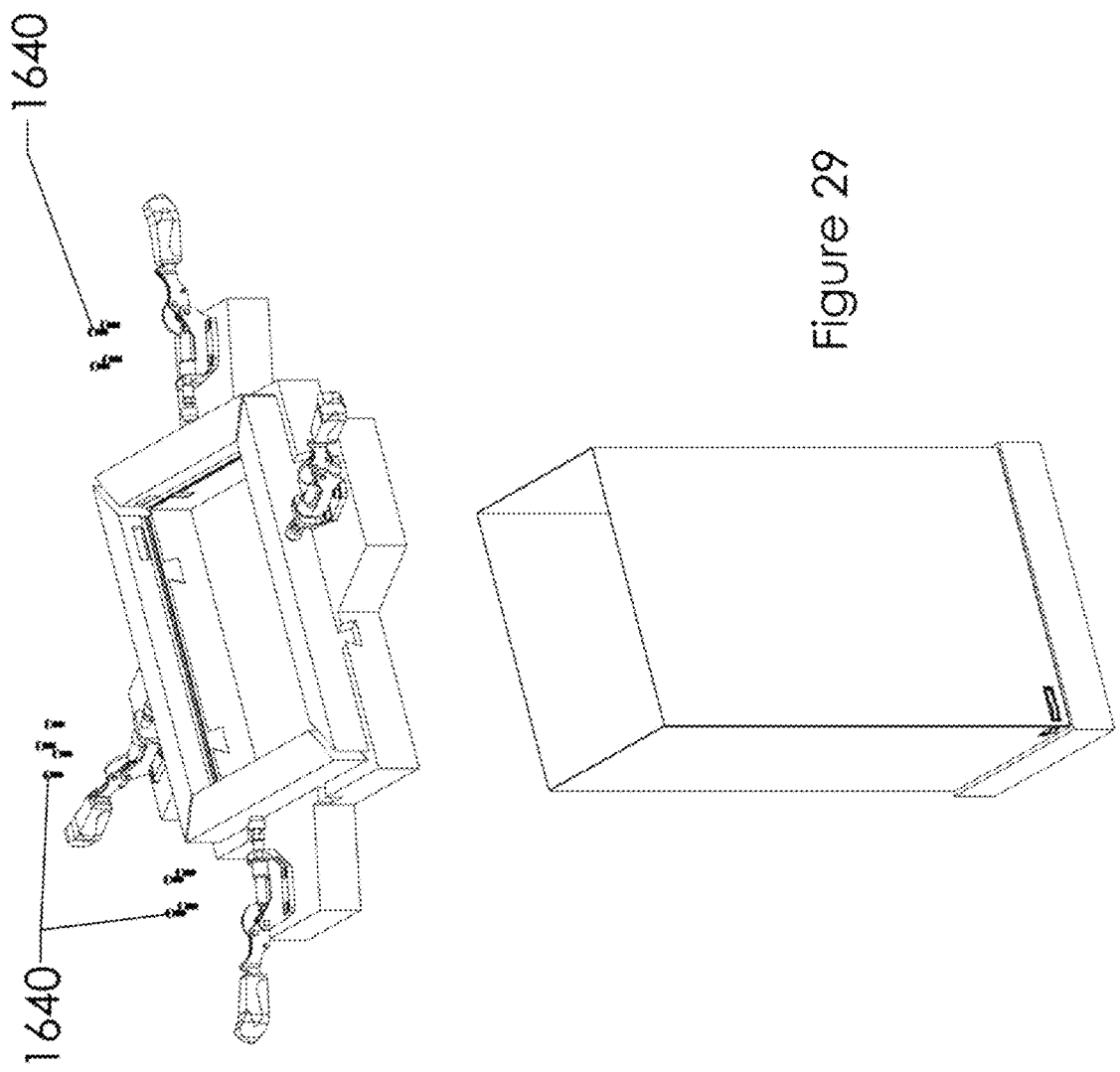
FIG. 29 introduces the inline clamp hardware.
Figure 30:
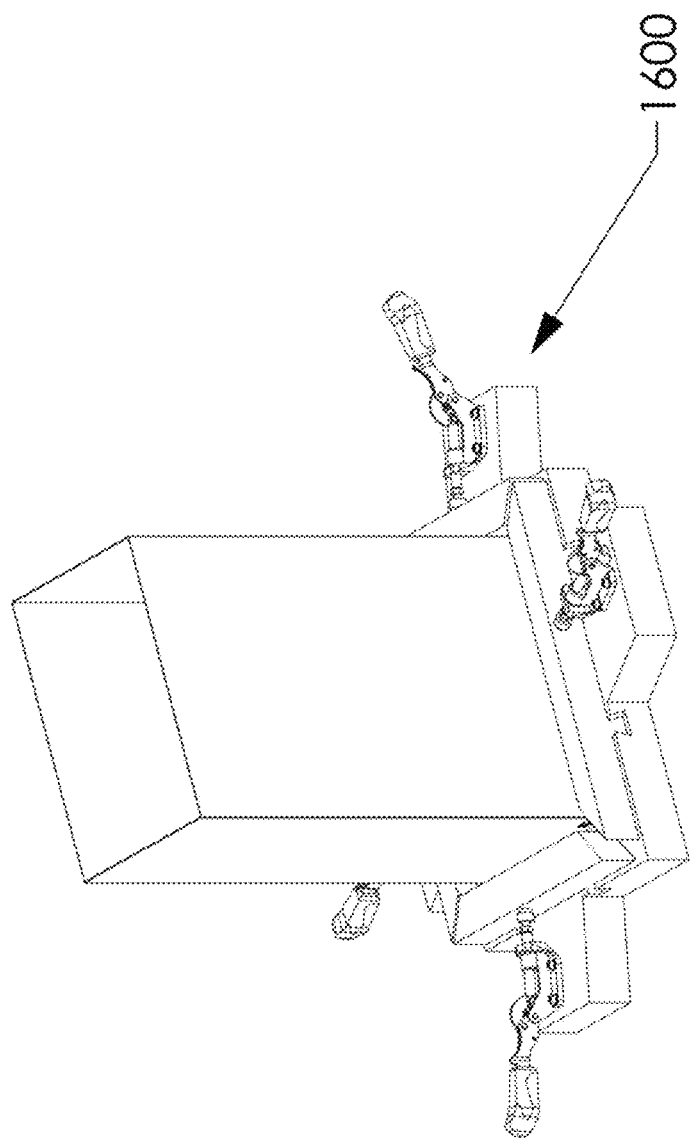
FIG. 30 shows the clamp fixture in position with handles down and open.

FIG. 25 introduces the clamp base 1610 and FIG. 26 introduces four slide action slides 1620 and FIG. 27 shows the slide action slides 1620 positioned on the clamp base 1610. FIG. 28 shows the inline clamps 1630 in position on the clamp base 1610. FIG. 29 introduces the inline clamp hardware 1640. One of the four clamps has the hardware already in position. FIG. 30 shows the clamp fixture 1600 in position with handles down and open.

Figure 31:
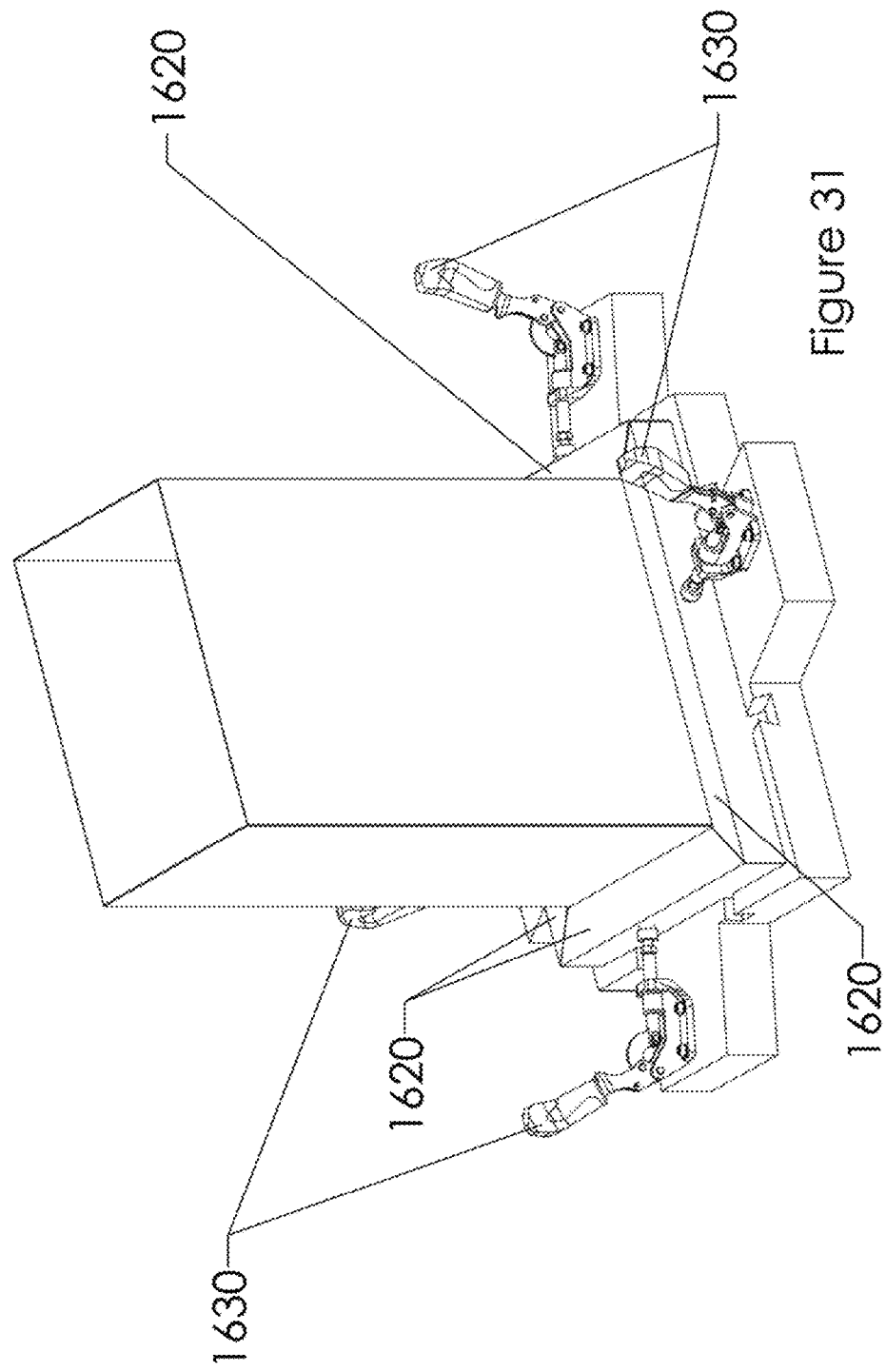
FIG. 31 shows the inline clamps with handles up, closing against the slide action slides.
Figure 32:
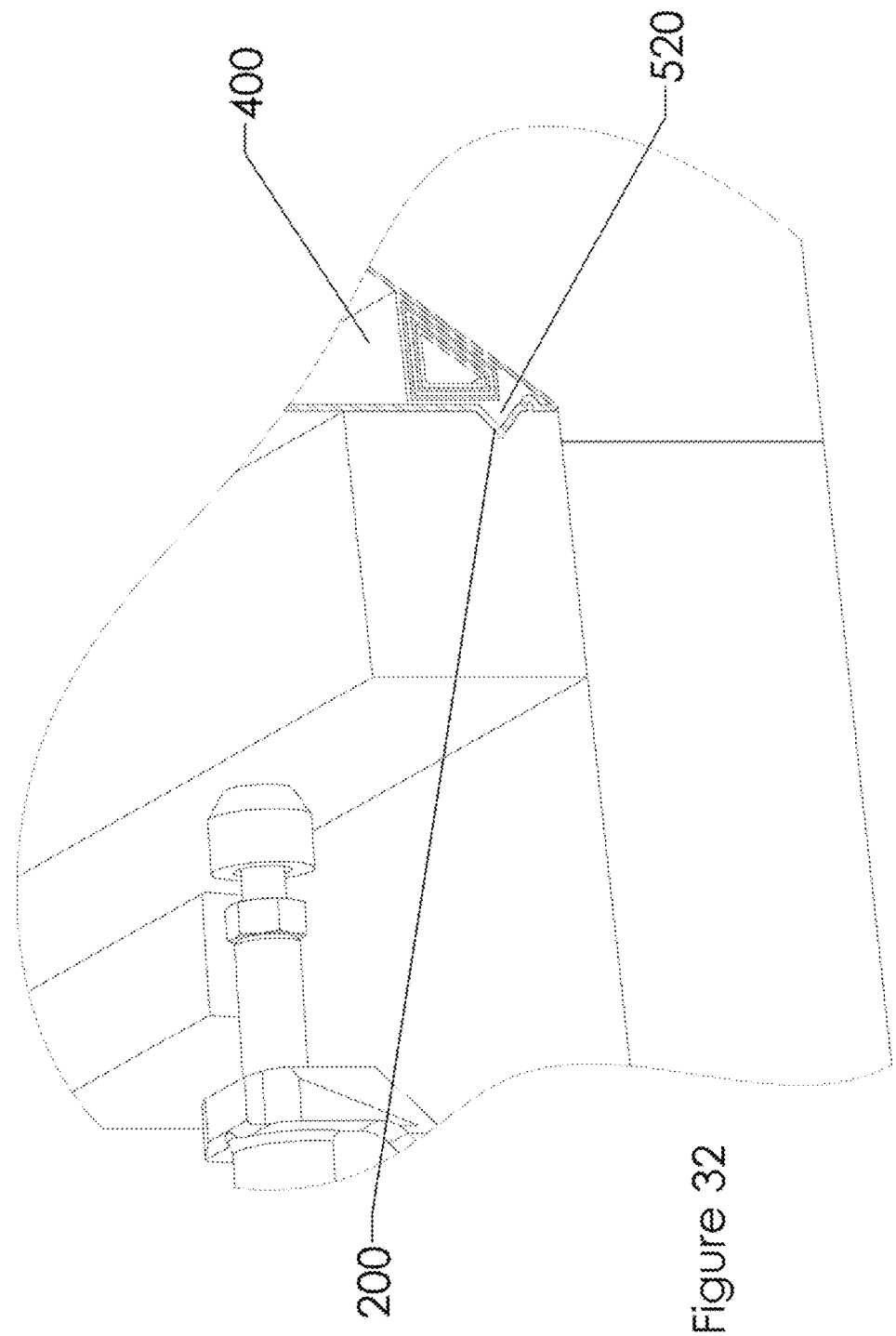
FIG. 32 shows the clamping action against the carbon fiber sheet into a boss on the male -A- conductive frame.

FIG. 31 shows the inline clamps 1630 with handles up, closing against the slide action slides 1620. FIG. 32 shows a detail of the clamping action against the carbon fiber sheet 200 into a V shaped boss 520 on the male -A- conductive frame 400.

Figure 33:
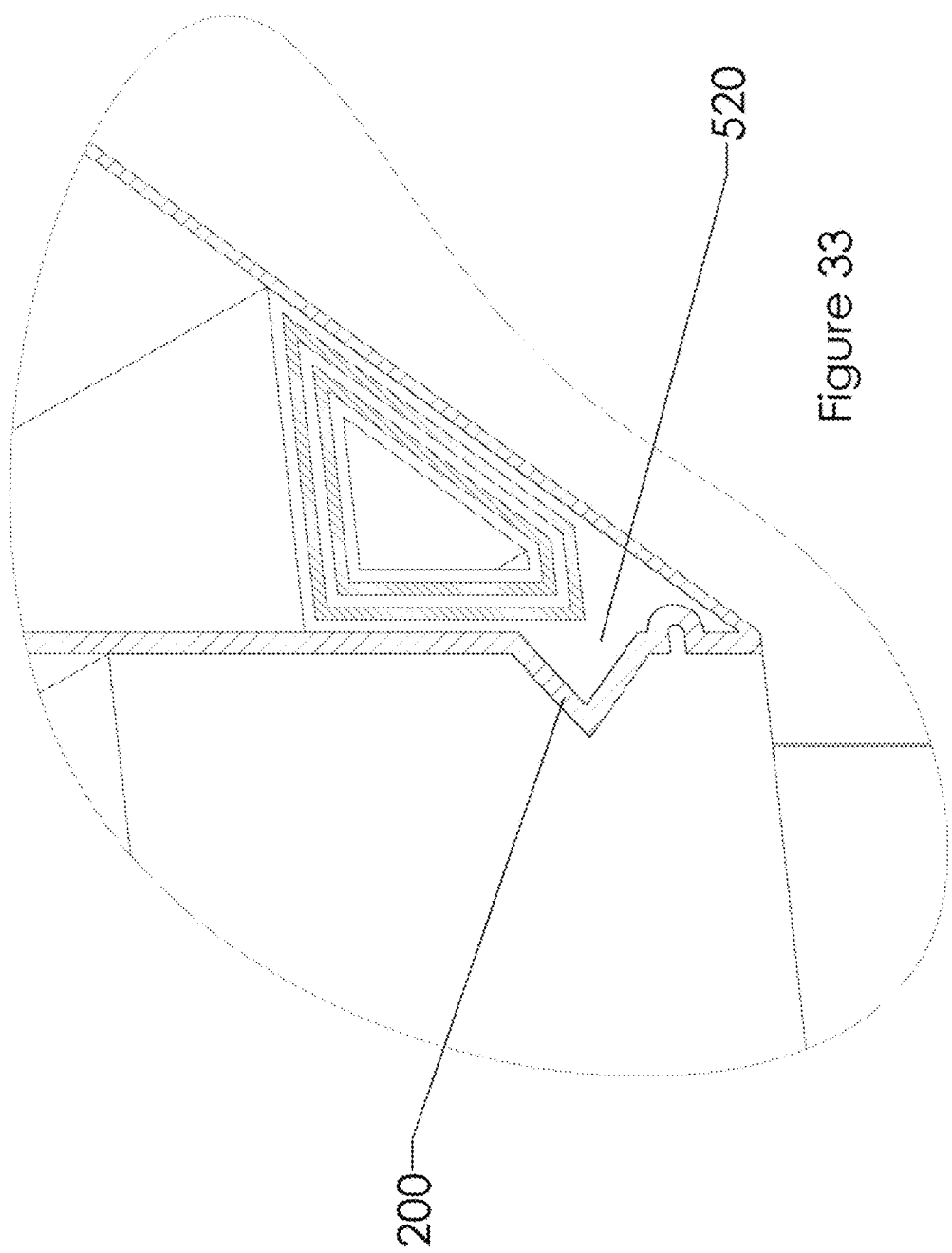
FIG. 33 shows a close-up detail of the area affected by the clamping action.
Figure 34:
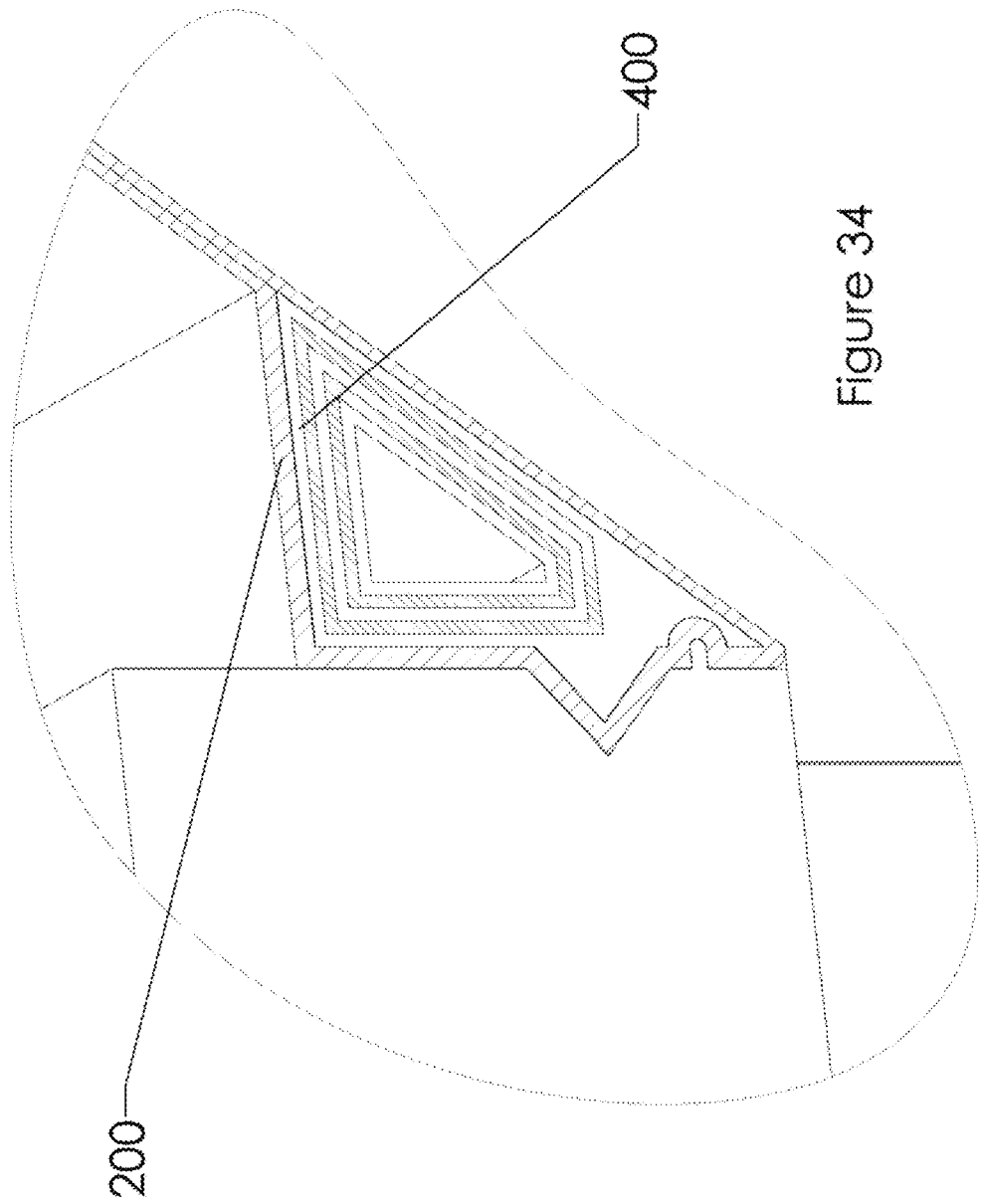
FIG. 34 shows a close-up detail of area where the carbon fiber wraps over the top of the male conductive frame and back onto itself.

FIG. 33 shows a close-up detail of the area affected by the clamping action including the carbon fiber sheet 200 and the V shaped boss 520. FIG. 34 shows a close-up detail of the area where the carbon fiber sheet 200 wraps over the top of the male conductive frame 400 and back onto itself in a second layer.

Figure 35:
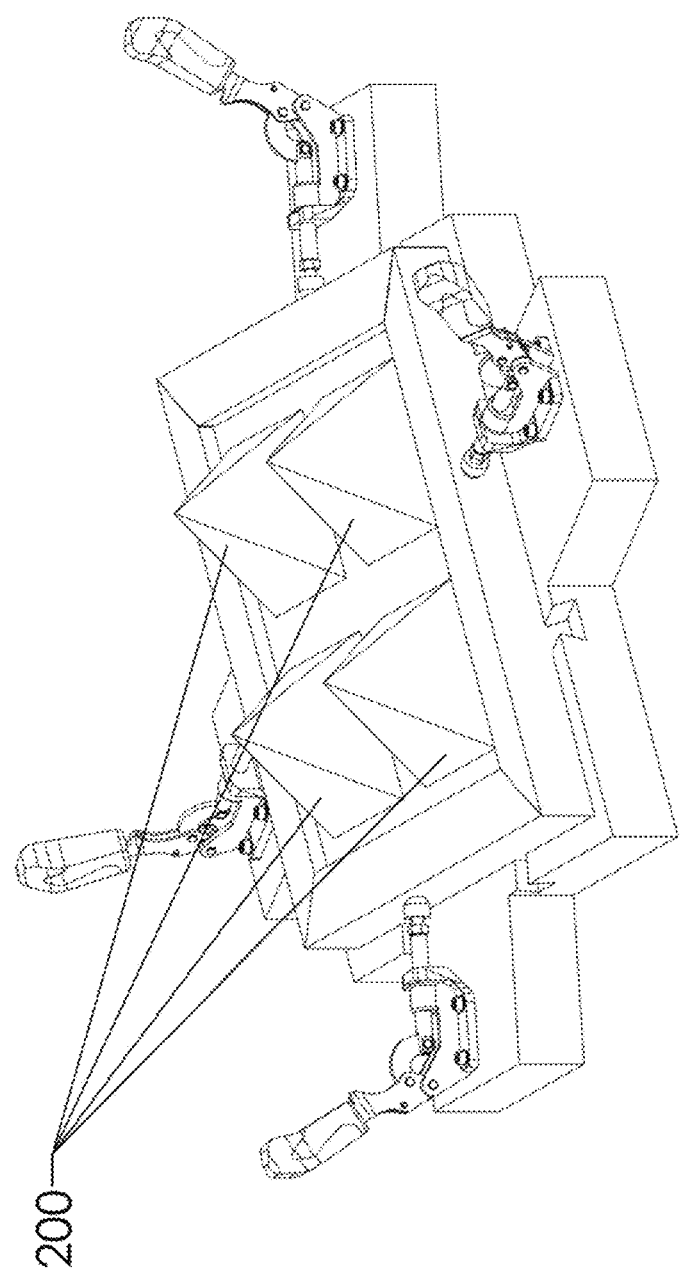
FIG. 35 shows the carbon fiber sheet completely wrapped over itself.
Figure 36:
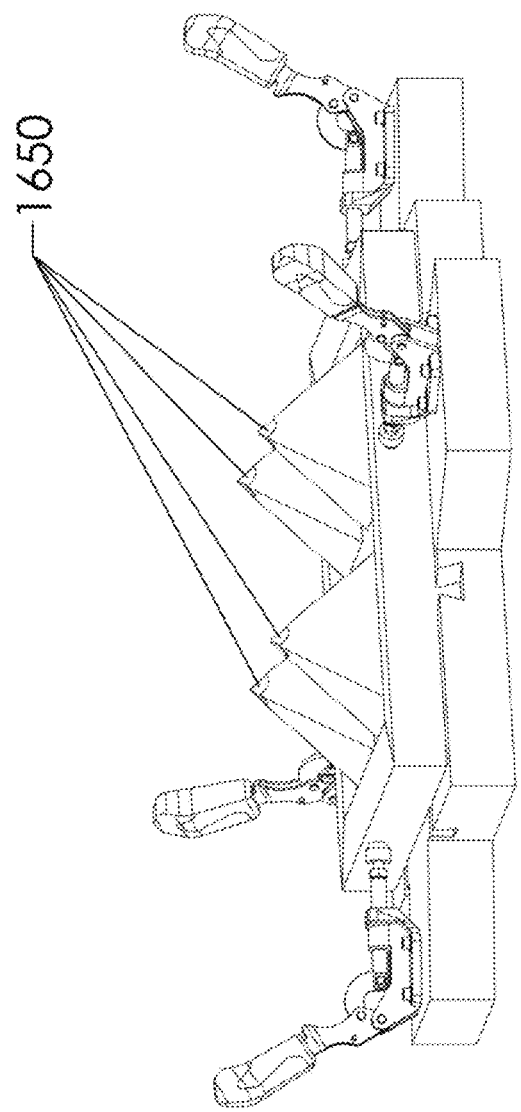
FIG. 36 shows circular cutouts into the top layer of the carbon fiber sheet.

FIG. 35 shows the carbon fiber sheet 200 completely wrapped over itself completing the second layer. FIG. 36 shows circular cutouts 1650 into the top layer of the carbon fiber sheet 200, but not into the first layer. This is to create a recess for the locking posts 1660 to be bonded in.

Figure 37:
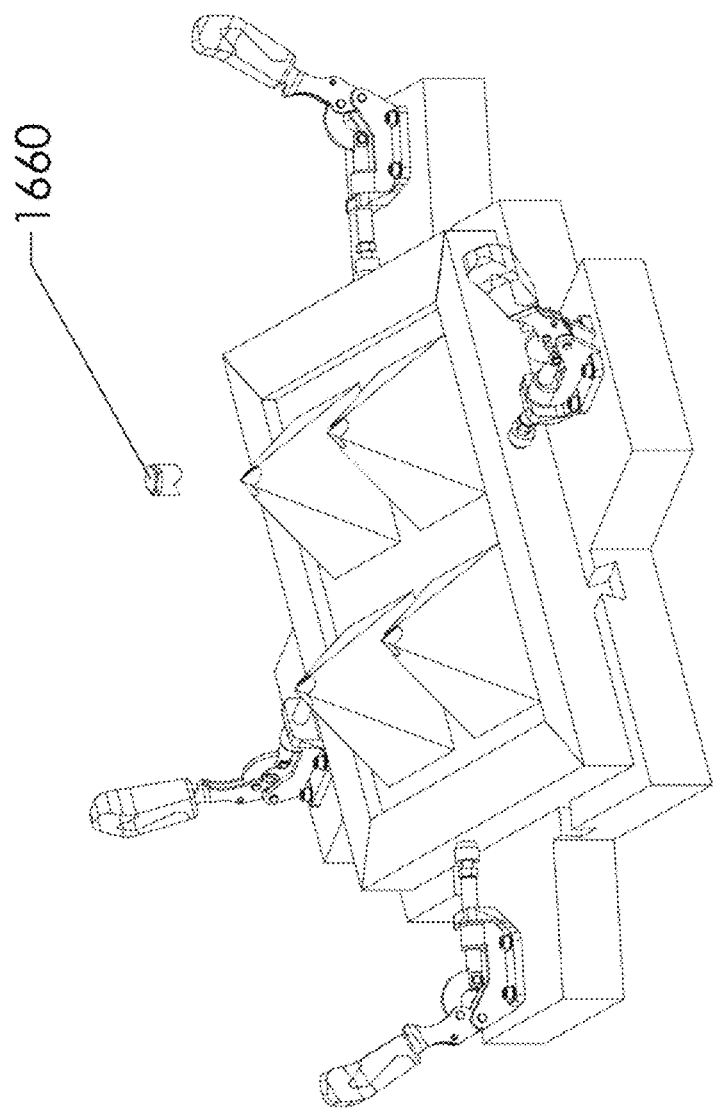
FIG. 37 introduces a locking post.
Figure 38:
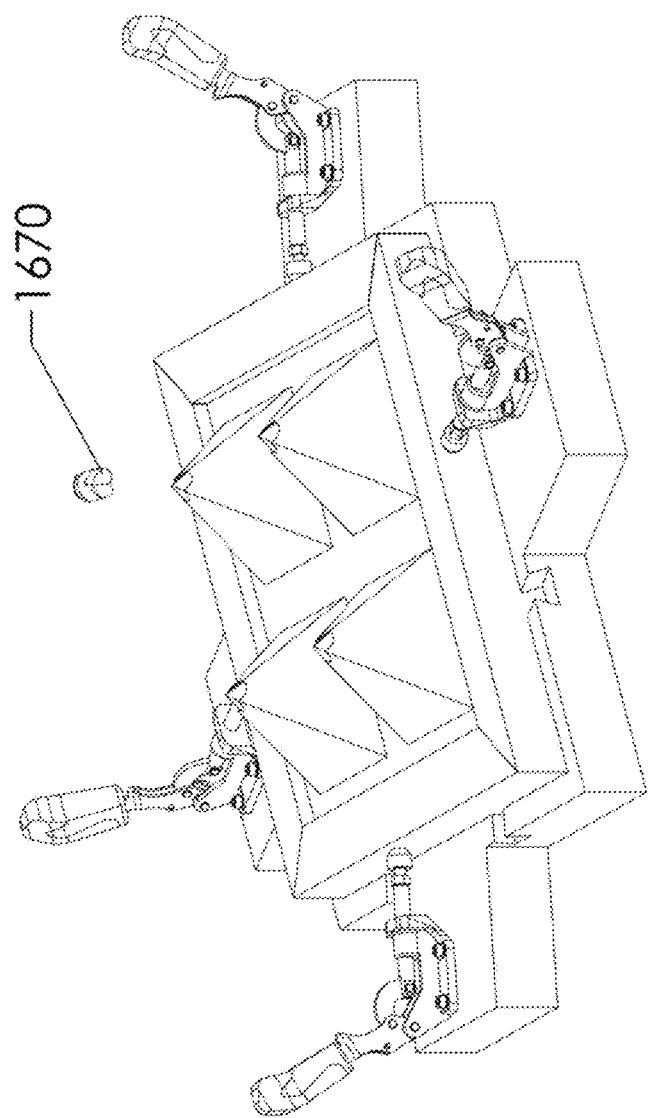
FIG. 38 reveals the bottom side of the locking post.
Figure 39:
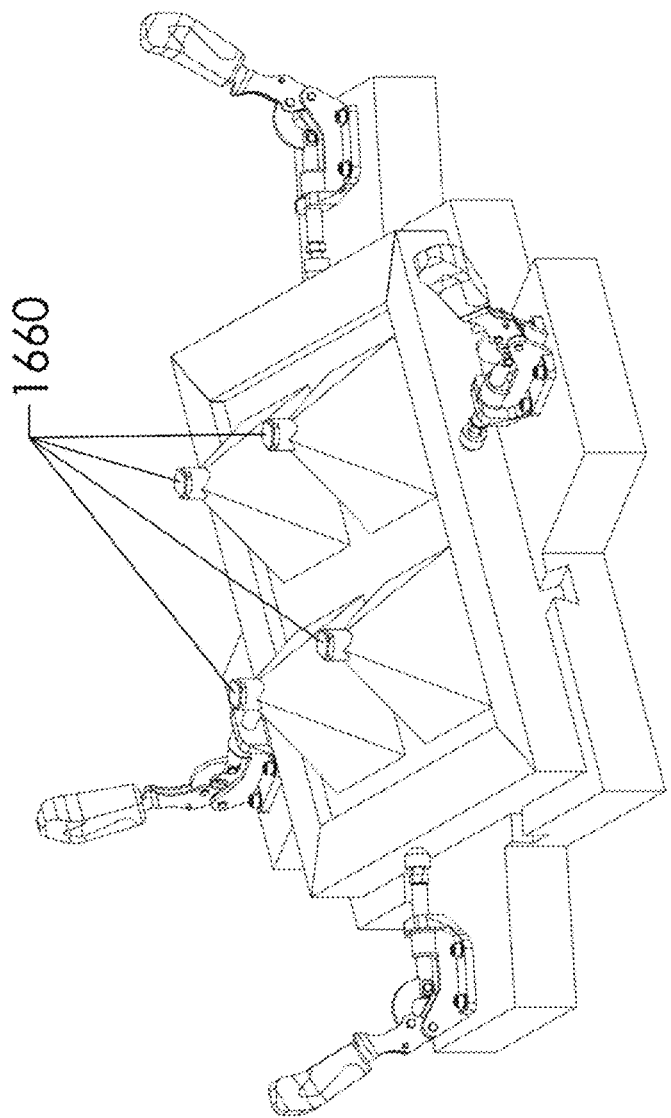
FIG. 39 shows all four locking posts in position.

FIG. 37 introduces a locking post 1660. FIG. 38 reveals the bottom side of a locking post 1660. These four faces 1670 and/or the exposed faces of the circular cutouts 1650 have glue applied there to bond the posts 1660. FIG. 39 shows all four locking posts 1660 in position.

Figure 40:
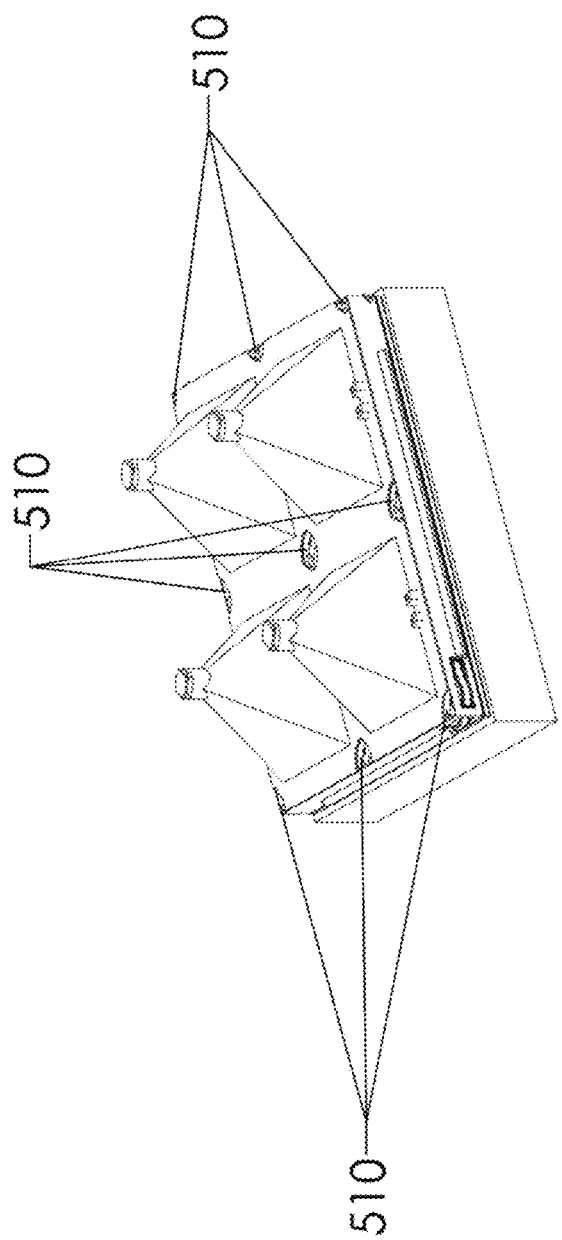
FIG. 40 shows the wrap trimmed to expose the post slots.
Figure 41:
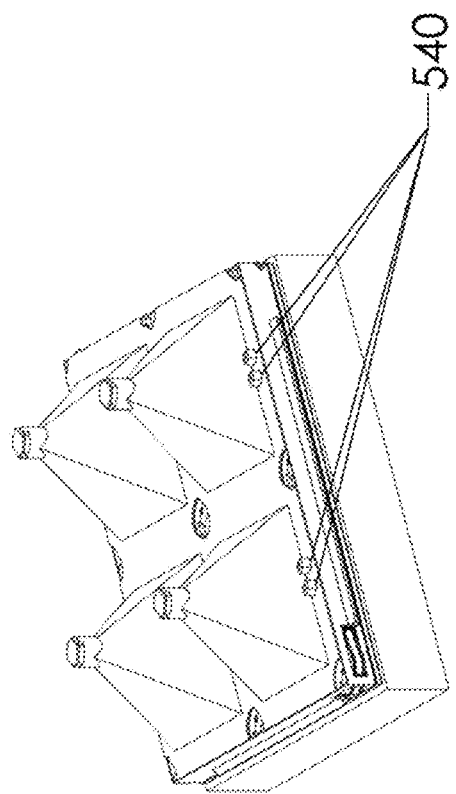
FIG. 41 shows wrap trimmed to expose bosses with ball socket detents.

FIG. 40 shows the wrap trimmed to expose the post slots 510 and FIG. 41 shows the wrap trimmed to expose ball socket bosses 540 with ball socket snap fits 700.

Figure 42:
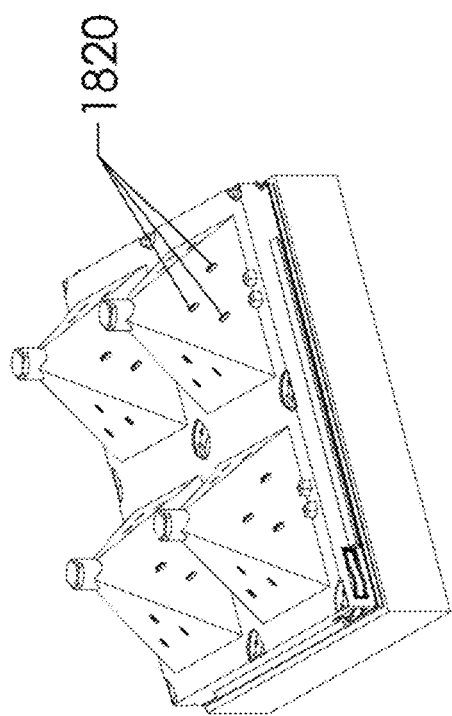
FIG. 42 shows one set of three oval slots cut into the second layer of the carbon fiber sheet.
Figure 43:
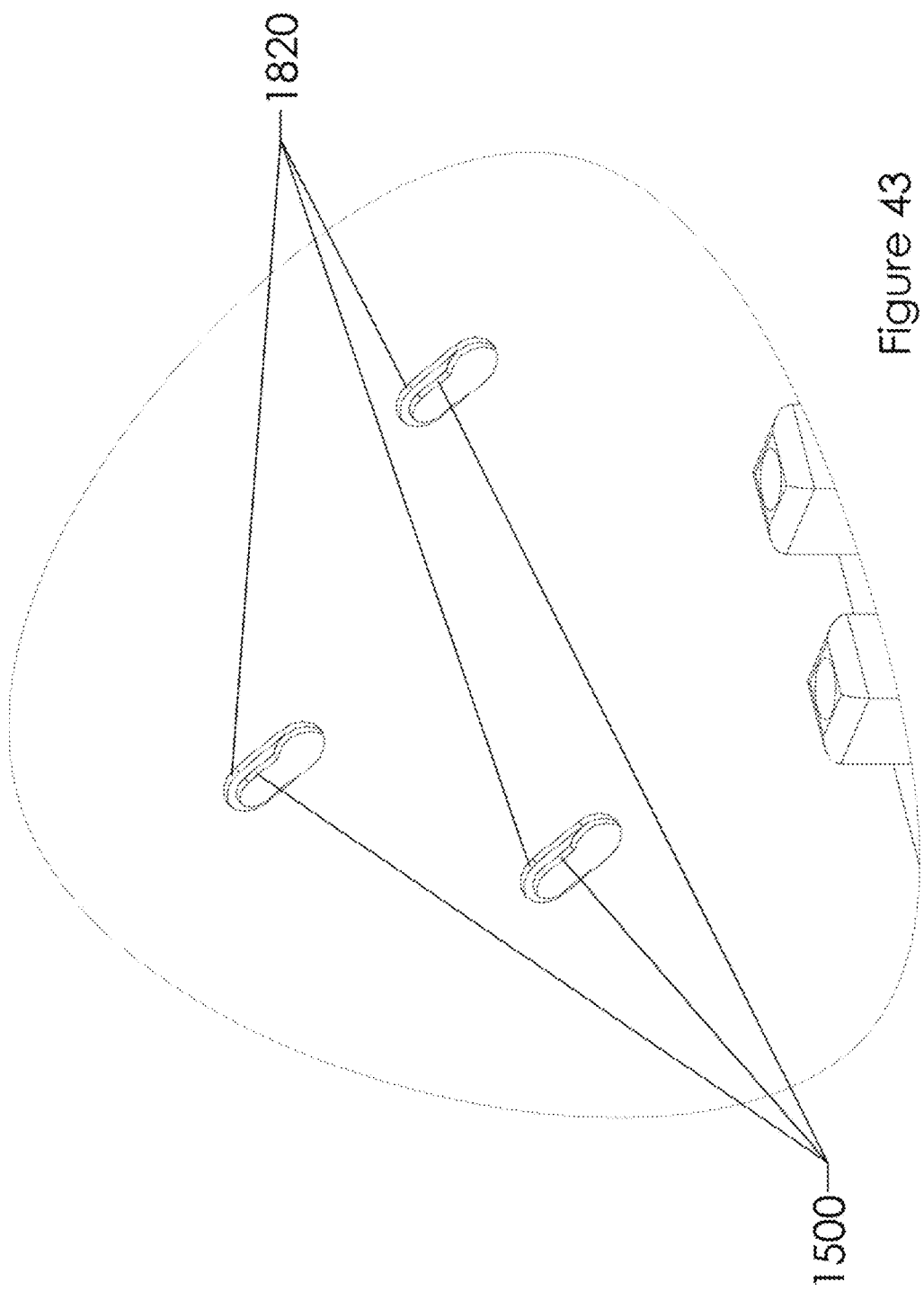
FIG. 43 shows a detail of the profile of the oval slots on top of the "keyhole" slots.

FIG. 42 shows one set of three oval slots 1820 cut into the second layer of a vacuum formed, carbon fiber sheet 200. FIG. 43 shows a detail of the profile of the oval slots 1820 on top of the "keyhole" slots 1500. These slots 1820 are aligned with the "keyhole" slots 1500 on the first layer and provide a stop against the head of a post 1810 on the back of a solar panel 1800 when it is put in position. There are four sets of slots 1820, 1500 for each pyramid boss 120 and a total of four pyramid bosses 120 for each carbon fiber housing.

Figure 44:
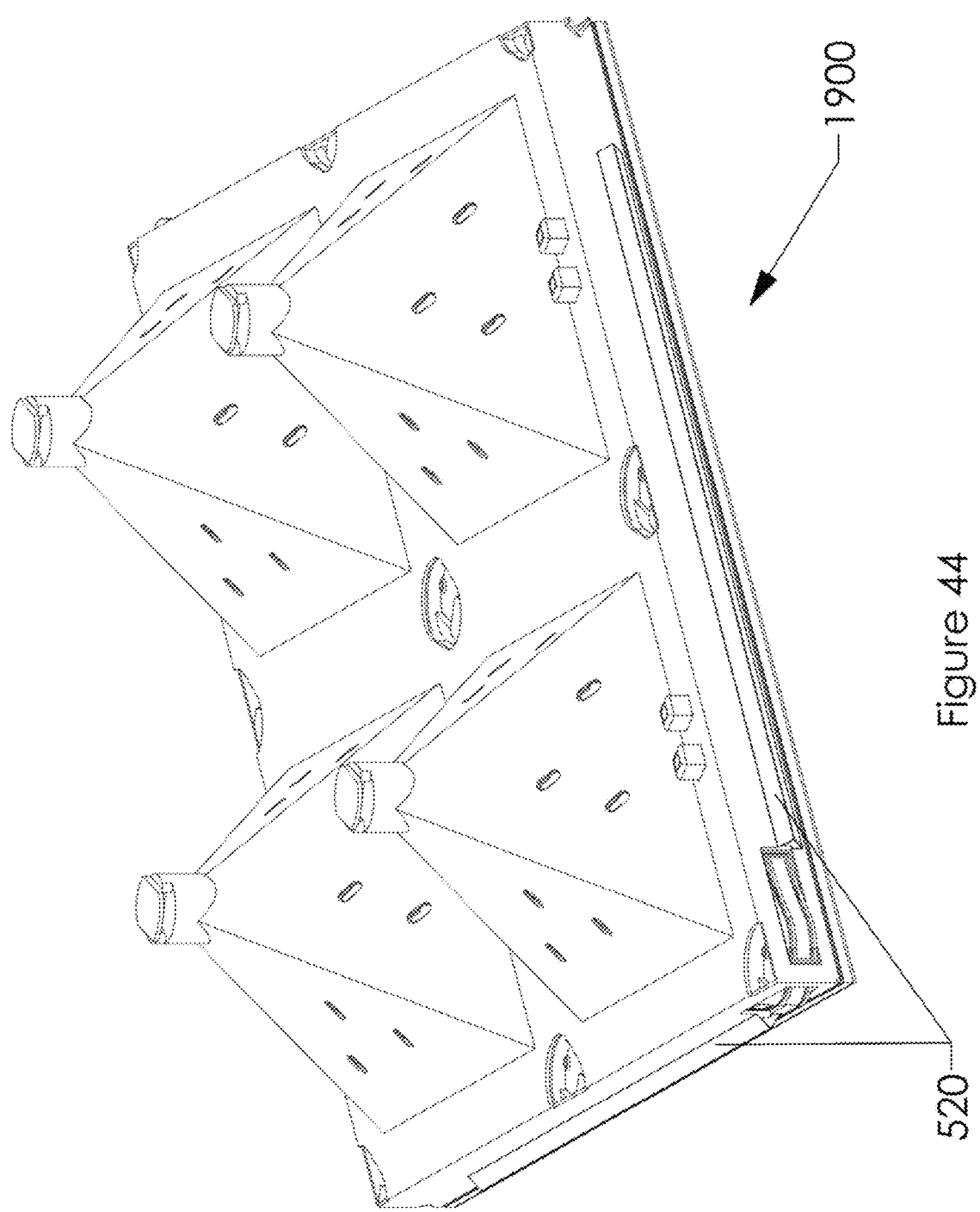
FIG. 44 shows a complete male side wall and bosses.
Figure 45:
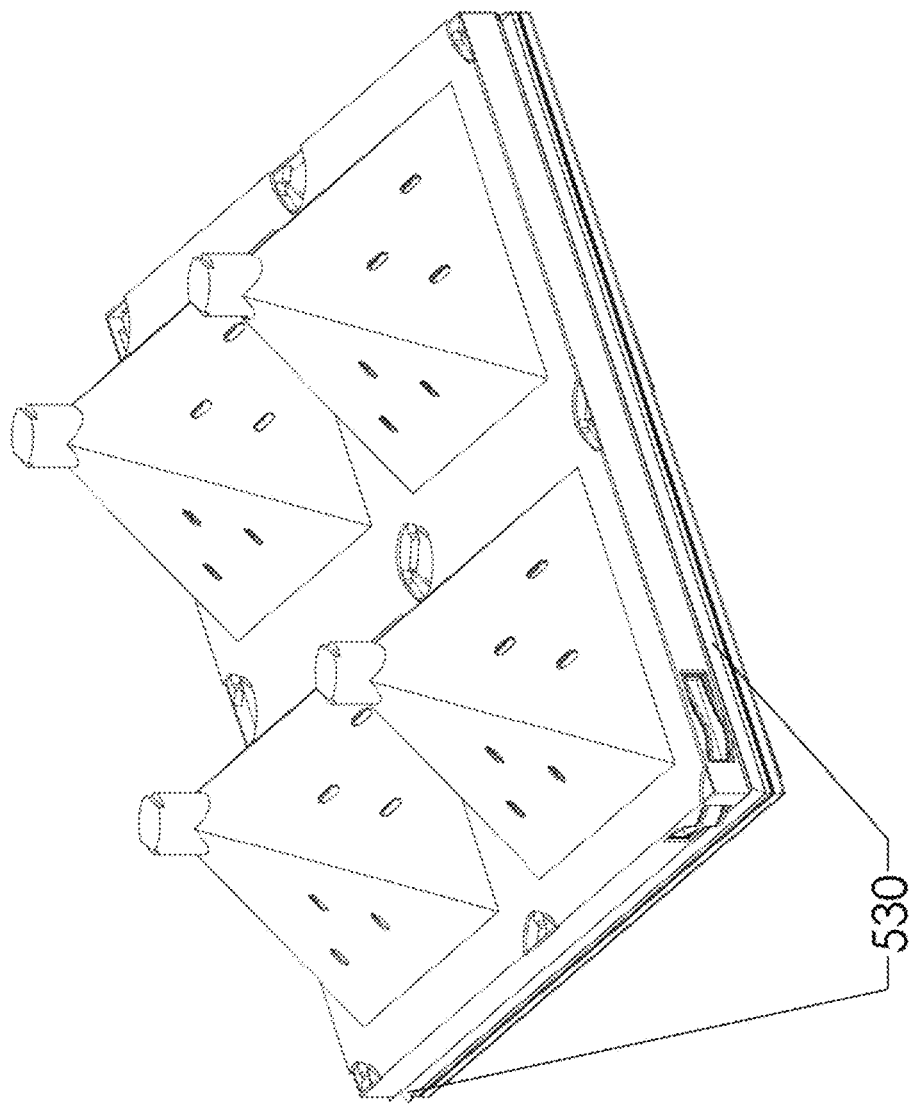
FIG. 45 shows the male side wall oriented to show the grooves.

FIG. 44 shows a complete male side wall 1900 (minus solar panels) and V shaped bosses 520. FIG. 45 shows the male side wall 1900 (minus solar panels) oriented to show the V shaped grooves 530.

Figure 46:
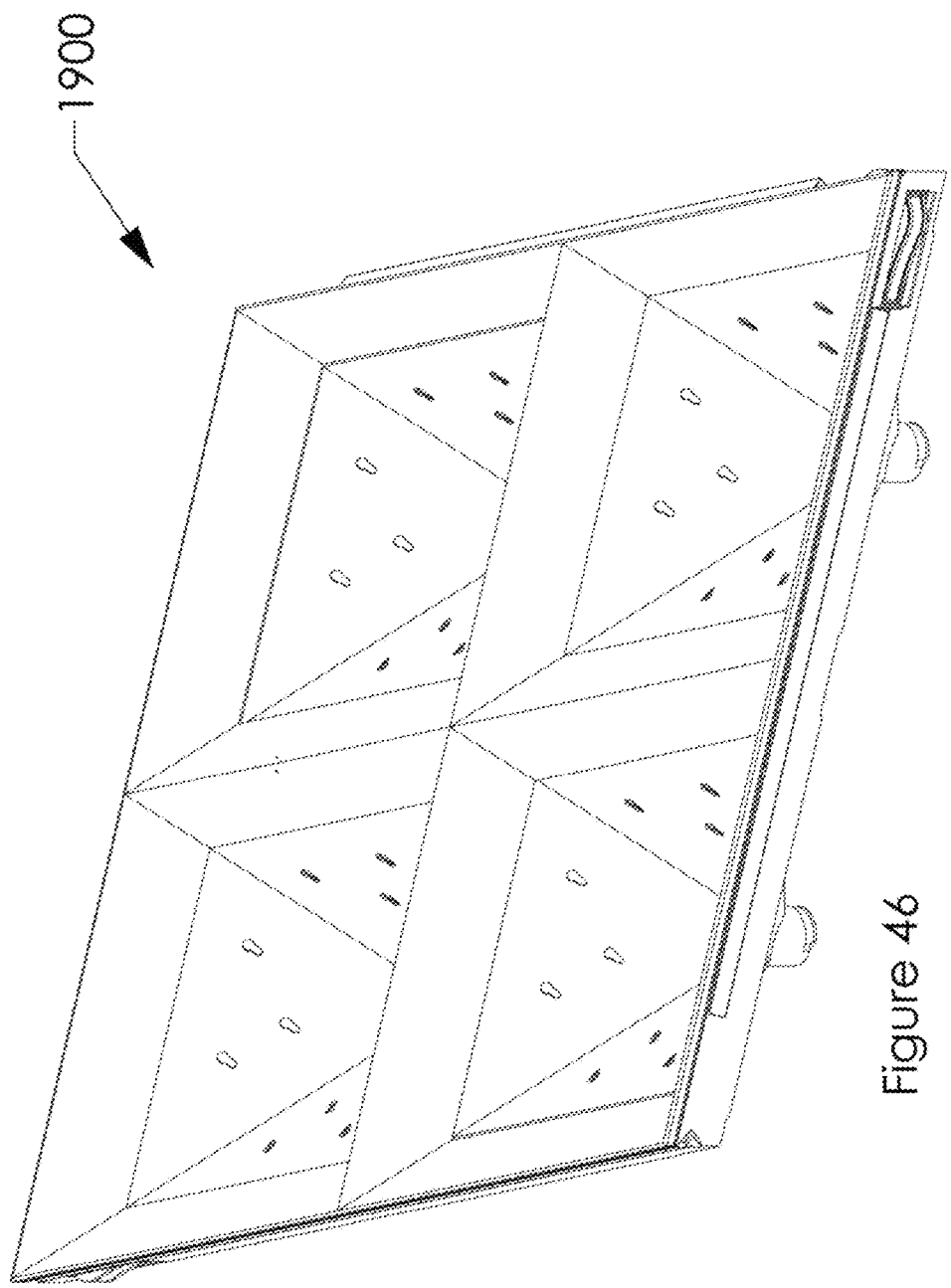
FIG. 46 shows the reverse (top) side of a male side wall.

FIG. 46 shows the top side (inside) of a male side wall 1900 (minus solar panels) before the insertion of solar panels 1800.

Figure 47:
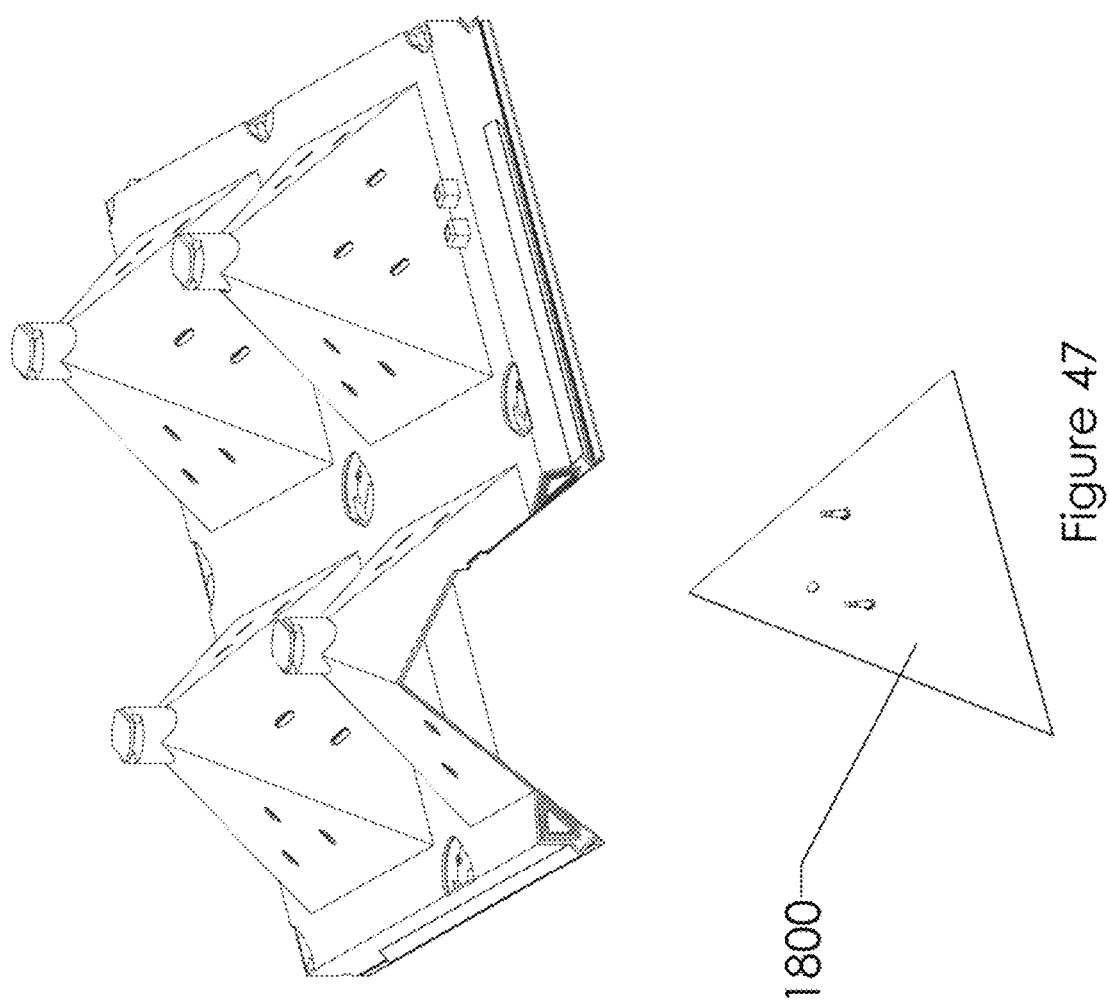
FIG. 47 shows a cutaway view of a solar panel prepared to be inserted into a male side wall.
Figure 48:
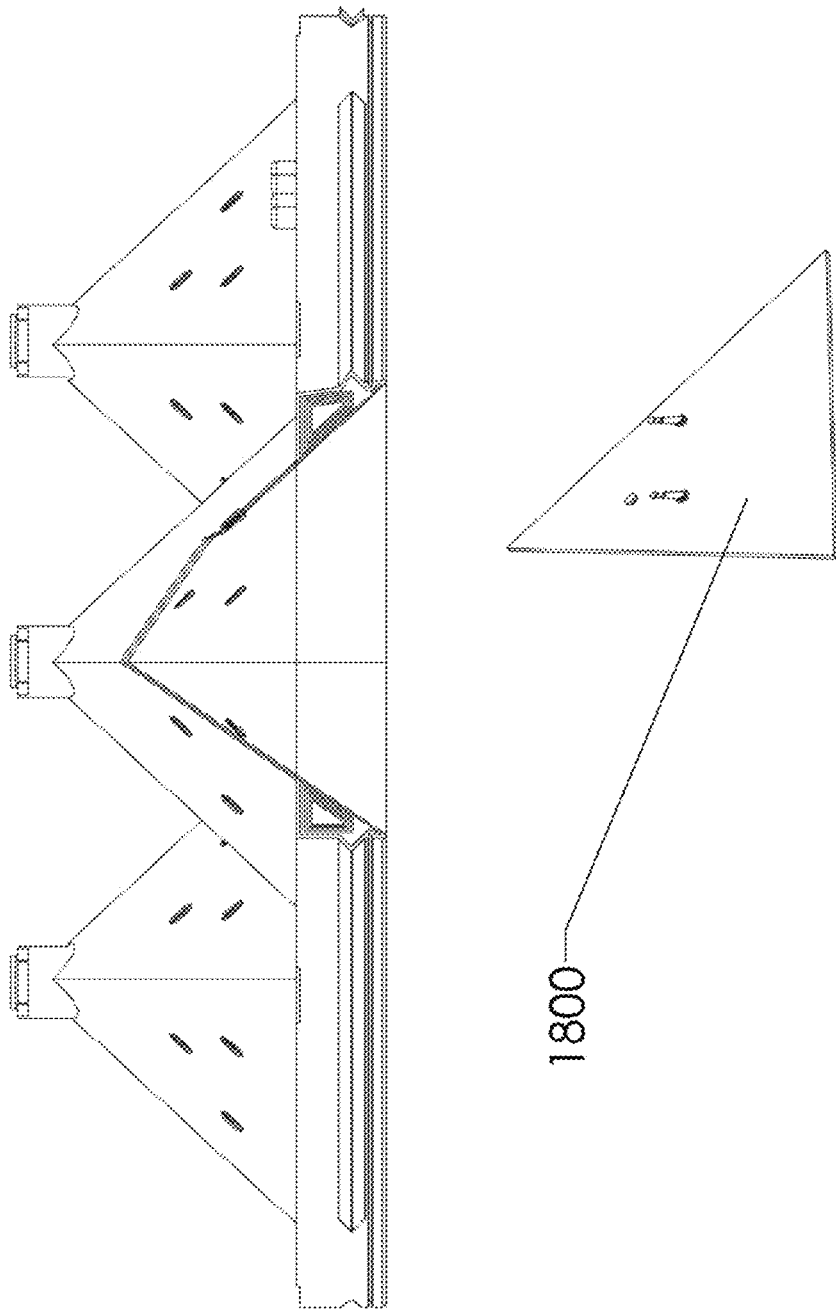
FIG. 48 shows the cutaway view along the long, diagonal edge.
Figure 49:
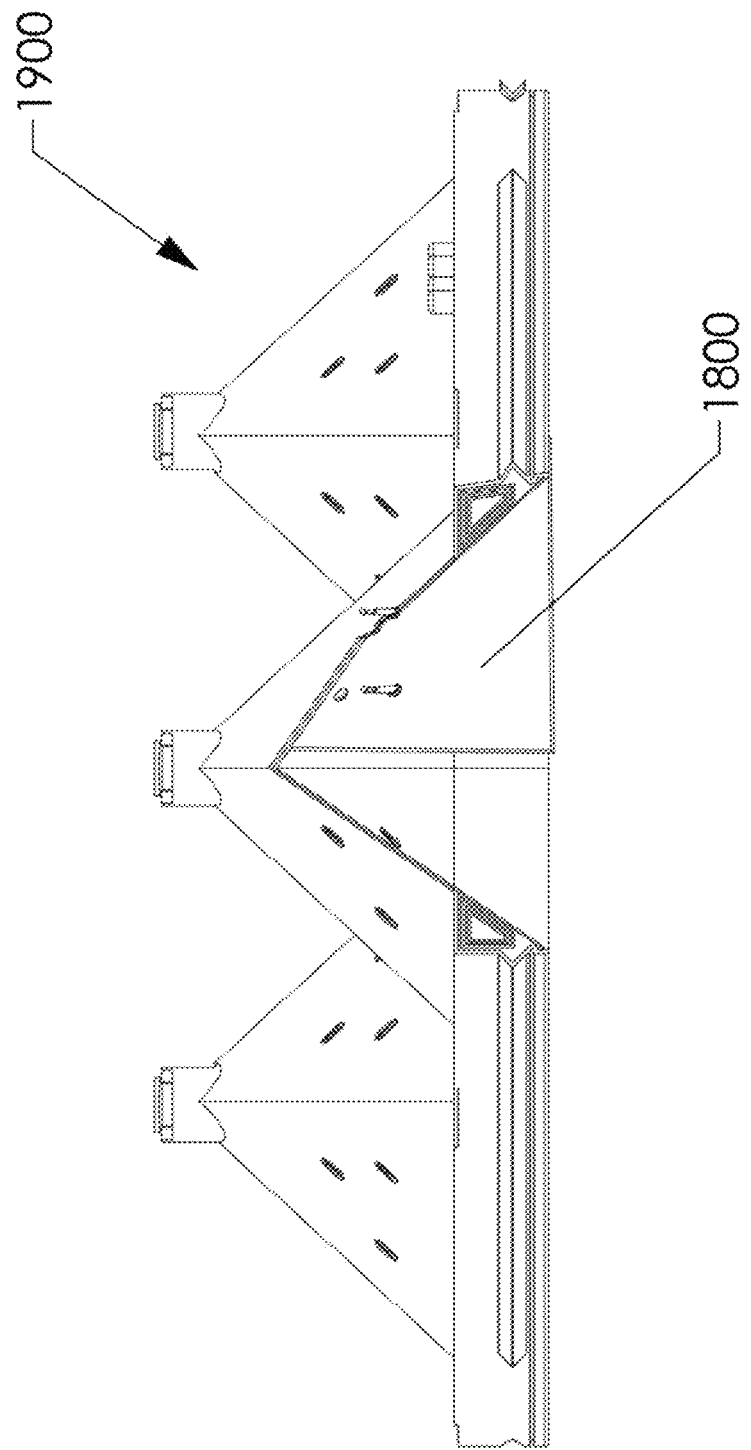
FIG. 49 shows the solar panel in place in the male side wall.

FIG. 47 shows a single solar panel 1800 prepared to be inserted into a male side wall 1900 with a cutaway of the face it is sliding into and an adjacent face. FIG. 48 shows the cutaway view in FIG. 47 but along the long, diagonal edge (normal to a plane that bisects the short diagonal edges). FIG. 49 shows the single solar panel 1800 in place into a male side wall 1900 with the same cutaway view as in FIG. 48.

Figure 50:
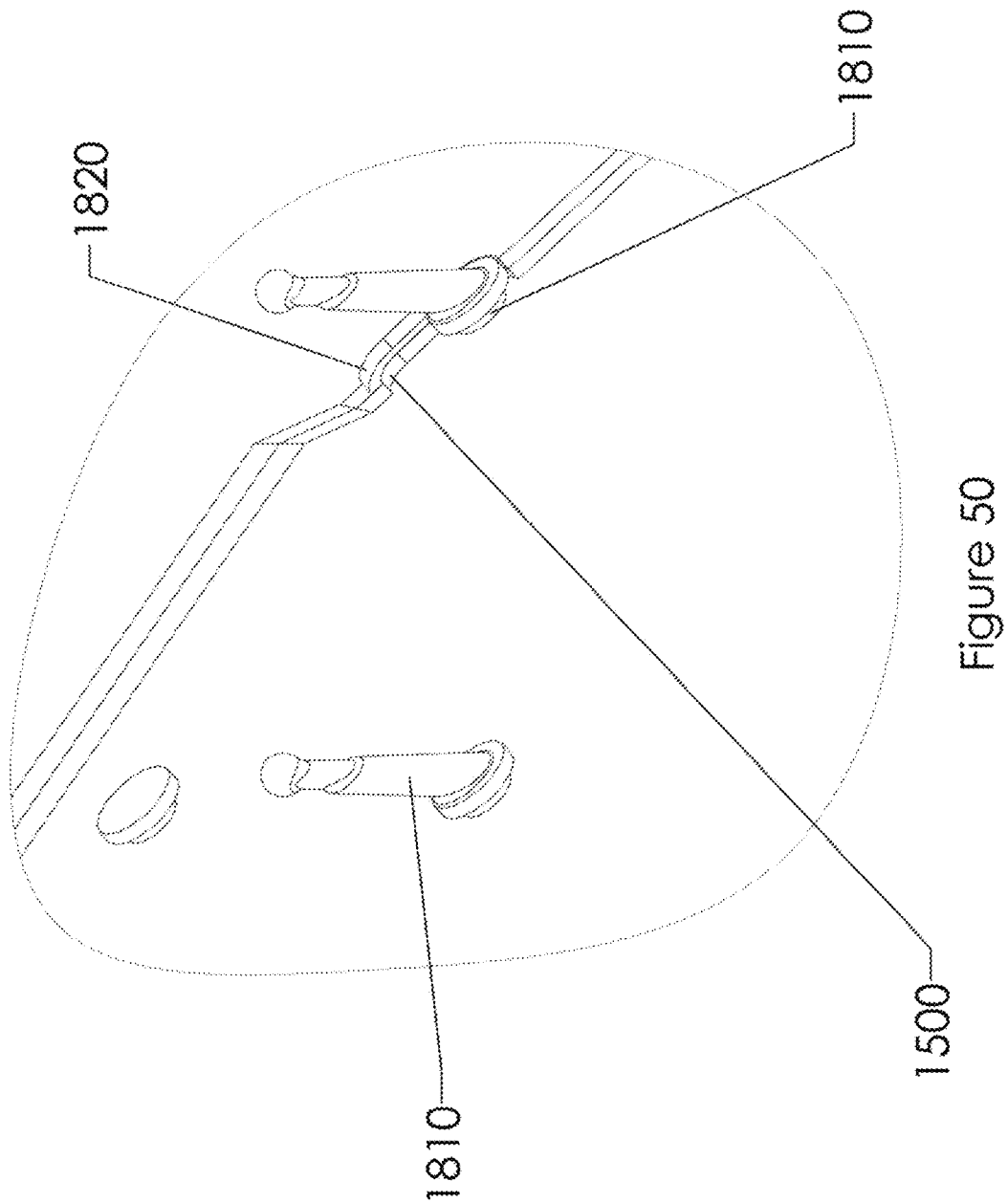
FIG. 50 shows a cropped detail of two solar panel posts in the male side wall.
Figure 51:
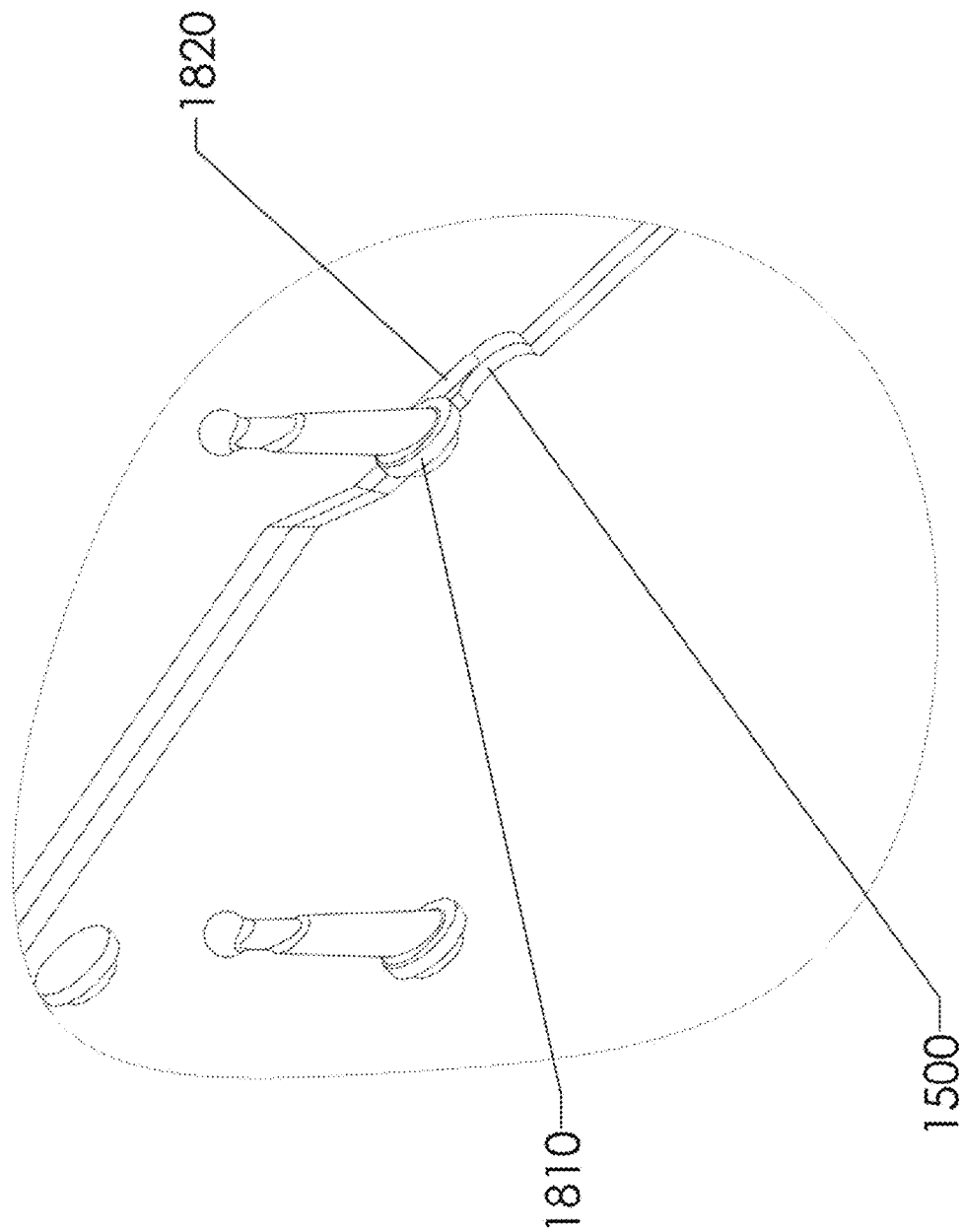
FIG. 51 shows a solar panel post locked in position in a "keyway" slot.
Figure 52:
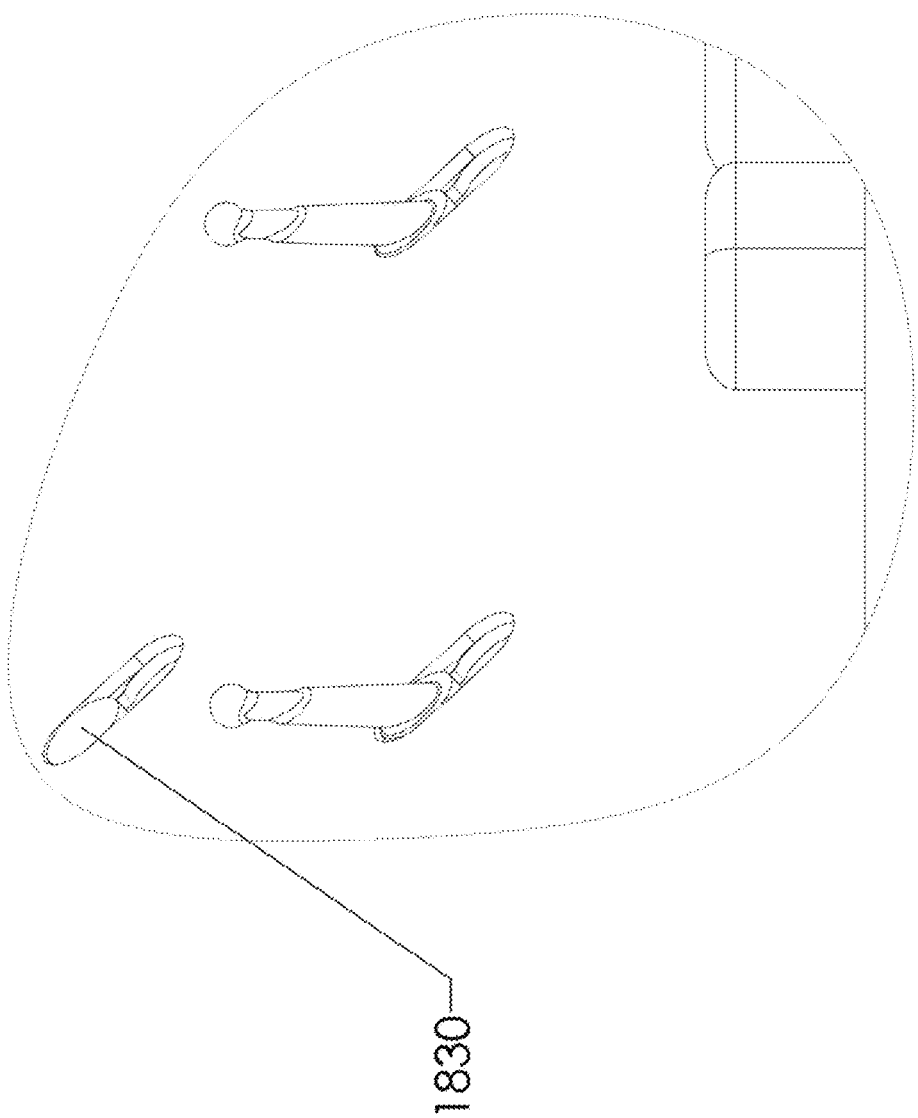
FIG. 52 shows a detail of the solar panel locked in position.

FIG. 50 shows a cropped detail of a cutaway of two solar panel posts 1810 with one post 1810 inserted at the wide section of a "keyway" slot 1500 and its shoulder resting at one end of an oval slot 1820. FIG. 51 shows a solar panel post 1810 locked in position with its shoulder on top of the narrow section of a "keyway" slot 1500 and pushed against the opposite end of an oval slot 1820. FIG. 52 shows a detail of both posts 1810, as well as a reinforcement tab 1830 on the back of a solar panel 1800 locked in position.

Figure 53:
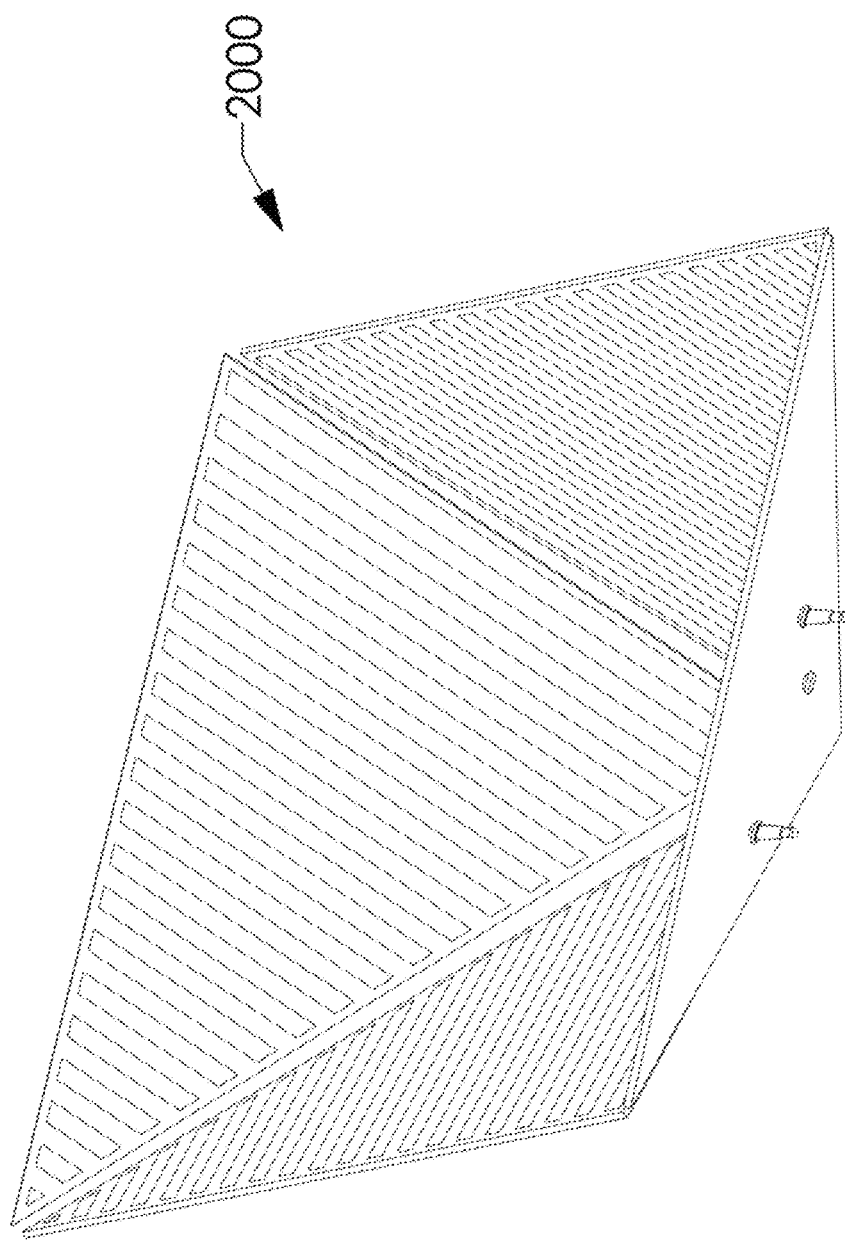
FIG. 53 shows a module of four solar panels in relative position.
Figure 54:
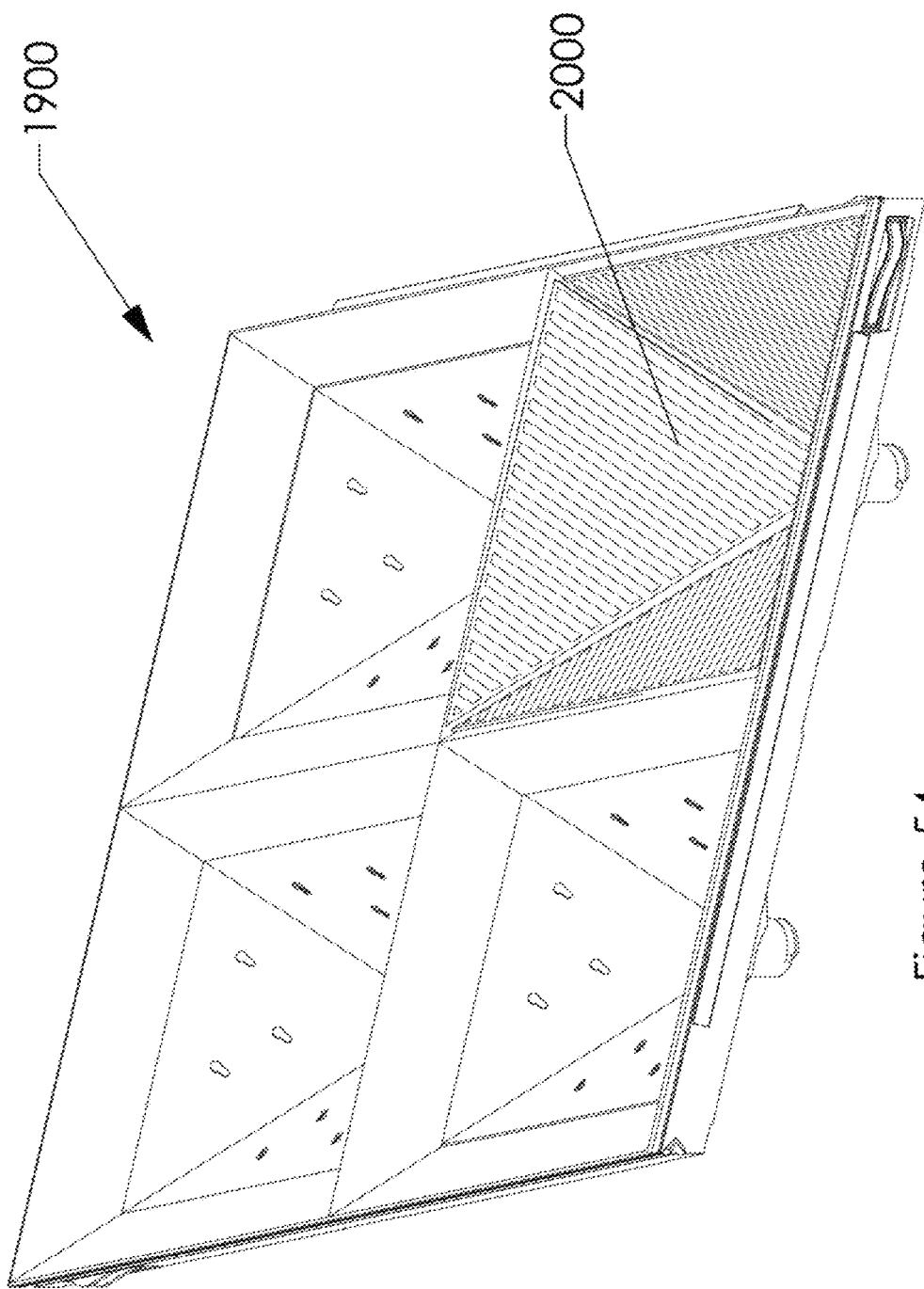
FIG. 54 shows a solar panel module locked in place in a male side wall.

FIG. 53 shows a module 2000 of four (4) solar panels 1800 in relative position and FIG. 54 shows a solar panel module 2000 locked in place in a male side wall 1900.

Figure 55:
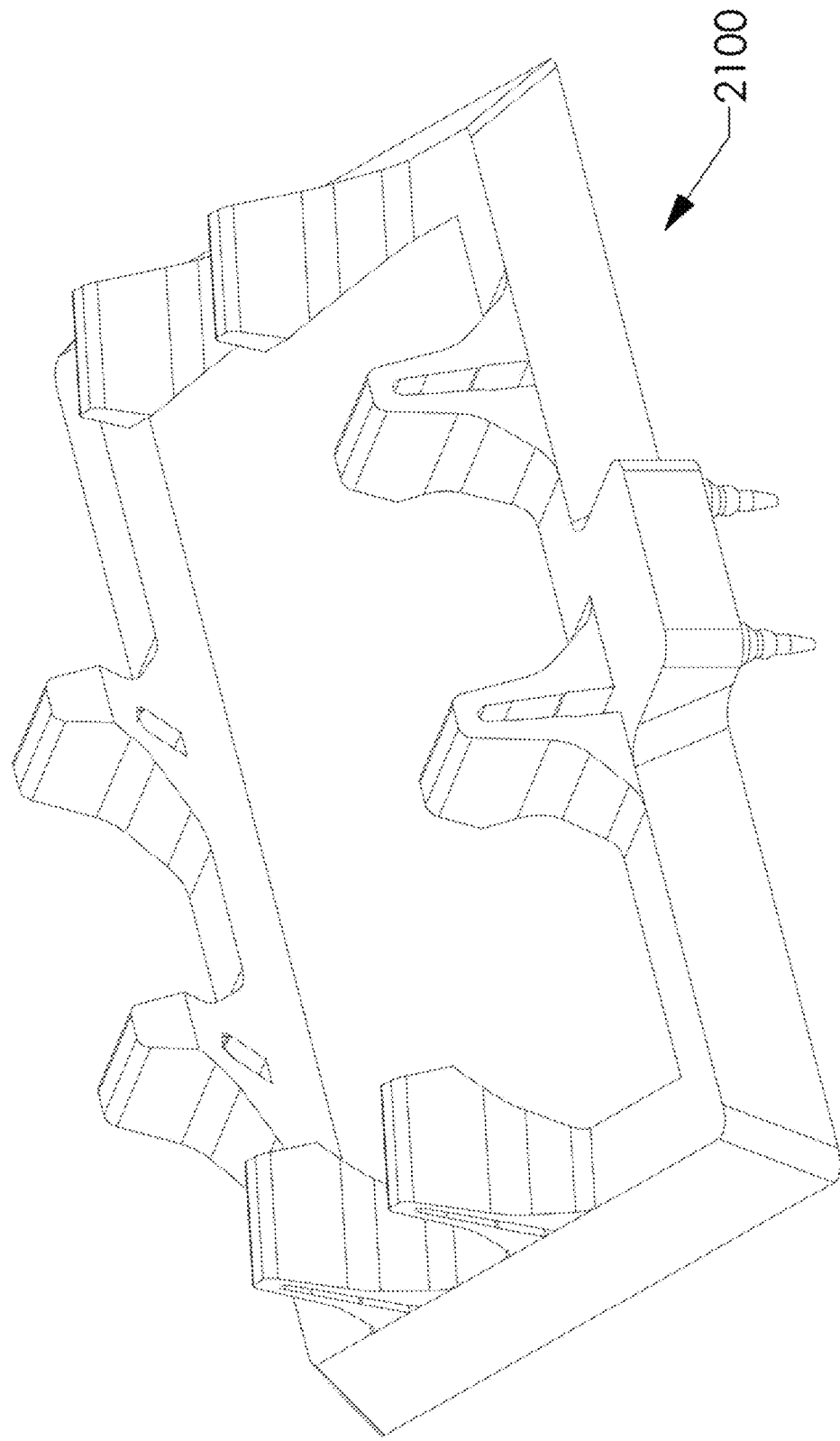
FIG. 55 shows a connection rack.

FIG. 55 shows a connection rack 2100 used to join a solar panel module 2000 and connect it to the first conductive layer 900 and the second conductive layer 1200. These racks 2100 are beneficial because they eliminate exposed wires and, if damaged, can be easily replaced. Because they are arranged in parallel, individual racks 2100 can be replaced without interrupting current flow.

FIG. 56A shows a cutaway view of a connection rack 2100. It shows its connection rack body 2110, solar rack positive circuit 2120, solar rack negative circuit 2130, positive lead 2160 and negative lead 2170. FIG. 56B shows two views of the extracted circuits for clarity. They are solar rack positive circuit 2120 and positive lead 2160, in the left view, and, in the right view, solar rack negative circuit 2130 and negative lead 2170.

In one non-limiting example, the connection rack 2100 will consist of metal conductive circuits 2120, 2130 overmolded with a thermoplastic body. In another non-limiting example, the components may be 3D printed with dual extruder heads. In this process, the body 2110 is printed using an insulative thermoplastic, while a second material will make the conductive circuits 2120, 2130, possibly using a graphene infused thermoplastic similar to the male conductive frame 400. In a further, non-limiting example, the body 2110 is 3D printed or molded in sections and locks in conductive wire.

Figure 57:
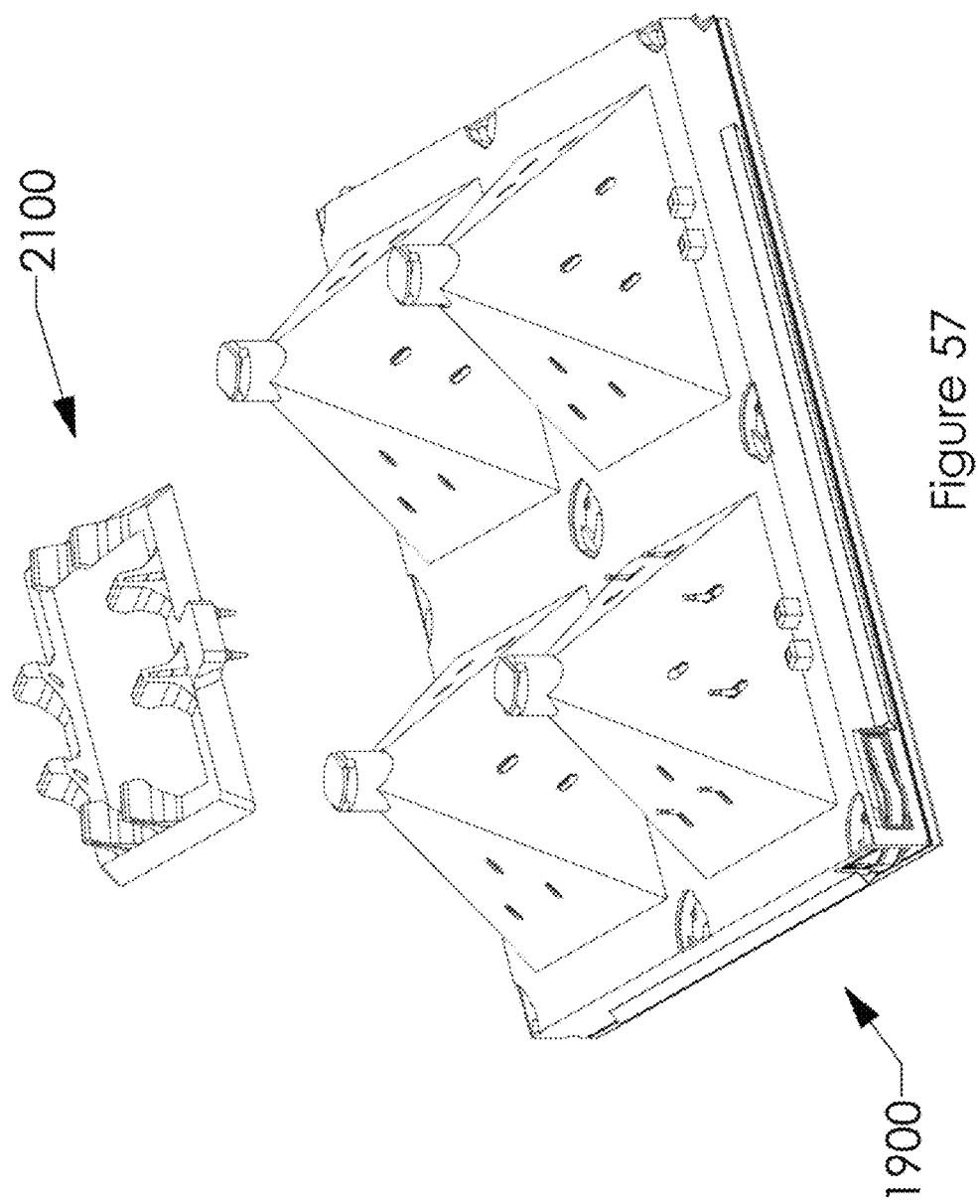
FIG. 57 shows a connection rack oriented to join a male side wall.
Figure 58:
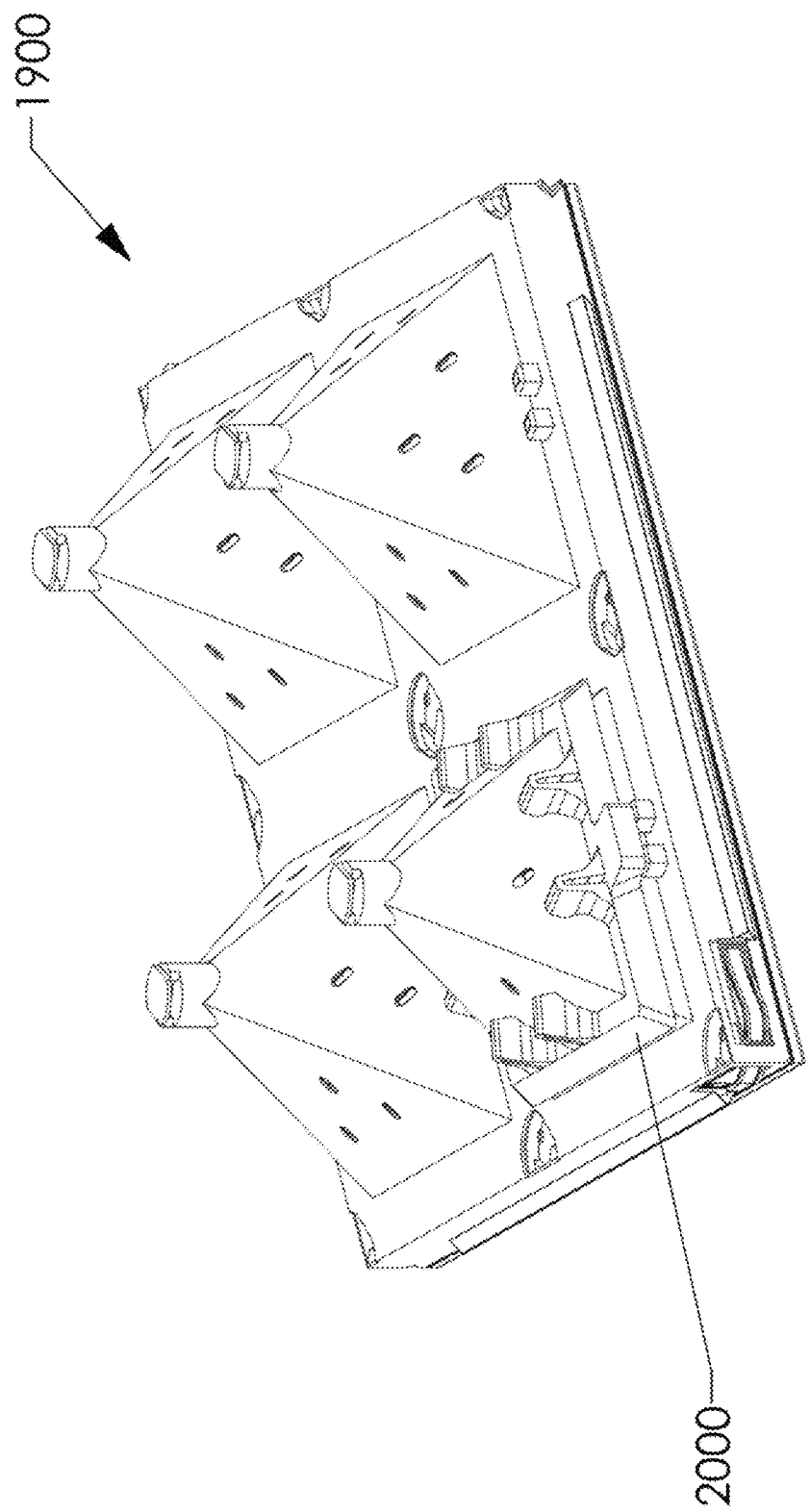
FIG. 58 shows a connection rack locked in place with a male side wall.
Figure 59:
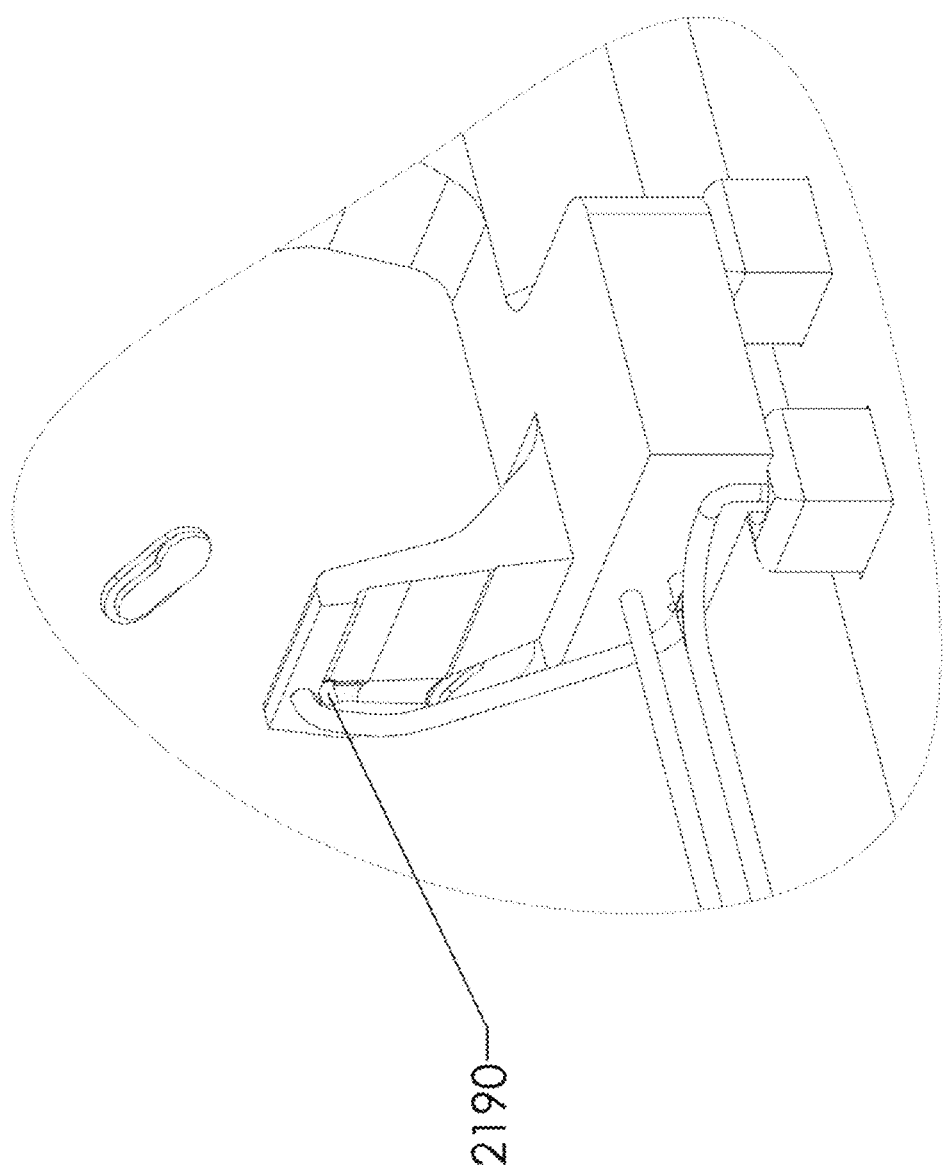
FIG. 59 shows a cutaway detail of a detent socket on a connection rack.

FIG. 57 shows a connection rack 2100 oriented to join a male side wall 1900. FIG. 58 shows the connection rack 2100 locked in place with the male side wall 1900. FIG. 59 shows a cutaway detail of one of the eight (8) detent sockets 2190 on a connection rack 2100. The detent sockets 2190 are used to retain the bulbous tip of the conductive lead on the solar panel post 1810. In this image, the solar panel 1800 and its post 1810 are hidden to reveal the cavity of the detent socket 2190.

Figure 60:
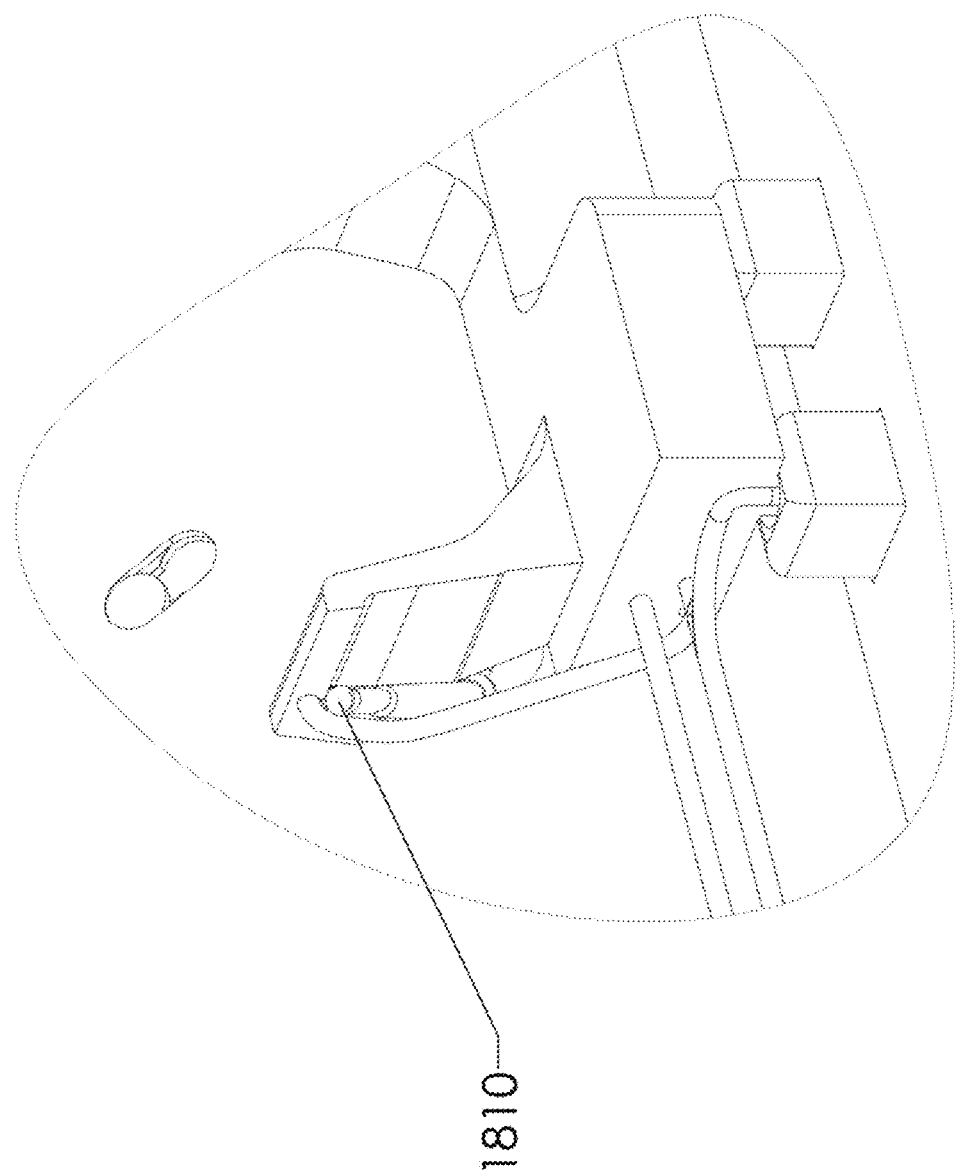
FIG. 60 shows a cutaway detail of a conductive lead on the solar panel post locked into a detent socket.

FIG. 60 shows a cutaway detail (similar to FIG. 59), where the bulbous tip of a conductive lead on the solar panel post 1810 is exposed as it is locked into a detent socket 2130.

FIG. 61 shows a cutaway of a connection rack 2100. At the bottom is a detail of the ball joints 2150 that go into the ball socket snap fits 700 (see FIG. 7). These snap fits 700 house the exposed positive lead 2160 of the solar rack positive circuit 2120 as well as the exposed negative lead 2170 of the solar rack negative circuit 2130.

Figure 62:
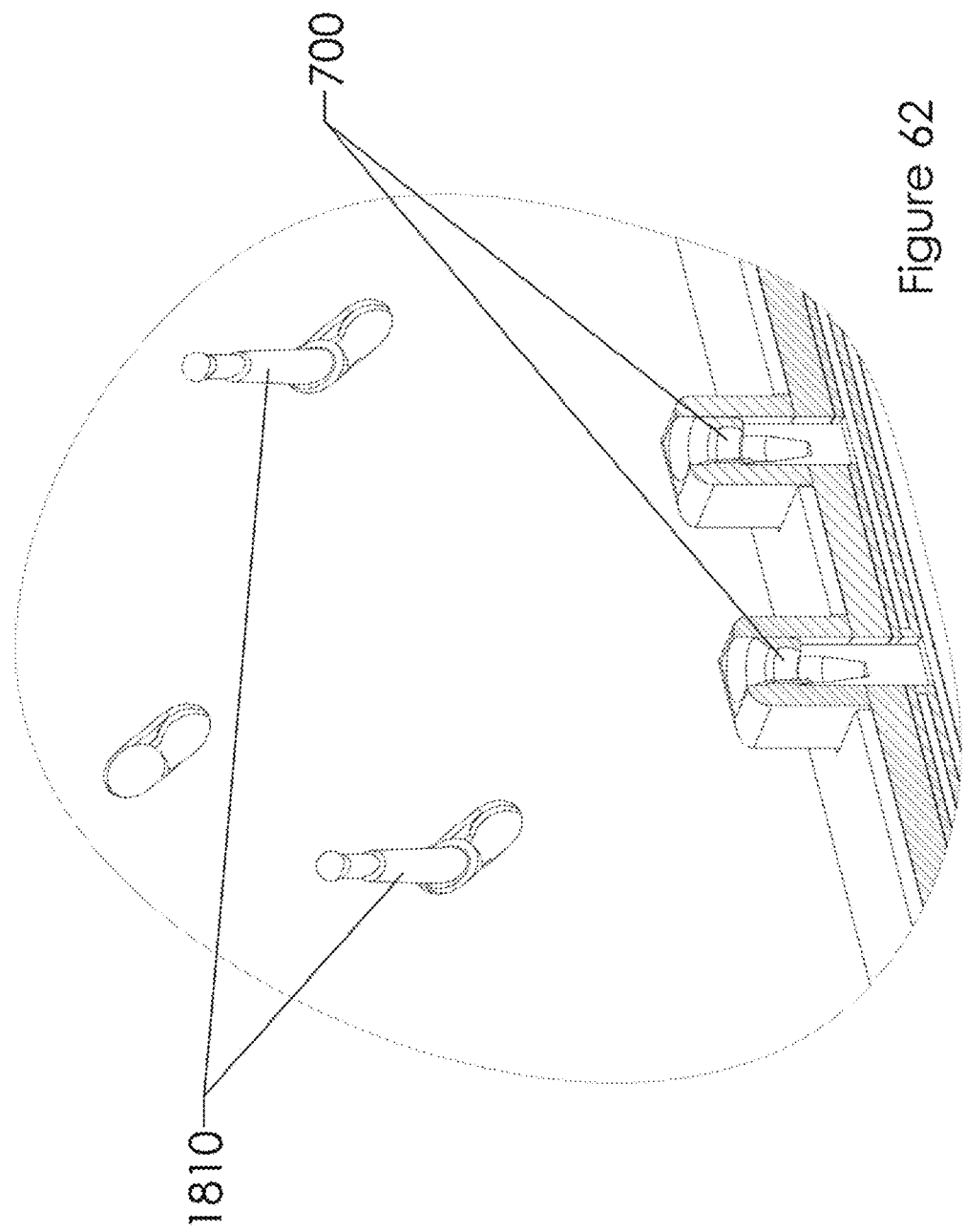
FIG. 62 shows a detail of a cross section of the ball socket snap fits.

FIG. 62 shows a detail of the cross section of the ball socket snap fits 700 (with the connection rack 2100 hidden) and the solar panel posts 1810 exposed.

Figure 63:
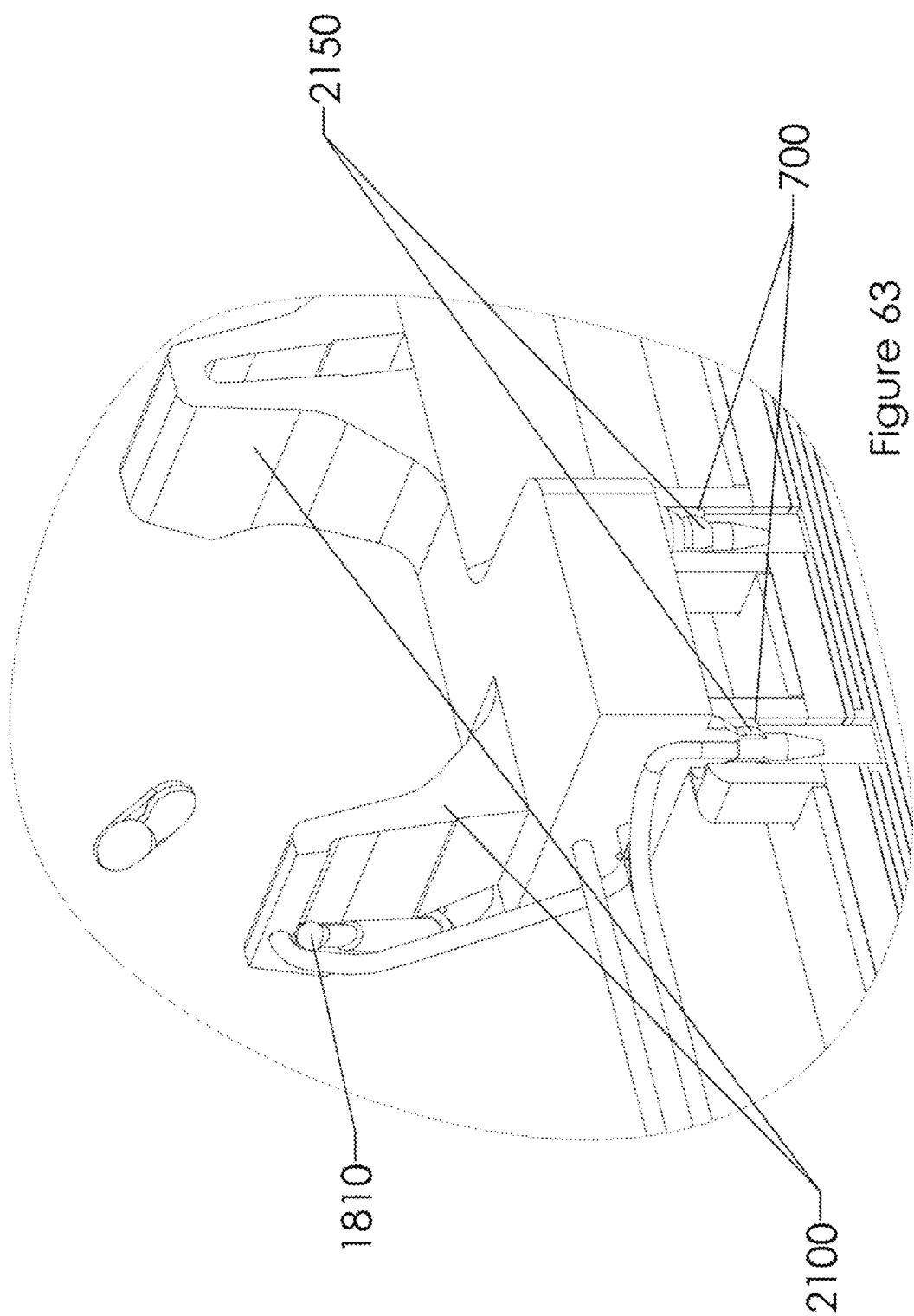
FIG. 63 shows a view of the ball joints locked into the ball snap fits.

FIG. 63 shows a view (similar to FIG. 60), but reveals the ball joints 2150 locked into the ball snap fits 700 and a cutaway of the connection rack 2100 exposing a solar panel post 1810 in place.

Figure 64:
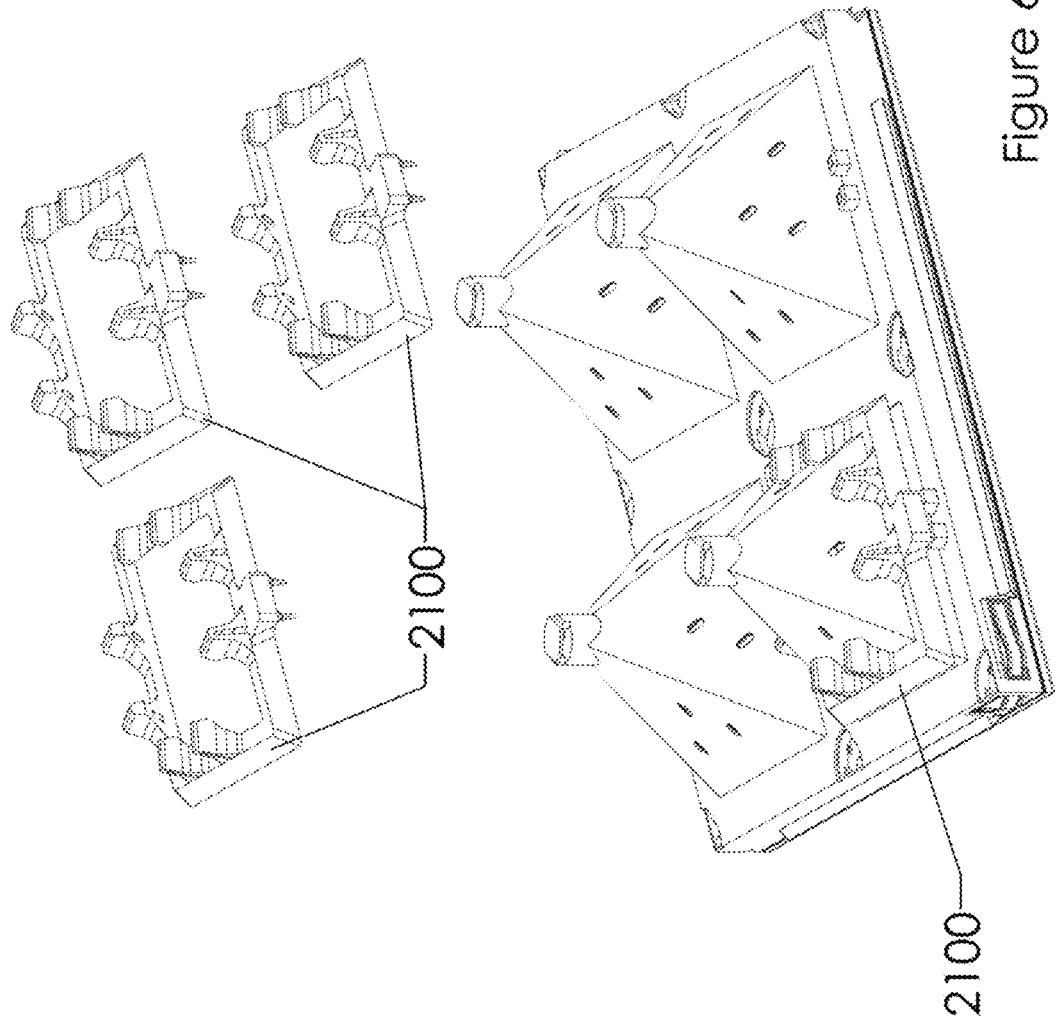
FIG. 64 introduces the remaining connection racks.
Figure 65:
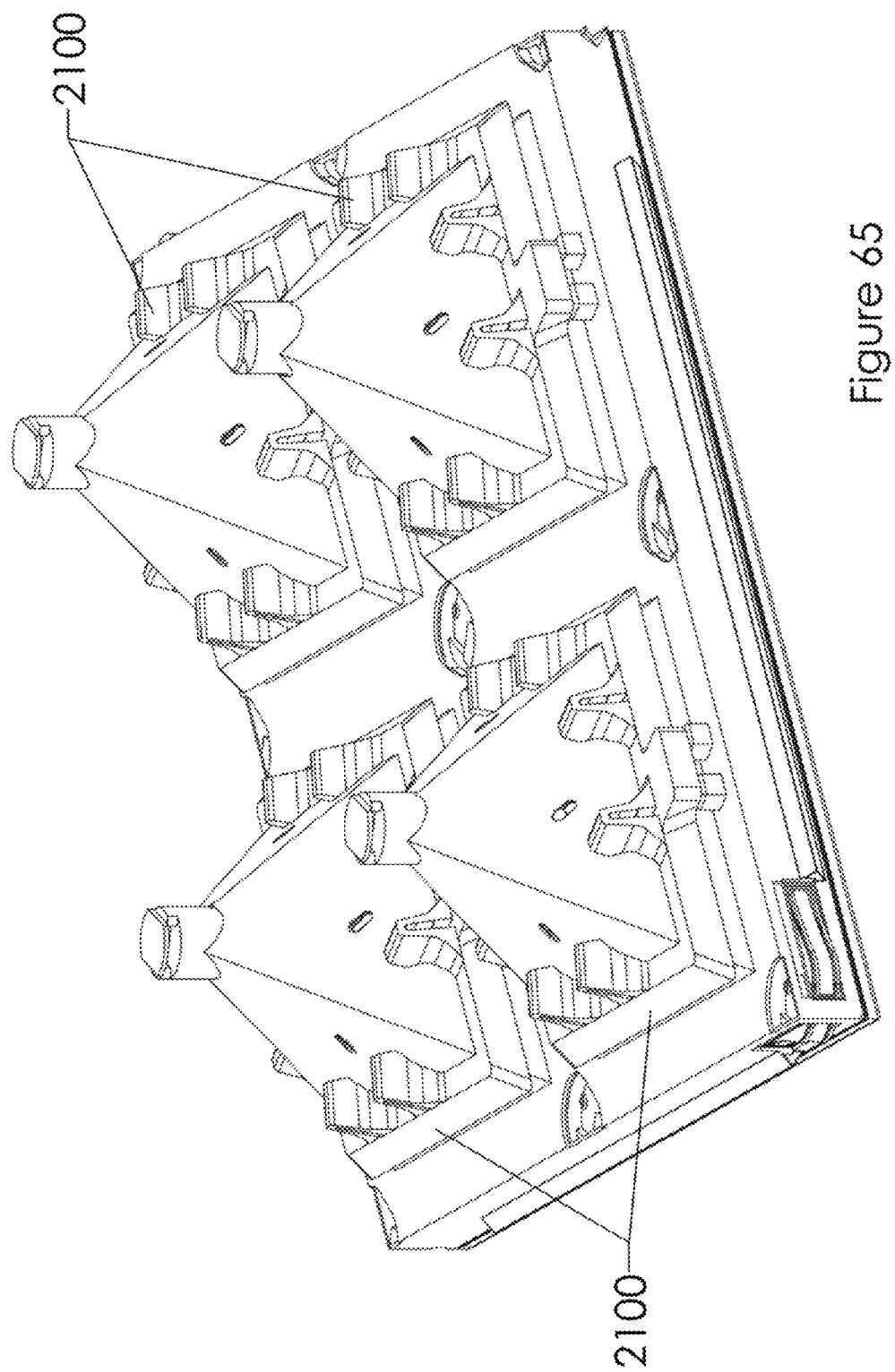
FIG. 65 shows all connection racks locked into place.

FIG. 64 introduces the three (3) remaining connection racks 2100 to complete the backside of a solar panel section. FIG. 65 shows all four (4) connection racks 2100 locked into place.

Figure 66:
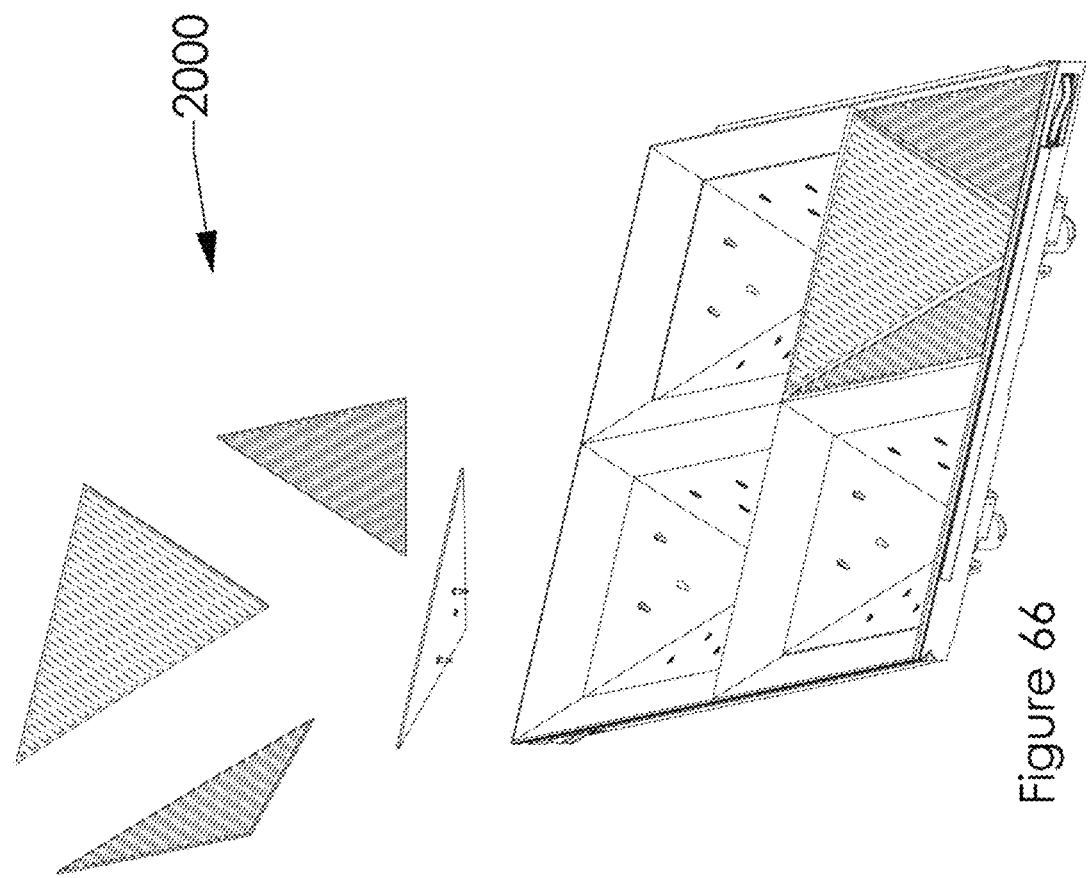
FIG. 66 shows a second module of solar panels separated and ready to be locked into place.
Figure 67:
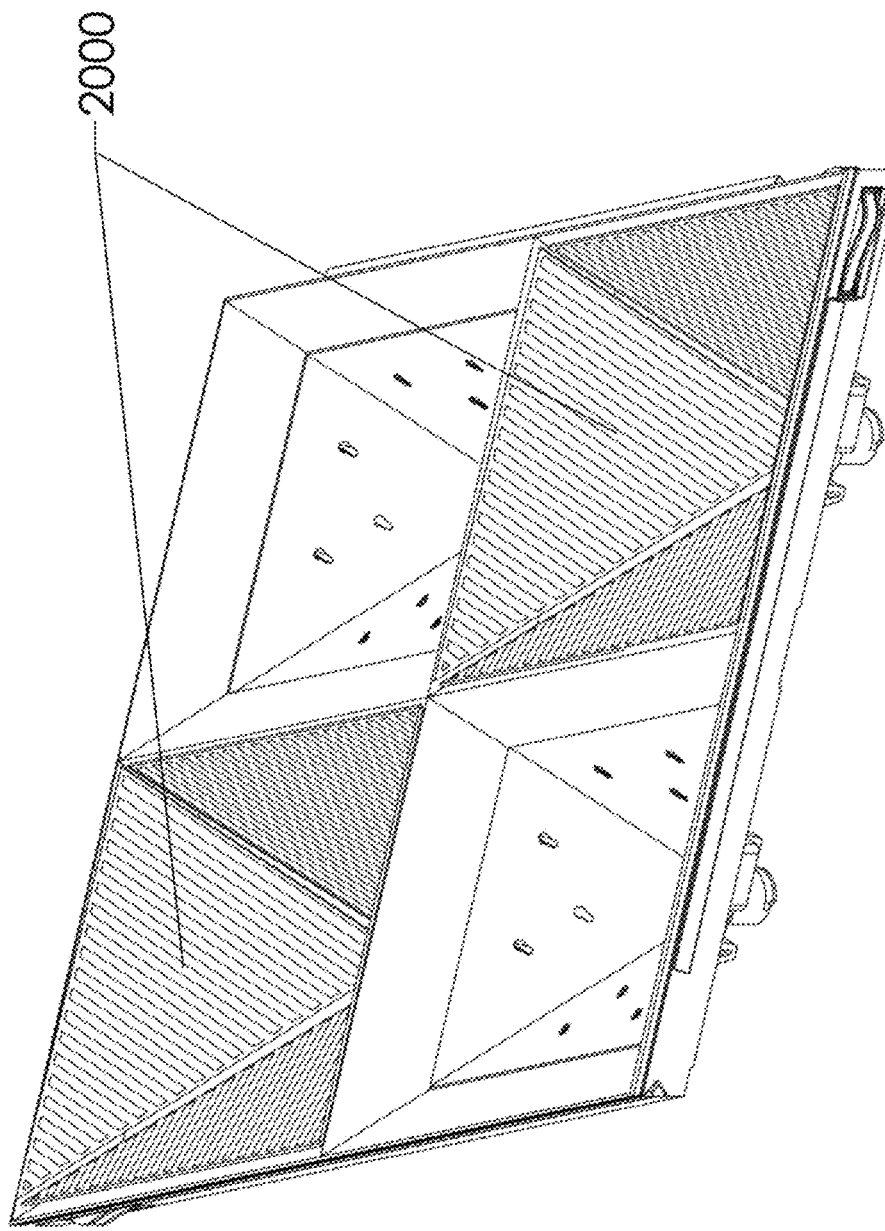
FIG. 67 shows the second module of solar panels locked into place.
Figure 68:
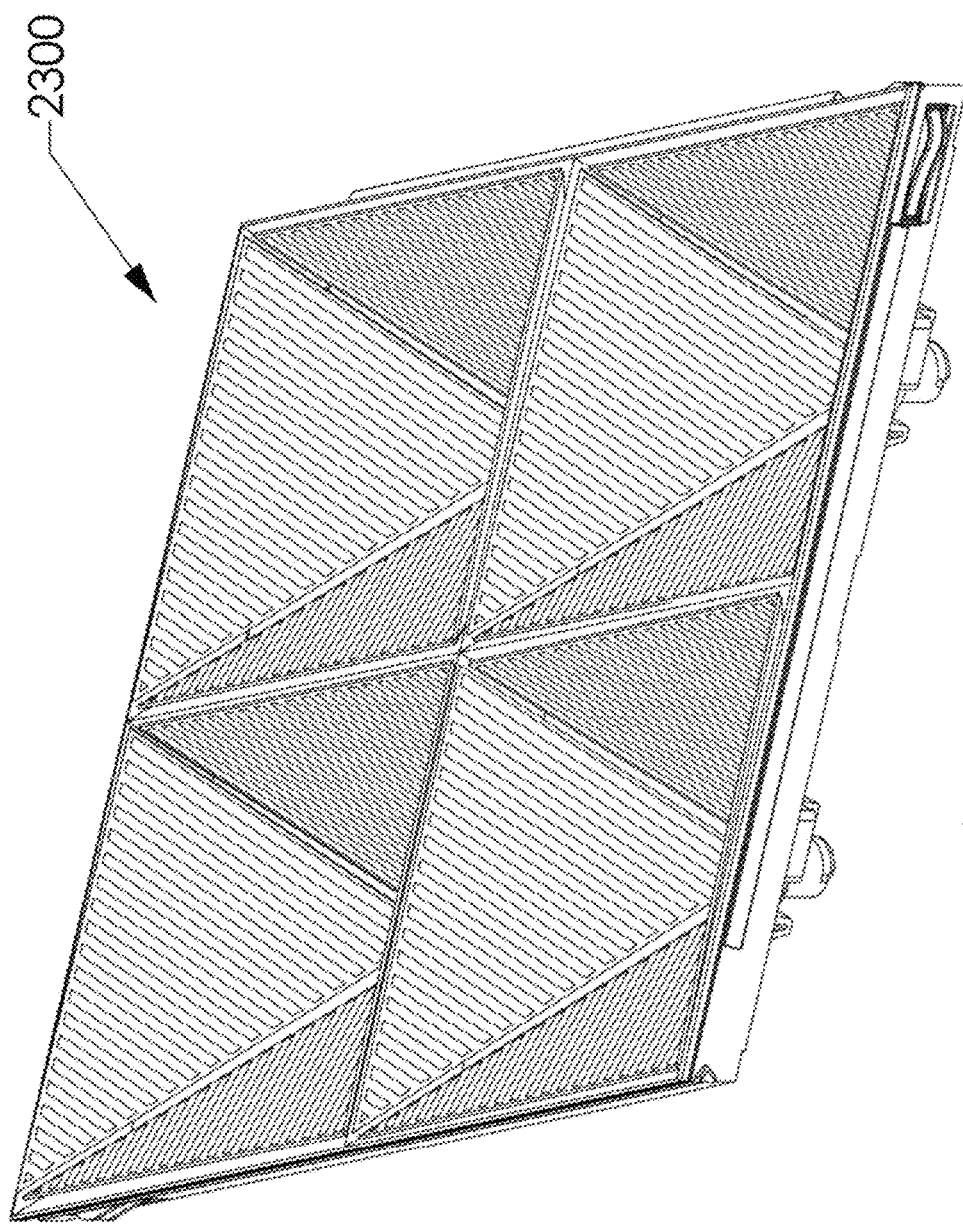
FIG. 68 shows a completed assembly of a male solar panel section from the solar panels side.

FIG. 66 shows a second module of four (4) solar panels 2000 separated and ready to be locked into place. FIG. 67 shows the second module of four (4) solar panels 2000 locked into place. FIG. 68 shows a completed assembly of a male solar panel section 2300 from the exposed solar panels side.

Figure 69:
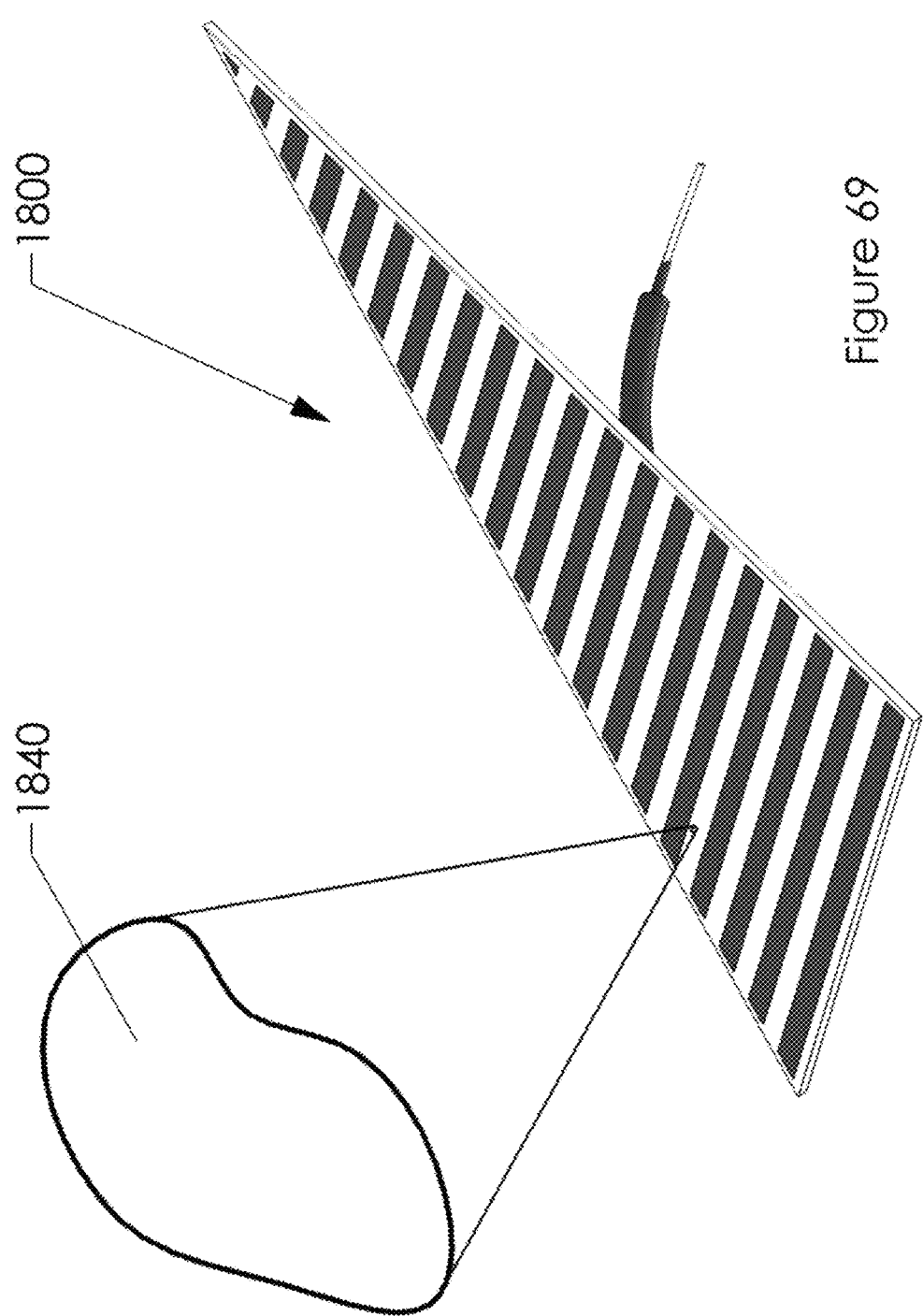
FIG. 69 shows a close-up view of a solar panel.
Figure 70:
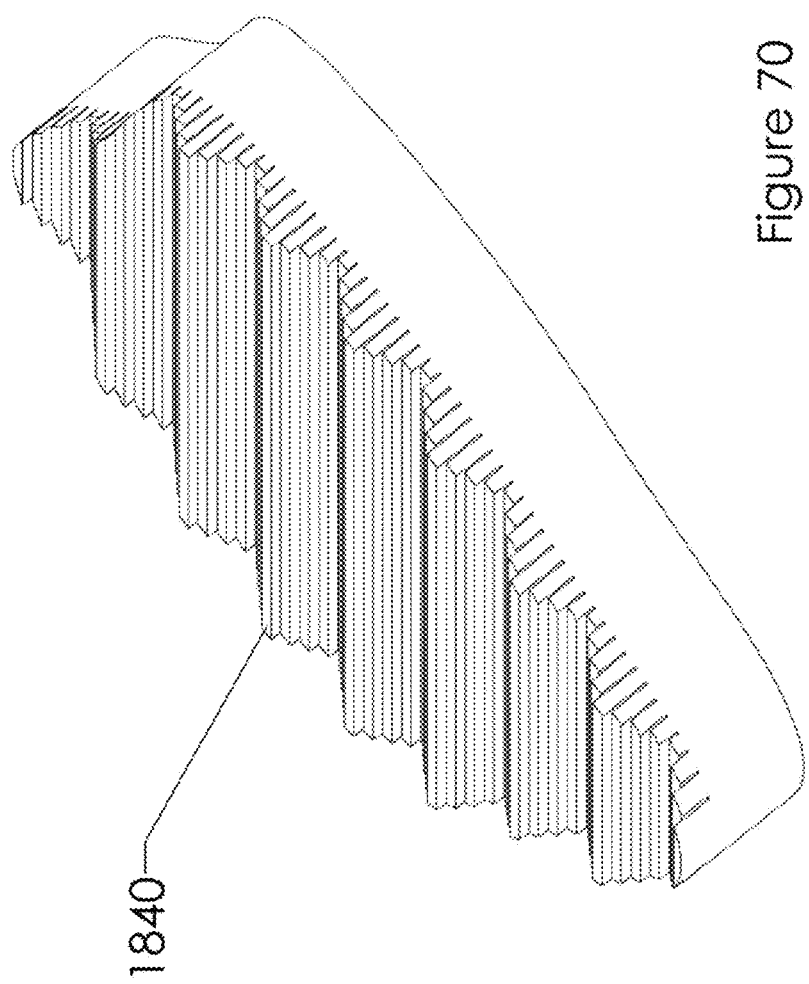
FIG. 70 shows exaggerated detail of the casing of the panel.

FIG. 69 shows a solar panel 1800 and the area to be detailed of a transparent casing 1840 (which is shown in FIG. 70). This casing consists of wave patterned, refraction steps on the outside surface of the panel 1800. In one non-limiting embodiment, the cells on the photovoltaic (PV) solar panel 1800 are 3D printed with multiple extruder heads, each assigned a different material. The first extruder prints an insulative backing. A second prints a conductive path for the bottom positive cell layer using conductive ink. A third prints a positively "doped" semi-conductive layer and a fourth prints a negatively doped semi-conductive layer. The second extruder can be reintroduced and prints a conductive path for the top negative layer.

At various levels of the build, in one non-limiting embodiment, the print is stopped to insert components, restarted and then encapsulate parts which are combined into an integrated circuit or IC. This IC may be a junction box consisting of bypass and blocking diodes in parallel to prevent a back flow of current and to allow continuous electricity in case an individual cell is damaged. In another non-limiting embodiment, the entire IC subassembly can be 3D printed at once using multiple extruder heads, each with a separate material in the same fashion that the cells are printed.

FIG. 70 shows exaggerated detail of wave patterned, transparent, refraction steps 1840 on the casing of the panel, as referenced in FIG. 69. These steps increase the surface area that is exposed to sunlight. In one non-limiting embodiment, this casing is produced as an injection molded component using an optical quality polymer and then polished. The edges are then bonded onto the top layer of the cell and complete the solar panel 1800. In another non-limiting embodiment, the casing is 3D printed using a different process, such as Stereolithograhy (SLA), and then polished to refine the refraction steps 1840.

Figure 71:
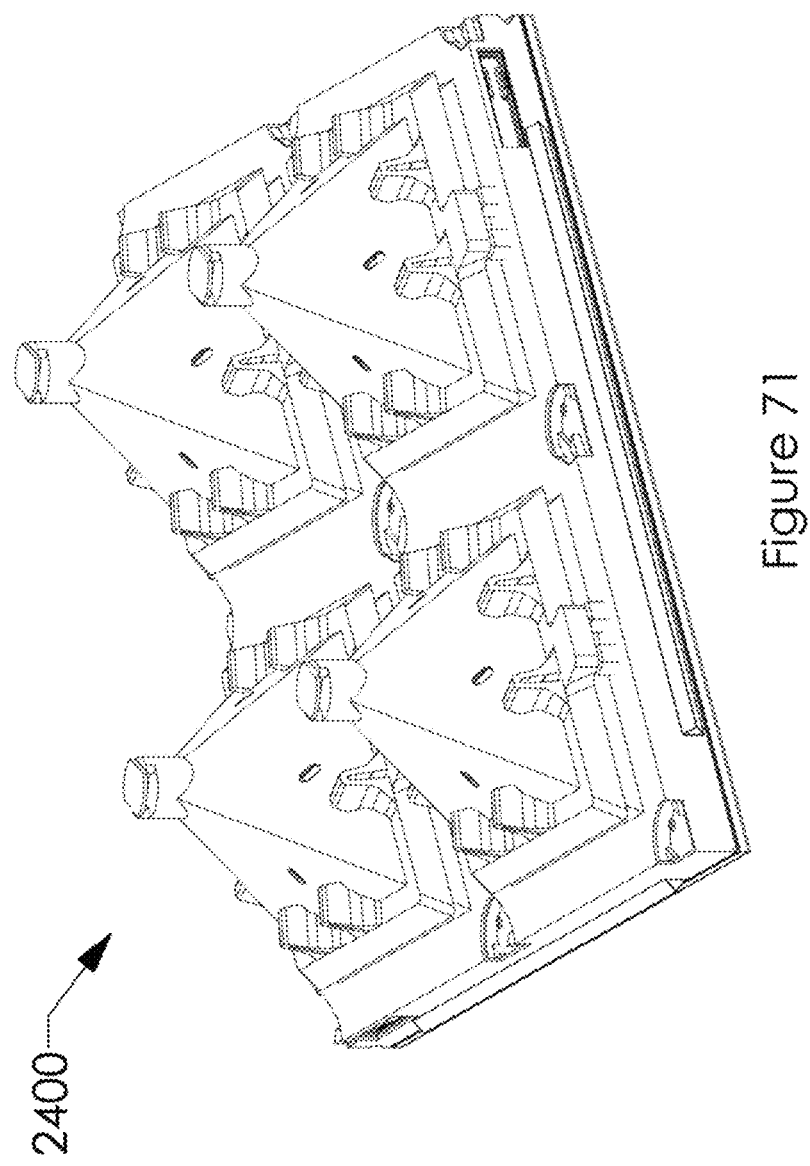
FIG. 71 shows a female -B- wall section from the connection rack side.
Figure 72:
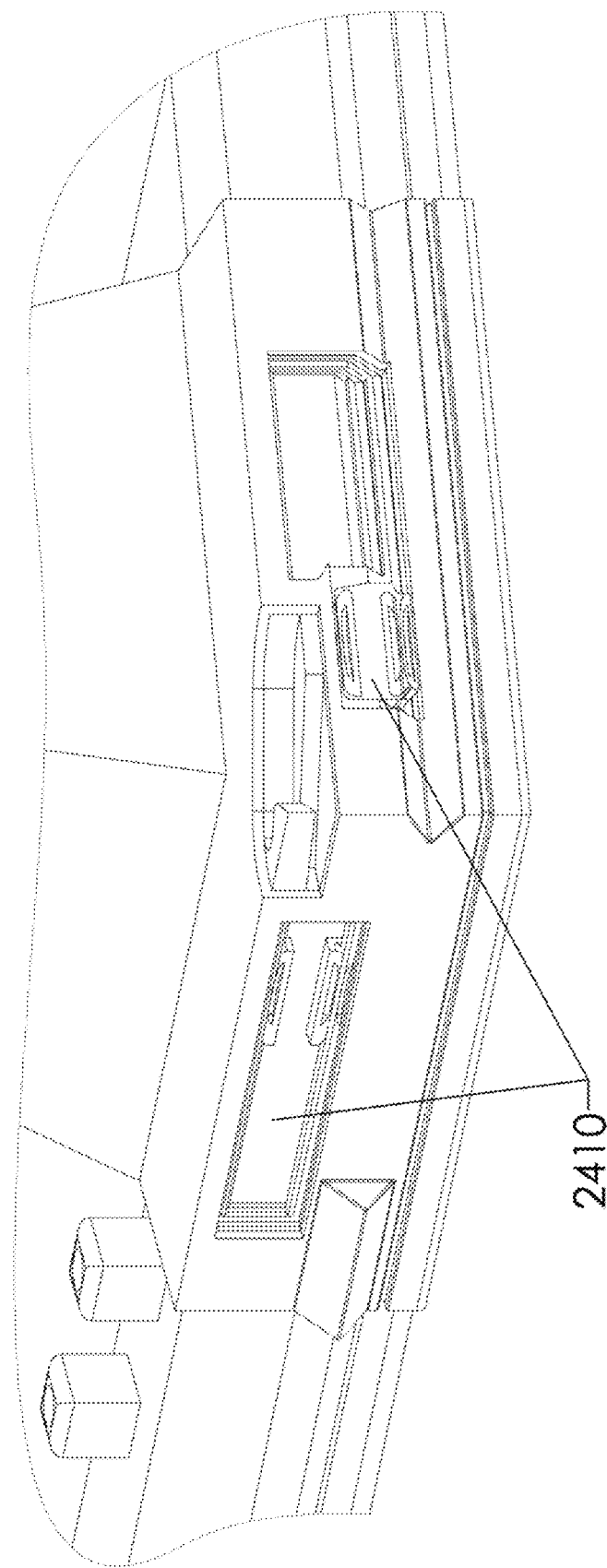
FIG. 72 shows a detail of the combined female connector ends.
Figure 73:
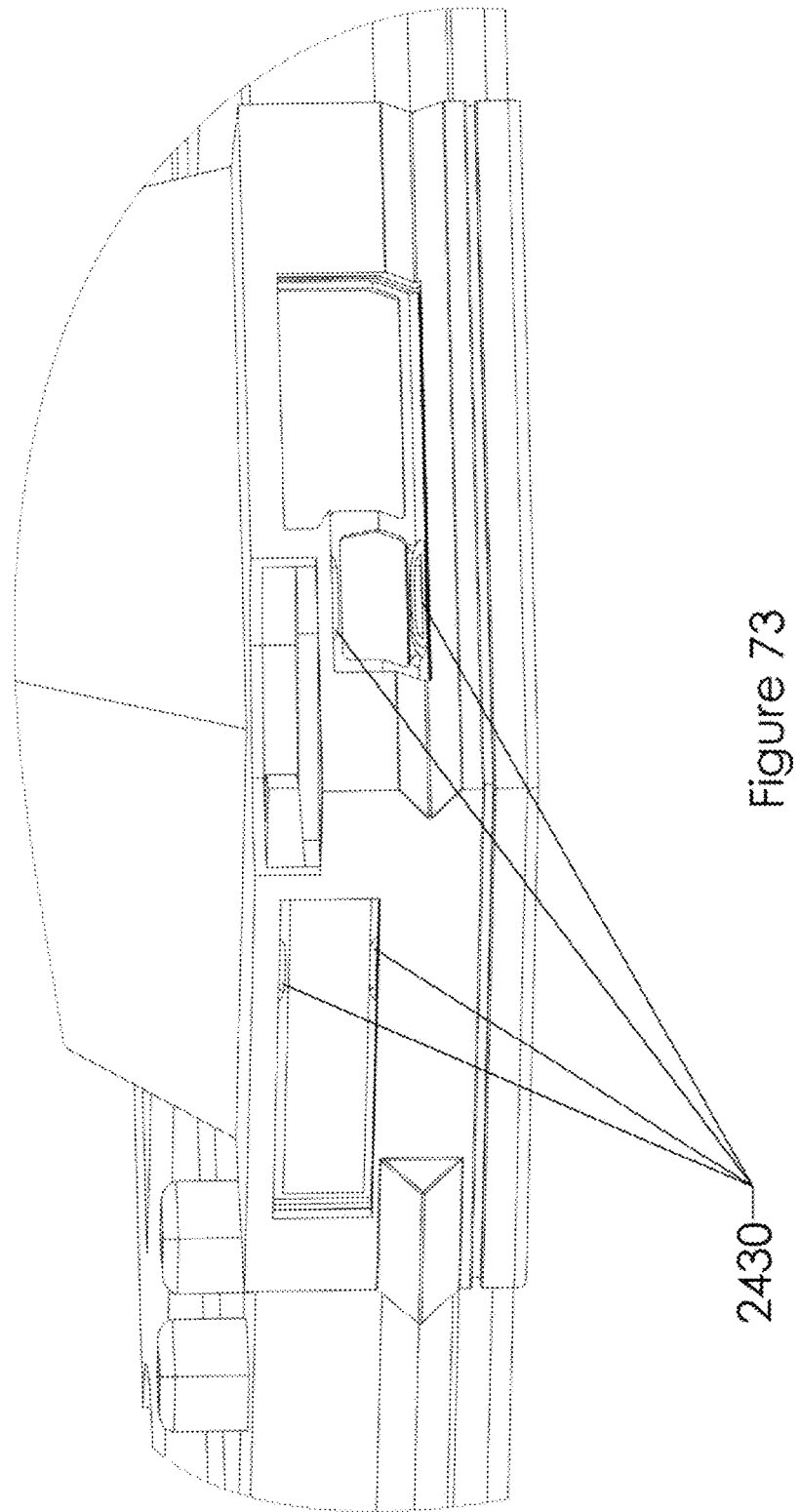
FIG. 73 shows a detail of the connector ends of the female first conductive layer.

FIG. 71 shows a female -B- wall section 2400 from the connection rack side. FIG. 72 shows a detail of the combined female connector ends 2410. FIG. 73 shows a detail of the connector ends of the female first conductive layer 2430. (A female first insulative layer is obscured).

Figure 74:
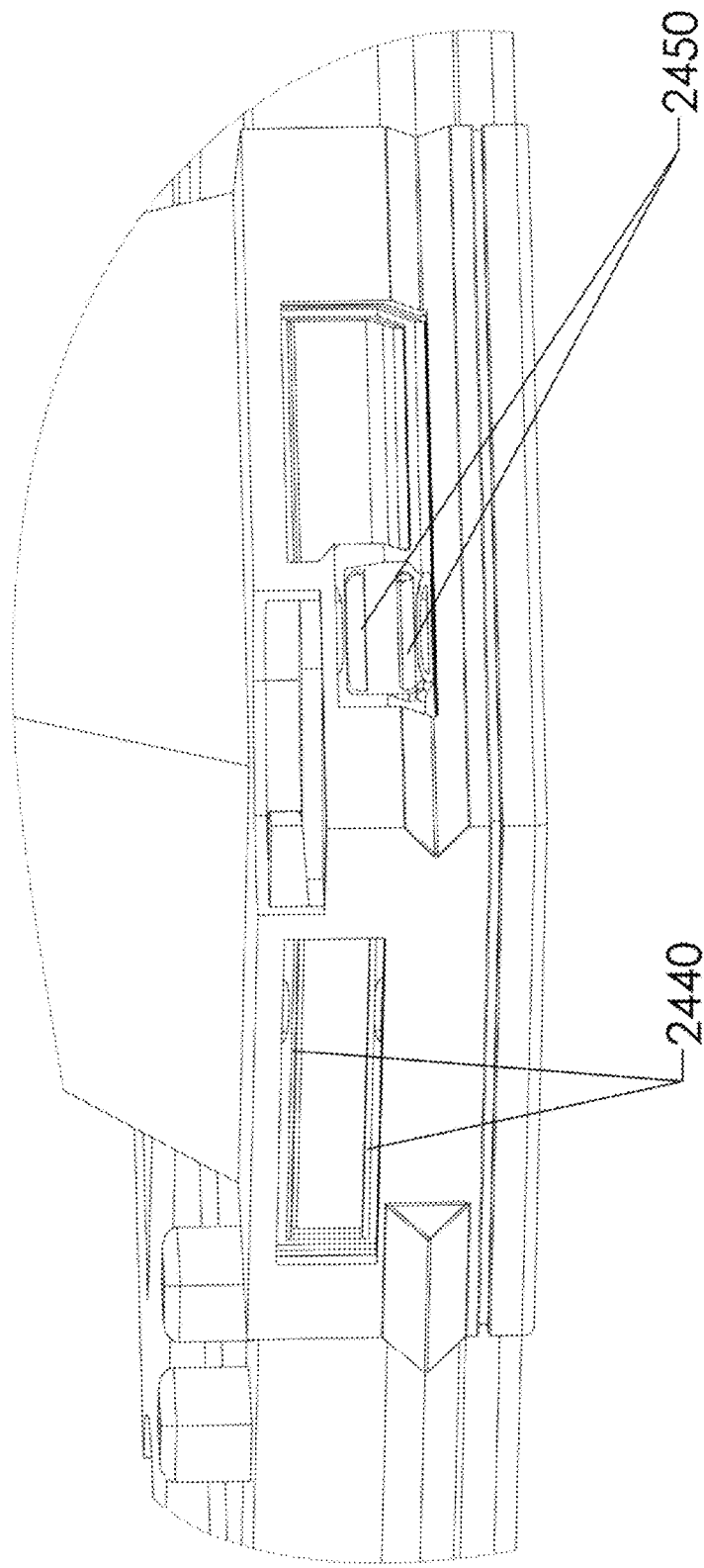
FIG. 74 shows a detail of the female second insulative layer.
Figure 75:
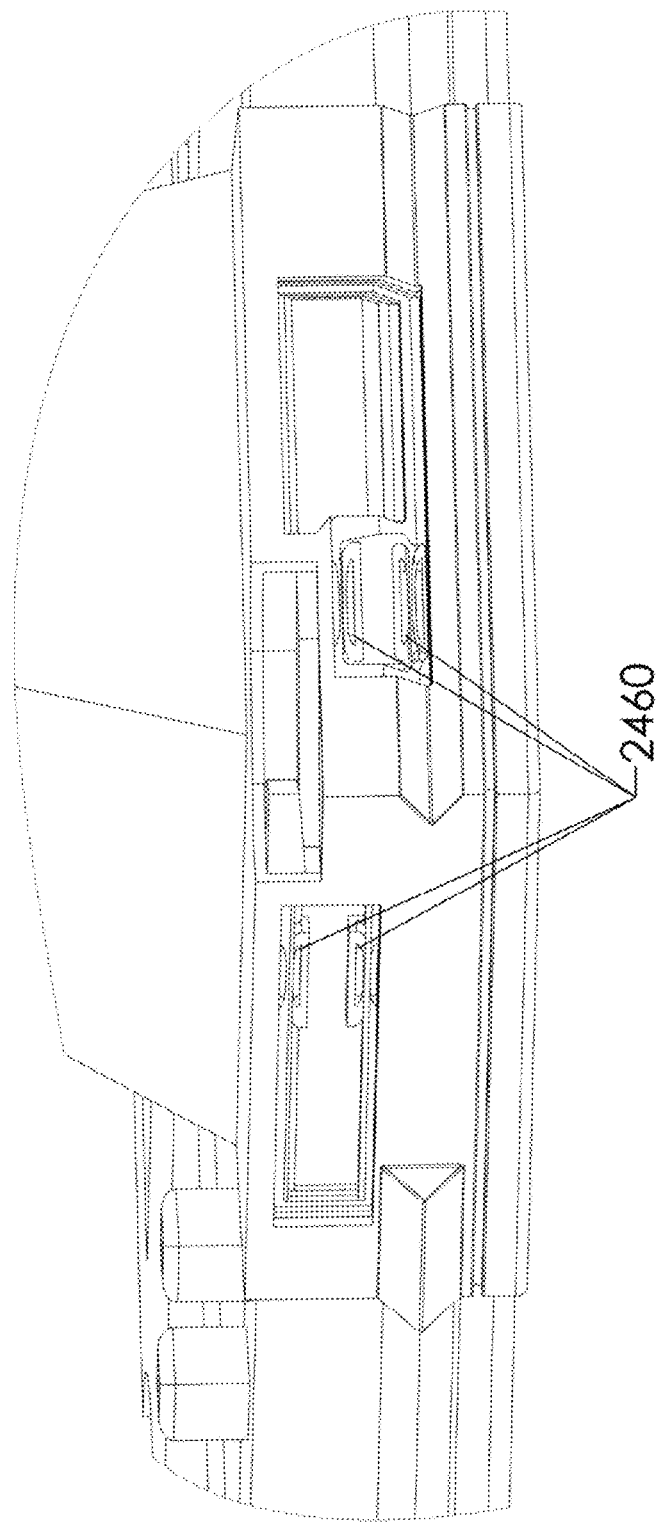
FIG. 75 shows a detail of the connector end's female second conductive layer.

FIG. 74 shows a detail of the female second insulative layer 2440 and its reinforced, connective sheath 2450 on the right side. FIG. 75 shows a detail of the connector end's female second conductive layer 2460.

Figure 76:
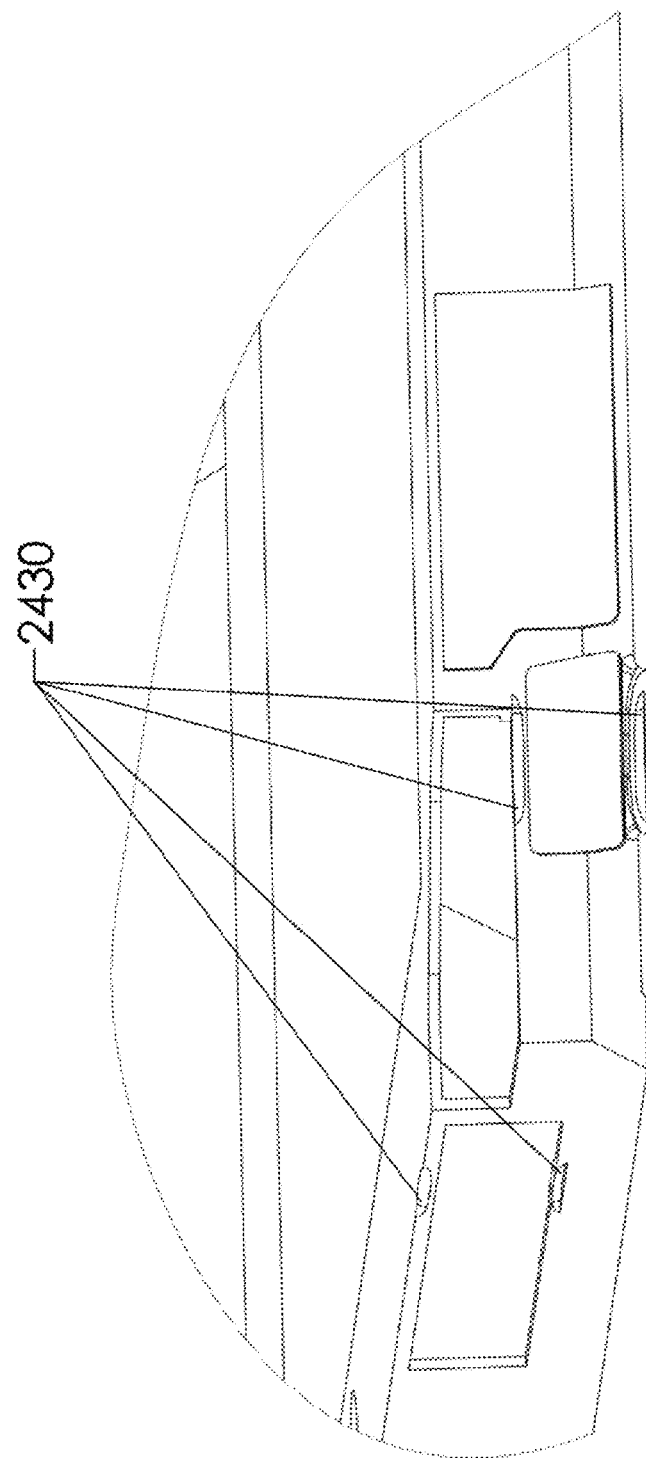
FIG. 76 shows a detail of the isolated connector ends of the female first conductive layer.
Figure 77:
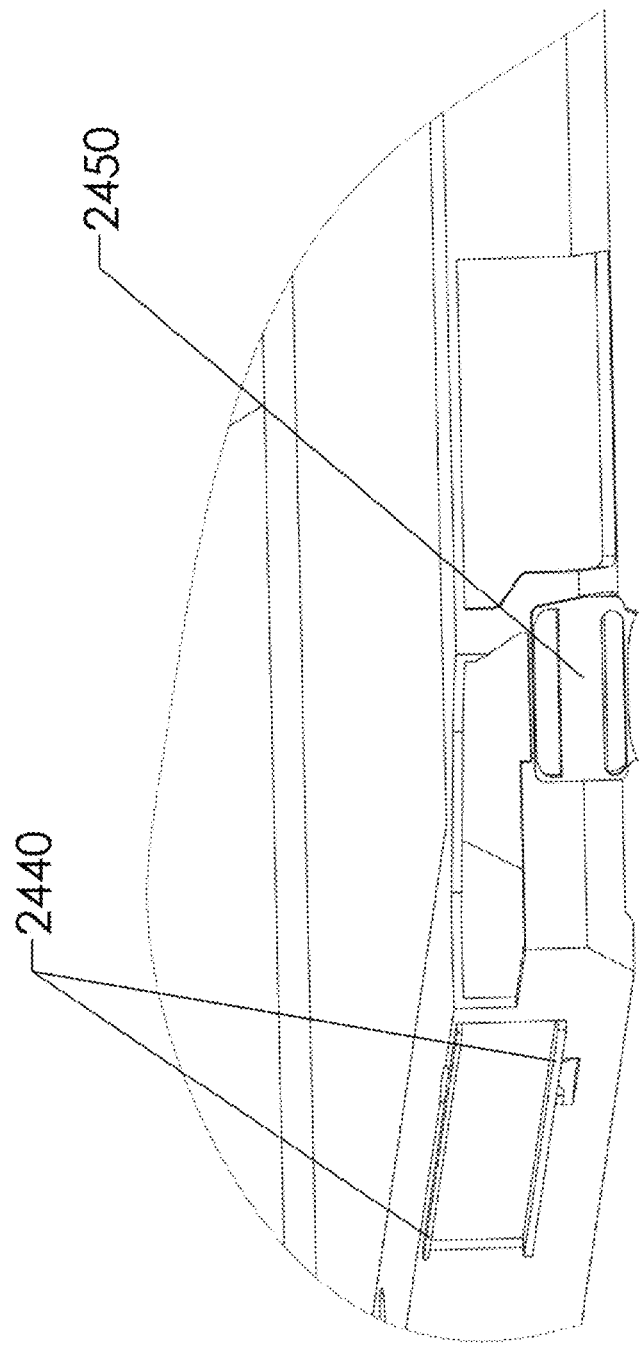
FIG. 77 shows a detail of the isolated female second insulative layer.
Figure 78:
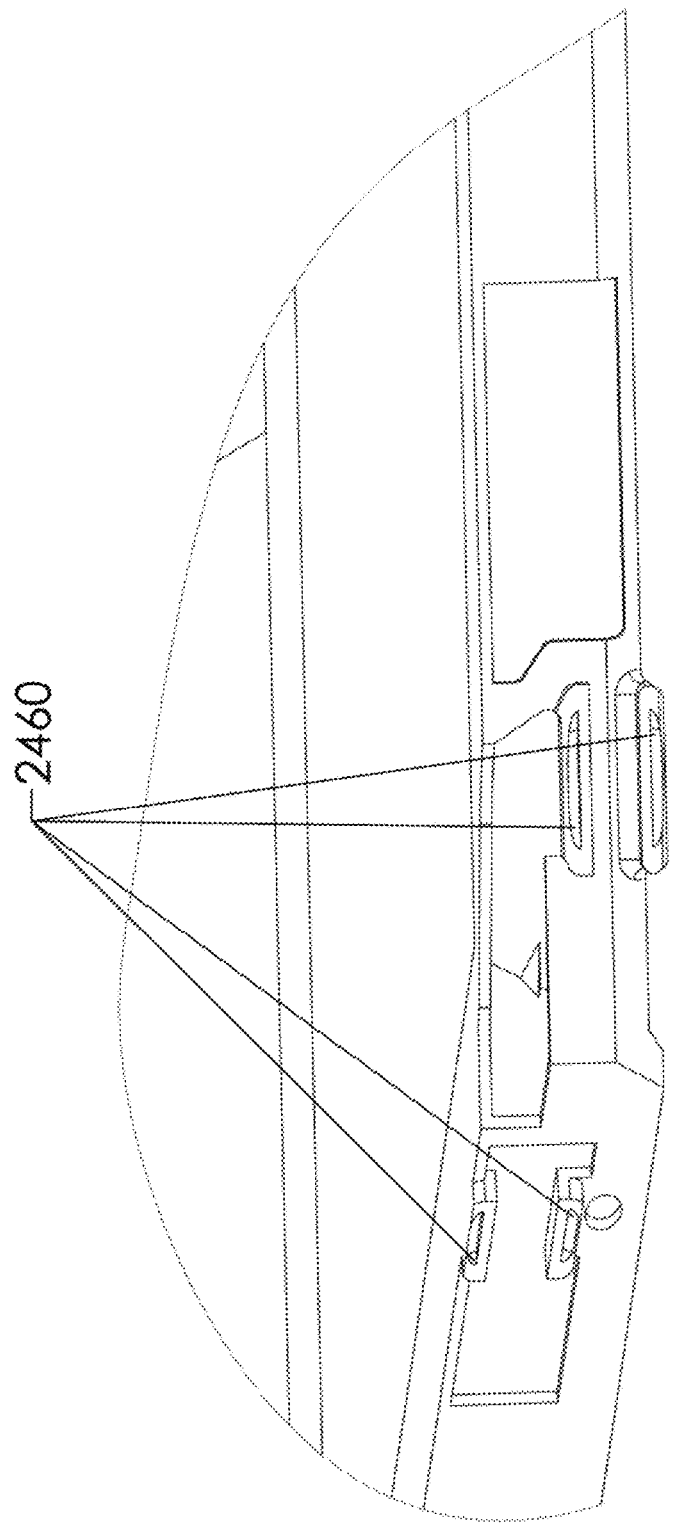
FIG. 78 shows a detail of the isolated connector ends of the female second conductive layer.

FIG. 76 shows a detail of the isolated connector ends of female first conductive layer 2430. FIG. 77 shows a detail of the isolated female second insulative layer 2440 and its reinforced, connective sheath 2450 on the right side. FIG. 78 shows a detail of the isolated connector ends of the female second conductive layer 2460.

Figure 79:
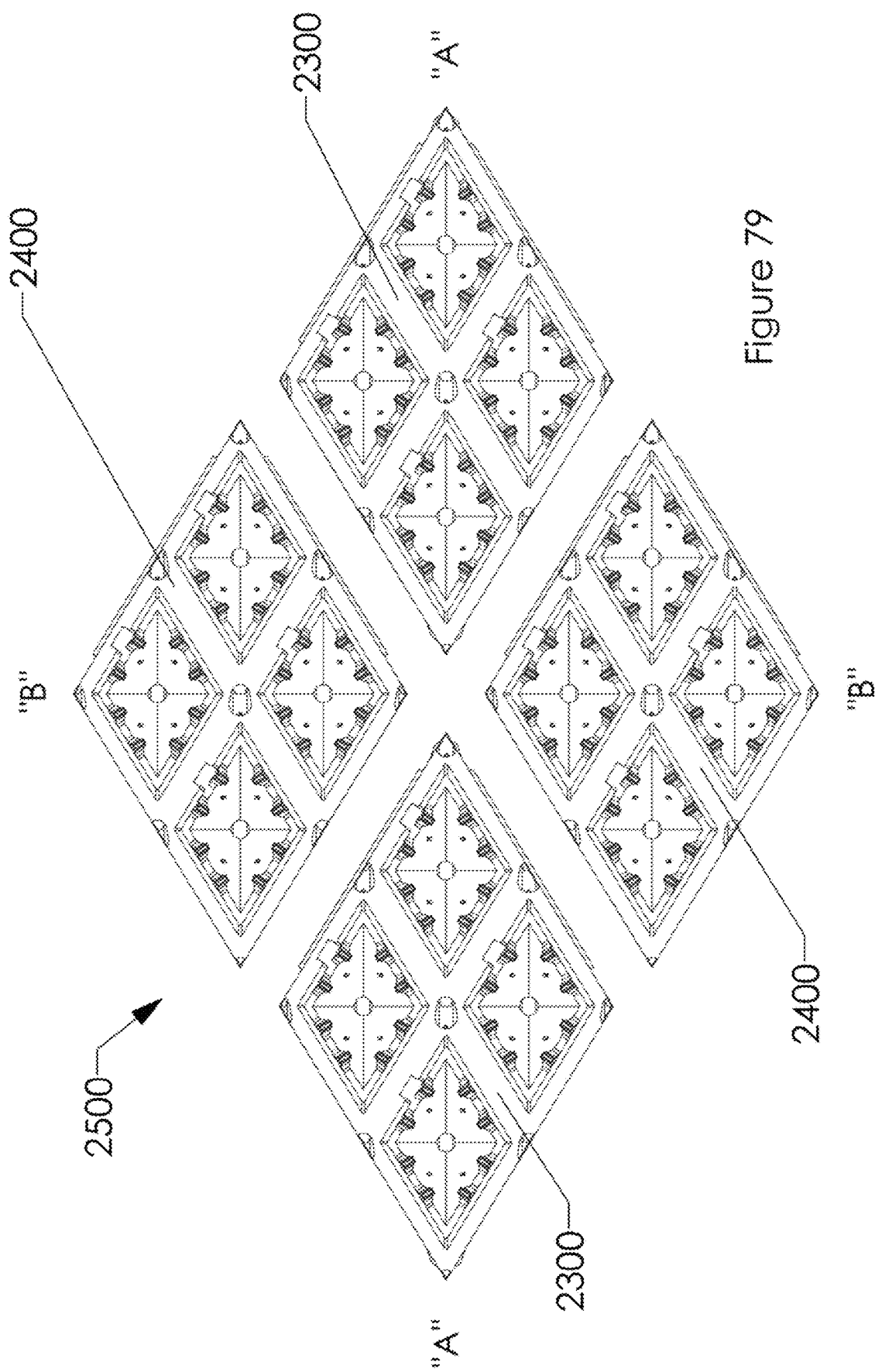
FIG. 79 shows male -A- and female -B- wall sections in relative position.

FIG. 79 shows male-A- wall sections 2300 and female-B- wall sections 2400 in relative position from the connector side.

Figure 80B:
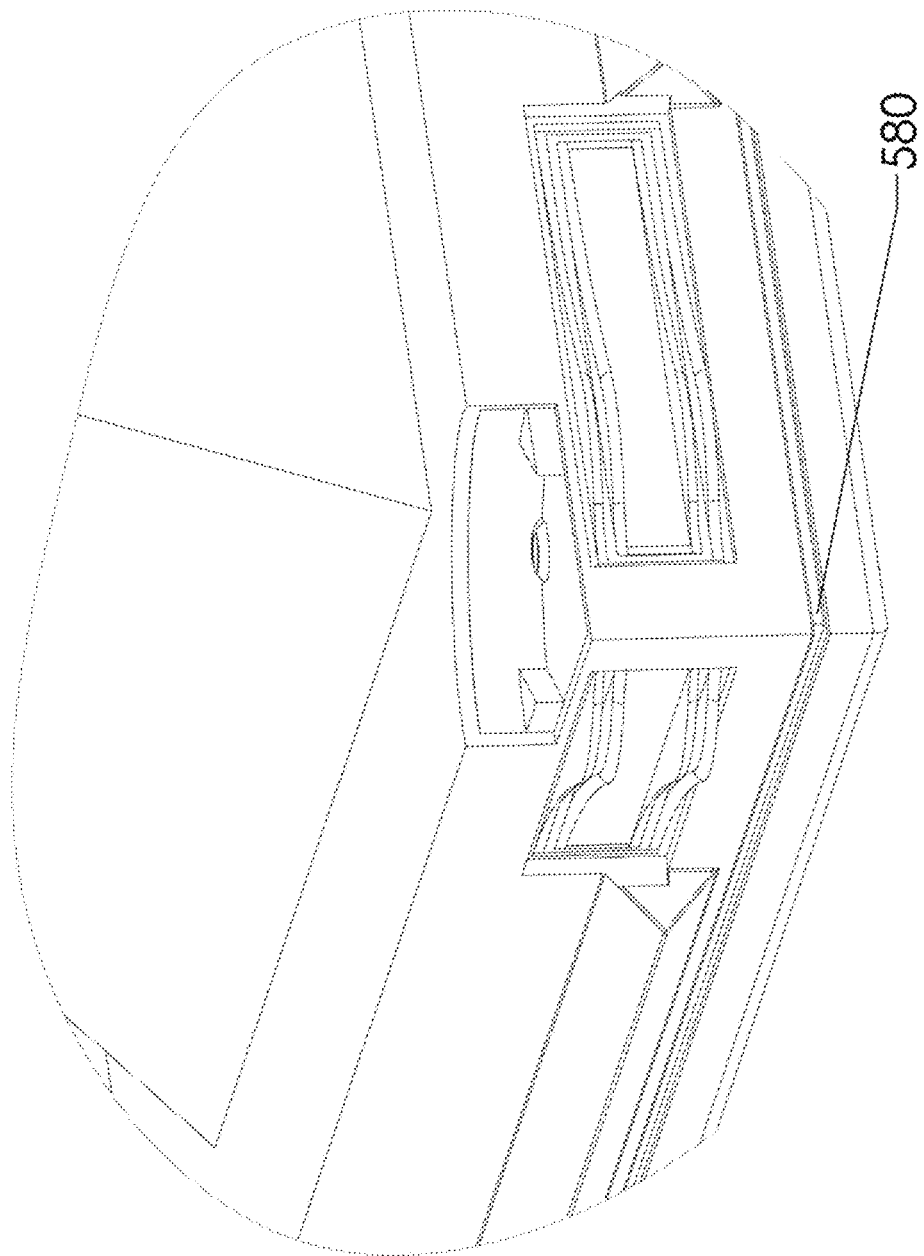
FIG. 80B shows a close-up of an O-ring groove.

FIG. 80A shows a detail of the -A- male connector ends (combined 550, 560 and 570), -B- female connector ends 2410, cutout vents 1700 at mating corners, V shaped bosses 520, V shaped grooves 530 and O-ring groove 580. FIG. 80B shows a close-up of an O-ring groove 580. This is used to seal the wall sections together and prevent moisture from penetrating either side. The groove surfaces may be coated with glue to reinforce the seal. FIG. 80C shows a cross section of the corner exposing the O-ring groove 580 and the O-ring 590.

Figure 81:
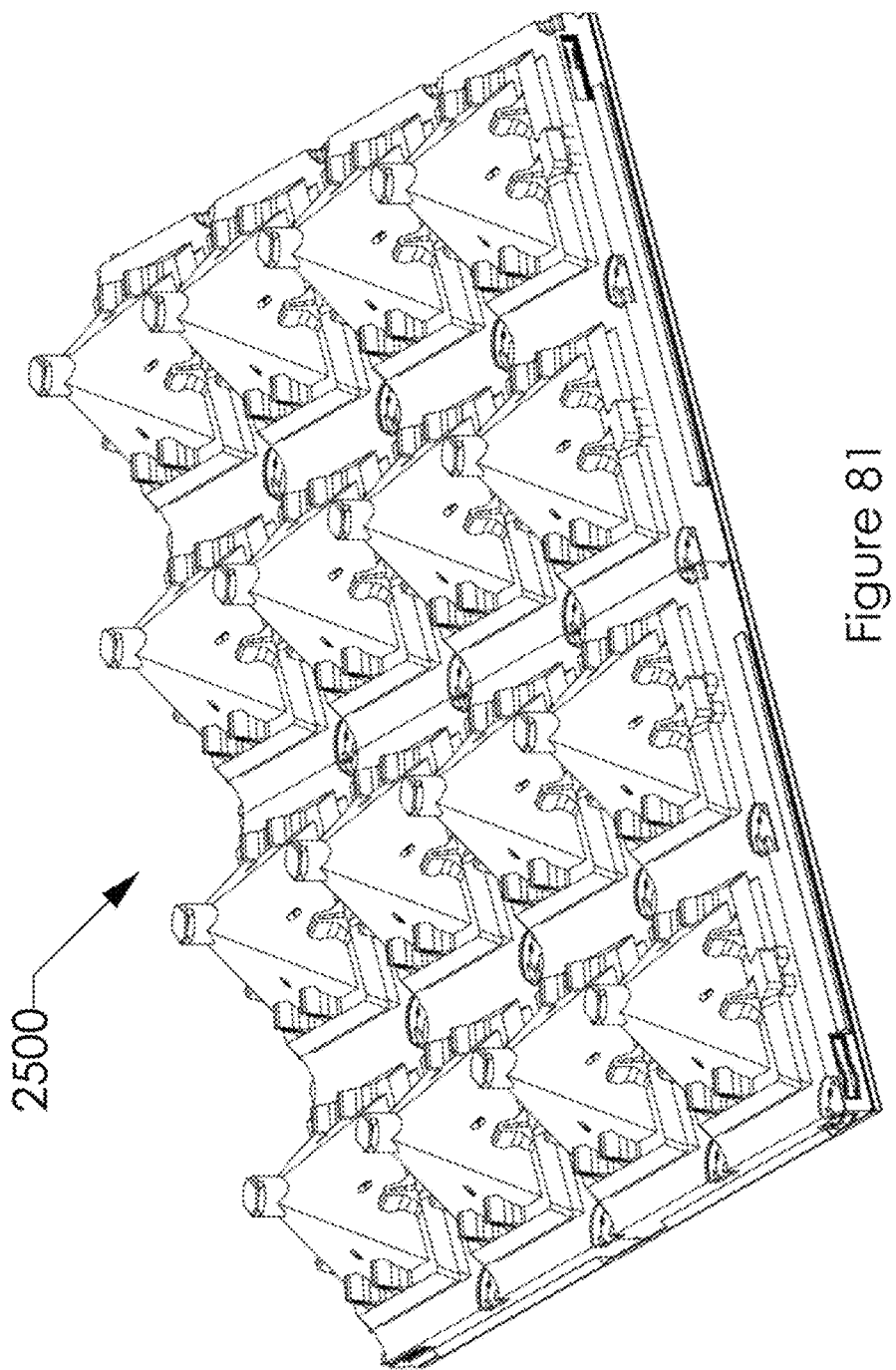
FIG. 81 shows male -A- and female -B- wall sections locked in place in a modular array.
Figure 82:
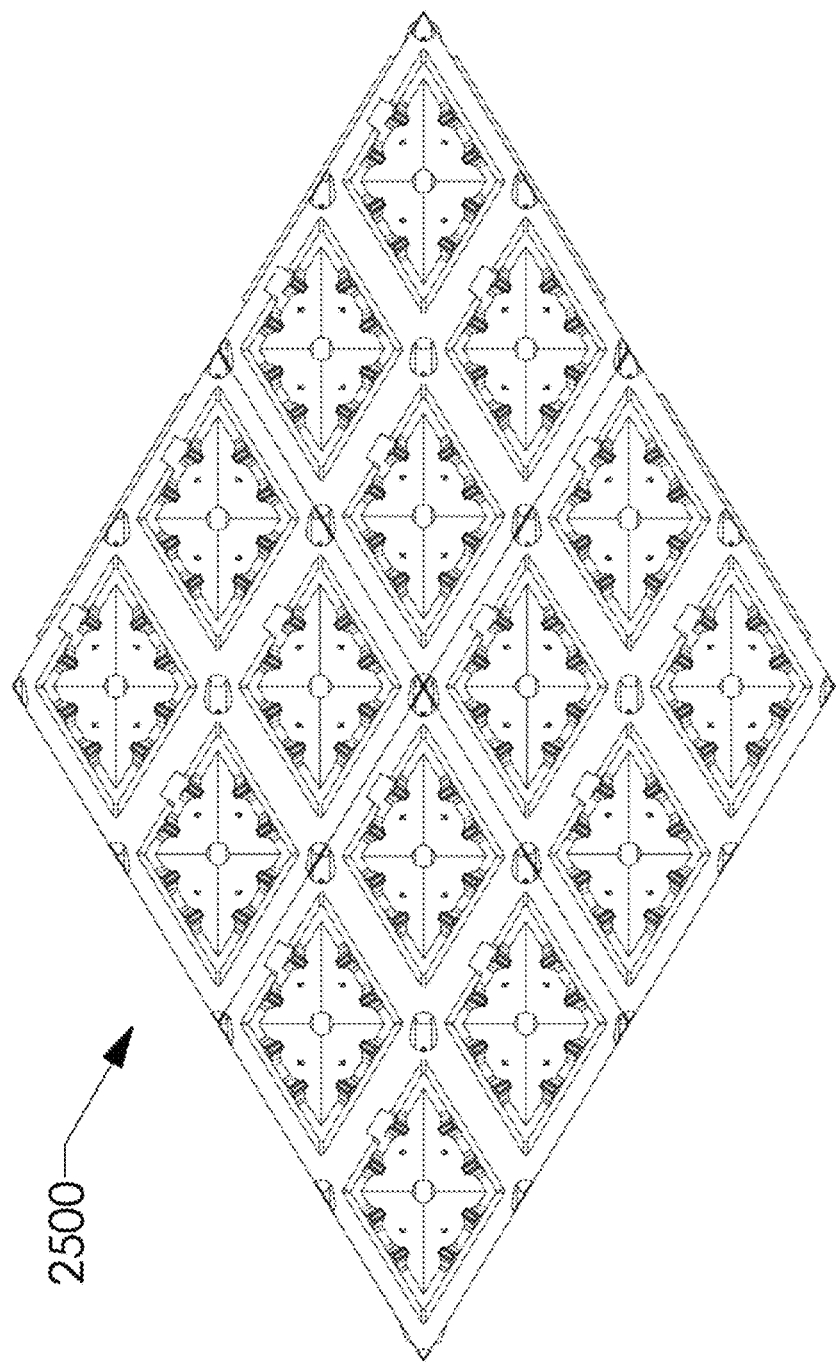
FIG. 82 shows alternate view of male -A- and female -B- wall sections locked in place in the modular array.

FIG. 81 shows male 2300 -A- and female 2400 -B- wall sections locked in place in a modular array 2500 from the connector side view. FIG. 82 shows alternate view of male-A- and female-B- wall sections 2300, 2400 locked in place in the modular array 2500 from the connector side view (here, normal to the underside face).

Figure 83:
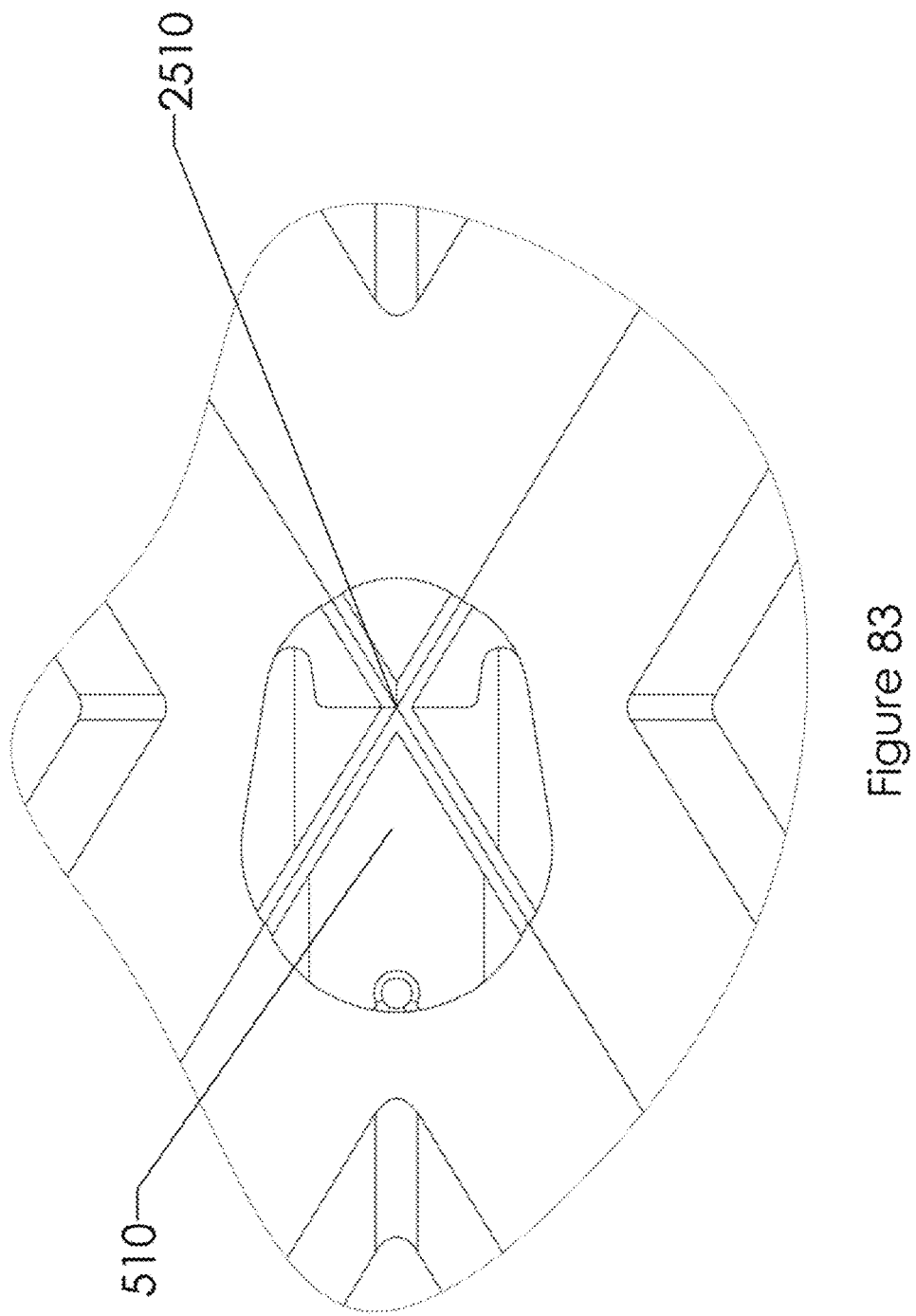
FIG. 83 shows a cropped detail of the junction of -A- & -B- sections which form a post slot.
Figure 84:
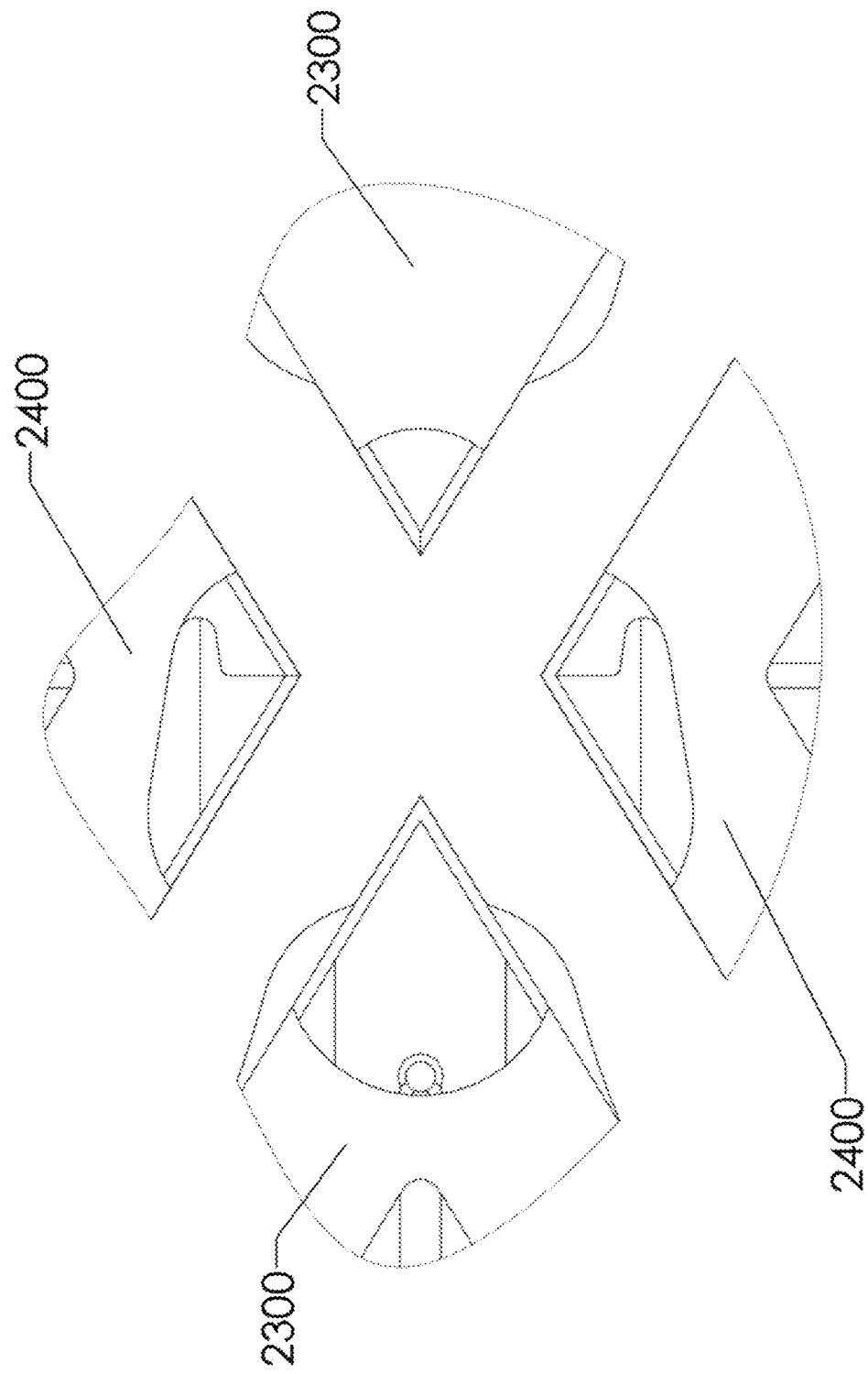
FIG. 84 shows a cropped detail of a laterally exploded junction of -A- & -B- sections.

FIG. 83 shows a cropped detail of the junction of -A- and -B- sections 2510 which form a post slot 510. FIG. 84 shows a cropped detail of a laterally exploded junction of -A- and -B- sections 2510.

Figure 85:
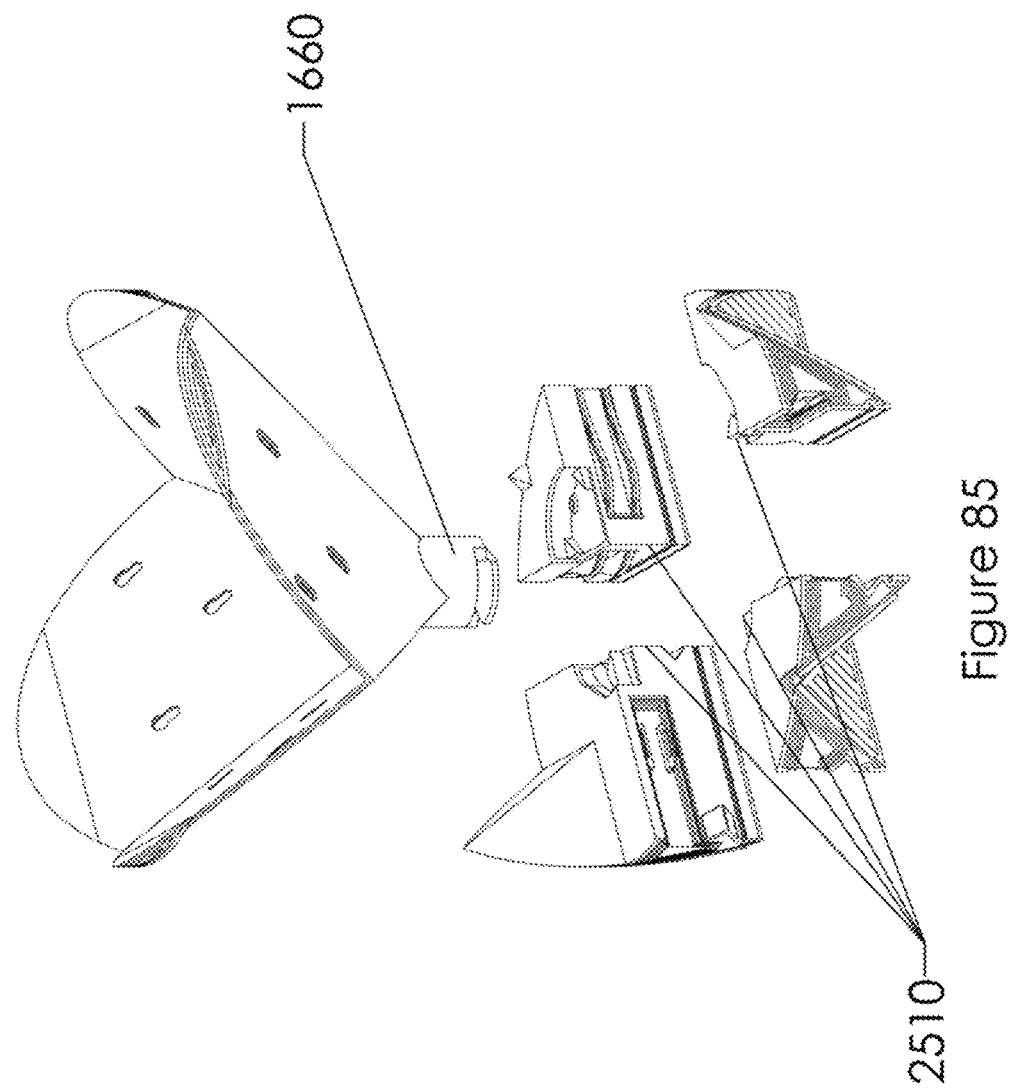
FIG. 85 shows a cutaway dimetric view of the laterally exploded -A- & -B- junction with a locking post from a backing wall section.
Figure 86:
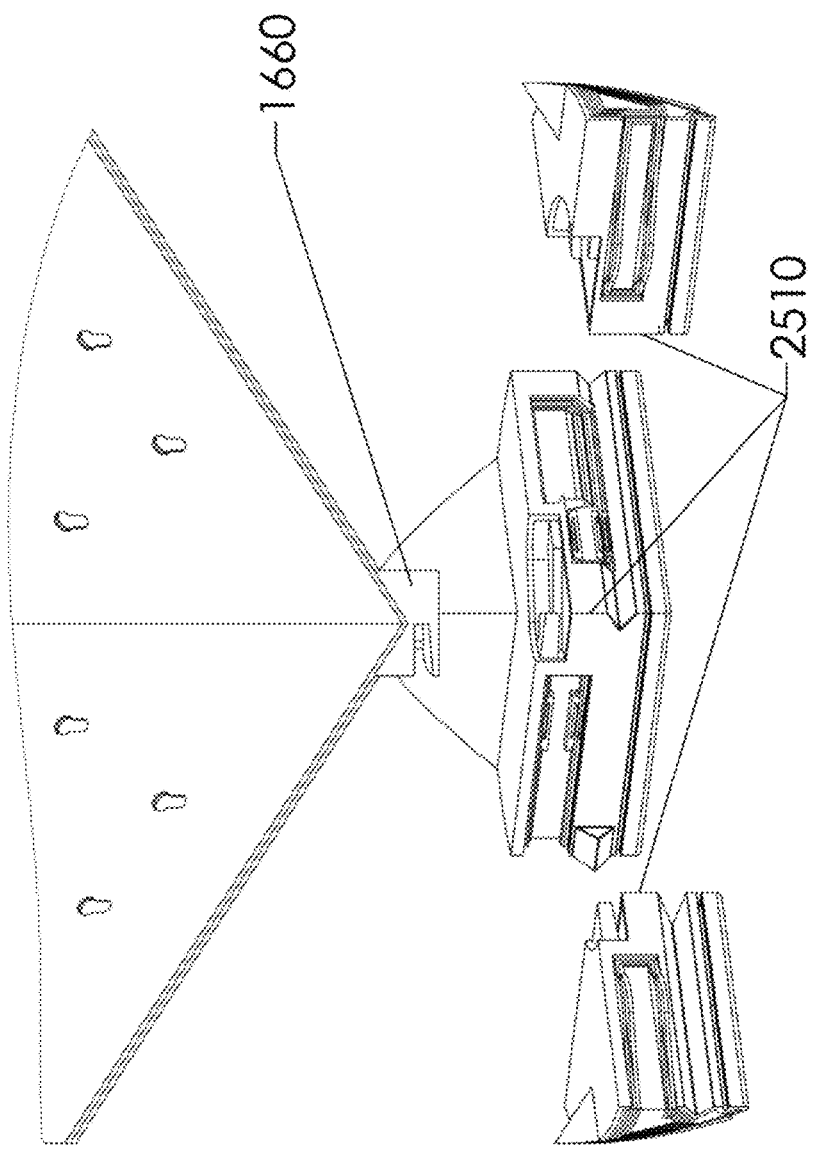
FIG. 86 shows an alternate view of the laterally exploded -A- & -B- junction and locking post.
Figure 87:
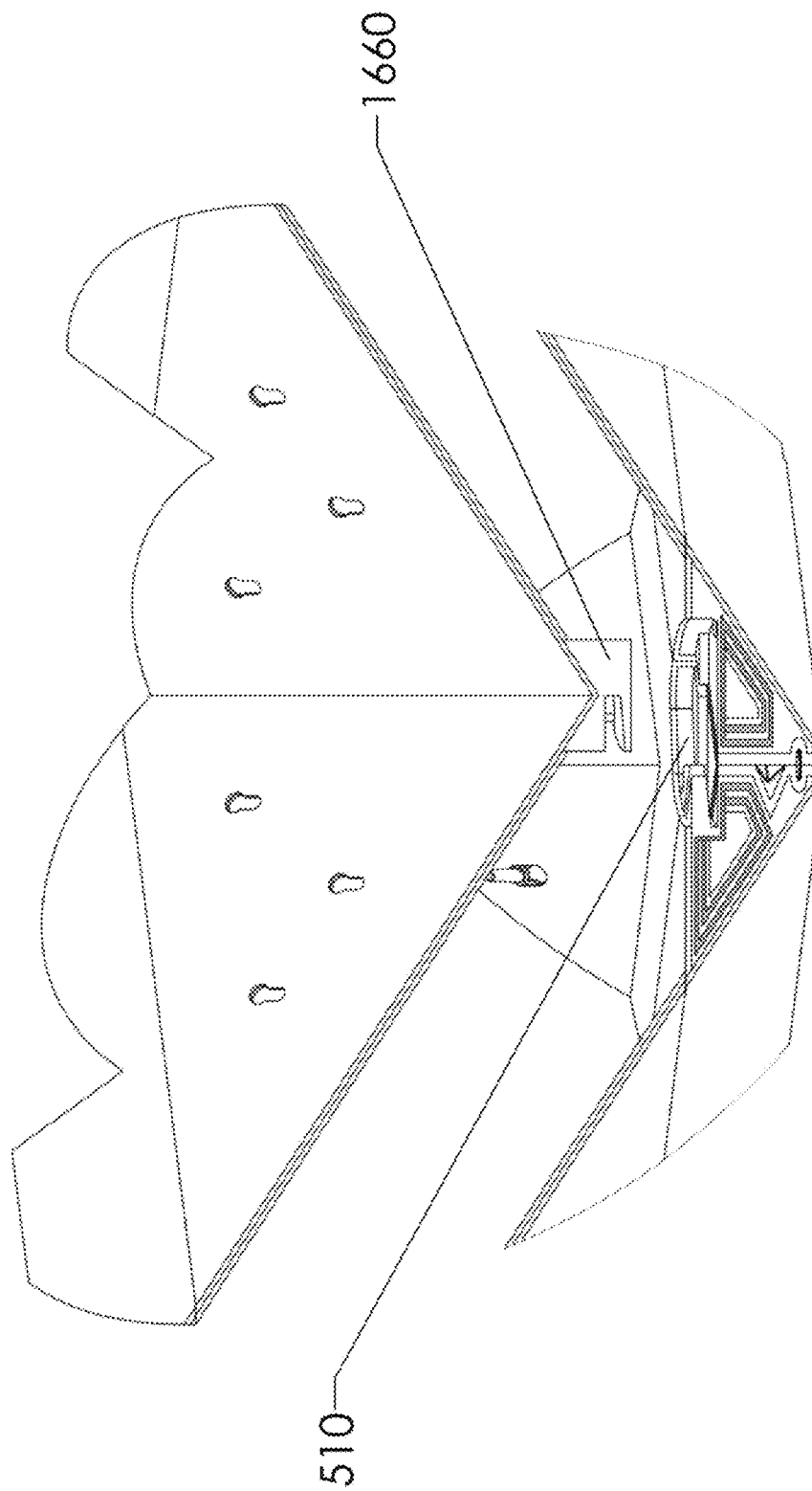
FIG. 87 shows an -A- & -B- junction joined together.
Figure 88:
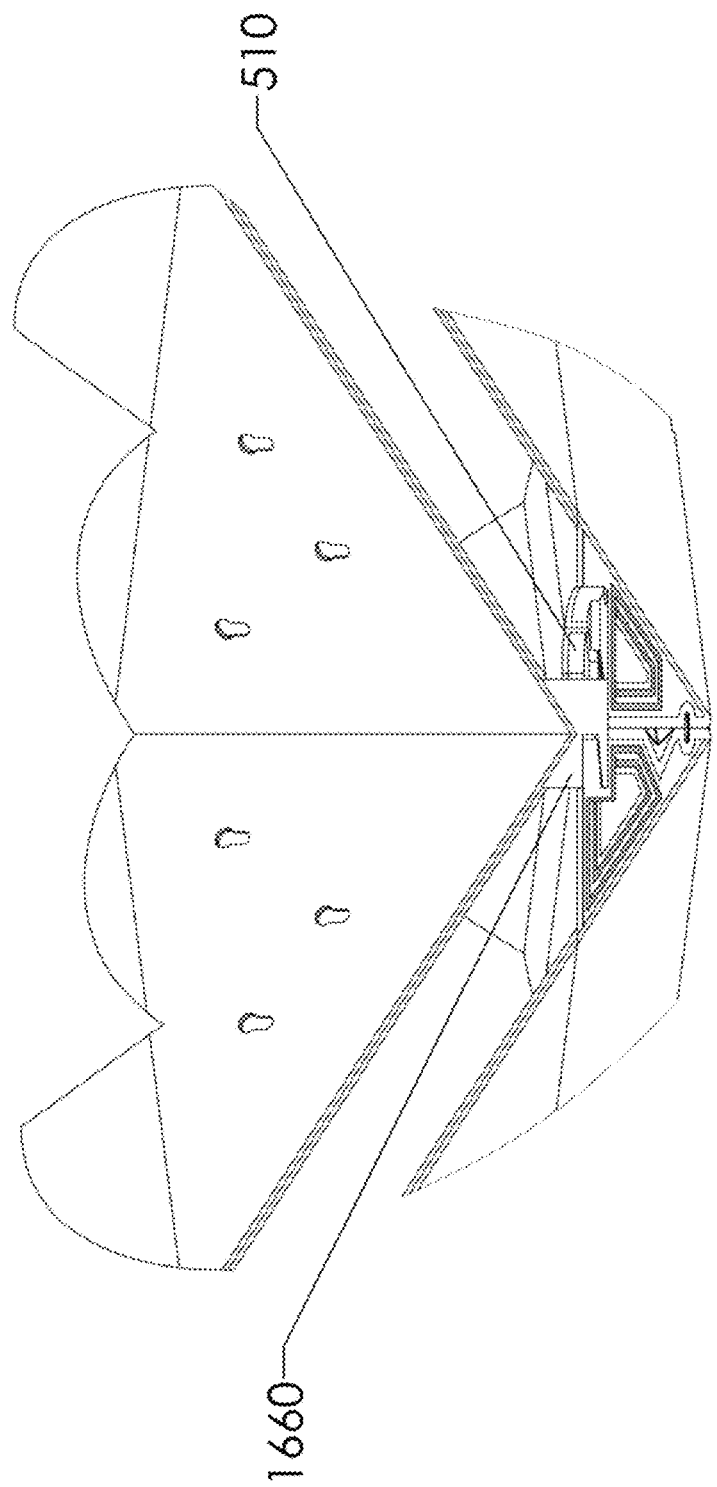
FIG. 88 shows a locking post secure in the post slot.
Figure 89:
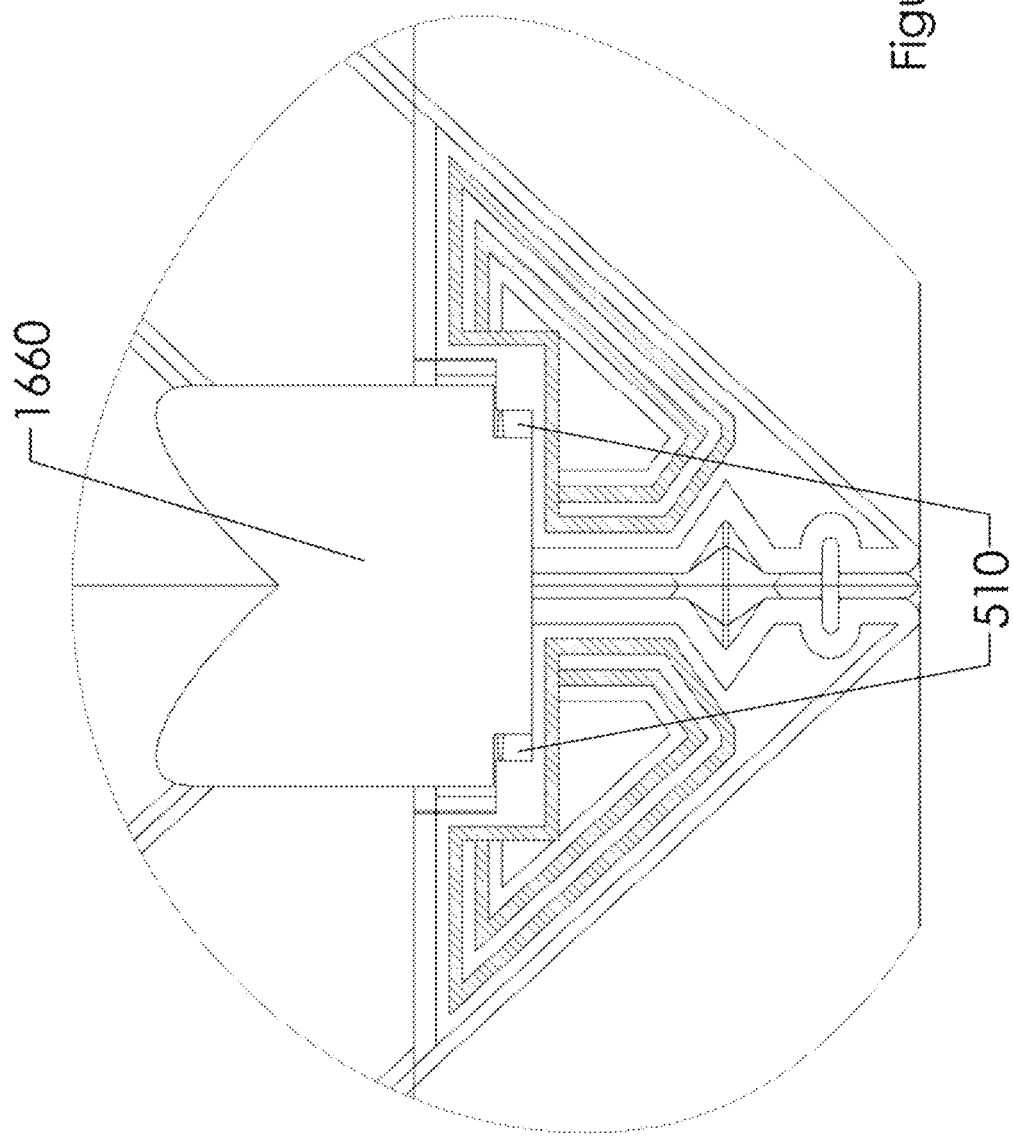
FIG. 89 shows a rotated view of the locking post secure in the post slot.

FIG. 85 shows a cutaway dimetric view of the laterally exploded -A- and -B- junction 2510 with a locking post 1660 from a backing wall section oriented to join the modular array 2500. FIG. 86 shows an alternate view of the assembly in FIG. 85, normal to a plane that bisects the short diagonal edges. FIG. 87 shows an -A- and -B- junction 2510 joined together. A locking post 1660 is oriented to insert into a post slot 510 and join a backing wall section to the modular array 2500. FIG. 88 shows the locking post 1660 secure in the post slot 510, from a section view normal to a plane that bisects the short diagonal edges and FIG. 89 shows a section view rotated 90° from the orientation of FIG. 88.

Figure 90:
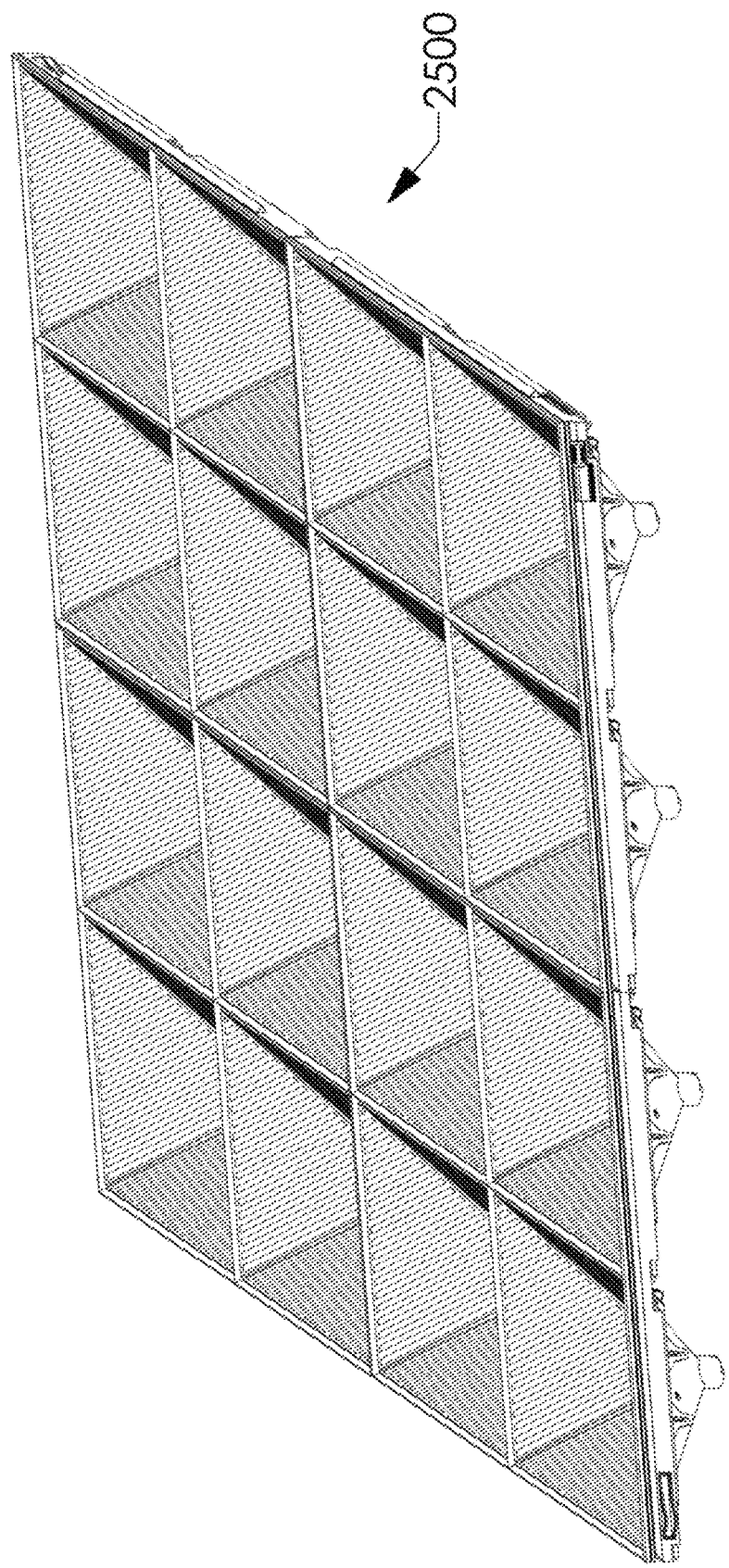
FIG. 90 shows the modular array from the solar panel side.

FIG. 90 shows the modular array 2500 from the solar panel side.

Figure 91:
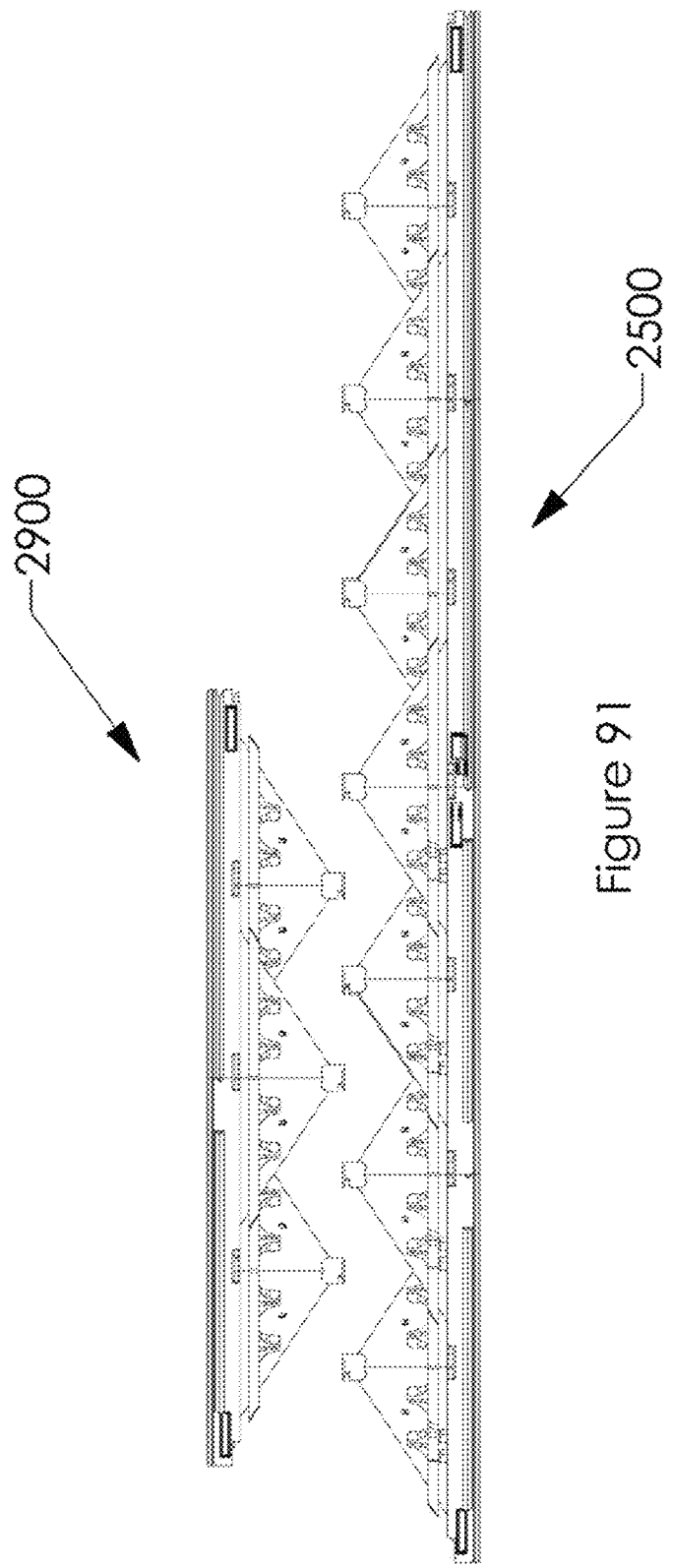
FIG. 91 shows a view of the modular array and a backing wall section.
Figure 92:
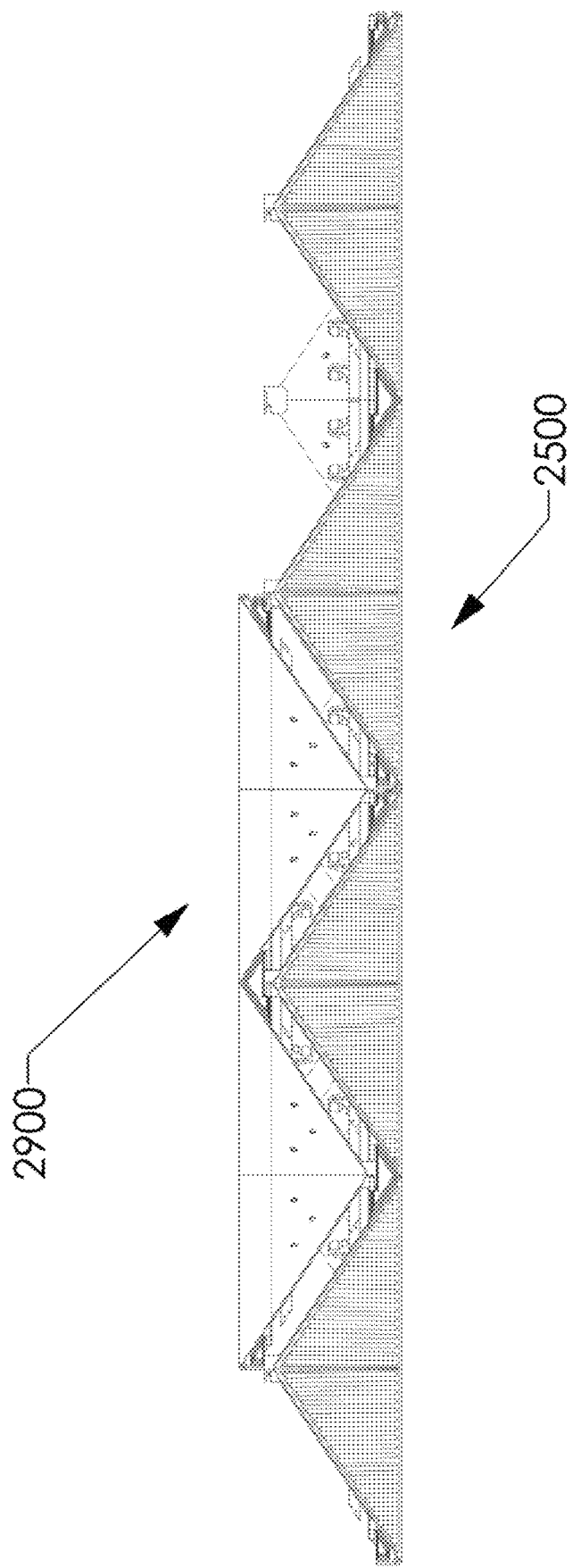
FIG. 92 shows a view of the modular array with the capacitor wall section in position.

FIG. 91 shows a side view of a modular array 2500 and a backing wall section. In this non-limiting embodiment, this backing wall is to be a capacitor wall section 2900. FIG. 92 shows a side section view along the long diagonal of a modular array 2500, with a capacitor wall section 2900 in position.

In order to prevent back-to-back wall sections (such as modular array 2500 and capacitor wall section 2900) from sliding apart a magnetic securing post 3000 is used. The body 3010 of these posts 3000 is made out of thermoplastic and has a rare earth NdFeB locking magnet 3020 bonded into it.

Figure 93A:
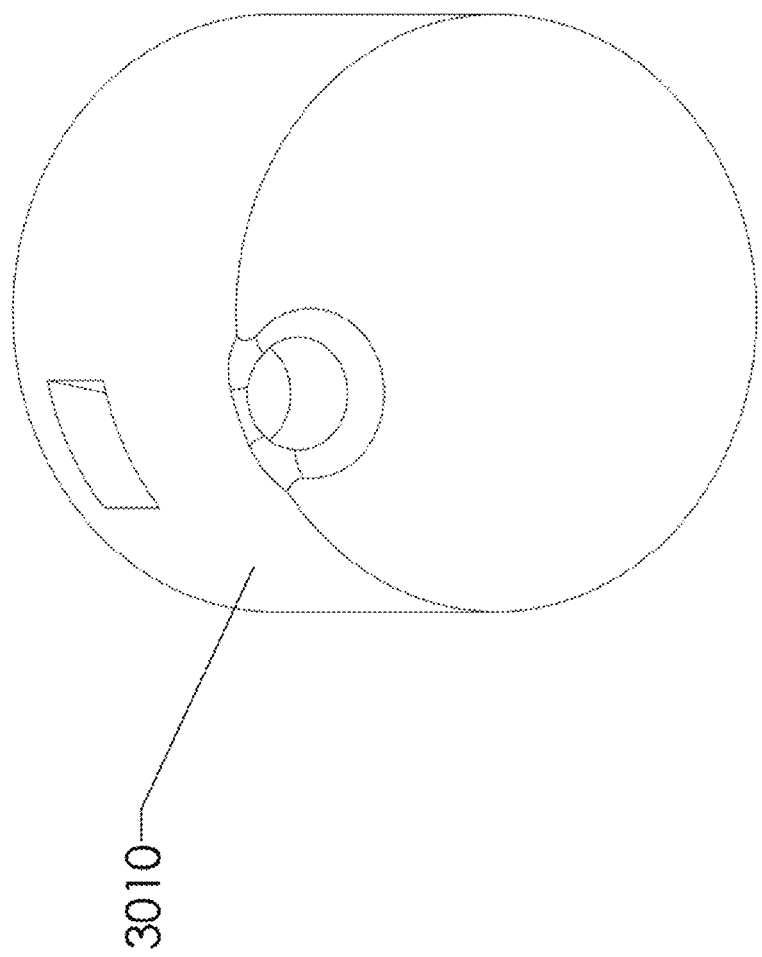
FIG. 93A shows the body of a magnetic securing post.
Figure 93B:
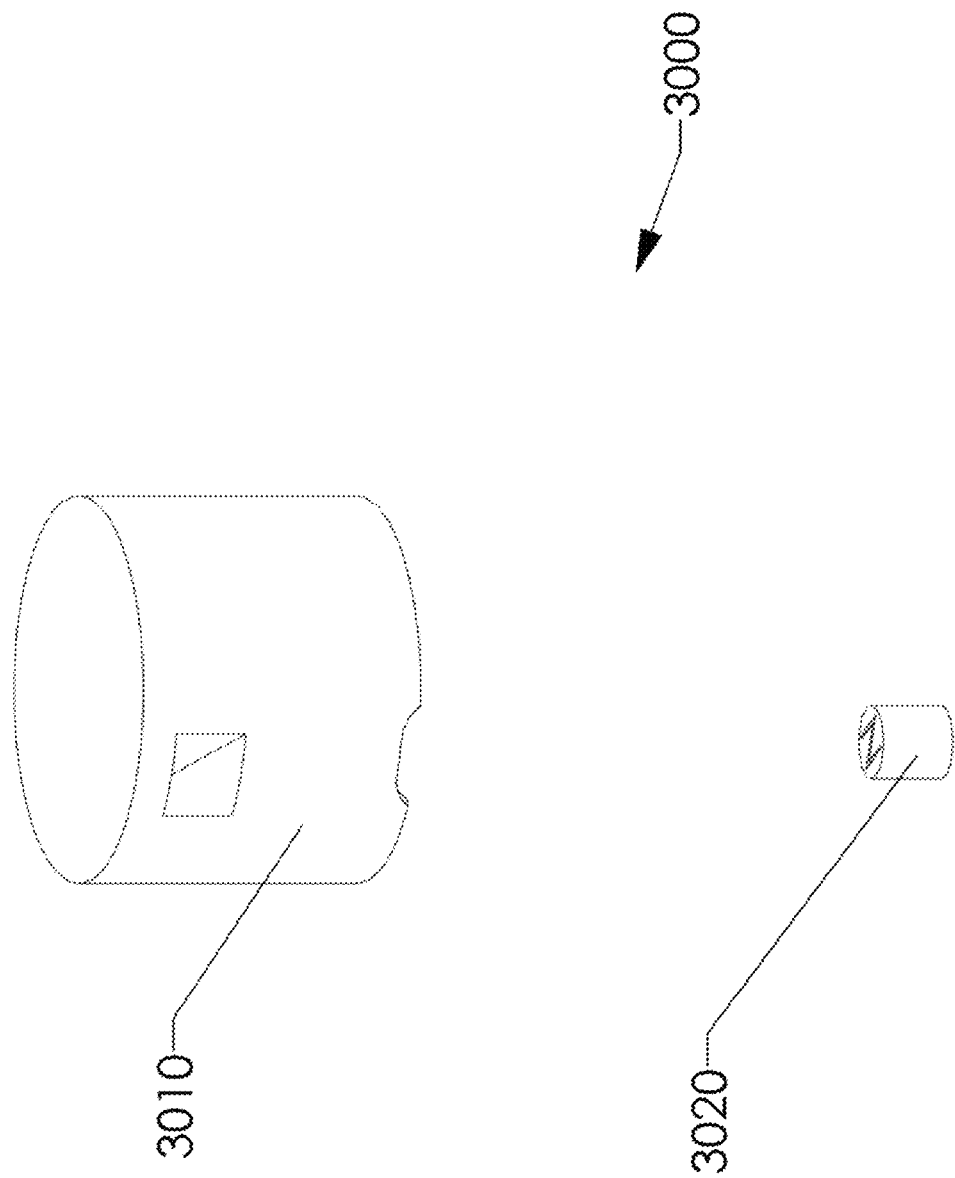
FIG. 93B shows an exploded view of a magnetic securing post.
Figure 93C:
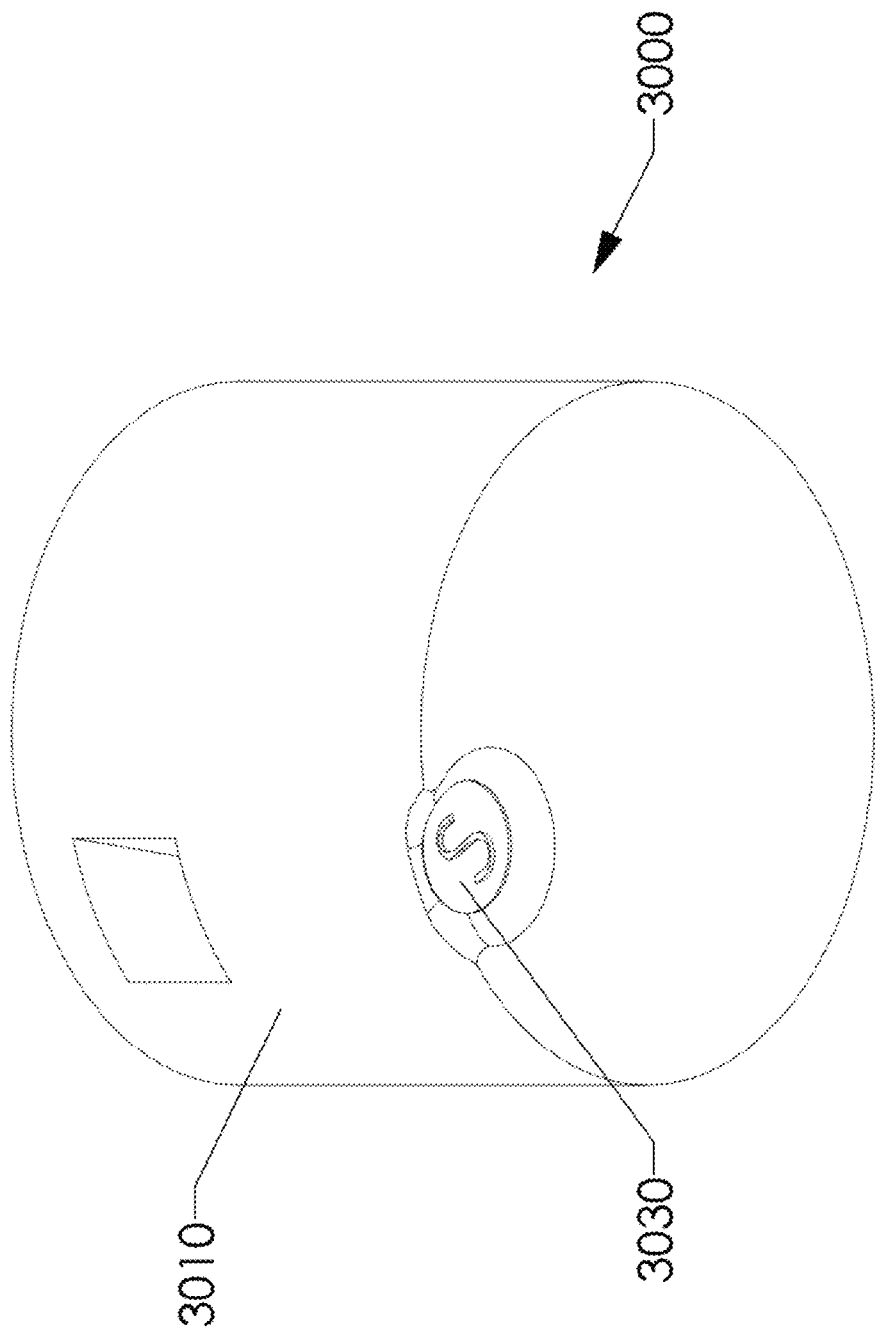
FIG. 93C shows a magnetic securing post with the locking magnet.

FIG. 93A shows the body 3010 of a magnetic securing post 3000. FIG. 93B shows an exploded view of a magnetic securing post 3000. At top is the body 3010 of a magnetic securing post 3000 and at the bottom is the rare earth NdFeB locking magnet 3020. FIG. 93C shows a magnetic securing post 3000 assembled with the rare earth NdFeB locking magnet 3020 bonded in and its South Pole 3030 facing outward. FIG. 93D shows the magnetic securing post 3000 with a clear view of its rectangular thru hole 3050.

Figure 94:
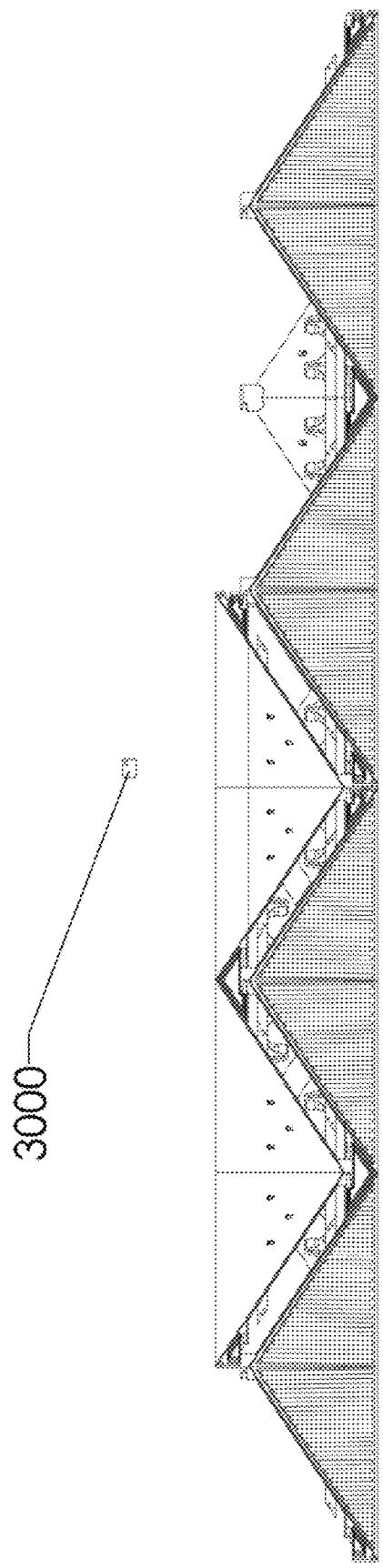
FIG. 94 shows a view of a magnetic securing post in view ready to assemble.

FIG. 94 shows a view similar to FIG. 92 with a magnetic securing post 3000 in view and ready to assemble.

Figure 95A:
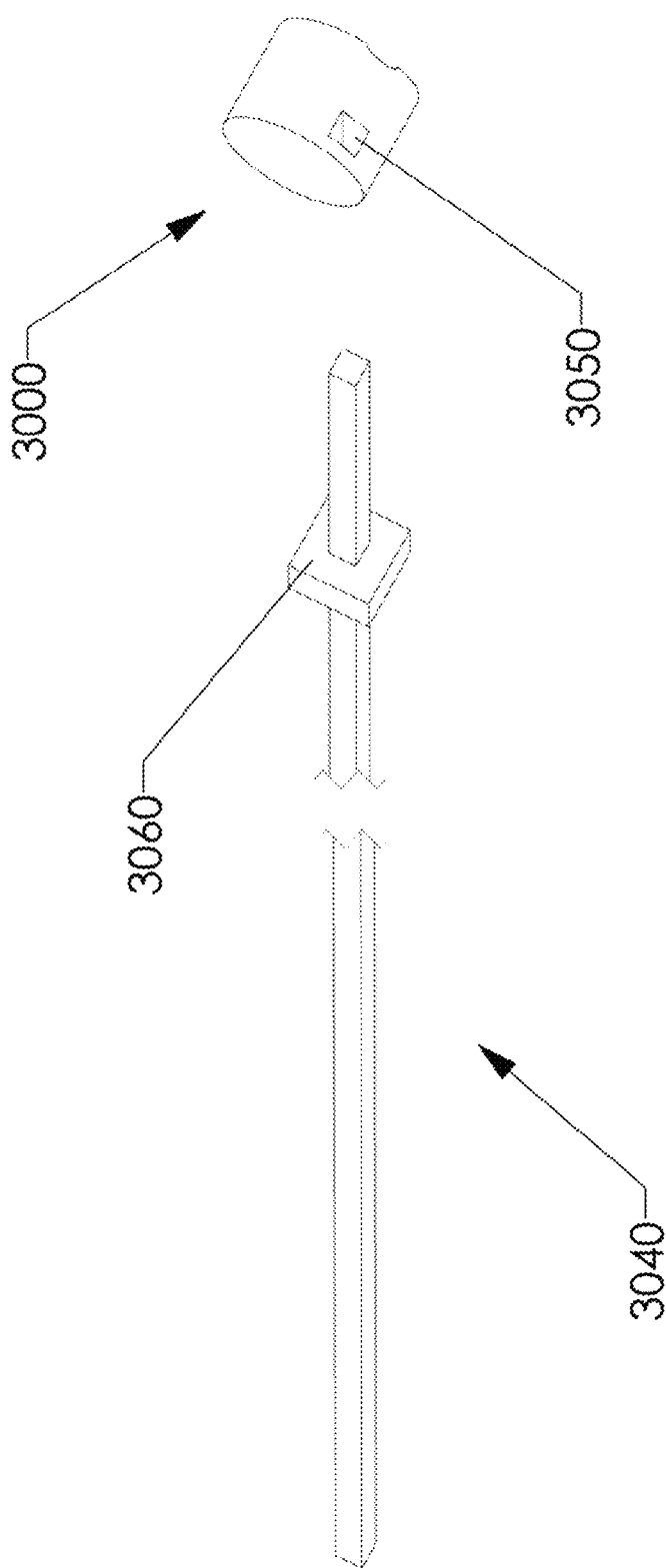
FIG. 95A shows a magnetic insertion tool.
Figure 95C:
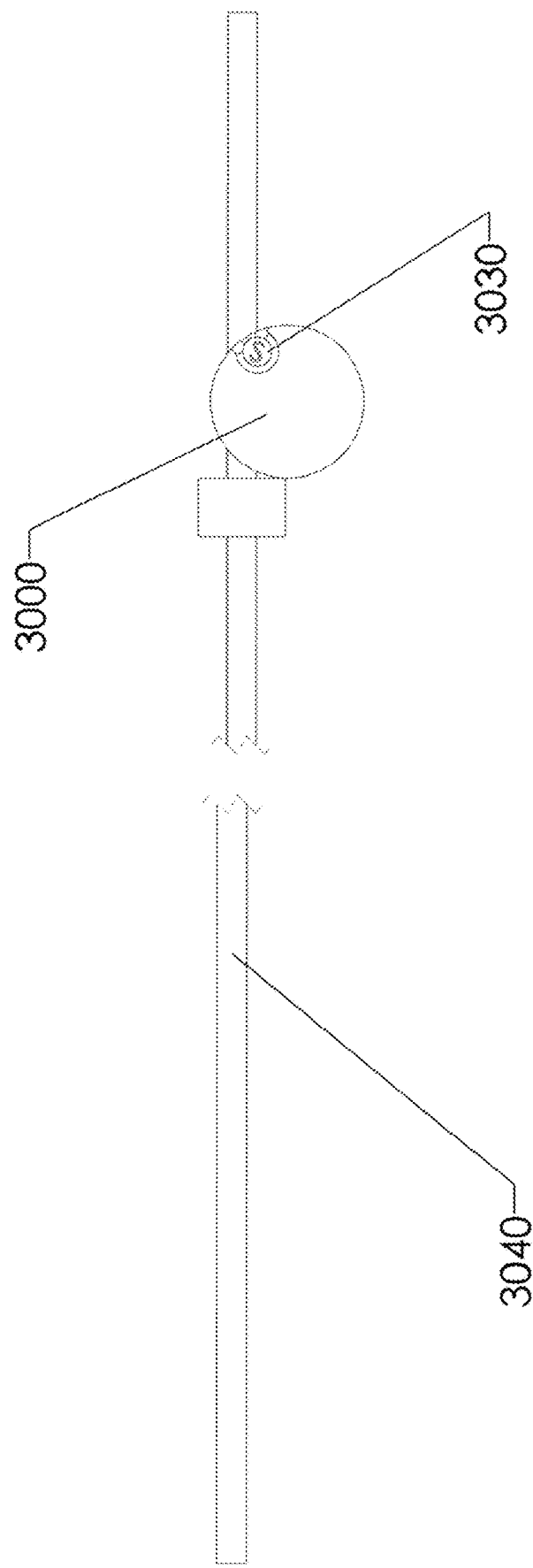
FIG. 95C shows another view of the magnetic securing post on a magnetic insertion tool.

FIG. 95A shows a magnetic insertion tool 3040. The tool body has a rectangular profile to prevent the magnetic securing post 3000 from wobbling and slides into the rectangular thru hole 3050 in the post's body 3010. The tool 3040 also has a shoulder stop 3060 toward one end to prevent the post 3000 from sliding backward as it's being inserted. FIG. 95B shows a magnetic securing post 3000 slid into position against a shoulder stop 3060 on a magnetic insertion tool 3040 and FIG. 95C shows the underside of a magnetic securing post 3000 on a magnetic insertion tool 3040 exposing the South Pole 3030 of its locking magnet 3020.

Figure 96:
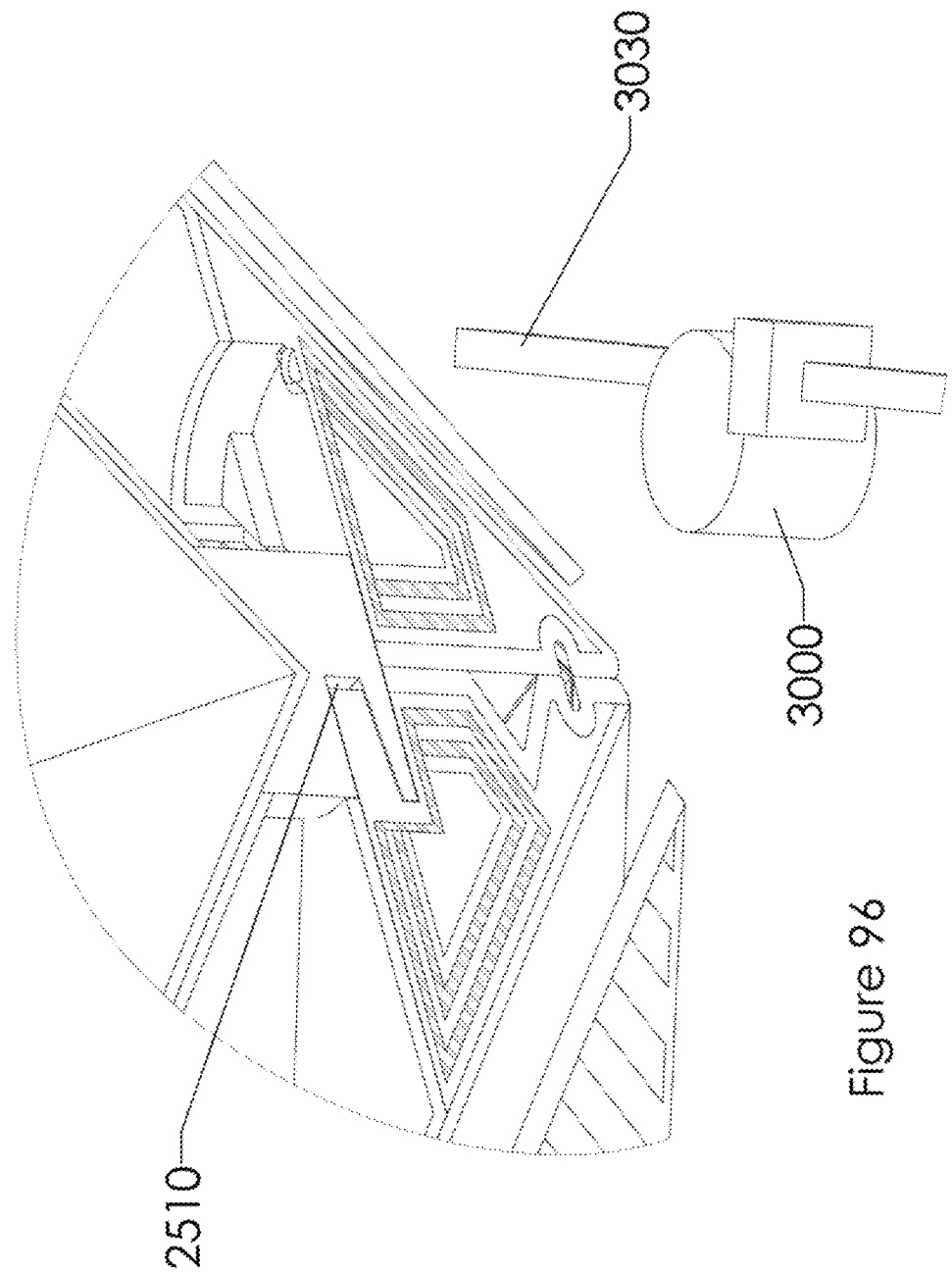
FIG. 96 shows a cropped view of the cross section of an -A- & -B- junction and the insertion tool with a magnetic securing post loaded on it.
Figure 97:
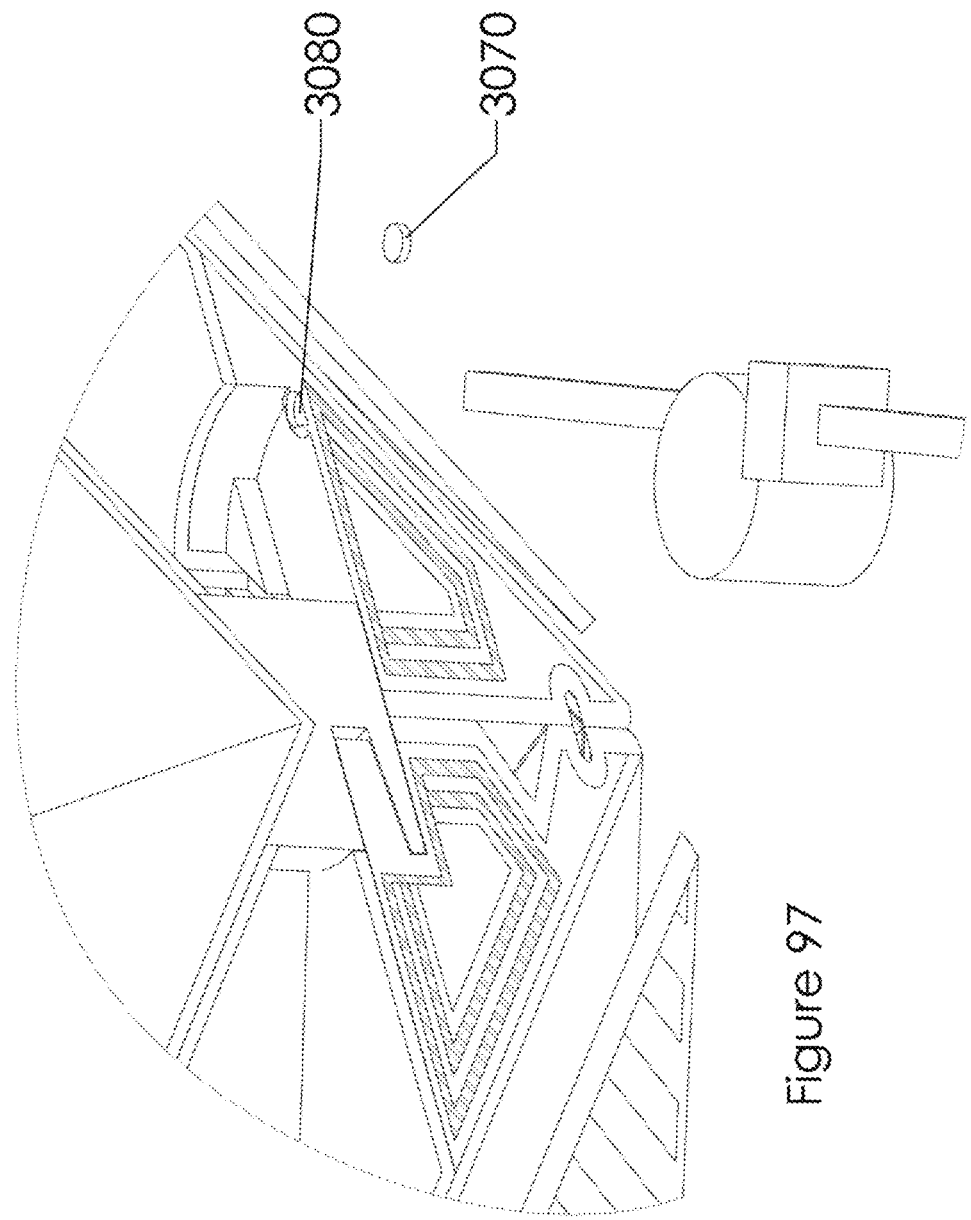
FIG. 97 shows a small steel retaining disk and a steel recess in the post slot.
Figure 98:
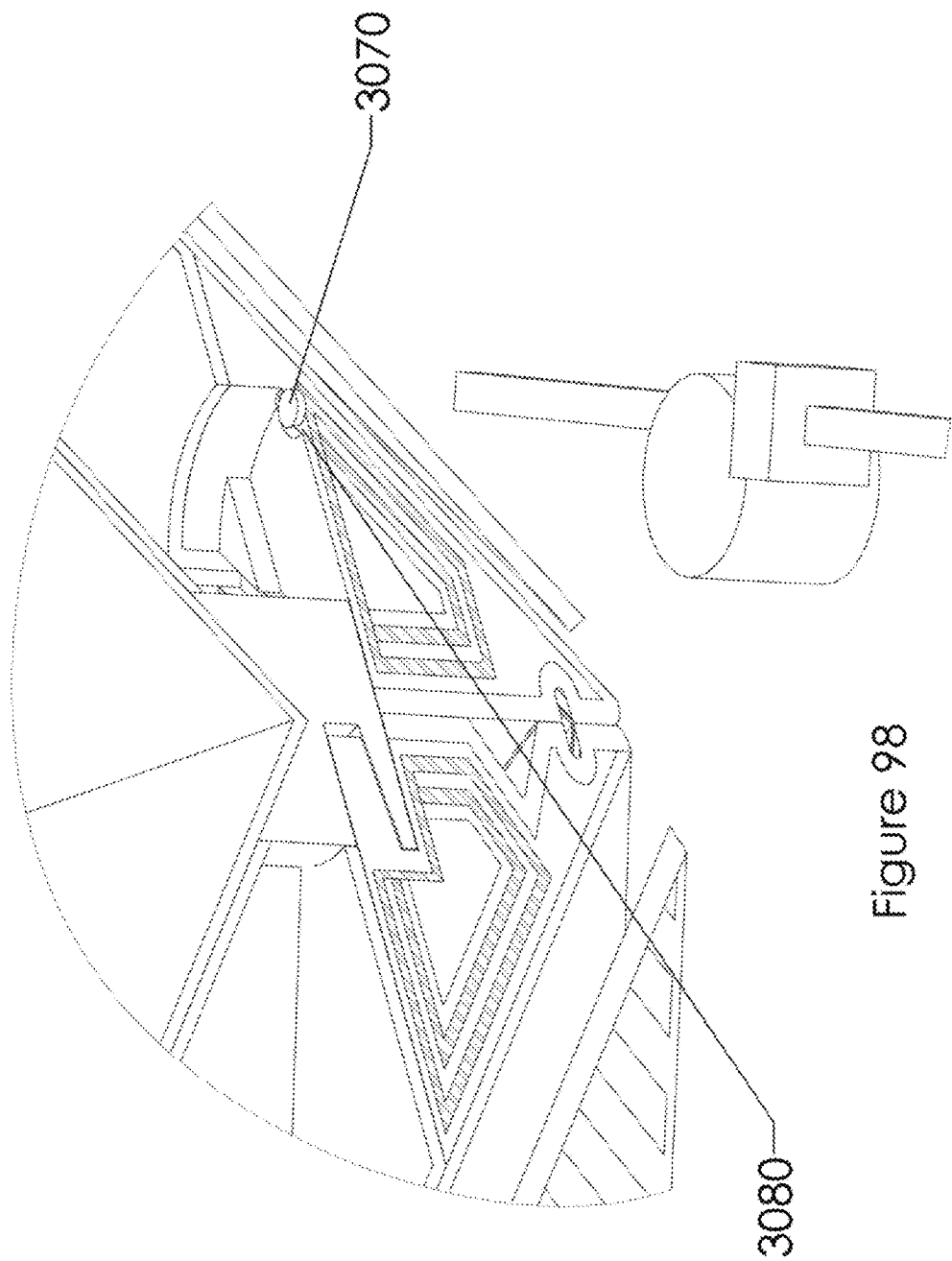
FIG. 98 shows the small steel retaining disk bonded in the steel recess.
Figure 99:
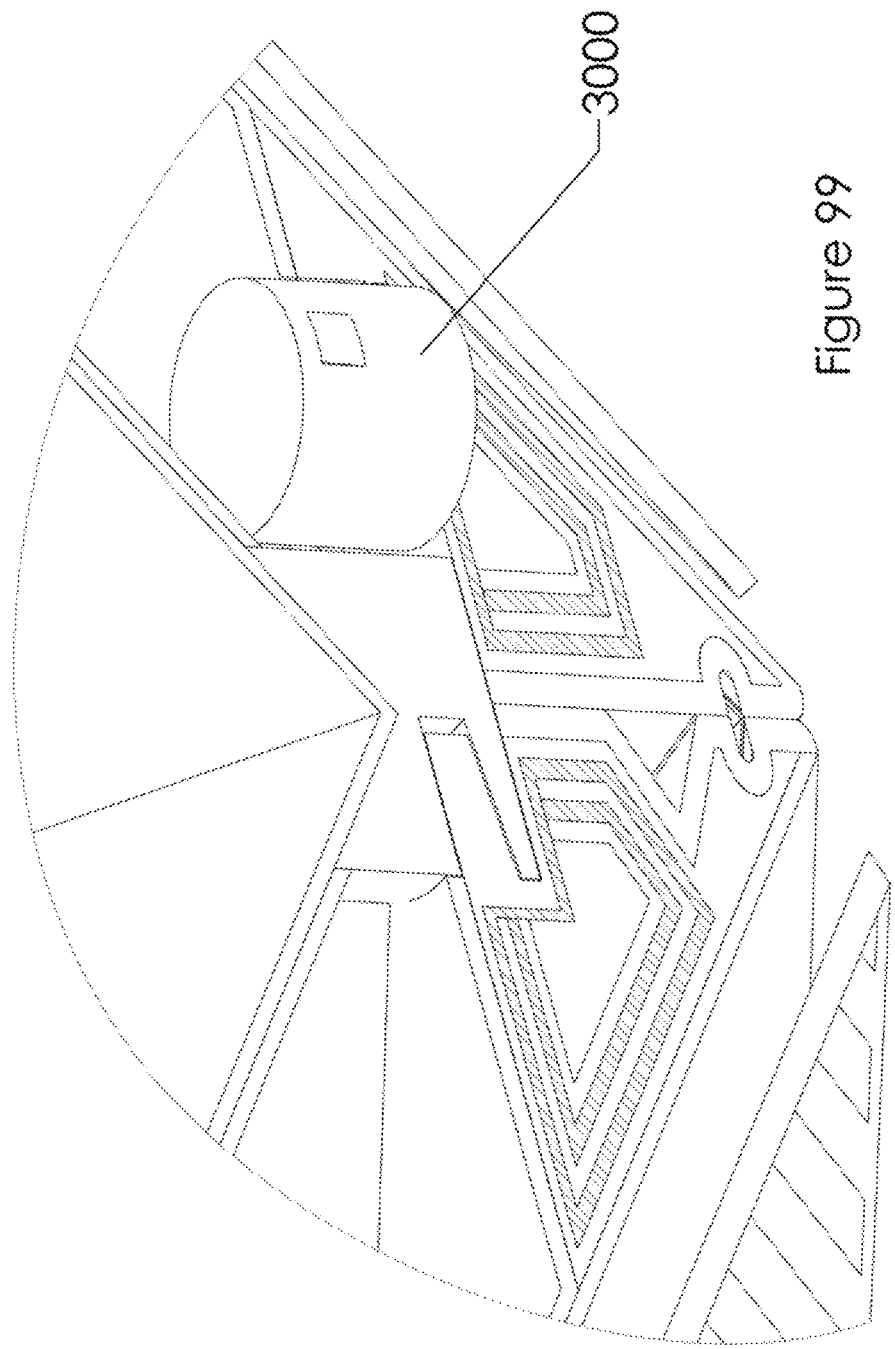
FIG. 99 shows a magnetic securing post locked in position.

FIG. 96 shows a cropped view of the cross section of an -A- and -B- junction 2510 and the insertion tool 3040 with a magnetic securing post 3000 loaded on it, ready to be inserted. FIG. 97 shows a similar view to FIG. 96, with the introduction of a small steel retaining disk 3070 used to hold the magnet in a steel recess 3080 in the post slot 510. FIG. 98 shows the small steel retaining disk 3070 bonded in the steel recess 3080. FIG. 99 shows a magnetic securing post 3000 locked in position with the South Pole 3030 of the locking magnet 3020 magnetically secured to the small steel retaining disk 3070.

Figure 100:
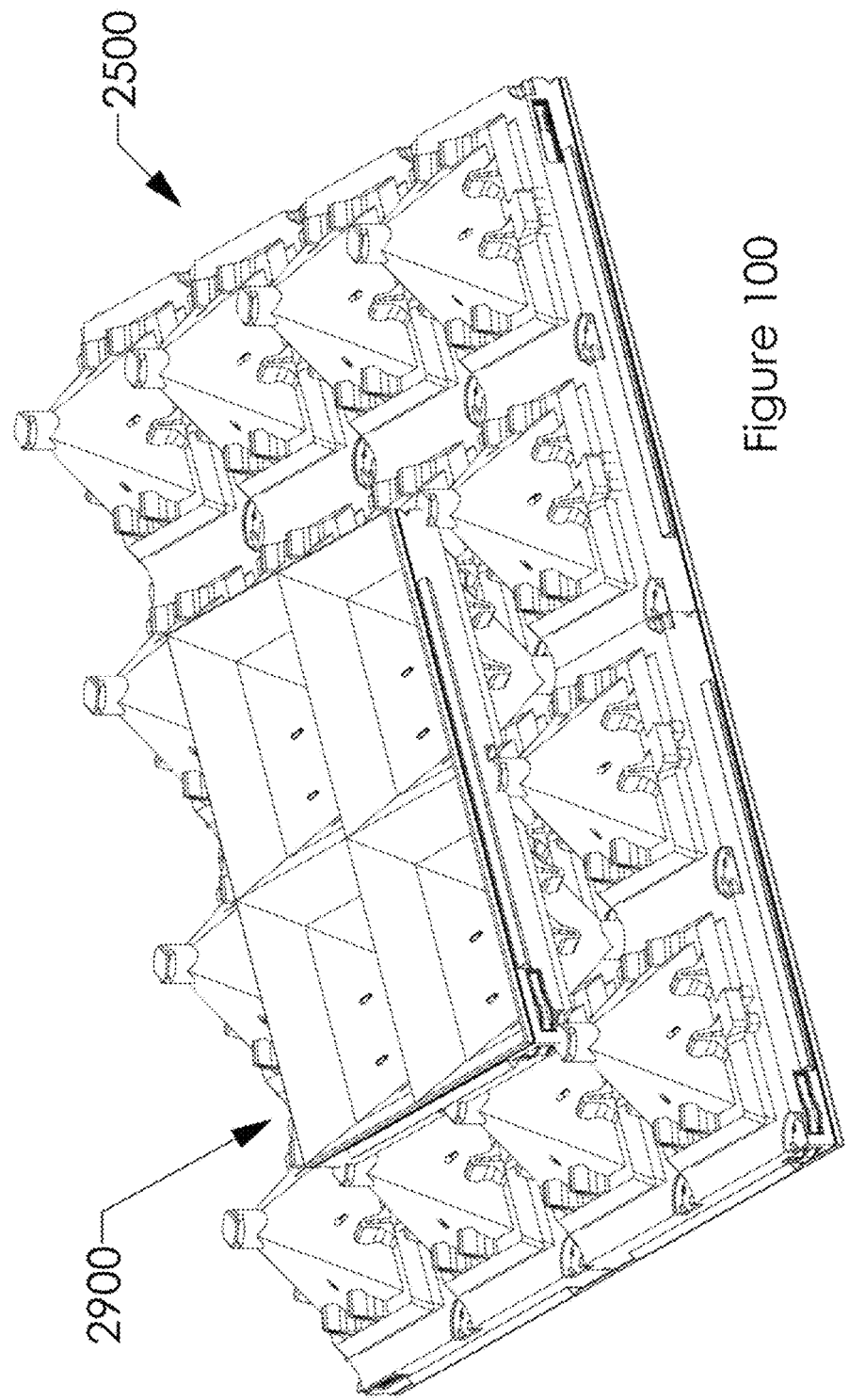
FIG. 100 shows a modular array locked with a sample structural backing.

FIG. 100 shows a modular array 2500 locked with a sample structural backing (here, a capacitor wall section 2900).

Figure 101:
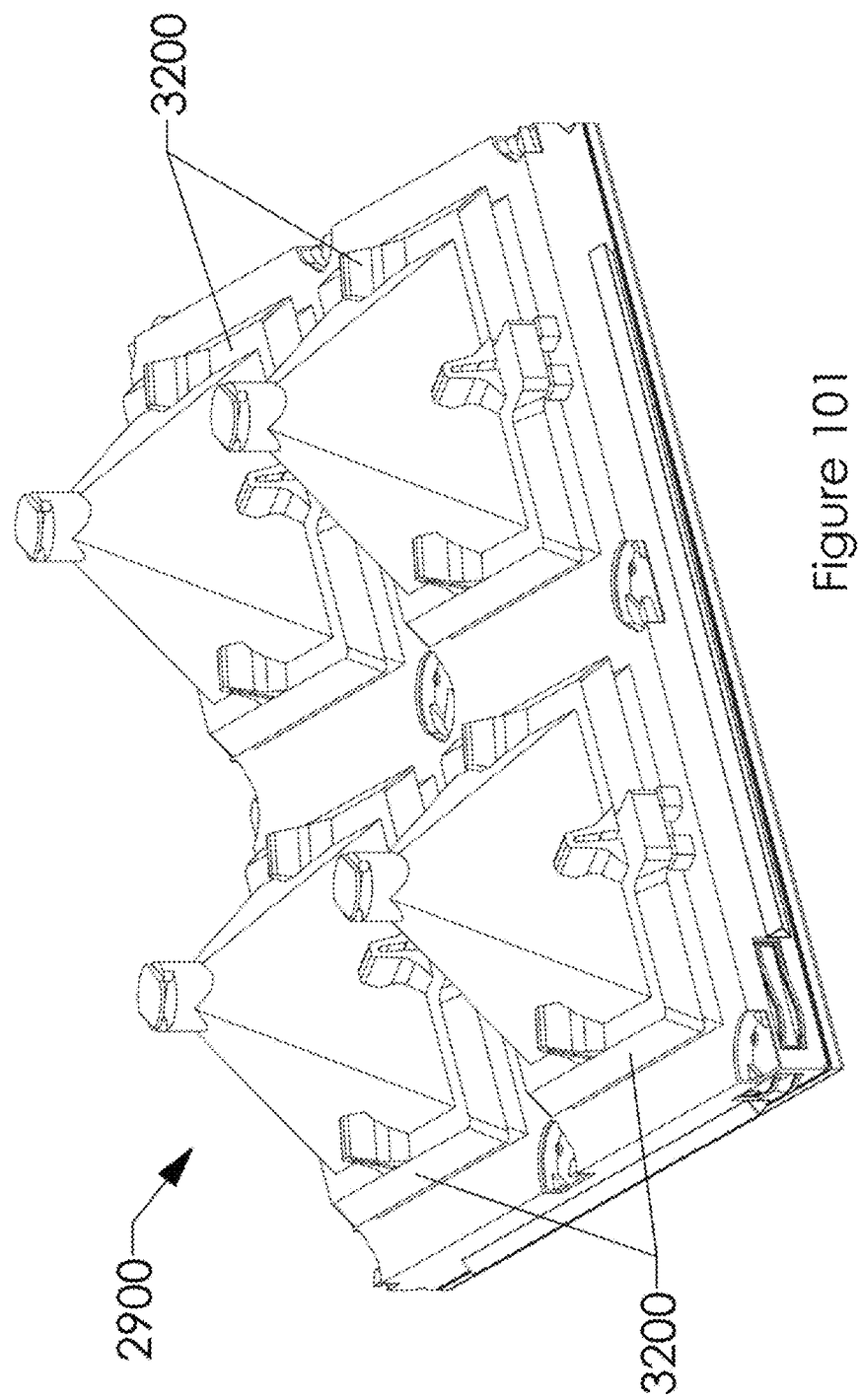
FIG. 101 shows a capacitor wall section.

FIG. 101 shows a complete (male) capacitor wall section 2900. The capacitor rack 3200 shown here is explained in FIG. 111.

Lithium-ion batteries charge and discharge electricity through a chemical reaction. Capacitors store energy via a static charge within a cell. In this non-limiting embodiment, the solar energy collected through the pyramid wall system will be stored in pyramid shaped capacitor cells 3100 as shown in detail in FIGS. 102-109. These cells, called "supercapacitors", "ultra-capacitors" or "double layer capacitors", are particularly suited to compliment battery technology.

These "supercapacitors" have a number of advantages over batteries including: a twenty year life span, lighter weight, 98% efficiency, ability to charge/discharge over a million cycles, use of non-toxic materials, won't overheat and ability to operate down to −40° C. However, conventional supercapacitors can only discharge over a range of seconds to minutes, which makes them ill-suited for applications where continuous power is needed. They cost approximately twenty times more than comparable lithium ion batteries and have about ⅓ of the storage capacity. This capacity is directly related to the surface area of electrodes in the capacitor. Accordingly, the electrodes are printed in a variety of dense patterns with superconductive material.

In one non-limiting embodiment, the capacitor cells 3100 will have electrodes formed into layers of a honeycomb lattice and with a base material of conductive thermoplastic. It is then coated with graphene, or equivalent nano-particles, to increase surface area and a superconductive gel electrolyte is introduced between the layers. This increased surface area increases the storage capacity. The gel electrolyte also increases energy density, extending discharge time to match that of batteries.

Conventional batteries have a high energy density allowing them to be used for applications where power is needed for several hours. But they can also take several hours to charge. Supercapacitors have a high power density, meaning they can charge and discharge in a fraction of seconds to minutes. This is useful when power is needed quickly (microseconds to minutes) to avoid data crashes during a blackout and/or in large amounts (regenerative braking for trains). Batteries are often used for applications that require long term discharge, but degrade significantly over time (limited to a few thousand charge/discharge cycles), especially under heavy load. By shifting load spikes to a supercapacitor, the life of the battery can be extended. In another non-limiting embodiment, lithium-ion batteries can be introduced into the pyramid cells to alternate with the capacitors.

FIG. 102 shows the cathode contact side of a capacitor cell 3100. Four of these cells 3100 can be put into a capacitor wall section 2900.

Figure 103A:
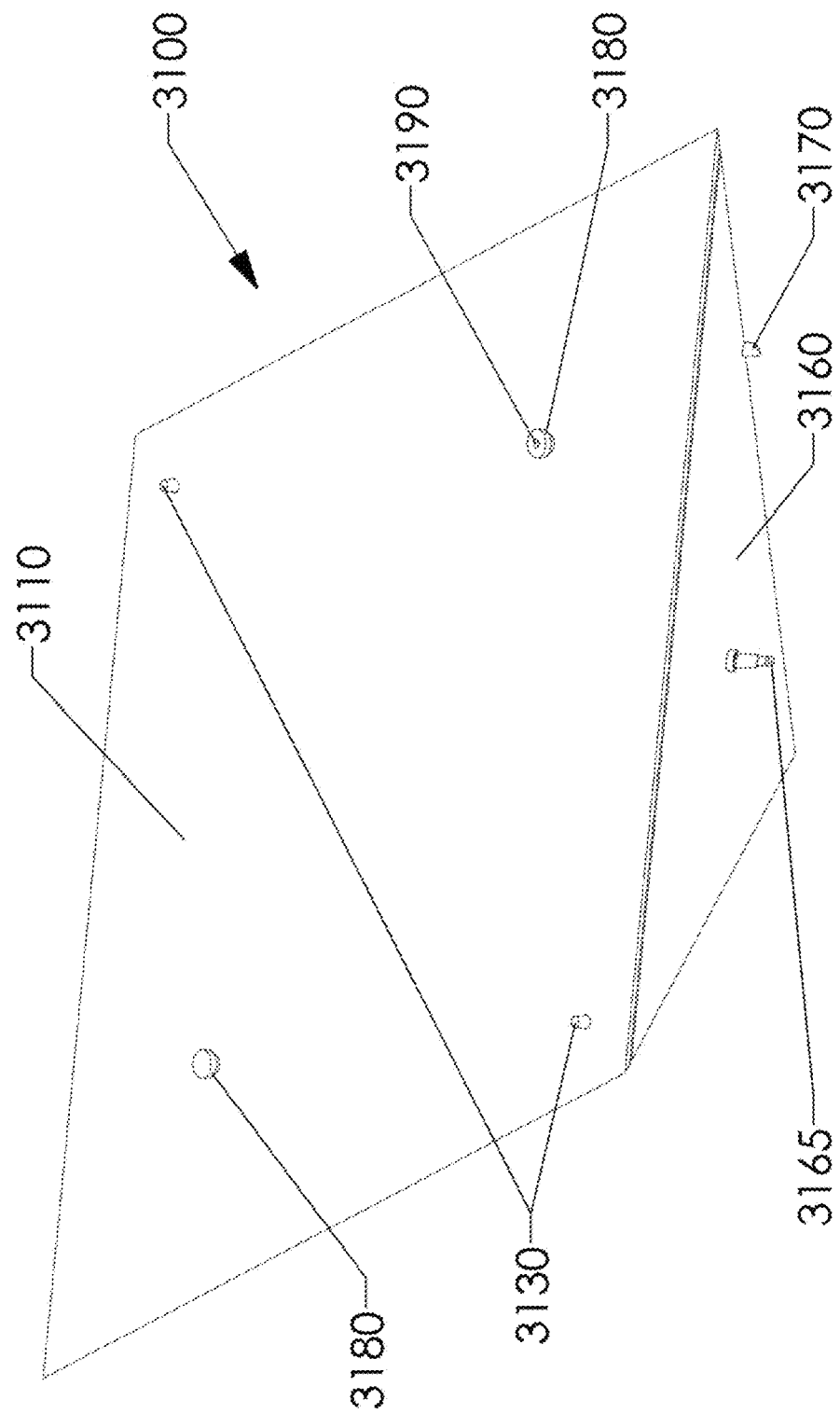
FIG. 103A shows the anode contact side of a capacitor cell.
Figure 103B:
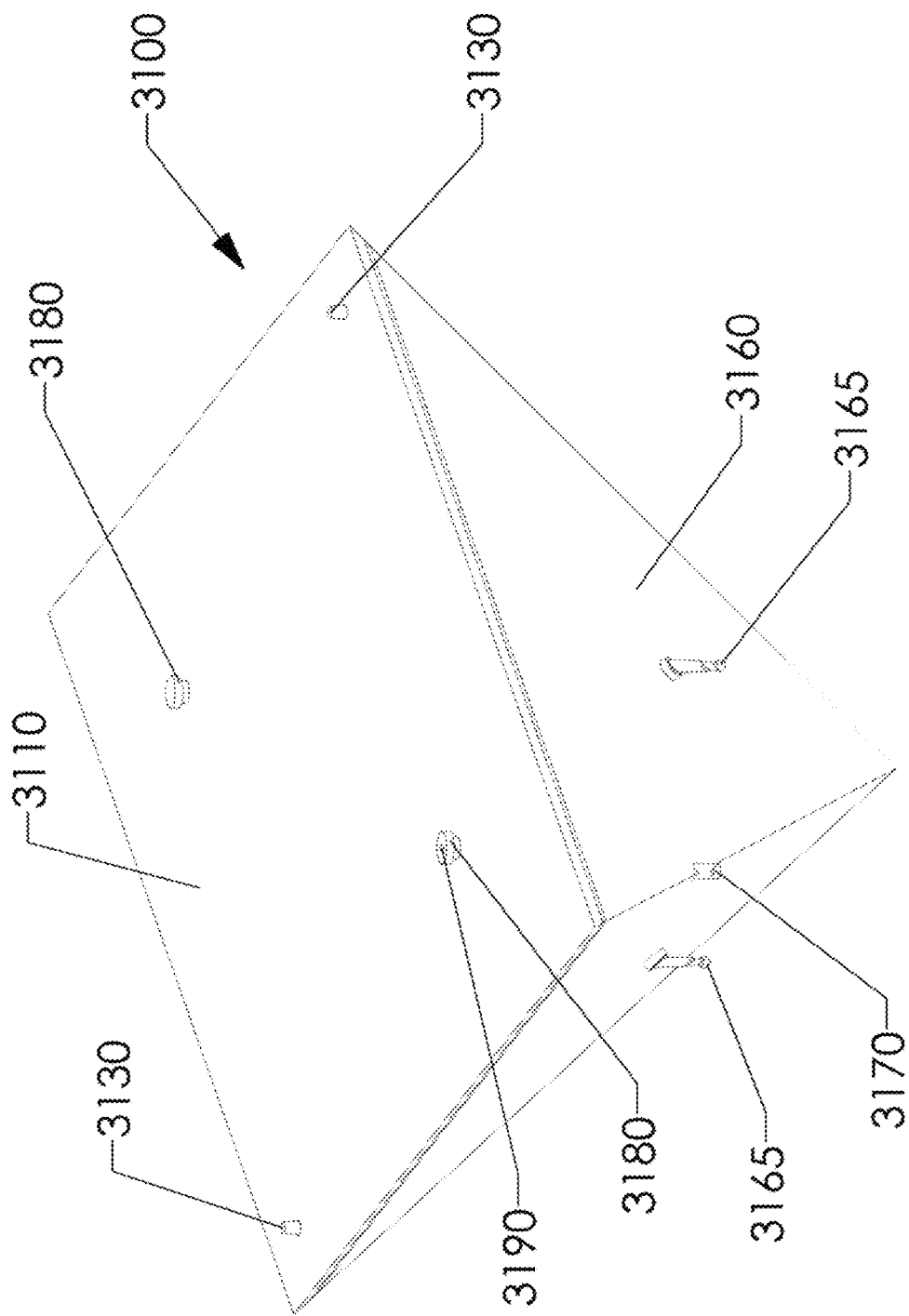
FIG. 103B shows a rotated capacitor cell.

FIG. 103A shows the anode contact side of the capacitor cell 3100. Shown are: the capacitor insulated cover 3110, the two anode conductive posts 3130, one of the four bulbous bosses 3165 that protrude from the capacitor cell casing 3160 to lock in a capacitor rack 3200 (see FIG. 110), one of the two cathode conductive posts 3170, the two capacitor cover handles 3180 and an LED socket 3190. The capacitor handles 3180 may be used to remove a damaged cell, whose status can be determined by viewing an LED through a port hole in one of the handles 3180 that leads to the LED socket 3190. FIG. 103B shows a capacitor cell 3200 rotated to be sectioned in subsequent views and highlighting the same features as FIG. 103A with the inclusion of one more bulbous boss 3165.

Figure 104A:
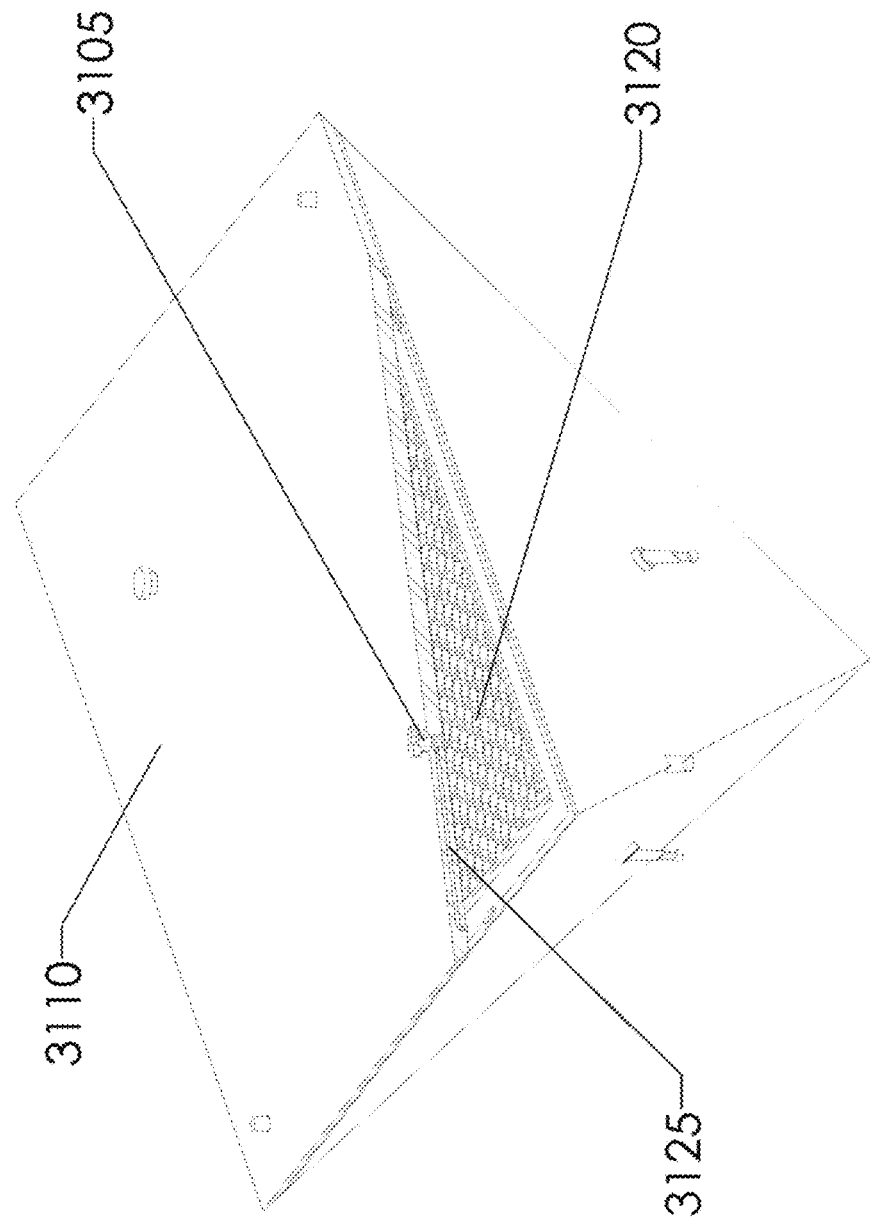
FIG. 104A shows an insulated cover sectioned to reveal a honeycomb anode, an LED and a cathode LED channel.

FIG. 104A shows an insulated cover 3110 sectioned to reveal a honeycomb anode 3120, an LED 3105 and a cathode LED channel 3125. In one non-limiting embodiment this channel 3125 is made by the insulated cover 3110 overmolding an LED lead with insulative, thermoplastic resin. In another no-limiting embodiment, the insulated cover 3110 is 3D printed with a similar material, the printing paused, a wire inserted and the process resumed. In another non-limiting embodiment, the channel 3125 is hollow and coated (or printed) with graphene or another conductive nano-particle material.

Figure 104B:
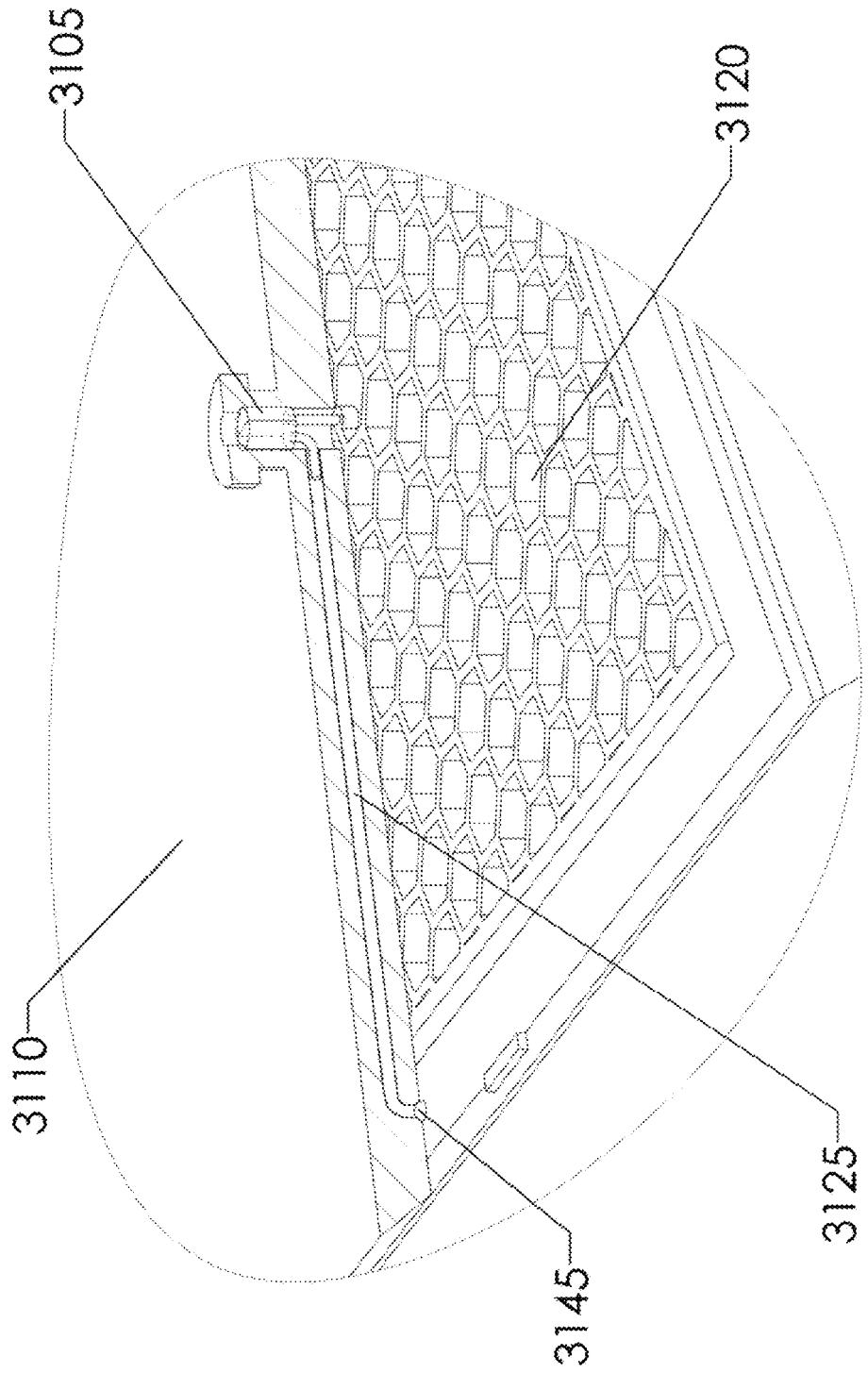
FIG. 104B is a cropped, close-up view of the sectioned, insulated cover.

FIG. 104B is a cropped detail of FIG. 104A and highlights the LED 3105, cathode LED channel 3125 and the cathode channel boss 3145 which protrudes near the edge of a honeycomb cathode 3150 and connects to the cathode LED channel 3125. The honeycomb cathode 3150 is shown in FIGS. 107A-107F.

FIG. 104C shows an exploded view of a capacitor cell 3100, with the insulated cover 3110, honeycomb anode 3120 and LED 3105 removed. The capacitor cell casing 3160 and honeycomb cathode 3150 are in place.

Figure 104D:
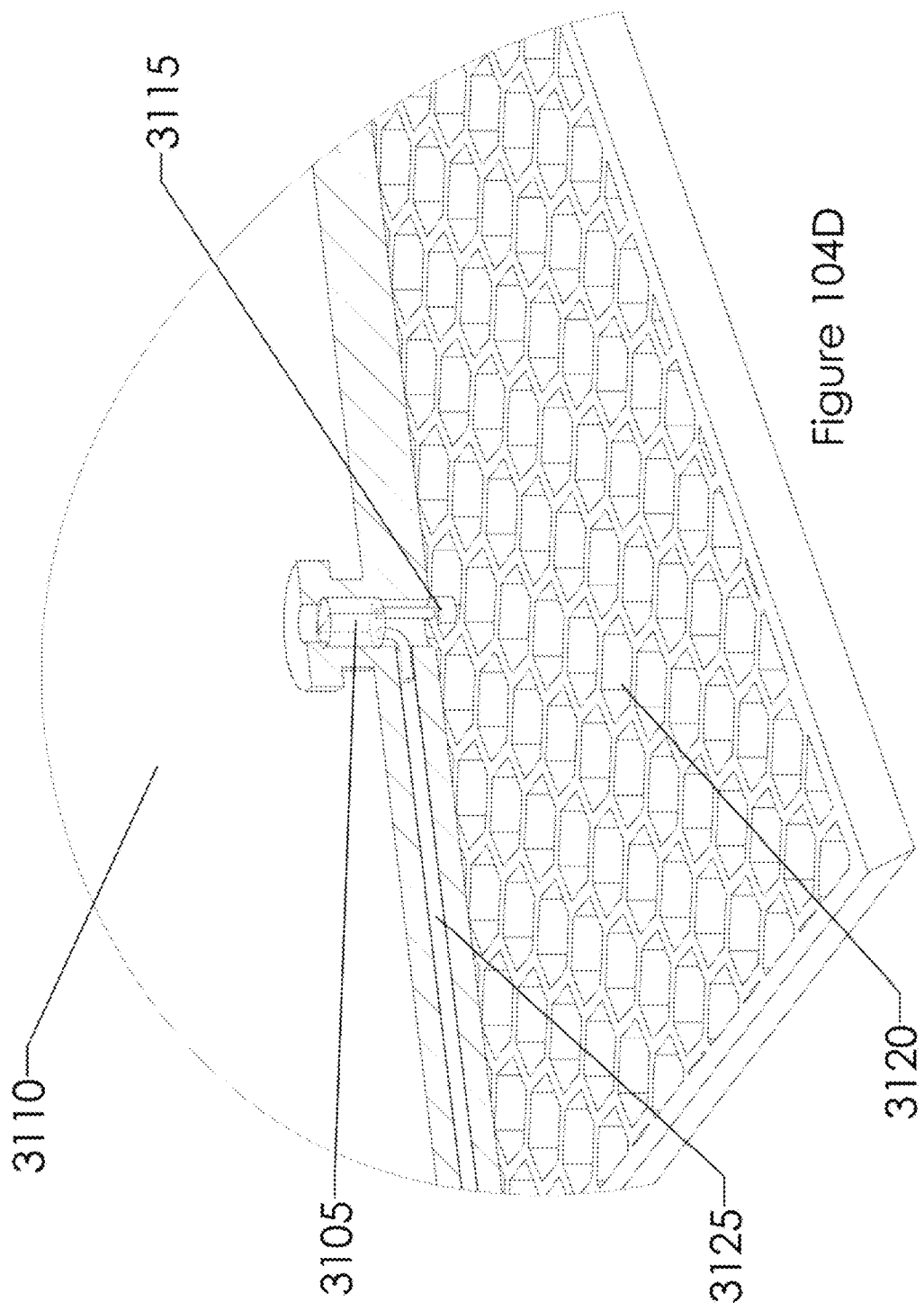
FIG. 104D shows a cropped, detailed area of a section of the insulated cover and honeycomb anode.

FIG. 104D shows a cropped, detailed area of a section of an insulated cover 3110 and a honeycomb anode 3120. The sectioned area exposes an LED 3105, cathode LED channel 3125 and the LED contact cavity 3115 that is formed into the honeycomb anode 3120 to house the positive lead of the LED 3105.

Figure 104E:
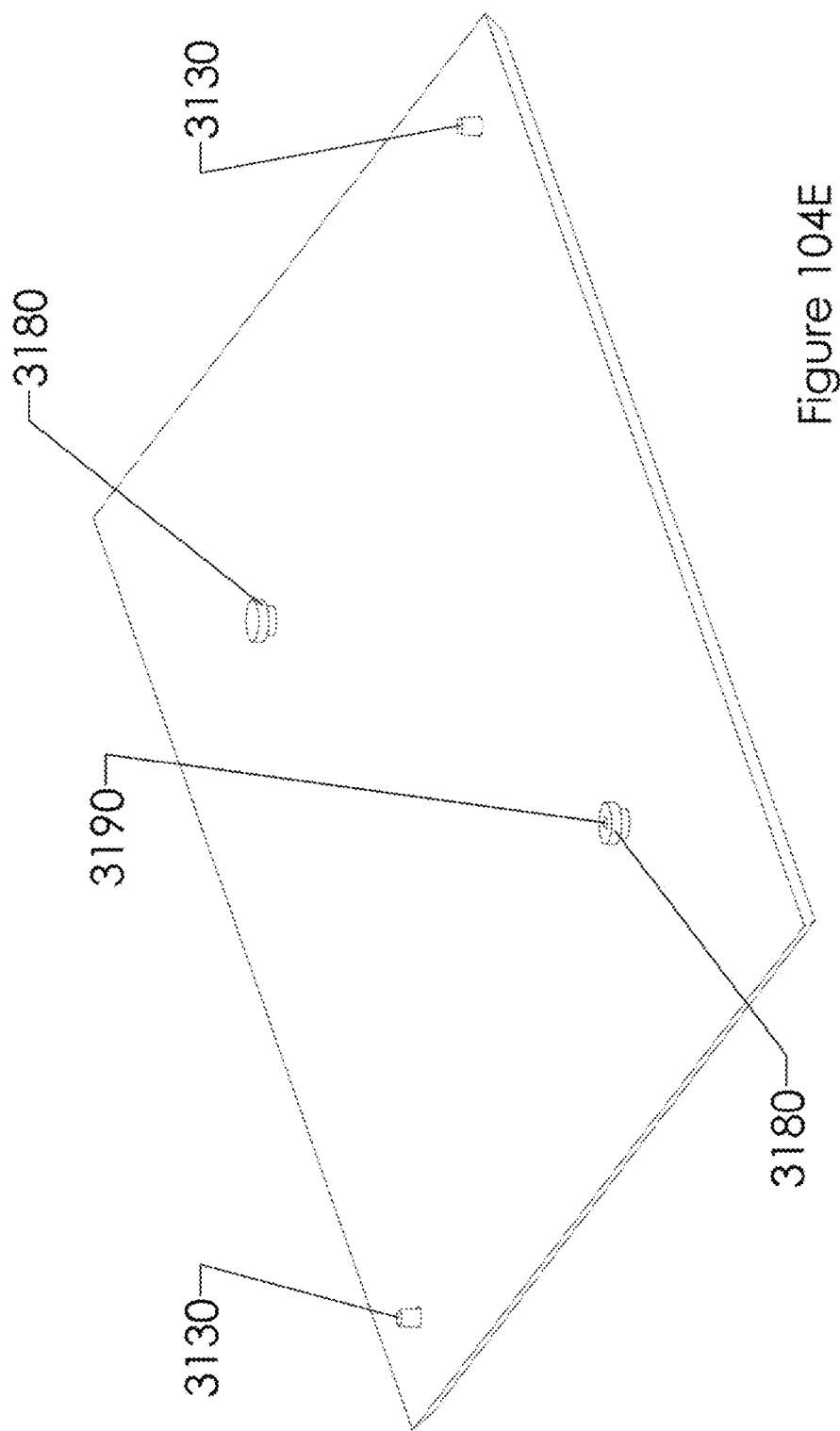
FIG. 104E shows the insulated cover with the anode conductive posts showing through the capacitor cover holes.

FIG. 104E shows the insulated cover 3110 joined with a honeycomb anode 3120, with the anode conductive posts 3130 showing through the capacitor cover holes 3140 (shown in FIG. 105A).

Figure 105B:
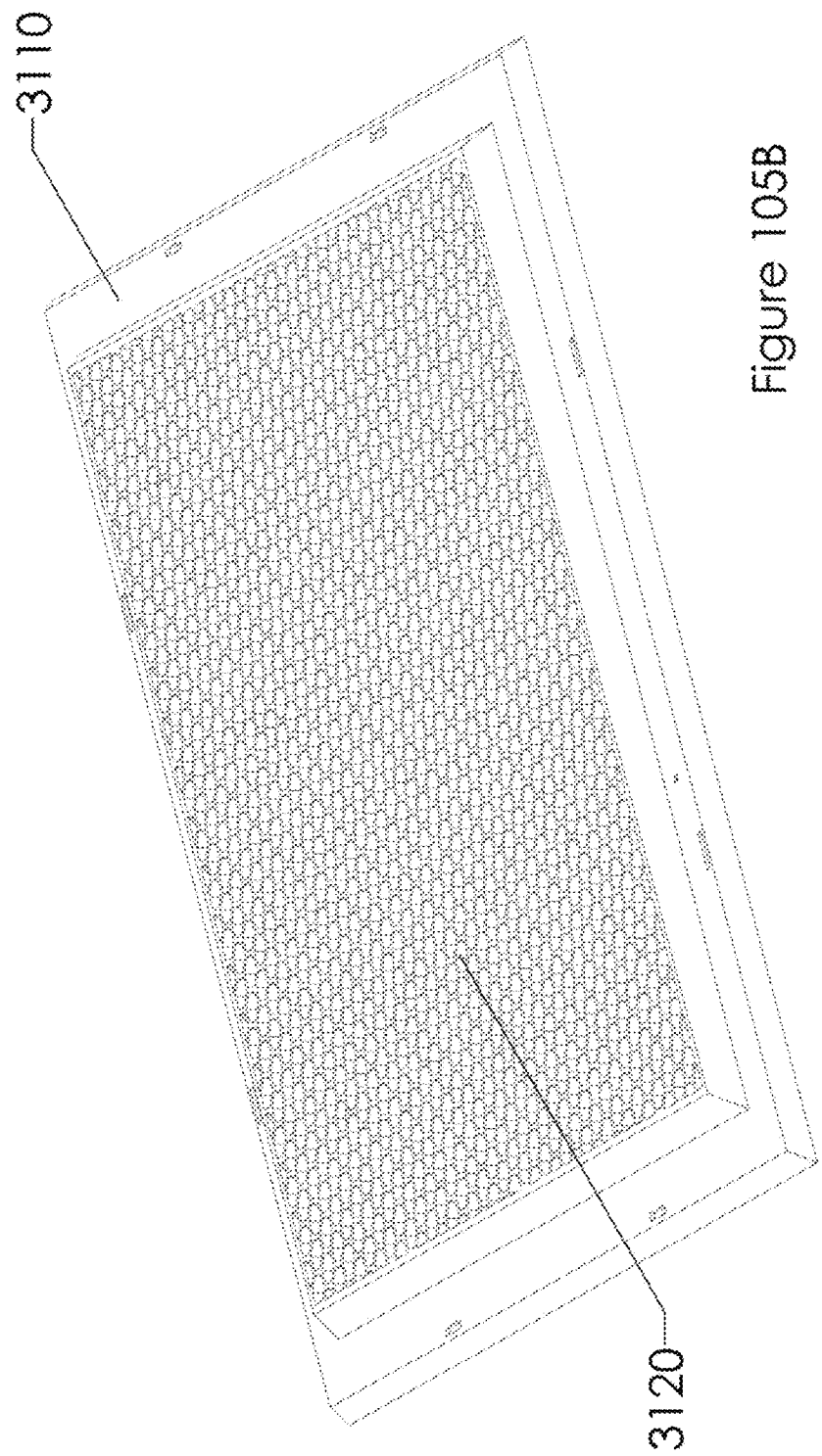
FIG. 105A shows an insulated cover separated from a honeycomb anode.

FIG. 105A shows the insulated cover 3110 separated from a honeycomb anode 3120 with the anode conductive posts 3130 and capacitor cover holes 3140 highlighted. FIG. 105B shows the reverse side of the insulated cover 3110 joined with the honeycomb anode 3120. These two components 3110, 3120 are secured together, as detailed in FIG. 105D-105F.

FIG. 105C is a section view of FIG. 105B, revealing the LED 3105 and the cathode LED channel 3125.

Figure 105D:
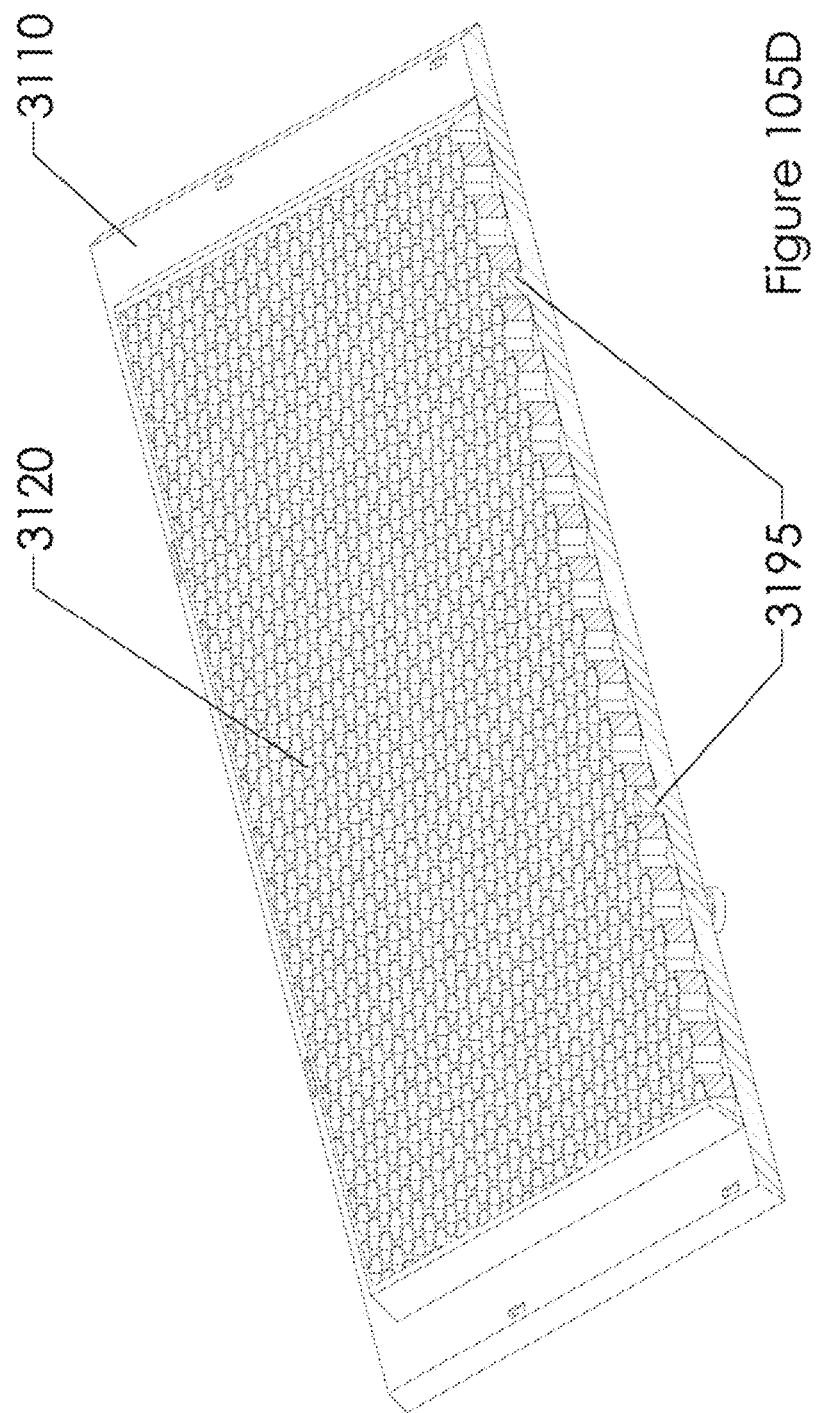
Figure 105E:
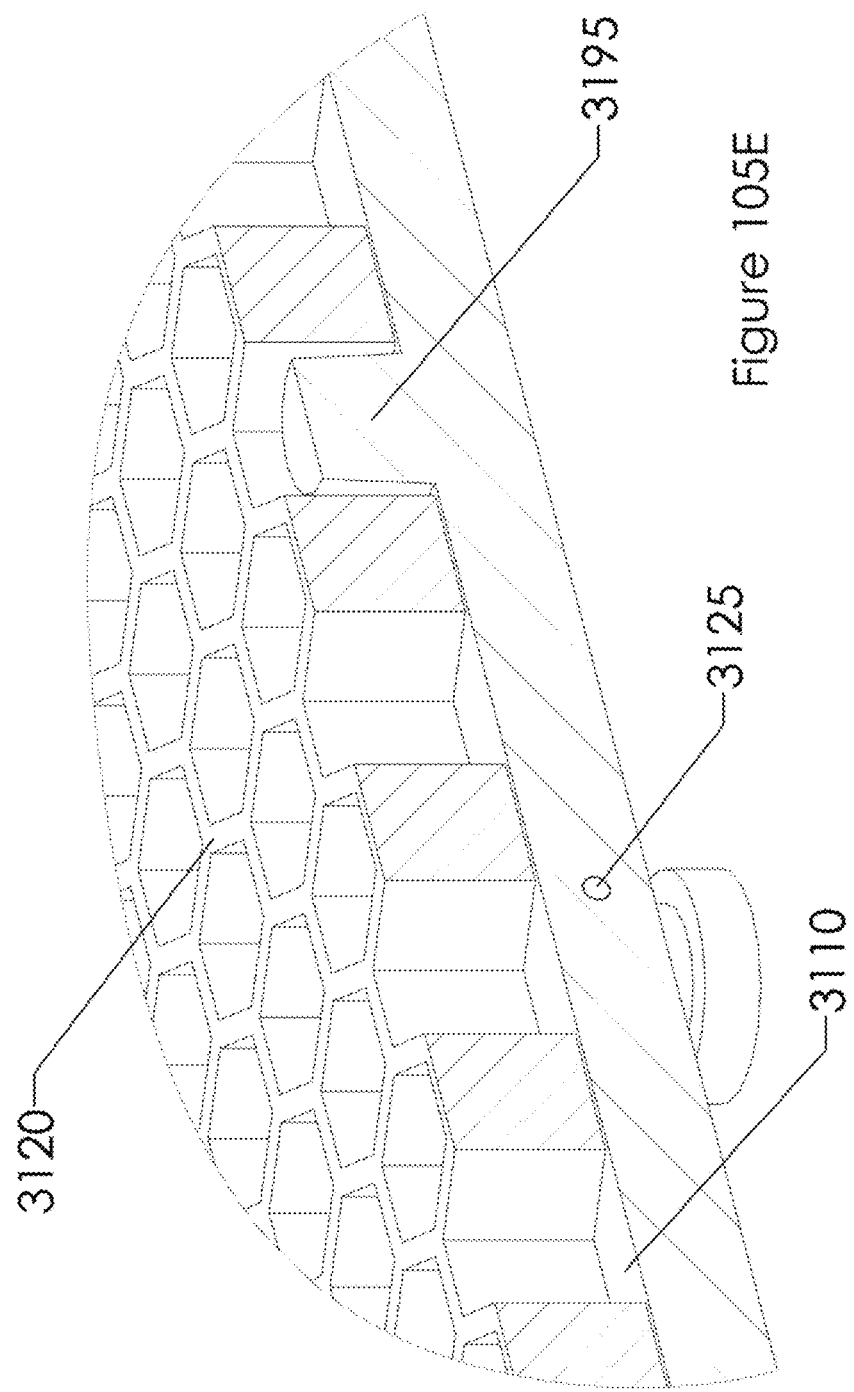

FIG. 105D is a section view of FIG. 105B, revealing tapered cover bosses 3195 on the insulated cover 3110. These bosses 3195 secure the anode 3120 and prevent the anode 3120 from touching a cathode 3150 by press fitting inside of the honeycomb spaces. FIG. 105E is a cropped detail view of FIG. 105D that shows one covered boss 3195 and a section view of the cathode LED channel 3125, normal to its axis.

FIG. 105F shows the honeycomb anode 3120 separated from the tapered cover bosses 3195 on the insulated cover

3110. Also shown are the tab slots 3175 in the cover 3110 that are used to hold the tabs 3185 (shown in FIG. 107A) on a capacitor cell casing 3160 when they are bonded together. FIG. 105G is similar to FIG. 105F and shows the addition of an LED 3105 in the exploded view. FIG. 106 shows a close-up view of the indicator LED 3105.

FIG. 107A shows the capacitor cell casing 3160 and the honeycomb cathode 3150 together, as well as casing tabs 3185 to be inserted in tab slots 3175 on the insulated cover 3110. The pyramid shape of the casing 3160 has the same 3D "footprint" as a solar panel module 2000 allowing a consistent modular design between these two types of wall sections.

FIG. 107B shows the capacitor cell casing 3160 and the honeycomb cathode 3150 separated, with one (of two) cathode conductive posts 3170 visible, as well as both casing holes 3135 for those posts 3170 and two bulbous bosses 3165. These bosses 3165 have the same shape as the conductive tip 1810 on the solar panels 1800; the bosses 3165 provide a locking feature to secure the capacitor rack 3200 and carry no current. FIG. 107C shows a cropped detail of a cathode conductive post 3170.

FIG. 107D shows an assembled capacitor cell 3100 with a sectioned insulated cover 3110. Highlighted are an anode 3120, the outside edge of a cathode 3150, a cell casing 3160 a cathode LED channel 3125, an LED 3105 and a cathode channel boss 3145 to connect to the end of the channel 3125.

FIG. 107E shows a cropped detail of FIG. 107D highlighting the cathode LED channel 3125 and a cathode channel boss 3145. FIG. 107F is similar to FIG. 107E with the insulated cover 3110 raised slightly to show a cathode channel boss 3145.

FIG. 108A shows a cropped detail of the top of the capacitor cell 3100 with the insulated cover 3110 sectioned across a tab slot 3175 and raised slightly above a casing tab 3185 to show its orientation before it is bonded in place. FIG. 108B shows a view similar to FIG. 108A with the insulated cover 3110 bonded in place with the tab slot 3175 and casing tab 3185 in relative position.

FIG. 109 shows an exploded view of the components in the capacitor cell 3100 including: the capacitor cell casing 3160, honeycomb cathode 3150, honeycomb anode 3120, indicator LEDs 3105 and capacitor insulated cover 3110.

FIG. 110 shows a capacitor rack 3200 removed from a complete (male) capacitor wall section 2900.

FIG. 111 shows the capacitor rack 3200 in isolation. The capacitor rack 3200 has a similar construction to the connection rack 2100 except that there are four (4) bosses, instead of eight (8), which serve to provide a detent snap fit against bulbous bosses 3250 in the capacitor cell casing 3160. FIG. 112 shows a capacitor rack circuit 3205 with input lead 3210 and output lead 3220 to the frame. The capacitor rack circuit 3205 is embodied within the capacitor rack 3200. FIG. 113 shows a circuit contact 3230 to the cathode.

FIG. 114 shows a hatch on the tip of a cathode connection post 3170 as a circuit contact 3230 is in position. FIG. 115 shows a detail of cathode connection post 3170 and a cutaway of the capacitor rack 3200 showing the bulbous boss 3165 in the capacitor cell casing 3160. When the capacitor rack 3200 is in place, the cathode connection post 3170 aligns and makes contact with the circuit contact 3230.

Electrical conduits within the U-shaped, three (3) sided base 3410 or its top cover 4400 can connect a solar panel wall 3300 with a capacitor wall 3500. These conduits can have bypass and blocking diodes to prevent a back-flow of electrical current from the capacitors 3100 to the solar panels 1800. In one non-limiting embodiment, detent/snap fit connection methods (similar to those seen in FIGS. 61-63) provide electrical connection between wall sections through the base 3410 and/or cover 4400. They can be connected in parallel to allow continuous electricity in case a section of wall is damaged. In a further non-limiting embodiment, plug outlets can be provided in order to draw power from sub-sections of the panels. In another non-limiting embodiment, a single outlet is used per wall.

FIG. 116 shows an example of a solar panel wall 3300 in a pyramid wall frame 3400. In addition to V shaped bosses 520 and grooves 530 that hold the sections together laterally, dowel pins can be put through these V joints normal to the connection rack side to prevent collapse when a force is applied normal to the face of the wall 3300. In the configuration shown here, there is one full modular array 2500, four male solar panel sections 2300, one half female sections (right side) 3700, one half female section 3800 (left side), one half female section (top) 3900 and one half female section (bottom) 4000.

FIG. 117 shows the backside of a pyramid wall frame 3400. Here, a capacitor wall 3500 compliments the solar panel wall side with capacitor shields 4300 covering the face of every panel and half section.

FIG. 118 shows the U-shaped, three (3) sided base 3410 of the pyramid wall frame 3400. FIG. 119 shows pyramid frame corners 3420 added to the frame as a cosmetic shield to missing quarter panels.

FIG. 120 shows two top half female sections 3900 inserted at the bottom of the frame 3400. FIG. 121 shows one male side -A- wall section 2900 added in the center and two female side -B- wall sections 2400 on either side of it. FIG. 122 shows one half female sections (right side) 3700 and one half female section 3800 (left side) added to either side. FIG. 123 shows the remainder of sections added: two female side -B- wall sections 2400, three male side -A- wall sections 2900 and two half female sections (bottom) 4000.

FIG. 124 shows the capacitor wall 4100 in place. FIG. 125 shows the frame cover 4200 ready to be put in place.

FIG. 126A shows a capacitor shield 4300 ready to position in place. FIG. 126B shows maintenance handles 4310 with a transparent window 4320 to see power outage signals on the indicator LEDs 3105. FIG. 127 shows the capacitor shields 4300 in place with one removed for clarity.

FIG. 128 shows the opposite side of the pyramid wall frame 3400, exposing the connector side of the capacitor wall 4100. FIG. 129 shows a frame cover 4200 added to the bottom.

FIG. 130 shows the solar panel wall 3300 to be added to the assembly 4100. FIG. 131 shows pyramid frame corners 3420 to be added to the frame. FIG. 132 shows the top cover 4400 to be added in order to complete the top and seal the pyramid wall frame 3400.

Various embodiments of the Pyramid Wall System use an array of pyramid shaped cavities which contain elements to collect and store solar energy. The base of these pyramids may be regular or irregular polygons and the number of sides are unrestricted. Reflectivity among the panels maintains the same power output as if they were laid flat. This allows for installations where the surface area is restricted. The angle of each side with respect to the base of the pyramid can range between 5° and 85° in the Pyramid Wall System.

The combined area of the sides of any pyramid with a polygon base is always greater than the area of the base. As the angle between the sides and the base becomes greater or steeper, so does the difference in area. However, there are tradeoffs between panels arranged to form shallow and steep angled pyramids. The steeper the angle, the lesser the footprint and the greater the internal reflectivity, but the more sensitive the system is to tracking (needing overhead light for maximum efficiency). The shallower the angle, the greater the footprint and the lesser the internal reflectivity, but the less sensitive the system is to tracking.

FIG. 133 has images of a moderately angled pyramid with a rhombus or diamond shaped base. The first is a section view showing the angle of its sides. Next is area of its base or foot print. At the bottom is the area of its sides.

The Pyramid Wall System has balanced this trade off with a rhombus (diamond) shaped base and sides to form compound angles as shown in FIG. 133. It is 33.6° from the long diagonal to horizontal. The increased surface of sides 4520 to base 4500 is 62.2%, allowing a 38% reduction in footprint 4510, while maintaining the same power output. This reduced footprint 4510 can accommodate irregular sides, angles or obstructions in wall or roof designs such as windows, chimneys, vents or outlets. Conversely, this configuration of the Pyramid Wall System will allow a 62% increase in power over a comparable flat panel system covering the same footprint 4510.

The Pyramid Wall System is not limited to the geometry described in FIG. 133. Alternate configurations allow shallower angles; as low as 5° from horizontal 4550, for setups where there are height restrictions or other requirements of geometry as shown in FIG. 134. The surface area increases over footprint 4540 in this configuration 4530 is marginal (1.4%), but does not use tracking. Also, it is more adaptable to conventional panel setups.

Other configurations allow steeper angles; as high as 85° from horizontal 4580, for setups where there is a restriction in mounting surface area. The surface area increase over footprint 4570 in this configuration 4560 is 2,100% as shown in FIG. 135. Arrays of these sharp pyramid configurations can be applied where footprint area is highly restrictive, vertical space is not an issue and a tightly controlled tracking system is in place.

In other, non-limiting configurations of this system a steeper side angle with a square base may be used, giving a surface area increase of 149%. Such configurations have the same triangular shaped panels 4520 as in FIG. 133, with the short sides forming a square shaped perimeter at the open footprint of the pyramid. Such as system would benefit more from tracking.

In further, non-limiting embodiments, the pyramid sides may be uneven. Sections that have restricted access to sunlight may have sides of extended or retracted length to best capture incident light. Arrays may combine inverted pyramids of equal and unequal size.

FIG. 136 shows two examples. The first embodiment 4585 is symmetrical along the X-axis, but sides 4586 and 4587 have unequal surface areas. The other embodiment 4590 is symmetrical along the Y-axis, but sides 4591 and 4592 have unequal surface areas.

Both embodiments 4585, 4590 have the same area and geometry of footprint 4510 (also shown in FIG. 133) and a comparable increase in surface area among their sides 4586, 4587, 4591 and 4592. Embodiment 4585 has an increase of 59.8% and embodiment 4590 has an increase of 60.6%. Asymmetry is not restricted to a single axis; sides may be unequal along both X and Y axis. The footprint geometry is not limited to a set number of sides, nor are side lengths limited to being equal.

Inverted pyramids have their sides spaced away from building surfaces, as shown in FIG. 137, allowing natural air flow 4595 to cool cells, increasing efficiency as heat is reduced.

Internal reflectivity 4596 is shown as a schematic representation in FIG. 137. This reflectivity among panels allows them to be arranged in a smaller footprint while maintaining the same, or comparable power output. A sphere is added to the top inverted pyramid cavity to demonstrate the orientation of the geometry; that it is indeed a set of 4 inverted pyramids. In Northern climates, panels can have solar cells on both sides, taking advantage of the reflectivity of snow. Single sided panels can also show an increase in power. In coastal climates single and dual sided panels can take advantage of the reflectivity of water. The Pyramid Wall System is not limited by the number of inverted pyramid "cells" or "modules". It can be as small as one or extended indefinitely. The Pyramid Wall cells or modules are scalable.

While conventional solar panels can be used in the Pyramid Wall System, it is not limited to existing photovoltaic technology or materials. Panels may be introduced into the inverted pyramid spaces in a variety of ways. In some non-limiting embodiments:

Solar Panels may be assembled flat and hinged, creating a cross shaped pattern bonded or snap fit to the inside faces of pyramids.

Solar panels may be flexible, formed as a cross shaped flat pattern and "4D" folded into a pyramid shape to be bonded or fit to the inside faces of pyramids.

Flexible solar panels may be in a cross shaped flat pattern and "4D" folded into a pyramid shape.

Solar panels may be single sided or bifacial and made with conventional manufacturing methods or through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, this may include a process which cures SLA resin with oxygen and UV light increases print speed up 25× to 100×. This ultrafast additive method is geared toward full production. They may be transparent in the visible spectrum and made of inorganic materials such as perovskite or organic salts. They may use graphene or equivalent superconductive material to create transparent nanowires to form transparent contacts throughout and along the edges. They may use graphene or equivalent superconductive material to coat conventional electrical contacts, which may be opaque. In the latter case, the density of the contact pattern throughout the panel and coverage along the edges may be affected. Panel contacts may be arranged in a dense geometric pattern such as (but not limited to) a honeycomb shape, to increase contact surface area and efficiency. The panels and its contacts may be made through chemical etching, laser etching, with other conventional manufacturing methods, 3D printed with conductive material or with any combination thereof.

Solar panels may be secured in a mounting post which will allow a conductive path through a central location. Mounting post wiring layers may contain embedded/over-molded wires. They may house molded, machined or 3D printed channels or conduits with inserted leads to create the wiring layers. The layers may have 3D printed conductive leads. The channels or conduits in the mounting posts may be sprayed or electroplated with conductive material or superconductive material such as graphene or equivalent. They may be coated with conductive or superconductive gel.

Wiring layers may be produced with any combination described herein and stacked for multiple sets of panels. The mounting post body may be extended with slots added to allow for the stacking of multiple panel arrays. Panels transparent to visible light (or specific wavelengths) may be stacked within the pyramid space, each layer positioned to absorb a specified range of wavelengths. Panel layers may be flat and parallel to each other or flat and independently oriented/angled/positioned to each other. Panel layers may be curved to form any geometric or non-geometric shape. They may be concentrically nested or independently oriented/angled/positioned to each other. They may be staggered and offset, like the petals of a rose. If panels have opaque edge contacts, they may only extend part way along the sides and avoid the top so as not to obscure panels underneath. Otherwise, transparent contacts may be used along the perimeter of the panel.

Panels may have a transparent outer surface that functions as any type of conventional simple lens, lenticular lens or Fresnel lens. These lenses may be of a variety of shapes and have a variety of purposes including focusing, defocusing and redirecting light. FIG. 69 shows a wave shaped solar panel 1800. FIG. 69 also highlights a sample area of this panel 1840. In one non-limiting embodiment, FIG. 70 details this sampled area and shows a solar cell cover with gradient wave patterned, refraction steps.

Panel surfaces may have specific areas coated with anti-reflective and/or polarizing compounds.

The inside faces of the pyramids may be coated (or lined) with electroluminescent paint, electroluminescent tape, or light-emitting diodes (LED)s. LEDs may be individual components in an array, in a ribbon or in a sheet. This allows for nighttime use if transparent/semi-transparent cells are used. These lighted faces enable self-sustaining light by drawing power through an inverter connected to electrical storage such as supercapacitors and/or batteries in the Pyramid Wall modules.

In one non-limiting embodiment FIG. 138, a hinged, cross shaped panel assembly 4600 is shown in an exploded view. Four triangular shaped panels 4610 are laid flat. At the smallest inside edge of each these panels is a hinge 4620 bonded in place. At the bottom center of the assembly is a mounting post hub 4630 which has the bottom portion of a cavity to hold the hinges in position and allow a mounting screw 4640 to secure the panel assembly into the inverted pyramid space. A mounting post body 4650 has the top portion of a cavity to secure the hinges in position, allowing it to rotate with one degree of freedom. It may be bonded into the hub 4630.

FIG. 139 highlights slots 4660 in the mounting post body 4650. Additional panels 4570 are positioned to slide into place. In FIG. 140, a mounting post body 4650 is shown surrounded with exploded components. This body 4650 has several purposes: it connects all of the panels 4610, 4670 to a central location, houses the internal wiring and provides a countersink to fasten a panel assembly 4600 into an inverted pyramid cavity.

Below the mounting post body 4650 is the mounting hub 4530, which will be positioned in the inverted pyramid cavity. External leads 4680 protrude from body 4650 just above the hub 4530. A mounting screw 4640 is just above the body 4650 and a protective access cap 4655 with snap fits 4656 is just over the screw. In one non-limiting embodiment, the protective access cap 4655 may have a generally pyramid shape and a reflective coating to reflect light back to the solar panels 4610, 4670.

FIG. 141 shows a section view of a mounting post, partly exploded components and detail of features. This includes the mounting hub 4630, the mounting post body 4650 (its internal wiring hidden for clarity), the protective access cap 4655, the snap fits 4656 in the cap 4655, the snap fit sockets 4657 in the mounting post body 4650 and the slots 4660 for the second array of panels 4670. The mounting post body 4650 may be extended with additional slots 4660 added to allow for the stacking of multiple panel arrays 4670.

In this non-limiting embodiment, FIG. 142 shows a transparent panel 4610 with a section view of its hinge 4620 and FIG. 143 highlights a section view of the hinge 4620. The negative contact on a lead 4621 can connect to a socket in a mounting post body 4650, a positive contact on a lead 4622 can go into the body of the hinge 4620 and a positive lead contact 4623 connects to a panel lead.

FIG. 144 shows a detail of a cropped cross section, where a panel 4610 and its hinge 4620 are connected and positioned horizontally; its positive lead 4622 is inside a cavity in a mounting post body 4650. A second panel 4670 is also in position in the cavity in the mounting post body 4650, while two leads 4680 from the internal wiring are exposed. A mounting hub 4630 is ready to be put in place.

FIG. 145 shows a detail of a cropped cross section where panel 4610 and hinge 4620 are folded into position. Positive contact on lead 4622 and second panel 4670 are shown for reference and mounting hub 4630 is now in position.

FIG. 146 shows the hinges 4620 in the flat position. It highlights the hinges' four negative contacts on leads 4621 that go into a mounting post body 4650 as well the four positive contacts 4622. The first layer of wiring 4681 and the connecting leads to the second layer of wiring 4682 in the cross panel mounting post is shown. These wiring layers may be embedded/over-molded wires in the mounting post or have 3D printed conductive leads. Or they may be have molded, machined or 3D printed channels in the mounting post base with inserted leads, coated with sprayed or electroplated conductive material, coated with conductive or superconductive gel or they may have any combination thereof.

FIG. 147 introduces the second layer of wiring 4682 to connect to the second layer of panels and electrical leads 4680. These wiring layers may be stacked for multiple sets of panels.

FIG. 148 shows hinges in the folded position exposing the negative and positive leads 4680 which will connect through the mounting hub.

FIG. 149 shows three back panels 4610 in the flat position, a fourth back panel 4611 folded up exposing its backside which in one non-limiting embodiment, may be coated with electroluminescent paint, electroluminescent tape or LEDs for night time use. These panels are transparent or semi-transparent to visible light. The backside also has snap fits 4612 to help secure the panels 4610, 4611 in the inverted pyramid housing, which in one non-limiting embodiment, has its inside faces coated with electroluminescent paint, electroluminescent tape or LEDs. Also shown is the second layer of panels 4670.

FIG. 150 shows a transparent panel 4610 and its lattice of contacts. In one non-limiting embodiment, these contacts are honeycomb shaped, to increase contact surface area and efficiency. The panels 4610 and its contacts may be made with conventional manufacturing methods, 3D printed with conductive material or a combination of the two.

FIG. 151 highlights a cropped detail of a panel 4610, highlighting its honeycomb lattice 4613 of contacts. Its positive edge contact 4614 and positive hinge socket 4617 are shown. Also shown is its negative edge contact 4615 and negative hinge socket 4616.

FIG. 152 shows a further close-up of the connections and contacts 4614, 4615. The honeycomb lattice 4613 connects to the edge contacts on both sides. Detail is shown of the following: a section of the positive edge contact 4614, the geometry of the housing for positive hinge socket 4617, negative edge contact 4614 and a section view of negative hinge socket 4616.

FIG. 153 shows a completed, folded cross panel assembly 4600 and notes the outside layers where electroluminescent paint electroluminescent tape or LEDs 4611 will be applied to the transparent or semitransparent panels.

Composite wall sections can be manufactured using a variety of processes. Pyramid Wall sections may be vacuum formed over molds using composite sheets. These sections can range from small modular "A" and "B" mating sections to full wall panels (as described above).

Pyramid Wall sections may also be made through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production.

Pyramid Wall sections may be FFF/FDM 3D printed in layers using chopped carbon fiber with a thermoplastic base or continuous strands of fiber with thermoplastic base. The chopped carbon fiber and thermoplastic base may be in the form of pellets, filament or combination thereof.

The Pyramid Wall System can form an array of hollow, inverted pyramids. Conventional FFF or FDM 3D printing technology uses an extruder head that follows a complete horizontal path before moving to the next level. While advancements in machine speed and material throughput can make these parts faster, extruders on conventional printers are limited to three degrees of freedom.

Incorporating robotic arms into the 3D printing process lets extruders move with six degrees of freedom, allowing non-orthogonal movement to match the geometry of the sections. This speeds up the process for manufacturing. The robotic arms may travel on a conventional linear rail or linear gantry system or move autonomously. Robotic arms may travel in a curvilinear motion on a simple curved track, a compound curve track or a three dimensionally curved path. Robotic arms may work as individual units or as multiple arms moving in unison or independently.

The Pyramid Wall System may be FFF/FDM 3D printed in part or in full by extruders on robotic arms, incorporating conventional FFF/FDM or other production methods. Combinations of conventional FFF 3D printing and robotic 3D printing can be used when using multiple materials and extruder diameters. These options allow large volume prints made with large diameter extruders and to have detailed features made with smaller diameter heads. In one non-limiting embodiment, FIG. 154 shows a flexible screw conveyor 4700 for handling pelletized plastic for use in robotic 3D printing. It labels the following: a control panel 4710 for the system, a stand 4720, conduits 4730 and an electric motor 4740. A feeder 4750 is shown (to be connected via hose to one of the 3D printer's extruders). Also shown is a flexible screw enclosure 4760 and a cutaway view of the flexible screw 4770. This screw 4770 draws pellets up to the feeder 4750. Pelletized plastic 4780 is shown feeding into the flexible screw enclosure 4760 which is attached to the main hopper 4790. This hopper 4790 stores material to print and has its hinged hopper door 4785 removed for clarity.

FIG. 155 shows a partial setup of a robotic 3D printing system 4800. Production systems may use multiple robotic arms for printing, as well as extruders on gantries as in conventional FFF or FDM printing. A gantry or linear rail 4810 allows controlled movement of a linear guide 4820. A robotic arm 4830 allows it to repeatedly position an extruder head (detailed in FIG. 156) with multiple degrees of freedom. A hose 4840 gravity feeds pellets to the extruder at the end of the robotic arm. The hopper door 4785, which was removed in FIG. 154, is shown. A completed wall section 4850, such as one made using the robotic 3D printing system 4800, is also shown.

FIG. 156 shows detail of a cropped section of an exploded view of a robotic arm 4830 and extruder. The end of the arm 4830, hopper feeding tube 4840, stepper motor and tube coupler 4860, heating cartridge 4870, thermistor (heat sensor) 4880 and an extruder hot end and nozzle 4890. Filament may be used instead of or in combination with the hopper fed, pelletized plastic.

In other, non-limiting embodiments, molds or forms for composite wrapping may be 3D printed using additive manufacturing processes such as FFF or FDM. They may also be made through SLA, SLS or DMLS. As described above, the pyramid mold core 100 can be made through 3D printing processes such as Fused Filament Fabrication (FFF) or Fused Deposition Modeling (FDM). Molds may be made with a CNC milling machine or router. Molds may also be made by pouring a variety of material (including but not limited to plastic and concrete) between back-to-back wall sections.

Pyramid Wall sections may be made from Vacuum formed thermoplastic sheets. Pyramid Wall sections may also be injection molded, rotomolded, cast, and/or extruded.

Wall sections may be made flat through any of the above processes (e.g., additive manufacturing or molding) to be stacked for storage and transportation. The sections can then be deployed into shape manually by incorporating a living hinge. Or they may take final form over a mold shape. They may also take form in a "4D" process by using an outside stimulus such as heat, electricity or a chemical reaction.

Substitute materials for composite mold wrapping include: fiberglass and Kevlar.

Substitute material for FFF/FDM 3D printing includes fiberglass and Kevlar (strands or chopped), thermoplastics (by themselves), concrete, cement, wood pulp, composite wood with binder, and recyclables. These materials can be fed as pellets, filaments or combinations thereof and extruded through the 3D printer nozzle.

Substitute materials for various mold process include: wood pulp/composite wood, recyclable material (including plastic) and composite embedded thermoplastics, cement or concrete.

Walls may be milled or routed out of plastic or wood; made out of sheet metal; or stamped into shape.

Any of the components in the Pyramid Wall System may be completely manufactured with any of the processes described herein or in a combination of such processes.

In one non-limiting embodiment, shown in FIG. 157, a vacuum/thermoforming setup 4900 is shown. A form 4910 shaped as the inside faces of the inverted pyramids in a wall panel section has a network of vacuum tubing 4920 attached to its backside. FIG. 158 shows the setup 4900 including the top of the form 4910, a network of vacuum tubing 4920, a section of the tubing and a section of the form 4910 showing where the vents connect to the vacuum path.

FIG. 159 shows a detail of this section view with the form 4910, vacuum tubing 4920, sectioned vent hole 4930 and a section of vacuum tubing aligned with vent holes in the form 4910.

FIG. 160 shows the thermoforming setup 4900 with a heated thermoplastic sheet 4945 above it. FIG. 161 shows a pyramid array 4950 formed from a thermoplastic sheet and removed from the form 4900.

FIG. 162 shows an exploded view of a thermoformed pyramid wall 4990, and its components. At the bottom is the pyramid array 4950. Above that is the array's support frame core 4960 (dummy or with bird-bone and conductive/insulative layers), the support frame's top with sockets 4970 and mounting plugs 4980.

FIG. 163 shows the back side of a completed wall section 4990. FIG. 164 shows the front side of that wall section and the inside face of the thermoformed pyramid array 4950.

In one non-limiting embodiment, shown in FIG. 165, a conventional injection mold 5000 (without side action) is used to create a complete wall section. A section view of the molten plastic channels is shown starting with the sprue 5010 and the runners 5020 which extend the entire length of the mold. The runners are then connected to gates 5030 which terminate at points in the mold core 5040 (in a similar orientation to the vents 4930 in the thermoforming images such as in FIG. 159).

Plastic can then be allowed to flow from the gates into mold cavity 5050 while top support plate 5060 and bottom support plate 5070 keep the mold 5000 closed.

In FIG. 166, a completed wall section 5100 is shown ejected from the mold, with the mold core 5040, top support plate 5060, mold cavity 5050 and bottom support plate 5070 shown open. FIG. 167 shows the back side of a single part wall section 5100 with completely molded features. In another embodiment, any of the features on the molded part may be removed, with the entire wall section assembled from multiple parts.

In standalone sections, separate wall sections can be connected back to back with fasteners. The axis of the posts and sockets may be aligned as posts are fit into sockets to be secured. Alternatively, sockets may have semi-circular cutouts so that posts may slide in. These standalone sections have space which can be filled with closed cell foam or pellets of a variety of material (including recycled plastic or paper) or cement. This filler material may be used for thermal insulation, sound absorption or both. A lattice can be inserted between sections and reinforced with material such as closed cell foam. The lattice may be made through conventional manufacturing methods including additive manufacturing, also known as 3D printing. It may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production.

The lattice may also be printed in the inside face of one of the standalone wall sections, with the sections joined later.

FIG. 168 shows two wall sections back to back and separated, in position to form a standalone pyramid wall sandwich 5200. In one non-limiting embodiment, FIG. 169 shows cropped section of a wall sandwich 5200 showing back to back sections in position and pyramid arrays 4950. Detail of that section includes a socket 4970 on one side with a drainage port 4975. A plug 4980 is shown opposite the socket with a drainage port 4985 in line with the port on the socket. The drainage port can be used for water, moisture and as a vent for heat.

FIG. 170 shows a breakaway view of the standalone pyramid wall sandwich 5200. In this non-limiting embodiment, closed cell foam 5210 is shown partially filling the cavity between wall sections.

As shown in FIG. 64, solar panel connection racks 2100 connect each of the four sets of four panels into one socket in the frame. (For example, in FIG. 101, capacitor/battery connection racks 3200 connect each battery/capacitor in the same fashion).

An alternate/supplemental connection method for a single sided Pyramid Wall section is to have their center posts form an electrical hub which connects the solar panel leads. This hub then connects into a cavity in a Wall Socket which has been mounted onto a wall or support surface. A fastener protrudes from the hub which is secured into an embedded, threaded insert in the Wall Socket cavity. The cavity has electrical contacts which then draw power from the hub and transfer it to a wiring harness or electrical conduits in an Aligning/Mounting Template/Fixture. Cutout sections in the Aligning/Mounting Template/Fixture can have the same profile as a Wall Socket. Notches in the cutout sections provide relief for contact nipples in the Wall Sockets.

The Aligning/Mounting Template/Fixture may also be used as a temporary mounting template to align the wall sockets before they're fastened or bonded into a wall. The template would have no electrical conduits or embedded wiring. It could be for Wall Socket alignment and then be removed.

As a permanent mounting fixture, the Aligning/Mounting Template/Fixture may or may not include electrical conduits or embedded wiring. It may be completely supported by sockets after they are fastened or bonded into a wall. The Aligning/Mounting Template/Fixture may be fastened or bonded independently to provide additional support for the Pyramid Wall Section. The Wall Sockets and Aligning/Mounting Template/Fixture may be machined, routed, laser cut, water cut or molded through various methods including injection molding. They may be formed through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS).

Electrical contacts in the Wall Sockets and conduits in the Aligning/Mounting Template/Fixture may be over-molded wires, 3D printed with conductive material, or a path for insulated wiring. The conduits may be coated with superconductive material such as Graphene or equivalent and/or filled with superconductive gel or any combination thereof.

The Wall Sockets and Aligning/Mounting Template as a permanent fixture may have mounting holes to allow fastening to a mounting surface. Alternatively, the Wall Sockets and Aligning/Mounting Template may be secured with fasteners (such as screws); a bonding compound or a combination thereof.

In FIG. 171, a single, diamond Pyramid Wall section 4900 is shown above a Wall Socket 5300 and an Aligning/Mounting Template/Fixture 5400. In one non-limiting embodiment, the Template 5400 can be used to temporarily position Wall Sockets 5300 as they're secured onto walls, roofs or other surfaces with fasteners or bonding compounds. In another non-limiting embodiment, the Template 5400 is permanently secured for reinforcement and/or to provide an electrically conductive path between panel sections, capacitors and/or batteries.

FIG. 172 shows a detail of an exploded view of a Wall Socket 5300 sectioned. It shows a Socket body 5310 with nipples for electrical leads 5315. It is sectioned to show the counter-bore for a Pyramid Wall post, a drainage area in the counter-bore 5316 and a thru hole for a brass threaded insert 5320. The drainage area allows moisture to escape and heat to vent. The insert 5320 is aligned to accept a screw 4640 and secure the Pyramid Wall post, which houses a solar panel assembly.

In one non-limiting embodiment, concreate screws 5330 (for example, Tapcon screws used to secure fixtures to concrete) will be used to secure the Wall Socket to a wall or roof FIG. 173 introduces the post of a Pyramid Wall section into the Wall Socket image. A solar panel lead 4680 from a panel array in the Pyramid Wall section is aligned with a conduit 5340 in the Wall Socket.

FIG. 174 adds a detailed section of an Aligning/Mounting Template/Fixture. In this non-limiting embodiment, its conduit 5410 is exposed and aligned with the Wall socket conduit and the solar panel lead. This conduit 5410 may be a path for insulated wiring, over-molded wires or 3D printed conductive material. The conduits 5410 may be coated with superconductive material such as Graphene or equivalent and/or filled with superconductive gel or any combination thereof.

FIG. 175 shows a section of a completed Pyramid Wall System 4990 as it connects into a Wall-Socket 5310. The Aligning/Mounting Template/Fixture 5400 aligns each Wall Socket and can either be removed after being an alignment tool or permanently fixed with electrical conduits. FIG. 176 shows detail of an exploded view of a Pyramid Wall 4990, some Wall Sockets 5300 and an Aligning/Mounting Template/Fixture 5400. FIG. 177 Removes the Pyramid Wall and shows a close-up of the image. Wall Sockets 5300 are in position to be fit into the receiving cavities of an Aligning/Mounting Template/Fixture 5400. Mounting holes 5420 may be used to secure the mounting template onto a surface. The holes may be left as is or modified with countersunk holes for fasteners.

In one non-limiting embodiment, the Pyramid Wall System can take advantage of space within the pyramid space to position layers of semitransparent or transparent cells/panels to absorb specified wavelengths of visible and/or non-visible light. This is shown in FIG. 139 and highlighted in FIGS. 142, 150, 151 and 152, where a second layer of "transparent" cells is introduced. The first layer of solar panels may be single sided or bifacial and fastened to the inside faces of the pyramid housing. They may use graphene or equivalent superconductive material to create transparent nanowires or to coat conventional electrical contacts. Panel contacts may be arranged in a dense geometric pattern such as (but not limited to) a honeycomb shape, to increase contact surface area and efficiency.

Both the first and subsequent panel layers may be transparent in the visible spectrum and made of inorganic materials such as perovskite or organic salts. They can be stacked like petals of a flower around a post or "stem". The stacking may be flat and form the sides of offset pyramids around a stem or the sides may be curved and/or overlap like the petals of a rose. Panel layers may be flat and parallel to each other or flat and independently oriented/angled/positioned to each other. Panel layers may be curved to form any geometric or non-geometric shape. They may be concentrically nested or independently oriented/angled/positioned to each other. They may be staggered and offset, like the petals of a rose. Individual panels may be split into two or more sections and positioned independently. Panel layers may be coated with anti-reflective and/or polarizing compounds.

They may be made with conventional manufacturing methods or through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production.

The panels and its contacts may be made with conventional manufacturing methods, 3D printed with conductive material or a combination of the two. Solar panels may be secured in a mounting post which will allow a conductive path through a central location. The mounting post may be manufactured with conventional manufacturing methods such as injection molding or 3D printed in any of the various methods described above or combinations thereof. In one non-limiting embodiment, transparent superconductive capacitors can be used between transparent cell layers for storage.

NOTE: Some of the components in the images used to describe this stacked panel 'Flower' assembly are identical to those in the Cross Panel assembly. Others are similar to ones from FIGS. 138 to 141. But there are instances where individual parts are now assemblies. So, for clarity they have been renumbered.

FIG. 178 shows an exploded view of panels 4610 and their hinges 4620 around a Flower Post assembly 5600. These panels form a Cross Panel assembly similar to that shown in FIGS. 138-153, with the difference that the Flower Post assembly allows multiple sets of panels to be stacked. At the bottom of this exploded view is the Flower Post's Connection Hub 5610. This hub is used to stabilize and secure the panels in the Pyramid Wall cavities.

FIG. 179 introduces a 2nd layer of panels 4670. FIG. 180 shows an exploded view of a Flower Post assembly 5600. It includes the post's base or hub 5610, the post body 5620, a mounting fastener 5630 and an access cap 5640. In one non-limiting embodiment, it is used to mount the solar array into a pyramid wall section and into a wall socket. It may be coated for reflectivity and contain electrical paths or conduits which may be over-molded, inserted or 3D printed with electrical leads. It may have a different profile from the diamond shape shown, such as circular, oval or any regular or irregular polygon, it may taper and may be scaled differently to account for space restriction.

FIG. 181 shows a section view of the Flower Post 5600. The post's hub 5610 is below the post body 5620 with a mounting fastener 5630 in place in the body's countersunk hole. The access cap 5640 is directly over it.

FIG. 182 shows a close-up of features on a cropped section view of the post's body 5620 and access cap 5640. Panel recesses 5622 along the outside of the post's body 5620 position the different levels of panels. Snap fit sockets 5621 allow snap fits 5641 on the access cap 5640 to secure it in place and protect the fastener. Access cap recesses 5642 allow tool access for quick release.

FIG. 183 shows the 1st level of wiring 5650 to connect to the Cross Panel hinges 4620. It follows the same circuit, variety of material and manufacturing processes as the wiring layers described for the Cross Panel in FIGS. 146-148. The exception is the serial connection 5651 to connect the multiple levels of panels in the cell.

FIG. 184 shows the negative and positive leads 5682 which will connect through the mounting hub. The 2nd level of wiring 5683 through the 7th layer of wiring 5688 is marked on one side only for clarity.

FIG. 185 shows a stacking from the 2nd level panels 4670 through the 7th level panels 4675. They are marked on one side only for clarity.

FIG. 186 shows a completed, stacked Flower assembly 5700, with the Cross Panels 4610 in the flattened position, and the Flower Post's hub 5610 exploded.

FIG. 187 shows a completed Flower assembly 5700, folded into a pyramid shape, its outside surfaces coated with electroluminescent paint, electroluminescent tape or light-emitting diodes (LED)s 4611. Panels may be transparent or semitransparent to different wavelengths depending on the requirements of the electroluminescent coating or LEDs.

In one non-limiting embodiment, each panel may form a single, flat layer around the mounting post, where their exposed faces are parallel to the footprint of the pyramid. Each layer may be curved and concentrically nested around the mounting post. Each layer may be equally spaced or spaced differently along the mounting post. Each layer may be angled independently from each other or in any combination thereof.

Tabs with electrical contacts may be secured in the mounting post slots; their exposed edges to connect the leads on the solar panels. They may be secured with fasteners, snap fits, bonding agents or any combination, thereof.

Panels may be coated with anti-reflective and/or polarizing compounds.

FIG. 188 introduces a 1st layer horizontal panel 5800, who's face is oriented parallel to the pyramid's base or footprint. The edges of a clearance hole in the horizontal panel can be positioned just above the panel recesses 5622 in the flower post. Connecting tabs 5805 that fit into the recesses can be bonded or fastened to the 1st layer horizontal panel. Subsequent panels may be assembled first, working toward the top.

FIG. 189 shows a cross section of several horizontal panels and their connecting tabs. The first to be assembled on top of the cross panels is 6th panel 5850 with connecting tabs 5855. Next is 5th panel 5840 and its connecting tabs, 5845. Then 4th panel 5830 with connecting tabs 5835. Then 3rd panel 5820 with connecting tabs 5825. Then 2nd panel 5810 with connecting tabs 5815. Finally, the top layer panel 5800 and its connecting tab 5805.

FIG. 190 shows a completed Horizontal Stacking Flower 5900 with Cross Panels 4610 shown flat and 1st layer horizontal panel 5800 highlighted.

FIG. 191 shows an alternate section view of the panels and the increased surface area from their configuration. It highlights the post's hub 5610, the post's body 5620, the mounting fastener 5630 and the access cap 5640.

FIG. 192 shows the horizontal stacking flower 5900 folded into a pyramid shape. Its outside surfaces 4611 are coated with electroluminescent paint, electroluminescent tape or LEDs.

In a further non-limiting embodiment, the stacking flower may be non-horizontal.

In several non-limiting embodiments, transparent covers may be used for various purposes within the Pyramid Wall System. They may be used for protection from weather, to provide an aerodynamic surface and/or to aid in the collection or dispersion of light. The geometry of the covers may be flat, indented or protruding and be of varying shapes. They may cover individual cells, small panel sections or large arrays. They may be uniform or mixed depending on the application.

Covers may be made from a number of different materials transparent to various wavelengths of visible and non-visible light. These include but are not limited to glass, transparent polymers, transparent inorganic polymers, transparent epoxy resin, transparent ceramics and combinations thereof. These materials may be treated with transparent silica coatings, transparent epoxy or transparent nano-coatings for protection.

Covers forming a protective barrier for solar panels may also provide protection for structures in windy areas. They may reduce drag when used to shield solar panels on moving vehicles. Data from wind tunnel tests and computer analysis such as computational fluid dynamics (CFD) will determine the specific geometry of a cover segment, as well as the arrangement of these segments over a large array.

As the Pyramid Wall System may be exposed to extreme weather conditions, moisture and heat ventilation ports can be introduced in various components in the wall sections. They may include side walls, edges corners, posts and mounting sockets on the Pyramid Wall and corners and edges on the covers.

Covers may perform a dual function as solar cells transparent in the visible spectrum and made of inorganic materials such as perovskite or organic salts. They may use graphene or equivalent superconductive material to create transparent nanowires or to coat conventional electrical contacts. Panel contacts may be arranged in a dense geometric pattern such as (but not limited to) a honeycomb shape, to increase contact surface area and efficiency (as described above).

Covers may function as any type of conventional simple lens, lenticular lens or Fresnel lens. These lenses may be of a variety of shapes and have a variety of purposes including focusing, defocusing and redirecting light. FIG. 69 in the original filing shows a wave shaped solar panel 1800. FIG. 69 also highlights a sample area of this panel 1840. In one non-limiting embodiment, FIG. 70 details this sampled area and shows a solar cell cover with gradient wave patterned, refraction steps.

Covers may be coated with anti-reflective and/or or polarizing compounds.

Covers may be made as individual units for individual pyramid cells. They may be made as small modular sections or complete panels. Modular sections or complete panels may have custom shaped areas to secure over individual pyramid cells with break-away features added for individual units. In this way, only damaged units need to be replaced.

Covers may be made through conventional methods used for producing clear plastic sheets including extrusion, casting, blown film, injection molding and thermoforming. Breakaway sections may be designed as molded features or added with a secondary manufacturing process such as water jet cutting, laser trimming or cutting blades.

Covers may also be made through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production (as described above).

Breakaway sections in 3D printed parts may be made as a design feature using a single material. Breakaway sections may also be formed from the grooves/cavities created after the removal of 3D print support material. Alternatively, they may be added as a secondary manufacturing process such as water jet cutting, laser trimming or cutting blades.

NOTE: This section shows examples of covers on horizontal petal setups, with and without posts. But they can be used in any of the solar panel variations, as well as combinations of capacitors and batteries.

FIG. 193 shows a section view of a spherical, concave cover 6010 and horizontal stacking flowers 5900. In this non-limiting embodiment, the access cap 5645 is truncated for clearance and the cover 6010 fits onto a 4-cell cavity in a wall section 4990. A center screw (not shown) may be used to secure the cover along with snap fit features in the corners.

FIGS. 194 and 195 show variations of the cover in several non-limiting embodiments as examples for a single cell. In FIG. 194 a flat cover 6000, a spherically concave cover 6010, an oval concave cover 6020 and a teardrop concave cover 6030 are shown. In FIG. 195, a spherically concave cover with a lens 6040, a spherically convex cover 6050, an oval convex cover 6060 and a teardrop convex cover 6070 are shown.

The lens feature is not limited to the spherically concave variation, nor to any of the variations in these figures. The lens shape may be any variation of conventional simple lens or Fresnel lens. The material for any of the covers may be an optically clear compound, transparent solar cells, transparent capacitors or any combination thereof.

In one non-limiting embodiment, an alternate version of the horizontal stacking flower removes the mounting post for stacking. This allows for a simpler construction of panels and more exposed surface area to light. Panel layers may be flat and parallel to each other or flat and independently oriented/angled/positioned to each other. Panel layers may be curved to form any geometric or non-geometric shape. They may be concentrically nested or independently oriented/angled/positioned to each other.

Panel layers may be coated with anti-reflective and/or or polarizing compounds.

Corners of the panels may provide electrical contact through leads along the inside edges of the pyramid cell or the edges between the sides of folded cross panels. A simplified version of a truncated mounting post would draw current from the inside edge leads into a central location (not shown).

FIG. 196 shows an alternate version of the horizontal stacking flower 6100. The non-post, stacking flower 6100 is shown with one cross panel 4610 and hinge 4620 removed to show various features. As in the cross panel, flower and horizontal stacking flower versions, the backside of the cross panels 4610 may be coated with electroluminescent paint, electroluminescent tape or LEDs.

In this non-limiting embodiment, six nested panels: 6110, 6120, 6130, 6140, 6150 and 6160 are shown press fit into the cross panel sides. Electrical contacts may be at the outer corners of the horizontal panels with the edges of the cross panels 4610 providing a serial connection. The cross panels may have groove features on the inside face to hold the horizontal panels when folded in place or they may be bonded (or a combination of the two). The panels may be flat or curved and may be positioned in various orientations within the pyramid cavity, not necessarily parallel to the footprint/base of the pyramid. Above the pyramid cavity is a spherically concave cover for reference.

FIG. 197 shows an exploded view of a truncated locking hub 6200. The hub base 6210 is similar to the hubs in the cross panel and other flower designs. The hub body 6220 has the same function as the cross panel and flower design posts. It provides a wiring path as in the other designs and support for the hinge contacts. But it is a much lower profile as it isn't needed to support the flower petals. A mounting fastener 6230 is shown above the hub body, which has a countersunk through hole to position it. Electric leads 6250 from the wiring path are shown. FIG. 198 shows a section view of the truncated locking hub 6200. The hub base 6210 nests the hub body 6220 and the mounting fastener is shown through both. The internal wiring has been removed for clarity.

FIG. 199 shows the hub base and body removed and highlights the internal wiring of the truncated base 6240. Two hinge bodies are hidden to remove clutter from the image. The internal wiring leads 6250 are shown connected to the hinge contacts.

In one non-limiting embodiment, FIG. 200 shows a completely assembled horizontal flower panel assembly with a concave transparent cover 6300.

An overview of supercapacitors and batteries is described above. To summarize: supercapacitors are designed for quick charging, while batteries are designed to provide long-term energy. Supercapacitors, also called "ultracapacitors", are lightweight and have a high power density, meaning they can charge and discharge over a range of a fraction of a second to minutes. They maintain high efficiency over many years, millions of cycles and a wide range of temperatures, but are expensive and have limited storage. Conversely, batteries have high energy density, meaning they can charge and discharge over the course several minutes to several hours. They are less expensive and have more storage than supercapacitors. However, their cycle life is much shorter. Also, their operating temperature is limited and they degrade quickly under heavy loads such as intermittent solar power. By shifting load spikes to supercapacitors, the life of the battery can be extended. And as supercapacitor storage increases, it will complement batteries in applications such as electric vehicles, speeding up charge times significantly.

Capacitor storage is directly related to the surface area of their electrodes, so a dense stacking of honeycomb layers was introduced to increasing energy storage. The density of the layers within the supercapacitor and the number of layers may vary. These layers are coated with graphene, or equivalent nano-particles, creating additional surface area, which leads to higher storage capacity. The pattern of the electrodes may be an array of any geometry, not necessarily honeycomb. Also, the pattern on each layer may combine with the pattern on subsequent layers to make a specific 3D geometry to get more optimal surface area. The layers are not restricted to being parallel to the base/footprint of the pyramid. Nor are they restricted to being parallel to each other or flat. They may be curved.

A superconductive gel electrolyte is introduced between the layers which increases energy density, extending discharge time to match that of batteries, see FIGS. 101-115. Until the advent of Additive Manufacturing, also known as 3D printing, the intricate geometries required for these supercapacitors were not easily possible or they were prohibitively expensive. As the speed of this process increases, parts can move directly from prototype to manufacturing, driving costs down further.

They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production.

Supercapacitor layers may be made with chemically etched metal plates or foil to increase surface area/capacity.

Conventional manufacturing methods such as injection molding, thermoforming or blow molding may be used for various components in the capacitor cell. Conventional manufacturing methods may be used in conjunction with 3D printing to make these components.

An alternate, hybrid configuration which combines supercapacitor layers and solar panel layers in a single pyramid cell may be used where there is space, weight and/or cost restrictions. The bottom section of the pyramid space would function as a capacitor, while the top would be for solar panels. Other non-limiting configurations may substitute batteries for capacitors in the same space.

NOTE: batteries may substitute or complement capacitor storage in any of the various embodiments.

FIG. 201 shows an exploded view of a supercapacitor cell 6400. The components include: cell cover 6410, honeycomb lattice pyramid 6420, supercapacitor casing 6430 and supercapacitor connection rack 6440. Similar components are shown in FIGS. 109 and 111 including a cover 3110, a shell or casing 3160 and connection rack 3200. Those components have a different geometry than those in FIG. 201.

FIG. 202 isolates the following components: a positive serial post 6421, positive electrical leads 6422, a negative serial post 6423 and negative electrical leads 6424. The posts 6421 and 6423 provide a serial connection for each of the honeycomb layers, according to their charge. The positive leads 6422 and the negative leads 6424 connect into posts on the supercapacitor casing 6430 which snap fit into the supercapacitor connection rack 6440.

FIG. 203 shows a supercapacitor casing 6430 sectioned in half to reveal the negative electrical leads 6424 as they're snap fit into the supercapacitor connection rack. The negative serial post 6423 is shown for reference. The rack has internal wiring to draw current into two of its own leads that snap fit into sockets on the pyramid wall body. These leads connect to the conductive elements in the bird-bone frame on the pyramid wall section.

FIG. 204 shows the introduction of positive honeycomb layers 6425. In FIG. 205 in this non-limiting embodiment, eleven positive layers 6425 are shown. In FIG. 206, eleven negative honeycomb layers 6426 are highlighted to show a complete honeycomb lattice pyramid 6420. Angled top and bottom views show detail in the lattice pyramid 6420.

FIG. 207 shows a complete supercapacitor module 6500. In the non-limiting embodiment shown here, the module is upside down and attached to an identical module. In other non-limiting embodiments, the opposite section may be a pyramid wall panel. This wall section may have multiple versions of solar panels in it.

FIG. 208 shows a hybrid supercapacitor/post-less flower panel cell 6600. A cell cover 6410 is shown at top. Under that are four nested panels 6110, 6120, 6130 and 6140. Under that is a section view of the supercapacitor casing 6430 and a half-sized honeycomb, lattice pyramid 6420. This configuration allows for solar collection and storage on a single sided pyramid wall. This can be for applications where vertical space or depth or weight is limited.

FIG. 209 shows a section view of a complete supercapacitor module 6500. At the bottom, two honeycomb lattice pyramids 6420 are shown. Connected at top is a pyramid wall housing with three configurations of solar panels. First, is a horizontal stacking flower 5900. In this non-limiting embodiment, this cell in the pyramid wall housing has a spherically concave cover 6010 in one corner. Next to that is a "conventional" flower assembly 5700 and next to that is a hybrid supercapacitor/post-less flower panel cell 6600.

FIG. 210 shows the same complete supercapacitor module 6500 with a top cover sectioned. In this non-limiting embodiment, the modular cover contains at least one spherically concave cover 6010 and two flat covers 6000. For weather protection, restricted access to light or aerodynamics, combinations of cover styles may range from 6000 to 6070 or any geometric shape based on the application.

The Pyramid Wall System has applications for both mobile installations and the trucking industry. Mobile setups may be deployed for emergency power or shelters in remote locations, their containers formed from Pyramid Wall sections that are hinged in one or more segments. They may unfold and track the Sun or form a fixed structure. Within the trucking industry, tractor-trailers and other vehicles can use the Pyramid Wall System to offset fuel costs in part or in total. Tractor-trailers would benefit from several features of the Pyramid Wall System including, but not limited to the following:

1) Its unique geometry leads to increased stiffness and strength compared to conventional walls and roofs of the same size. This strength can be augmented with a bird-bone lattice frame.

2) The configuration of solar panels within this geometry leads to increased energy collection compared to panels laid flat over the same footprint.

3) The ability to quickly charge advanced supercapacitors reduces the time needed at refueling stations, while supercapacitor/battery combinations allow a controlled discharge of power for hybrid or fully electric vehicles.

4) Drag reduction from dimpled covers can save at least 11% annual fuel costs. Additional features such as the Fluke (see FIG. 215) can reduce drag further.

5) The Pyramid Wall System may provide power for refrigerated units, while the closed cell interior of the wall sandwich sections can provide thermal insulation.

6) Electroluminescent paint, electroluminescent tape or light-emitting diodes (LEDs) can provide night time illumination and/or signage through the panels and/or flukes. LEDs may be individual components in an array, in a ribbon or in a sheet. They can also use this illumination feature to augment signaling. Their low power consumption allows them to draw off of the capacitor-battery portion of the Pyramid Wall System without an external source. There are several methods described above, such as, to coat the back side of the last layer of panels or the inside faces of the pyramids. In one non-limiting embodiment, the top faces of the pyramids on the sides of a trailer may be coated for downward illumination.

7) Container sides may be retrofitted to house Pyramid Wall sections or completely constructed out of Pyramid Wall sections. They may include single sided wall panels containing solar cells or any of the combinations of solar panel-capacitors.

8) Pyramid Wall sections may have transparent covers for weather protection and a variety of dimple shapes and characteristics as shown in FIGS. 193-195 and FIG. 200. These covers form side panels with shapes independently positioned and configured for maximum drag reduction. Some covers may have simple lens characteristics; either conventional, Fresnel or lenticular based on the position of the Pyramid Cell. In addition, pyramid cavities may have uneven sides in order to achieve the maximum potential solar collection, based on their position within the wall. The covers may be individually formed or made in a complete sidewall sheet. It can be followed by a post process to allow individual sections to be replaced in case of damage or if reconfigured. The covers may have drag reducing "Flukes" on the leading and trailing edges. These flukes may be individually formed as well or made in a complete sidewall sheet with the ability to be replaced. Drag reduction covers may be used on existing trailers without the Pyramid Wall sections.

FIG. 211 shows a fully assembled tractor trailer 6700 with the Pyramid Wall System. The dimpled covers are configurable and may be used without solar panels or electrical storage such as batteries or capacitors. The dimpled covers may also be used on conventional trailer sides without Pyramid Wall sections.

FIG. 212 shows a standalone trailer frame 6710, three wall sections 4990, a close-up of the inside faces of a pyramid array 4950 and a close-up of the backside of a wall section showing a frame top with sockets 4970 and mounting plugs 4980. Wall sections can be made in various sizes and bonded together to make a complete trailer side or they can be made as a single panel, with or without connecting features or electrical features.

FIG. 213 introduces a cab 6720 and two end, transparent dimpled covers 6730. Other non-limiting embodiments may include solar cell and capacitor/battery end walls.

FIG. 214 introduces two side transparent, dimpled walls 6740 and one top transparent, dimpled wall 6750. The dimple patterns on these walls are configurable and adjusted based on input from wind tunnel tests and 3D model simulations such as computational fluid dynamics (CFD).

FIG. 215 shows cropped, exploded and detailed views of several features on the top transparent, dimpled wall 6750. Included are circular dimpled panels, flat panels, crescent shaped dimpled panels and triangular shaped cavity seals. Nested above that are small and large aerodynamic "Flukes". Exploded from the leading edge is a row of three small, aerodynamic flukes 6760 and three large aerodynamic flukes 6770. To the left and above that is a side view showing the profile of a small fluke 6760 and a large fluke 6770 behind it. To the right of that is a cropped view from the back end of the panel highlighting crescent shaped dimples 6025. Exploded above that are three large flukes 6770. Their footprint is to be aligned with crescent shaped dimples, which in one non-limiting embodiment may be a pattern choice based on experimental data.

At the bottom left is a detail view of the top dimpled wall. A flat cover 6000 and spherically concave cover 6010 are noted as well as a triangular shaped cavity seal 6005 for a flat cover and a triangular shaped cavity seal 6015 for a spherically concave cover. In one, non-limiting embodiment, these cavity seals will be simply an end feature of a cover configuration, e.g., seal 6005 is part of cover 6000, seal 6015 is part of cover 6010, etc.

FIG. 216 shows a section view of the tractor-trailer showing a sample of the solar panel/supercapacitor wall. A cropped view normal to the section cut shows capacitors and flower panel wall cells. Transparent covers are removed to show a more detailed section view of the capacitor/flower assembly. An end view looking from back to front shows alternating small flukes 6760 and large flukes 6770.

In one non-limiting embodiment, the solar panel configuration may be a stacked flower assembly 5700 as shown in the end view. Diagonally below that and to the right is a honeycomb latticed pyramid 6420 as part of a supercapacitor. This shows a cross section of a flower panel/supercapacitor array. To the right is a detailed view of the trailer section. Select covers are removed to reveal features of the array (petals and post in the flower 5700 and honeycomb features in the lattice 6420).

FIG. 217 shows a view from the front of a sectioned tractor-trailer. An exploded view of some transparent wall covers reveals asymmetrical Pyramid Wall cells, where the top sides are shorter than the bottom. The cab 6720 is shown for reference. A detail of an exploded area of a side panel is shown with several flat covers 6000 removed. Directly behind that is a sample of asymmetrical panels. In one non-limiting embodiment, pyramid configuration 4585 with uneven sides (shortened at the top) are used to best capture incident light from the bottom rows on a trailer. Panel sides and covers will be customizable.

FIG. 218 shows an angled view of a tractor-trailer with Pyramid Wall System 6700. Customizable aerodynamic features are shown in context of the whole vehicle.

Sound walls are designed for the purpose of reflecting, diffusing or absorbing sound waves. For over fifty years they have been extensively used in the US as highway noise barriers. Residential and commercial developments have seen an increase of these barriers as well. They have been used for sound damping in concert halls and in studios where they can mute specific frequencies. They create the anechoic chambers in laboratories, which fully absorb and isolate all sound waves. Effectiveness, cost and esthetics are design factors, with most of the tradeoff between cost and effectiveness.

In general, the least effective but cheapest form of wall is reflecting, which may be seen on long stretches of highway. Reflecting walls may be sufficient in rural areas, but generally transfer noise to areas in front of it. Competing reflective walls on opposite sides may actually increase noise in an area.

Diffusing walls are the next most effective, but may have a more elaborate shape and higher cost. "S" shaped walls and walls with irregular geometric features fall into this category; they break up sound in front of it, not merely reflecting it to the other side.

Absorbing walls are generally the most effective and most expensive. These include walls with acoustic foam, closed cell foam, pellets, earth and small rocks. Many sound walls have some combination of all three kinds of barrier.

The Pyramid Wall System is a natural candidate for two of these sound wall categories: diffusion and absorption. Its unique shape diffuses sound by reflecting it within its array of inverted pyramid faces.

In one non-limiting embodiment, H-beams are secured on concrete forms (for example, Sonotubes) which in turn are secured to footings. The Sonotube/footing combination can then be embedded in the ground, with a horizontal ground level support providing a base and spacing between the Sonotubes.

Back to back wall sections, as described in FIGS. 168-170, can form the standalone panels used to create an absorbing wall. The back to back wall sections slide down between the channels in the H-beams beginning with a start section, which has a row of dummy panels at its bottom. More sections are added until it reaches the top, which has a space to hold a weather cap.

Before the cap is added material is then forced into the "sandwich gap" between the front and back. This material may include, but is not limited to: spray foam insulation, closed cell foam, acoustic foam, and recycled material including plastic and wood pulp.

A lattice may be printed in the inside face of one of the standalone wall sections, with the sections joined later, to provide increased reinforcement. Plugs and sockets may have drainage ports for moisture and heat.

Pyramid Wall sections may be made in any of the processes, using any of the materials mentioned above. In particular, any of the wall sections made with composites are an order of magnitude or more lighter than if made of concrete.

A sound wall made up of Pyramid Wall sections may have empty pyramid spaces.

Pyramid spaces may have solar panels on one side, capacitor/battery combinations on the opposite or hybrid capacitor/solar panels on one side. Electroluminescent paint, electroluminescent tape and light-emitting diodes (LED)s on the outsides face of the innermost solar panels or the inside faces of the pyramid cells for nighttime use. LEDs may be individual components in an array, in a ribbon or in a sheet. Capacitor/battery combinations can make these lighted features self-sufficient.

Pyramid Wall sections joined by H-beams may be joined to form a continuous stretch of sound wall. Sound wall sections may be curved. In one non-limiting embodiment, the inverted faces of the pyramids may follow a curved backing shape in a design based on acoustic criteria. The curve may be "S" shape or compound.

Inside faces of the pyramids may be uneven or asymmetrical, based on acoustic criteria. Solar power criteria may be a factor in shaping the inside pyramid faces as well.

FIG. 219 shows an exploded view of a sound wall section 6800. At the bottom of the left side image, footings 6820 are ready to be put in the ground. Concrete Sonotubes 6830 are directly on top and will be buried to their top. A ground wall support 6840 is put directly on top of the Sonotubes 6830, its ends just covering the gap between posts. H-beams 6810 are joined on top of the Sonotubes 6830, with rebar (not shown) sticking into it and all the way until the footing.

Four Back to Back Pyramid Wall sections 5200 are shown above the H-Beams 6810 ready to slide in. Detail on the bottom left shows a portion of a dummy panel 5220 at the bottom of a Back to Back Pyramid Wall section 5200. The profile of an H-beam 6810 is shown in that detail view. Above that on the right is detail of the Pyramid Arrays 4950 (back and front) and Wall Cap 6850 ready to secure the Pyramid Wall sections 5200.

FIG. 220 shows a completed sound wall section 6800. FIG. 221 shows a completed sound wall section 6800 with a breakaway view exposing (in one non-limiting embodiment) closed cell foam 5210. In other configurations this insert may be pellets of plastic, recyclables including plastic, paper/pulp or concrete. FIG. 222 shows a series of sound wall 6900. These segments may be of indefinite length, curved or angled, depending on design criteria.

The Pyramid Wall System may be applied to structures of various sizes and shapes. They may also form self-contained structures to be used as stand-alone units of various size and shape. They may form arrays of indefinite length. They may use tracking systems or be fixed. The individual pyramid cells in the structure may have uneven sides and be unlimited in size and number. The base of this structure may be a regular or irregular polygon with an unlimited number of sides. Sides of the Pyramid Wall Structure may be flat or curved. The pyramid cells are then joined in a modular fashion within a pyramid shaped frame to create the Pyramid Wall Structure.

In one non-limiting embodiment, the involute surfaces of the Pyramid Wall Structure show a 119.6% increase in surface area over the base or footprint of the pyramid. Another non-limiting embodiment of the Pyramid Wall Structure may only use panels for the base of the pyramid with the sides removed. A wind skirt may be added around the perimeter of these base sections to help keep panels pressed to the roof during drafts. Air vents may be added for moisture and heat ventilation.

FIG. 223 shows a standalone, Pyramid Wall Structure 7000. This may be a standalone unit, be used on top of a building or in an array on a solar farm.

FIG. 224 shows an exploded view of the triangular sidewall of a Pyramid Wall Structure. This side wall may have similar construction to the Pyramid Wall 4990. However, it can be sectioned differently, so it has a unique number. In this non-limiting embodiment, a nine pointed wall section 7110, eight and seven point section 7120, six and five point section 7130, four and three point section 7140 and a two and one point section 7150 are positioned to be joined. A slotted base section 7210 is directly underneath and a base 7220 will connect to it.

FIG. 225 shows detail of the slotted base section 7210 and base 7210 to be connected. FIG. 226 shows a triangular sidewall 7100 assembled and ready to connect to the slotted base section 7210 and onto the base 7220. FIG. 227 shows two reference views of a triangular sidewall 7100 assembled into a slotted base section 7210 and the base 7220 waiting to be assembled. FIG. 228 shows an assembly of four bases 7220, one triangular sidewall 7100 into one of the four slotted base sections 7210 and two frame member's 7230 ready to assemble. In one non-limited embodiment these frame members may secure panels on the inside of the pyramid structure, so as to allow complete exposure of the panel edges and sides to the Sun. FIG. 229 shows a completed Pyramid Wall Structure 7000 with its cap 7240 exploded over it.

FIG. 230 shows a full building with its sides covered with single sided Pyramid Wall 4990 sections. At the top are the base 7220 and slotted base 7210. FIG. 231 shows a partially assembled Pyramid Wall Building 7300. Frame members 7230 are shown exploded with a cap 7240 just over them. Panels may be assembled one row at a time or one side at a time. FIG. 233 shows a fully assembled Pyramid Wall Building 7300. In this non-limiting embodiment, four Pyramid Wall Structures are shown on a roof. These structures are not restricted to size, shape or quantity.

FIG. 233 shows a tracking Pyramid Wall Structure 7400. In this non-limiting embodiment, the Pyramid structure may track the sun with two degrees of freedom. Base elements 7420 is connected to pivoting element 7410. Element 7410 can move in one direction and the Pyramid structure may be moved in a second, perpendicular direction.

In one non-limiting embodiment (not shown) back to back wall panels may be used to house capacitors/batteries inside the pyramid's structure. They may be in arrays in a solar farm and the shape of the individual cells may vary based on the optimum performance of solar collection.

FIG. 234 shows a Flat Pyramid Wall Building 7500. In an exploded view above roof sections, wind skirts are positioned to be secured. In this non-limiting embodiment, the panels, sides, base, slotted base frame and cap are replaced by a Pyramid Wall 4990 secured by Wall Sockets (5300) and an Aligning/Mounting Template/Fixture (5400). The perimeter of these panels is secured by a Wind Skirt 7510. This helps reduce strain on fasteners and bonding agents by taking advantage of downward drafts over buildings.

FIG. 235 shows a detailed cropped view of the Wind Skirt 7510, Skirt Vent Holes 7515 and a Pyramid Wall Section 4990. As in any of the configurations of Pyramid Wall System, electroluminescent paint, electroluminescent tape or light-emitting diodes (LED)s may be used with inverters in this system; either on the backs of panels or on the inside faces of the pyramids. LEDs may be individual components in an array, in a ribbon or in a sheet. Transparent covers for weather and or air dispersion may be used.

As described above, various embodiments provide a method and apparatus to create wall sections. These wall sections may then be used to quickly set up pyramidal structures.

Various operations described are purely exemplary and imply no particular order. Further, the operations can be used in any sequence when appropriate and can be partially used. Various operations described as individual steps may be combined into a single operation. Additionally, some operations described as individual steps may be divided so as to be performed as multiples steps. As used herein, the terms fig., Figure, image and step may be used interchangeably. For example, in some embodiments, the vacuum forming shown in FIG. 3 may be done in a full vacuum chamber and the steps may vary. In other embodiments, the sheet may be clamped and cut at various steps before the final vacuum forming step and curing occurs. In still other embodiment, various Figures could be reordered so as to take place as another sequence of steps.

In one non-limiting embodiment of the sheet being formed into the shape of the pyramids, after the last fold and cutting step, an infusion mesh may be placed on top of the material to wick resin. The mesh may be taped along the outside, with two plastic connectors loosely placed for a vacuum hose on opposite sides. A slightly oversized vacuum bag (for example, a single sided sheet of clear bagging material) can then be placed over the material and taped down with vacuum bagging tape.

An incision may be made above each connector. One allows a hose to draw resin from a reservoir. The other connects a hose which is attached to a vacuum pump. Initially, the reservoir may be clamped off and a full vacuum may be pulled through the bag. Then, the hose at the pump end may be clamped off as well. After it is determined that there are no leaks, the clamp at the reservoir end may be opened and the resin may be drawn through the infusion mesh. Then both hoses may be clamped off again. The vacuum forming sheet may be allowed to cure over the next 24 hours to make the finished housing.

An embodiment provides a method for collecting and storing solar energy using pyramid shaped cavities and associated elements in singular units or arrays. The method uses reflectivity among the panels to maintain the same power output as if they were laid flat. This allows for installations where the mounting area is restricted. The angle of each side with respect to the base of the pyramid ranges between 5° and 85°. The base or "footprint" of these pyramids may be regular or irregular polygons such as a diamond or rhombus shape. However, the number of sides are unrestricted and the pyramid sides may be uneven. Sections that have restricted access to sunlight may have uneven sides to best capture incident light.

Inverted pyramids have their sides spaced away from building surfaces allowing natural air flow to cool cells, increasing efficiency as heat is reduced. The Pyramid Wall System is not limited by the number of pyramid "cells" or "modules" and that the cells or modules are scalable.

Another embodiment provides a method for arranging solar panels, The solar panels may be assembled flat and hinged, creating a cross shaped pattern bonded or snap fit to the inside faces of pyramids. Solar panels may be flexible, formed as a cross shaped flat pattern and "4D" folded into a pyramid shape to be bonded or fit to the inside faces of pyramids. Solar panels may be single sided or bifacial and made with conventional manufacturing methods or 3D printed. They may be transparent in the visible spectrum and made of inorganic materials such as perovskite or organic salts. They may use graphene or equivalent superconductive material to create transparent nanowires or to coat conventional electrical contacts. Panel contacts may be arranged in a dense geometric pattern such as (but not limited to) a honeycomb shape, to increase contact surface area and efficiency. The panels and its contacts may be made with conventional manufacturing methods, 3D printed with conductive material or a combination of the two.

Solar panels may be secured in a mounting post which will allow a conductive path through a central location. Mounting post wiring layers may contain embedded/overmolded wires. They may house molded, machined or 3D printed channels or conduits with inserted leads to create the wiring layers. The layers may have 3D printed conductive leads. The channels or conduits in the mounting posts may be sprayed or electroplated with conductive material or superconductive material such as graphene or equivalent. They may be coated with conductive or superconductive gel.

Wiring layers may be produced with any combination described herein and stacked for multiple sets of panels. The mounting post body may be extended with slots added to allow for the stacking of multiple panel arrays. Panels transparent to visible light (or specific wavelengths) may be stacked within the pyramid space, each layer positioned to absorb a specified range of wavelengths. Panel layers may be flat and parallel to each other or flat and independently oriented/angled/positioned to each other. Panel layers me curved to form any geometric or non-geometric shape. The may be concentrically nested or independently oriented/angled/positioned to each other. They may be staggered and offset, like the petals of a rose.

Panels may have a transparent outer surface that functions as any type of conventional simple lens, lenticular lens or Fresnel lens. These lenses may be of a variety of shapes and have a variety of purposes including focusing, defocusing and redirecting light.

Panels transparent or semi-transparent to visible light may have their outside faces coated with electroluminescent paint, electroluminescent tape or light-emitting diodes (LED)s. LEDs may be individual components in an array, in a ribbon or in a sheet. This will be for nighttime use if transparent cells are used. These lighted faces will be self-sustaining, drawing power through an inverter connected to electrical storage such as supercapacitors and/or batteries in the Pyramid Wall modules. Electroluminescence may be powered by the capacitor or solar panel.

A further embodiment provides wall sections vacuum formed over molds using composite sheets. These sections can range from small modular "A" and "B" mating sections to full wall panels. Wall sections may be made through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). (One ultrafast additive process geared toward full production uses SLA resins and/or SLA cured with oxygen and UV light). Wall sections may be FFF/FDM 3D printed using chopped carbon fiber with a thermoplastic base or continuous strands of fiber with thermoplastic base. The chopped carbon fiber and thermoplastic base may be in the form of pellets, filament or combination thereof.

The Pyramid Wall System may be FFF/FDM 3D printed in part or in full by extruders on robotic arms, allowing non-orthogonal movement to match the geometry of the sections and speed up the process for manufacturing. The robotic arms may travel in individual or multiple units on a conventional linear rail or linear gantry system. Robotic arms may travel in a curvilinear motion; individual or multiple arms moving independently or on a compound curve track. Production systems may use combinations of robotic arms as well as extruders on gantries as in conventional FFF or FDM printing.

Molds or forms for composite wrapping may be 3D printed using additive manufacturing processes such as FFF, FDM, SLA, SLS or DMLS. Molds may be made with a CNC milling machine or router. Molds may be made by pouring a variety of material (including but not limited to plastic and concrete) between back-to-back wall sections.

Pyramid Wall sections may be made from Vacuum formed thermoplastic sheets, injection molded or rotomolded Wall sections may be printed flat, with a living hinge to move into shape, either manually or with an outside stimulus, to be stacked for storage and transportation.

Substitute materials for wrapping include: fiberglass and Kevlar. Substitute material for FFF/FDM 3D printing includes fiberglass and Kevlar (strands or chopped), thermoplastics (by themselves), concrete, cement, wood pulp, composite wood with binder, and recyclables. These materials can be fed as pellets, filaments or combinations thereof and extruded through the 3D printer nozzle. Substitute materials for various mold process include: wood pulp/composite wood, recyclable material (including plastic) and composite embedded thermoplastics, cement or concrete.

Walls may be milled or routed out of plastic or wood.

Walls may be made out of sheet metal.

Any of the components in the Pyramid Wall System may be completely manufactured or in combination with any of the processes described herein.

Another embodiment provides a method of joining Pyramid Wall sections back to back. In standalone sections, separate wall sections can be connected back to back with fasteners. The axis of the posts and sockets may be aligned as posts are fit into sockets to be secured. Sockets may instead have semi-circular cutouts so that posts may slide in.

These standalone sections have space which can be filled with closed cell foam or pellets of a variety of material (including recycled plastic or paper) or cement. This filler material may be used for thermal insulation, sound absorption or both. A 3D printed lattice can be inserted between sections and reinforced with material such as closed cell foam. The lattice may be printed in the inside face of one of the standalone wall sections, with the sections joined later.

Plugs and sockets can have aligned drainage ports for moisture and heat.

A further embodiment provides a method to connect single sided Pyramid Wall sections to walls. A single sided Pyramid Wall section has their center posts form an electrical hub which connects the solar panel leads. This hub then connects into a cavity in a Wall Socket which has been mounted onto a wall or support surface. A fastener protrudes from the hub which is secured into an embedded, threaded insert in the Wall Socket cavity. The cavity has electrical contacts which then draw power from the hub and transfer it to a wiring harness or electrical conduits in an Aligning/Mounting Template/Fixture. Cutout sections in the Aligning/Mounting Template/Fixture have the same profile as a Wall Socket. Notches in the cutout sections provide relief for contact nipples in the Wall Sockets.

The Aligning/Mounting Template/Fixture may also be used as a temporary mounting template, to align the wall sockets before they're fastened or bonded into a wall. The template may have no electrical conduits or embedded wiring itself. It would be for Wall Socket alignment and then be removed.

As a permanent mounting fixture, the Aligning/Mounting Template/Fixture may be with or without electrical conduits or embedded wiring. It may be completely supported by sockets after they are fastened or bonded into a wall. The Aligning/Mounting Template/Fixture may be fastened or bonded independently to provide additional support for the Pyramid Wall Section.

The Wall Sockets and Aligning/Mounting Template/Fixture may be machined, routed, laser cut, water cut or molded through various methods including injection molding. They may be formed through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS).

Electrical contacts in the Wall Sockets and conduits in the Aligning/Mounting Template/Fixture may be a path for insulated wiring, over-molded wires or 3D printed with conductive material. The conduits may be coated with superconductive material such as Graphene or equivalent and/or filled with superconductive gel or any combination thereof.

The Wall Sockets and Aligning/Mounting Template as a permanent fixture may have mounting holes to allow fastening to a mounting surface. They may be secured with bonding compound or a combination thereof.

In one non-limiting embodiment, the Pyramid Wall System can take advantage of space within the pyramid space to position layers of semitransparent or transparent cells/panels to absorb specified wavelengths of visible and/or non-visible light. The first layer of solar panels may be single sided or bifacial and fastened to the inside faces of the pyramid housing. They may use graphene or equivalent superconductive material to create transparent nanowires or to coat conventional electrical contacts. Panel contacts may be arranged in a dense geometric pattern such as (but not limited to) a honeycomb shape, to increase contact surface area and efficiency.

Both the first and subsequent panel layers may be transparent in the visible spectrum and made of inorganic materials such as perovskite or organic salts. They could be stacked like petals of a flower around a post or "stem". The stacking may be flat and form the sides of offset pyramids around a stem or the sides may be curved and/or overlap like the petals of a rose. Panel layers may be flat and parallel to each other or flat and independently oriented/angled/positioned to each other. Panel layers may be curved to form any geometric or non-geometric shape. The may be concentrically nested or independently oriented/angled/positioned to each other. They may be staggered and offset, like the petals of a rose. Individual panels may be split into two or more sections and positioned independently.

Panel layers may be coated with anti-reflective and/or polarizing compounds.

They may be made with conventional manufacturing methods or through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production.

The panels and its contacts may be made with conventional manufacturing methods, 3D printed with conductive material or a combination of the two. Solar panels may be secured in a mounting post which will allow a conductive path through a central location. The mounting post may be manufactured with conventional manufacturing methods such as injection molding or 3D printed in any of the various methods described above or combinations thereof.

The conductive paths that make up the mounting post wiring layers may contain embedded/over-molded wires. They may house molded, machined or 3D printed channels or conduits with inserted leads to create the wiring layers. The layers may have 3D printed conductive leads. The channels or conduits in the mounting posts may be sprayed or electroplated with conductive material or superconductive material such as graphene or equivalent. They may be coated with conductive or superconductive gel.

In one non-limiting embodiment, transparent superconductive capacitors could be used between transparent cell layers for storage.

The Cross Panel/Flower assembly can have a Mounting/Flower Post assembly that allows multiple sets of panels to be stacked. The Flower Post's Connection may be used to stabilize and secure the panels in the Pyramid Wall cavities. A Flower Post assembly includes the post's base or hub, the post body, a mounting fastener and an access cap. In one non-limiting embodiment, it is used to mount the solar array into a pyramid wall section and into a wall socket. It may be coated for reflectivity and contain electrical paths or conduits which may be over-molded, inserted or 3D printed with electrical leads. It may have a different profile from the diamond shape shown, such as circular, oval or any regular or irregular polygon, it may taper and may be scaled differently to account for space restriction. The Flower Post's hub is below the post body with a mounting fastener in place in the body's countersunk hole. Panel recesses along the outside of the post's body position the different levels of panels. Snap fit sockets allow snap fits on the access cap to secure it in place and protect the fastener. Access cap recesses allow tool access for quick release.

The first level of wiring connects to the Cross Panel hinges. Negative and positive leads connect through the mounting hub. Multiple levels of wiring connect multiple levels of stacked panels.

A completed Flower assembly may be folded into a pyramid shape, its outside surfaces coated with electroluminescent paint, electroluminescent tape or light-emitting diodes (LED)s. LEDs may be individual components in an array, in a ribbon or in a sheet. Panels may be transparent or semitransparent to different wavelengths depending on the requirements of the electroluminescent coating or LEDs.

In another non-limiting embodiment, each panel may form a single, flat layer around the mounting post, where their exposed faces are parallel to the footprint of the pyramid. Each layer may be curved and concentrically nested around the mounting post. Each layer may be equally spaced or spaced differently along the mounting post. Each layer may be angled independently from each other or in any combination thereof.

Tabs with electrical contacts may be secured in the mounting post slots; their exposed edges to connect the leads on the solar panels. They may be secured with fasteners, snap fits, bonding agents or any combination, thereof.

Panels may be coated with anti-reflective and/or polarizing compounds.

In this non-limiting embodiment, a first layer horizontal panel, has an exposed face that is oriented parallel to the pyramid's base or footprint. The edges of a clearance hole in the horizontal panel will be positioned just above the panel recesses in the flower post. Connecting tabs fit into the recesses to be bonded or fastened to the first layer horizontal panel. Subsequent panels may be assembled first, working toward the top. The first to be assembled on top of the cross panels may be the bottom panel with connecting tabs. Consecutive layers are assembled until the top layer panel and its connecting tabs. The assembly is then folded into a pyramid shape, its outside surfaces coated with electroluminescent paint, electroluminescent tape or LEDs.

In several non-limiting embodiments, transparent covers may be used for various purposes within the Pyramid Wall System. They may be for protection from weather, to provide an aerodynamic surface or to aid in the collection or dispersion of light. The geometry of the covers may be flat, indented or protruding and be of varying shapes. They may cover individual cells, small panel sections or large arrays. They may be uniform or mixed depending on the application.

Covers may be made from a number of different materials transparent to various wavelengths of visible and non-visible light. These include but are not limited to glass, transparent polymers, transparent inorganic polymers, transparent epoxy resin, transparent ceramics and combinations thereof. These materials may be treated with transparent silica coatings, transparent epoxy or transparent nano-coatings for protection.

Covers forming a protective barrier for solar panels may also provide protection for structures in windy areas. They may reduce drag when used to shield solar panels on moving vehicles. Data from wind tunnel tests and computer analysis such as computational fluid dynamics (CFD) will determine the specific geometry of a cover segment, as well as the arrangement of these segments over a large array.

As the Pyramid Wall System may be exposed to extreme weather conditions, moisture and heat ventilation ports are to be introduced in various components in the wall sections. They may include side walls, edges corners, posts and mounting sockets on the Pyramid Wall and corners and edges on the covers.

Covers may perform a dual function as solar cells transparent in the visible spectrum and made of inorganic materials such as perovskite or organic salts. They may use graphene or equivalent superconductive material to create transparent nanowires or to coat conventional electrical contacts. Panel contacts may be arranged in a dense geometric pattern such as (but not limited to) a honeycomb shape, to increase contact surface area and efficiency.

Covers may function as any type of conventional simple lens, lenticular lens or Fresnel lens. These lenses may be of a variety of shapes and have a variety of purposes including focusing, defocusing and redirecting light. In one non-limiting embodiment a solar cell cover may have gradient wave patterned, refraction steps.

Covers may be coated with anti-reflective and/or or polarizing compounds.

Covers may be made as individual units for individual pyramid cells. They may be made as small modular sections or complete panels. Modular sections or complete panels may have custom shaped areas to secure over individual pyramid cells with break-away features added for individual units. In this way, only damaged units need to be replaced.

Covers may be made through conventional methods used for producing clear plastic sheets including extrusion, casting, blown film, injection molding and thermoforming. Breakaway sections may be designed as molded features or added with a secondary manufacturing process such as water jet cutting, laser trimming or cutting blades.

Covers may also be made through additive manufacturing, also known as 3D printing. They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production.

Breakaway sections in 3D printed parts may be made as a design feature using a single material. Breakaway sections may also be formed from the grooves/cavities created after the removal of 3D print support material. They may instead be added as a secondary manufacturing process such as water jet cutting, laser trimming or cutting blades.

Covers may be used on horizontal petal setups, with and without posts. Additionally, they can be used in any of the solar panel variations, as well as combinations of capacitors and batteries.

The access cap for a flower post may be truncated for clearance based on the geometry of the cover. A center screw may be used to secure the cover along with snap fit features in the corners.

The cover for a single pyramid cell has many variations. Several non-limiting embodiments include a flat cover, a spherically concave cover, an oval concave cover, a teardrop concave cover, a spherically concave cover with a lens, a spherically convex cover, an oval convex cover and a teardrop convex cover are shown. The lens feature is not limited to the spherically concave variation, nor any of the variations in these figures. The lens shape may be any variation of conventional simple lens or Fresnel lens. The material for any of the covers may be an optically clear compound, transparent solar cells, transparent capacitors or any combination thereof.

In another non-limiting embodiment, an alternate version of the horizontal stacking flower removes the mounting post for stacking. This allows for a simpler construction of panels and more exposed surface area to light. Panel layers may be flat and parallel to each other or flat and independently oriented/angled/positioned to each other. Panel layers may be curved to form any geometric or non-geometric shape. They may be concentrically nested or independently oriented/angled/positioned to each other.

Panel layers may be coated with anti-reflective and/or or polarizing compounds.

Corners of the panels may provide electrical contact through leads along the inside edges of the pyramid cell or the edges between the sides of folded cross panels. A simplified version of a truncated mounting post can draw current from the inside edge leads into a central location (not shown).

The non-post, stacking flower has nested panels press fit into the cross panel sides. Electrical contacts may be at the outer corners of the horizontal panels with the edges of the cross panels providing a serial connection. The cross panels may have groove features on the inside face to hold the horizontal panels when folded in place or they may be bonded or a combination of the two. The panels may be flat or curved and may be positioned in various orientations within the pyramid cavity, not necessarily parallel to the footprint/base of the pyramid. The hub base is used to support the cross panel hinges. The hub body provides a wiring path as in the other designs and support for the hinge contacts. It has a low profile as it is not used to support flower petals. A mounting fastener connects through hub body, which has a countersunk through hole to position it.

Electric leads from the wiring path connect through the hub base. The hub base nests the hub body and the mounting fastener and the internal wiring leads connects to the hinge contacts.

The backside of the cross panels may be coated with electroluminescent paint, electroluminescent tape or LEDs.

Supercapacitors are designed for quick charging, while batteries are designed to provide long-term energy. Supercapacitors, also called "ultracapacitors" are lightweight and have a high power density, meaning they can charge and discharge over a range of a fraction of a second to minutes. They maintain high efficiency over many years, millions of cycles and a wide range of temperatures, but are expensive and have limited storage. Conversely, batteries have high energy density, meaning they can charge and discharge over the course several minutes to several hours. They are less expensive and have more storage than supercapacitors. However, their cycle life is much shorter. Also, their operating temperature is limited and they degrade quickly under heavy loads such as intermittent solar power. By shifting load spikes to supercapacitors, the life of the battery can be extended. And as supercapacitor storage increases, it will complement batteries in applications such as electric vehicles, speeding up charge times significantly.

Capacitor storage is directly related to the surface area of their electrodes, so a dense stacking of honeycomb layers was introduced as a method of increasing energy storage. The density of the layers within the supercapacitor and the number of layers may vary. These layers are coated with graphene, or equivalent nano-particles, creating additional surface area, which leads to higher storage capacity. The pattern of the electrodes may be an array of any geometry, not necessarily honeycomb. And the pattern on each layer may combine with the pattern on subsequent layers to make a specific 3D geometry to get optimum surface area. The layers are not restricted to being parallel to the base/footprint of the pyramid. Nor are they restricted to being parallel to each other or flat. They may be curved.

A superconductive gel electrolyte is introduced between the layers which increases energy density, extending discharge time to match that of batteries. Until the advent of Additive Manufacturing, also known as 3D printing, the intricate geometries for these supercapacitors was not workable or they were prohibitively expensive. As the speed of this process increases, parts can move directly from prototype to manufacturing, driving costs down further.

They may be made in part or in full with specific 3D printing methods such as Fused Filament Fabrication (FFF), Fused Deposition Modeling (FDM), Stereolithography (SLA), Selective Laser Sintering (SLS) and Direct Metal Laser Sintering (DMLS). In one non-limiting embodiment, a process which cures SLA resin with oxygen and UV light increases print speed up 25× to 100×. This ultrafast additive method is geared toward full production.

Supercapacitor layers may be made with chemically etched metal plates or foil to increase surface area/capacity.

Conventional manufacturing methods such as injection molding, thermoforming or blow molding may be used for various components in the capacitor cell. Conventional manufacturing methods may be used in conjunction with 3D printing to make these components.

An alternate, hybrid configuration which combines supercapacitor layers and solar panel layers in a single pyramid cell may be used where there is space, weight and/or cost restrictions. The bottom section of the pyramid space would function as a capacitor, while the top would be for solar panels. Other non-limiting configurations may substitute batteries for capacitors in the same space.

NOTE: batteries may substitute or complement capacitor storage in any of the various embodiments.

The components of a supercapacitor cell include: cell cover, honeycomb lattice pyramid, supercapacitor casing and supercapacitor connection rack. Electrical contacts include the following: a positive serial post, positive electrical leads, a negative serial post and negative electrical leads. The posts provide a serial connection for each of the honeycomb layers, according to their charge. The positive leads and the negative leads will connect into posts on the supercapacitor casing which will snap fit into the supercapacitor connection rack. The rack has internal wiring to draw current into two of its own leads that snap fit into sockets on the pyramid wall body. These leads then connect to the conductive elements in the bird-bone frame on the pyramid wall section.

In one non-limiting embodiment multiple positive honeycomb layers combine with negative honeycomb layers to complete a honeycomb lattice pyramid. In one non-limiting embodiment, a module is upside down and attached to an identical module. In other non-limiting embodiments, the opposite section may be a pyramid wall panel. Wall section may have multiple versions of solar panels and covers in it, including a hybrid supercapacitor/post-less flower panel cell. This configuration allows for solar collection and storage on a single sided pyramid wall in applications where vertical space or depth or weight is limited. Other configurations may include a horizontal stacking flower, conventional flower or any combination thereof.

An alternate, hybrid configuration which combines supercapacitor layers and solar panel layers in a single pyramid cell may be used where there are space, weight and/or cost restrictions. The bottom section of the pyramid space would function as a capacitor, while the top would be for solar panels.

This configuration allows for solar collection and storage on a single sided pyramid wall. This can be for applications where vertical space or depth or weight is limited.

Other non-limiting configurations may substitute batteries for capacitors in the same space.

In a further embodiment, the Pyramid Wall System has applications for both mobile installations and the trucking industry. Mobile setups may be deployed for emergency power or shelters in remote locations, their containers formed from Pyramid Wall sections that are hinged in one or more segment. They may unfold and track the Sun or form a fixed structure. Within the trucking industry, tractor-trailers and other vehicles can use the Pyramid Wall System to offset fuel costs in part or in total. Tractor-trailers would benefit from several features of the Pyramid Wall System including, but not limited to the following:

1) Its unique geometry leads to increased stiffness and strength compared to conventional walls and roofs of the same size. This strength can be augmented with a bird-bone lattice frame.

2) The configuration of solar panels within this geometry leads to increased energy collection compared to panels laid flat over the same footprint.

3) The ability to quickly charge advanced supercapacitors reduces the time needed at refueling stations, while supercapacitor/battery combinations allow a controlled discharge of power for hybrid or fully electric vehicles.

4) Drag reduction from dimpled covers can save at least 11% annual fuel costs. Additional features such as the Fluke can reduce drag further.

5) The Pyramid Wall System may provide power for refrigerated units, while the closed cell interior of the wall sandwich sections can provide thermal insulation.

6) Electroluminescent paint, electroluminescent tape or light-emitting diodes (LED)s can provide night time illumination and/or signage through the panels and/or flukes. LEDs may be individual components in an array, in a ribbon or in a sheet. They can also use this illumination feature to augment signaling. Their low power consumption allows them to draw off of the capacitor-battery portion of the Pyramid Wall System without an external source. A luminescent layer can be a coat the back side of the last layer of panels or the inside faces of the pyramids. In one non-limiting embodiment, the top faces of the pyramids on the sides of a trailer may be coated for downward illumination.

7) Container sides may be retrofitted to house Pyramid Wall sections or completely constructed out of Pyramid Wall sections. They may include single sided wall panels containing solar cells or any combinations of solar panel-capacitors.

8) Pyramid Wall sections may have transparent covers for weather protection and a variety of dimple shapes. These covers can form side panels with shapes independently positioned and configured for maximum drag reduction. Some covers may have simple lens characteristics; either conventional, Fresnel or lenticular based on the position of the Pyramid Cell. In addition, pyramid cavities may have uneven sides in order to achieve the maximum potential solar collection, based on their position within the wall. The covers may be individually formed or made in a complete sidewall sheet. It would be followed by a post process to allow individual sections to be replaced in case of damage or if reconfigured. The covers may have drag reducing "Flukes" on the leading and trailing edges. These flukes may be individually formed or made in a complete sidewall sheet with the ability to be replaced. Drag reduction covers may be used on existing trailers without other features of the Pyramid Wall sections.

For a fully assembled tractor trailer with the Pyramid Wall System, dimpled covers are configurable and may be used without solar panels or electrical storage such as batteries or capacitors. The dimpled covers may also be used on conventional trailer sides without Pyramid Wall sections. In one non-limiting embodiment, a standalone trailer frame, three wall sections the length of a trailer and two wall sections to fit the ends of a trailer are assembled. Wall sections can be made in various sizes and bonded together to make a complete trailer side or they can be made as a single panel, with or without connecting features or electrical features. Two side transparent, dimpled covers; one top transparent, dimpled covers and two end, transparent dimpled covers are added. The dimple patterns on these walls are configurable and optimized based on input from wind tunnel tests and 3D model simulations such as computational fluid dynamics (CFD). Also, the size, shape and disposition of aerodynamic flukes along the leading and trailing edges of the trailer may be configured based on the intended use. Their footprint can be aligned with dimples, which in one non-limiting embodiment may be a pattern choice based on experimental data. Triangular shaped cavity seals for covers of a variety of shape fill the contours at the edges of the trailer. In one, non-limiting embodiment, these cavity seals are a feature of a cover configuration.

In one non-limiting embodiment, a pyramid configuration with uneven sides (e.g., shortened at the top) can be used to capture incident light from the bottom rows on a trailer. Panel sides and covers can also be customizable.

Various embodiment provide a solar panel pyramid array that wraps around a pole which can be used as a lamp post. The array can have multiple layers of inverted pyramids arranged in a radially shape (for example, circularly arranged around 360°). In one embodiment, there are 3 layers of 8 pyramids for a total of 24. In other embodiments there may more or less layers and/or pyramids per layer. The post may also include batteries for storing energy collected by the pyramidal collectors.

FIG. 236A shows a lamp post embodiment. The lamp post includes a central post 23610 around which is a batter pack wrap 23620 having battery slots 23621 for receiving battery units. In this non-limiting embodiment the battery units may be loaded from the top; however, in other embodiments the battery units may be loaded using other methods. The lamp post features solar collecting units 23630 which face upwards and light emitting units 23640 which face downward. FIG. 236B shows another view of the lamp post embodiment. In this embodiment, the light emitting units 23640 include an LED 23642 configured to provide light.

FIG. 237 demonstrates stacked solar collecting unit 23730 for the lamp post embodiment. These solar collecting unit 23730 may be stacked above the solar collecting units 23630 so as to provide additional energy collection. Each solar collecting unit 23630 includes upward facing stack portions 23735. When stacked the units may be aligned so as to offset the relative radial position of the unit 23630 compared to the radial position of a unit directly below by a given amount, for example, each solar collecting unit 23630 may be offset by 120° from the one below.

FIG. 238 shows a battery pack 23820 for use in the lamp post embodiment. The curved battery pack 23820 includes a batter pack cap 23822 and a battery pack shell 23824 which enclose battery cells 23826. The battery pack 23820 shown has four battery cells 23826; however, in other embodiments more or less battery cells 23826 may be included. FIG. 239 shows a curved battery wrap 23920 for use in the lamp post embodiment. The batter pack wrap 23920 includes slots for receiving the curved battery pack slot 23921.

FIGS. 240-242 illustrate various rotations for a rhombus pyramid. The base footprint of the pyramid may maintain a perpendicular relationship to a primary plane which is perpendicular to the ground, that primary plane being perpendicular to a secondary plane which is also perpendicular to the ground. While maintaining its perpendicular relationship to the primary plane, the base footprint may be angled between 0°-90° against the secondary plane. These rotations provide three degrees of rotation/orientation (X,Y & Z).

FIG. 243 shows a single collector unit 24310 with a control unit 24320 for use in various embodiments. The collector unit 24310 is connected to the control unit 24320 via lead wires 24330 which provide power collected by the collector unit 24310. The control unit 24320 is also connected to the collector unit 24310 via emitter cable 24340. The emitter cable 24340 may be used to control an LED or provide light through a fiber optic cable.

In further embodiments, the control unit 24320 may be similarly connected to additional collector units 24310. The control unit 24320 may include individual circuitry or processors capable of controlling light emission for each collector unit 24310 or include a single processing unit for centralized control of the collector units 24310.

FIG. 244 shows a solar cell panel 24410 of a collector unit 24310. The solar cell panel 244410 has a collection area 24412 and a frame 24414. At the bottom of the solar cell panel 244410 are leads 24416 to transmit energy collected. The frame 24414 may be transparent to spectrums of light capable of being collected by the collector unit 24310 and/or reflective to such spectrums.

FIG. 245 shows the solar cell panel 24410 with a support clip 24510. The support clip 24510 is configured to provide additional structural support for the solar cell panel 24410 in order to prevent excess movement or bending. The support clip 24510 may be affixed to the frame 24414 by glue or any other means.

FIG. 246 shows the solar cell panel 24410 with a lead connectors 24610 attached to the leads 24416. These lead connectors 24610 are configured to electrically connect multiple solar cell panels 24410 so that the energy collected is combined. FIG. 247 is a closeup view of the lead connector 24610 with four solar cell panels 24410 interconnected.

FIG. 248 shows the solar cell panel 24410 in a unit junction 24810. The unit junction 24810 ensures the placement of various components of the collector unit 24310. FIG. 249 shows multiple solar cell panels 24410 of the collector unit 24310 connected to a lead wires 24330.

FIG. 250 shows a flower base 25010 for the collector unit 24310 and FIG. 251 shows (in a cut-out view) the flower base 25010 with an inward-facing flower cell 25110. The flower base 25010 may be transparent to spectrums of light capable of being collected by the collector unit 24310 and/or reflective to such spectrums. FIG. 252 shows the flower cell 25010 and the lead wires 24330 without the flower base 25010. FIG. 253 shows the backside of the flower base 25010 with additional, outward-facing flower cells 25010. In this non-limiting embodiment, the flower base 25010 provides support for eight flower cells 25010, four inward-facing flower cell 25110 and four outward-facing flower cells 25010.

FIG. 254 shows two sets of back-to-back flower cells 25010 connected to flower cell leads 24520 by flower cell connectors 25410. These flower cell leads 24520 are configured to electrically connect multiple flower cells 25010 so that the energy collected is combined. In addition, the flower cell leads 24520 may also electrically connect to lead connectors 24610 so that energy from the solar cell panels 24410 and the flower cells 25010 are joined together.

FIG. 255 shows the solar cell panels 24410 and flower cells 25010 of the collector unit 24310. As shown, pairs of flower cells 25010 are positioned on opposite faces of the flower base 25110 and from an inner portion of the collector unit 24310. The solar cell panels 24410 are arranged around this inner portion completing the flower design. The solar cell panels 24410 and flower cells 25010 are secured by the unit junction 24810.

FIG. 256 illustrates an LED 23642 for use in various embodiments. The LED 23642 includes various LED emitters 25610 configured to emit light in a given spectrum. The LED emitters 25610 may all be configured to emit light in the same spectrum or individual LED emitters 25610 may be configured to emit light at different spectrums. The LED 23642 may be powered by LED connectors 25620.

In further embodiments, a fiber optic component may be used instead of a LED 23642. In some situations, the heat generated at higher wavelengths from the LEDs can contribute to loss of solar cell efficiency if the cells are next to the LEDs. To avoid this, LEDs could be put inside the system and thermally isolated from the panels. Fiber optic strands can then be used to draw the light out for illumination.

In either embodiment, various spectrum can be used to illuminate the solar panels. This can include infrared (IR) light so that the panels are provided IR light and/or visible light (or any other spectrum). In such embodiments, the panels may be configured so as to be response to such spectrums, for example, panels which respond strongly to IR light being illuminated with IR light.

FIG. 257 illustrates an expanded fiber optic cable for use in various embodiments. The emitter cable 24340 in this embodiment includes expanded optical fibers 25710 at one end and a fiber optic connection 25720 at the other. FIG. 258 illustrates the expanded optical fibers 25710 on the end of the emitter cable 24340. In this embodiment, a set of central fibers 25810 are surrounded by a series of expanded fibers 25820. Each fiber ends in a fiber optic tip 25712. As shown, the fiber optic tips 25712 are shaped as circles perpendicular to the length of the fiber. In other embodiments, the tips may be shade in various ways, for example, a sloped oval shape, a round bulb end, a conical point, etc.

FIG. 259 shows a fiber optic cable positioned within a unit junction 24810 of the collector unit 24310. The central fibers 25810 extend through a central fiber opening 24812. In an alternative embodiment, the unit junction 24810 may provide a receptacle for receiving and powering a LED 23642.

The unit junction 24810 also includes expanded fiber openings 24814 for the expanded fibers 25820 and, as shown in FIG. 261, flower cell leads 24520. The unit junction 24810 includes flower base receivers 24816 for receiving the flower base 25110 and connector notches 24818 for receiving the lead connectors 24610.

FIG. 260 shows the expanded optical fibers 25710, unit junction 24810 and flower cell 25010 of the collector unit. FIG. 261 shows the flower base 25110 connected to the unit junction 24810 and supporting multiple flower cells 25010. FIG. 262 shows solar cell panels 24410 connected to the unit junction 25010 and footprint cells 26210.

FIG. 263 shows the collector unit 24310 with four side walls 26310 forming a pyramid shape and FIG. 264 shows the collector unit 24310 with a footprint mirror 26410 covering the pyramid shape. The side walls 26310 and footprint mirror 26410 configured to reflect light which the solar cell panels 24410, flower cells 25010 and/or footprint cells 26210 are responsive to back into the pyramid shape.

The side walls 26310 and footprint mirror 26410 may be one-way reflective so that light outside the pyramid shape can enter.

The solar cell panels 24410, flower cells 25010 and footprint cells 26210 may be configured to be responsive to either the same spectrum of light or different spectra of light. These spectra may or may not overlap.

The footprint mirror 26410 may also act a cover for the pyramid shape. In such embodiments, the footprint mirror 26410 (e.g., a one-way mirror) can also focus incoming light and/or be optically clear to the desired spectrum (e.g., IR light).

Enclosed IR responsive units take advantage of potential increased output and can be stacked back-to-back (or footprint-to-footprint). In such embodiments, the stacked units may each have separate footprint mirrors 26410, share a single footprint mirror 26410 or omit the footprint mirror 26410. This also allows the combined units to take up a more compact space. They could be used on the pyramid shaped building, on stand-alone walls, pole mounted units or anywhere there's an exposed pyramid base (e.g. rhombus shaped surface).

FIG. 265 shows a back-to-back unit 26510 which is made of a pair of infrared (IR) collector units 24310 placed back-to-back. In other non-limiting embodiments, sets of infrared (IR) collector units 24310 may be connected side-to-side so as to share a side wall 26310 instead of a footprint mirror 26410.

FIG. 266 demonstrates pyramid flower wall panels combined into a pyramid building 26610. The flower wall panels may also be combined to any size with any number of pyramids in an array. Likewise, the combined building may be any shape, such as cubic, domed, etc.

As discussed above, a lattice can be bolted into a wall in order to support an array of pyramid sections. In various embodiments, the lattice may be flexible so that it can bend around an uneven surface or even wrap around a curved surface. Then, the pyramid sections can be secured against the non-planar surface. FIG. 267 shows a flexible lattice 26710 and an array of collector units 26720 for use against a curved wall. FIG. 268 shows the flexible lattice 26710 in place against the collector units 26720.

In various embodiments, pulse-wave modulation (PWM) enables the solar panels to better maximum photovoltaic (PV) power. A controller, for example, a computer/CPU/ASIC, may be included to the LED system, such as control unit 24320. The controller can receive input from meters on the power lines to track output and from sensors around the system, for example, thermometers to measure heat.

The system uses the controller with multiple (analog) inputs to flood photovoltaic cells with light. Low-light photovoltaics can use significantly less light to activate them to full potential. By using pulse-wave modulation to control the light sources, the light input value can be increased or decreased to supply the photovoltaic cells with the desired amount of light. The microcontroller can poll the analog inputs for the light source value, the PV Array resistor for a ohms value, the PV Array for a voltage value, and the temperature of the array. By speeding up or slowing down the PWM of the light source, the efficiency of power can be maximized.

The controller can be configured to operate on scheduled triggers and/or on automatic triggers based on the input data (for example, when the data passes a given threshold value, either high or low).

An embodiment provides a method for using pulse width modulation to efficiently drive artificial light sources and wavelength emitters for the purposes of achieving efficient activation of photovoltaic cells. Pulse-wave modulation (PWM) of lights sources or wavelength emitters is used to illuminate a solar collector. Using PWM the light source is turned on and off repeatedly. Each on-off cycle takes a given period and the duty of the cycle represents the amount of time the light is on. Increasing the PWM causes the light to flash more, reducing the time on.

The method includes using a microcontroller or computer with sensors and data acquisition devices to monitor conditions within the solar collector in real-time. In response to a triggering event, performing an adjustment of the light sources/wavelength emitters to maximize generation of power using defined rules and/or manual notification triggers by a human operator.

FIG. 269 is a logic flow diagram 26900 that illustrates a method, and a result of execution of computer program instructions for automatic trigger control, in accordance with various embodiments. In accordance with an embodiment a method performs, at Block 26910, a step of automatically triggering control of PWM light source. At Block 26920, the method determines if an analog input triggered the event. If not, the method proceeds to Block 26960. At Block 26930, the method determines what type of analog trigger was received. These triggers could be a temperature trigger, at Block 26942, a resistance or voltage trigger, at Block 26944, or a light trigger, at Block 26946. The method also includes, at Block 26950, changing the light source to maximize power. Then, at Block 26960, the method determines that no further action is needed to respond to this trigger and ends.

FIG. 270 is a logic flow diagram 27000 that illustrates a method, and a result of execution of computer program instructions for scheduled trigger control, in accordance with various embodiments. In accordance with an embodiment a method performs, at Block 27010, a step of receiving a scheduled trigger control of the PWM light source. The method determines if there is a schedule pending at Block 27020. If not, the method proceeds to Block 27070. At Block 27030, the method determines if an analog input triggered the event. If not, the method proceeds to Block 27070. At Block 27040, the method determines what type of analog trigger was received. These triggers could be a temperature trigger, at Block 27052, a resistance or voltage trigger, at Block 27054, or a light trigger, at Block 27056. The method also includes, at Block 27060, changing the light source to maximize power. Then, at Block 27070, the method determines that no further action is needed to respond to this trigger and ends.

FIG. 271 is a logic flow diagram 27100 that illustrates a method, and a result of execution of computer program instructions for analog triggers, in accordance with various embodiments. In accordance with an embodiment a method performs, at Block 27110, a step of responding to a temperature trigger by increasing the light source PWM to decrease the temperature, at Block 27115. The method responds to a resistance or voltage trigger, at Block 27120, by increasing the light source PWM if voltage decreases or resistance increases, at Block 27125. The method performs, at Block 27130, a step of responding to a light trigger by decreasing the light source PWM to compensate for low PV, at Block 27135. At Block 27140, the result should be increased photovoltaic power.

The various blocks shown in FIGS. 269-271 may be viewed as method steps, as operations that result from use of computer program code, and/or as one or more logic circuit elements constructed to carry out the associated function(s).

FIG. 272 shows a simplified circuit diagram 27200 of a device that is suitable for practicing various embodiments. The circuit 27200 includes a processor 27210 which is configured to receive data from a voltage input 27222, a temperature sensor 27224 and a resistance input 27226. The processor provides PWM control to a MOSFET 27230 which powers the pulsing LED 27240.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium can be used with computer programs written in accordance with the teachings herein, or it may be more convenient to construct a more specialized apparatus to perform the required operations.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A lamp post comprising:
a central post;
a plurality of upward-facing solar collectors positioned around the central post, wherein at least one solar collector of the plurality of upward-facing solar collectors is responsive to infrared spectrum light;
at least one energy collecting unit configured to receive energy collected by the plurality of upward-facing solar collectors, wherein the at least one energy collecting unit comprises at least one curved battery unit configured to be positioned around the central post; and
a plurality of downward-facing light emitters positioned around the central post, wherein the plurality of downward-facing light emitters are powered by the at least one energy collecting unit.

2. The lamp post of claim 1, wherein the plurality of downward-facing light emitters each comprise at least one LED configured to generate light.

3. The lamp post of claim 1, wherein the plurality of upward-facing solar collectors comprises at least two units of stacked upward-facing solar collectors, wherein each stacked upward-facing solar collector comprises a set of solar collectors positioned around the central post.

4. The lamp post of claim 3, wherein the at least two units of stacked upward-facing solar collectors are aligned so as to be offset in relative radial positions.

5. The lamp post of claim 4, wherein the at least two units of stacked upward-facing solar collectors comprise an upper solar collector and a lower solar collector, and the upper solar collector is radially offset to the lower solar collector by 120°.

6. The lamp post of claim 1, wherein the at least one curved battery unit comprises a battery pack shell, a battery pack cap and a plurality of battery cells disposed within the battery pack shell.

7. The lamp post of claim 6, wherein the plurality of battery cells comprises four battery cells.

8. The lamp post of claim 1, further comprising a batter pack wrap disposed around the central post and configured to receive the at least one curved battery unit.

9. The lamp post of claim 8, wherein the batter pack wrap is configured to receive five curved battery units.

10. A lamp post comprising:
   a central post;
   a plurality of upward-facing solar collectors positioned around the central post;
   at least one energy collecting unit configured to receive energy collected by the plurality of upward-facing solar collectors, wherein the at least one energy collecting unit comprises at least one curved battery unit configured to be positioned around the central post; and
   a plurality of downward-facing light emitters positioned around the central post, wherein the plurality of downward-facing light emitters are powered by the at least one energy collecting unit,
   wherein at least one solar collector of the plurality of upward-facing solar collectors comprises a light emitting element.

11. The lamp post of claim 10, wherein the light emitter is configured to emit light in the infrared spectrum.

12. The lamp post of claim 10, wherein the light emitting element is a light emitting diode (LED).

13. The lamp post of claim 10, wherein the light emitting element is a fiber optic tip.

14. The lamp post of claim 10, wherein the light emitting element is configured to illuminate the at least one solar collector.

15. The lamp post of claim 10, wherein the plurality of downward-facing light emitters each comprise at least one LED configured to generate light.

16. The lamp post of claim 10, wherein the plurality of upward-facing solar collectors comprises at least two units of stacked upward-facing solar collectors, wherein each stacked upward-facing solar collector comprises a set of solar collectors positioned around the central post.

17. The lamp post of claim 16, wherein the at least two units of stacked upward-facing solar collectors are aligned so as to be offset in relative radial positions.

18. The lamp post of claim 17, wherein the at least two units of stacked upward-facing solar collectors comprise an upper solar collector and a lower solar collector, and the upper solar collector is radially offset to the lower solar collector by 120°.

19. The lamp post of claim 10, wherein the at least one curved battery unit comprises a battery pack shell, a battery pack cap and a plurality of battery cells disposed within the battery pack shell.

20. The lamp post of claim 19, wherein the plurality of battery cells comprises four battery cells.

21. The lamp post of claim 10, further comprising a batter pack wrap disposed around the central post and configured to receive the at least one curved battery unit.

22. The lamp post of claim 21, wherein the batter pack wrap is configured to receive five curved battery units.

* * * * *